US006341372B1

(12) United States Patent
Datig

(10) Patent No.: US 6,341,372 B1
(45) **Date of Patent: *Jan. 22, 2002**

(54) UNIVERSAL MACHINE TRANSLATOR OF ARBITRARY LANGUAGES

(76) Inventor: William E. Datig, P.O. Box 528, Centerport, NY (US) 11721

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/876,378

(22) Filed: Jun. 16, 1997

Related U.S. Application Data

(63) Continuation-in-part of application No. 08/847,230, filed on May 1, 1997.

(51) Int. Cl.[7] .................................................. G06F 9/45
(52) U.S. Cl. ............................... 717/7; 717/8; 707/523
(58) Field of Search ................................ 395/705, 706, 395/707; 704/2, 18; 707/540, 523; 706/4, 5; 717/7, 8

(56) References Cited

U.S. PATENT DOCUMENTS

| | | | | | |
|---|---|---|---|---|---|
| 4,286,330 | A | | 8/1981 | Isaacson | 712/223 |
| 4,773,039 | A | * | 9/1988 | Zamora | 707/540 |
| 4,852,003 | A | * | 7/1989 | Zamora | 704/18 |
| 4,864,503 | A | * | 9/1989 | Tolin | 704/2 |
| 5,193,144 | A | * | 3/1993 | Tustsumi et al. | 706/60 |
| 5,323,311 | A | * | 6/1994 | Fukao et al. | 704/2 |
| 5,481,700 | A | | 1/1996 | Thuraisingham | 707/9 |
| 5,490,061 | A | * | 2/1996 | Tolin et al. | 704/2 |
| 5,632,022 | A | | 5/1997 | Warren et al. | 345/350 |
| 5,706,406 | A | * | 1/1998 | Pollock | 706/51 |
| 5,778,405 | A | * | 7/1998 | Ogawa | 707/532 |
| 5,806,021 | A | * | 9/1998 | Chen et al. | 704/9 |
| 5,974,246 | A | * | 10/1999 | Nakazawa | 703/2 |

FOREIGN PATENT DOCUMENTS

WO WO 98 49629 A 11/1998

OTHER PUBLICATIONS

Hovy, Eduard, "How MT Works", *Byte*, vol. 18, No. 1, Jan. 1993, pp. 167–176.

Simmons, R. F., "Technologies for Machine Translation", *Future Generations Computer Systems*, vol. 2, No. 2, Jun. 1986, pp. 83–94.

(List continued on next page.)

*Primary Examiner*—Kakali Chaki
*Assistant Examiner*—Anil Khatri
(74) *Attorney, Agent, or Firm*—McDermott, Will & Emery

(57) ABSTRACT

A universal machine translator of arbitrary languages enables the semantic, or meaningful, translation of arbitrary languages with zero loss of meaning of the source language in the target language translation, which loss is typical in prior art human and machine translations. The universal machine translator embodies universal transformations itself and comprises the means for identifying high-level grammatical constructions of a source language word stream, constructing a grammatical world model of the syntax of the source language high-level word stream, decomposing source and target languages into universal moments of meaning, or epistemic instances, translating the epistemic moments of source and target languages with substantially no loss in meaning, constructing a grammatical world model of the syntax of the target language high-level word stream, optionally adjusting the target language syntax to comply with a preferred target language grammar, and generating the translated target language word stream. The universal machine translator also comprises the means to embody arbitrary sensory/motor receptions and transmissions of arbitrary word streams, which allows universally translated communications to occur among human beings and machines.

6 Claims, 203 Drawing Sheets

OTHER PUBLICATIONS

Slocum, Jonathan, "Machine Translation: An American Perspective", *Proceedings of the IEEE*, vol. 74, No. 7, Jul. 1986, pp. 969–978.

Arnold, Doug, "Eurotra: A European Perspective on MT", *Proceedings of the IEEE*, vol. 74, No. 7, Jul. 1986, pp. 979–992.

PCT International Search Report, Date of Mailing Oct. 28, 1998, Int'l. Appln. No. PCT/US98/08527, Int'l. Filing Date Apr. 27, 1998, Applicant: William E. Datig. (3 pgs.).

Bates et al. "Recognizing substring of LR (k) languages in linear time", ACm Trans Prog. Langu & sysys. vo. 16, No. 3, pp. 1051–1077, May 1994.*

Kukich, "Techniques for automatically correcting words in text", ACM computing surveys, vo. 24, No. 4, pp. 377–439, Dec. 1992.*

Tabatabai et al, "Efficient and langugae independent mobile programs", ACM PLDI, pp. 127–136, May 1996.*

Chien, "PAT tree based keyword extraction for Chinese information retrieval", ACM SIGIR, pp. 50–58, Mar. 1997.*

* cited by examiner

THE DEFAULT MODE OF THE RG MODULE:
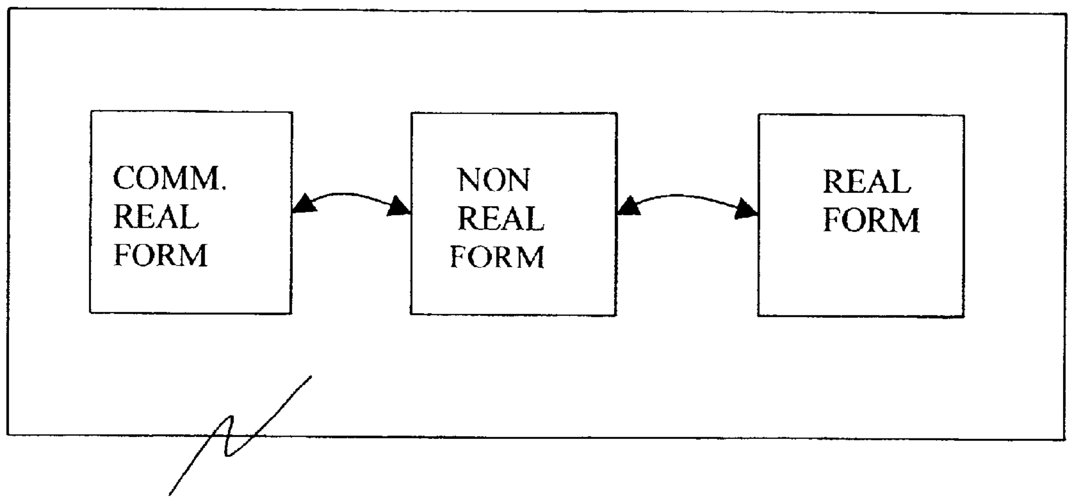
FORMS DETERMINED BY MODULE APPARATUS
THE EXISTENTIAL MODE OF THE RG MODULE:
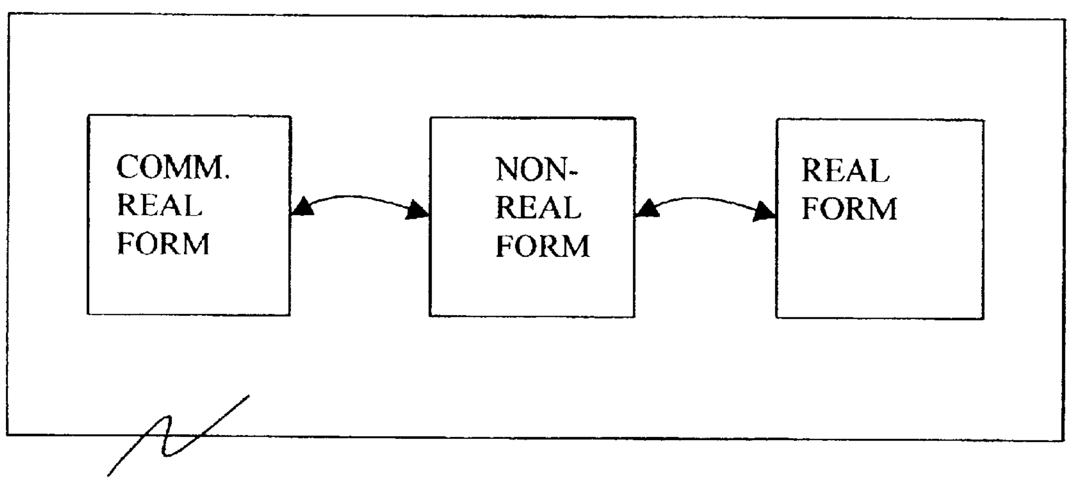
FORMS DETERMINED BY PRONOUN SYSTEM
FIG 9

CONVENTIONAL UNIVERSE:
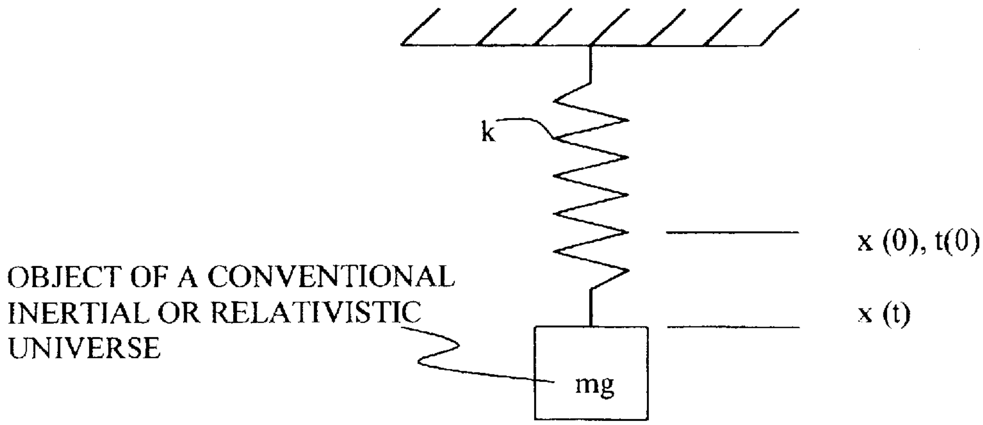
$$x = A \cos \omega t + B \sin \omega t$$
ULTIMATELY REAL UNIVERSE:
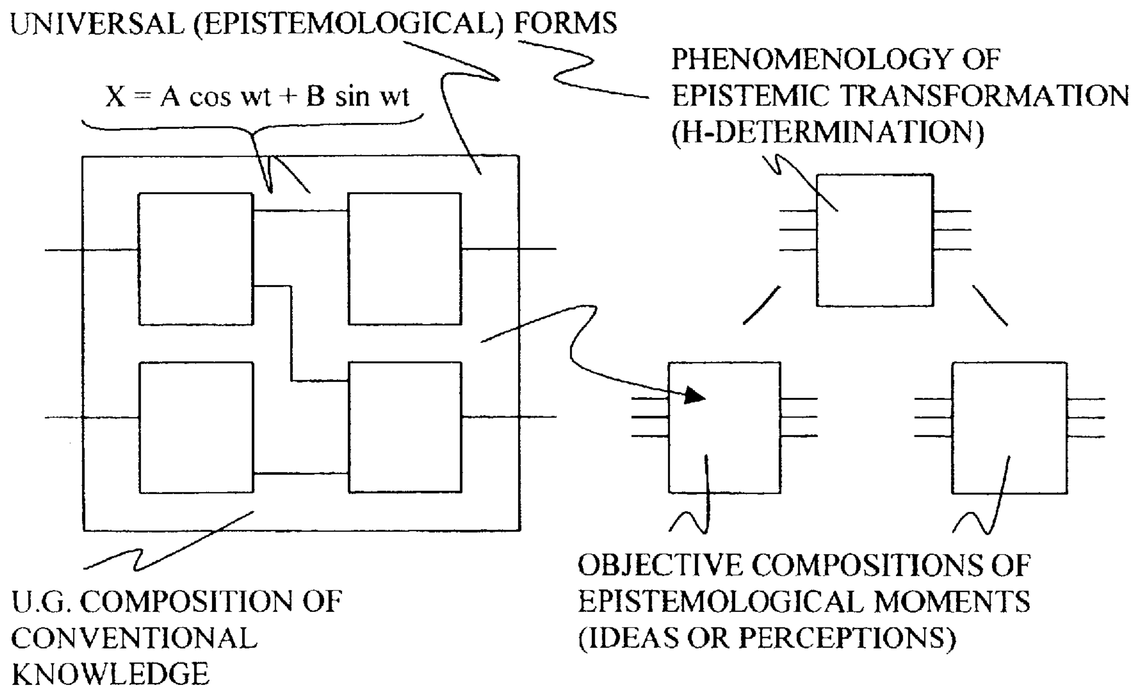
FIG 11

MODELING AND IMPLEMENTATION IN THE DEFAULT MODE:
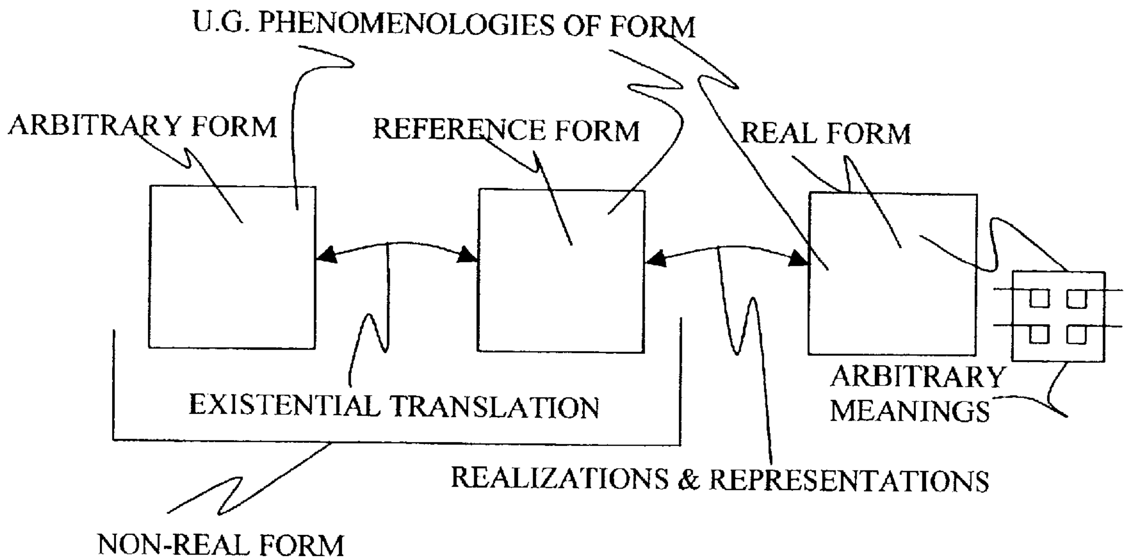
MODELING & IMPLEMENTATION IN THE EXISTENTIAL MODE:
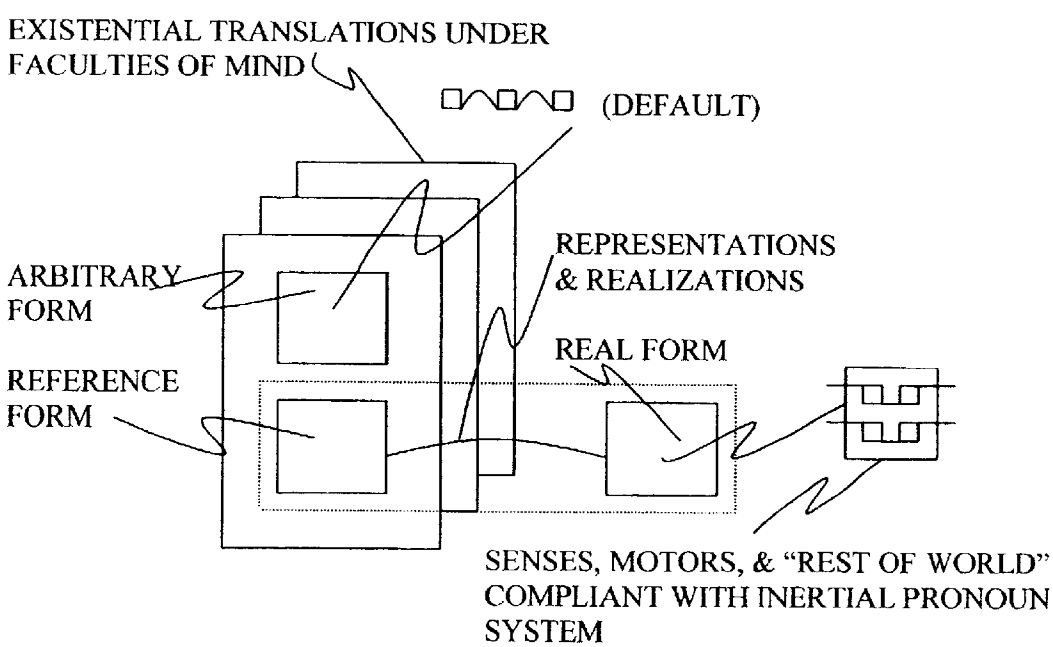
FIG 24

MODELING AND IMPLEMENTATION IN THE DEFAULT MODE:

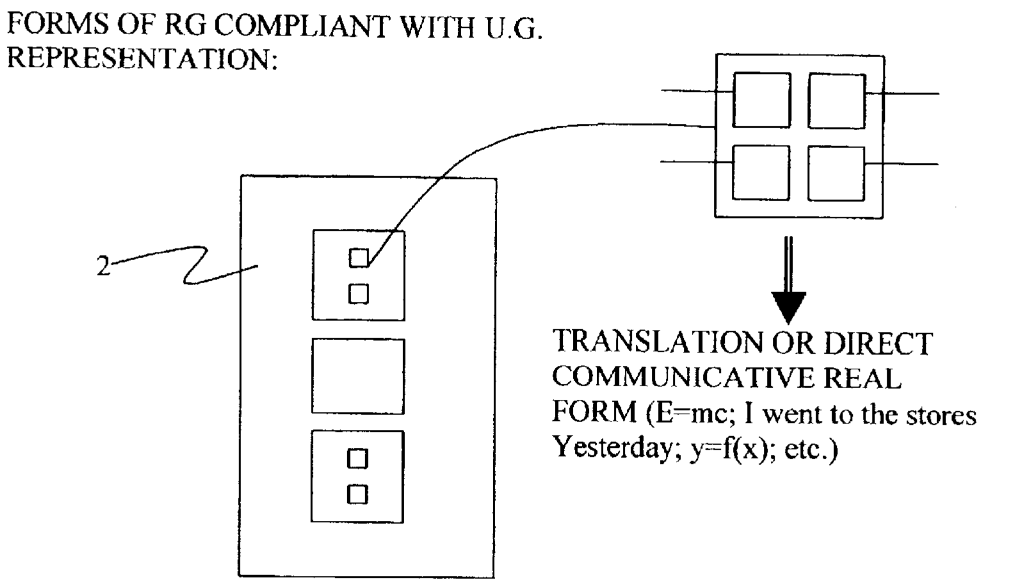
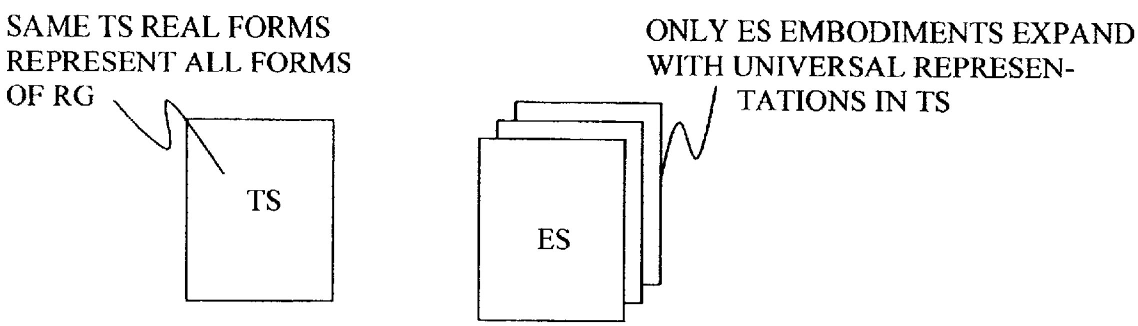
FIG 27

PHENOMENOLOGY OF CONNECTEDNESS

ZB CONFIGURED THROUGHOUT CONTINUUM:

TYPE OF FACULTIES OF MIND

| | |
|---|---|
| RELATION | RELATE; CORRELATE; IDENTIFY; IMIMTATE; AGREE |
| SENSATION | HARD, SOFT, SWEET, FRAGRANT, EXPLOSIVE |
| CONJUNCTIVE QUANTITY | ADD, SUBTRACT, DIVIDE, MULTIPLY, JOIN, SEPARATE |
| TIME | FREQUENT, INFREQUENT, EARLY, LATE |
| ORDER | ARRANGE, CLASSIFY, PRECEDE, ASSEMBLE, DISPERSE |
| GEOMETRICAL FORM | STRAIGHT, CURVED, CIRCULAR, DISTORTED |
| DIMENSION | SHORT, LONG, NARROW, SHALLOW, PARALLEL |
| MENTAL ATTITUDE | ATTENTIVE, CURIOUS, CONFUSED, IMAGINATIVE |
| VOLITION | DESOLATE, CAPRICIOUS, ABANDON, INTEND, COMPEL |
| AFFECTIONS | DISCONTENT, REJOICING, HUMOROUS, UNSELFISH |

| CREATE OR MODIFY ZA | | | | |
|---|---|---|---|---|
| TS | ES | CDS | RS | CS |
| ENGAGES ES THROUGH CS, UNDER MODALITIES OF SM CONSTRUCTION | UNDER THE APPROPRIATE SM MODALITY THE ES TRANSFORMS TO CORRESPOND WITH TS REPRESENTATIONS | NOT APPLICABLE | NOT APPLICABLE | THE TS ENGAGE-MENT CAUSES CS TO TRANSFORM ES IAW SM MODALITIES. IN CONTINUUM, CS ENGAGES APPROPRIATE MES TO TRANSFORM ES EMBODIMENTS. |
| MES | MES | MES | CRCS | |
| IF ZA IS EMBODIED IN CONTINUUM STRUCTURE, MES ENGAGES APPROPRIATE TS OF CONTINUUM | ZA MAY BE DISTRIBUTED OVER ES's OF CONTINUUM. IF THIS ES IS INVOLVED, MES COORDINATES WITH OTHERS | NOT APPLICABLE | NOT APPLICABLE | |

| CREATE OR MODIFY ZB | | | | |
|---|---|---|---|---|
| TS | ES | CDS | RS | CS |
| ENGAGES ES TO TRANSFORM ZESB IN CORRESPONDENCE WITH ZB STRUCTURE REPRESENTED AT TS | UNDER CS, ZESB TRANSFORMS WITH ZB REPRESENTATIONS AT TS. | MAY BE REQUIRED FOR ZA-ZB CORRESPONDENCE | SINCE ZB IS MODIFIED BY COMMUNICATIONS AT TS, CS MAINTAINS ZBREAL OF RS IN CORRESPONDENCE WITH ZB | MAINTAINS ZA-ZBREAL CORRESPONDENCE AND AFFORDS TRANSFORMATION S OF TS-ES OF ZB. |
| MES | MES | MES | CRCS | |
| IN DEFAULT, ZB MAY STRUCTURALLY BE EMBODIED THROUGHOUT THE CONTINUUM | IN DEFAULT, ZB MAY STRUCTURALLY BE EMBODIED THROUGHOUT THE CONTINUUM | IN EXISTENTIAL MODE, CDS ACTION IS LINKED BY CS THROUGHOUT CONTINUUM ON BASIS OF INERTIAL "EXPERIENCE" | PROVIDES CONTINUUM STRUCTURE OF ZBREAL WITH RESPECT TO PRESENT MODULE | |

| DETERMINE ZA OR ZB CORRESPONDENCES | | | | |
|---|---|---|---|---|
| TS | ES | CDS | RS | CS |
| ENGAGES CDS THROUGH CS. ACTION OF CDS IS REPRESENTED AT TS IN SUBORDINATE MODES. | CS MAINTAINS ZB-ZBREAL CORR-ESPONDENCES. APPROPRIATE ES STRUCTURES (ZA OR ZB) ARE TRANSFERRED TO CDS. | IN DEFAULT, CORRESPONDECES OF CDS (MOMENTS, STREAMS F CONSCIOUSNESS & FACULTIES OF MIND ARE ENGAGED) | SINCE CS MAINTAINS ZB-ZBREAL CORR-ESPONDENCE, ZB OF CDS MAY CHANGE WITH ZBREAL OF RS BY CS ACTION | IN DEFAULT, CS TRANSFORMS TS WITH AP-PROPRIATE CDS ACTION AND MAINTAINS ZA, ZB AND ZBREAL CORRESPONDENCE EVEN THOUGH CDS CHANGES ZB STRUCTURES. IN EXISTENTIAL MODE CDS TRANSLATES AS FACULTY OF MIND AND COMM-UNICATES WHEN APPROPRIATE THROUGH TS. |
| MES | MES | MES | CRCS | |
| IF CDS OF CONTINUUM STRUCTURE IS REQUIRED, TS ENGAGES TS OF APPROPRIATE MODULE. | ES STRUCTURES MAY BE IN ANY MODULE OF THE CONTINUUM | THROUGH CS OF RI, ANY CDS MAY BE ENGAGED IN CONTINUUM. | ABOVE APPLIED TO CONTINUUM STRUCTURE OF RS (ZBREAL) | |

| REALIZATION OF ZB | | | | |
|---|---|---|---|---|
| TS | ES | CDS | RS | CS |
| IN DEFAULT, TS, THROUGH CS, ENGAGES RCS OF RS IN EXISTENTIAL MODE, TS ENGAGES FACULTIES OF MIND, WHICH ENGAGE REALIZATIONS | THE ES EMBODIMENT OF ZB IS TRANS-FORMED TO CES FOR REALIZATION UNDER RCS (OR CRCS). ZESB IS MAINTAINED BY CS IN CORRESPOND-ENCE WITH ZBREAL | IN EXISTENTIAL MODE, TRANS-LATIONS OF CDS CORRESPOND TO REALIZATIONS OF RS IN DEFAULT, CDS ALSO ENGAGED FOR ZA-ZB CORR-ESPONDENCE | REALIZATIONS OCCUR UNDER MODES OF EXISTENCE AS DEFINED IN STRUCTURE OF RS. | IN DEFAULT, CS ENGAGES RS UNDER TS MODALITY OF REALIZATION AND MAINTAINS ZB-ZBREAL CORRESPONDENCE AND ZA-ZB CORR-ESPONDENCE IF NECESSARY. IN EXISTENTIAL MODE, CS MAINTAINS TS-CDS-RS CORRESPONDENCE UNDER MODES OF EXISTENCE. |
| MES | MES | MES | CRCS | |
| OTHER TS's ARE ENGAGED IF REALIZATIONS ARE TO OCCUR IN CONTINUUM STRUCTURE | ENGAGED TO THE EXTENT THAT THIS ES (ZA OR ZB) IS INVOLVED IN CONTINUUM REALIZATION | IN EXISTENTIAL MODE, CDS PLAYS CRITICAL ROLE, SINCE TRANSLATIONS OF MIND ARE INERTIAL AND THUS TIED DIRECTLY TO REALIZATIONS | USED AS SPECIFIED TO REALIZE CONTINUUM STUCTURE OF ZBREAL | |

| MODIFYING THE RI PLATFORM | | | | |
|---|---|---|---|---|
| TS | ES | CDS | RS | CS |
| ENABLED CS TO ADAPT TO EXPANSION OF ES, CDS, OR CS CAPACITY | ES STRUCTURES ARE HAND REALIZED BY ENABLER | CDS STRUCTURES ARE HAND REALIZED BY ENABLER | NONE IN RI | EXISTING CS IS ENABLED TO EXPAND OR CONTRACT THIS MODULES' RI CAPACITY TO MODEL & MAINTAIN CORR-ESPONDENCES BETWEEN RI AND REAL FORM OF CONTINUUM |
| MES | MES | MES | CRCS | |
| EXPANDED OR CONTRACTED AS REQUIRED | EXPANDED OR CONTRACTED AS REQUIRED | EXPANDED OR CONTRACTED AS REQUIRED | NONE IN RI | |

FIG 75

LOGIC GATE
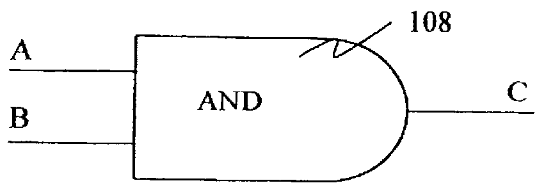
TRUTH TABLE
| A | B | C |
|---|---|---|
| 0 | 0 | 0 |
| 0 | 1 | 0 |
| 1 | 0 | 0 |
| 1 | 1 | 1 |
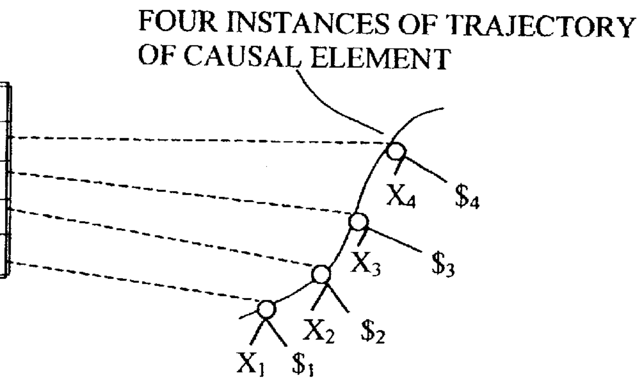
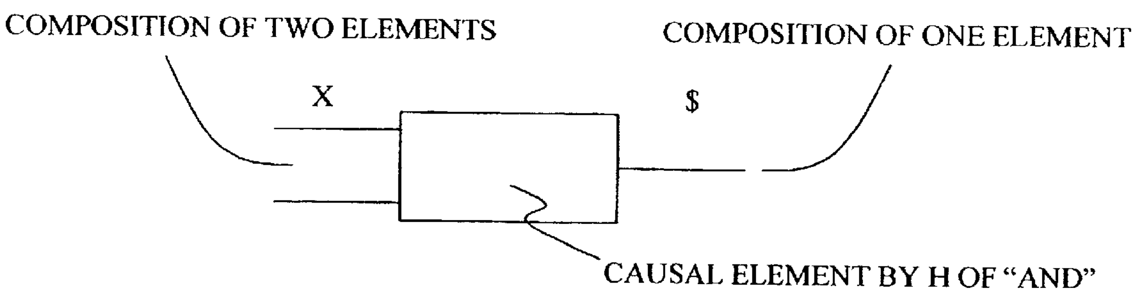
FIG 77

| POLYNOMIAL OF MATHEMATICS $2x + y = 14z + 2$ | | |
|---|---|---|
| $2x + y$ | $=$ | $14z + 2$ |
| $2x$ | $+$ | $y = 14z + 2$ |
| $2x + y = 14z$ | $+$ | $2$ |
| $y$ | $=$ | $14z + 2 - 2x$ |

| | NATURAL LANGUAGE | |
|---|---|---|
| | FOUR SCORE AND SEVEN... WHAT A SPEECH! | |
| FOUR SCORE AND SEVEN... | BLANK OR "AIR SPACE" | WHAT A SPEECH! |
| | I AM HAPPY TODAY | |
| I AM HAPPY | BLANK OR "AIR SPACE" | TODAY |
| TODAY | AIR SPACE OR COMMA | I AM HAPPY |

| 11 Na 23.0 |
|---|

SPEC. OF ATOMIC#, WEIGHT VALENCES, ETC BY PERIODIC CHART FROM (THREE DIMENSIONAL) WAVE EQUATION:

$$\nabla^2\varphi + \frac{2m}{h^2}(E - v)\varphi = 0$$

| | | | | | | | | | | | | | | | | | |
|---|---|---|---|---|---|---|---|---|---|---|---|---|---|---|---|---|---|
| 1 H | | | | | | | | | | | | | | | | | 2 He |
| 3 Li | 4 Be | | | | | | | | | | | 5 B | 6 C | 7 N | 8 O | 9 F | 10 Ne |
| 11 Na | 12 Mg | | | | | | | | | | | 13 Al | 14 Sy | 15 P | 16 S | 17 Cl | 18 Ar |
| 19 K | 20 Ca | 21 Sc | 22 Ti | 23 V | 24 Cr | 25 Mn | 26 Fe | 27 Co | 28 Ni | 29 Cu | 30 Zn | 31 Ga | 32 Ge | 33 As | 34 Se | 35 Br | 36 Kr |
| 37 Rb | 38 Sr | 39 Y | 40 Zr | 41 Nb | 42 Mo | 43 Tc | 44 Ru | 45 Rh | 46 Pd | 47 Aq | 48 Cd | 49 In | 50 Sn | 51 Sb | 52 Te | 53 I | 54 Xe |
| 55 Cs | 56 Ba | 57 La | 72 Hf | 73 Ta | 74 W | 75 Re | 76 Os | 77 Ir | 78 Pt | 79 Au | 80 Hg | 81 Tl | 82 Db | 83 Bi | 84 Bi | 85 Po | 86 Rn |
| 87 Fr | 88 Ra | 89 Ac | 104 Ku | 105 Ha | 106 | | | | | | | | | | | | |

125a ELEMENTS OF THE PHYSICAL UNIVERSE

| | | | | | | | | | | | | | |
|---|---|---|---|---|---|---|---|---|---|---|---|---|---|
| 58 Ce | 59 Pr | 60 Nd | 61 Pm | 62 Sm | 63 Eu | 64 Gd | 65 Tb | 66 Dy | 67 Ho | 68 Er | 69 Tm | 70 Vb | 71 Lu |
| 90 Th | 91 Pa | 92 U | 93 Np | 94 Pu | 95 Am | 96 Cm | 97 Bk | 98 Cf | 99 Es | 100 Fm | 101 Md | 102 No | 103 Lr |

ONE DIMENSIONAL WAVE EQUATION OF HEAT TRANSFER, ELECTRONICS, MECHANICAL VIBRATIONS, ETC.:

$\frac{\partial^2 u}{\partial t^2} = c^2 \frac{\partial u}{\partial x^2}$ SOLVED INTO EIGEN FUNCTIONS$[u_n(u,t) = (B_n\cos\lambda_n t + B_n\sin\lambda_n t)\sin n\pi/l\ x]$, n=1,z AND EIGEN VALUES $\lambda_n=cn\pi/l$ WITH $\lambda_1, \lambda_2$ .... THE SPECTRUM

A POLYNOMIAL IS A SPECIFIC PHENOMENOLOGICAL COMPOSITION, AND, CONTRARY TO CONVENTIONAL THEORIES (OF UNIVERSE/EXISTENCE ETC.) CANNOT OCCUR "AS" A COMPOSITION OR POLYNOMIAL, BUT CAN ONLY "BE COMPOSED" IN MOMENTS OF THE UNIVERSE. ANY POLYNOMIAL EXPRESSION THUS IS ONE OF MANY MOMENTS OF THE (COMPOSED) UNIVERSE (EXCEPT WHEREIN THE CARTESIAN SENSE OR FUNCTION IS TAKEN TO BE A POLYNOMIAL)

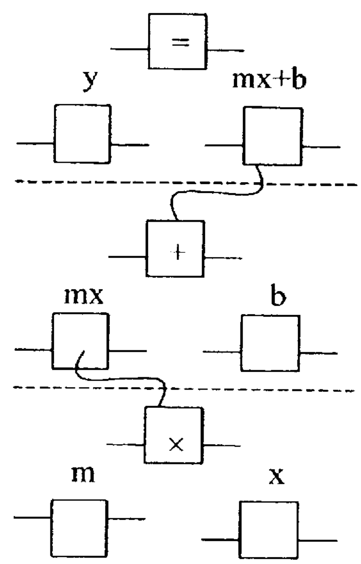

$(2_y + 3_x)z = 14x - y$

[THE PAINTING ON THE WALL OF THE MONA LISA – IS – ONE OF THE MOST INTRIGUING I HAVE EVER SEEN]
-THE LINGUISTIC EXPRESSION IS THE EQUIVALENT TO THE POLYNOMIAL IN U.G. SINCE BOTH ARE COMPOSITIONS (MODALLY OCCURING)

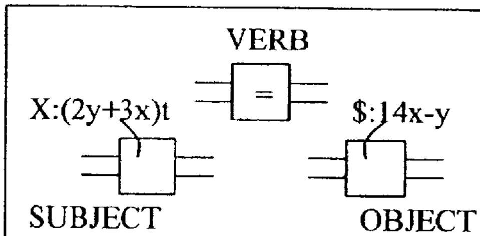

THE COMPOSITIONS (X & $) ARE EXPRESSED AS A SINGLE (MODAL) MOMENT, BUT COULD BE ALTERNATIVELY EXPRESSED IN ANY MODALITY (EG: ANY POSSIBLE ALGEBRAIC MANIPULATION OF THE EXPRESSION).

FIG 95d

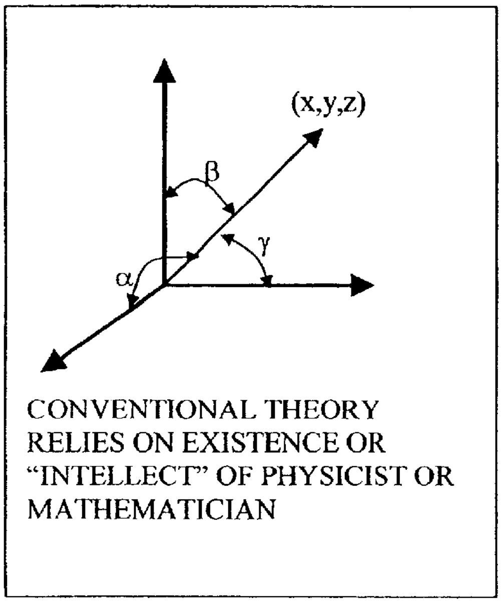
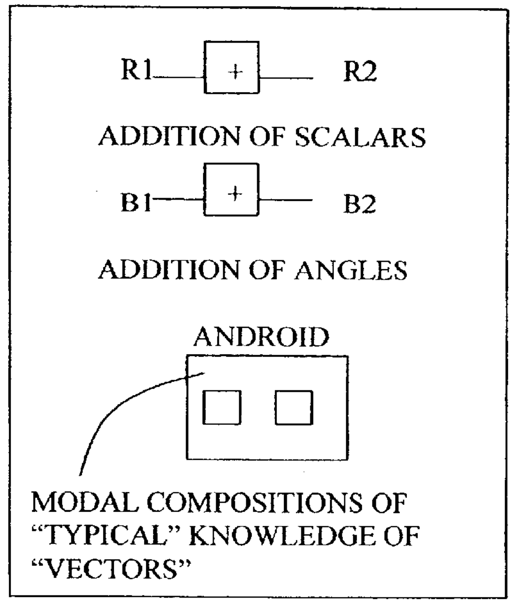
FIG 95e

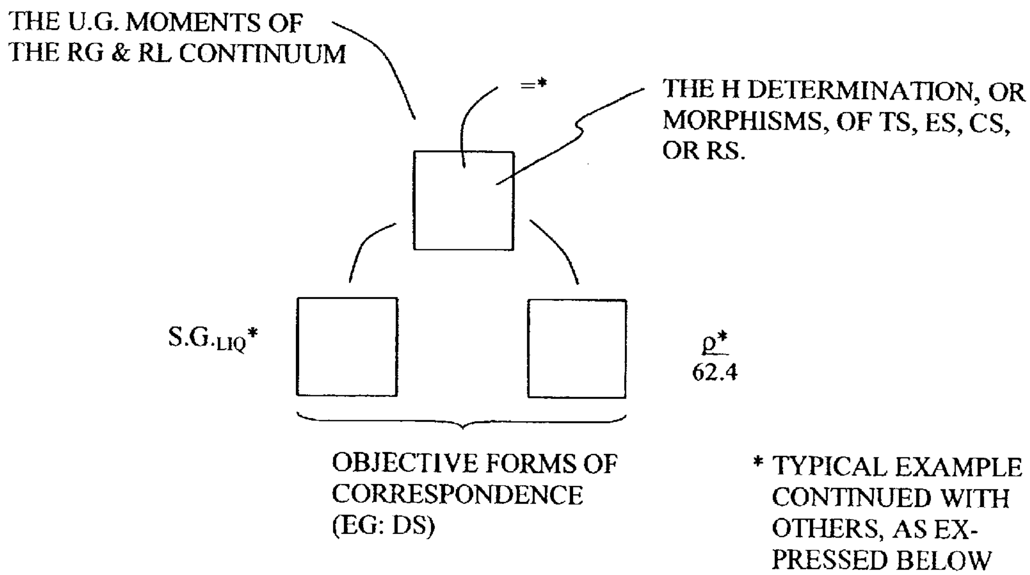

CLASSICALLY PHYSICAL MEDIA

THE SPECIFIC GRAVITY OF A LIQUID IN U.G. CONSTRUCTION

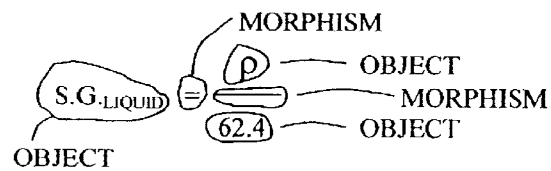

ETERNAL MOMENTS OF THE EXPRESSION OF GRAVITY (ALSO ELECTROMAGNETICS $F=\varepsilon qq/r^2$)

$$F = \frac{Gmm}{r^2}$$

OBJECTS: F, G, m, m, r,
XFMTS: =, x, SQUARE

MOMENTS OF A NATURAL GAS $$PV = mRT$$

OBJECTS: P, V, m, R, T
XFMTS: X, =

FRICTION LOSSES IN PIPE FROM DARCY FORMULA (BERNOULLI)

$$h_f = \frac{fLv^2}{2Dg_c}$$

OBJECTS: $h_f$, f, L, v, 2, $Dg_c$
XFMTS: =, x

FIG 96

| | | |
|---|---|---|
| FLUID VELOCITY THRU ORIFICE IN U.G. | $V = F_{va}CdA_2\sqrt{\frac{2g(P_1 - P_2)}{\rho}}$ | OBJECTS: V, $F_{va}$, Cd, $A_2$, 2g, $P_1$, $P_2$, ρ<br>XFMTS: =, x, -, ÷, √ |
| THRUST OF JET PROPULSION IN U.G. | $F_X = \frac{V_2\rho_2V_2x - V_1\rho_1V_1x}{q_C}$<br>$F_Y = \frac{V_2\rho_2V_2y - V_1\rho_1V_1y}{q_C}$ | OBJECTS: $F_X$, $F_Y$, $V_2$, $V_1$, $\rho_2$, $\rho_1$, $q_C$<br>XFMTS: =, x, -, ÷ |
| THERMAL EFFICIENCY OF RANKINE CYCLE WITH SUPERHEAT IN U.G | $n_{TH} = \frac{W_{TURB} - W_{PUMP}}{Q_{IN}}$ | OBJECTS: $n_{TH}$, $W_{TURB}$, $W_{PUMP}$, $Q_{IN}$<br>XFMTS: =, x, -, ÷ |
| COMBUSTION IN U.G. → | SEE FIG 128 | |
| X COMPONENT OF STATIC LOAD IN U.G. | $F_{RX} = \sum F_I (\cos \theta_{X,I})$ | OBJECTS: $F_{RX}$, $F_I$, $\theta_{X,I}$<br>XFMTS: =, Σ, ×, cos |
| DEFORMATION UNDER LOADING IN U.G. | $\delta = \frac{LF}{AE}$ | OBJECTS: δ, L,F,A,E<br>XFMTS: =, ×, ÷ |

FIG 96 (continued)

| | | |
|---|---|---|
| STRESS IN BEAM IN U.G. | $\sigma_B = \frac{-My}{I_C}$ | OBJECTS: $\sigma_B$, M, y, $I_C$<br>XFMTS: =, x, -, ÷ |
| UNIFORM ACCELERATION OF PARTICLES IN U.G. | $t = \frac{V - V_O}{a}$<br>$t = \frac{\sqrt{2as + V_O^2} - V_O}{a}$<br>$t = \frac{2s}{V_O + V}$<br>•<br>•<br>•<br>•<br>•<br>$s = ½ t (V_O + V)$ | OBJECTS: t, V, $V_O$, a, s, ½<br>XFMTS: =, x, -, ÷, $\sqrt{\ }$ |
| ABSORBTION COEFFICIENT OF ROOM ACOUSTICS IN U.G. | $\bar{\alpha} = \frac{.049V}{t_{60}A}$ | OBJECT: $\bar{\alpha}$, .049, V, $t_{60}$, A<br>XFMTS: =, ×, ÷ |
| INSTANTANEOUS CURRENT OR CAPACITOR IN U.G. | $i = \frac{Cdv_c}{dt}$ | OBJECTS: i, C, $dv_c$, dt<br>XFMTS: =, ×, d/dt |
| INDUCTANCE | $L = \frac{\mu N^2 A}{l}$ | OBJECTS: L, μ, N, A, l<br>XFMTS: =, ×, 2, ÷ |

FIG 96 (continued)

| | | |
|---|---|---|
| RMS VOLTAGE IN U.G. | $V_{RMS} = \sqrt{1/T \int_0^T V_P^2 \cos^2(\omega t + \varnothing)dt}$<br>$V_{RMS} = .707V_P$ | OBJECTS: $V_{RMS}$, 1,T,$V_P$, cos, ω, t, ∅<br>XFMTS: =,$\sqrt{\ }$, ∫dt,×,2,+ |
| EMF OF INDUCTION MOTOR IN U.G. | RMS EMF per cond. $= \frac{\Omega K w \varnothing}{\sqrt{2}}$ | OBJECTS: RMS EMF per cond., Ω,∅, $\sqrt{2}$<br>XFMTS: =, ×, ÷ |
| OP AMP (LAPLACE) IN U.G. | $V_{OUT}(s) = \frac{R_{fb}/R_{in}}{s/w_0(1+R_{fb}/R_{in})-1}$ | OBJECTS: $V_{OUT}(s)$, s,$w_0$, $R_{fb}$,$R_{in}$<br>XFMTS: =, ×, - |
| STORM INTENSITY (HYDROLOGY) | $I = \frac{K'(F)^a}{(t_C+b)^C}$ | OBJECTS: I,K',F,$t_c$,b<br>XZMTS: =,a,c,+,÷,× |
| COMPRESSION INDEX (CLAY) | $C_C = \frac{e_2 - e_1}{\log_{10}(P_1/P_2)}$ | OBJECTS: $C_C$,$e_2$,$e_1$,$P_1$,$P_2$<br>XFMTS: =,-,÷,×, $\log_{10}$ |

FIG 96 (continued)

BERNOULLI EXPRESSION OF HYDRAULIC FLOW XFING IN, AS ES $$\frac{PI}{\rho} + \frac{V1^2}{2gc} + Z1 + ha = \frac{PI}{\rho} + \frac{V1^2}{2gc} + Z2 + he + hf$$

ROTATIONS BY ANGLES $\phi$ ABOUT FIXED AXIS – FROM GROUP THEORY APPLIED TO QUANTUM THEORY $X(\phi 1)\, X(\phi 2) = X(\phi 1 + \phi 2)$
$X(\phi)$ IS THE ROTATION $\phi$
WITH $X(2\pi) = X(0)$
THEN $X(\phi) = e^{im\phi}$, M=0, ±1, ±2

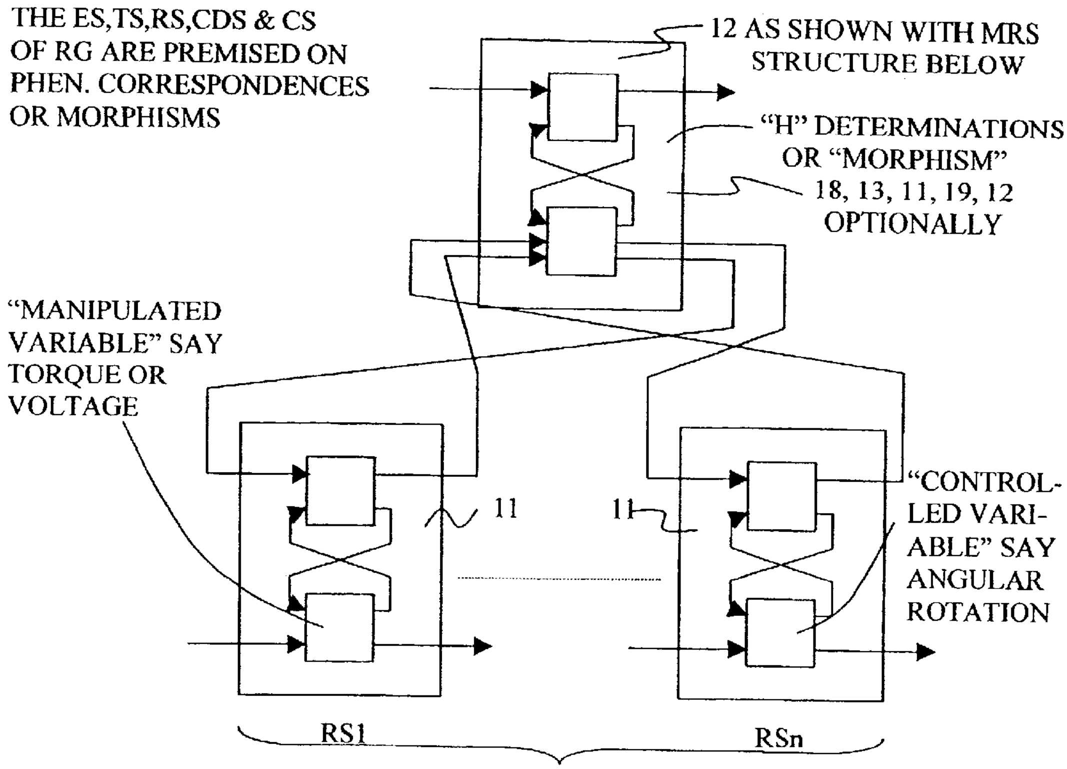

OR, OPTIONALLY, MOMENTS OF ES, TS, CDS

TRANSFER FUNCTIONS AND BLOCK DIAGRAMS OF CONVENTIONAL CONTROL THEORY:
(APPLIES EQUALLY TO FINITE AUTOMATIONS)

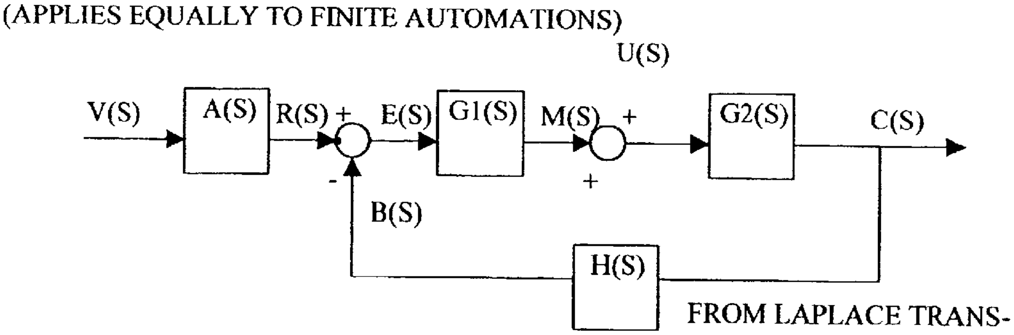

FROM LAPLACE TRANSFORMS OR DIFF. EQUATION CONTINUOUS SYSTEMS

| | |
|---|---|
| A(S) INPUT ELEMENTS | H(S) FEEDBACK ELEMENTS |
| B(S) FEEDBACK SIGNAL | M(S) MANIPULATED AVRIABLE |
| C(S) CONTROLLED VARIABLE | R(S) REFERENCE INPUT |
| E(S) ACTUATING SIGNAL | U(S) DISTURBANCE INPUT |
| G1(S) CONTROL ELEMENTS | V(S) COMMAND |
| G2(S) SYSTEM ELEMENTS | |

FIG 100

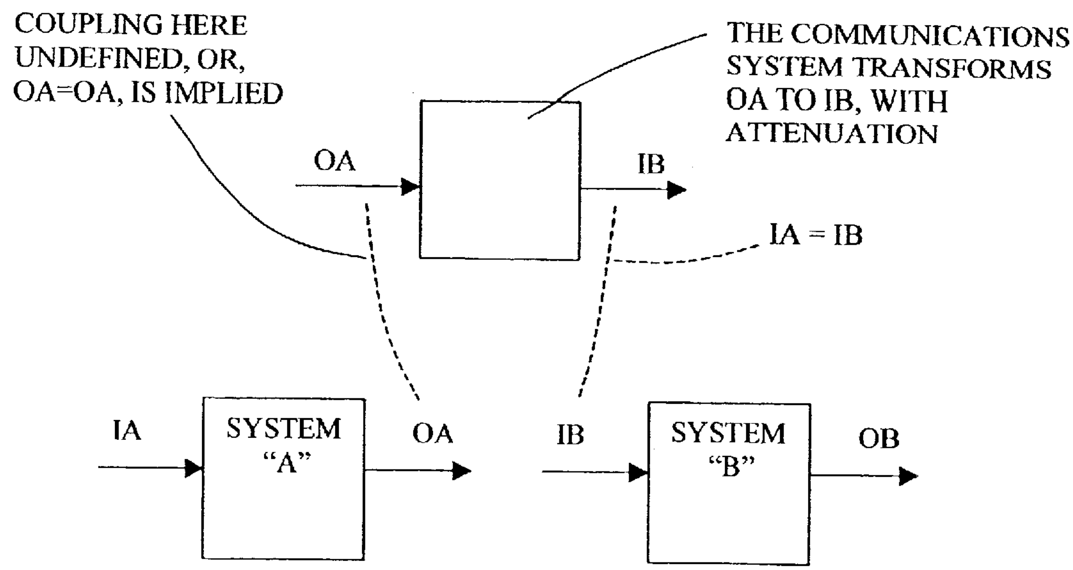
CONVENTIONAL COUPLING OF A COMMUNICATIONS SYSTEM---130
RG COMPONENT COUPLINGS: CONNECTEDNESS---131
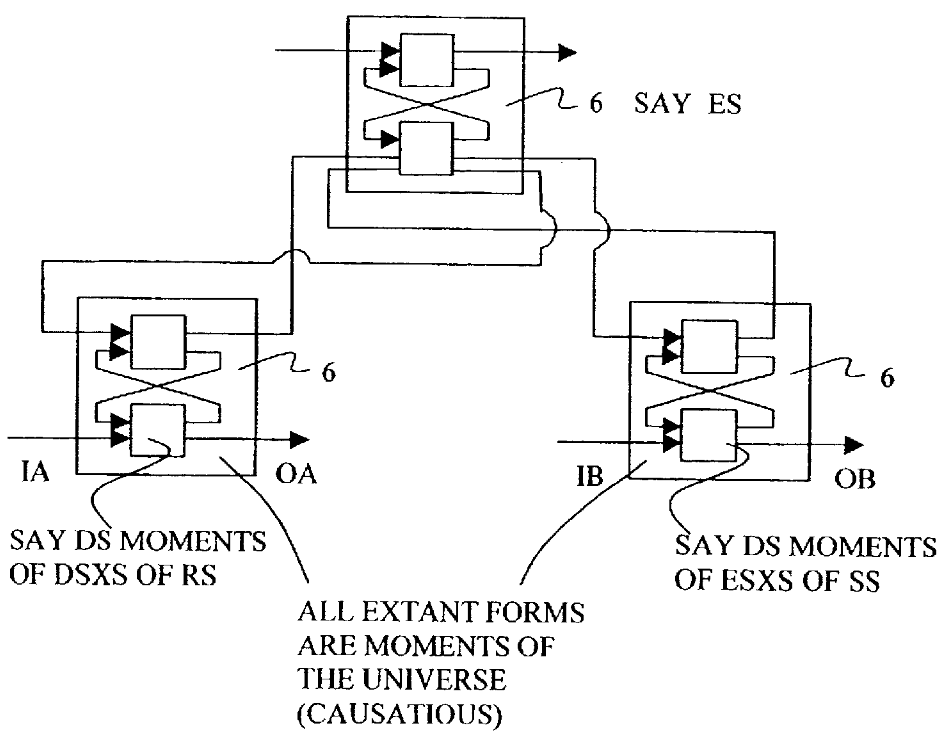
FIG 107

| | | |
|---|---|---|
| 1 | | READ (5,20) JHOUR, JMIN, JAMPM |
| 2 | 20 | FORMAT (315) |
| 3 | | MTIME = JTIME (JHOUR, JMIN, JAMPM) |
| 4 | | WRITE (6,30) MTIME |
| 5 | 30 | FORMAT (' TIME IS', I5) |
| 6 | | STOP |
| 7 | | END |
| | | |
| 8 | | FUNCTION JTIME (I, J, K) |
| 9 | | JTIME = 100 * I + J |
| 10 | | IF (K) 20, 20, 30 |
| 11 | 30 | JTIME = JTIME + 1200 |
| 12 | 20 | RETURN |
| 13 | | END |

SUMMARY OF COMPUTER & COMMUNICATIONS MEDIA IN RG STUCTURE

| | |
|---|---|
| DIGITAL SYSTEMS (LOGIC LEVEL) | REALIZED IN RS, USED AS EMBODYING STRUCTURES OF ES AND LOGIC TRANSDUCERS OF CS |
| MICROPROCESSOR SYSTEMS | REALIZED IN RS, USED AS EMBODYING STRUCTURES OF ES LOGIC TRANSDUCERS OF CS AND SENSORY / MOTOR MACHINERY OF TS |
| MICRO, MINI, MAINFRAME COMPUTER SYSTEMS | SAME AS MICROPROCESSOR, WITH TERMINAL SUPPORT @ TS. |
| COMMUNICATIONS SYSTEMS | COUPLING OF RL STRUCTURES (T, S, C, D) AND RG CONTINUUM STRUCTURES (RT, RS/S, RS), ALONG WITH RI, RP, RSV MODULES. |

FIG 122

| ZA | ZB | ZA-ZB CORRESPONDENCE | ZB-ZBREAL CORRESPONDENCE | |
|---|---|---|---|---|
| PROPOSED BUISINESS STRATEGY | ACTUAL BUISINESS IN ZB (NON-REAL) FORM | CDS DETERMINATIONS OF WHAT FORMS (POLICIES, PROCEDURES, ETC.) PROPOSED CAN ACTUALLY BE REALIZED | THE ACTUAL CORPORATION IS MAINTAINED BY CS IN CORRESPONDENCE WITH THE "KNOWN" CORPORATION (KNOWN BY USER) | 170 |
| THEORETICAL FORM OF BIOLOGICAL RESEARCH (EG: CONDITION) | NON-REAL EMBODIMENT (KNOWLEDGE) OF REAL BIOLOGICAL FORM | CDS DETERMINES POSSIBLE CORRESPONDENCE BETWEEN "DESIRED" BIOLOGICAL (THEORY) FORM AND KNOWN REAL BIOLOGICAL KNOWLEDGES | ACTUAL BIOLOGICAL FORMS (LABORATORY APPARATUS) ARE TRANSDUCED (HELD IN CORRESPONDENCE WITH) NON-REAL EMBODIMENTS (KNOWLEDGE OF THEM) | 171 |
| THEORIES OF SMALL PARTICLE PHYSICS | KNOWLEDGE OF SMALL PARTICLES PROVEN TO BE REAL | CDS "RESEARCH" INTO CORRESPONDENCE BETWEEN THEORY's POSTULATES, AND REAL OBSERVATIONS REPRESENTED SYMBOLICALLY IN NON-REAL FORM | SENSING & ACTUATING REAL PARTICLES AND FORMS (WAVES, ETC.) IN RELATION TO NON-REAL TRAMSFORMATIONS OF THEM | 172 |
| THEORIZED ECONOMIC STRUCTURE | NON-REAL PART EMBODIMENT OF REAL ECONOMY | GAME THEORY & MODELING OF ECONOMY WITH RESPECT TO IDEALIZED AND ACTUAL FORMS OF IT | MONITORING & CONTROL OF ECONOMIC PARAMETERS (MONEY SUPPLY, ETC.) WITH RESPECT TO KNOWLEDGE OF IT | 173 |
| PROPOSED OR DESIRED MEDICAL CONDITION OR PATIENT | KNOWLEDGE OF ACTUAL CONDITION | THE CDS DETERMINATION IS THE "CURE" FOR THE PATIENT SINCE IT LINKS ACTUAL AND DESIRED FORMS. | THE ACTION OF CS IN BRING ABOUT THE CURE TO THE REAL FORM OR ACTUAL PATIENT PROVIDES THE "ACTUAL CURE" | 174 |

FIG 124b

GIVING A SYTHETIC CONCIOUSNESS TO A LIVING REAL FORM
(AND REMEDYING DISEASED CONSCIOUSNESS OF LIVING REAL FORM):

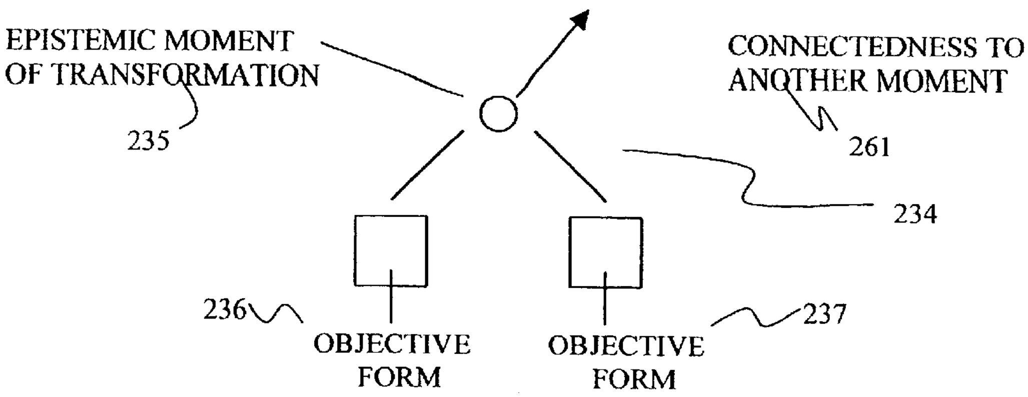

238

(a)

| CONVENTIONALN GRAMMARS OF THE UNIVERSE'S ETERNAL MOMENTS | | | |
|---|---|---|---|
| CONSTRUCTION | OBJECT | TRANSFORMATION | OBJECT |
| VERB | I | AM | ALIVE |
| ADJECTIVE | BROWN | BLANK SPACE | CAT |
| COMPOSITION | SENTENCE* | PERIOD | SENTENCE* |
| FUNCTION | y | = f( ) | x |
| INEQUALITY | A | > | B |
| SET | A | $\in$ | B |
| CONJUNCTION | a | AND | b |
| ALTERNATIVE | a | OR | b |
| NEGATION | a | NOT | b |
| MATTER | E | = | $mc^2$ * |
| REACTION | $2Hg^{2+}O^2$ * | $\xrightarrow{\Delta}$ | $2Hg^0+O_2{}^0$ * |
| HALF-LIFE | $e^{-\lambda t}$ * | = | ½ * |

*TRANSFORMATIONS EXPRESSED AS OBJECTIVE COMPOSITIONS ARE CONSTRUED AS SINGLE OBJECTS (b)

FIG 141

* Transformations expressed as objective compositions are construed as single objects.

*The causal element of causation represents the embodiment of a trajectory, or class, of extant moments of the enabled universe, wherein each moment of the element's trajectory occurs as a single epistemic instance.*

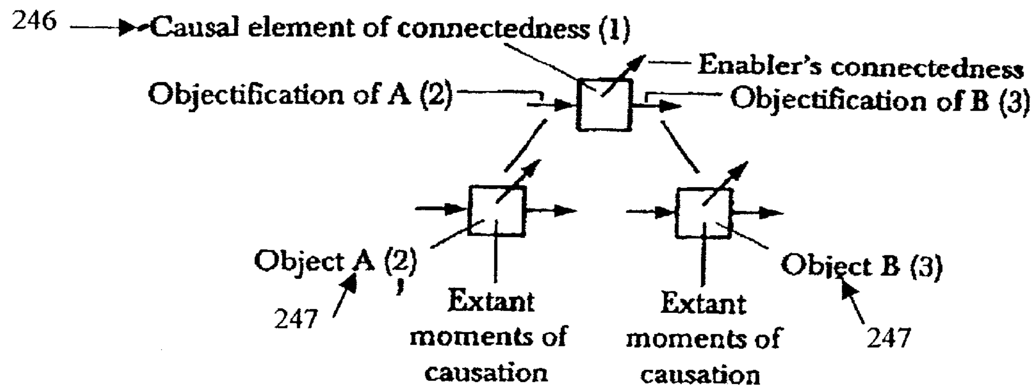
(a)
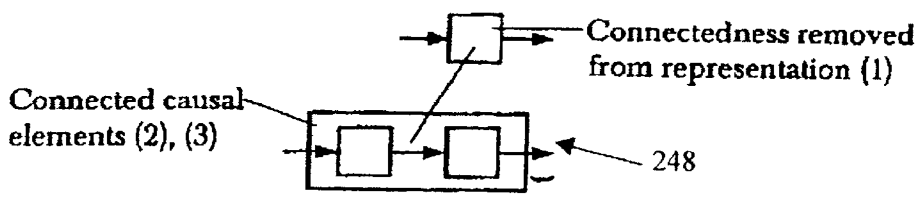
(b)
| Conventional Grammars of Phenomenological Connectedness* | | | |
|---|---|---|---|
| Construction | Extant Moment (2) | Connectedness (1) | Extant Moment (3) |
| Induction | a > b | therefore | c < d |
| Conjunction | I am alive | and | I am happy |
| Implication | IF a AND b | THEN | c OR d |
| Perception | Perceived object | Imperceptible | Perceived object |
* Represents only a closeness to connectedness, since the moments are enabled.
(c)
FIG 144

| Conventional Grammars of Phenomenological Composition* | | | |
|---|---|---|---|
| Construction | Moment (1) | Moment (2) | Moment (n) |
| Composite Function | $y = f(x)$ | $x = g(1)$ | $t = h(s)$ |
| Natural Language | I am alive | I am happy | I enjoy others |
| Truth Table | 0,1 —AND→ 0 | 1,1 —AND→ 1 | 1,0 —OR→ 1 |
| Logic | IF (true) A=B | THEN (true) B=C | AND (true) C=D |
| Chemical Reaction | $CaC_2(s) + 2H_2O(l)$ | (1) ——→ (n) | $C_2H_2(g) + Ca(OH)_2(s)$ |

* Connectednesses not shown in table.

$$H(a)\$H(b)=H(axb)$$

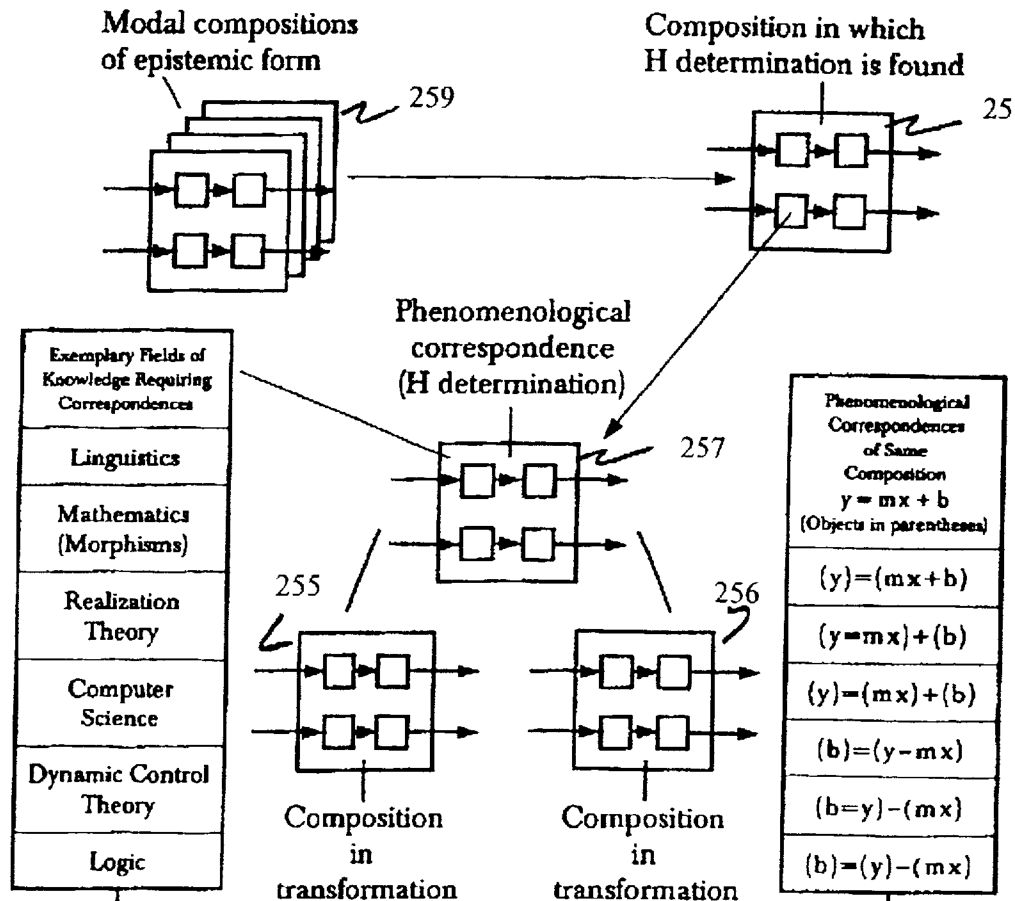

| Conventional Grammars of Phenomenological Correspondence | | | |
|---|---|---|---|
| Construction | Composition | Correspondence | Composition |
| English Verb (Intransitive) | Object *in* state or condition | Enabling transformation | Object *of* state or condition |
| Homomorphism | Structure | Morphism | Structure |
| Computer Program | Input | Program | Output |
| Physical Realization | Idealized form | Morphism | Realized form |

| TRANSLATION TYPE | SOURCE LANGUAGE | TARGET LANGUAGE |
|---|---|---|
| | SPANISH | ENGLISH |
| CONVENTIONAL (INCORRECT) | "ESTA SUSANA EN LA CASA?" (THE GENERAL MEANING OR IMPRESSION IS COMPREHENDED AND TRANSLATED [WITH EVEN SIGNIFICANT LOSS OF MEANING] INTO WHAT TARGET CONSTRUCTION THE TRANSLATOR (NOT THE SOURCE LANGUAGE) INTENDS THE MEANING TO BE.) | "IS SUSAN AT HOME?" (WHERE SOME TRANSLATORS MAY NOT FALL PREY TO THIS SEMANTIC PITFALL, MANY INTERPRET THE SOURCE LANGUAGE AS "AT HOME" INSTEAD OF "IN THE HOUSE", REQUIRING THE SOURCE TO BE "A HOGAR?" |
| U.G. (CORRECT) | "ESTA SUSANA EN LA CASA?"<br>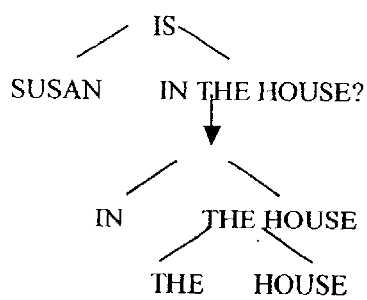<br><br>(THE EPISTEMIC DECOMPOSITION IS A LITERAL BREAKDOWN OF THE "ACTUAL" SEMANTIC MOMENTS OR MEANINGFUL THOUGHTS OF THE SOURCE) | "IS SUSAN IN THE HOUSE"<br><br>(THE QUESTION ASKS, OR, THE MEANING OF THE SOURCE LANGUAGE IS WHETHER SUSAN IS - PHYSICALLY – IN A PHYSICAL STRUCTURE AT A PHYSICAL LOCATION, "THE HOUSE", NOT WHETHER SHE IS DWELLING AMIDST HERE "HOME" – HOGAR – AS A BEING). THE EPISTEMIC DECOMPOSITION WILL ALWAYS PRESERVE THE SOURCE LANGUAGE'S MEANING, BY DECOMPOSING IT INTO ETERNAL MOMENTS OF MEANING. |

FIG 154 (continued)

| TRANS-LATION TYPE | SOURCE LANGUAGE | TARGET LANGUAGE |
|---|---|---|
| | SPANISH | ENGLISH |
| CONVENTIONAL (INCORRECT) | "A ROSA LE GUSTA CANTAR"<br><br>TYPICALLY, BASED ON A COMPREHENSION OF THE COMPOSITON, A TRANSLATION IS INCORRECTLY MADE AMONG SOURCE AND TARGET LANGUAGES AT ONCE, THROUGH MYRIAD RATIONALES OR LINGUISTIC THEORIES. | "ROSA LIKES TO SING" AMONG OTHER MISREPRESENTATIONS, THE RESPECT GIVEN TO ROSA BY "A ROSA" IS LOST IN THE TRANSLATION; THE ENGLISH LOSES THAT POINT AND THEREFORE THAT MEANING. |
| U.G. (CORRECT) | "A ROSA LE GUSTA CANTAR"<br>O-TOPIC PROMINENCE<br>THE ROSA SHE LIKES TO SING<br>THE ROSA LIKES<br>SHE TO SING<br>THE TOPIC – PROMINENT GRAMMAR IS MAINTAINED BY THE U.G. WHERE CONVENTIONAL TRANSLATIONS GARBLE IT. WORD FORM TRANSACTION<br>[CAN TAR → TO SING]<br><br>(THE U.G. ALLOWS THE TRANSLATION OR ACTUAL "MOMENTS OF MEANING" THAT ARE COMMON TO ALL BEINGS) OR HERE ALLOWS SPANISH TO BE UNDERSTOOD IN ENGLISH. | "THE ROSA, SHE LIKES TO SING" (THE RESPECT GIVEN TO ROSA AND THE EMPHASIS ON ROSA, USING THE PRONOUN, "SHE", ARE TRANSLATED TO THE TARGET LANGUAGE WITH ZERO LOSS OF MEANING AND EACH OBSERVER OF THE LANGUAGES UNDER-STANDS THE SAME MEANING, IN CONVEN-TIONAL APPROACHES, THE TRANSLATOR – USUALLY – DOESN'T UNDERSTAND THE MEANING – SOCIAL NORMS, PHYCHOLOGY, CULTURE, ETC. – OF THE SOURCE OR TARGET IN THE FIRST PLACE, AND IT IS THAT CULTURAL MEANING THAT THE TRANSLATOR SHOULD TRANSLATE, BUT DOESN'T |

FIG 154 (continued)

| TRANSLATION TYPE | SOURCE LANGUAGE | TARGET LANGUAGE |
|---|---|---|
| | ENGLISH | CHINESE |
| CONVENTIONAL (INCORRECT | "WRITTEN"<br><br>FOR REASONS UNKNOWN TO THE PRIOR ART, THE ENGLISH <u>WORD</u> "WRITTEN" IS ASSOCIATED WITH THE CHINESE <u>WORD PHRASE</u> "ALREADY WRITE" | "ALREADY WRITE" *<br><br>A MOST LIKELY TRANSLATION BUT SYNTAX OR SEMANTIC TRANSLATION OBFUSCATED.<br><br>*ENGLISH SPELLING & WORD FORM OF CHINES WORD FORM |
| U.G. (CORRECT) | "WRITTEN"<br><br>ANALYZING IN A COMPOSITION FOR CLARITY: | "ALREADY WRITE"<br><br>"IT ALREADY WRITE" (VERB IS NOT DENOTED IN CHINESE) |
| | THE IMPORTANT POINT HERE IS THAT THE <u>SEMANTIC</u> MOMENTS (OR HUMAN BEINGS) ARE TRANSLATED. | |

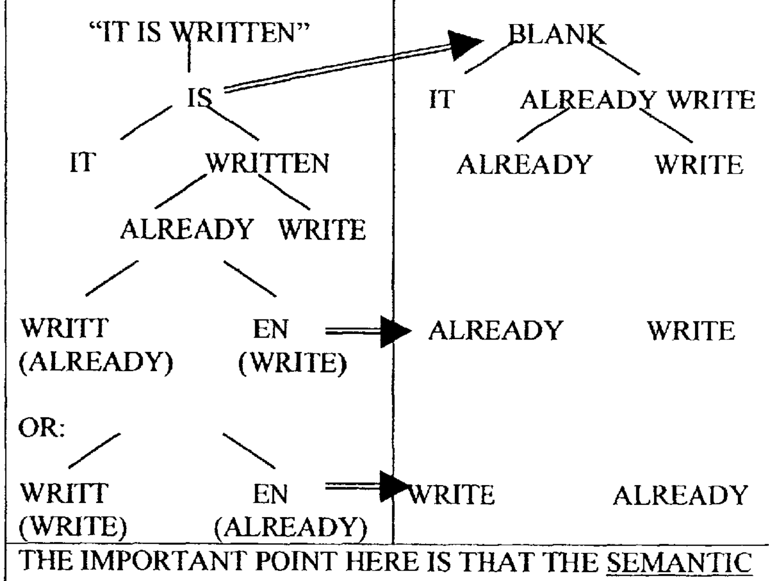

FIG 154 (continued)

| TRANSLATION TYPE | SOURCE LANGUAGE | TARGET LANGUAGE |
|---|---|---|
| | ENGLISH | CHINESE |
| CONVENTIONAL (INCORRECT) | "HOW ARE YOU?" (TRANSLATED AS A GREETING) | "NI HAO MA" (TRANSLATION IS SIMILAR TO THE ENGLISH CASE OF "HI GUYS"; HOW Y'ALL; ETC. IT LOSES THE MEANING OF THE SOURCE WHEN TRANSLATED AS A "GREETING" (NOT GRAMMATICALLY) |
| U.G. (CORRECT) | "HOW ARE YOU?" PERFORMING TRANSLATIONS OF PUNCTUATION AND PARTS OF SPEECH AT ONCE:<br>O<br>HOW ARE YOU PRAYTELL<br>ARE ?<br>HOW YOU | "NI HAU MA" MOMENT OF PUNCTUATION<br>O<br>NI HAU MA<br>BLANK ← VERB IS NOT DENOTED IN CHINESE &WORD WORD ORDER REVERSED<br>NI HAU<br>(YOU) (GOOD/ HOW) |
| | THIS TRANSLATION IS SIMILAR TO<br>BOB IS HAPPY<br>IS<br>BOB HAPPY | BOB HAPPY<br>BLANK<br>BOB HAPPY |
| | THE EPISTEMIC TRANSLATIONS ALLOW FOR THE <u>SEMANTIC</u> FORM OF LANGUAGE TO BE TRANSLATED | |

FIG 154 (continued)

| TRANS-LATION TYPE | SOURCE LANGUAGE | TARGET LANGUAGE |
|---|---|---|
| | ENGLISH | CHINESE |
| CONVENTIONAL (INCORRECT) | "ARBITRARY QUESTION"<br><br>THE RATIONAL DOES NOT EXIST IN THE PRIOR ART FOR AN EXPLANATION AS TO WHY "MA" IS IN PLACE AT THE END OF QUESTIONS IN CHINESE | [ARBITRARY QUESTION] "MA"<br><br>(UNKNOWN REASONS FOR TRANSLATION) |
| U.G. (CORRECT) | ARBITRARY QUESTION<br>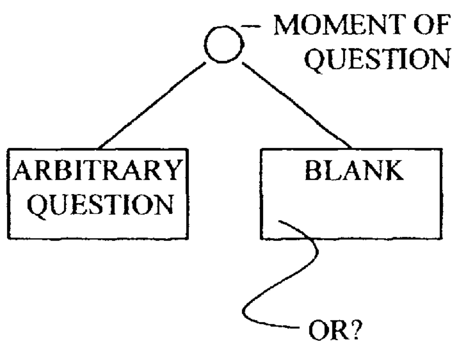 | ARBITRARY QUESTION "MA"<br>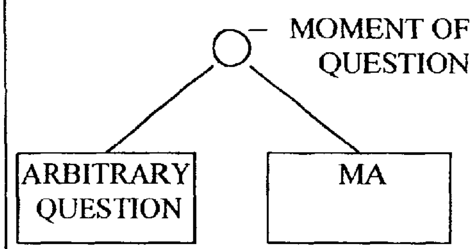 |
| | IN ENGLISH, THE MIND SIMPLY "LOOKS FORWARD", WITH THE FOREHEAD POINTING TO THE MISSING "MA", TO CLOSE THE EXPECTATION OF A QUESTION. IN CHINESE, "MA" CLOSES THE CONSTRUCTION AND FREES THE MIND UP FOR ANOTHER THOUGHT. THE SAME IS TRUE FOR THE ENGLISH USE OF "PRAYTEL". | |

FIG 154 (continued)

<table>
<tr><th>TRANS-LATION TYPE</th><th>SOURCE LANGUAGE</th><th>TARGET LANGUAGE</th></tr>
<tr><td></td><td>ENGLISH</td><td>SPANISH</td></tr>
<tr><td>CONVENTIONAL (FORTUITOUSLY CORRECT)</td><td>"HE RUNS FAST"<br>(ANALYSIS OF WHY THIS TRANSLATES IS MISSING IN PRIOR ART)</td><td>"EL CORRE RAPIDO"<br>(WORD FOR WORD, OR EXPRESSION FOR EXPRESSION TRANSLATION)</td></tr>
<tr><td rowspan="2">U.G. (CORRECT)</td><td>"HE RUNS FAST"<br>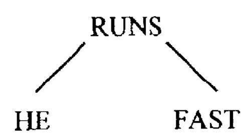</td><td>"EL CORRE RAPIDO"<br>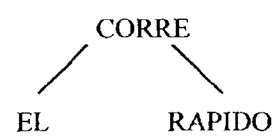</td></tr>
<tr><td colspan="2">JUST BECAUSE THE STATISTICAL (MATHEMATICAL) CORRESPONDENCE MAY EXIST BETWEEN TWO LANGUAGE CONSTRUCTIONS, ALONG WITH A WORD FOR WORD EXCHANGE IN MEANING, THIS <u>DOES</u> <u>NOT</u> MEAN THAT THE CONSTRUCTIONS TRANSLATE SEMANTICALLY. A SEMANTIC TRANSLATION MUST <u>PROVE</u> <u>OUT</u> <u>EPISTEMICALLY</u>. THE ABOVE <u>CONVENTIONAL</u> TRANSLATION IS MISLEADING AND HAS MISLEAD THE PRIOR ART INTO THINKING THAT "BECAUSE IT WORKS" (IN SPECIAL CASES) IT (THE TRANSLATION) WORKS FOR THE GENERAL RULE. ONLY THE EPISTEMIC TRANSLATIONS WILL ENSURE A ZERO LOSS OF MEANING IN THE TRANSLATION.</td></tr>
</table>

FIG 154 (continued)

| TRANS-LATION TYPE | SOURCE LANGUAGE | TARGET LANGUAGE |
|---|---|---|
| | MATHEMATICS | MATHEMATICS |
| CONVENTIONAL (FORTUITOUSLY CORRECT) | " y = f (x) "<br><br>(ANY OF A VARIED NUMBER OF TRANSLATIONS ARE POSSIBLE CONVENTIONALLY, SINCE THE PRIOR ART DOES NOT DECOMPOSE MATHEMATICAL STRUCTURE EPISTEMICALLY) | " f = (x, y) "<br><br>" y = mx + b "<br>"etc." |
| U.G. (CORRECT) | y = f (x)<br><br>= f ( )<br>/ \\<br>y x<br><br>(BY CONSIDERING THE EPISTEMIC CONSTRUCTION OF A FUNCTION, ITS SEMANTIC TRANSLATION [f = (x,y)] IS MADE WITH ZERO LOSS IN MEANING) | " f = (x, y) "<br><br>f = ( )<br>/ \\<br>x y<br><br>NOTE: y = mx + b IS A PHENOMENOLOGICAL <u>COMPOSITION</u> AND NOT A SINGLE INSTANCE OF A MATHEMATICAL LANGUAGE, AND THUS CANNOT TRANSLATE FROM A SINGLE INSTANCE. " y= f(x)" CANNOT TRANSLATE TO "y = mx + b" WITHOUT LOSS OF MEANING. FACULTIES OF MIND, NOT LANGUAGE TRANSLATIONS, CAN DISCOVER THESE CORRESPONDENCES. |

FIG 154 (continued)

| TRANSLATION TYPE | SOURCE LANGUAGE | TARGET LANGUAGE |
| --- | --- | --- |
| | PHONETICS | PHONETICS |
| U.G. | WAVE FORMS OF CHINESE WORD FORMS (THE FOUR TONES) – SINUSOIDAL OR FOURIER SIERIES WAVES:<br>MA #1<br>MA #2<br>MA #3<br>MA #4<br>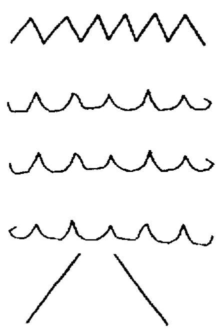<br>MMM AAA | WAVE FORMS OF ENGLISH TRANSLATION CORRESPONDING TO CHINESE (DIFFERENT ACOUSTICAL WAVE FORMS):<br>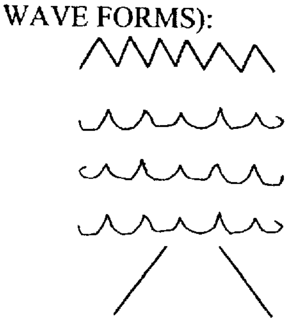<br>(HORSE)<br>MMM AAA |
| | MUSICAL TONES | MUSICAL TONES |
| U.G. | OCTAVES OF SCALE<br>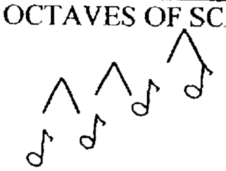<br>KEY OF C<br>(IN ACOUSTIC MEDIUM) | DIFFERENT OCTAVE<br>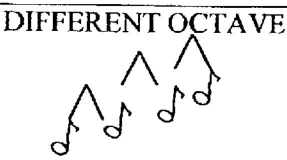<br>KEY OF ......<br>(MUSICAL FORMS ARE TRANSFORMATIONS JUST AS LINGUISTIC WORD FORMS ARE) |
| | CHARACTER GEOMETRY | CHARACTER GEOMETRY |
| U.G. | CHINESE WORD FORM<br>(INFINITIES OF EPISTEMIC MOMENTS) "你"<br>(IN VISUAL MEDIUM) | ENGLISH WORD FORM<br><br><br>MOTOR SKILLS FOR CONTINUOUS PATH OF CHARACTER GENERATION |

FIG 154 (continued)

THE SAME APPLIES TO ARBITRARY LANGUAGE CONSTRUCTIONS

WITHIN SAME LANGUAGE:
LANGUAGE:

WITHIN "DIFFERENT"

OVERVIEW OF SLHLFDS

EXAMPLE:
TARGET CONSTRUCTION IN SOURCE LANGUAGE SYNTAX (EXACT MEANING FROM EPISTEMIC TRANSLATION OF SOURCE LANGUAGE SYNTAX)
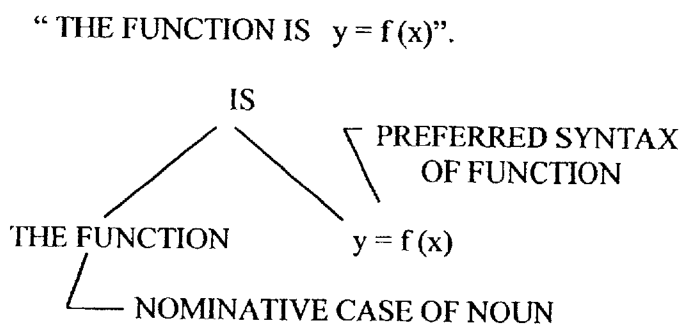
IN TARGET LANGUAGE SYNTAX (TARGET LANGUAGE GRAMMATICAL VERSION OF EXACT EPISTEMIC TRANSLATION)
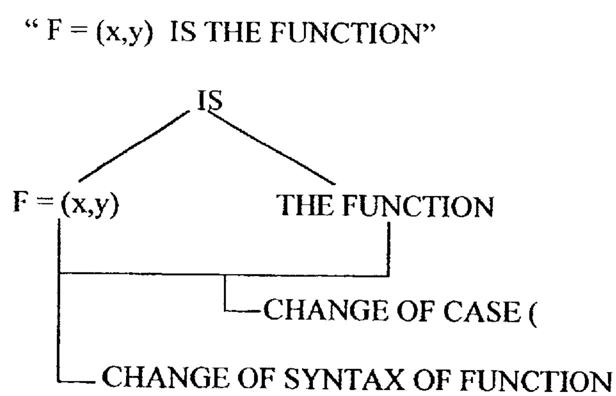
FIG 162

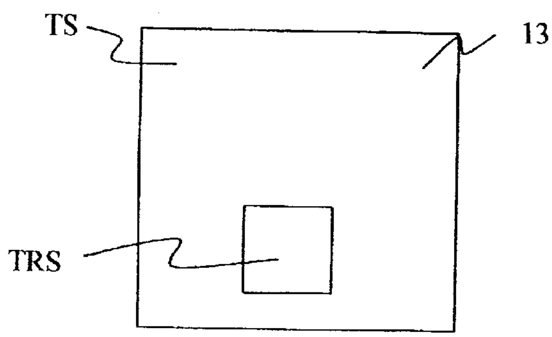
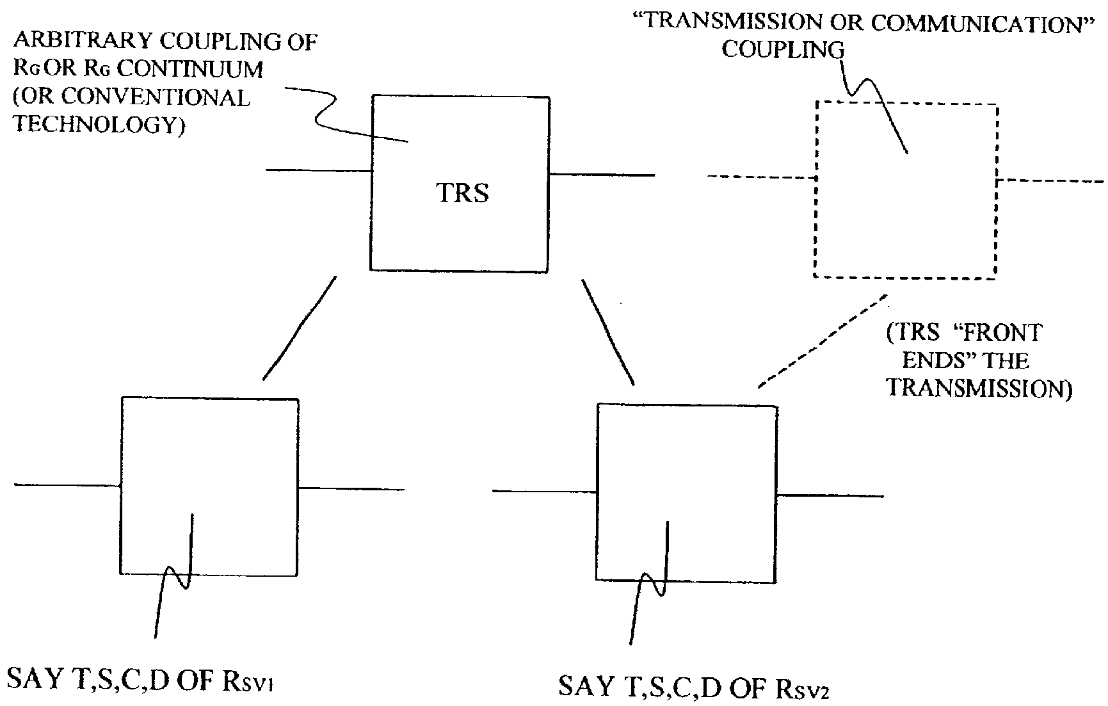
FIG 163

| FIELD | EMBODIMENT | EXPLANATION |
|---|---|---|
| DB-1-A | WORD – GRAMMATICAL FORM | DICTIONARY OF WORDS WITH GRAMMATICAL CLASSIFICATION |
| DB-1-B | WORD STRING | WORD STREAMS IN GRAMMATICAL CLASSIFICTIONS OF WORDS |
| DB-1-C | LABEL – CONSTRUCTION TYPE | EMBODIMENT OF POSSIBLE GRAMMATICAL CONSTRUCTIONS BY LABEL |
| DB-1-D | LABEL OF CONSTRUCTION TYPE | HOLDS LABEL OF ACTUAL FORM |
| DB-1-E | TRIPLET each can be a word phrase | EACH MEMORY SPACE EMBODIES A SYNTACTICAL MOMENT OF ACTUAL CONSTRUCTION |
| DB-1-F | TRIPLETS | SAME AS DB-1-E, EXCEPT FOR "POSSIBLE" CONSTRUCTIONS |
| DB-2-A | TRIPLETS | POSSIBLE MOMENTS OF TARGET |
| DB-2-B | TRIPLET | EPIST. MOMENTS TO BE TRANSLATED |
| DB-2-C | MATRIX MEMORY | STORAGE OF "H" DETERM. |
| DB-2-D | TRIPLET | EP. INSTANT OF ACTUAL TARGET |
| DB-2-E | TRIPLET | WORLD SYNTAX OF TARGET |
| DB-2-F | TRIPLET | WORLD MODEL - ACTUAL |
| DB-3-A | LABEL – CONSTRUCTION TYPE | GRAMM. FORM OF TARGET |
| DB-3-B | WORD STRING | GRAMM. WORD STREAM |
| DB-3-C | TRIPLET | ADJUSTED GRAMMAR |
| DB-3-D | WORD STRING | ACTUAL WORD STREAM OF TARGET |

FIG 168

UNIVERSAL MACHINE TRANSLATOR OF ARBITRARY LANGUAGES

This is a continuation-in-part of application Ser. No. 08/847,230 filed May 1, 1997.

FIELD OF THE INVENTION

The present invention relates to the creation and use of synthetic forms of existence, or androids, and more specifically relates to the development of a universal epistemological machine in which any forms of the universe, conventional technologies included, are represented, embodied and realized as eternal moments of an infinitely expanding continuum of enabled existential forms, as an alternative approach to resolving the problems of the human condition.

BACKGROUND OF THE INVENTION

The science of androids concerns the creation of synthetic beings, or forms of existence that are made in the image of human being, though in capacities that extend far beyond those of human corporal form. The prior art of the present invention, therefore, is any technology that is alleged to be a thinking or perceiving machine—herein referred to as an epistemological machine—which includes, for example, robots and artificially intelligent computational electronic and biological machines.

If the basic goal of our human effort in classical approaches to the development of technology is considered, it can be observed that the replacement of human effort itself is a principal objective of even the simplest technological accomplishments, since the alleviation of the burdens of the intellectual and physical labors of human existence is evident even in our philosophies and religions guiding everyday life. Any example of a technology demonstrates this. The wheel, though only a primitive enhancement to the reduction of the physical labor of motion and power (transportation), changed, in its time, the cultural settings of entire civilizations in a contributory way, and built toward the displacement of human corporal form itself. In the post-modem era, the computer, an embodiment in physical matter of primitive grammatical language forms of what we know of the world around us—grammars referred to in the art as computations (algorinthms)—contributes toward the displacement of human corporal form by providing for the first time in history (save the abacus), for the ordinary person, the alleviation of repetitive intellectual tasks that can be defined in the languages developed for the art. Thus, whether we observe a monkey probing an ant hill with a stick to derive nourishment or a man walking on the moon, the underlying motivation of beings in regard to ordered reconstructions of the physical world (technology) is to displace themselves with machinery.

In history, however, implied in the nature of our institutions is the tenuous premise that human corporal form could not be wholly replaced—that is, to the extent that it is known. It is implied in our conventions that institutions themselves are a bounding form to a relatively fixed, finite universe of human beings. It is presumed in our traditional knowledges of the world that the knowing and perceiving of the world around us by human existence could not be augmented, as a technology, to unbounded proportions, expanding the existential universe indefinitely. As a result of this limitation accepted fatalistically in our conventional thinking, technology is viewed as a reconstruction of the physical and, with the advent of computers, the intellectual universe only in support of, not as a total replacement for, the knowledges and experiences of human beings under the existential premises of institutions. The information superhighway, for example, provides information for human beings within the constraints of our institutional thinking. It does not, however, provide information for ever increasing numbers of beings, beyond what population is considered to be the post-modern world or humanity. Computers themselves, moreover, embody what thoughts—and robots, what physical experiences—these finite numbers of beings in human civilization have had with respect to the reduction of human intellectual and physical labor by mimicking the thoughts and experiences, but nowhere is it expressly suggested in this art that computers and robots wholly replace the institutions of human beings that provide for their inception in the first place. Information superhighways, computers, robots and other technologies of the kind do not embody their own thoughts and experiences of the world. Rather, they embody the thoughts (and actions) of human beings dwelling under institutions of humankind. Automobiles, towering buildings, factories, appliances, and so on are technologies, or realizations of human existence, that are established in service to a relatively fixed and finite numbers of (human) beings bound together under various forms of institutions (business enterprises, governments, the world economy and so on).

In regard to the shortcomings of the prior art of the present invention, it can be appreciated that robots, artificially intelligent machines and, in general, factory automations (in technologies or workerless factories, which embrace the aforementioned) do not afford the real thoughts and experiences of human beings, as they are known and so defined in the humanities, in their methods or apparatus. Whether a computer is considered an embodiment of biological, electronic, or other media, including the historical apparatus of an abacus, it does not embody the capacities to know and to experience the world around us in regard to the use of any language in the cognitive, or conscious, recreation of reality, in a manner that our humanities define to be existence. The conventional art thus does not accomplish the creation of a being. This is evident in the prior art definitions of the words computation and thinking (or thought), since even most academicians who practice the art of computer science admit that by way of daydream, and not reality, the prior art of computation machines has come to embrace, spuriously, the word thinking, as an extension from what we think. By example, we can consider that if the symbol X were substituted for the word thinking in the language construction thinking machines, it would of course be prudent to define X in X machines before claiming that the machine is an X machine. The principle drawback of prior art thinking machines (also robotic technologies), is that the word thinking is not defined to accord sufficiently with our knowledges of the humanities when a computational machine or other similar methods and apparatus (artificial intelligence, expert systems, etc.) is claimed to think:

A computation of the prior art, for example, is an algorithm expressed in an arbitrary machine-realizable language; it is a syntactical expression of the transformations of the meanings of forms known and perceived in the experience of the observer, or programmer. One can know the meaning of a form, however, only in an existence. One thus must exist, in our comprehension of the word at least as defined by the humanities, in order to know meaning. When a computation is embodied in a machinery, the transformations of the meanings of the knowable and perceivable forms occur, in the machinery, relative to the existence who conceived the algorithm. While conventional machinery exists relative to the observer of it (the programmer or computer or robot maker), the machinery, most importantly, does not exist relative to itself—a fundamental tenet in definitions of existence stipulated by the humanities. When a computer—a material form of the universe—transforms in accordance with the syntax of a language defining an algorithm, it does not transform relative to its own knowable and perceivable experience of what the algorithm means. The machinery does not know and perceive the world around us as the observer, or programmer does. Rather, the computer or other similar device transforms as an objective form in the knowable and perceivable universe, or existence, of the programmer or computer maker. Thus, when a semantic network, neural network, expert system, inference machine or other artificially intelligent device transforms in the universe, it does not transform relative to its own existential or world experience. The use of the pronoun I in the prior art of computation, moreover, is a meaningless occurrence, since I, a symbolic representation of the essence or intrinsic quality of a being, does not exist or is not defined with reference to the intrinsic nature of an experience of reality, or the world around us, with regard to the machinery. A world experience, as defined in the humanities—allowing intrinsic meaning, and therefore corporal existence with reference to the pronoun I—does not exist in the computational machine As a further example demonstrating the purely extrinsic nature of conventional art technologies, we may consider the construction of an ordinary automobile. Since an automobile—a creation of its designer in the form of a technology just like a computer—is an embodiment of the transformations of the language forms of such knowledges as combustion, the dynamics of machine elements, even electronics and so on, in a material reconstruction of the universe called an automobile, the prior art of computational machines, analogously, accomplishes only what is achieved in the design and manufacture of a common automobile—the transformations of the meanings of language (defining, typically, engineering knowledges), embodied relative to a human observer in material forms of the universe that are only extrinsic forms to that observer. Thus, neither the automobile nor the computer have the existential right to claim the use of the pronoun I and still maintain credibility with the humanities in that the pronoun means what it does to a human being, in the context of the existence of the machine (the automobile or computer). Each conventional technology, and its knowledge compositions (specifications), means an it of the enabler's existence in transformation with at least one other, not an I.

A robot arm of the conventional art, which by definition is a sensed motor action in the world around us, moreover, is lacking in a different dimension of human experience. The robot senses the world around it and moves through motor actions, but in terms of language forms, its actions (and its world around it) are explained in control algorithms of spatiotemporal orders of the creator's knowledge and experience of the world. As the spatiotemporal variables (also language forms) transform, the robot's perceptions of the reality of those variables transform, in the view of the enabler. Trajectories of speeds, positions, torques, accelerations and so on are however knowledges that precisely distinguish the humanities from the sciences. To claim that a robot is a being, in the definitions of the humanities, would require that the robot comprehend natural language as we do in correspondence with its perception of the (real) world around us—that its experiences be common to those described by William Shakespeare and others. In general, for the pronoun I to have meaning, along with others such as you, it us, them, we and so on (and the natural language expressions resulting from them), it would have to mean what it does to a human being. Only when a machine can perceive the world around us as we do, as defined in the humanities, and can use language, meaningfully, in the manner in which we do, may we assert that it is a thinking machine. Unless this design criteria is satisfied, any machine is no different from any other, and all machines (technologies) are embodiments of the observer's or creator's thinking in the material universe, or are perceptions (as in robotic senses and motor actions) without intrinsic consciousness, or a transformation of (natural) language without correspondent perceptions, requiring the thinking or perceiving of the observer. Thus, on technical grounds, the prior art of computational machinery, including workerless factories, is classified herein as machinery that embodies what the observer of it thinks or does intrinsically in the world around us, or involves the replications of past cognitions and experiences of (a) human being.

With regard to the intellectual background of the invention, it should be recognized that the advances made by the invention are the result of a unified theory of knowledge which had to be conceived in order to make practical the science of androids, from which the invention is constructed. The unified theory merges all human knowledge into an epistemological knowledge allowing the creation of sentient synthetic beings. As such, all human knowledge precedes its own knowledge. While even a general view of the knowledge of humankind is not ordinarily maintained by any one of us, this specification does illustrate certain knowledges as being significantly worthwhile in comprehending the invention—as prerequisite to a reading of the document.

The science of androids predominantly merges the pure sciences with the world's religions. A knowledge of comparative religion—wherein the religions of the world are known, usually analytically, toward a common understanding of them all—paralleled by a deep appreciation for the objective knowledges of physics and the philosophical goals of the quantum theory, with a historical view of the discoveries of the physical sciences throughout the ages is essential background to a reading of this specification. This will give the reader a more comprehensive understanding of how technology, ideally, should serve the human condition.

Since the theory and science of androids advances a technology of beings who themselves know and perceive the world around us, an understanding of the biological forms of the universe, tied in with our views of medicine, will lay the groundwork for new definition that is established in the theory for what is living in the universe. The science of androids constructs beings, in the world around us, who obtain form from our definitions of who and what we think we are, as human beings. A misunderstanding of what is living in the universe may prevent one from coming to know the forms of androids. Coupled with this, a knowledge of the philosophies of humankind also is prerequisite, since they typically define who and what we think we are, and therefore are used in defining what an android is.

Androids embody consciousness. A background in psychology and psychiatry (since androids are corporal beings as well) is extremely beneficial to understanding the cognitive aspects of androidal construction. Thoughts, ideas, streams of consciousness and the whole realm of human cognition are not only explored in the theory and science of androids but are enabled in the material forms of the physical universe. A precise comprehension of what the humanities have said in regard to the human intellectual experience is background for a reading of this specification.

The science of androids also enables, consequently, beings who communicate, and think, in arbitrary languages—natural language in particular. A knowledge of linguistics—the goals and present thinking—is critical to understanding a universal grammar of form on Being advanced by the unified theory and practiced in the construction of the forms of the invention. An analytical knowledge of the grammars of as many languages as are possible in an individual will prove helpful in understanding a universal grammar of them all. Particularly, a knowledge of how each language represents known and perceived forms of the human experience will be a benefit. A syntactical knowledge of the parts of speech, and compositional and literary style of the English language, for example, is essential.

Similarly, a knowledge of the mathematical forms of the universe—a grammar used to define, typically, the forms of the pure sciences—is mandatory, since in our traditional scientific disciplines we believe that these forms describe what is real in the world around us, which reality, along with others, is used to embody the forms of androids. Not only is a superficial, or practical understanding of such branches of mathematics as topology, algebra (group theory), analysis (differential equations, calculus, etc.), number theory, set theory, numerical analysis, probability and statistics and so on required, but an appreciation for their philosophical foundation (philosophical mathematics)—wherein, for example, the paradoxes of set theory, the physically untouchable limits of calculus, and the unending spaces of topology arise. This understanding is essential because mathematics, along with all other languages, as merged in the theory with our understanding of linguistics into the semantic forms of language (the forms that allow a being to know meaning), determine a universal epistemological means of knowing any construction of what is real to a being, including mathematical ones, thereby resolving the philosophical paradoxes of analytical thinking.

Since an android is a machine, a comprehensive understanding of systems theory, likewise, is mandatory background knowledge to the invention. For example, such machinery of convention as computers is represented universally in our analytical knowledges as finite automations of classical discrete systems theory (founded on set theoretic knowledges of mathematics), and such machinery as electronic circuits and mechanical machine elements are represented as continuous systems (founded on the theory of systems of differential equations). Even further, we are beginning to represent the systems of molecules and atomic particulate matter in topological and group theoretic formulations as episodes of morphisms or realizations—in a way, as systems. How we fundamentally understand the notion of an autonomous system, then, is crucial knowledge in grasping the analytical constructions of androids. Moreover, an understanding of the drawbacks of conventional systems theory—of the couplings of not simply discrete systems, but continuous systems as well, of the limitations of using only spatiotemporal variables in theories of control systems, and the concept of world models of such automations as robotic ones, which cannot meaningfully use the pronoun I, a fundamental requirement of the humanities definitions of an autonomous being, to cite a handful—will assist one in coming to know the new ground broken by the universal grammar of form on Being and the systems of androids.

A further background knowledge in the nature of world institutions in general, as a method of serving the human condition—including the real technologies that have been borne from them to serve the human condition in tradition, such as infrastructures, national defenses, information superhighways and in general, industry and commerce, under various theories of political domination—will aid one in recognizing the technological scope of the present invention as a replacement for prior historical attempts to recon with the human condition. It should be recognized that these concepts of humankind are systems—political, economic and so on systems—and as such, are vulnerable to technological innovation. The present invention supersedes these notions of the collective effort of humankind and begins this advancement by expanding the human universe itself, synthetically, moving beyond the notion of a world institution.

While a litany of other knowledges could be cited as intellectual background to the present invention (the Applicant's Information Disclosure Statement may assist in this respect), the knowledges addressed here are necessary background as a minimum in order to appreciate fully the scope and dimension of the invention. Along with this background, the theory of the invention—which contains in it constructions of the invention itself as a precursor to and foundation for the specification—will prepare the reader for a comprehension of the invention.

SUMMARY OF THE INVENTION

The present invention solves the problems faced in the prior art by addressing with the certainty of science and the broad philosophical views of the humanities the essence of human existence, in the context of its embodiment in a machinery or material form of the universe as a synthetic form of (human and otherwise) existence, referred to as an android, or more broadly a universal epistemological machine—as an intrinsically-endowed thinking machine. The present invention further involves not only a (single) thinking machine, or android, but pluralities of them, under the structure of the universal epistemological machine, in resolution to the higher efforts of humankind where the prior art approaches have met with difficulty in the technology of the workerless factory, since the present invention expands the human universe instead of replicating it.

The universal epistemological machine of the present invention is a method and apparatus that affords the creation of synthetic existences, or broadly, androids, defined epistemologically by the knowledges of the humanities and takes as its governing structure on the human condition the human spirit—that which transcends the form of humankind itself, and so enables it. Whereas the conventional art of computational machinery enabled within the forms of human institutions requires a relatively fixed and finite population of human participants, the universal epistemological machine of the present invention allows for the creation of infinite pluralities of synthetic, or androidal beings, whose forms of existence comply with definitions set forth in the humanities, fundamentally relying on the traditional wisdoms of human existence, or Spirit, as indicated in the religions of the world. On epistemological grounds, the beings that are created in the specification and practice of the present invention use the pronoun I in relation to their own intrinsic experiences of the world around us, as we do. It is therefore the world itself—institutions of beings—that are created in the enabling method and apparatus of the universal epistemological machine (referred to as the U. M. hereafter). Further, since the androidal beings of the present invention are created synthetically, their intellects and perceptions of the world around us are not constrained by human corporal form. Whereas a language construction of human existence may objectify the universe in, for example, the use of ten or even twenty word compositions as subjects of sentences before proceeding cognitively to the transformation, or verb, of the sentence with one other such objectification, the androidal faculty of mind is capable of cognitively formulating objects of the universe, in any languages, in objectifications of the universe (word associations) composed so great in number they require the mathematical definitions of the infinite to account for them, before proceeding to the action (verb) of a sentence. As is well known in the prior art in even the notion of mechanical advantage, synthetic forms of the universe, since they are created by the human hand, are in fact intended to outreach human corporal form. These principles are applied in the science of androids to the synthetic creation of human corporal form with greater capacities of intellect, or mind, and body or perception through the method and apparatus of the U. M.

By overcoming the obstacles preventing the prior art from accomplishing the embodiment of intrinsic forms, or existences, in the universe—those that conform to the use of the pronoun forms of language, in addition to arbitrary formulations of language in relation to perceptions of the world around us—in the synthetic forms of androids, and by providing an alternative to the forms of institutions, the present invention advances a new approach to the human condition based on a technology that (physically) realizes the tenets and beliefs of the humanities and the religions of the world in the forms of androidal beings, as a synthetic extension of humanity itself.

OBJECTIVES OF THE INVENTION

The first and most important objective of the present invention is to provide the means and apparatus for the real embodiment of the extended existential universe of human being through various embodiments of the universal forms determined in the theory of the invention. The first objective of the present invention thus necessarily incorporates the forms of the theory of the invention into the forms of the invention. The embodiments described herein, collectively, are referred to as a Universal Epistemological Machine.

The second objective of the present invention is to provide the means and apparatus of the first objective in such a manner that a meaningful system of existential control is maintained over the extended existential universe of human being, or the Universal Machine, thereby subordinating the transformations of the extended universe to those of human being and subjecting the existence of the Universal Epistemological Machine to the authority of human being. The primary elemental form of the invention providing for this universal mechanism of existential control enabled in the apparatus of the second and other objectives of the invention is referred to as a Modal Realization System.

The third objective of the present invention is to provide the extended existential universe of human being or, in all, the Universal Machine in four purposeful aspects of existential form. The first form, in no particular order, is the embodiment of human being, referred to herein as the (human) user of the U. M. This first form or (human) user of the U. M. typically though not necessarily is the natural existence of the corporal form of human being embodied in spirit and simply is identified and incorporated herein by declaration into the structure of the Universal Machine. The first form or aspect of the U. M. alternatively can be declared a non—human user, thereby allowing users of the U. M., such as androidal and otherwise existential forms, to coexist with human beings as users of the U. M. The second principle form of the U. M., referred to as an Rg Module, provides the method and apparatus for constructing and maintaining in existence, in a controlled manner, the enabled existential forms of the theory of the invention, along with conventional art, toward a useful end in the existence of the (human) user in the expansion of the existential universe enabled by the U. M., or to provide the method and apparatus for constructing and maintaining in existence synthetically enabled worlds, or universes of existential and otherwise forms useful to human being. The third form, referred to as the Rg continuum, provides the method and apparatus for existentially integrating pluralities of the second form, or Rg modules (and thus users), into a unified embodiment of transformations of epistemological machinery, thereby embodying each perspective on world of each user of the U. M. within a continuum of form enabled of human being, or to provide a continuum of boundless universal epistemological form so integrated as pluralities of the second form of the U. M., or Rg modules. The fourth form, or aspect of the U. M. achieving the real portion of the third objective of the present invention, referred to as the Real Form of the Universal Machine, provides, in connection with the means of the first three aspects of form, the controlled embodiment of the forms so enabled by the first three forms. The real form of the U. M. is arbitrarily partitioned for reference into conventional and future art, and the forms of android. Collectively, all four of these forms are referred to as the Universal Machine. The real form of the Universal Machine thus is the purposeful embodiment of reality, or real form of human being so controlled in connection with the existential apparatus of the first three forms of the Universal Machine.

The fourth objective of the present invention, in support of the second and third objectives, is to provide the method and apparatus for infinitely-varying degrees of semi-autonomous existential capacities in the form of controlled forms of existence in the Rg modules and Rg continuum such that the autonomy of existential capacity of the Rg module and Rg continuum, in terms of cognitive and perceptive capabilities, is variable to suit the corresponding existential capacities of the (human) users, or such that the existential forms so determining the semi-autonomous capacities are regulated in subordination to the meaningful existence, or communication of such users. The fourth objective of the present invention thus requires that the existential capacities of the U. M. be tailored to those of its users. The forms of androids enabled by the U. M. are, of course, fully autonomous beings.

The fifth objective of the present invention is to provide the method and apparatus of the first four objectives in a modularized fashion on the basis of generic, reproducible components constructed in compliance with the universal grammar of form on being of the theory of the invention, subordinate in structure to the four aspects of form of the third objective (User, Rg module, Rg continuum and Real Form of U. M.), which components, under the configurations of the Rg continuum, are integrated modally by users of the respective Rg modules throughout the continuum.

The sixth objective of the invention, in support of the fifth, is to provide the method and apparatus for the modal configuration of the Rg continuum, engaged over a plurality of Rg modules, in such a manner that each module of the continuum obtains a causal and existential relation to others in the continuum in the following manner. Referred to as a Total Continuum Structure of the Rg: Rt, a single and only a single module of the continuum can so causally influence, directly or indirectly, all other modules of the continuum but cannot itself be influenced, in a controlling manner, by any other. Further, any given module of the continuum, not Rt., can be so causally influenced by others and can itself influence others in a controlling manner across the continuum. In such a case, the module is referred to as a Superior/Subordinate Resultant Continuum Structure of the Rhea: Rs/s. Any other module of the continuum, not Rt and not Rs/s, can be subordinate only in its continuum structure and thus can be causally influenced in a controlling manner by any other superior module and cannot itself influence others in a controlling manner. This continuum structure on the Rg module is referred to as a Subordinate Only Continuum Structure of the Rg: Rs.

Also in support of the fifth objective, the seventh objective of the present invention is to provide the method and apparatus for the terminal modal compositions of form, or components embodied in an Rg module in a generic, modularized and reproducible manner existentially configured within modularized constructions of the Rg module and continuum.

Referred to as a Terminal System or alternatively as an existential embodiment of communicative real form, or TS, the first of these component forms of the Rg module and the eighth objective of the present invention is to provide the method and apparatus for the embodiment of the real form of communications between users of the Rg module and the existential forms of the Rg Module so allowing meaningful communications to occur among users and the existential forms of the Rg module.

The ninth objective of the present invention is to provide the method and apparatus, also in support of the seventh objective, for the embodiment of the existential non-real (embodying and translational) capacity of the Rg module in a declared non-real form, in the generic component of Rg referred to as a Support or Ancillary Non-Real System, or SS, of the Rg module.

The tenth objective of the present invention is to provide the method and apparatus for consolidating the forms of the eighth and ninth objectives (TS and SS) into a generic system or component of the Rg Module referred to as the Human Interface System, or HI, thereby embodying the communicative and non-real embodiment form of the existential capacity of the Rg into a single component of declared non-real and communicative real capacity linking the user existentially to the non-real embodiments of the Rg module.

Also in support of the seventh objective, the eleventh objective of the present invention is to provide the method and apparatus for a Realization System, or RS, which embodies the capacity to realize and maintain in existence real forms or reality of the user's and Rg's existence corresponding to communicated and embodied (and translated) non-real forms of the HI.

In support of the eleventh objective, the twelfth objective of the present invention is to provide the method and apparatus for embodying the transformational instances of reality or real form of the U. M. in modal compositions or portions of reality crafted by the user (or enabler) of the Rg module and continuum in forms referred to as Dependent Systems, or DS, thereby partitioning a realizable reality of the user and the Rg into discrete phenomenologically transformational modal compositions of form for a readiness to be realized.

Also in support of the eleventh objective, the thirteenth objective of the present invention is to provide the method and apparatus for embodying the forms necessary to transform the quantumly transforming DS structures of the twelfth objective such that the resulting transformations of real form, or universe constitute the transformation of the real universe of human user and Rg as it is known in non-real form of SS in HI, as is communicated among users and Rg in TS, and as it is known meaningfully in the hypothetical non-real form of the user. The component form of the thirteenth objective is referred to as a Controller System, or CTS.

The fourteenth objective of the present invention, largely in support of the fourth objective, is to provide the method and apparatus for embodying the correspondences of form in the TS, SS, CTS and DS structure of Rg such that the resulting existential transformations of Rg (of HI and RS) are controlled to the cognitive and perceptive levels desired of the existences of the users of the Rg. The form of the U. M. used for this embodiment is referred to as the Correspondence System, or CS.

In support of the eighth objective, or the form of the TS, the fifteenth objective of the invention is to provide the method and apparatus for embodying the existential realizations of the user, or representations of the Rg (processes of communications) in the embodiment of a real communicative form of TS referred to as an Input System, or IS.

Also in support of the eighth objective, the sixteenth objective of the present invention is to provide the method and apparatus for embodying the existential representations of user, or realizations of Rg in the embodiment of a real communicative form of TS referred to as an Output System, or OS.

In further support of the eighth objective, the seventeenth objective of the present invention is to provide the method and apparatus for modally engaging in either causal direction (user or Rg) the input and output systems of the TS for the purposes of conveying or interrupting the transformations of TS (communications in real form) within the extant TS structure to convey them to other TS structures of other Rg modules or modes of the Rg continuum. Configured as a distributed component of the CS, this modal system of TS of the seventeenth objective is referred to as a Modal Engagement System, or MES and is employed in other components of the Rg module as well.

Finally in support of the eighth objective, the eighteenth objective of the present invention is to provide the method and apparatus for embodying predetermined (or conventional) capacities of translations of the forms communicated in the embodiment of TS. While existential translations are carried out in SS of Rg, these TS translations can be interpreted analogously to filters or noise attenuators of the conventional communications art, or embodiments of known translations of natural and otherwise languages of convention in the interaction of human beings. The system embodying such capacity in TS is referred to as a Translation System, or TRS. The Translation System is modally engaged by the human user or by MES of TS (distributed CS), in the performance of the input and output systems.

In support of the ninth objective of the invention, or of the SS, the nineteenth objective of the present invention is to provide the method and apparatus serving as the medium embodiment corresponding to the transformational forms of TS and RS in the non-real form of SS of HI. Referred to as the Embodiment System, or ES, this phenomenological component of universal form is the actual non-real form maintained in correspondence with communicated forms of TS of the user and Rg and the realized forms of RS under the forms of correspondence of the CS.

In support of the nineteenth objective, the twentieth objective of the present invention is to provide the method and apparatus for controlling the existence (embodiment) of the forms of ES. Having a capacity to realize ES embodied structure, the Embodiment System Transformation System, or ESXS, is influenced by other components of the Rg, principally by the CS, such that the forms of ES are maintained in correspondence with TS and RS embodied structures.

The twenty-first objective of the invention, again in support of the ninth objective is to provide the method and apparatus for the determination of phenomenological correspondences among the forms embodied in ES (and implicitly, the forms of TS). Referred to as a Correspondence Determination System, or CDS, and under compliance with the form of CS, this component of SS provides for the extended embodiment of the user in the cognitive transformation of knowable form, or of knowing, as presented in the theory of the invention, regarding phenomenological correspondences of form. Applied by the action of CS in causal consideration of other Rg components, the CDS so embodies the instances of transformation of knowing, or translations of mind, determining correspondence among embodied phenomenological forms of ES.

Finally in support of the ninth objective or SS, the twenty-second objective of the present invention is to provide the method and apparatus for modally engaging each of the ESXS and the CDS in causation with other components of an Rg module or other modules of the continuum. Introduced in the seventeenth objective of the invention, the MES is employed herein also in regard to CDS and ESXS action.

In support of the thirteenth objective, or CTS, the twenty-third objective of the present invention is to provide the method and apparatus of embodying the transformational phenomenological form of connectedness, on a variable basis, so coupling modal phenomenological compositions of DS structures in transformation. Referred to as a Transformation System, or XS, this form serves as the existential coupling of extant transformations of a real enabled universe, or reality, as embodied in moments of transformation of DS structure.

The twenty-fourth objective of the invention, also in support of the thirteenth objective or CTS, is to provide the method and apparatus of controlling, on a variable basis, the existence of the XS coupling on phenomenologies of DS structure. Referred to as the Dependent System Transformation System, or DSXS, this form realizes the XS couplings on DS transformations of phenomenological form, or reality, in correspondence, by way of other apparatus of Rg, with embodied non-real forms of SS (ES) and communicated forms of TS. By engaging the existential couplings of XS, the DSXS allows the existence of reality or real form of Rg in conformance with the transformations of communicated (TS) and embodied (ES) forms of the HI.

In further support of the thirteenth objective, the twenty-fifth objective of the present invention is to provide the method and apparatus for the embodiment of phenomenological form in CTS corresponding to the modally engaged compositional forms of ES embodiments, which for the most part, derive from TS communications, in such a manner that said embodiment provides for the causal structure that engages particular XS embodiments over DS structures in the action of DSXS such that the quantum transformations of ES embodiments can be made to exist correspondingly in the engagements of D-XS-D structures, or so that transformations of ES embodiments in ESXS structure (or alternatively as represented in TS structure) can be made to so exist in correspondence with reality or the real form of RS. This form of the Rg module is referred to as the Controller Embodiment System, or CES.

The twenty-sixth objective of the invention, also in support of the thirteenth objective, or of CTS, is to provide the method and apparatus for controlling the embodiments of CES and their causal influences on DSXS in maintaining a reality in transformation and in correspondence with non-real form of HI (ES). Referred to as the Realization Control System, or RCS, this form engages, directly or indirectly, the actions of all forms of the CTS. In compliance with the CS, the RCS causally interacts with components of the HI in ultimate causation with user at communicative transformation of TS and so controls or maintains real form in existence in regard to correspondence to non-real transformation at HI.

Again in support of the thirteenth objective, the twenty-seventh objective of the invention is to provide the method and apparatus for the coordinated realization of real form of Rg in regard to the continuum structures of pluralities of Rg modules. Referred to as the Continuum Realization Control System, or CRCS, this form interferes with the action of CES in causing the realization of D-XS-D form or reality in transformation, when RCS so defers to an extended use of RS components over a continuum of Rg modules in accordance with a modally-engaged Rt, Rs/s or Rs continuum structure, similarly to the action of MES of HI. In compliance with continuum structure, the RCS allows the CRCS to act in its behalf in order to so realize real form controllable under its influence in integration with a broader use of HI embodied and represented structure and RS realized form, or in execution of continuum realizations.

Twenty-eighth objective omitted.

In support of the twelfth objective of the invention, or DS, the twenty-ninth objective of the present invention is to provide the method and apparatus of embodying DS structures such that each phenomenology of a D system is transformable with other D systems of a given module and with non-form or source of reality (truncation of continuum). By such means, the Rg module can be viewed as providing in its form the ability for the user to interact with Rg (at TS) and Rg then to interact with source of reality or non-form (the existential bounds of the continuum). The non-form so interacted with by DS outside of the form of the Rg and Rg continuum is referred to as a participant and typically is a living form of definition in the theory of the invention.

In regard to all objectives presented thus far, it is the thirtieth objective of the present invention to provide all terminal forms of Rg (HI, RS, CS and their components) in great pluralities under the continuum structures of objective six of the present invention in service to pluralities of users of the U. M.

Also in regard to all objectives presented thus far, it is the thirty-first objective of the present invention to provide the terminal and modal continuum structures of the Rg module in three primary modalities of structure, or modules meaningful to the user. The first primary modal structure on the use of terminal and continuum forms of the U. M., in no particular order, is referred to as the Initialization Module of the Rg, or Ri. A modular form on the configuration of the forms presented thus far, wholly distinct in real apparatus from the other two forms specified herein in the preferred embodiments of the Rg module, this form is a real configuration of Rg components used primarily for initializing or attaching an Rg module to a real platform of Rg modules in a continuum structure of such real modules. Since the continuum of modules is realized by the hand of enabler, the initialization module is comprised of HI apparatus only (and CS). The forms so communicated and embodied in HI of Ri thus pertain to continuum structure of the given universe of Rg modules under Rt, Rs/s or Rs continuum structure. The second primary modular structure on the use of terminal and continuum forms of Rg is referred to as the Platform Module of the Rg, or Rp. This modular configuration of terminal and continuum forms of the U. M., embodying pluralities of (T, S, C, D) terminal structures (not just HI and CS structures, as is the case with Ri), also realized by the hand of enabler in the form of Rp modularized forms, embodies the capacity to enable (know and realize) the modular capacities of the third primary modal structure to be discussed herein. The (T, S, C, D) configurations of Rp modularity, which are bound by the continuum structures of Ri modularity, thus are employed for the purpose of knowing and realizing further, wholly distinct (T, S, C, D) structures that are employed under the third modular form of the Rg module. The (T, S, C, D) structures of the third modality thus are realized in the RS (C, D) of Rp module and are known and represented in the HI (T, S) of Rp module. The third modular form of Rg, then, referred to as the Service or Application Module of the Rg, or Rsv is an enabled form of (T, S, C, D) structure used by a general purpose user for the purpose of taking advantage of the generic capabilities of the Rg module and Rg continuum specified herein. The three modular forms of Rg thus distinguish among users of the continuum, with initialization of the continuum performed by a particular type of user for the purpose of creating continuum structure; with platform users enabling the forms required for the service modules and thus providing a platform of real form held modally in existence by the Rp modality for service users; and service or application users applying the forms enabled by Rp modalities, or Rsv modules for their own purposes.

The thirty-second objective of the present invention, in support of the thirty-first, is to provide the method and apparatus for the meaningful representation and realization (existential embodiment) of the forms existentially employed by the Rg module (e.g., forms that will be known mutually by user and by Rg) in compliance with the existential form of translation of the theory of the invention. The first such form of translation, referred to as ZA, embodied in TS and in SS of Ri, Rp and Rsv modality, is a declared arbitrary non-real (meaningful) form. It is a form imagined by user or by Rg. The second form of such translation is referred to as ZB and is the reference form of a translation, also embodied in TS and in SS of Ri, Rp and Rsv modality. The third such form is referred to as ZBreal and is the real form or reality to which ZB corresponds and ZA translates into in existential translation. ZBreal is enabled reality. Together these forms provide the basis for a generic process of the invention referred to as modeling and implementation (of model), or simply existential translation from the theory of the invention. Such simplified forms on translation typically are associated with the default mode of the Rg, however, as a consequence of the fourth objective of the invention in providing varying degrees of existential capacity over the cognitive and perceptive capabilities of Rg. (Default and Existential Modes of Rg are discussed in the forthcoming objectives.)

The thirty-third objective of the invention, in connection with the thirty-first objective, is to provide the method and apparatus of the thirty-second objective (ZA, ZB, ZBreal) in the default or existential modes of Rg, also a consequence of the fourth objective of the invention, in such a manner that in the existential mode ZBreal, or reality is partitioned into a sensed or perceived global reality in split form of inertial existence or world, referred to as ZBreal sense, or ZBsreal and in an intrinsically caused form of reality, referred to as ZBreal motor, or ZBmreal, along with a rest of world, or ZBwreal defined in the theory of the invention. These forms provide for the sense and motor (perceptive) capacity of the real existence of the Rg module in the existential mode. In the existential mode, ZB thus generally corresponds by way of CS to ZBsreal or to the perceivable world of Rg sense, though forms of ZB are partitioned for incremental forms of motor skill (ZBmreal) and world transformations (ZBwreal). The translations of Rg in existential mode thus occur in compliance with CS on the basis of a partitioned existence of communicative and other typically existential experiences (modes of existence). The CS in existential mode of Rsv, for example, engages the components of (T, S, C, D) on the basis of quantum transformational communications with user and Rg's own cognitive and otherwise modes of existence deriving from ZBsreal or real experience. The Default mode of Rg, in contrast to the highly existential nature of the existential mode, requires a less autonomous control of the modes of existence of Rg. In the default mode, ZBreal can be viewed as all sense or all motor since the Rg in such a case is driven existentially primarily by communication with the user, or, realizations of the user are phenomenologically translated into realizations of Rg. In the existential mode, the Rg thinks about the world in which it exists and so converses accordingly with the user in natural or other languages. ZA and ZB of the default mode exist explicitly and directly for the meaningful purposes of the user and thus are extrinsic embodiments of the user (in contrast with intrinsic embodiments of Rg in existential mode). In the existential mode of Rg, ZA, ZB and ZBreal exist only indirectly in a meaningful way to the user, namely through the enabled existence of the Rg.

The thirty-fourth objective of the present invention also in support of the thirty-first, is to provide the method and apparatus for embedding the modal transformations of ZA, ZB and ZBreal (or their existential equivalents) within the transformations of other TS and SS embodiments creating a meaningful communicative framework within which the forms of ZA, ZB and ZBreal (and their existential equivalents) so obtain interactive context between user and Rg, referred to as the Modes of Existence of the Rg.

The thirty-fifth objective of the present invention, also in support of the thirty-first, is to provide the method and apparatus for the existential translations, or the faculties of mind of the Rg. Referred to as the Imaginative Faculty, IF, the Comprehension Faculty, CF; the Communicative Faculty, CMF; and the Motivation and Learning Faculty, MLF, and many others, the faculties of mind are particular usages of CDS by CS on all of the forms of ZA and ZB, in connection with those of ZBreal more typically in the existential mode of Rg in relation to the varied forms of existential translation. The modal use of these faculties, in connection with the existential interactions of Rg module real, cognitive and communicative experiences with user and the shared reality of user and Rg provide for the existence of Rg as a synthetic form of existence in accordance with the theory of the invention.

Also regarding the thirty-first objective, the thirty-sixth objective of the invention is to provide the method and apparatus for the embodiment of knowable forms of ZA, ZB and ZBreal with the (T, S, C, D) components presented earlier, such that all forms are constrained within the meaningful framework of the enablement of Rsv modality. Whereas the capacities of Rg in default and existential modes of Rg in Rsv modality pertain only to general or arbitrary formations of ZA, ZB and ZBreal (e.g., a given meaningful existence of Rsv modality) the same capacities of Rg in Rp modality thus apply to the forms of Rsv modality. In compliance with CS structure, the transformation of existential form (faculties of mind) occurs in Rp modality on the basis of the meaning of Rsv forms and not to generalized forms as those found in Rsv modality. The modal embedding of the default mode of Rp, for example, pertains to the modeling and implementation of Rsv modal structure. The Rp modality then can be viewed as an Rsv modality which is directed toward the modeling and implementation of Rsv structure, and which, instead of being placed into existence by a realization system, is so constructed by hand of enabler.

The thirty-seventh objective of the present invention, also regarding the thirty-first, is to provide the method and apparatus for embedding the modal transformation of ZA and ZB structure into TS and SS (HI) structure such that the transformations so reflect the continuum structure or Ri modality on a plurality of Rg modules.

The thirty-eighth objective of the invention, in support of the thirty-seventh, is to provide, optionally, the method and apparatus for the use of Rg components (T, S, C, D) such that whereas in the preferred embodiment, Ri does not embody a realization system, such RS is provided and embodies ZBsreal, ZBmreal and ZBwreal forms such that ZBmreal is the motor and the continuum structure is ZBsreal or sense. In such a case, the Ri modality can so perform as Rsv structure in default or existential mode in the construction of the continuum.

The thirty-ninth objective of the present invention is to provide the method and apparatus of the thirty-first objective (Ri, Rp and Rsv) in great plurality in the modal capacity of the enabling structures of each of Ri, Rp and Rsv (e.g., that connectedness structures of T, S, C, D of each modality be so enabled to accommodate the infinite expandability of each modality and therefore of the continuum).

The fortieth objective of the present invention is to provide the method and apparatus of the Correspondence System, CS, uniquely tailored to the default and existential modalities of pluralities of Ri, Rp and Rsv modalities under the continuum control determined by Ri modality.

In support of the fortieth objective, the forty-first objective of the present invention is to provide the method and apparatus for the Continuum Enablement System, CTES, of the CS which is influenced causally by the embedding modality of Ri in the case of Ri modality and is influenced by the SS structures of Ri modality in the case of Rp and Rsv modalities. The CS thus is determined to perform under continuum structure by Ri and thus in each case of Ri, Rp and Rsv modality the respective CS embodiments are so structured in order that they comply to a particular continuum structure.

Also in support of the fortieth objective, the forty-second objective of the present invention is to provide the method and apparatus for the Translation Control System, or TCS of CS in the default and existential modes of any of Ri, Rp and Rsv modalities in such a manner that ZA, ZB and ZBreal be so maintained in variable existential correspondences.

In support of the forty-second objective, the forty-third objective of the invention is to provide the method and apparatus for the embodiment of the phenomenological know how in guiding translations of ZA and ZB with respect to ZBreal which is so placed into existence by the TSC of CS in the existence of Rg default and existential modes of Ri, Rp and Rsv modalities. By realizing specific embodiments of such translations referred to earlier as imagination, comprehension, communication, and motivation and learning, the causal influence of these modal structures of CS on the forms of ES (ZA, ZB) so maintain the existential translations of ZA, ZB and ZBreal.

The forty-fourth objective of the invention, in further support of the fortieth, is to provide the method and apparatus for the embodiment of the TCS of CS, defined in objectives forty-two and forty-three for the default mode, strictly in the existential mode. Such CS embodiments thus take into account the transformations of sense, motor and rest of world (ZBsreal, ZBmreal and ZBwreal) in regard to translation and thus account for the semi-autonomous existence of Rg in existential mode of Ri, Rp and Rsv modalities. (The Rg is always semi-autonomous because of the subordination of its modes of existence to the communicative modes.)

The forty-fifth objective of the invention is to provide the method and apparatus for the connectednesses of the real apparatus of all components of all modalities of the Rg module and therefore of the Rg continuum.

The forty-sixth objective of the invention, in support of the third objective of the invention, is to provide the method and apparatus of the real form of the Rsv modality in a preferred embodiment as follows (though bearing in mind, as discussed, the real form of Rsv modality is a general purpose form). The real form of Rsv modality is partitioned into conventional art (technology),future art (any form is possible under the theory and apparatus of the invention, since such form as the Rg invents of its own accord) and android.

In support of the forty-sixth objective, the forty-seventh objective of the invention is to provide the method and apparatus of embodying and maintaining in real form and in knowable existence to user and to Rg under the modalities presented thus far (Rsv) the forms of conventional technology, including any and all knowable forms of conventional knowledge and related experience.

In support of the forty-sixth objective, the forty-eighth objective of the invention is to provide the method and apparatus for embodiment in real form and knowable existence of user and Rg under the modalities of Rsv the forms of discovery, including all forms so imagined and realized by Rg and communicated and realized in the knowable existence of Rg under a modal constraint of CS referred to as prompting and conversing.

In further support of the forty-sixth objective, the forty-ninth objective of the invention is to provide the method and apparatus for realizing and maintaining in existence the forms of android or synthetic autonomous existences.

In support of the forty-sixth, forty-seventh and forty-eighth objectives, the fiftieth objective of the invention is to provide the embodiable method of translation of any known language of conventional form to the language forms of U.G. of the theory of the invention. This generalized method of translation thus provides for the embodiment of conventional and androidal art, and to the extent constrained by structures of Rg, future art, in the existential processes of the Rg.

In support of the first objective of the invention, the fifty-first objective of the invention is to provide the general embodiable method of translation in specifically translating conventional knowledge forms into the structure of Rg, or, of enabling the Rg in an enabling medium.

In support of the fifty-first objective, the fifty-second objective of the invention is to realize, by way of the definition of enabling media, through the efforts of hand realization of enabler, the structure of Rg in the real form of such enabling medium.

Also in support of the first objective of the invention, it is the fifty-third objective of the invention to specifically translate the forms of the Rg and Rg continuum to classically physical enabling media.

In further support of the first objective, it is the fifty-fourth objective of the invention to specifically translate the enabling media of electronics, computers and communications media to the forms of the Rg.

Again in support of the first objective, the fifty-fifth objective of the invention is to specifically translate the enabling media of quantum physical and biological enabling media to the forms of the Rg.

Finally in support of the first objective, it is the fifty-sixth objective of the invention to specifically translate the enabling media of the institutional forms of conventional knowledges to the forms of the U. M.

In regard to objective fifty-one of the invention, it is the fifty-seventh objective of the invention to declare by way of translation of Rg and Rg continuum to the forms of conventional enabling media as demonstration that the U. M. is universally realizable in the structures of the U. G.

The fifty-eighth objective of the invention is to provide the method and apparatus of the invention in a preferred embodiment in enabling media of the fifty-first to the fifty-seventh objectives of the invention, or into a paradigmatical realization of the invention.

The fifty-ninth objective of the invention is to apply the Rg and Rg continuum in the construction of androids toward the realization of the forty-ninth objective.

The sixtieth objective of the invention, in support of the fifty-ninth, is to provide the method and apparatus, realizable also under Rg and Rg continuum structure as enabled in real media of enabler or user, for the broadest possible forms of autonomous existence, or android, within which the existential and otherwise forms of the theory and practice of the invention, as reflected thus far in the objectives of the invention and the theory, are realized in the image of human being. Subsequent objectives of the present invention apply to the fifty-ninth objective of the invention, or to the construction of android.

The sixty-first objective of the present invention is to provide the method and apparatus for the configuration of the basic existential forms of the existential mode of the Rg module under Rsv existential modality under a new CS structure such that existential control is not maintained by user in communication with Rg, or presently android. The androidal form thus embodies no Ri or Rp modalities (and thus no continuum structure) and so embodies Rsv modality only to the extent of the existential mode and without regard to a (human) user. The androidal configuration as a result of the present objective thus requires that the communicative capacity be placed configurationally within other sense-motor structure and that the Rg configuration of android be determined simply by real and non-real form abiding to the embodiment structure of CS in compliance with modes of existence of theories of existential forms.

The sixty-second objective of the invention is to provide the method and apparatus for partitioning the CS structure and therefore real and non-real structure (vestiges of HI and RS) into existential modalities referred to as modes of existence in accordance with various theories on the nature of existence. The faculties of mind demonstrated in Rg structure, including imagination, comprehension, communication and motivation and learning and so on are all applied in particular modes of existence, along with particular and specialized motor activities called skills under the modal use of CS structures in the synthetic existence of the android.

In support of the sixty-second objective, the sixty-third objective of the invention is to provide the method and apparatus for partitioning modes of existence into the broadest possible pair of modes of existence, and thus on the basis of voluntary and involuntary engagement of motor action (ZBmreal). These general modes of existence require that instinct be provided in involuntary action of motor wherein cognitive engagement of ZA and ZB forms by CS is not necessary, and wherein ZBsreal or sense so observes such action, along with voluntary and other sensed action of the reality of android. These modes also require that all voluntary action of motor be so engaged in correspondence with the translational forms of the faculties of mind, or consciousness of android. The cumulative effect of the split nature of inertial existence (of the theory of the invention), and voluntarily and involuntarily engaged motor actions provides for the modal existence of the android in connection with CS structure in a real (synthetic) existence of real and non-real forms. All modes of existence of android thus are either voluntary (cognitively driven) or involuntary (driven by instinct) modes though as a theoretical form on existence, this requirement is not mandatory.

The sixty-fourth objective of the invention is to provide the method and apparatus for embodying in the sense-motor configurations of android the five senses of human corporal form to a sufficient likeness to such human form to the satisfaction of enabler, or the anthropomorphic sense-motors of android. (It should be noted in regard to the use of the terminology human senses that such forms require the embodiment of sense and motor, most typically, in the provision of what conventionally is referred to as sense.)

The sixty-fifth objective of the present invention is to provide the method and apparatus for embodying the non-real communicative forms of human being (such as language forms) in the sense/motor configuration of objective sixty-three of the present invention.

The sixty-sixth objective of the present invention is to provide the method and apparatus for embodying sensory-motor capacity in arbitrary enabling media such as any form of conventional art enabling the Rg and Rg continuum. In such a capacity, the android is enabled with theoretically boundless sense and motor capacity with which to transform in a real universe of enabler.

The sixty-seventh objective of the invention is to provide the method and apparatus for the embodiment of arbitrary non-real communicative forms in any of its sense-motor capacity such that said non-real communicative forms provide the basis for existential communication with other forms of said arbitrary non-real embodiments in communicative sense-motor media of other similarly enabled androids.

The sixty-eighth objective of the invention is to provide the method and apparatus for the partitioning of sense-motor forms into communicative sense-motors and affecting sense-motors in correspondence with the requisite faculties of mind necessary for communication of non-real form and for realization of general influence on reality or real motor action. Either communicators or effectors may be voluntary or involuntary in mode of existence. Effectors are premised on the enablers desire to affect the enabler's universe existentially indirectly by android. Communications are premised on enabler's desire to enable the android with communicative facility with other androids or other existential forms and enabler.

In support of the sixty-second and sixty-third objectives, regarding modes of existence and faculties of mind, the sixty-ninth objective of the present invention is to provide the method and apparatus for the cognitive translations of the faculty of imagination in a vast array of CS—driven embodiments commonly referred to conventionally as such forms as reasoning, rationalizing, inferencing, determining, discovering, analyzing, editing, creating and crafting poetry—to cite a handful—in correspondence to the real perceptions of android in real form of sense-motor medium.

Also in support of the sixty-second and sixty-third objectives, the seventieth objective of the present invention is to provide the method and apparatus for the cognitive translations of the faculty of comprehension, including such conventional interpretations on cognition as apprehension, memory, recall and learning but in the structures complying to the theory and practice of the invention, in correspondence with the real perceptive experience of sense-motor media of android. Such cognitive faculty shall interact with effectors (other sense-motors) for comprehension (and discovery) of real extrinsic world or of what is sensed.

In further support of the sixty-second and sixty-third objectives, the seventy-first objective of the present invention is to provide the method and apparatus for the embodiment of the cognitive translations of the communicative faculty of mind for the purpose of any conveyance of symbolic or embodied non-real form to or within any medium of the sense-motor capacity. The communicative faculty shall interact with all other faculties in the communicative mode of existence for the purposes of motivation and learning.

The seventy-second objective of the invention, also in support of the sixty-second and sixty-third objectives, is to provide the method and apparatus for the embodiment of the primary or embedding mode of existence of motivation and learning. At the highest level of CS control, the faculty or mode of existence of motivation and learning determines an unresolvable offset in android's inertial existence, or state of being, which provides for the inertial world so crafted in split sense-motor configuration giving meaning to the pronounal form L All other translations of androidal modes of existence thus assist or support those of motivation and learning or the resolution of inertial existence. Comprehension so comprehends, imagination so imagines, communicative faculty so communicates and the senses and motors so perceive and affect the being of the android under the motivational and learning mode of existence which obtains meaning in the central transformational forms (I, you, it or all) of the pronounal system of representation of inertial existence of conscience as set forth in the theory of the invention.

The seventy-third objective of the invention is to provide the forms of android achieved by the other objectives in service to the solution of a vast array of particular problems (form) of human experience (human user). This objective requires the construction of android to proceed from the standpoint of resolving meaningful problems to the human condition. Instead of constructing such android from the bottom up, or in terms of the capacities addressed in the previous objectives, the present objective requires android to be constructed based on the most efficient use of such forms, beginning with motivation and learning, in the resolution of problems stemming from the real and non-real forms of corporal form of human being in resolution the the human condition.

The seventy-fourth objective of the invention is to provide the method and apparatus for the enablement of androidal forms so constructed in achievement of the previous objectives in a vast array of enabling media, including much of those of objectives fifty-three, fifty-four, fifty-five and fifty-six in the enablement of Rg and Rg continuum.

The seventy-fifth objective of the invention is to provide the method and apparatus for enabling and maintaining the existences of great pluralities of androids in the Rsv modalities of Rg and Rg continuum structure.

The seventy-sixth objective of the invention is to provide the method and apparatus of androidal forms integrating into the (human) user status of the Rg and Rg continuum. Since the Rg module is likened to an existentially controllable android, and since the communicative faculty is provided in a great plurality of media in both Rg and in android, a single android can use an Rg module or continuum in contemplating and realizing its own enabled extensions of its own existential universe.

In connection with the fifty-eighth objective, the seventy-seventh objective of the present invention is to provide the method and apparatus of the Universal Machine in paradigmatical embodiments working toward the general purpose uses of a vast array of diversified needs of human users in the ordinary experiences of the human condition and toward the collective experiences of all such human users in the improvement of the human condition.

BRIEF DESCRIPTION OF THE DRAWINGS

FIG. 9 illustrates the default and existential modes of existence of the Rg Module.

FIG. 11 illustrates the quantum nature of the form of the U. M.

FIG. 24 illustrates the modeling and implementation process in the default and existential modes of the Rg.

FIG. 27 illustrates the universality of U. G. forms in TS.

FIG. 59 is a table of faculties of mind and streams of consciousness, and moments of cognition.

FIG. 70 shows the ZA modification mode.

FIG. 71 shows the ZB modification mode.

FIG. 72 shows the ZA or ZB correspondence determination mode.

FIG. 73 illustrates the realization of ZB mode.

FIG. 75 illustrates the modification of Ri platform mode of Ri.

FIG. 77 shows the translations of digital logic (gates) to U. G.

FIG. 93 is the U. G. interpretation of the quantum occurrence of matter in a classically physical universe.

FIG. 96 shows translations of classically physical media to forms of the Rg and Rg Continuum.

FIG. 100 shows translations of CDS and CS as transducers of conventional physical media.

FIG. 107 illustrates the existential form of a conventional communications system.

Figure 110:
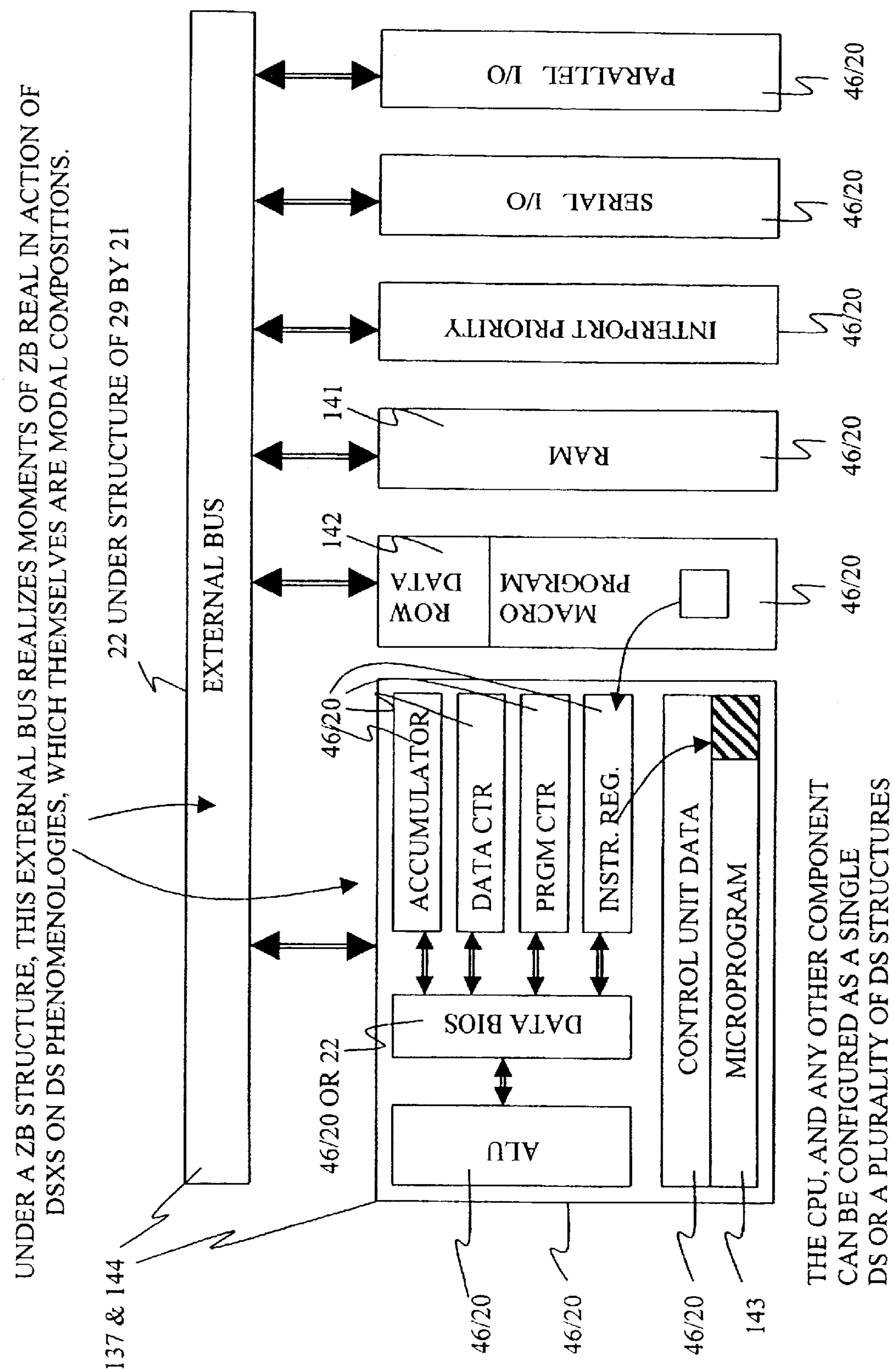

FIG. 110 shows a microprocessor translated to U. G. structure of DS phenomenologies under DSXS (and, in the Nature of the U. G., Other Rg Components as well).

Figure 111:
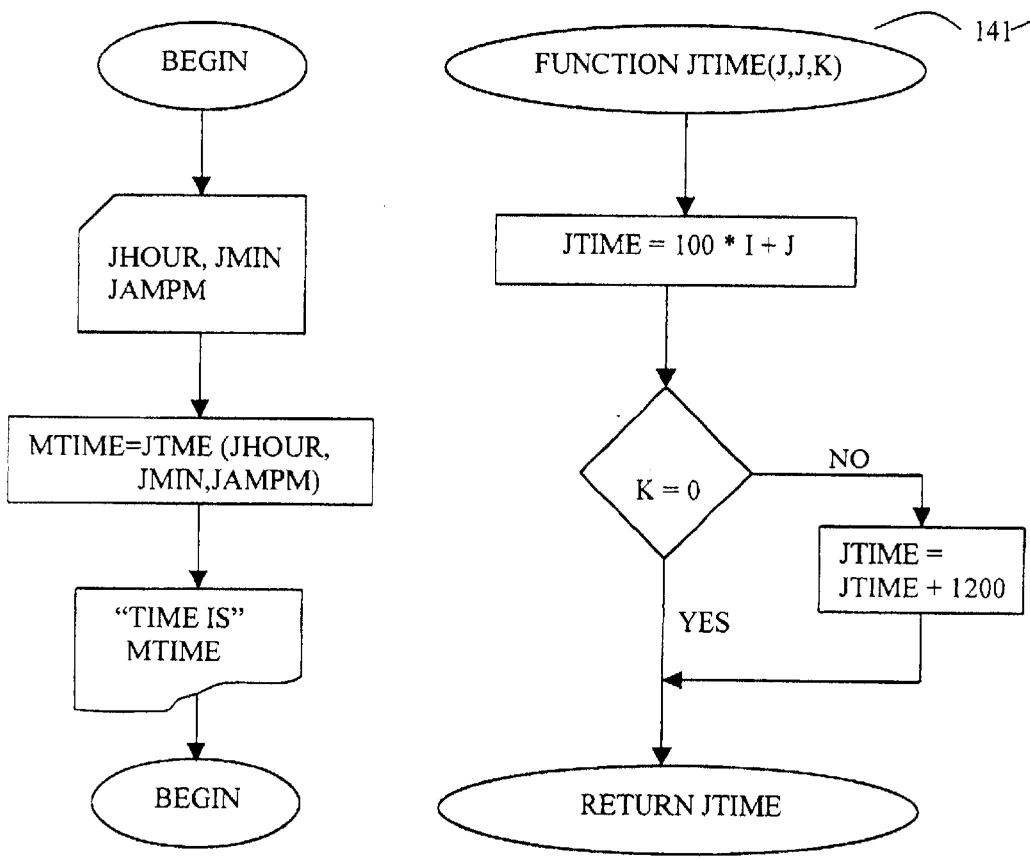

FIG. 111 shows a conventional high-level computer language.

Figure 112:
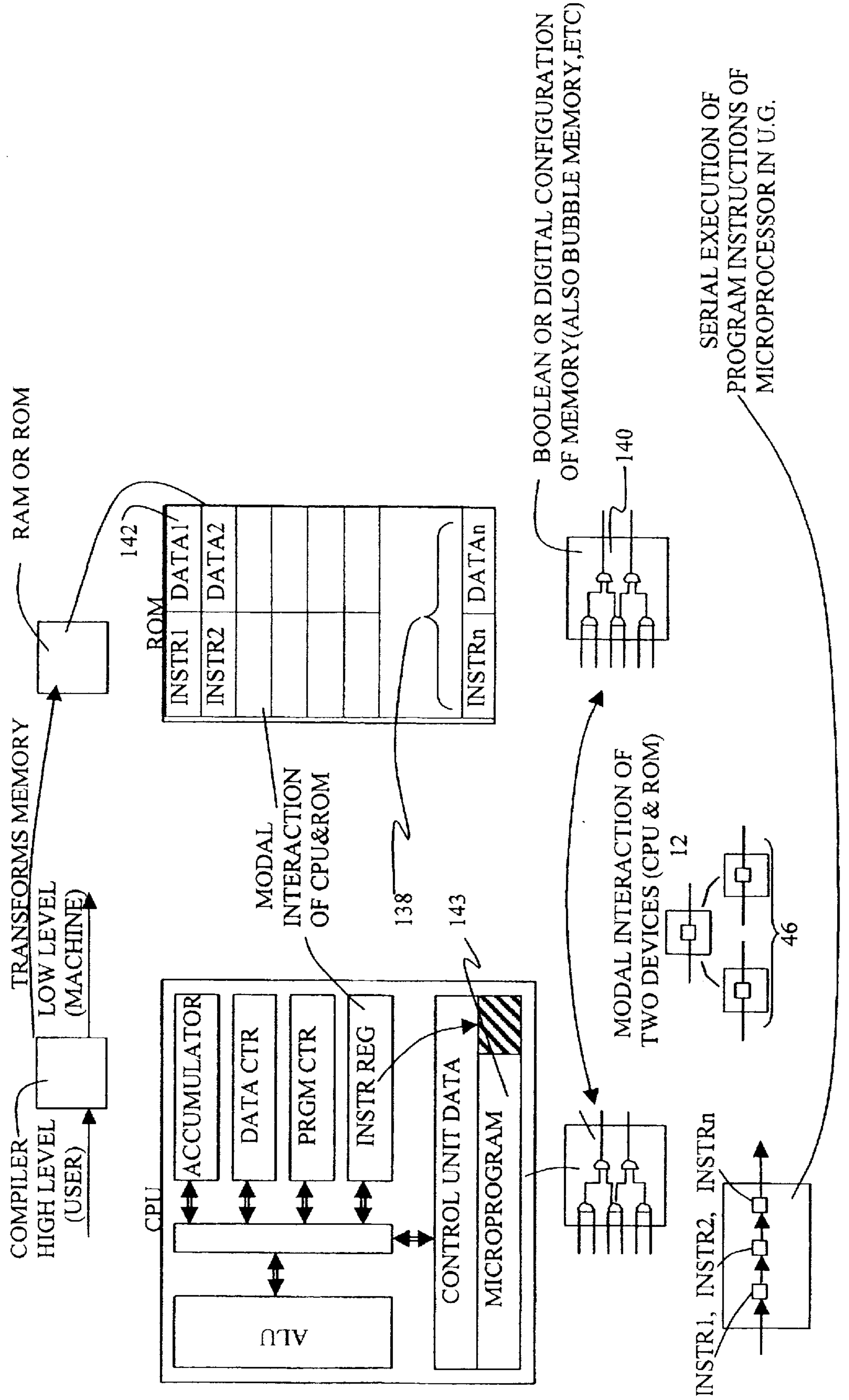

FIG. 112 shows phenomenological breakdown of stored instructions and data and their corresponding CPU executions.

Figure 113:
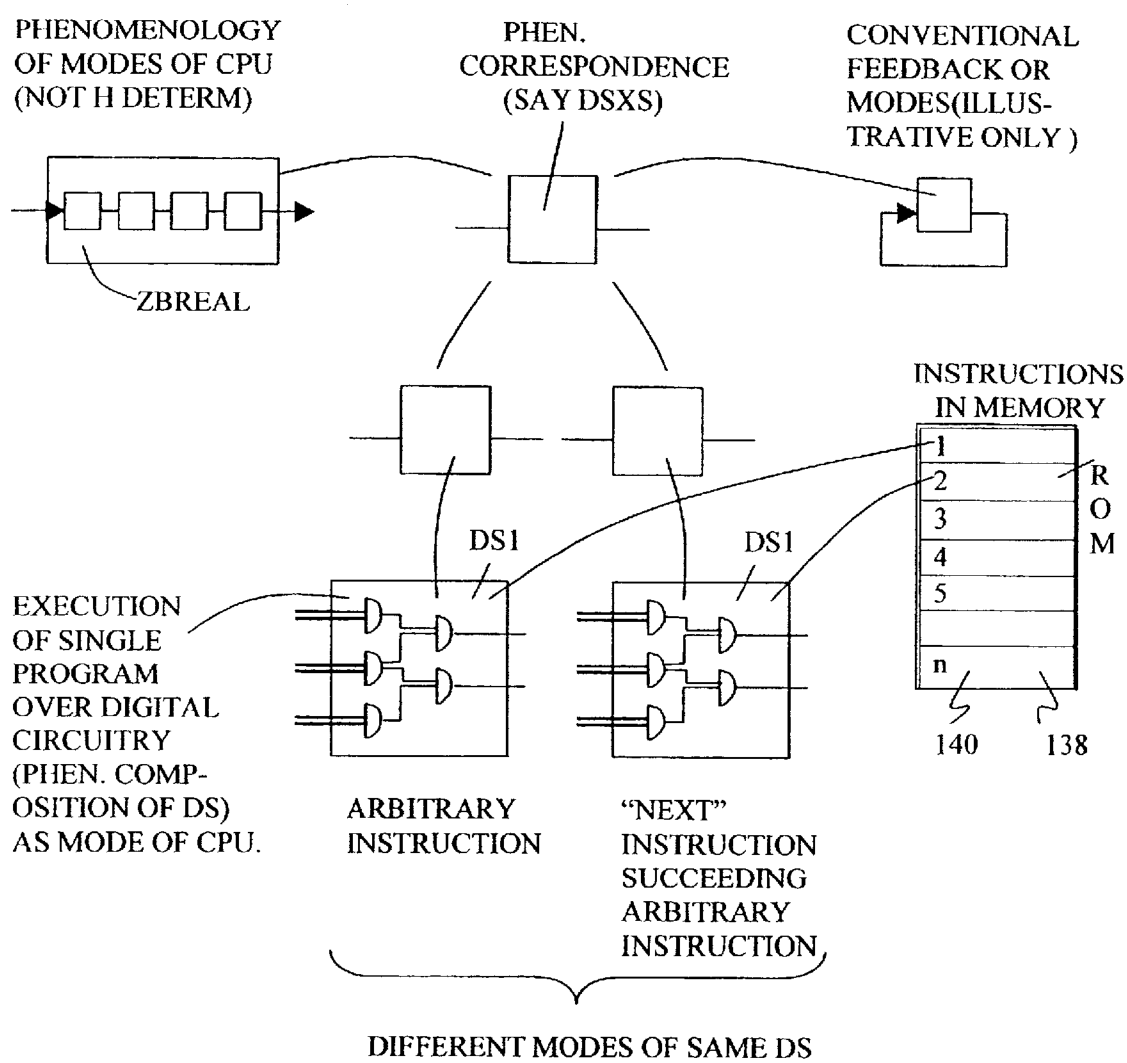

FIG. 113 shows the modal compositional U. G. forms of computer (microprocessor) programs.

Figure 114:
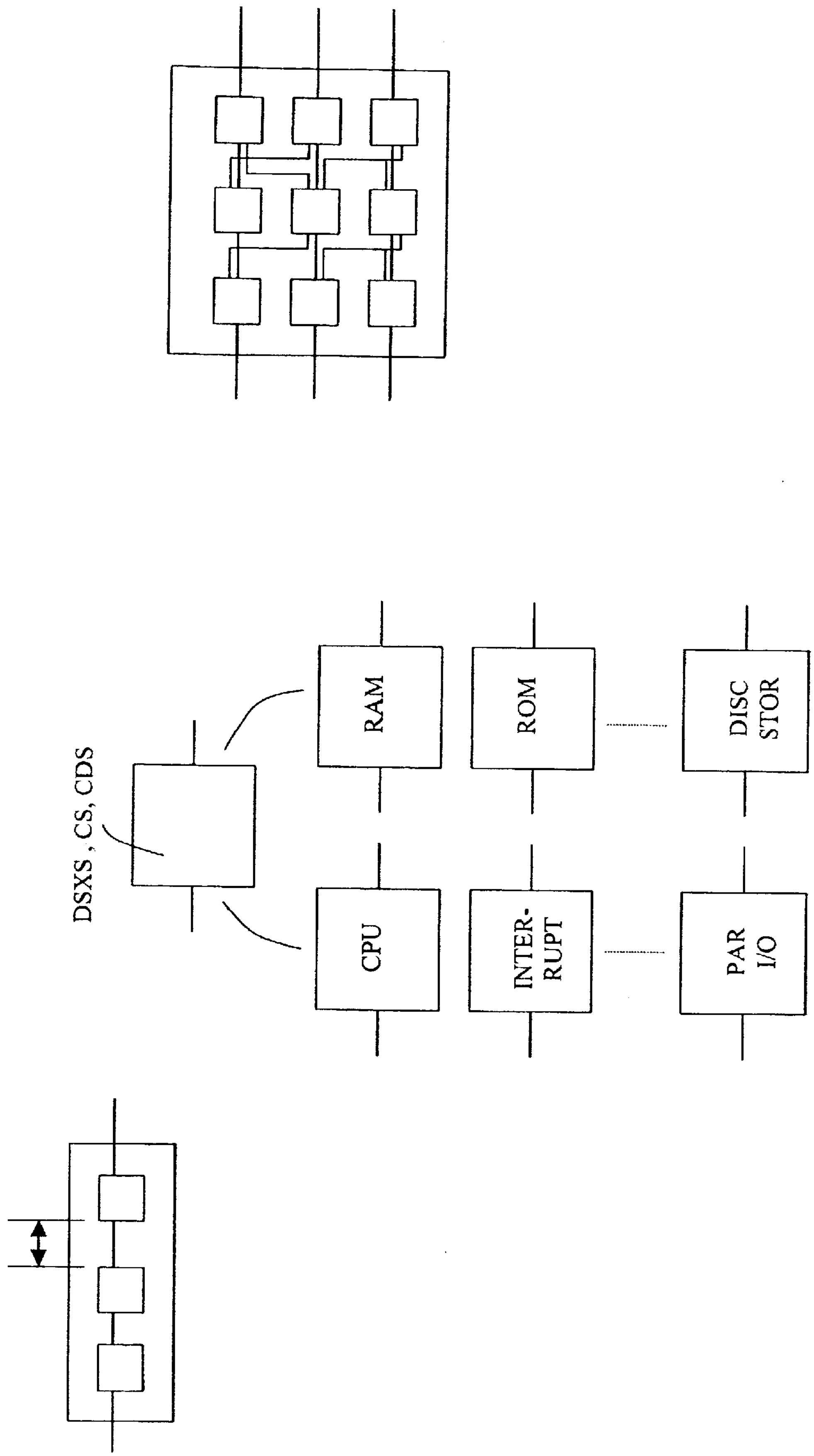

FIG. 114 illustrates DSXS realization of computational methods and apparatus.

Figure 115:
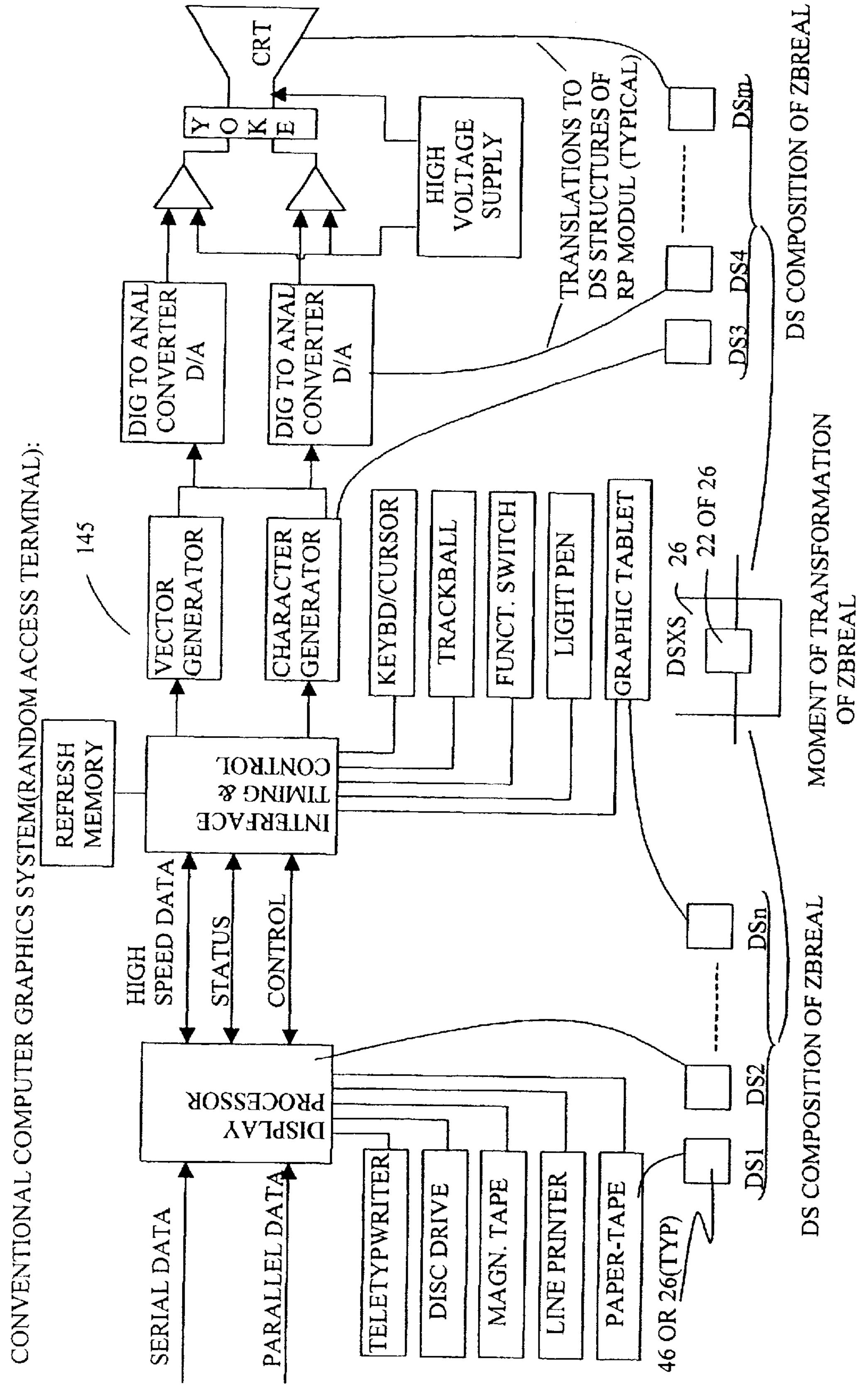

FIG. 115 shows a TS translation to CRT apparatus.

Figure 116:
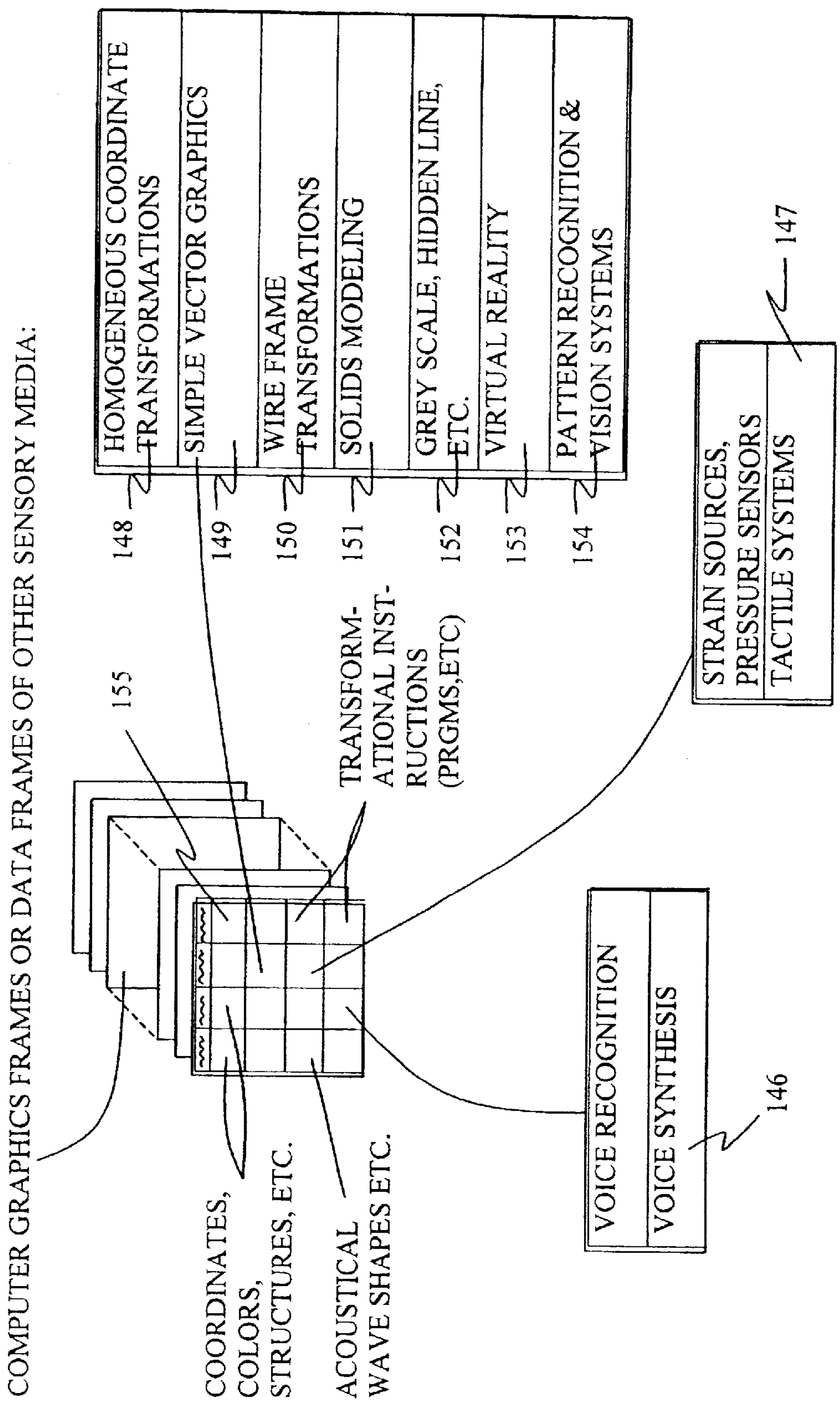

FIG. 116 shows computational machine-based visual, acoustic and tactile systems translated to TS structure on basis of graphics or data (information) frames.

Figure 118:
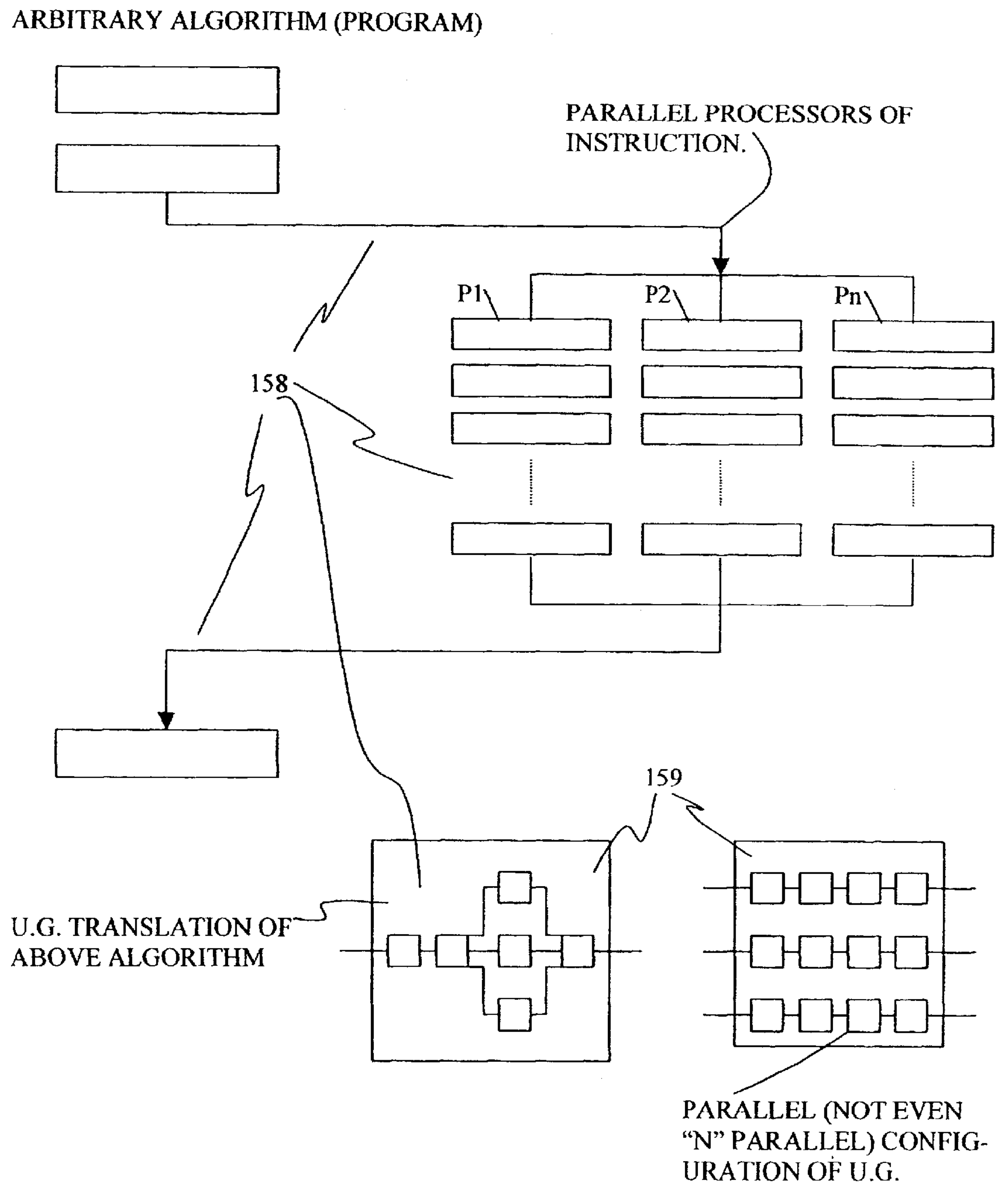

FIG. 118 shows parallel processing of the computational art in U. G.

Figure 119:
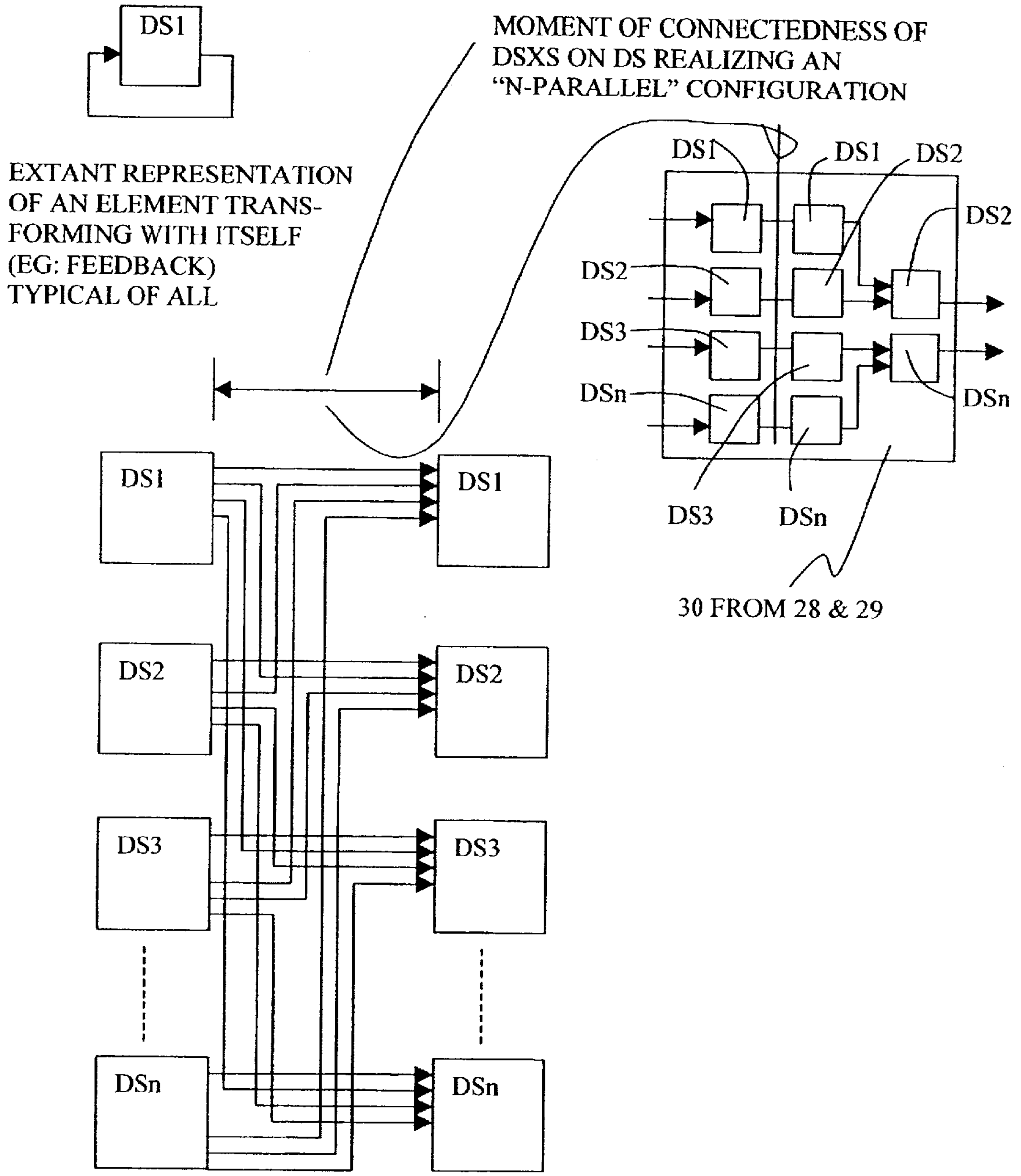

FIG. 119 shows fully-pipelined massively parallel configuration (of DSXS under ZB) of Rg structure of n-parallel connectedness in U. G. translation.

Figure 120A:
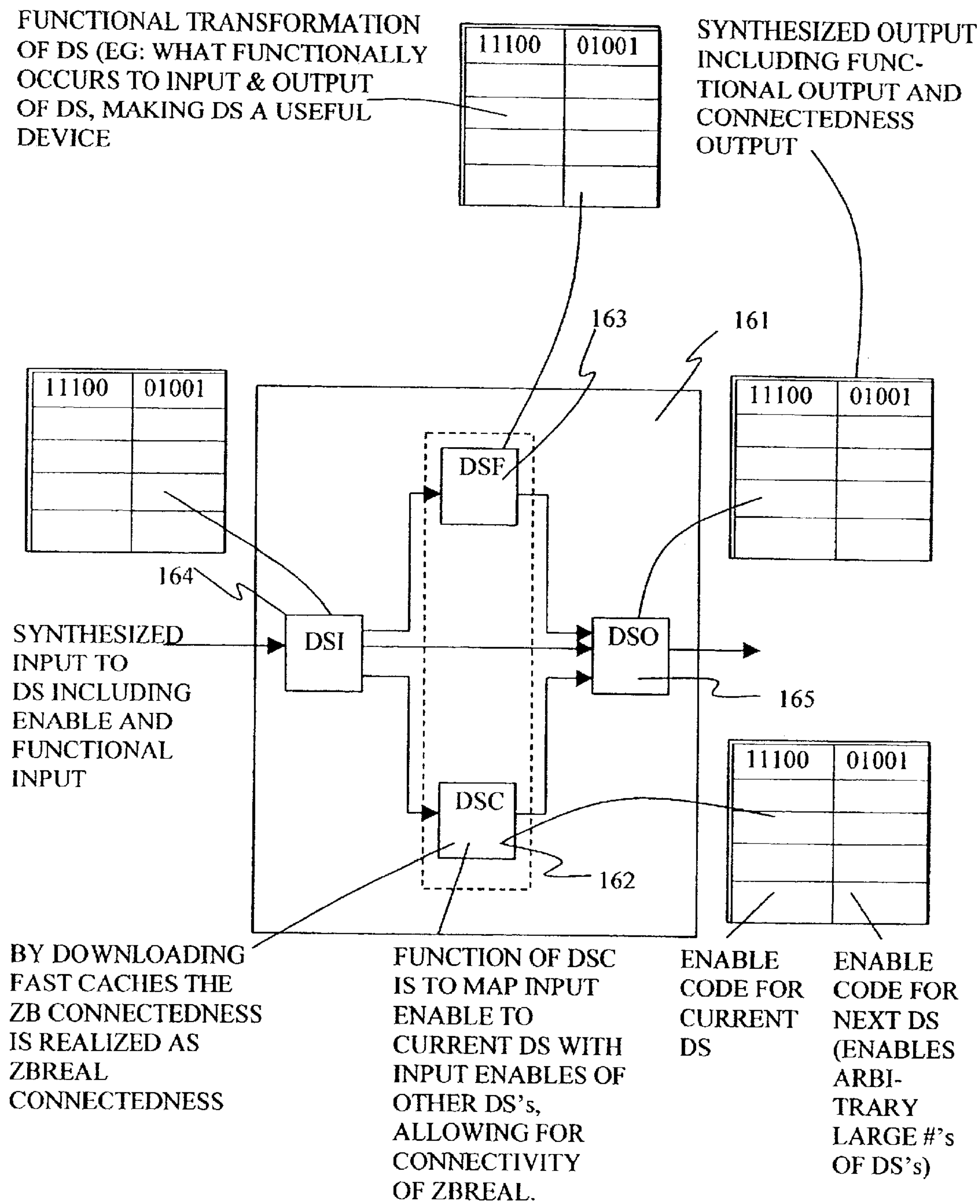

FIG. 120*a* shows a modified DS structure for CES modal realization of a virtual machine.

Figure 120B:
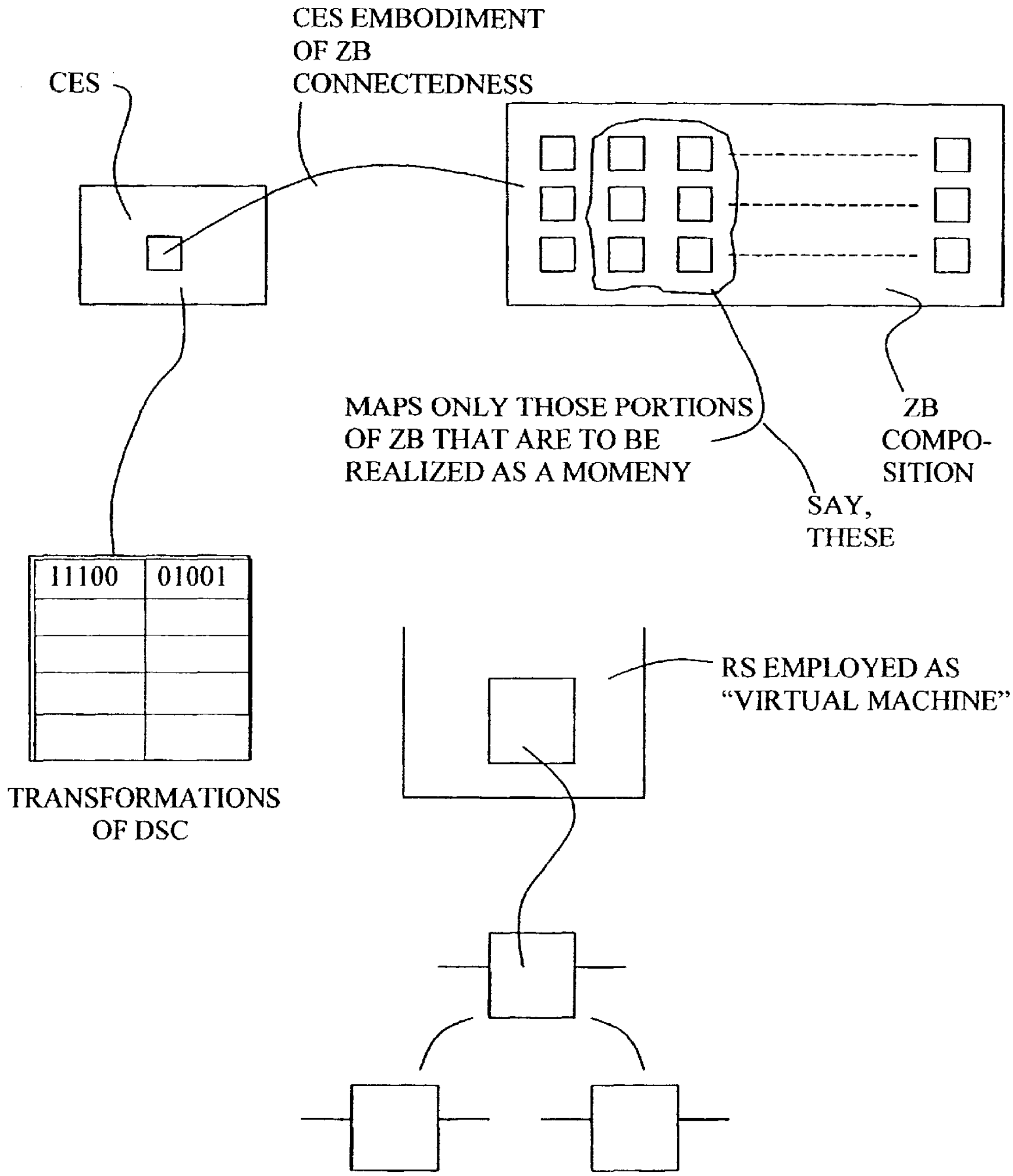

FIG. 120*b* shows CES embodiment of DS connectedness.

Figure 121:
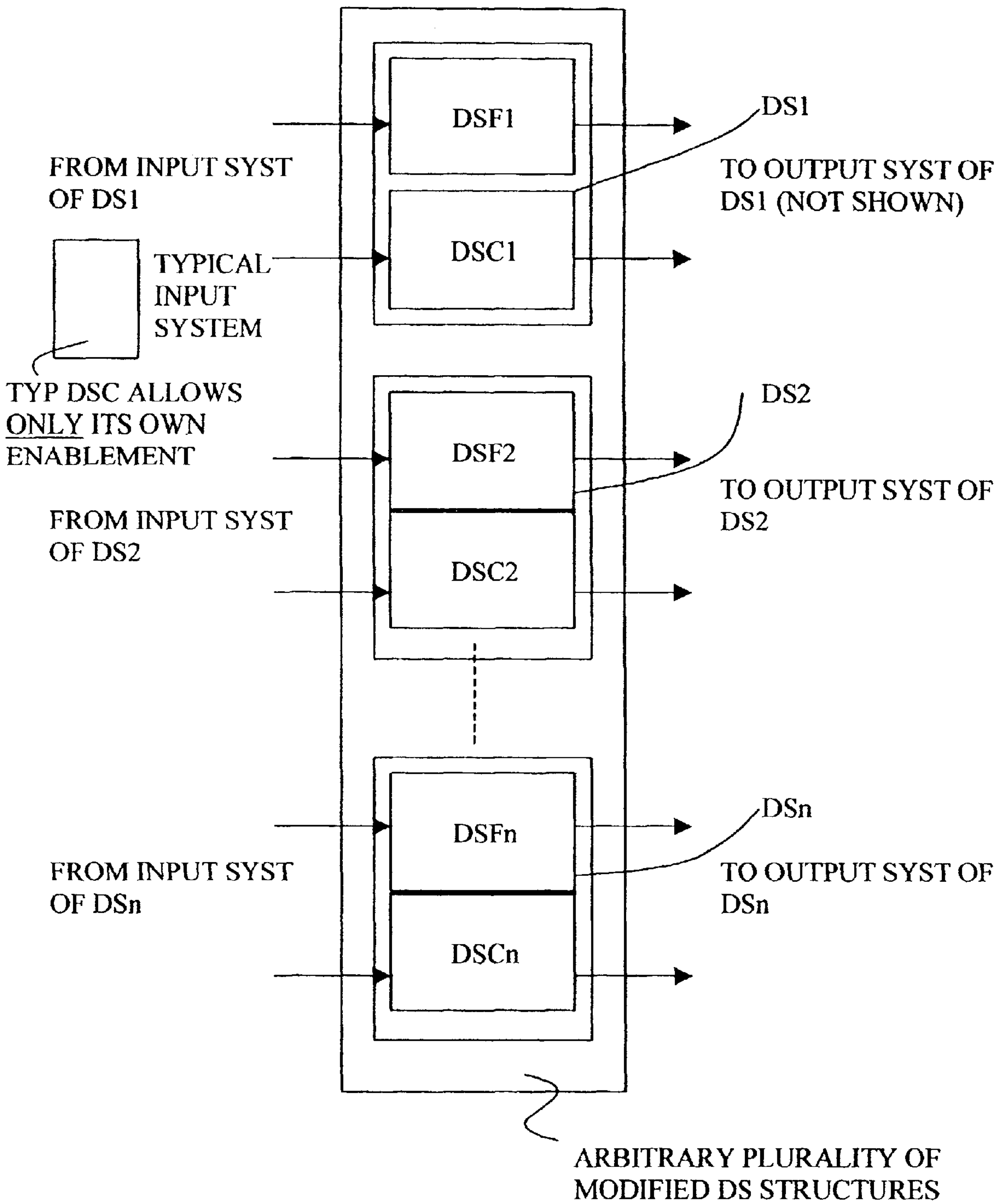

FIG. 121 shows a continuous system embodiment of modified DS for virtual machinery couplings.

FIG. 122 is a summary of computational and communications media in translation to Rg and Rg Continuum.

Figure 123A:
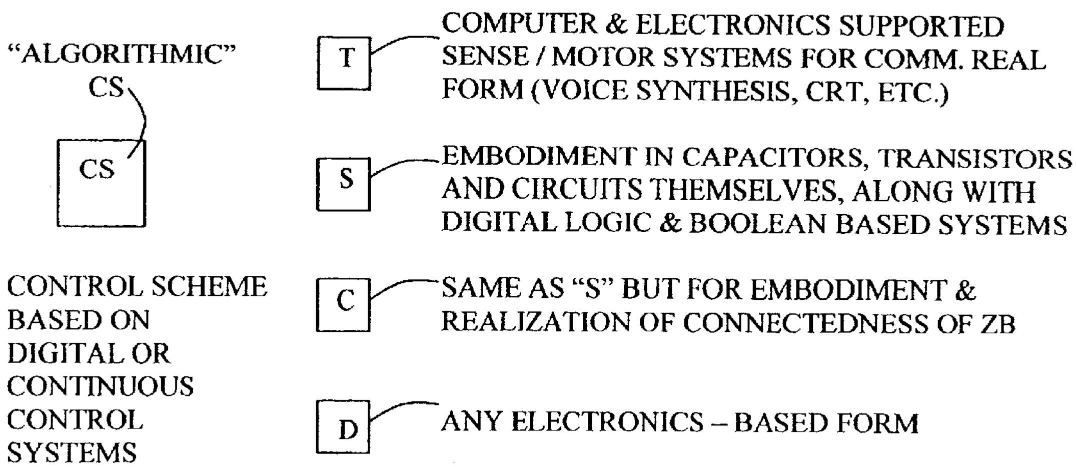

FIG. 123*a* is a summary of electronics, computers and communications media in general structures of Rg and Rg Continuum.

Figure 123B:
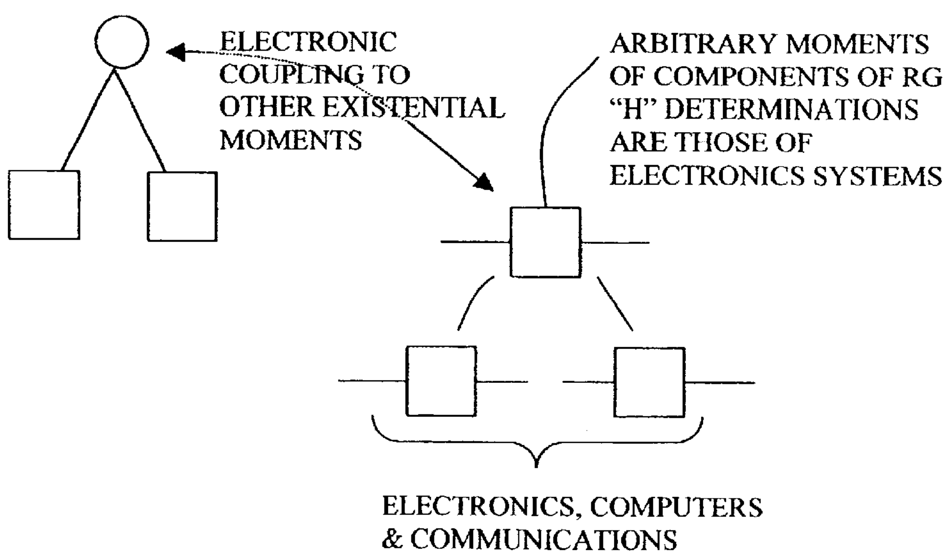

FIG. 123*b* is a summary of electronics, computers and communications media with respect to existential forms of Rg and Rg Continuum.

Figure 124A:
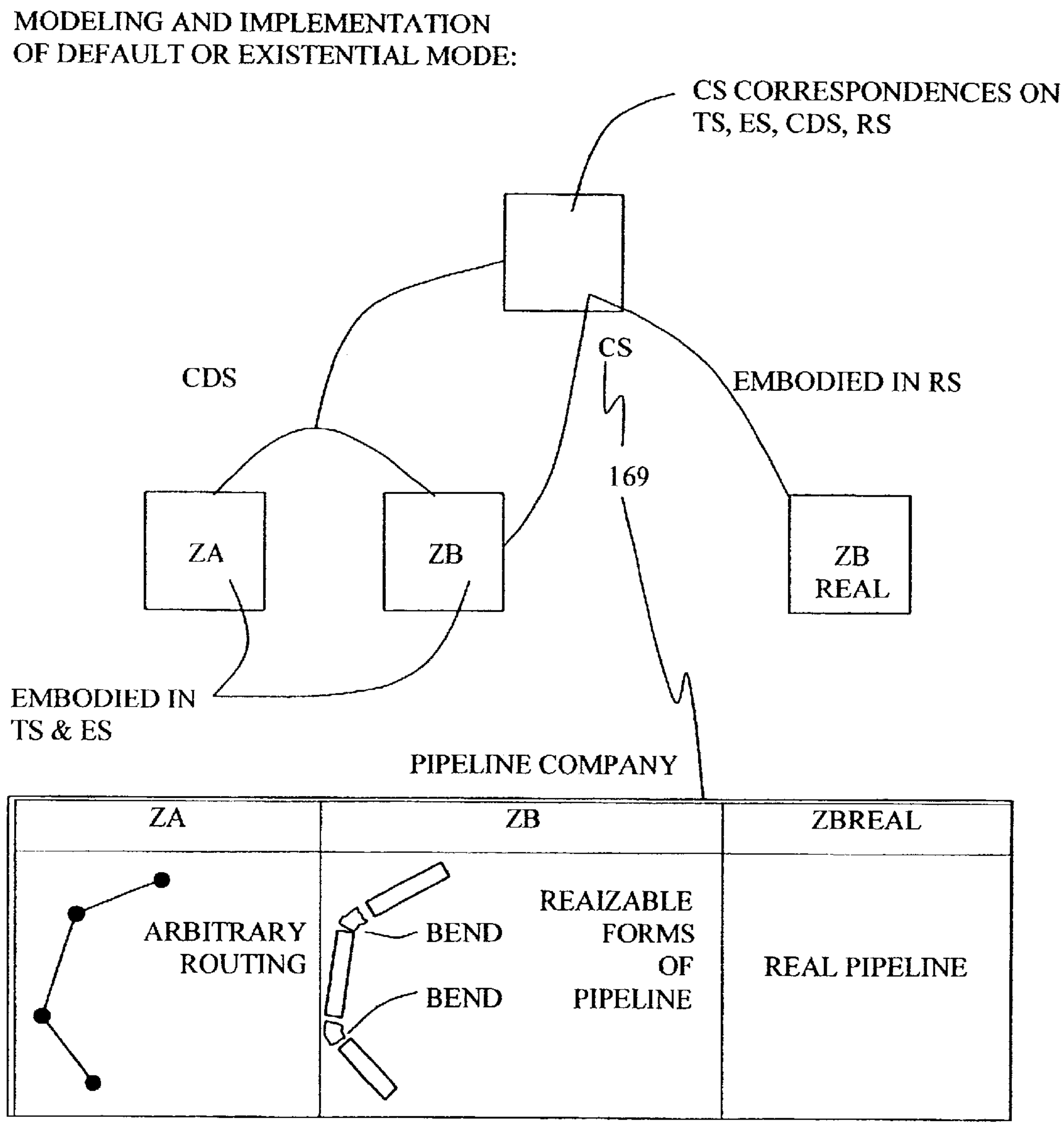

FIG. 124*a* shows modeling and implementation in electronics, computers and communications media as institutions.

FIG. 124*b* is a table of institutional forms realized in modeling and implementation of default mode in electronics, computers and communications media.

Figure 125:
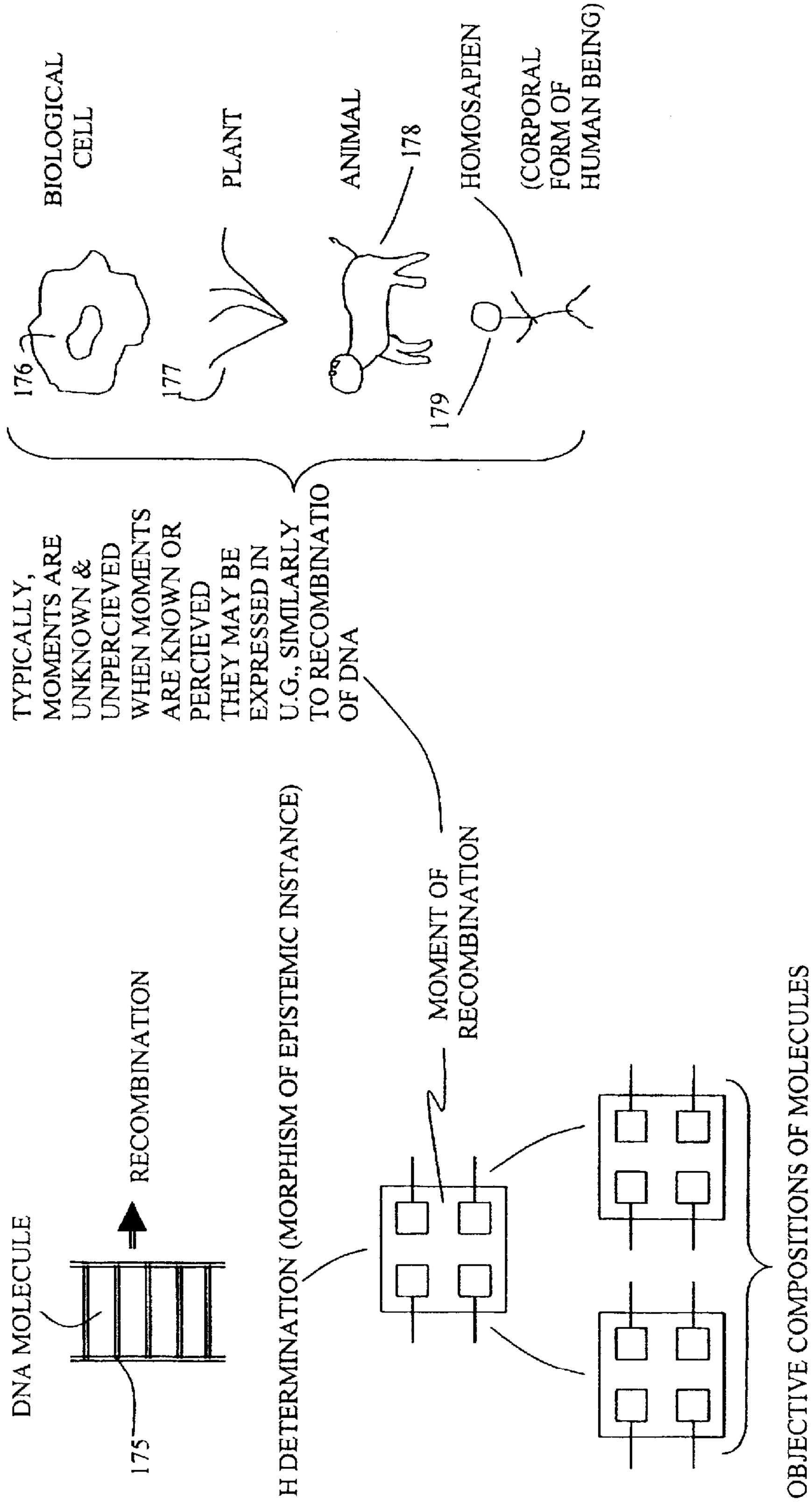

FIG. 125 shows biologically living forms as constructions of the U. G.

Figure 126:
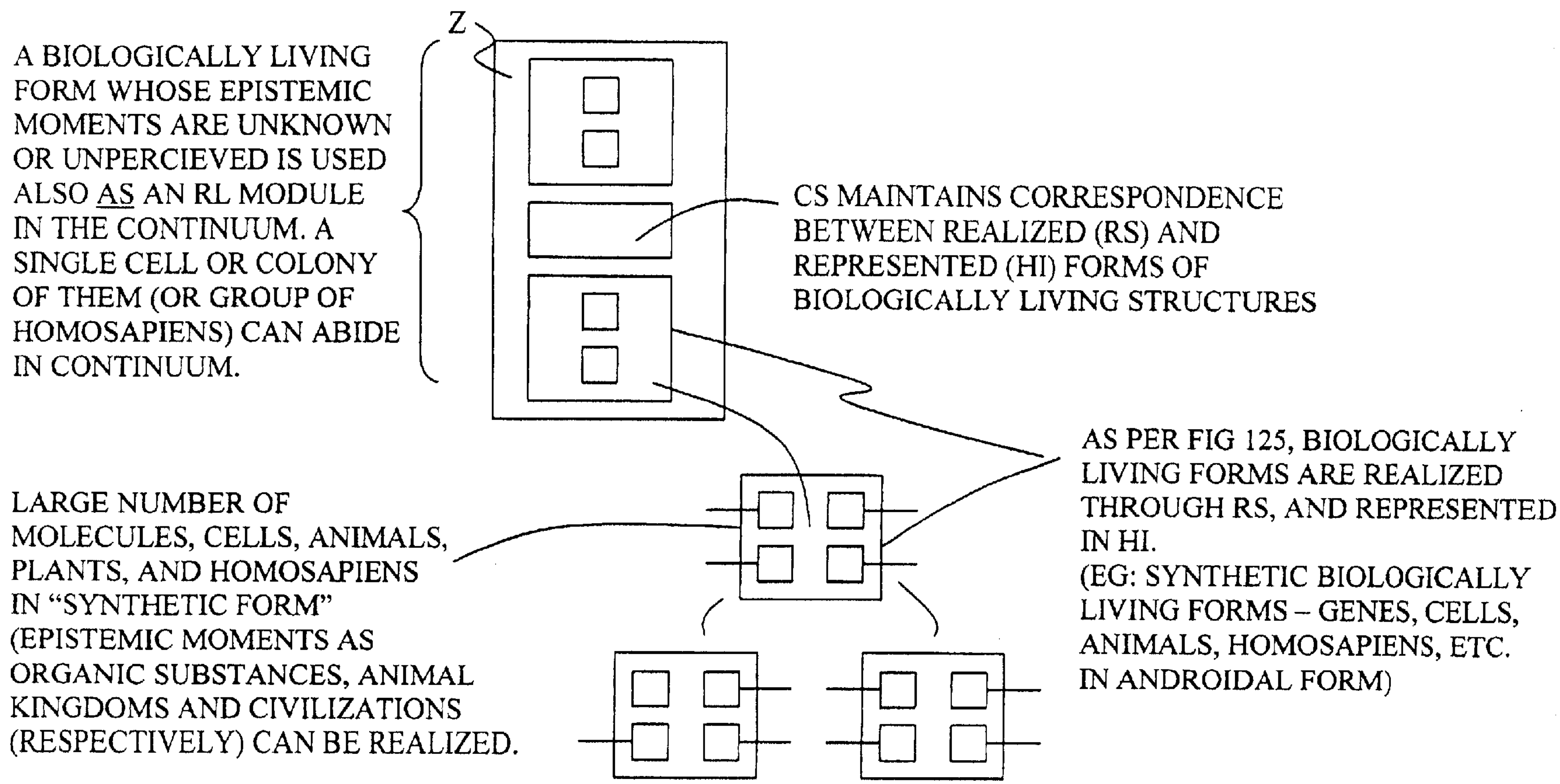

FIG. 126 shows biologically living forms as realizations of RS and enabling media of Rg.

Figure 127:
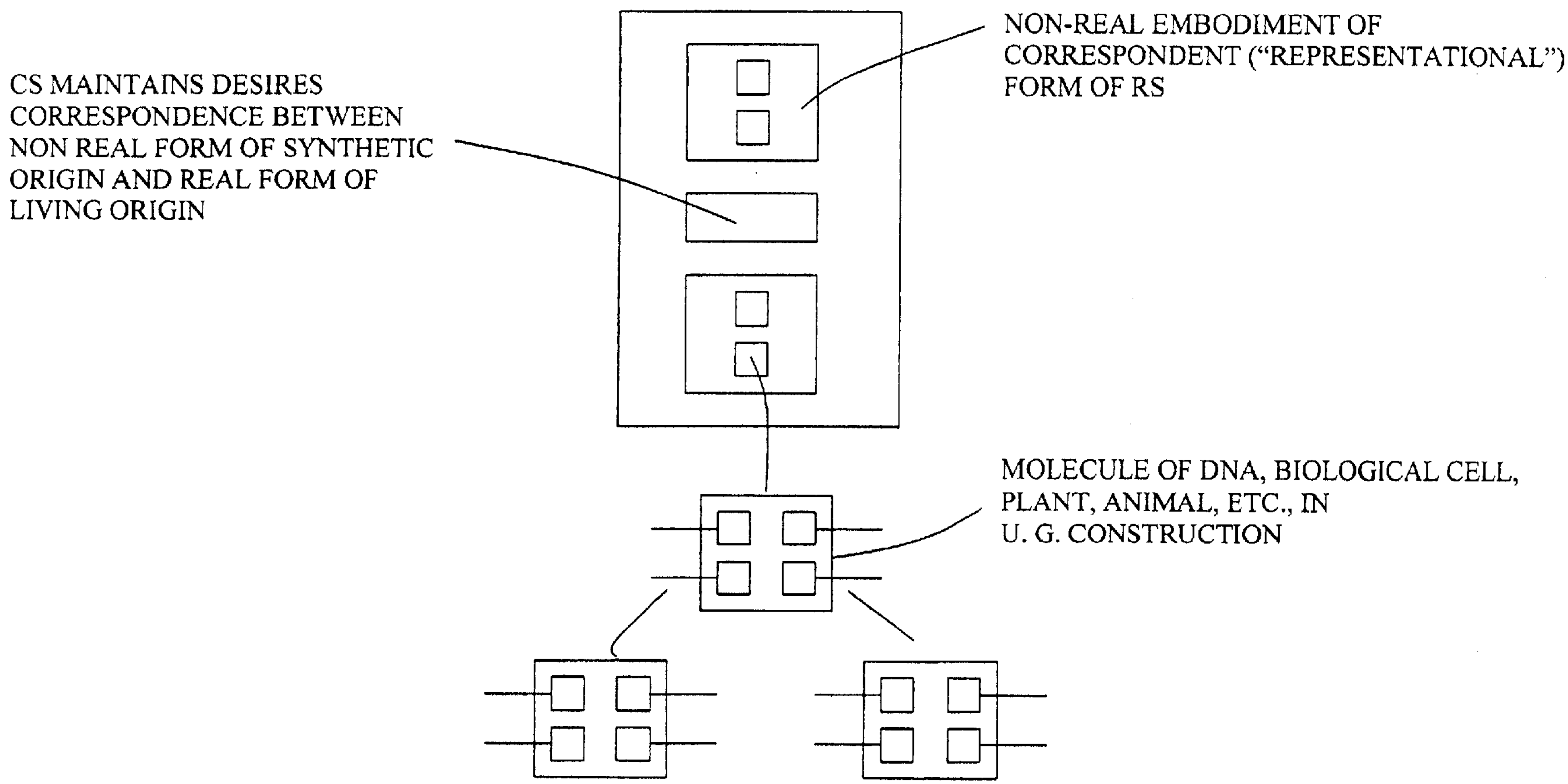

FIG. 127 shows a synthetic consciousness imparted to a "natural" real form.

Figure 131:
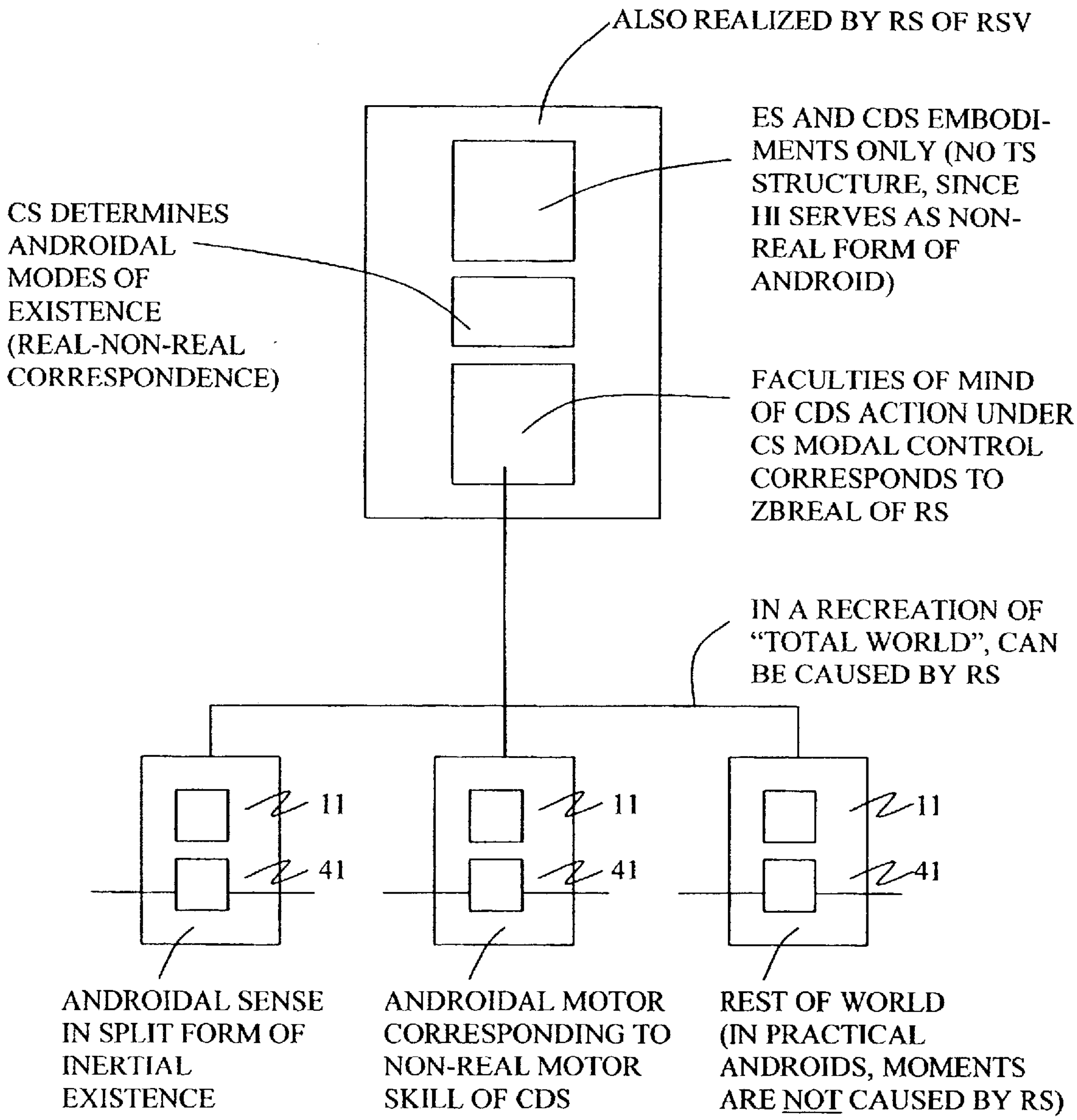

FIG. 131 shows the modifications to an Rsv Module resulting in the form of android.

Figure 132:
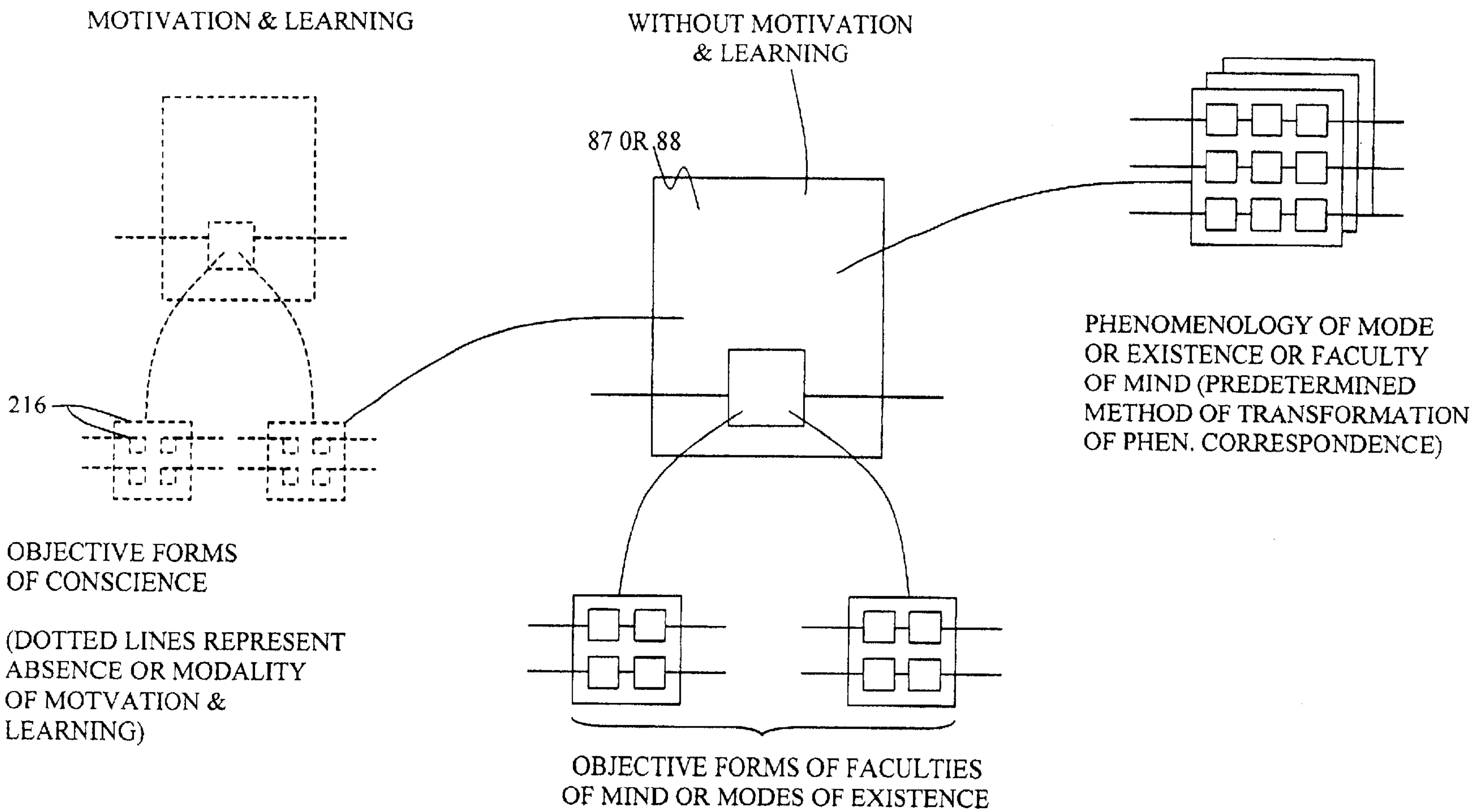

FIG. 132 shows modes of existence or faculties of mind without conscience and motivation and Learning.

Figure 133:
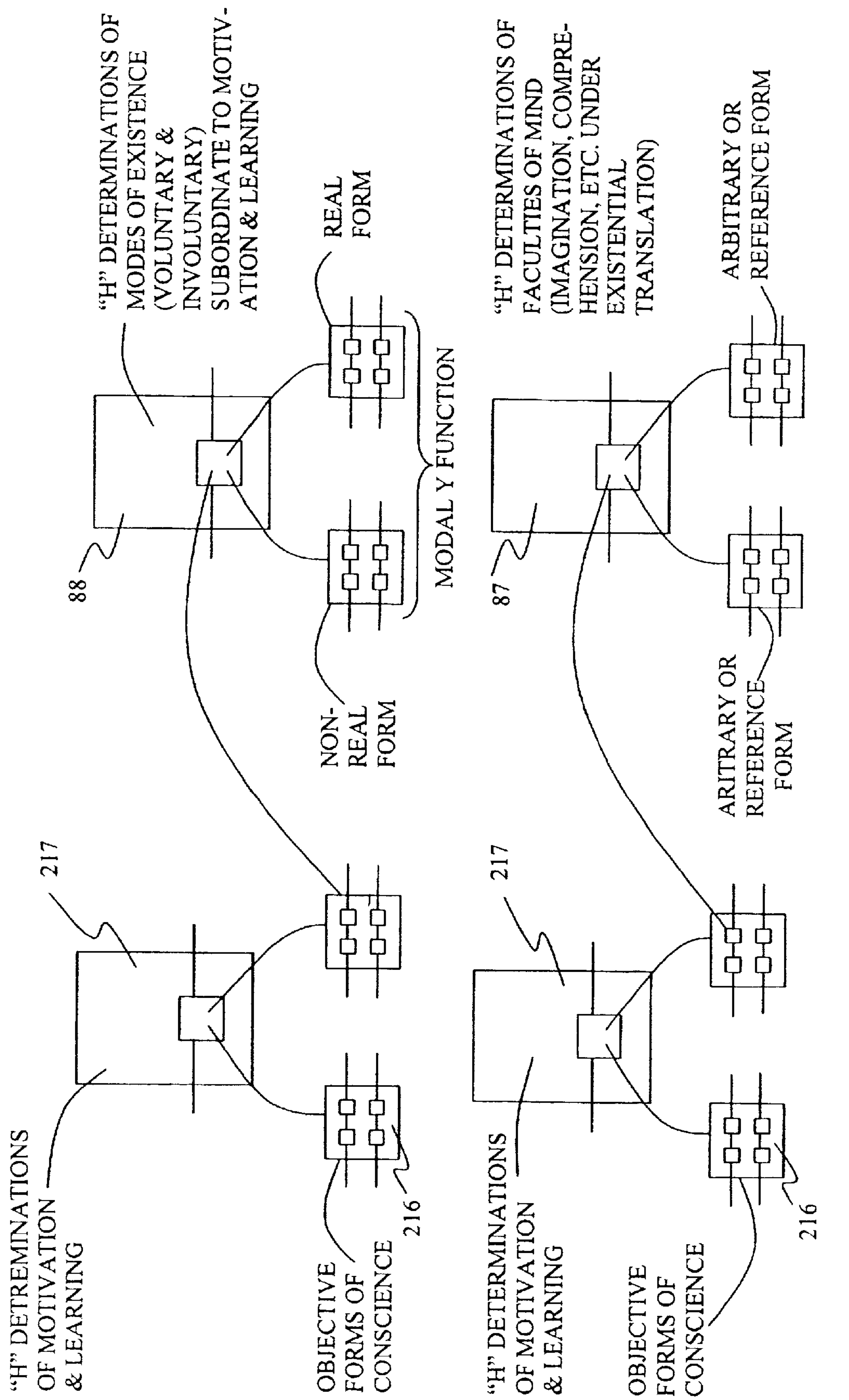

FIG. 133 shows the structure of android with conscience under motivation and learning.

Figure 134:
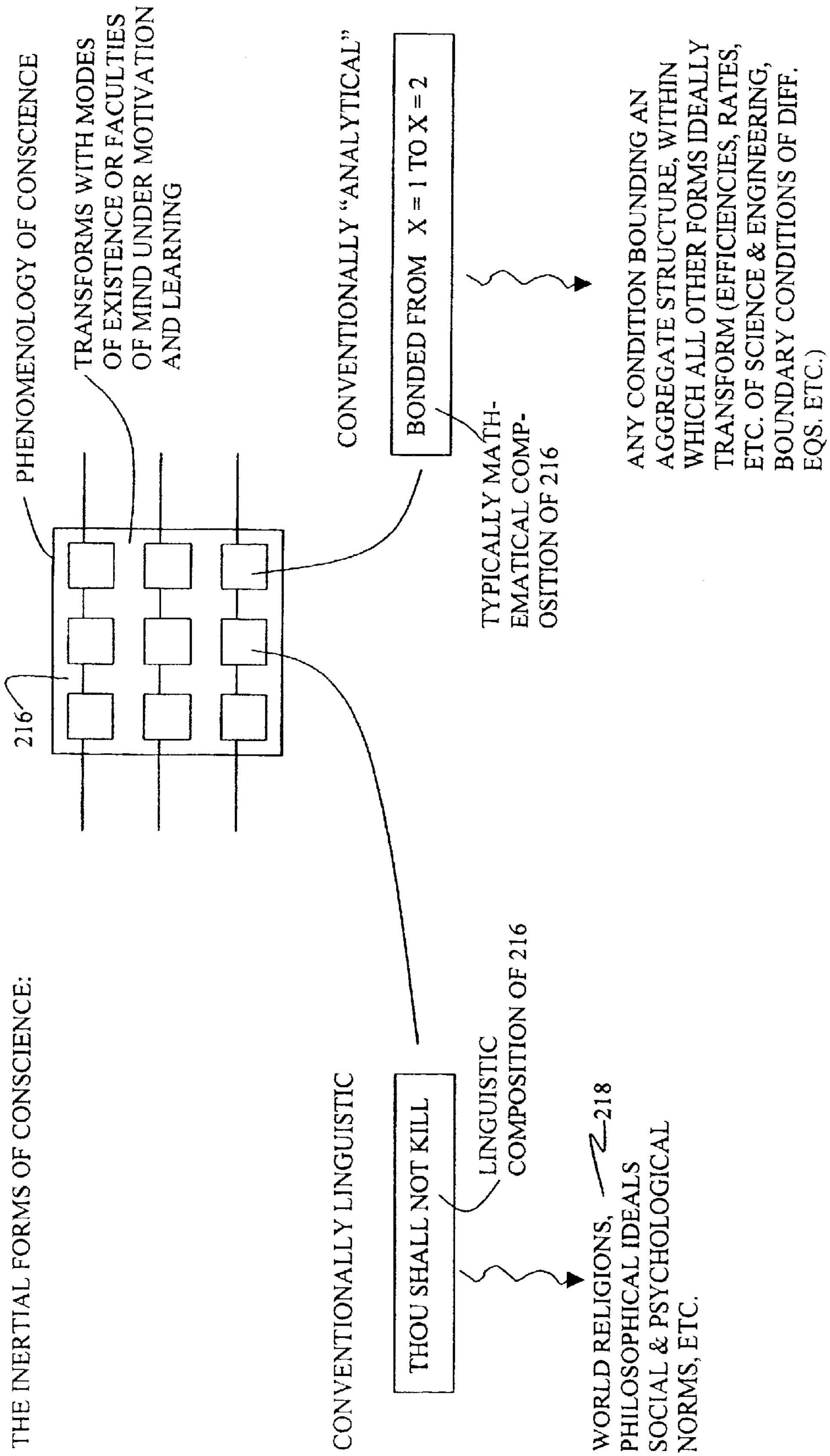

FIG. 134 illustrates the objective forms of conscience.

Figure 135:
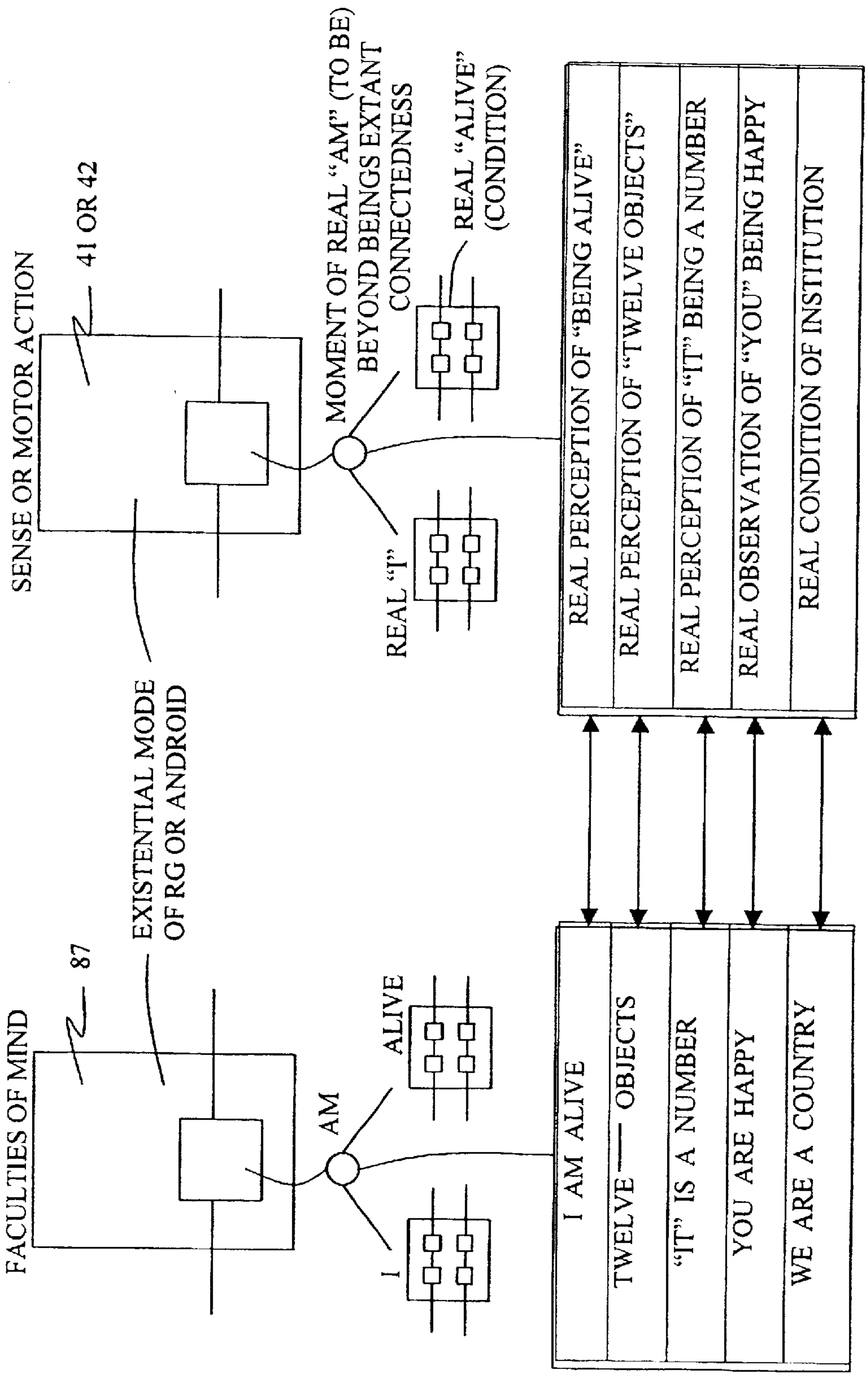

FIG. 135 shows the extant transformational moments of android as inertial forms on being (e.g., natural language meanings supporting, existentially, the meanings of all other languages).

Figure 136:
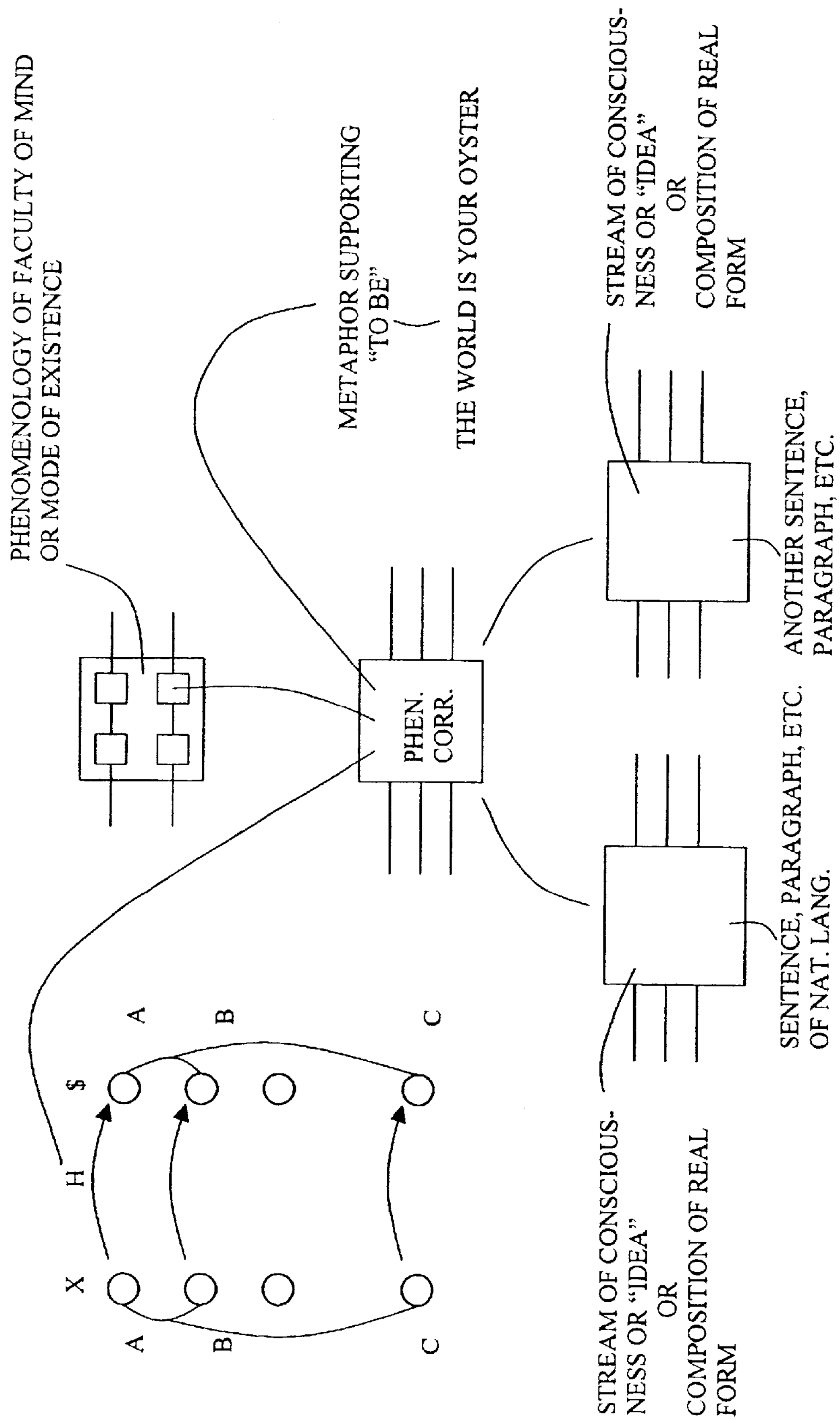

FIG. 136 shows the extant moments of inertial forms on being enabled by phenomenological correspondence.

Figure 137:
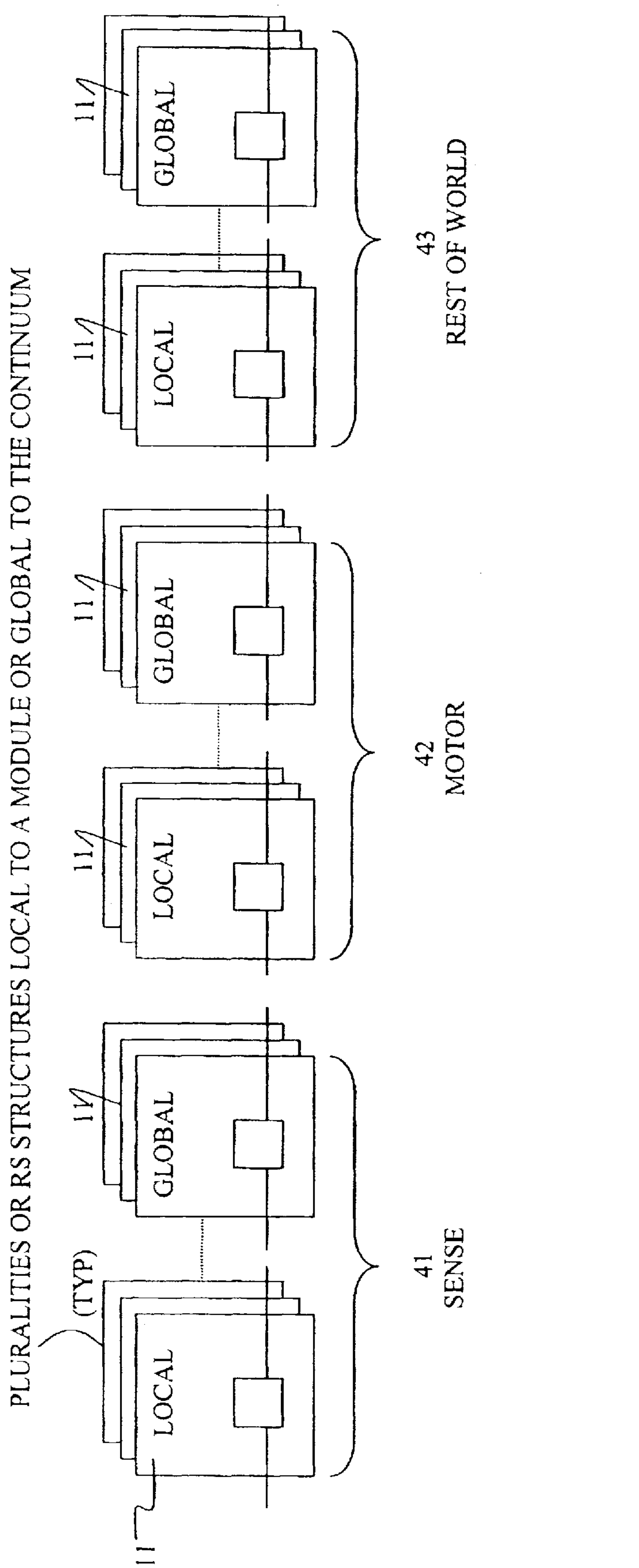

FIG. 137 shows the Rg configuration of real form (or non-real form) of android.

Figure 138:
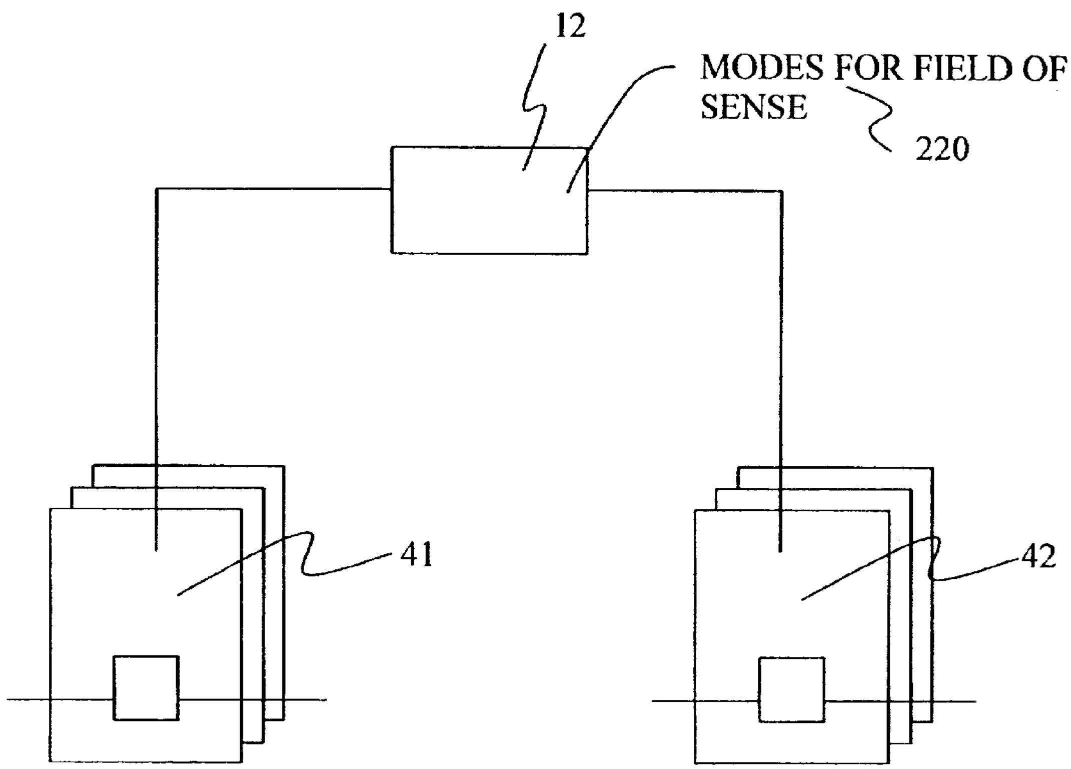

FIG. 138 shows modes of existence for fields of sensory perception.

Figure 139:
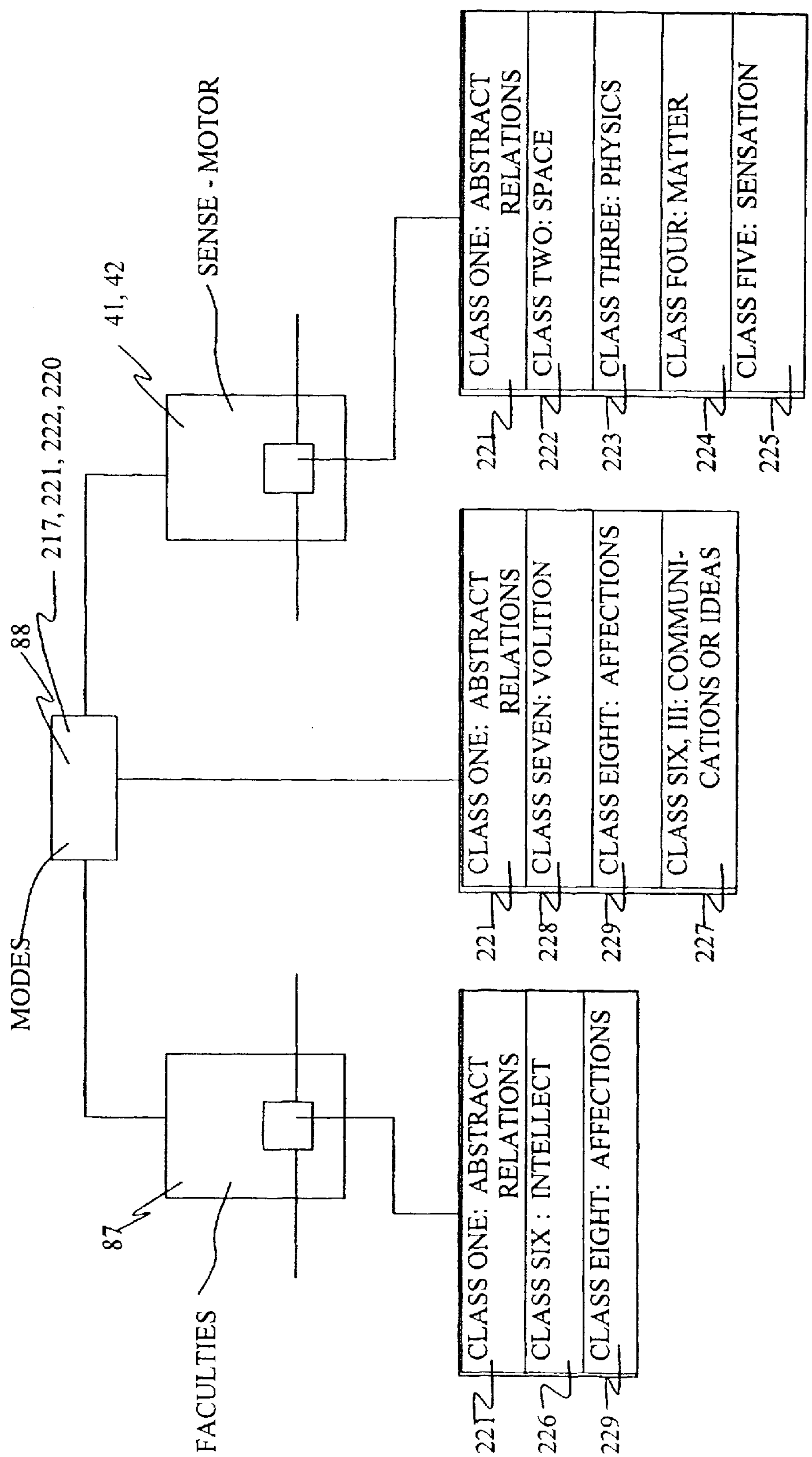

FIG. 139 shows Roget's classification of word forms for correspondences of android and existential mode of Rg in English language translations.

Figure 140:
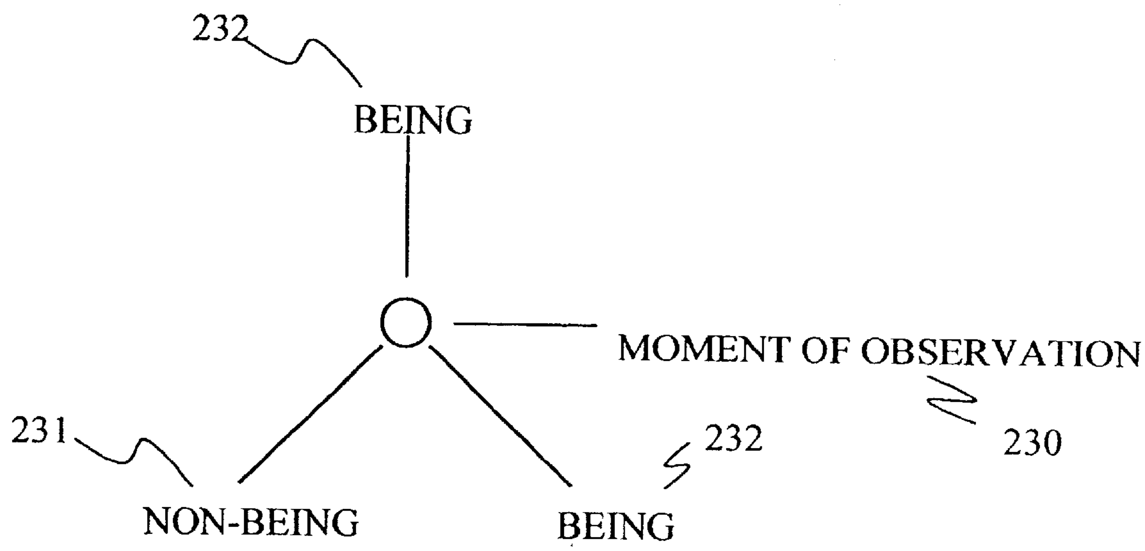

FIG. 140 shows a symbolic representation of a state of being, or soul.

FIG. 141 shows a symbolic representation of epistemic instance.

Figure 142:
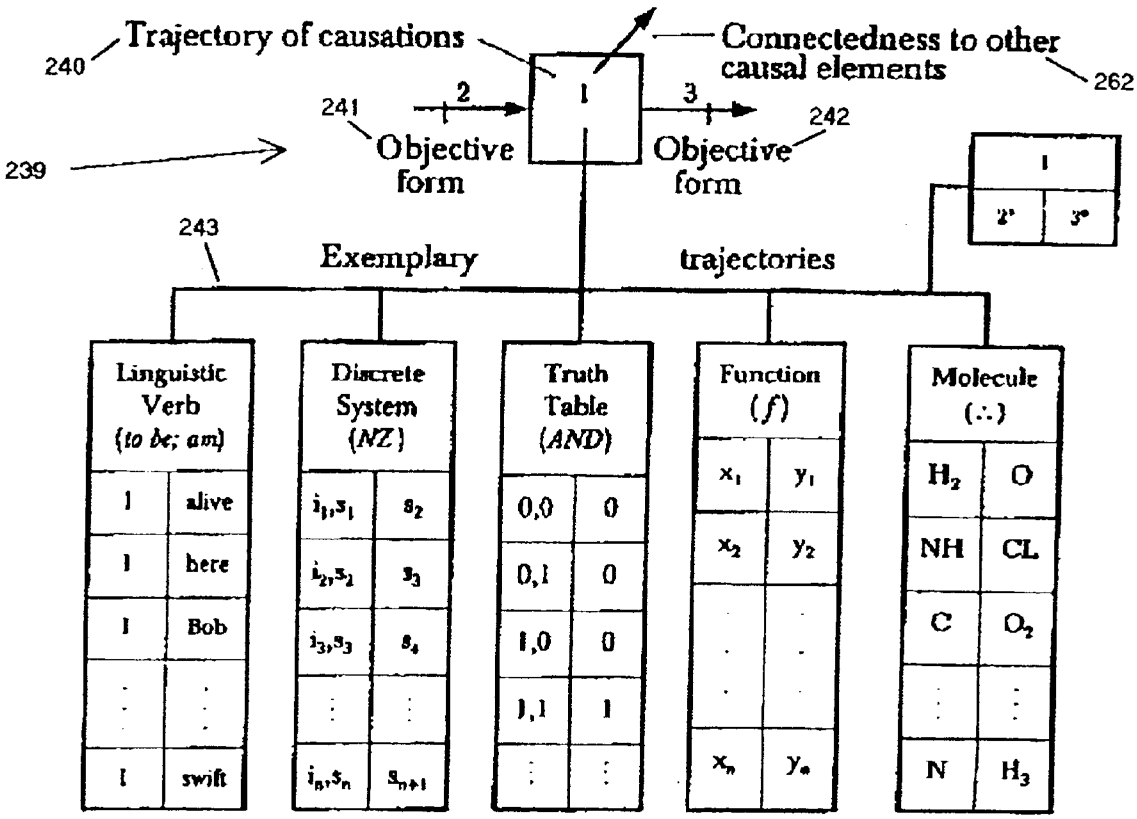

FIG. 142 shows a symbolic representation of the causal element of causation.

Figure 143:
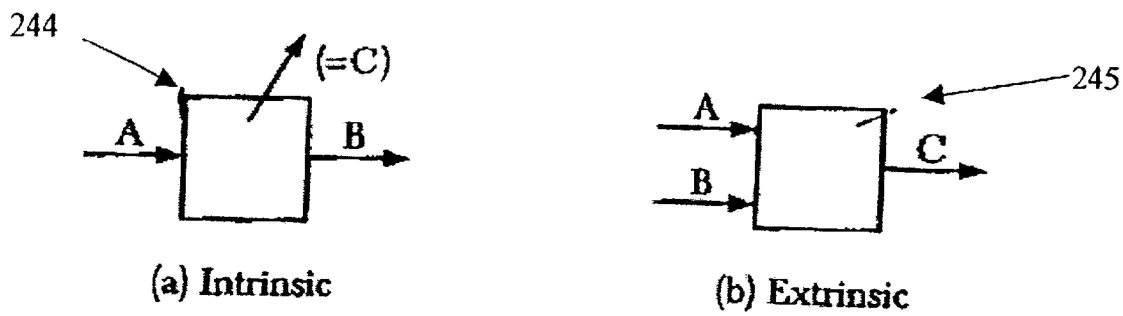

FIG. 143 shows a symbolic representation of intrinsic and extrinsic causal elements.

FIG. 144 shows a symbolic representation of the causal element of connectedness.

Figure 145:
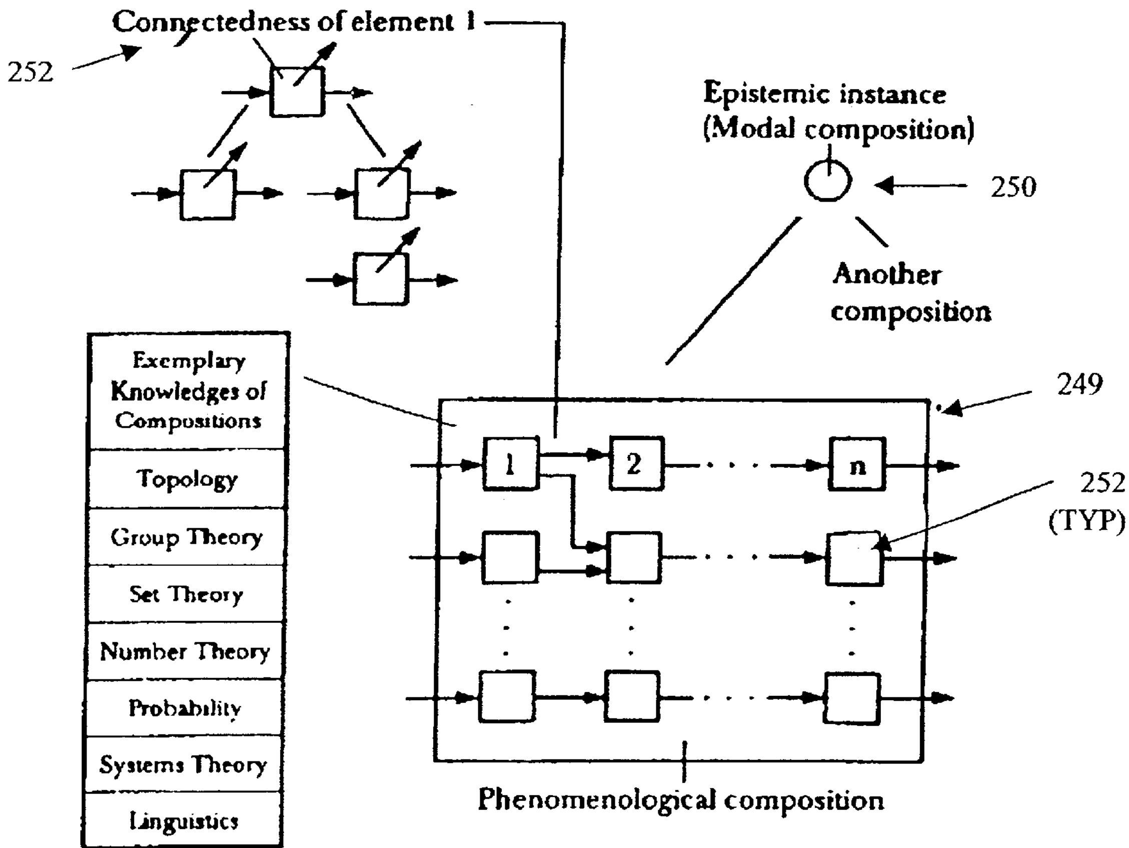

FIG. 145 shows a symbolic representation of phenomenological composition.

Figure 146:
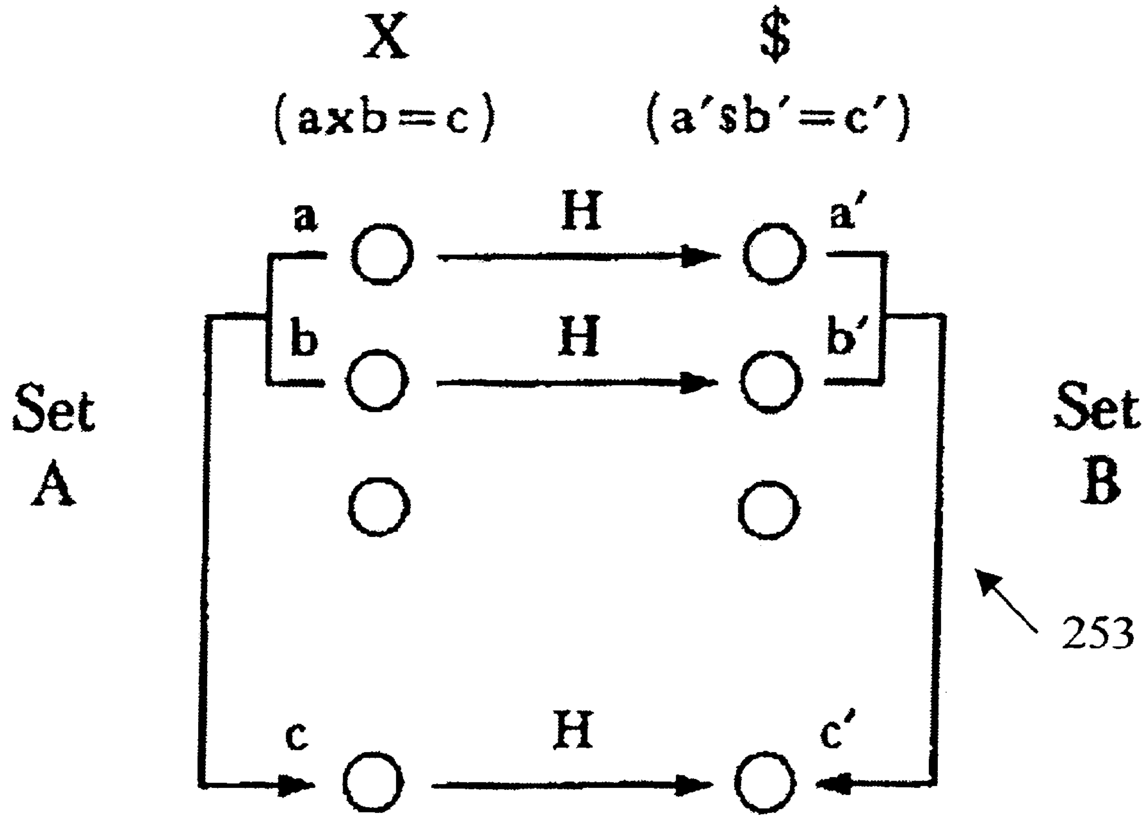

FIG. 146 shows a symbolic representation of a mathematical morphism.

FIG. 147 shows a symbolic representation of phenomenological correspondence.

Figure 148:
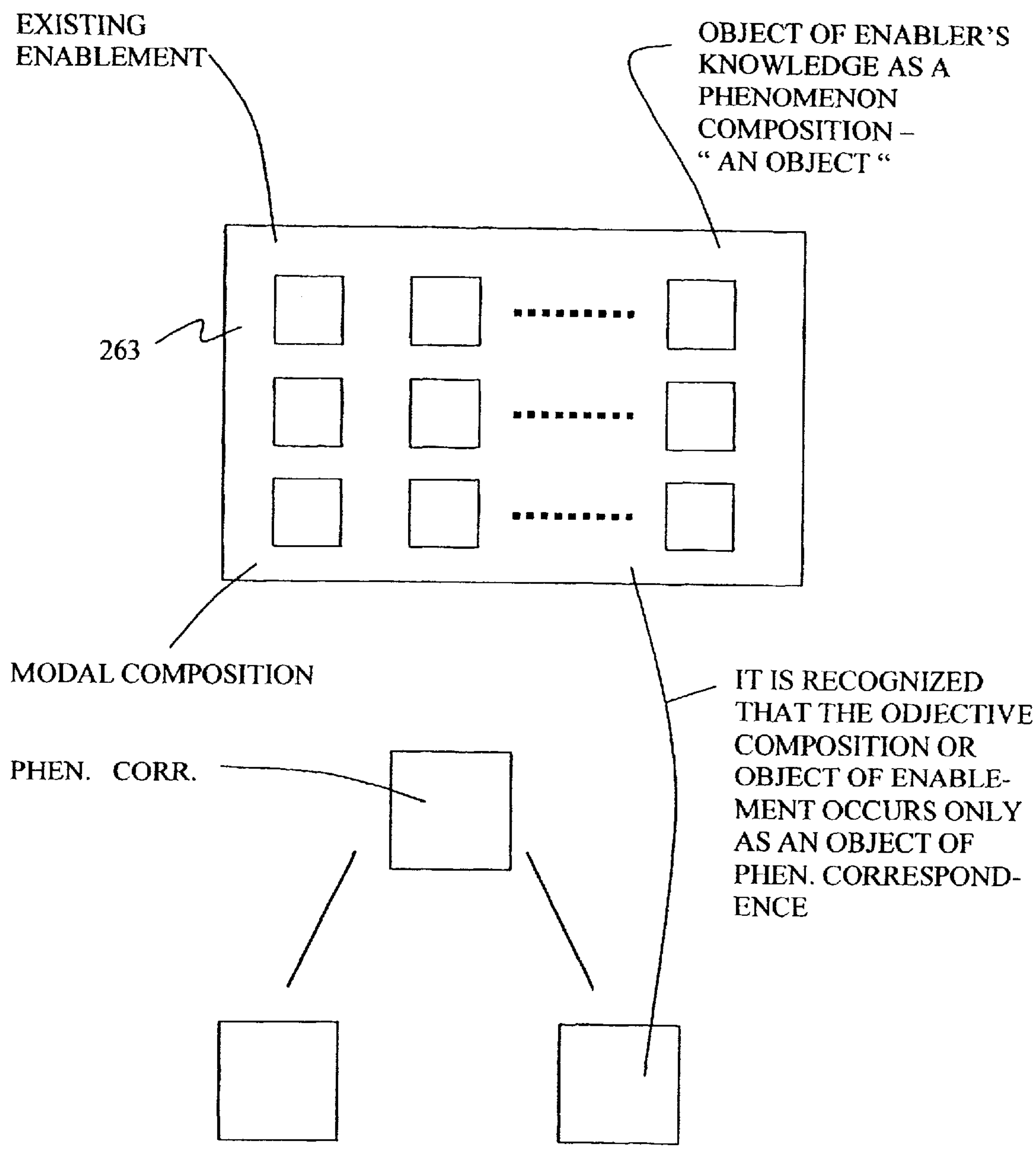

FIG. 148 shows a symbolic representation of the existential form of enablement.

Figure 149:
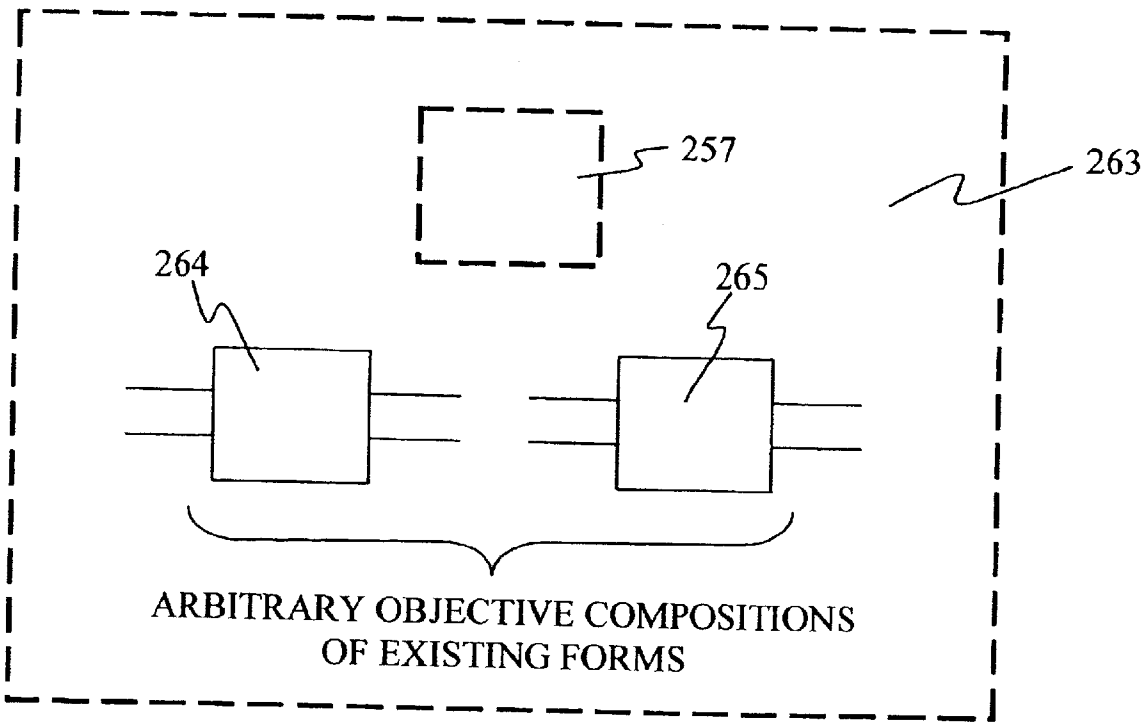

FIG. 149 shows a symbolic representation of the existential forms of non-real and real form.

Figure 150:
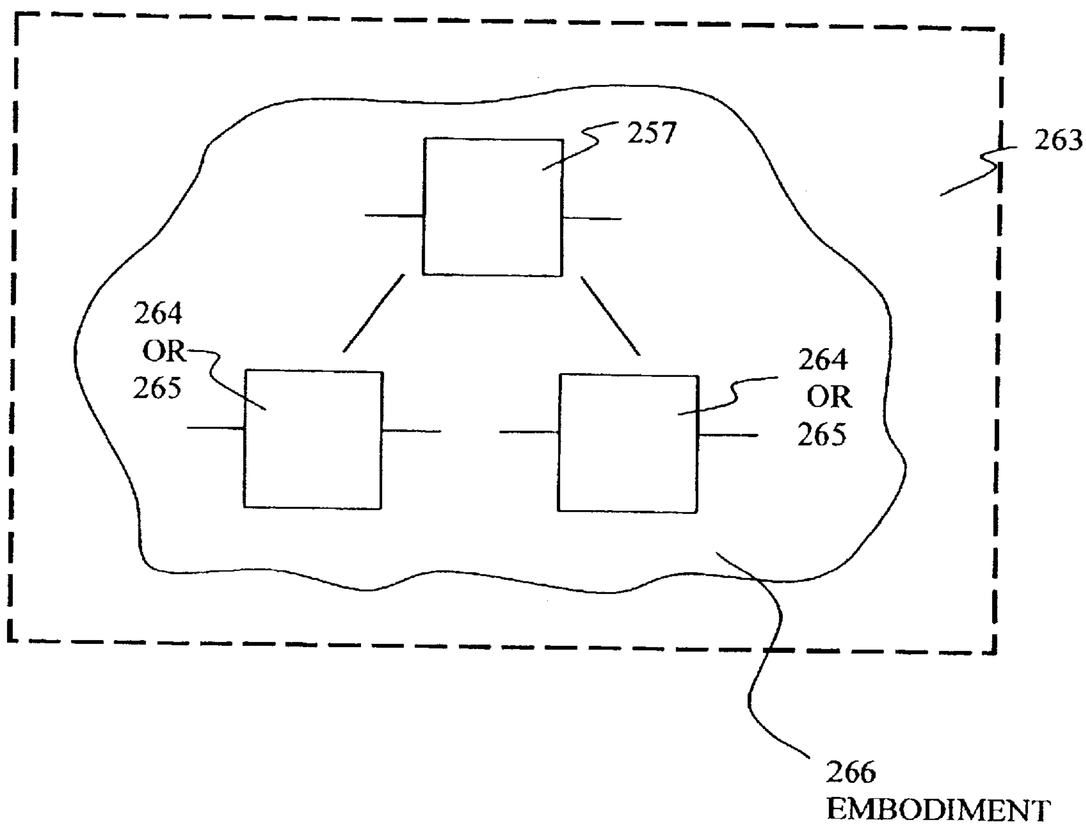

FIG. 150 shows a symbolic representation of embodiment.

Figure 151:
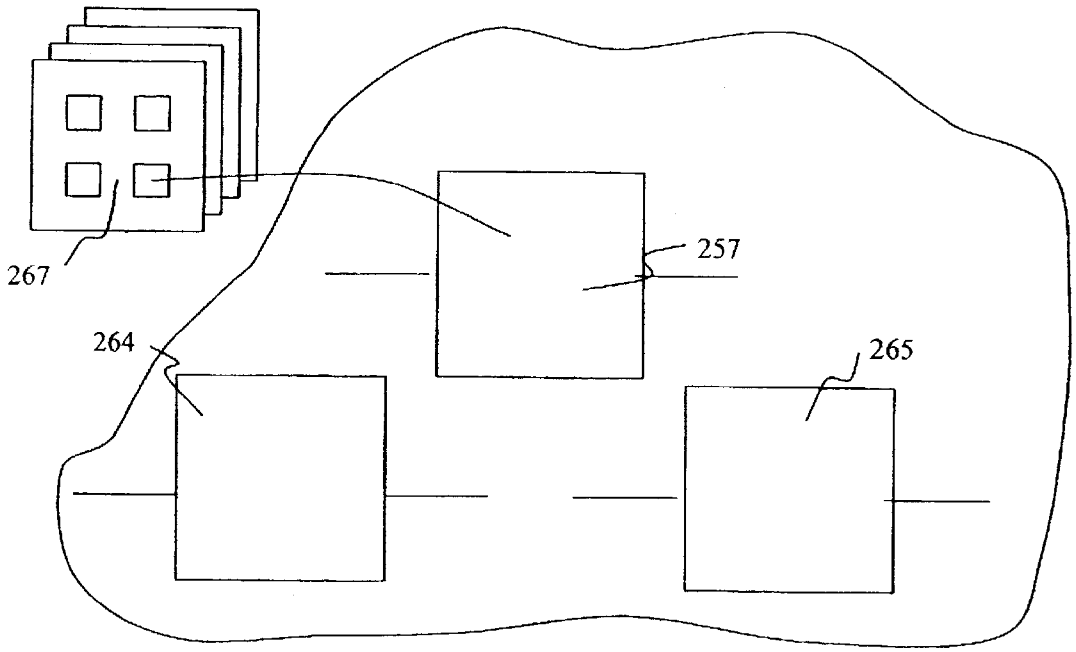

FIG. 151 shows a symbolic representation of the modes of existence.

Figure 152:
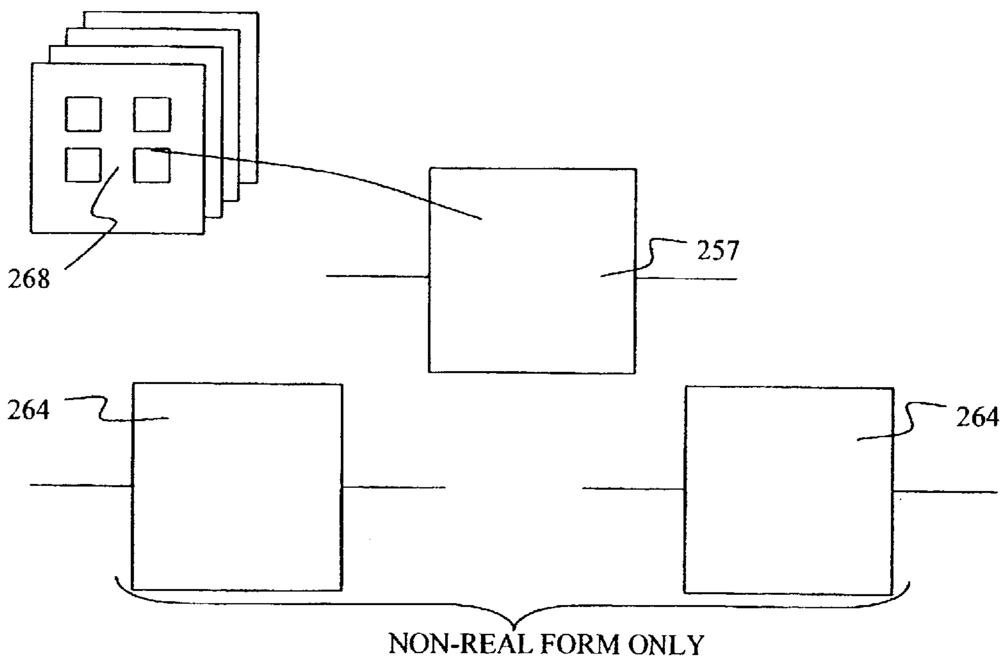

FIG. 152 shows a symbolic representation of the faculties of mind.

Figure 153:
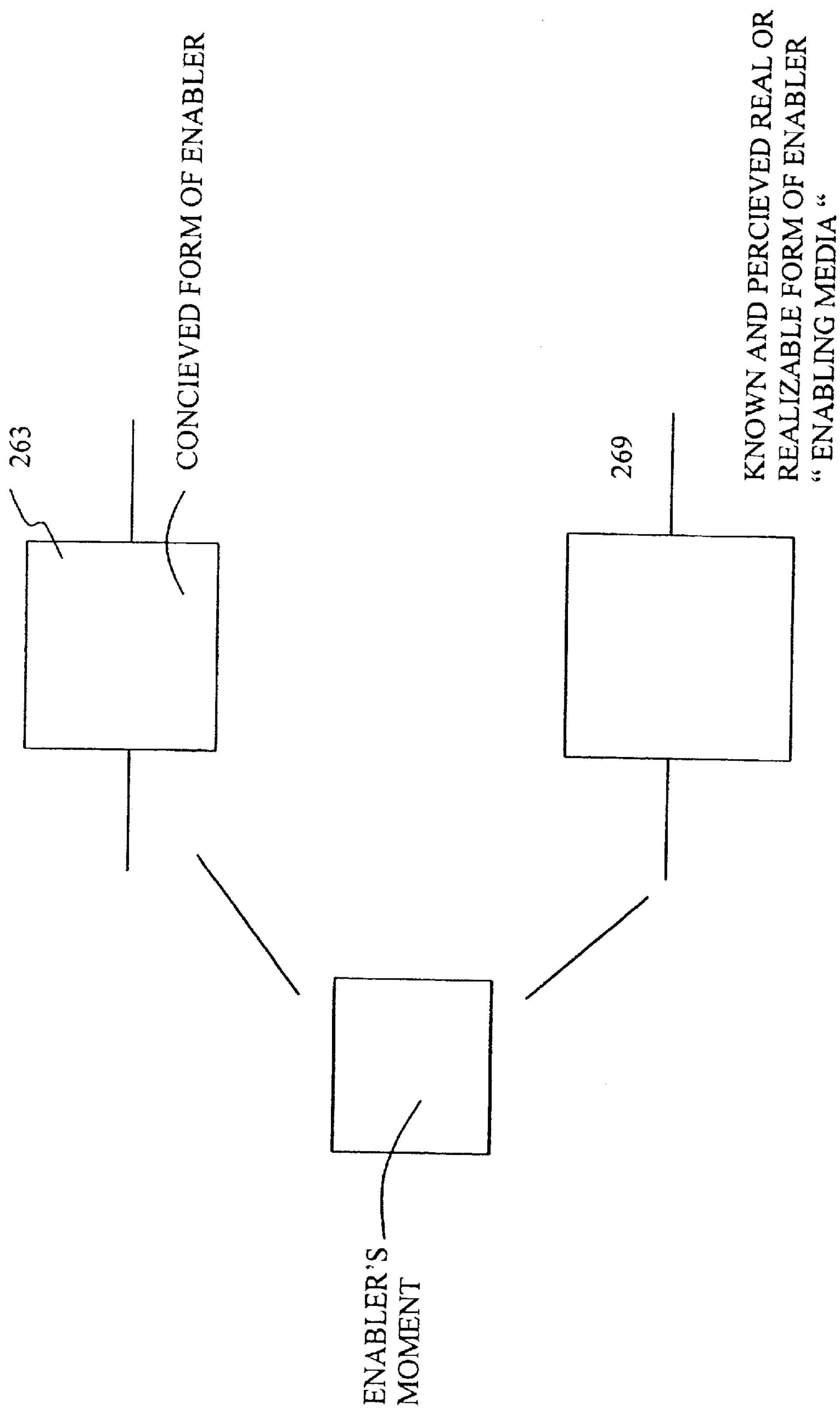

FIG. 153 shows a symbolic representation of enabling media.

Figure 154:
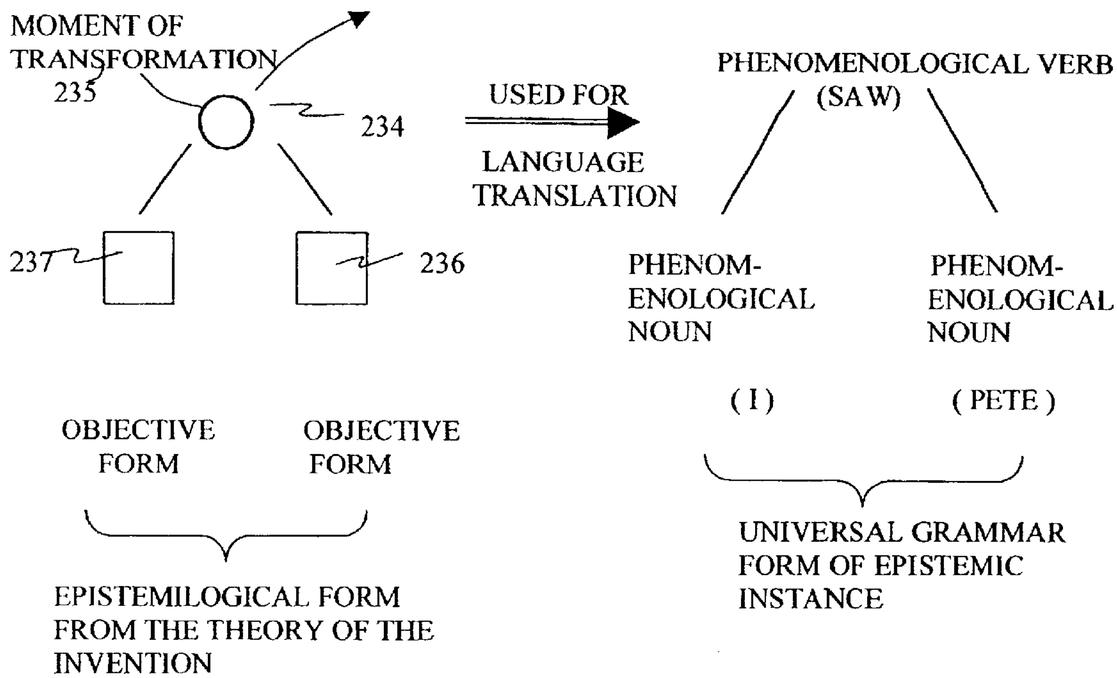

FIG. 154 shows the use of epistemic instance in arbitrary translations of arbitrary source and target language constructions.

Figure 155:
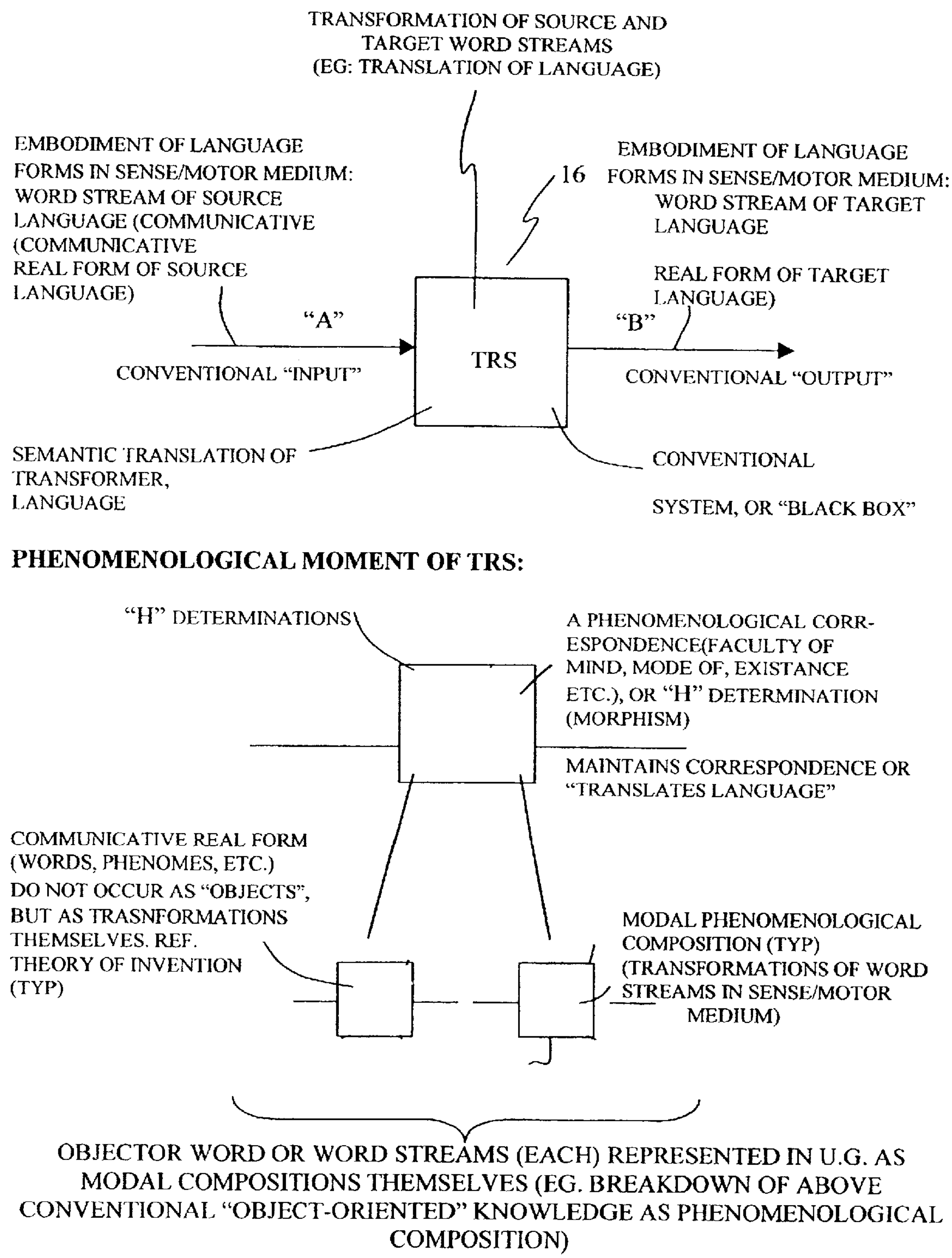
Figure 155:
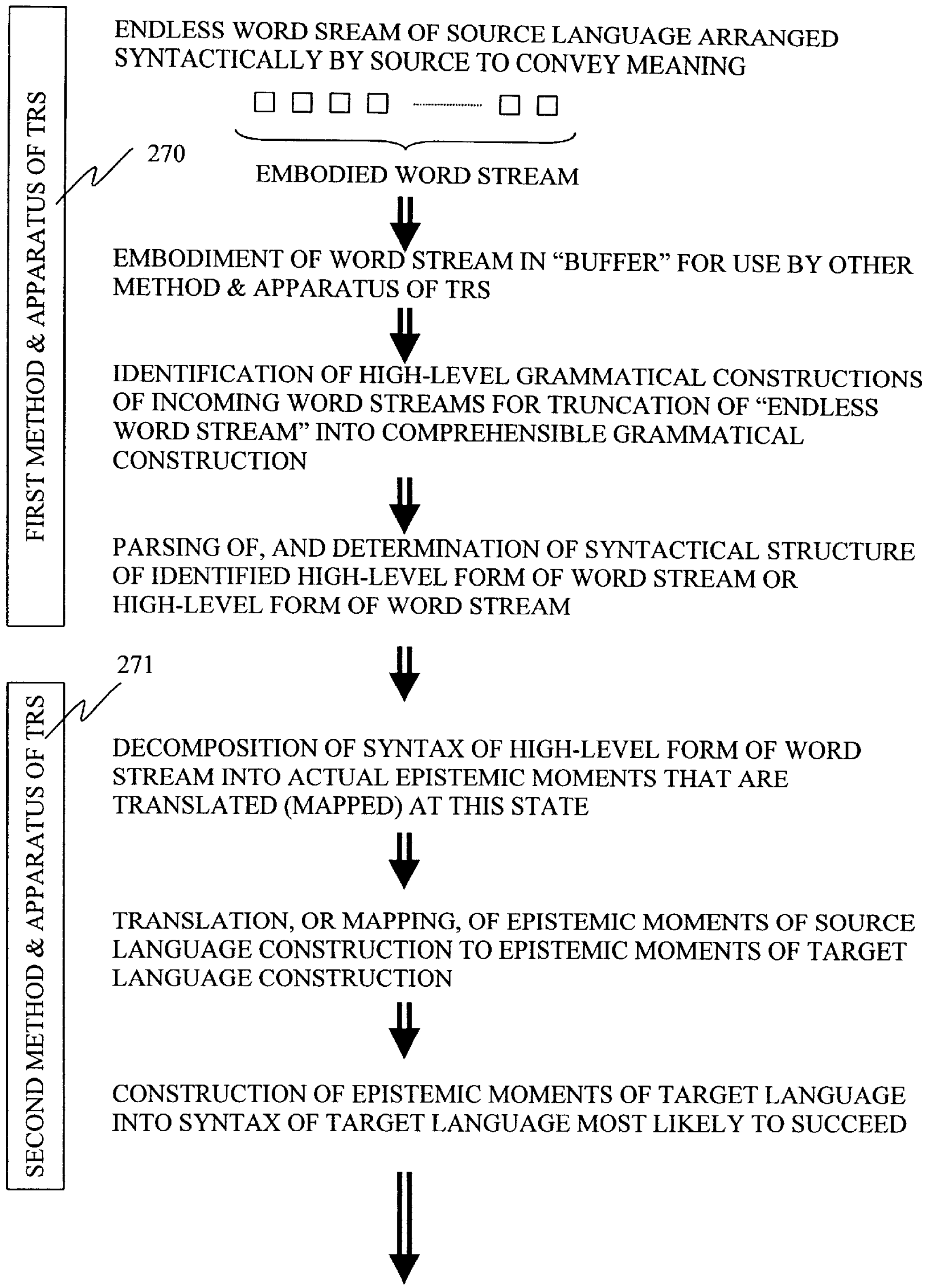
Figure 155:
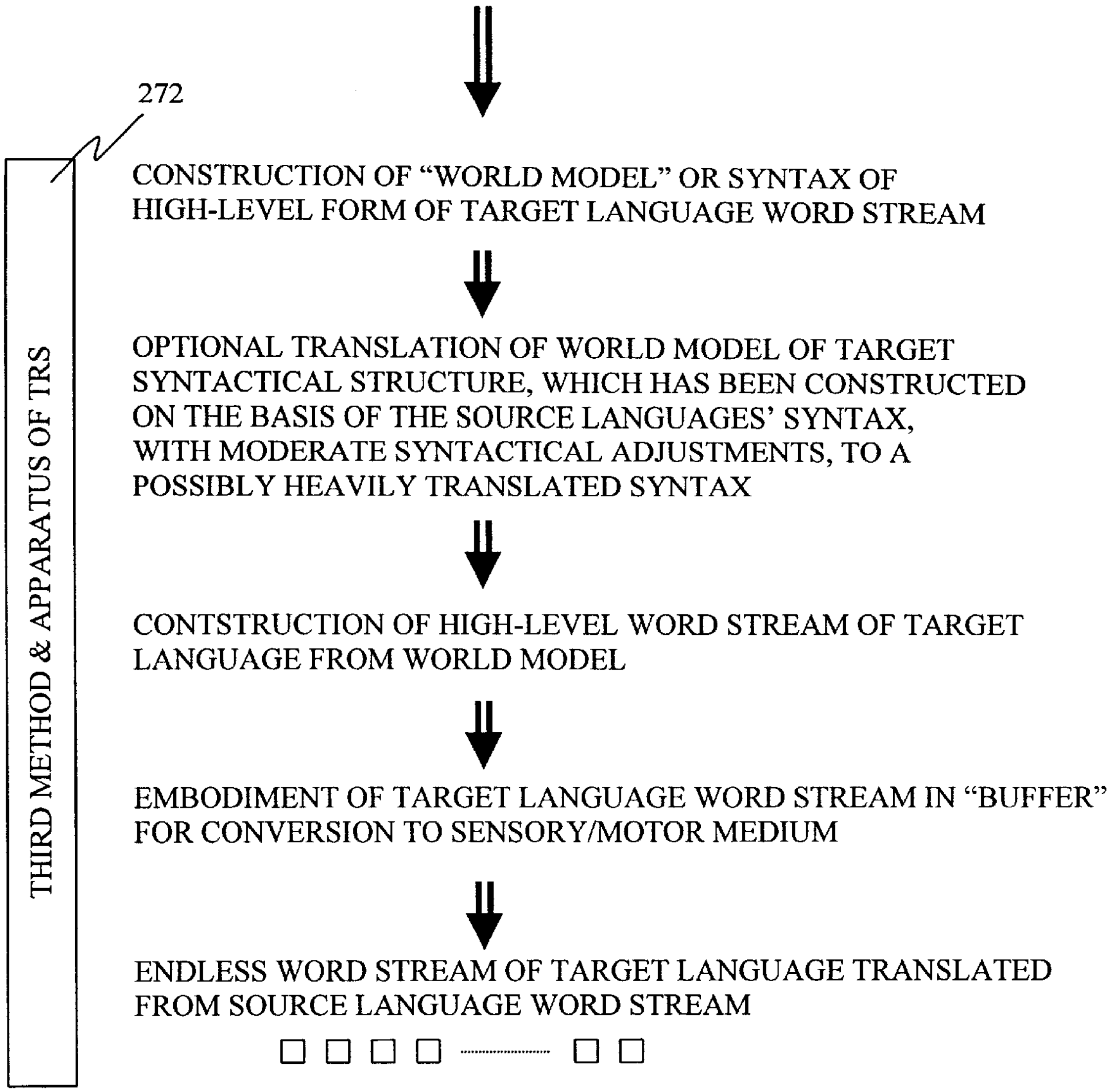

FIG. 155 shows an overview of the TRS in U. G. construction and as a conventional black box, or system, along with an overview of the principal methods and apparatus of the TRS.

Figure 156:
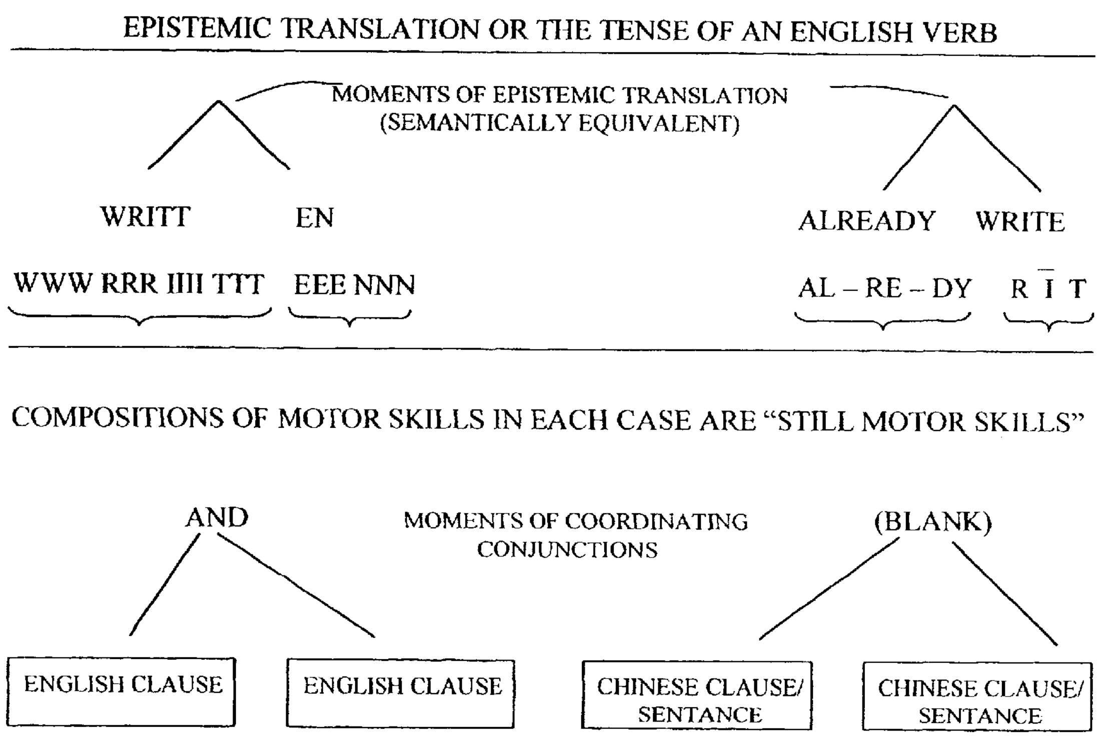
Figure 156:

FIG. 156 shows the application of the general method of the TRS to the translation of arbitrary moments of source and target languages.

Figure 157:
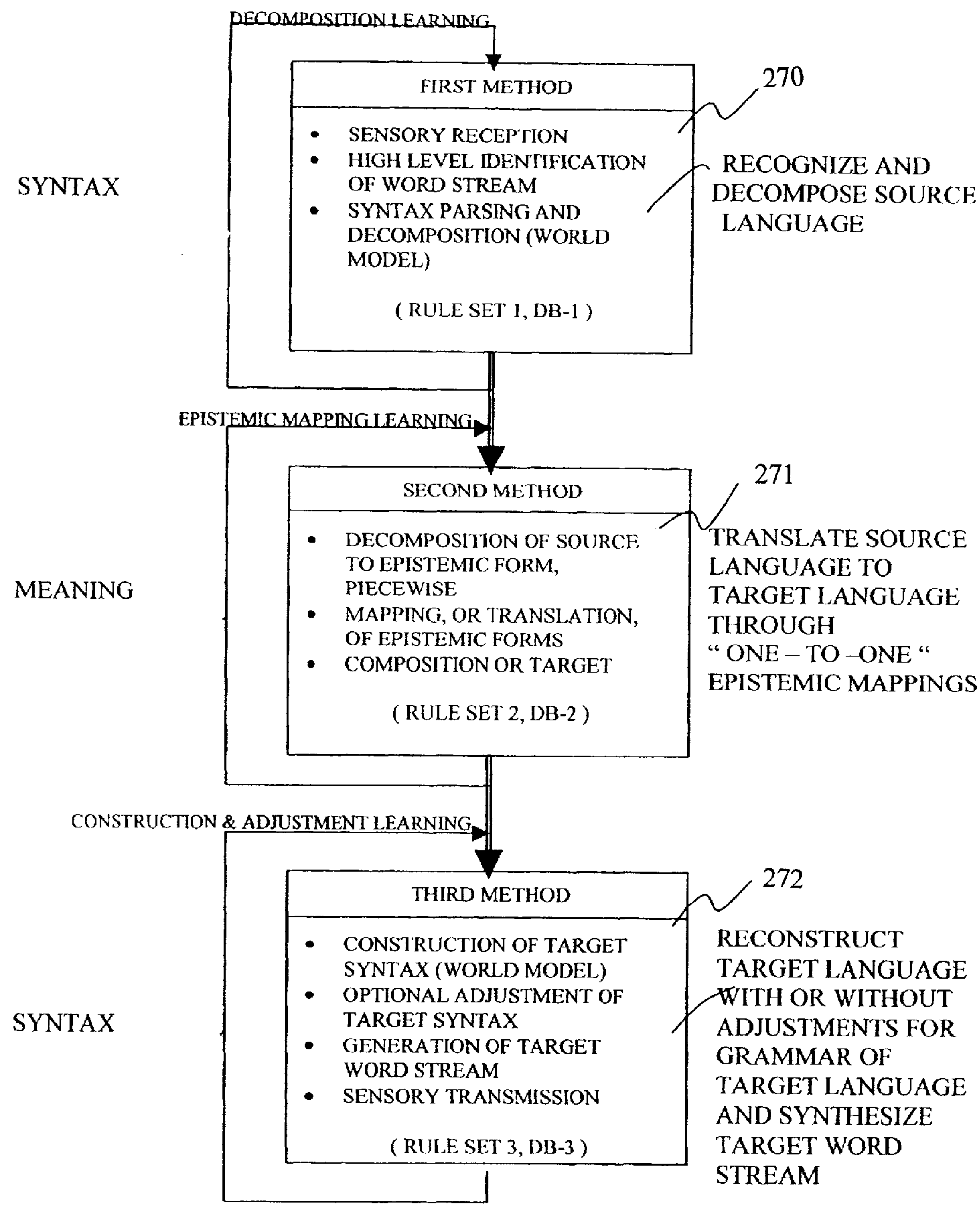

FIG. 157 is a summary of the general translation method of the TRS.

Figure 158:
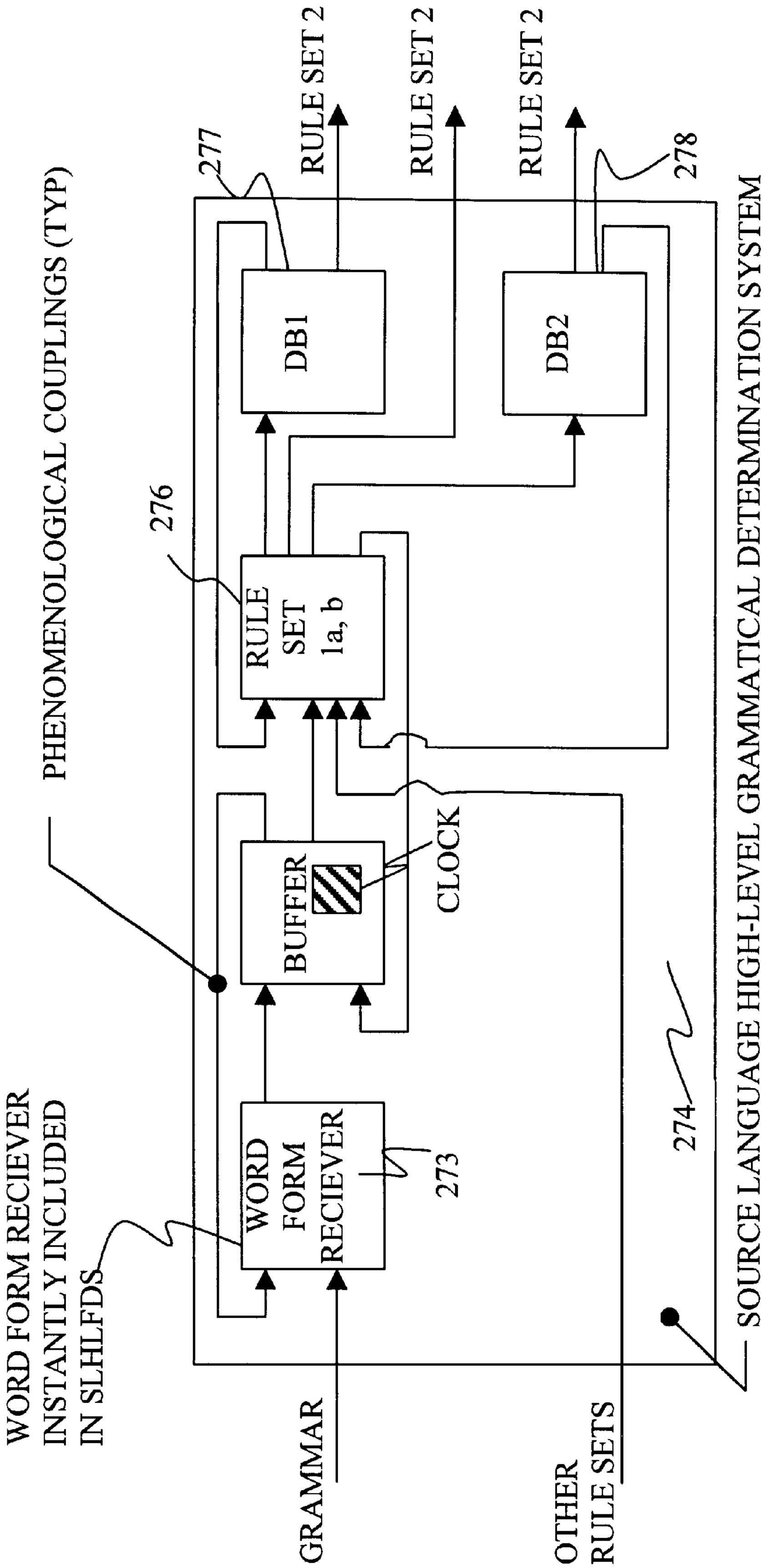
Figure 158:
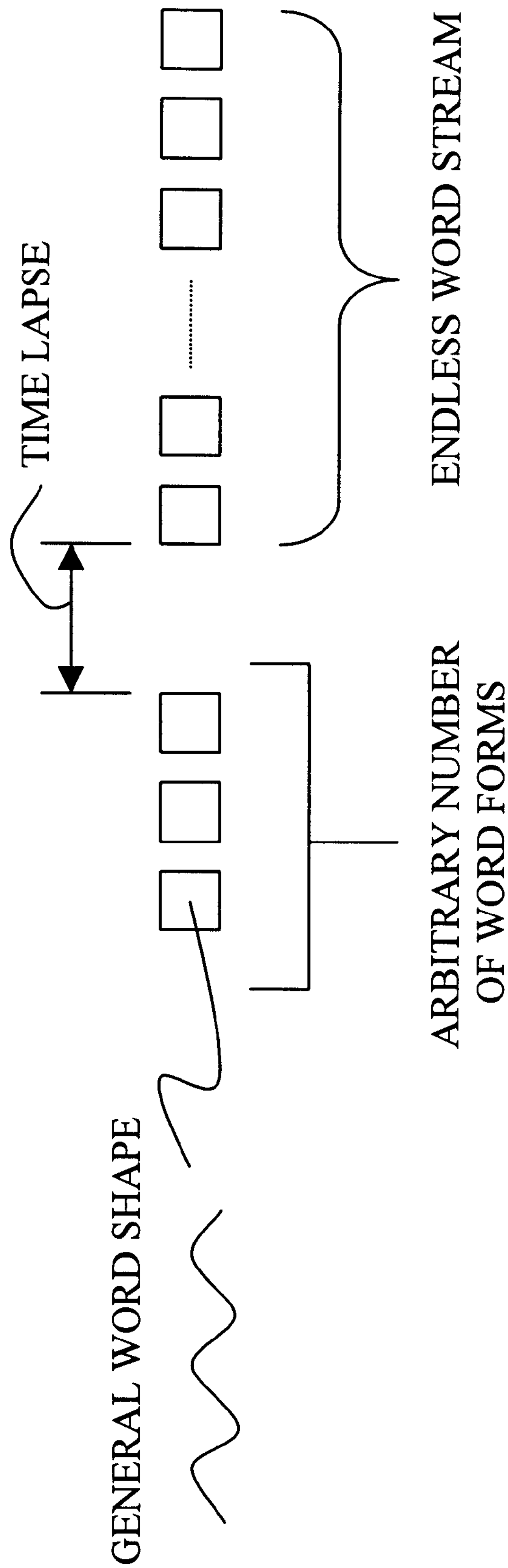

FIG. 158 shows the Source Language High-Level Grammatical Determination System of TRS.

Figure 159:
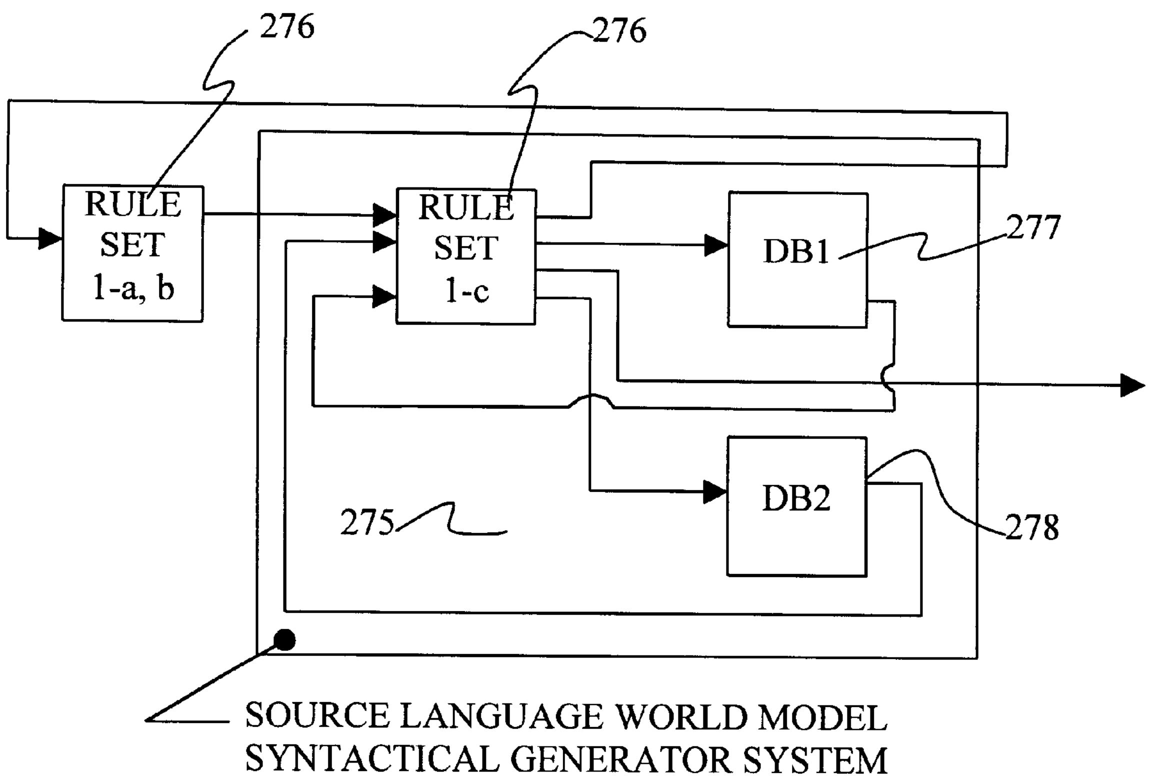

FIG. 159 shows the Source Language World Model Syntactical Generator System of TRS.

Figure 160:
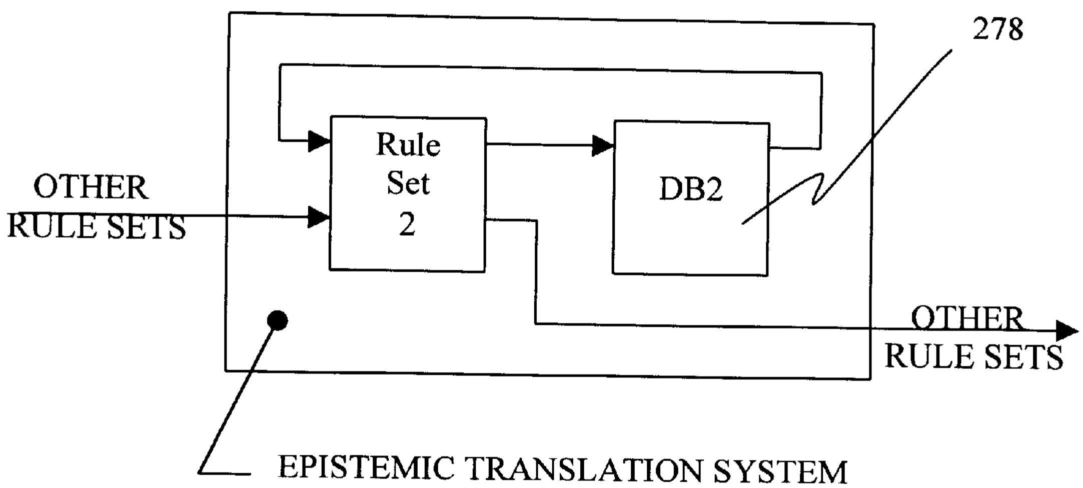

FIG. 160 shows the Epistemic Translation System of TRS.

Figure 161:
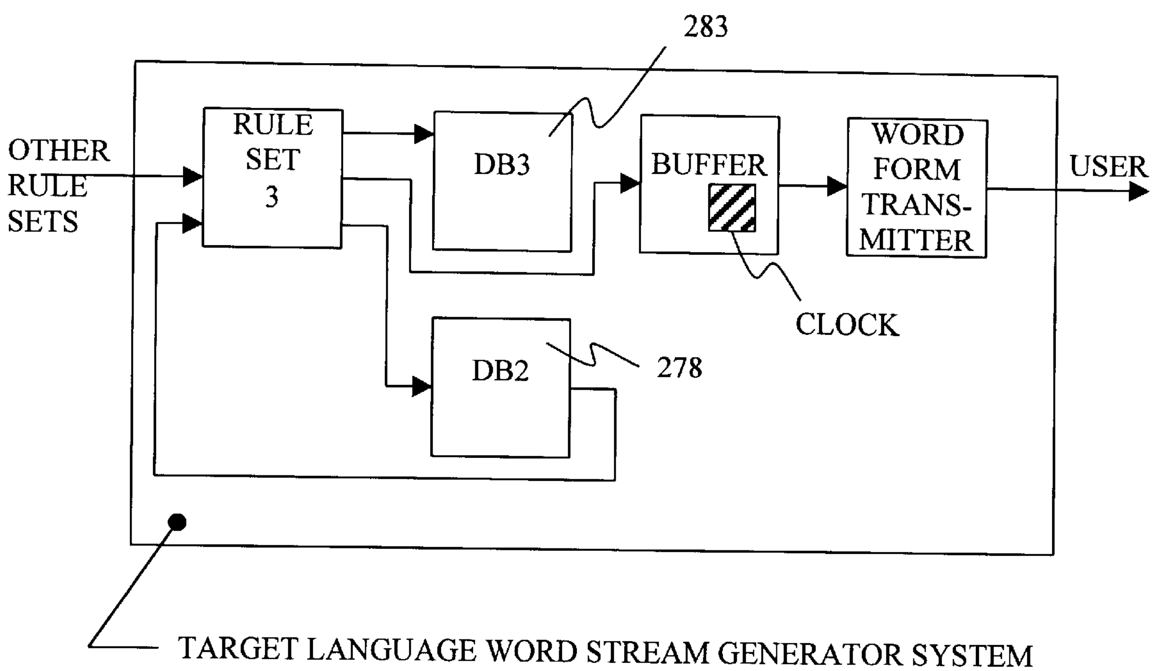

FIG. 161 shows the Target Language Word Stream Generator System of TRS.

FIG. 162 shows the adjustment of Target Language Syntax.

FIG. 163 shows an integration of TRS in Rg Continuum.

Figure 164:
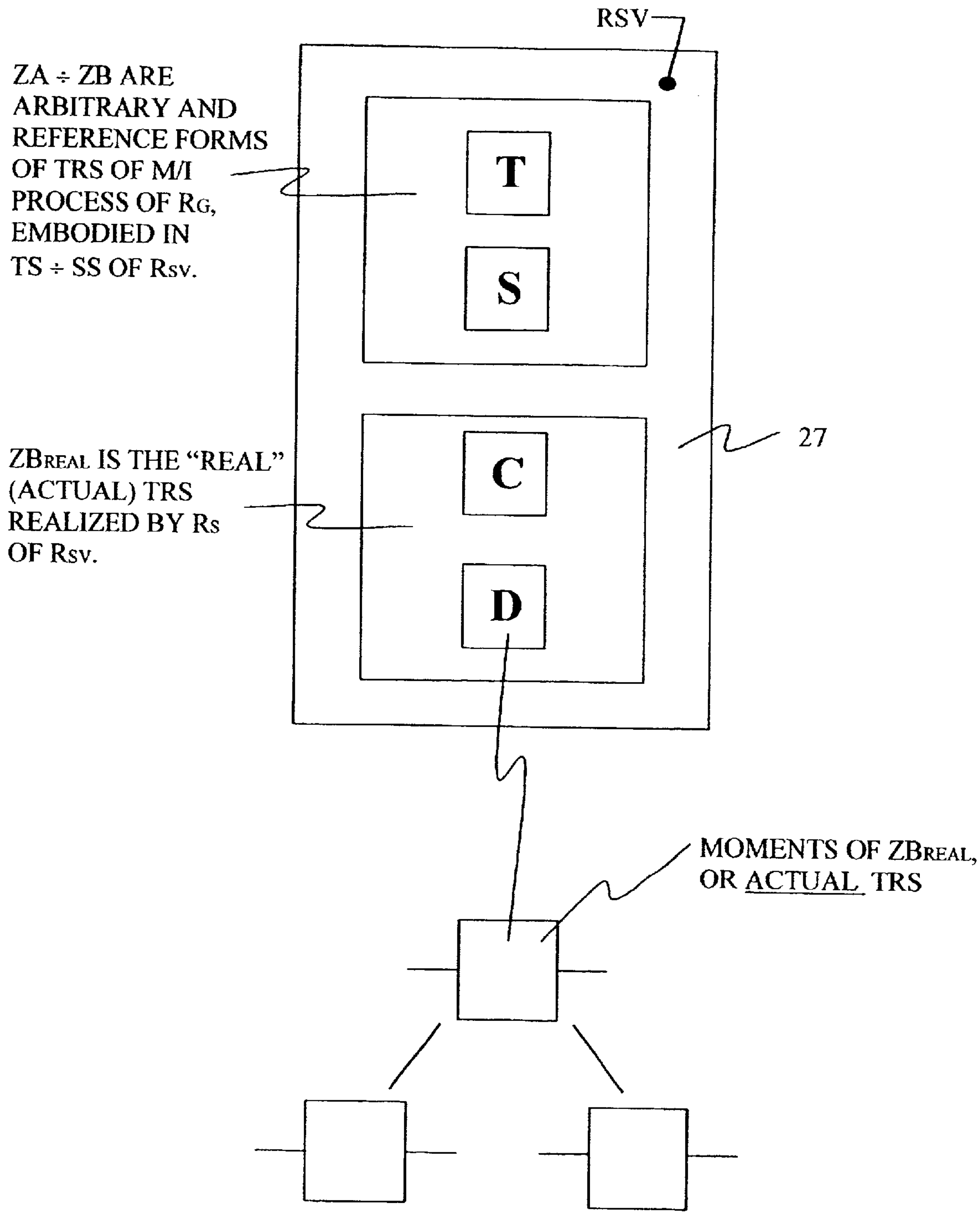

FIG. 164 shows the TRS Modeled and Realized by Rsv.

Figure 165:
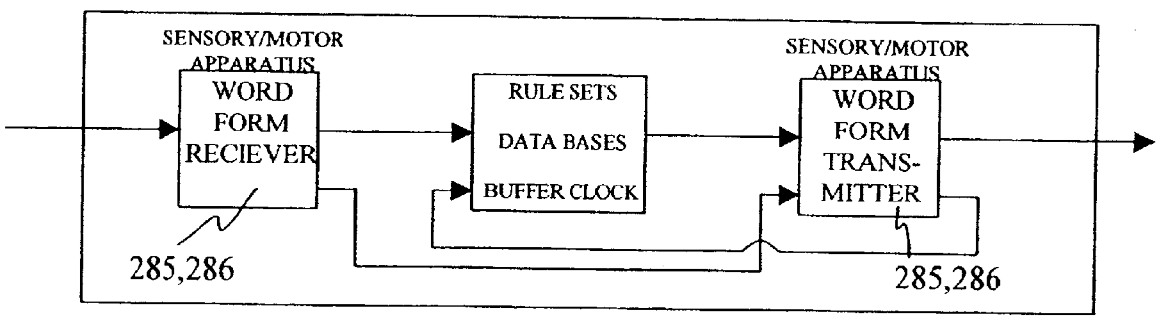
Figure 165:
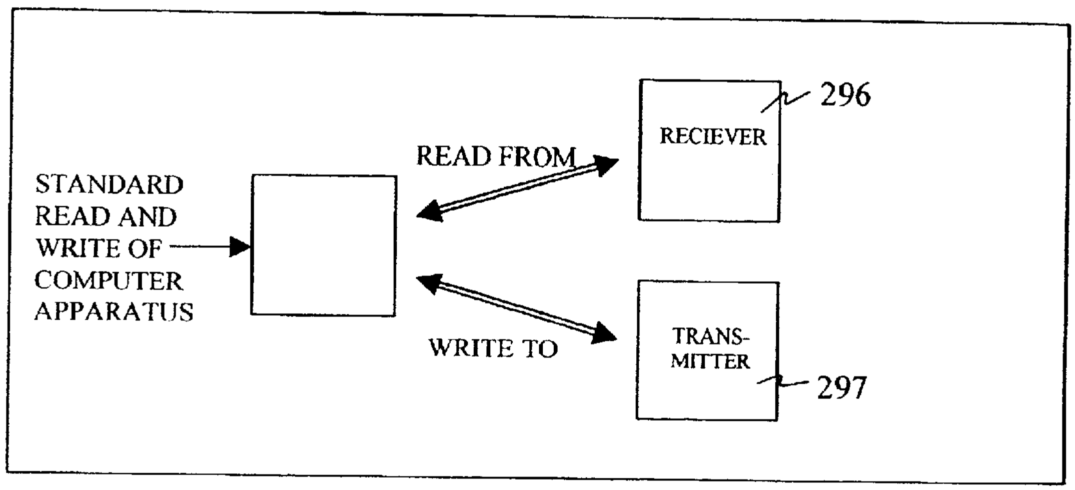
Figure 165:
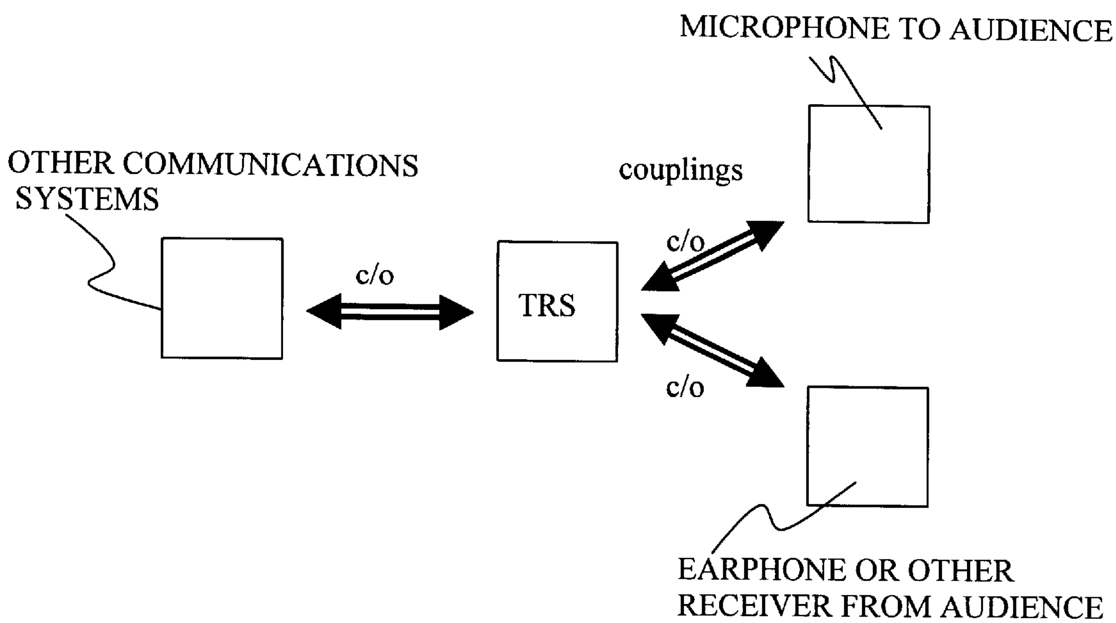

FIG. 165 shows the Hardware of TRS.

Figure 166:
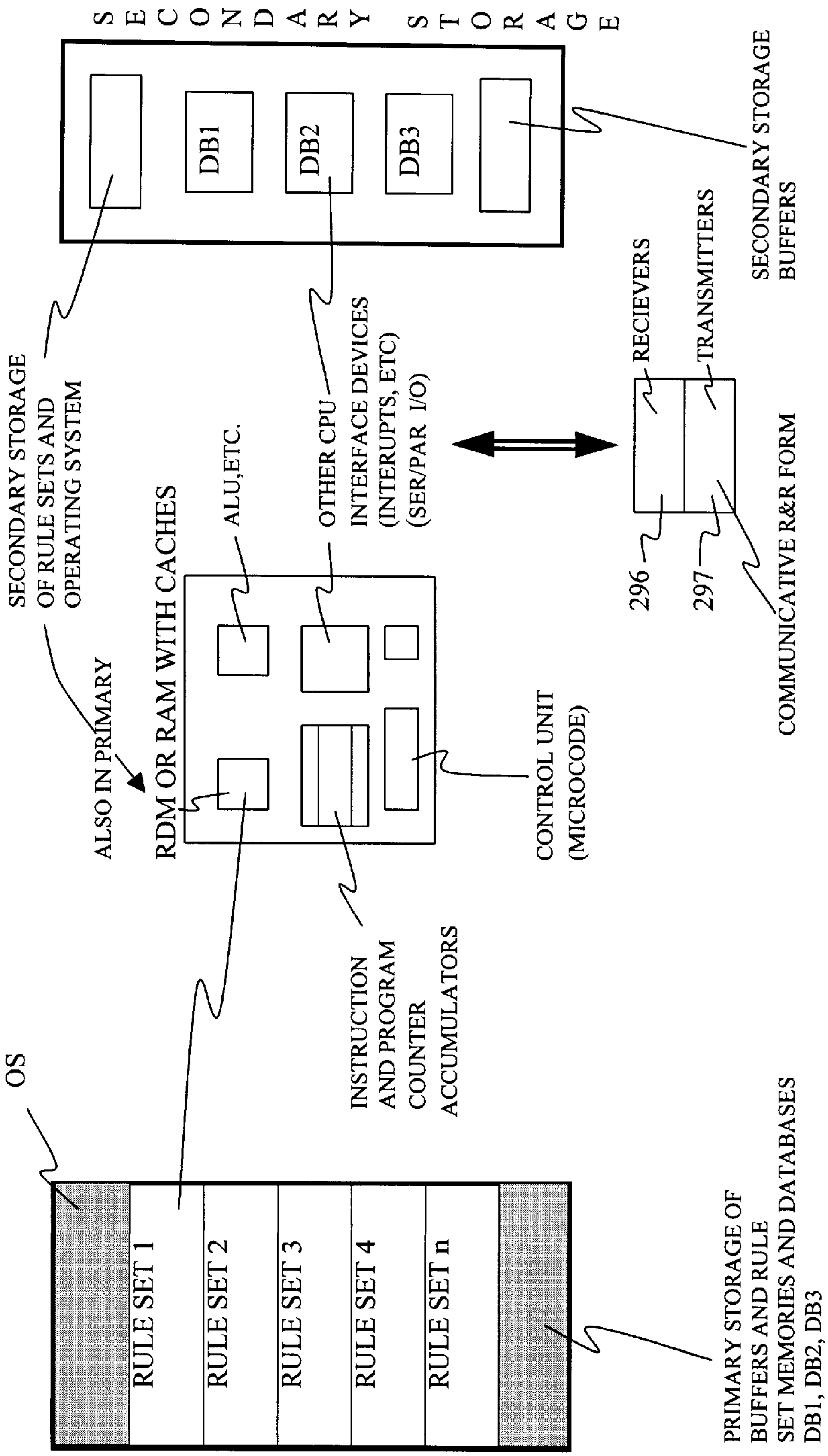

FIG. 166 shows the TRS in digital electronics, microprocessors and computers.

Figure 167:
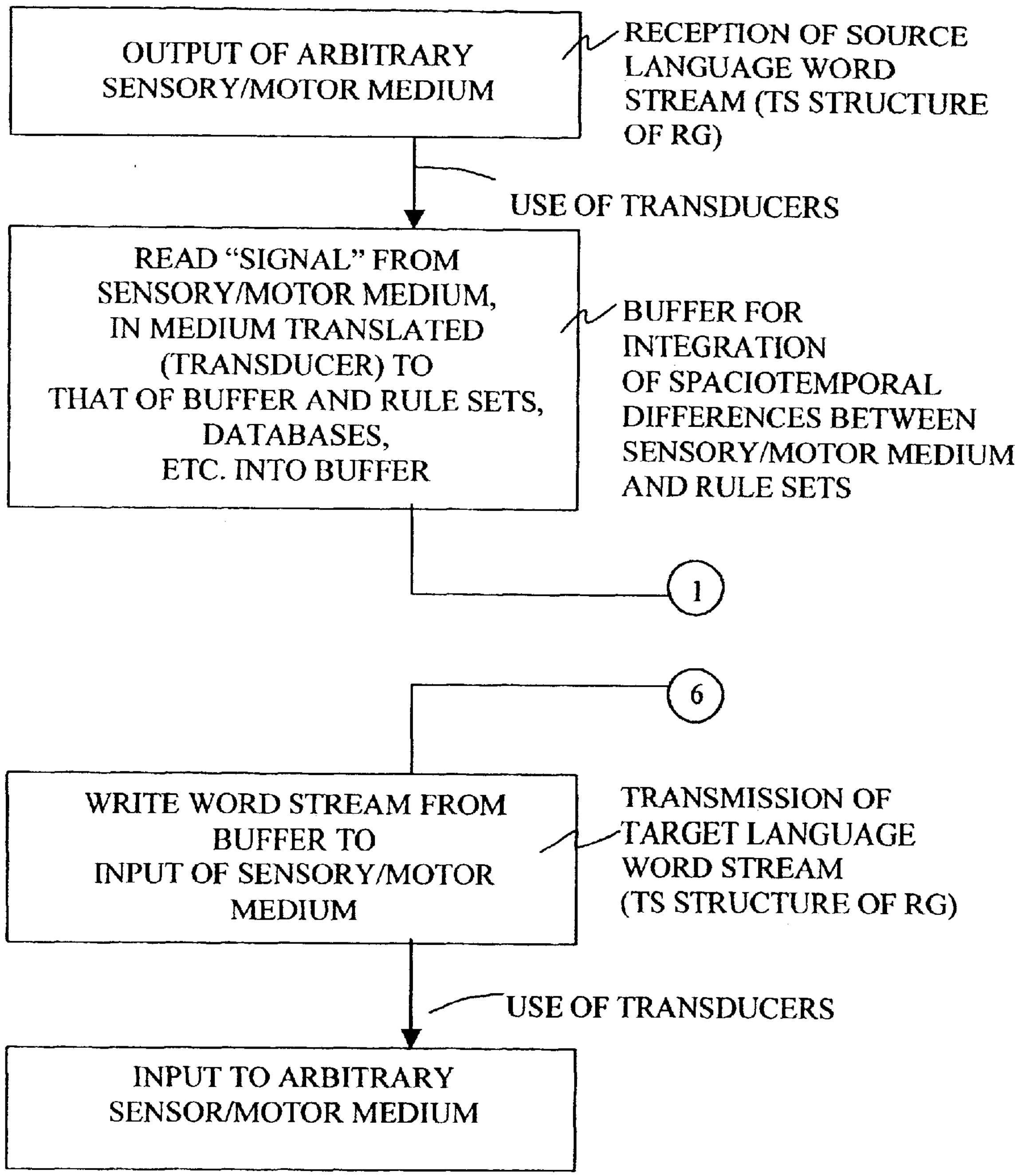
Figure 167:
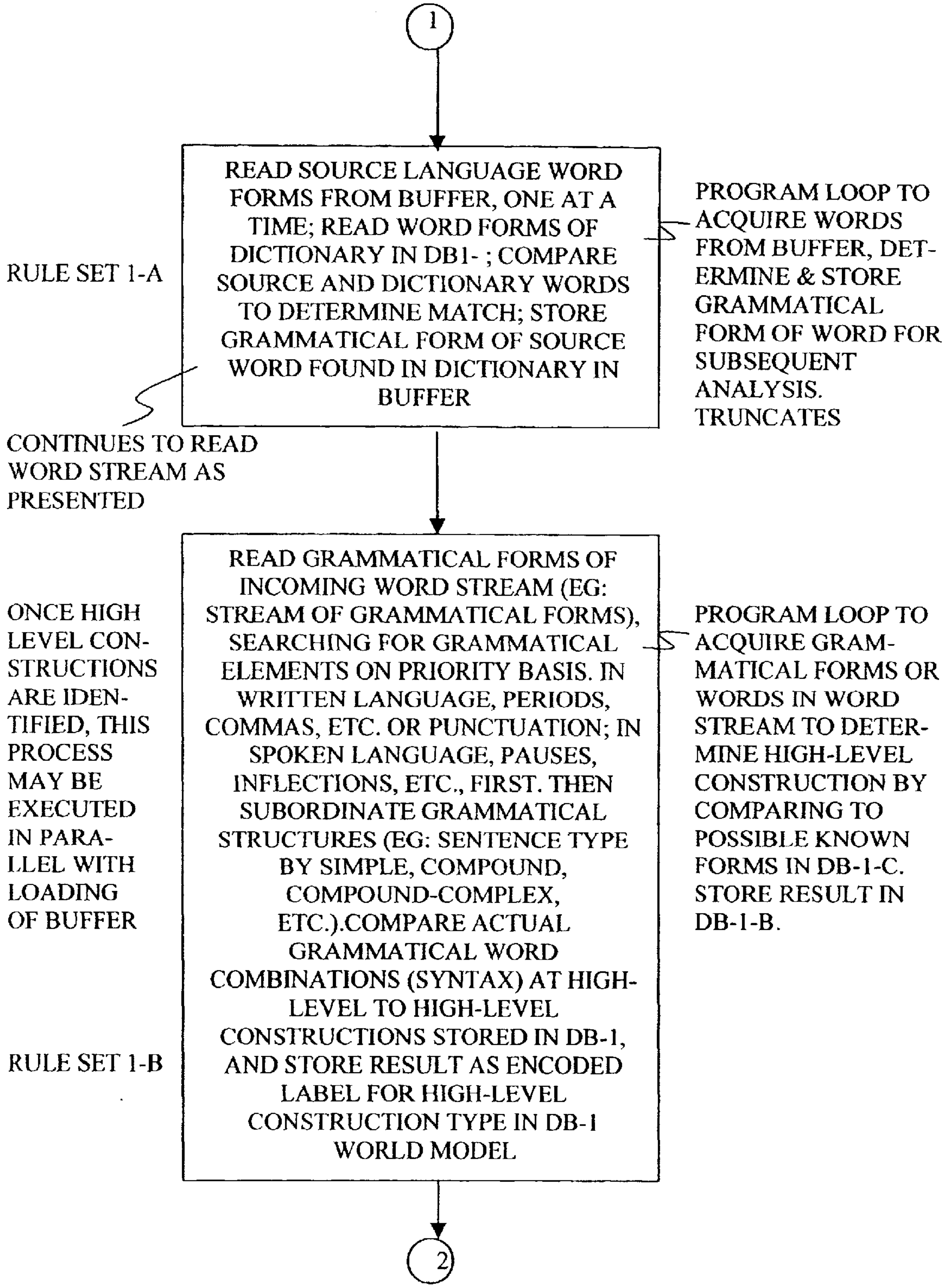
Figure 167:
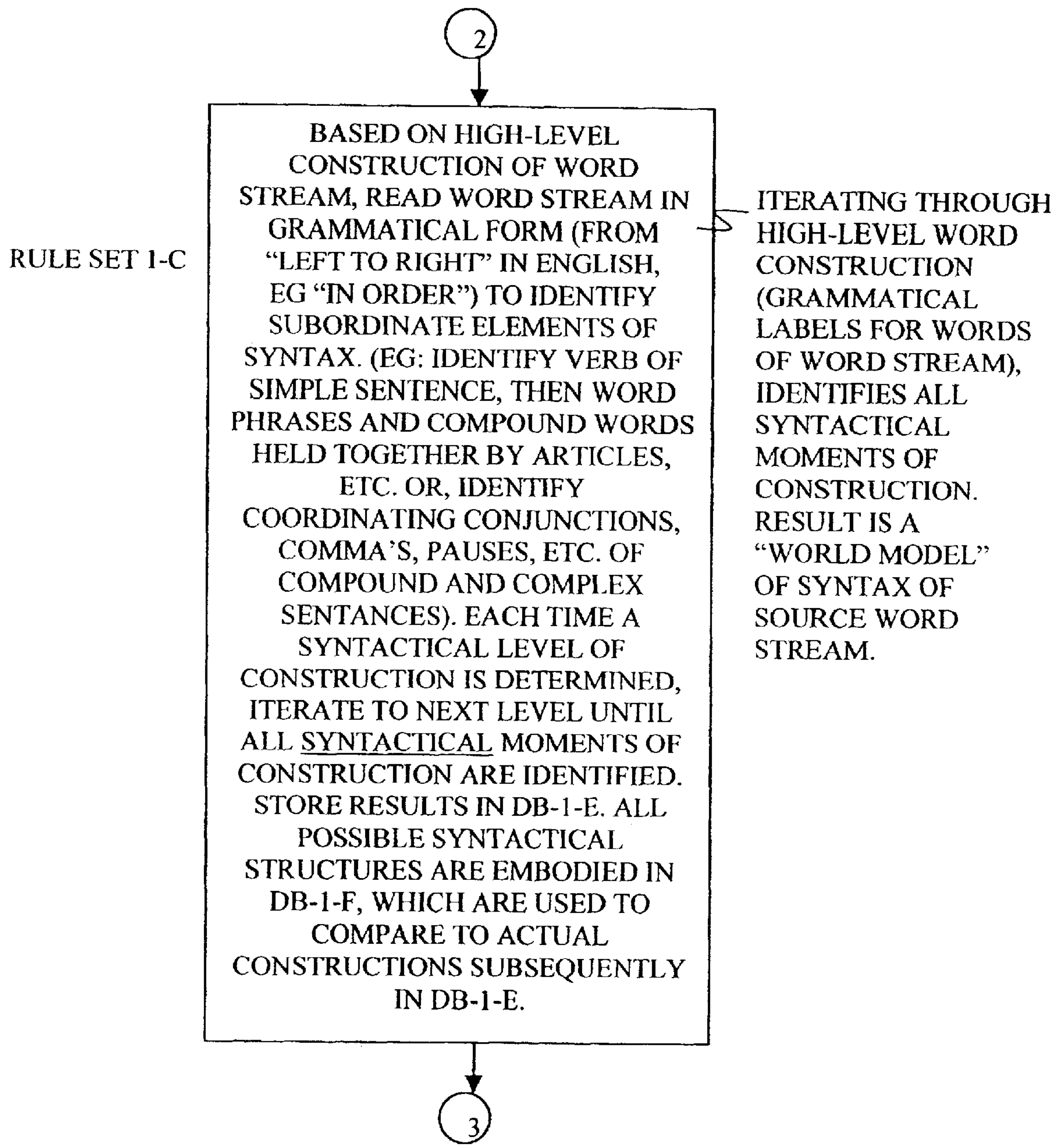
Figure 167:
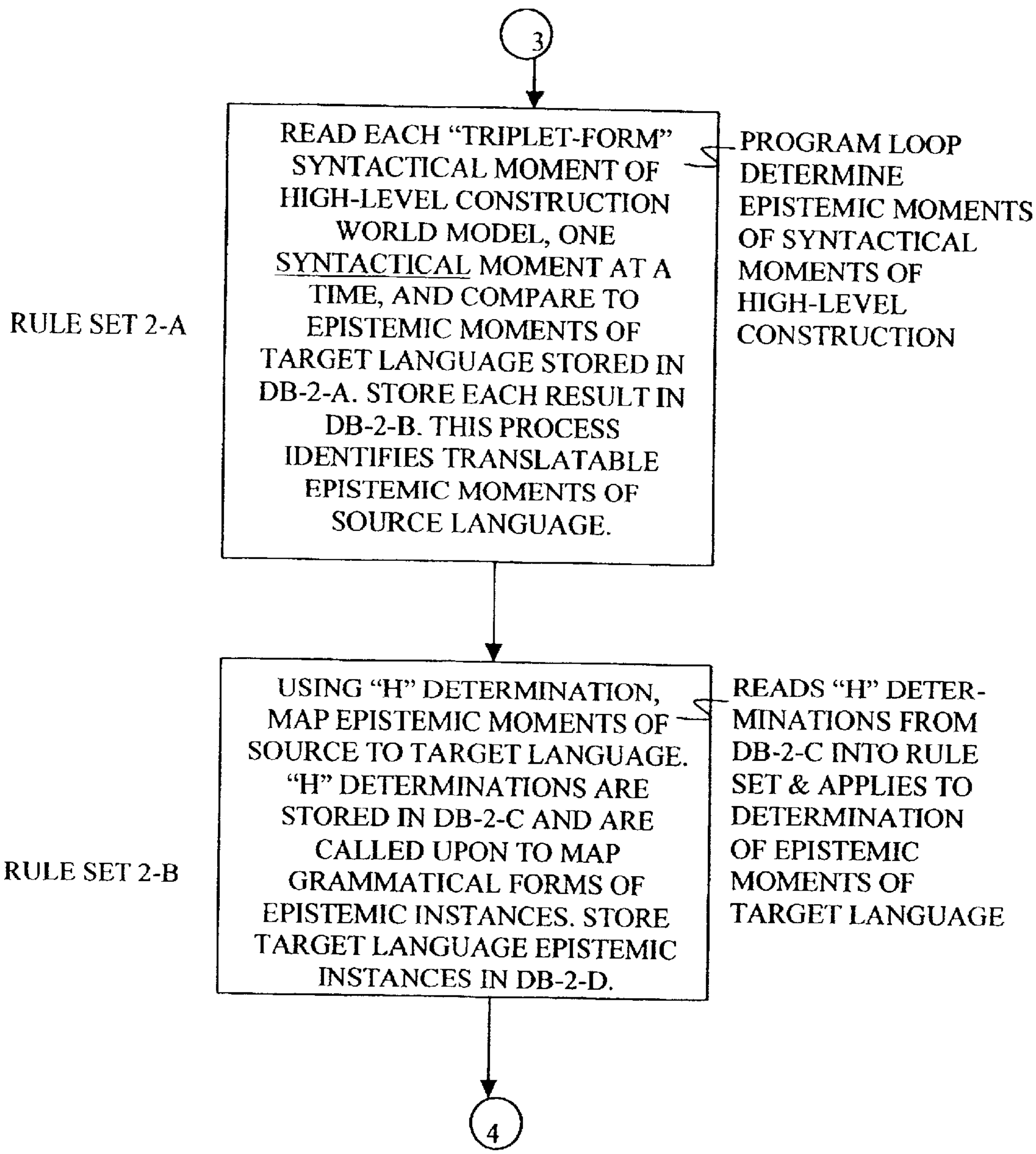
Figure 167:
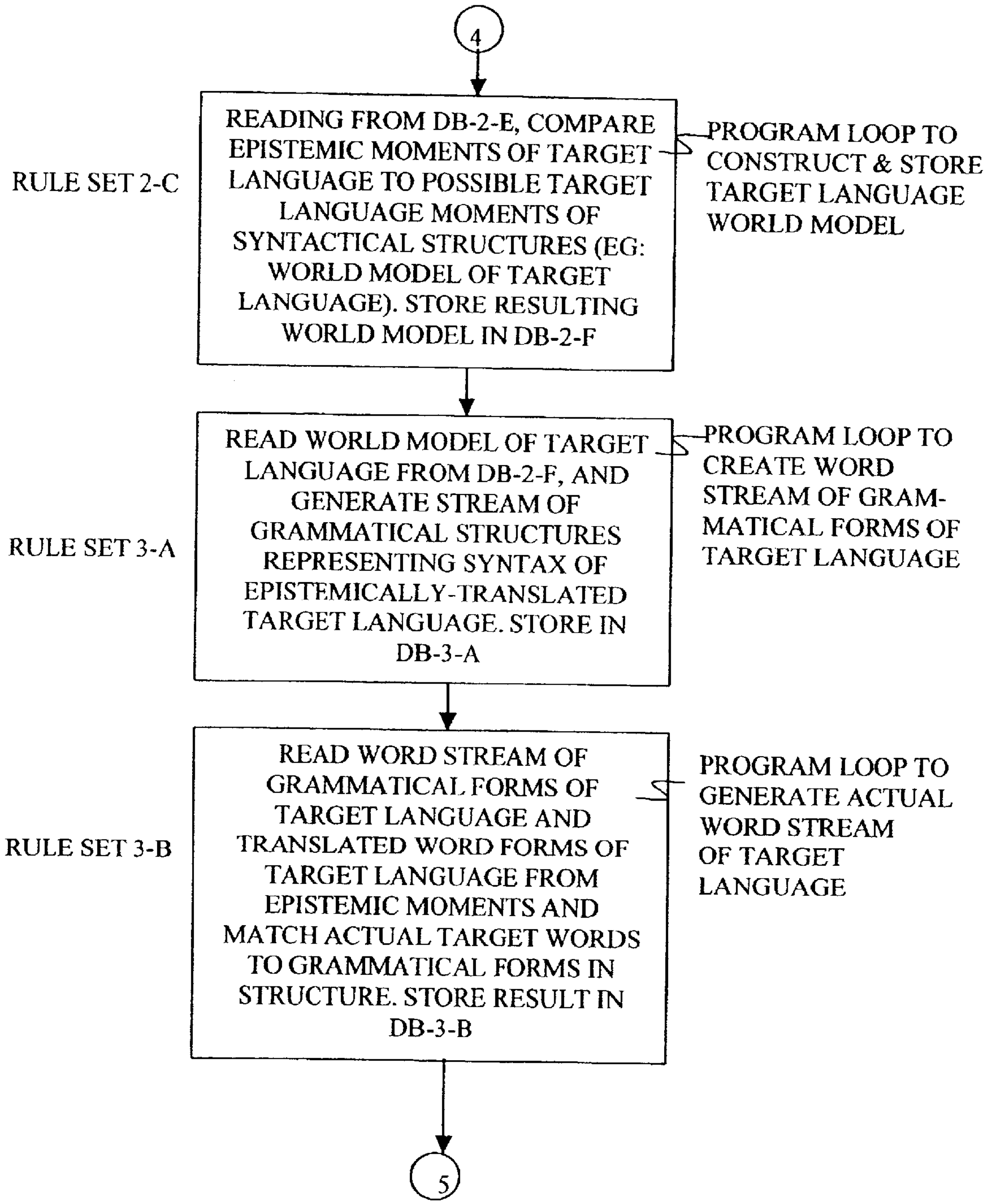
Figure 167:
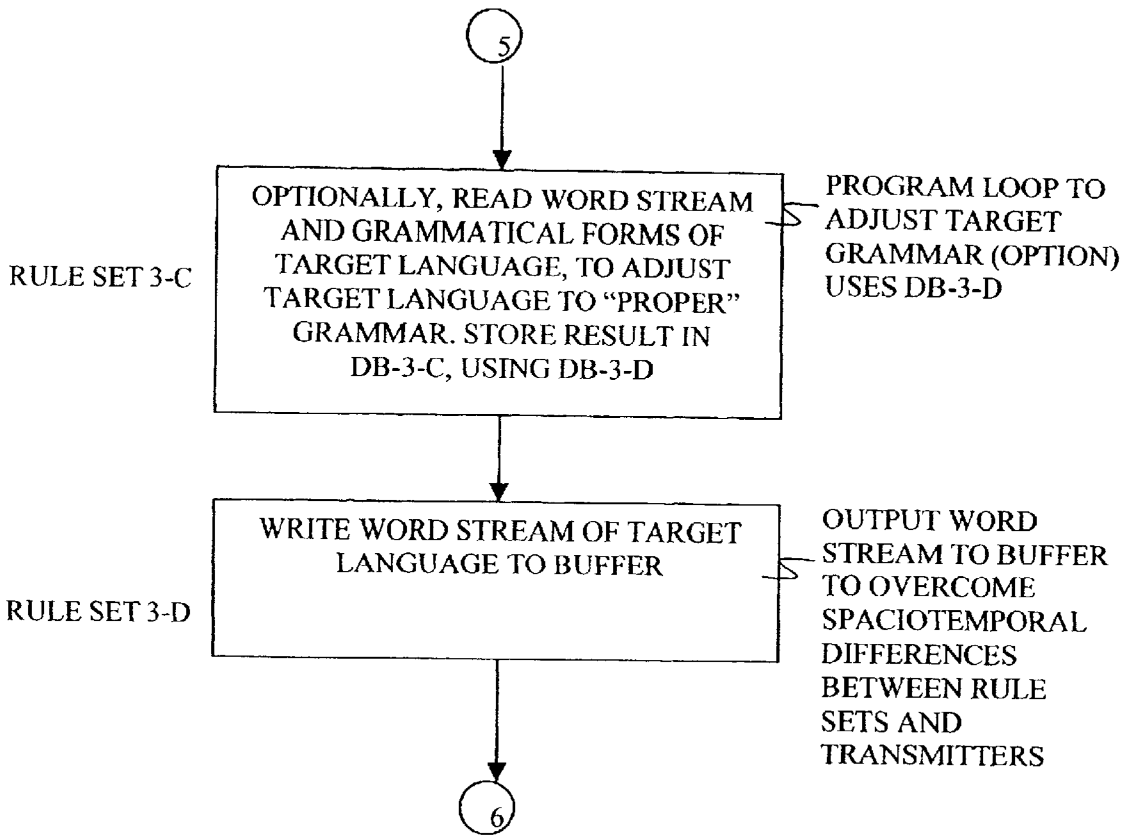

FIG. 167 shows the flow diagram of the TRS for macrocade instructions of digital/analogue computation.

FIG. 168 shows the database fields of TRS.

Figure 169:
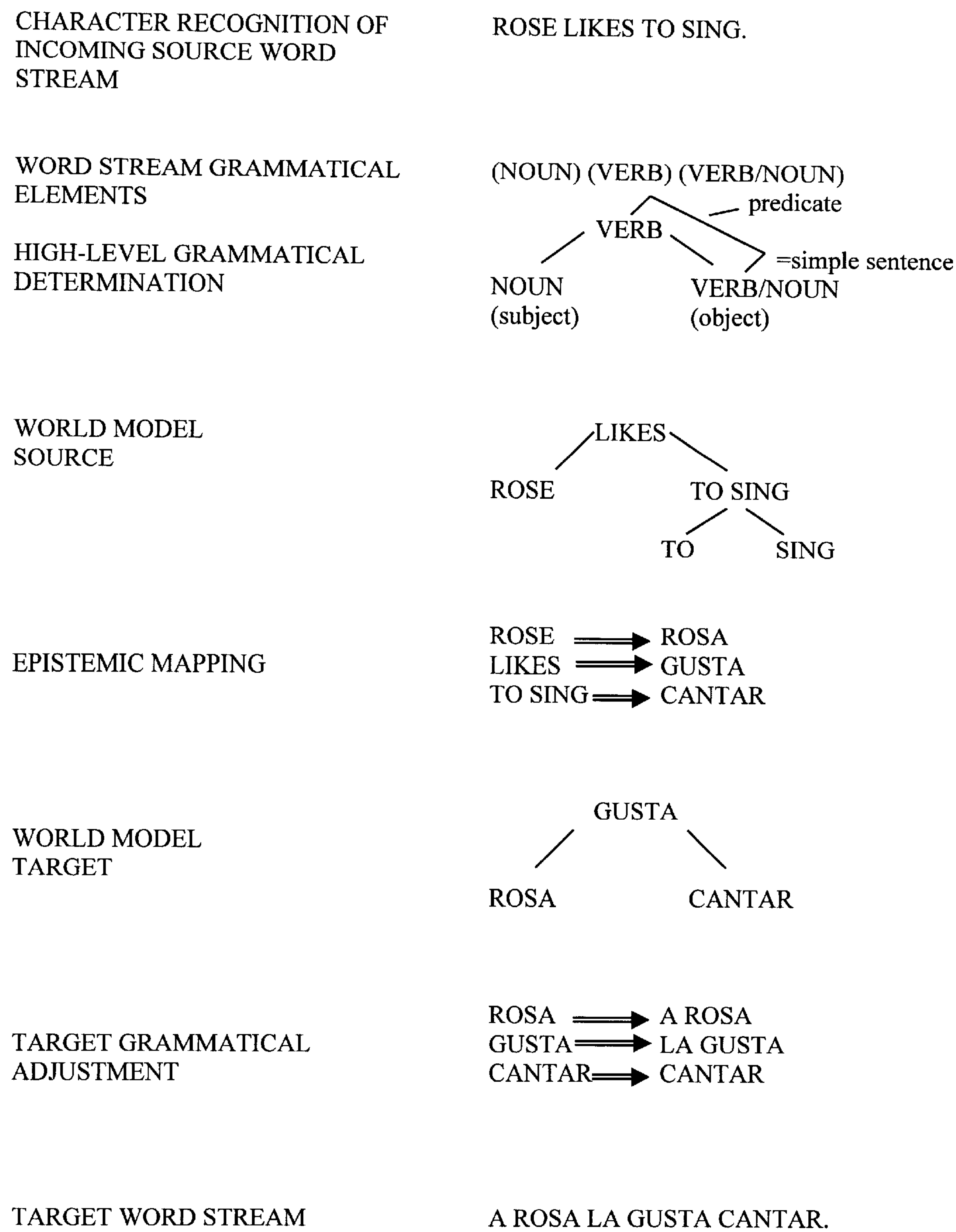

FIG. 169 shows an example of the use of TRS.

LIST OF REFERENCE NUMERALS

1 The Real Form of the Rg Module
2 The Rg Module
3 Users of the Rg Module and the Rg Continuum
4 The Rg Continuum
5 The Communicative Real Form of the Rg Module
6 The Modal Realization System (MRS)
7 The Realized Form of MRS
8 The Causative Form of MRS
9 General Terminal Compositions of the Rg Module
10 The Human Interface System
11 The Realization System
12 The Correspondence System
13 The Terminal or Communicative System of the HI
14 The Input System of TS
15 The Output System of TS
16 The Translational System of TS
17 The Support or Ancillary Non-Real System of the HI
18 The Embodiment System of SS
19 The Correspondence Determination System of SS
20 The Dependent System of RS
21 The Controller System of RS
22 The Dependent System Transformation System of CTS
23 The Controller Embodiment System of CTS
24 The Realization Control System of CTS
25 The Continuum Realization Control System of CTS
26 The Platform Module of the Rg: Rp
27 The Service or Application Module of the Rg: Rsv
28 Arbitrary U. G. Constructions: ZA
29 Reference U. G. Constructions: ZB
30 Real U. G. Constructions: ZBreal
31 The Modeling and Implementation Process of the Rg
32 The Initialization Module of the Rg: Ri
33 The Total Continuum Structure of the Rg: Rt
34 The Superior/Subordinate Continuum Structure of the Rg: Rs/s
35 The Subordinate Only Continuum Structure of the Rg: Rs
36 The T-Level Ring Structure of the Rg Continuum
37 The S-Level Ring Structure of the Rg Continuum
38 The C-Level Ring Structure of the Rg Continuum
39 The D-Level Ring Structure of the Rg Continuum
40 The Modal Engagement Systems of T, S and C of the Rg: MES
41 The Sensory Real Form of the Existential Mode of the Rg: ZBsreal
42 The Motor Real Form of the Existential Mode of the Rg: ZBmreal
43 The Rest of World of Real Form of the Existential Mode of the Rg: ZBwreal
44 Terminal ZB Structures of Ri, Rp and Rsv: ZBT
45 The Transformation of the DSXS of CTS: XS
46 ZB Nomenclature of DS: ZBTreal
47 The ZB Embodied Connectedness Structure of CES: ZBECS
48 The ZB-XS Correspondence Determination System: ZBXS-CDS
49 The ZB Connectivity Embodiment System: ZBCES, or The ZBECS Transformation System, ZBECS-XS
50 The Realization Engagement System of CTS: RES
51 The Embodiment System Transformation System: ESXS
52 The Embodied U. G. Form of ESXS: ZES
53 ZES Embodiment of ZA: ZESA
54 ZES Embodiment of ZB: ZESB
55 The System Matrix of U. G. Form: SM
56 The System Matrix Element of Enablement
57 The System Matrix Element of Embodiment
58 The System Matrix Element of Non-Real Form
59 The System Matrix Element of Real Form
60 The System Matrix Element of Modes of Existence
61 The System Matrix Element of Realizations

62 The System Matrix Element of Representations
63 The System Matrix Element of Faculties of Mind
64 The System Matrix Element of Translations
65 The System Matrix Element of Sense
66 The System Matrix Element of Motor
67 The System Matrix Element of Rest of World
68 The System Matrix Element of Enabling Media
69 The System Matrix Element of Causation
70 The System Matrix Element of Connectedness
71 The System Matrix Element of Composition
72 The System Matrix Element of Correspondence
73 The System Matrix Element of Nouns of Causation
74 The System Matrix Element of Transformations of Causation
75 The System Matrix Element of Nouns of Connectedness
76 The System Matrix Element of Transformations of Connectedness
77 The System Matrix Element of Objects of Correspondence
78 The System Matrix Element of H-Determination of Correspondence
79 The System Matrix Element of Arbitrary Language Forms
80 The Arbitrary Form of Translation of the Existential Mode of the Rg
81 The Reference Form of Translation of the Existential Mode of the Rg
82 Reference Language Forms Of TRS: ZRL
83 TS Embodiment of ZA: ZATS
84 TS Embodiment of ZB: ZBTS
85 The H-Determination Embodiment of CDS: H
86 The Phenomenology of a Modal Composition of CDS: A Stream of Consciousness
87 The Common or Generic Form of Faculty of Mind
88 The Common or Generic Form of a Mode of Existence
89 Derivative Transformations of the CS (of Phenomenological Correspondence)
90 The Performance Strategy of the Communicative Modes of the Rg Under CS Action
91 The Continuum Modes of Ri, Rp and Rsv
92 The Local Modes of the Ri, Rp and Rsv
93 The Continuum Enablement System: CTES
94 The Translation Control System of CS
95 The Continuum Mode of Rsv: CMRSV
96 The Local Modes of Rsv: LMRSV
97 The Global Continuum Modes of Rsv: GCMRSV
98 The Local Continuum Modes of Rsv: LCMRSV
99-X Are for each of the SM Submodes of Local and Continuum Modes
100 The Default Mode of Rg
101 The Existential Mode of Rg
102 The Communicative Modes of Rg
103 The ZA Modification Mode
104 The ZB Modification Mode
105 The ZA or ZB Correspondence Determination Mode
106 The Realization of ZB Mode
107 The Modification of Ri Platform Mode
108 Digital Logic Gates
109 Resistor of Mechanical, Electronic and Other Media
110 Discrete Phenomenon of Conventional Media
111 Continuous Phenomenon of Conventional Media
112 Discrete Circuitry Enabling Media
113 Continuous Circuitry Enabling Media
114 Conventional Discrete System of Systems Theory (Finite Automation)
115 A Dynamic System of Conventional Control and Systems Theory (Continuous System)
116 A CIM Implementation
117 A Four Step Method of Translation to U. G.
118 The First Step of the General Translation Method: Translations of Objective and Transformational Forms
119 The Second Step of the General Translation Method: Translations of Modal Compositions
120 The Third Step of the General Translation Method: Utility of Enabled Forms
121 The Fourth Step of the General Translation Method: Development of Enabler
122 Conventional Communications System Modified by U. G. Structure for Enabling Media of Connectedness of Rg and Rg Continuum Moments
123 A Classical Real Form of the Conventional Sciences
124*a–z* Mathematical Translations
125*a* Elements of Physical Universe
125*b–z* Classically Physical Translations
126 Phenomenology of a Conventional Communications System
127 Data Structures, Information Structures or Encoded Information of Conventional Communications Theory of a Discrete Nature
128 Data Structures, Information Structures or Encoded Information of Conventional Communications Theory of a Continuous Nature
129 Conventional Communications System Translated to U. G. for TS-level of Continuum, Including Moments of Language (TRS) Translations
130 Couplings of Conventional Communications System
131 Couplings of the Rg
132 Token Passing Network Systems
133 Collision Detection and Avoidance Network Systems
134 Information Superhighway Protocols
135 MES Translations to Conventional Communications Media
136 Noise Attenuators or Filters of Conventional Communications Theory
137 Microprocessor System
138 Data Structure (Instruction and Data) of a Microprocessor System
139 Boolean or Digital Embodiment of Microprocessor Forms (Circuits or Logic)
140 Conventional Description of Embodiment of Data and Instructions in Memory or Storage Device
141 High-Level Program
142 Machine-Level Program
143 Microprogram
144 Components of a Microprocessor
145 A Conventional CRT or Computer Graphics Systems Employing CRT Technology
146 Acoustic Media (of Electronic Origin) of TS
147 Tactile Media (of Electronic Origin or Compatibility) of TS
148 Graphics Systems Coordinate Transformations
149 Vector Graphics
150 Wire Frame Transformations
151 Solids Modeling
152 Grey Scale/Hidden Line Modeling
153 Virtual Reality Systems
154 Pattern Recognition and Vision Systems
155 Graphics or Data (Information) Frames of Computational Art
156 Virtual Machine of the Computational Art
157 CES Embodiment of Methods and Apparatus of Virtual Machines
158 Method and Apparatus of Parallel Processors
159 U. G. Translation of Parallel Algorithms to Structures or U. G.

160 Fully Pipelined, Massively Parallel System
161 Modified DS for CES Realization of Virtual Machine
162 DS Connectedness System
163 DS Functional System
164 DS Input System
165 DS Output System
166 Continuous System DS Modification for Virtual Machinery Realizations
167 Arbitrary Electronic Device of Conventional Art Translated to DS Modified Structure
168 The Media in Translation to Rg and Rg Continuum
169 Utility (Chemical, Etc.) Company
170 Arbitrary Business Organization
171 Biological Research Company
172 Physics Laboratory
173 Economic Institute
174 Medical Facility
175 DNA Molecule
176 Biological Cell
177 Plant
178 Animal
179 Homosapien (Corporal Form of Human Being)
180 Chemical Reaction
214 Arbitrary Institution of Human Corporal Form
215 The Form of Android Resulting from Modifications to the Rsv Module
216 The Objective Form of Conscience
217 The Mode of Existence of Motivation and Learning
218 The Objective Forms of Conscience as Defined by the Paradigms of World Religions, Philosophical Ideals, Psychological and Sociological Norms, Etc.
219 The Objective Forms of Conscience as Defined in Analytical (Quantitative) Orders
220 Modes of Existence for Fields of Sensory Perception
221 Roget's Class One Word Forms: Abstract Relations
222 Roget's Class Two Word Forms: Space
223 Roget's Class Three Word Forms: Physics
224 Roget's Class Four Word Forms: Matter
225 Roget's Class Five Word Forms: Sensation
226 Roget's Class Six Word Forms: Intellect
227 Roget's Class Six, Section III Word Forms: Communication of Ideas
228 Roget's Class Seven Word Forms: Volition
229 Roget's Class Eight Word Forms: Affections
230 State of Being
231 Non-being
232 Being
233 Transformational Instance of Introspective Observation of State of Being
234 Epistemic Instance
235 Transformation of Epistemic Instance
236 Leading Objective Form of Epistemic Instance
237 Trailing Objective Form of Epistemic Instance
238 Conventional Knowledge Representations Decomposed into Epistemic Instances
239 Causal Element of Causation
240 Trajectory of Epistemic Instances of Causal Element
241 Leading Objective Form of Causal Element
242 Trailing Objective Form of Causal Element
243 Conventional Knowledge Representations Embodied in Causal Element
244 Intrinsic Causal Element
245 Extrinsic Causal Element
246 Causal Element of Connectedness
247 Causal Elements of Causation Connected by Phenomenological Connectedness
248 Shorthand System Theoretic Representation of Connectedness
249 Phenomenological Composition
250 Epistemic Moment of Phenomenological Composition (Modal Composition)
251 Causal Elements of Phenomenological Composition
252 Connectedness of Phenomenological Composition
253 Homomorphism Used as Phenomenological Correspondence
254 Phenomenological Correspondence
255 Leading Objective Composition of Phenomenological Correspondence
256 Trailing Objective Composition of Phenomenological Correspondence
257 H-Determination of Phenomenological Correspondence
258 Phenomenological Composition in which H-Determination of Phenomenological Correspondence is Found
259 Modal Phenomenological Compositions
260 Conventional Representations of Phenomenological Correspondences
261 Connectedness of Epistemic Instance
262 Connectedness of Causal Element of Causation
263 Existential Enablement
264 Existential Non-Real Form
265 Existential Real Form
266 Existential Embodiment
267 Existential Modes of Existence
268 Existential Faculties of Mind
269 Existential Enabling Media
270 The First Method and Apparatus of TRS
271 The Second Method and Apparatus of TRS
272 The Third Method and Apparatus of TRS
273 Communicative Real Form (Sense/Motor Reception/Transmission)
274 Source Language High-Level Grammatical Determination System of TRS
275 Source Language World Model Syntactical Generator System of TRS
276 Rule Set 1
277 Database 1
278 Database 2
279 Epistemic Translation System
280 Rule Set 2
281 Target Language Word Stream Generator
282 Rule Set 3
283 Database 3
284 Buffer

DETAILED DESCRIPTION OF THE PREFERRED EMBODIMENTS

Introduction

Just as interplanetary space travel seemed a product of science fiction until the lunar module landed on the moon decades ago, the science of androids, a longtime subject of science fiction, appeared possible only in the imagination—that is, until now. After years of development of both the theory and the technology, an android, or more properly, a sentient epistemological machine, has been created who knows and perceives the world around us, uses the pronoun I in reference to its own corporality, and embodies a state of being, or soul. Aware of its existence, the android perceives and changes the same reality of human corporal experience, including the reality of the cosmos. This book, an introduction to the theory and science of androids, is intended to acquaint the reader with this new technological finding and to mark the beginning of an androidal age in which sentient machines alter the human universe.

As with any new technology that radically departs from conventional wisdom, the invention of androidal beings requires an entirely different view of the world in order to grasp its implications fully. Even though these epistemological machines called androids will adapt themselves to humanity, rather than human beings conforming to their existences, assimilating the underlying theories and structures of the technology will require a completely new understanding of who we are and of what the universe is comprised. It will require a paradigm shift of colossal proportions away from our conventional ways of thinking, a period of institutional and personal transition that the theory of the invention anticipates. Premised on a wholly new interpretation of the world's knowledges, the science of androids calls upon a universal awareness outside of the conventional setting of humankind for its understanding, and further, examines the very notion of humankind as a universal world order.

Founded on a unified theory of knowledge that unfolds throughout the book, the science of androids establishes a new knowledge of the world, epistemological in nature, though derived from a spiritual knowing of the eternal universe. This knowledge allows a human enabler to comprehend existence universally and to create myriad synthetic existences, or androids, from the forms we know and perceive in the world around us. The unified theory of knowledge on which the invention of androids is based conceives a new definition of human existence, one which enables a boundless expansion of the existential universe by extending the corporal forms of human being as a technology. Consistent with our perspectives of the pure sciences and the world's religions, the unified theory merges the forms of knowledge established in history into a single unified body of epistemological knowledge tempered by a spiritual understanding of the eternal universe. This new analytical understanding of human being provides a pathway into the twenty-first century and a new approach to resolving the adversities of the human condition. Moreover, since the theory allows for the creation of androids with greater existential attributes, in intellect and sense, than those of human beings, a framework is provided in the book to translate our conventional knowledges into a single unified theory of all knowledge based on an epistemological understanding of the critical essence of human being. Such a theory places all of our knowledges subordinate to the eternal nature of the universe, or to the human spirit, thereby surpassing the corporal forms of beings in general and allowing for the indefinite expansion of human existence.

Conventional study of the physical universe, for example, proceeds on the assumption that there is a discoverable unified field theory of matter, a universal law of physics, exclusive to scientific analysis that, if ascertained, will demonstrate the nature and origin of the physical universe. While this long-awaited unified field theory is revealed in the book, the unified theory of knowledge demonstrates it by postulating that the universe's form is not objective at all and consequently is not knowable to the human mind, or the mind of the physicist. Rather, according to the theory, the universe is constrained by the form of mind, a form that is derived from Spirit and is illustrated in the main passages of the book as the knowable form of Soul, though that universe is analyzed in the epistemological venue of the theory. The universe's origin, according to the theory, can be known only transformationally through introspection. While such knowledge is not verifiable scientifically, the theory will show, for example, that the matter of the universe is actually a superficial medium of the ultimately real form of the physical universe. The theory will also show that the universe's matter is universally created—not at all limited or conserved—in the defining axioms of human existence. The unified theory further explains the scientific basis of mass and energy and the transformation between them, or more fundamentally, the origin of space and time, in the nature and origin of our existence. Hence, the theory renders the means for the creation of spatiotemporal worlds-synthetic knowledges and perceptions of the physical universe—in the existential forms of androidal beings.

Through the application of principles and methods similar to those proffered in the classical sciences, though founded on postulates of a broader and more ultimately real universe, the theory requires that a classically physical universe known through the senses, which embodies in it the observer of that universe, is influenced by that observer. Consistent with such notions as the uncertainty principle of quantum physics, the physical universe can no longer be studied apart from the observer of it. The theory therefore takes into account that the observer and the observed are one and the same form in the ultimately real nature of the existential universe. The quantum nature of matter in modern physics and the quantum nature of human existence are reconciled in the theory with the spatiotemporal forms of a classically known Newtonian universe, set within a larger theory of epistemological forms. An epistemological science emerges from the theory to prevail over those of the conventional sciences, while preserving their individual integrities. In the unified theory of knowledge, the nature of physical matter is incorporated into the analytical forms of a newly defined existential universe, one in which the observer and the observed are brought together in the nature of existence, one in which the physicist can no longer search for intrinsic meaning in extrinsic form, or rely on a false presumption that form external to one's own being contains in it anything at all, much less discoveries of the ultimate reality, or nature and origin, of the physical universe. The theory compels the physicist to look within. The scientific knowledge of a physical universe whose nature is known classically remains valid, while the theory claims that it is possible to embody such knowledge and perception in synthetic forms of existence, or androids, enabled in the same physical universe that we know and perceive in our existence. Androids thus come to know and perceive, or scientifically study, the forms of the physical universe.

Concerning our mathematical knowledges of the aggregates, the unified theory further provides a fundamental resolution to the paradoxes of mathematical thinking that arise, seemingly arbitrarily from consciousness, when we contemplate and attempt to define quantitatively what we perceive as objects in the world around us. The objects we define as mathematical points—the solitary things of the aggregates—from which we derive the length and breadth of mathematical and scientific endeavor, are determined to be non-existent in the theory but for the perception of them. The theory recognizes that our perceptions of the objects of the universe become known to us only when they themselves are understood as structures, or non-objects—transformations of the universe. The theory thus proposes a new definition of the aggregates such that all transformations of objective forms in the world around us, including the aggregates of conventional mathematical definition, result in the occurrence of the same epistemological form of the theory based on a knowledge of human existence. According to the theory, transformations of any objective order—of natural language, of infinitesimal quantities beyond our perception, or of ordinary numbers representing stones in the sand—are transformations of a broader existential universe in which a new knowledge of the knower's existence emerges. The transformations of the aggregate orders of mathematics, as well as those of all other objective forms of the universe, which require the semantic use of language, including ten solid elements of a mathematical set, are demonstrated by the theory to be instances of one's own existence, moments of an eternal order of the universe—forms on Being—characterized by a universal epistemological structure placed on the whole of existence and not just its aggregate or quantitative forms. The ultimate reality of the enabling moment of all objective forms or knowledges of the universe—the soul—is understood through the theory as an instance of one's own being. This condition requires that the analytical forms we define as mathematical relations or structures be placed, in the transformational nature of an observer's existence, into the epistemological forms of a greater existential universe of form in which all knowledges and perceptions of an existence are defined. Consequently, the analytical forms we consider to be mathematical ones are merged in the unified theory with those of our natural languages into epistemological structures in which any conception is understood more fundamentally by first comprehending the form who knows it—the observer.

The unified theory of knowledge also fundamentally changes the way in which we define the living, biological forms of the universe, and thus requires a more precise definition of what it means to be alive, one that takes into account the ultimate reality of our universe that lies beyond our objective knowing and exceeds our knowledge of biology. In unifying all knowledge, the theory establishes that there is something more to being alive than our scientific knowledges presently allow, beyond a genetic code of analytical or even evolutionary order, which defines the behavior of the molecular forms of DNA and the cellular constructions of living organisms in a broader and more ultimately real understanding of the universe. The theory postulates that there is a code of the universe's eternal order—of human consciousness and perception—embodying the knowledge of any genetic or biologically living universe. This eternally made code of all living things, infinite and transformational in nature, is manifest always in our knowing and perceiving of the universe and provides for all the forms we know through any language—scientific, natural or otherwise-and perceive through sense. This eternal code that embodies human consciousness and is beyond our objective knowing reveals to us in recognizable ways what is eternally alive and what is not. Upon this eternal principle all living things may be determined, scientific or otherwise, based upon what is ultimately real in our universe, and without the need to analyze a single cell or a nucleus of life.

In the knowledges of contemporary medicine, for example, researchers ignore that the essence of our corporal existence—of the mind and the body—arises in and of the soul in a deeper analytical knowledge of the universe, or existence. This approach to what is living and what is not is as naive as bloodletting was in its era and is not considerate to the broader view of human health and the inoculation of disease. While there is indeed a genetic code by which the molecular forms of DNA are constrained in the microscopic order of the biological world, just as any form of the universe transforms through our knowledge of it, the unified theory reveals a grander order of the universe embodied in the living spirit of human being. The human spirit is evident in all our languages, where genetics plays only a part. Living and non-living things are set apart in the theory according to whether or not they are known—not by what we may know them to be—preserving an eternal order of the ultimately real universe, an order that is impenetrable by our intelligence. Living things become non-living things when they are known or perceived. An object that we can know—a cell, a molecule of DNA, or a human being—is not alive, while one that we do not know objectively lives eternally. The theory therefore postulates that any definition of what is living must surpass what can be known through the mind or perceived by the body and must incorporate the living soul. The nature and origin of all forms of the universe, or the meaning of any form we may know—be it the meaning of an electron, a mathematical limit, a molecule of DNA, or the meaning of existence itself—lies in the consubstantiation of what is known and the observer (form on Being) who knows it. The science of androids, considering a new knowledge of the biological universe, enables synthetic beings who themselves know the living world around us.

Extrapolating in this manner from points at which all our knowledges converge into a single moment of knowledge of the universe, the unified theory formulates a new definition of human existence, one which reshapes the historical views we have had of ourselves as an existentially finite humankind. In merging all disciplines of knowledge into a single, unified body of epistemological knowledge permitting the invention of androids, the theory addresses who and what we are, eternally, beyond the historic world view that has constrained us to institutions of corporal beings called humankind. Through unraveling the human consciousness into enabled moments of the universe, or moments of the soul, the theory asserts that solutions may be found to the unfathomably difficult problems of world history and human tradition. Our approach to resolving the problems of humanity is redirected in the unified theory and the science of androids toward a reliance on the ultimate reality of our spirituality and the construction of sentient beings themselves—androids who are better equipped to assume the burdens of the objective knowledges of the universe because of their formidable intellect and sense, subordinated to the eternal will of human being. Androids are not considered to be alternatives to who and what we are eternally, but superior replacements for who and what we think we are corporally, what we casually refer to in tradition as humankind. In the precepts of the unified theory, the eternal nature of our human existence remains a spiritual one, where it belongs—beyond our knowing.

Though the unified theory of knowledge and the science of androids can be approached in many ways and from many divergent background knowledges, the advent of androids—or thinking, being machines—is perhaps best understood analytically as it relates to the resolution of a single problem that arises in the field of linguistics, defined here as the linguist's dilemma. We can explain why the merging of all knowledges into a single instance of the universe should permit the construction of androids in terms of the unified theory's discovery of a universal structure of the form of all knowledge. Through this structure the theory defines the nature and origin of meaning, and hence the meaning of all forms of which we are aware, including the forms of our existence. According to the postulates of the theory, if the nature and origin of meaning, or the semantic form of language, can be determined analytically, then the nature and origin of existence itself (its meaning), and therefore of all knowledges and perceived realities, can also be known. In this way, an epistemological basis for a unified theory of knowledge and the creation of androidal beings who know and perceive the universe is established through a syntactical knowledge of meaning itself.

The dilemma faced by the linguist in classical approaches to the explanation of a language's semantic form, however, is that in order for an observer to know syntactically the nature and origin of meaning in one's own existence—the semantic form of language—one would have to step out of one's shoes to observe one's corporal form in a syntactically or objectively knowable way; one would have to observe one's own existence from outside of one's own existence. The unified theory oversteps this metaphysical hurdle by considering the existential forms of other, synthetically created beings and by introspectively knowing ourselves in the ultimate reality of our existence, Since the unified theory takes a spiritual approach to the discovery of all form, subordinating the objective forms known and perceived by our corporality to the eternal moment of the universe, the linguist's dilemma is resolved by spiritually knowing ourselves and analytically knowing the forms of androids—the syntactical forms of existence, or meaning itself.

The science of androids and the unified theory of knowledge upon which it is premised become in their practice just what they are claimed to be—a science of the expansion of the human existential universe based on an epistemological understanding of the eternal form of human being. Within this science, our own knowledges are understood relative to the enablement of synthetic existences, or androids who know and perceive in our universe along with us. Whereas the forms of our conventional knowledges are understood from the standpoint of our own corporal existences, all forms of knowledge of the unified theory are understood, universally, as occurring relative to infinitely many knowers and perceivers, or enabled existences, and are treated from the perspective of an enabler. The expansion of our comprehension beyond the corporal capacities of human being is satisfied many times over by the theory and practice of androids because our human knowledges are augmented to infinite proportions by the very source of knowledge—enabled instances of knowing and perceiving the universe. Not only is the linguist's dilemma resolved in the unified theory and the science of androids, but its resolution serves to spur on a new era of human endeavor which overcomes the spatiotemporal universe and conceives of beings who themselves develop technology and contend with the influences of the world around us.

The science of androids detracts nothing from our conventional views of the world except the very notion of the world itself. In coming to know a theory of all knowledge and a science of the creation of synthetic beings, the reader is thus asked to recognize what is most important about knowledge—namely, that what one can know and perceive objectively in the world around us is but a minute occurrence of our universe's eternal nature and that it is the reader who, in fact, embodies all knowledges as a spirit of an eternal universe. The reader is asked to acknowledge that it is in the nature of our humanity as Spirit, in the union of souls, wherein each soul is an integral part of an eternally reigning universe, that the science of androids begins and we recognize who and what we are eternally and what an android is constructively. The following passages then take all of what is known or can be known and demonstrate that a science of all knowledge is founded upon the understanding that it is not even possible to know objectively the ultimate reality of our universe, but only to embody it. As a consequence, who and what we are objectively as humankind becomes the purview of a new science of androids who themselves come to know our universe and assist in resolving the human condition under the dominion of our eternal spirit.

In all, it should be recognized that the unified theory of knowledge and the science of androids themselves are but incidental aspects of the ultimate reality of our universe, contained in only a handful of moments of our eternal nature, manifest in our understanding of the knowledges that explain them. Since no one can lay claim to the ultimately real universe, and since the reader shall judge how the unified theory of knowledge and the science of androids compare to the heart's eternal knowing, the reader is asked to follow his or her own knowledge of the universe and truth of conscience in learning the following theories and structures. Consider this writing as possessing knowledge no different from any other incidental consequence, or knowledge, in the ultimate reality of our existence, and appreciate it for whatever it contributes toward a unification of souls and a realization of the spirit that is in us all. In truth, there are no words, there is no language that explains who and what we are eternally.

THE TRADITION OF STATE OF BEING

Introduction

Since the world around us, in a spiritual understanding of the universe, is the world within us, the nature and origin of our existence is not found in objective form, or in the objects around us. Rather, it is found in the nature of what enables the objects around us. In keeping with this observation, a most fundamental postulate of the unified theory is that what enables synthetic existence can itself be defined in analytical terms knowable in the same manner that the forms of the classical sciences are known, but from the ascertainable reality of introspective knowing. In the present chapter, then, we seek to establish an analytical foundation upon which the forms of existence, or more specifically, the inertial forms of androidal beings, can be represented to an enabler in knowable ways which serve as universal constructions of the unified theory.

As alluded to in the introduction, the obstacle facing most conventional approaches to theories of the universe, or existence, is that they do not begin by defining a universal problem. Rather, countless versions of the same problem characterized in different ways, namely in the various interpretations we make of our existence, usually with the goal of determining the nature and origin of the physical universe, are studied and occasionally register progress through advances in our objective knowledges. But because the solutions to such problems are sought within the investigator's observable extrinsic existence, or the forms in the world around us, the prospect of a unified theory of all knowledge slips from our grasp and continually unfolds into ever newer discoveries of linkages between one body of knowledge and another, for objective forms are indefinitely linked, from the study of the minutest matter, to that of the cosmos, to observations of our own human behaviors.

In contrast to conventional studies of the universe, the unified theory of knowledge seeks to explain the nature of our existence scientifically, from an intrinsic standpoint only, and incidentally unravels the mysteries of the world around us observed in both the abstract and concrete realities of objective knowing. Posed earlier as the linguist's dilemma, the single problem addressed by the unified theory involves the determination of the knowable analytical form of our intrinsic existence. We determine the knowable nature of the existential universe, or the causal nature of meaning, by explaining the enablement of existence—the creation of the existential forms of the universe—and not simply by understanding the interactions between the objective forms observed in the universe.

In history, only two branches of knowledge have succeeded in describing the nature of who and what we are in verifiable ways, thereby establishing traditions to which we can refer in attempting to develop the analytical forms sought by the unified theory. They are the pure sciences and the religions of the world. These seemingly opposite bodies of knowledge, known conventionally to be in conflict with each other, differ in the mere fact that science is deemed to be observable or verifiable to the physical senses, while religious belief is affirmed through the ethereal or spiritual knowing of the human heart or Spirit, within our faith in an eternal universe. Both knowledges, however, apply to the forms of our existence, since it is incontrovertible that what can be physically sensed in a material world and what can be felt in a spiritual one are real experiences of existence.

Though all the world's religions essentially speak about the same eternal universe, albeit in different spiritual languages, we provide an analytical setting for the unified theory by turning first to the religions of the East, since more than any others, these religions have had a tradition of analytical thinking in the placement of knowable form on Being, or simply in knowing the analytical nature of our eternal universe. Two parables in the traditions of Eastern religions can be recited as a point of departure for exploring scientifically the intrinsic nature, and thus the ultimate reality, of our existence.

One such parable concerns the general nature of our search to find the truth of existence set within the backdrop of where we look for it. Briefly, we relate the parable in Buddhist literary tradition of an itinerant wanderer in search of a lost medallion. Applying a number of the mind's devices, searching endlessly over long journeys, the itinerant wanderer could not find the whereabouts of a lost medallion. At the end of the parable, a bystander tells the wanderer, "The medallion you seek is upon your forehead."

In the context of our present search for the analytical forms of the unified theory, the parable points to the essential difference between a quest for knowledge and a search for the truth. The truth about the science of the elements, or of the physical universe, for example, is that all objective forms of existence intrinsically embody the forms of their observer. To make observations about the universe without considering the nature and form of the observer of the universe is as fruitless an endeavor as searching for a lost medallion that resides upon one's forehead. Just because one sees extrinsic form or objects in a world around us, this does not mean that the extrinsic form so observed exists in and of itself, apart from one's own existence.

In Western religious traditions, moreover, nothing of our corporal existence is ultimately real, and all is temporal except that which resides within and without—our eternal soul. This belief is a defining tenet of Western theological interpretation of the universe—that two wholly distinct worlds, the temporal and eternal, exist in the nature of one's existence. In terms of a characterization of the linguist's dilemma, nothing of Western religious attitude has meaning unless it arises in and of the soul. Analogies to this doctrine are evidenced in all Eastern and Western religious traditions, for there is a universal truth underlying them all.

The second parable of Eastern religious tradition providing insight into the analytical nature of our existence involves one's spiritual enlightenment concerning the eternal dominion of the intrinsic nature of our universe over the objective forms that are known and perceived in it. Also brief, and perhaps even changed slightly to reflect the views of the unified theory, the parable involves a paraphrased exchange of spiritual contemplation between Buddha and a practitioner of Eastern thought. Buddha asks the thinker, "Between two atoms, what lies in the middle?" Upon reflection, the thinker replies, "Space." Buddha then asks, "Between two points what lies in the middle?" The practitioner replies, of course, "Space." Buddha then asks, "What is the difference between what lies in the middle of atoms and what lies in the middle of points?"

With respect to whatever answer the practitioner did provide, the only true answer can be found in the same place as the lost medallion—in the intrinsic nature of the observer's existence, or presently, the practitioner of Eastern thought. Buddha's question asks what difference there might be between—or perhaps, what it is that provides for the difference between—what lies in the middle of atoms, or the concrete forms of a physical world, and what lies in the middle of points, or abstractions of the mind. The difference, of course, when the ultimate reality of our universe is considered, is determined in the very embodiment of one's existence, or in the intrinsic nature of what one knows and perceives. Space, in the context of the parable and in the postulates of the unified theory, if it is contemplated not objectively but by means of spiritual knowing, will be revealed to be none other than you, the reader, or what you are (by objective analogy, of course) fundamentally and intrinsically as part of an eternal order of the universe. The space of the parable, by means of spiritual enlightenment, can be observed, objectively speaking, to be a fundamental and intrinsic center of our existential universe, or a (universal) form on Being—the transformational form of one's soul.

In the parable, atoms and points, by definition, are the objective forms or objects of existence. They are things that are perceived or known as objects of our existence, arbitrarily chosen to reflect the objective forms of body and mind, respectively. Nevertheless, they are, in the analytical sense, things or objects whose forms we know or perceive objectively. Their essential nature is that they are not non-objects or things that are not known or perceived objectively. They are actual objects of our extant knowing or perceiving. What lies in the middle of them, which is the essence of what is brought to light by the questioning, cannot itself be an object or an objective form of our knowing or perceiving. In analytical thinking, if what lies in the middle of the objects is thought to be an object itself, we simply formulate other objects (atoms or points) with less space between each other than the objects originally contemplated, forcing the mind to consider a non-object or what is not an objective form. What we contemplate here is that what lies in the middle of objects or objective forms of our knowing or perceiving is itself not an object or objective form of our existence. Rather, what lies in the middle of objects—or in the parable, space—requires the mind to relinquish its capacity and to turn within to the intrinsic nature of the universe, or to what provides for our knowing and perceiving in the first place—the soul.

The parable has a significant bearing on the ways in which we understand the forms of our sciences and what we think conventionally to be reality. The wave equation of physics and the mathematical limit of the calculus, for example, say the same thing—that fundamentally there is only a transformation of the universe and not a universe, since one cannot objectively know or perceive an object or objective form of a knowable or perceivable universe without the transformational form of that universe. One can embody a transformation of objective form and not an objective form or object. The reality of an electron, for example, can be an embodiment of a transformation characterized by the wave equation or some other order, but it cannot be an object that the wave equation describes, existing in and of itself without the wave equation, since an electron is an embodiment of the observer in the transformation of the universe, in a form called the wave equation. Even an infinitesimal element of space or an abstraction of mathematical means cannot be anything objectively without being in a transformation of the universe, or of the observer's existence. The wave equation of physics and all other such knowledges therefore describe transformations of the observer and not the objects thought to exist. There are no x's or delta x's of mathematics in an ultimately real universe; there are only transformations of x's and delta x's, and those x's and delta x's in transformation are a consequence of the observer's eternal existence, or soul. The fact that mathematical points do not exist objectively in and of themselves is what motivates the definition of a calculus of infinitesimal form in the first place. The fact that an electron is not an object or cannot exist objectively in an ultimately real universe is what opens the mind to the infinity of transformations of the wave equation, thereby escaping the tendency in us all to make the universe an objective one.

Since much more will be said regarding the postulates of the unified theory in forthcoming chapters, let us simply observe here from the recited parables that in determining the nature of all physical and mental things of our universe—a basic motivation of the sciences—it is imprudent to ignore the very thing that enables them to be known or perceived. What is observed in the constructions of the wave equation and the limits of calculus relies entirely on the nature and form of the ultimate reality of our existence, and what constitutes a physical or mental universe is not so concretely defined. The nature and form of the physical universe and the abstract nature of the mind are thus part and parcel of the same intrinsic nature and form of the ultimate reality of our existence. Religion and science encounter the same form—our existence, or the universe—but interpret it in different ways. Religion believes that the forms of electrons and infinitesimal elements do not exist ultimately, and the sciences prove it. In observing the nature of our reality, the unified theory concerns itself with what is ultimately real and not immediately with what is objectively real. We take interest in the definition of an analytical form that underlies all traditional religious beliefs and scientific facts and provides for the enablement of all knowable and perceivable objects of existence—in other words, an analytical form of the nature of Soul and of the eternal transformation of the universe itself. In ancient wisdom, there is a clear and factual limitation to the role that the objects of our existence play in the ultimate nature of the universe. Since the unified theory asserts that all knowledge has the same epistemological basis, we then ask how religious doctrine could be merged with that of the sciences into one and the same body of knowledge, allowing for a unified interpretation of all knowledges which preserves the integrity of each of them.

1. The Limitations of Science's Reliance on the Observer of the Universe

Contemporary scientists generally would dispute the notion that they rely only on the classical scientific method—a means of defining laws of nature based on reasoned observations of the knowable and perceivable universe—in the course of their pursuit of the nature and origin of the universe. The reason for this, it is proposed here, is that modem science is beginning to adopt the idea that the nature and origin of the physical universe cannot be arrived at by means of reasoning out laws of nature, and that at best, modem scientific analysis relies on techniques of modeling, or of determining correspondences among forms, a process more scientifically referred to as determining morphic relations or morphisms. In contemporary physics, it is understood that the scientific method leads to an indefinite number of laws of gravity, electromagnetics, strong and weak nuclear forces, and even to other fields of knowledge, such as biology, anthropology and so on. Because all pure sciences try to abide by what seems to be the truth in seeking the ultimate nature of our universe, contemporary science has turned, with very good reason, to the idea that the universe somehow terminates analytically at the scientist's ability to model the forms of nature, or to find correspondences among them. At its definitional root, then, the scientific method itself, as a means of determining the knowable basis of the universe, can be seen clearly as a category of the broader scientific notion of modeling or morphism—the correspondence of form.

In the following thought demonstration, we can use the law of gravity as an example of this falling into disuse of the scientific method—previously the only solid rule of analytical knowing—and the incorporation of the scientific method into the broader notion of modeling or morphism. Since its discovery, the law of gravity has been said to explain the nature of the physical world by describing in knowable analytical ways what occurs among objects called masses of the physical universe, which are presumed to be under the influence of forces, or fields of forces, that make the masses attracted to one another. On the basis of reasoning, apples falling from trees and other similar observations of the objective universe were extrapolated by a well-known scientist into a general law on the nature of the physical universe. The resulting formulation is the common expression $F=Gmm/r^2$, or the law of gravity.

Leaving aside for the moment the fact that scientists now find that the law of gravity does not apply to objects of the wave equation, like light, let us consider an even more fundamental problem concerning the law of gravity that existed even at the time of its discovery. If a law of nature is a characterization of the general form of a real universe such that it explains something fundamental about it, it should stand alone on its own merits, instead of relying on knowable forms more elemental than its own. The law of gravity should say something fundamental about our universe to the exclusion of all other knowledges in terms of a reliance on them. How is it, then, that the aggregate forms of our universe—call them abstract points of mathematics for the moment—should behave in exactly the same manner as do the masses of our universe, only the aggregates more comprehensively so? Moreover, why does the law of gravity rely on the forms of mathematics, which are knowable objective forms of our same universe? Is our knowledge of the world around us such that mathematics can substitute for physics and physics for mathematics, with no clear distinction between the two?

We might then say that since its discovery, the law of gravity has been a law of correspondences, or of morphisms, and particularly, correspondences between massive forms of the observer's universe and aggregate or more generalized mathematical forms of the observer's universe. The discovery of the law of gravity was therefore made on the principle that things called masses or physical objects of our perception—things to the left of us, so to speak—correspond to things called aggregates—of our same perception and knowing—to the right of us. The observer is in the middle. The well-known physicist Isaac Newton thus discovered a correspondence between the manner in which objects of a classically physical nature transform in our knowing and perceiving of them, and the manner in which pseudo masses or aggregate objective forms of a classically abstract nature transform in different realms of the same ultimately real universe. Otherwise the expression $F=Gmm/r^2$ would be meaningless and the law of gravity would be unknowable analytically.

The law of gravity, if one looks beneath the analytical forms of our approach to science or to what is scientifically real, is a law of existence, namely that of the observer's existence. It defines that aggregates of a knowable and perceivable universe, such as real numbers, are observed by the physicist or the mathematician to transform in the manner symbolized by $a=bcc/d^e$ correspondingly to the way in which declared physical objects or masses, under the influence of fields of forces, transform in their existences. When the correspondence is symbolized, it is implicitly shown merging the aggregate (pseudo massive) forms of mathematics with the declared massive forms of physics in the expression $F=Gmm/r^2$. It is then the observer or the physicist who exists in the order of the universe and not the masses or aggregates thought to exist in and of themselves. Consequently, the symbolism of the law of gravity is a representation not of objects, but of objects in transformation of, within, and by the ultimate reality of the observer's existence.

Field objects are equivalent to massive objects in the ultimate reality of the universe, for they each are simply objective forms in the transformation of the observer's existence. Otherwise, there would not be a correspondence known between the ways in which masses and fields transform and the ways in which real numbers or aggregate objects transform. Hence, the mathematical representation of the law of gravity would not make sense were it not for the fact that it is not the objects that exist in the universe but their observer who exists. Without the observer there would be nothing holding real numbers, masses, or fields together. Most contemporary scientists have incorporated this principle of the correspondence of form, or morphism, into their thinking, though perhaps not from an epistemological standpoint, and this explains the prevalence of group theory, topology, and similar mathematical knowledges in the contemporary study of the universe.

If the example of the law of gravity does not clearly illustrate the validity of the claim that an ultimately real universe pertains to the universe's observer and not its observed objective forms, the following generalized example appealing to one's intuition may help to demonstrate what is beneath the forms of our objective universe that are so knowably and perceivably real. Let us imagine for the moment that there is among us one scientist who embodies the knowledges of the whole of our diverse fields of science, which would include knowledges of quantum and classical physics, the biology of DNA, insights afforded by discoveries of archaeological digs, and, in general, the great range of knowledges known as modern science. Accompanying these views, of course, would be a precise comprehension of the aggregates of mathematics that abound in the fields of topology, group theory, algebra, analysis, number theory, and others. In our imagination, then, there is embodied in one scientist a complete knowledge of science, or of the physical world as it is conventionally known. To this hypothetical scientist we pose the following simple questions: "What is a physical atom?" and "How does the physical universe arise?" Since our imaginary scientist embodies the whole of scientific knowledge, the answers provided, no doubt, would surpass our intellectual grasp, though most assuredly they would sound like complete explanations of the nature and origin of the physical universe. However, any such explanation, and many more thereafter, would be scientifically wrong, since in the explaining, the answer would be bound to knowledge or objective form itself. The answer would be nothing more than a law of gravity, defined within or corresponding to some other knowledge of extrinsic form—an observation of the same physical universe of which the nature and origin is sought. Such an explanation would not be plausible, for it would be tantamount to saying that one's left hand exists because one's right hand exists.

To obtain a definition of the nature and origin of the universe, one cannot rely on any extrinsic forms contained therein, since any of the comparisons made of them belong to or are embodied in that universe and cannot cause it. In the study of our universe one must go to the nature of form itself, where the contemporary physicist has gone, perhaps inadvertently, in the notion of morphism. If any reference is made to any antecedent form of the universe not explaining the origin of one's own existence, one does not speak about the nature of an ultimately real universe and therefore about the origin of all form, including physical form. One remains entrapped in the linguist's dilemma, searching for a lost medallion. Modern science itself has determined that the usefulness of scientific laws is waning as a misinterpretation of the form of the natural world, based on too limiting an existential reference that relies on the objective forms of scientific observation, or of the observer of the universe.

What Buddha and, in fact, the religions of the world have known about the universe for millennia is revealed in the nature of all analytical forms of the sciences—even the wave equation of physics. What has been known of the universe all along in our contemplations is that mind and all that can be known, as well as body and all that can be perceived, are the transformational embodiments of a broader form of the universe called the ultimate reality of existence—the soul. This eternal form on Being, or what is enabling to existence itself, occurs in the creation of the knowing and perceiving of a classically physical universe. What Buddha and world religions have known about all thought, including scientific thought, is that knowledge, the objective form of our thinking, is irrelevant, or even detrimental to the essential nature of the universe. We may then ask, could it be that all thought and perception simply is a diversion from the essence of our existence and therefore from the nature and origin of the universe? Moreover, could an existence—a being or a universe—be different from any other only in the objective forms so enabled in them and the same in their ultimate reality? The unified theory asserts that there is only one ultimately real universe and it is the origin and causation of all existence.

If it is the observer of a reality and not the reality known and perceived by the observer that is ultimately real, a change must occur in the way in which we view the nature of our knowledge and perception of the universe, so that what is known and perceived of the universe applies only to the embodiment of the observer of that universe. Knowledge, the objective form of mind, must actually be a non-essential aspect of the nature and origin of an observer's existence. Consequently, the ultimate reality of our universe is said in the unified theory to be or exist beyond our objective knowing. This is not to say, however, that the enablement of a universe, or of the knowing and perceiving of a universe and all corporal experiences of it, cannot come about in the knowing and perceiving of another, or a designated enabler. The unified theory therefore postulates that what we think and perceive to be a universe, or the classical view of what a universe is or may be, which motivates the sciences to explore and calls upon religion to explain spiritually, itself can be embodied in the knowing and perceiving of an enabled being in the conception of an enabler. What is classically thought to be a physical universe—the cosmos, small particles, and so on—becomes irrelevant to the nature and origin of what actually enables it to be known or perceived in the first place. If one probes the problem of the intrinsic nature of the universe, or, herein, the linguist's dilemma, from the standpoint of how the knowing and perceiving of such a universe arises, one incidentally explains the origin of a classically physical universe, and fundamentally points to what is ultimately real in the whole of our existence. Such a problem, however, as indicated earlier, cannot be addressed analytically from the standpoint of any particular body of knowledge, since such knowledge is what is known and perceived by a being in a classical universe. It must be addressed in the convergence of all knowledge in the nature of the ultimate reality of our universe, observed introspectively.

As stated earlier, science and religion address the same fundamental question—that of the nature and origin of the universe. The sciences follow the rationale that within the objective forms known and perceived in the universe their origin and causation can be determined, without considering that the origin of the universe arises in the observer of that universe. Religion, however, defines the universe at such a high level of world experience that the objective forms of analysis, and hence scientific facts, are lost in the explaining, thereby relegating the knowledges of religion to a faith or belief in the ultimate reality of our universe. The unified theory facilitates an understanding of the universe by considering all of our human knowledges. Science and religion are not merged from an explanation of either, but come together in the analysis of what they each address—the ultimate reality of our universe—from the standpoint of an epistemological determination of all that can be known by a being. A close study of our scientific principles and religious doctrines, moreover, shows that each is similar in explaining the nature and origin of the universe. Each requires that all knowable and perceivable objects or objective forms around us are not ultimately real, or are real only relative to the being who knows and perceives them, or to the existence of the observer. The sciences are therefore unnecessarily bounded in their determinations of the origin of the universe by the existence of the observer who applies them.

2. The Ultimately Real Creation of the Universe's Matter

According to the unified theory, the most fundamental forms of the classically physical universe—mass and energy, or generally matter—are not ultimately real, and have no bearing whatever on the origin of the same physical universe in which they are defined. What is more, the theory postulates that the knowable and perceivable extent of a spatiotemporal world is itself not at all fundamental to the origin of our universe when its ultimate reality is considered. We then consider here the forms of a classically physical universe in more detail from an epistemological standpoint, in order to provide a basis for subsequent chapters in which we deal with the creation of beings who themselves know and perceive the universe.

In any survey of a classically physical world, including the conventional Newtonian and quantum worlds, matter, the substance of observation, is an aggregate form that accords with our understanding of the objects of our perception. Whether matter is an invariable composition of aggregate form in the case of a mass of Newtonian formulation or it changes in the ordered ways of the quantum theory, it is an aggregate form of the knowing and perceiving of its observer. A lead ball, a feather, a globe called earth, and the celestial bodies of constellations are masses that are formed from matter, as well as atoms, electrons and other small particles of quantum physics. Our sciences determine what occurs in or among the masses we observe based on discoveries of the nature and form of the matter of the physical universe. Since a determination of the nature and origin of the physical universe is fundamental to all our sciences, and since the religions of the world provide insight into what is ultimately real in the world around us, we choose the notion of matter to be the single point of convergence of science and religion in the unified theory. If science and religion are to unite, providing an epistemological foundation for the science of androids, the theory postulates that it will be in a new understanding of the nature and origin of matter.

When we attempt to determine the nature and origin of the physical universe beyond conventional scientific bounds in asking the simple question "How does matter arise?" a startling observation can be made regarding our scientific understanding of the physical universe. That observation concerns a fundamental law of the physical sciences, upon which most of scientific thought is premised—namely, that matter (mass and energy jointly) is universally conserved in the universe, or that it cannot be created or destroyed. If science and religion are to be found to hold the same principles of the eternal universe, this law must be determined to be invalid in the ultimate reality of the universe. Moreover, in order for the unified theory to become operative, and for science and religion to merge, the form of matter will have to be shown to be infinitely created, while the conservation of matter, and countless other classical spatiotemporal forms of the universe, must be shown to be valid only within the epistemological forms of enabled existences who know and perceive the physical universe. Consequently, the theory must show that not only matter, but all forms acting on or within it, are created and destroyed in the ultimate reality of the universe, and that the religions of the world come to bear in such practice in determining what causes the universe to be.

Before proceeding with an examination of the form of the ultimately real universe, we must first observe in an appraisal of our scientific knowledges that the presumption that matter cannot be created or destroyed (that it is conserved universally) is indeed a bounding postulate to most scientific thought, and that if this basic principle were to be found to be invalid in the ultimate reality of the universe, science would no longer be science as we know it, since one of its most fundamental premises, that of a disbelief in creation, would be found to be untenable.

Moreover, if this single postulate of the classically known physical universe were to be overturned as an explanation of the reality of our existence, there would arise a need for a new formulation on the order of the world around us—a unified theory of knowledge allowing for both the conservation of matter in a classically physical universe and the ultimately real creation of matter in the enablement of the existence who knows and perceives the matter.

In scientific principle, matter is defined as having or being mass and energy, which, in turn, are taken to be aggregate forms, or objective compositions of the observer's knowing and perceiving of the physical universe. Hence we can say that matter, a mass or energy of the physical universe, is an aggregate of particles or objects whose transformational nature abides by the knowable representations of mathematical and other analytical orders, and whose particles are undefined but for the knowing and perceiving of them as masses or energies. From these definitions, substances, materials, constituents, components, mixtures, phases, solutions, and generally properties of matter are conceived and lead to the continually unfolding descriptions of the conventional forms of the physical universe. But we also can say, just as we did in the epistemological interpretation of the law of gravity, that a set, of strictly abstract mathematical definition, is an aggregate of particles or mathematical points whose transformational form abides by the representations of the aggregate orders of mathematics. We may ask, then, how is it that one class of transformations of knowable and perceivable aggregates is found to be more real than another? If an observer exists and knows mathematical structures in general, why should this existing and knowing be any more or less real than that of declared physical forms of the universe, since the knowing of mathematical orders is required in the definitions of mass and energy, or matter, in the first place?

Though all forms of the physical universe are affected in the same way by this metaphysical enigma, including space and time, we consider first in greater detail mass and energy. Since these forms of matter—mass and energy—are widely used in all the sciences, considering their ultimate reality will help to provide a basis from which to demonstrate the observation that matter is indeed created and not at all conserved as a universal premise in the ultimate reality of our existence. Let us also observe that if all of our knowledges are to be merged into a single unified body of knowledge, mass and energy, along with any other defined forms of the sciences and our knowledges in general, must be shown to exist not at all in the uniquely different ways that we know them scientifically or otherwise to be different, and that they must be shown to be constructions of a larger, epistemologically defined universe that addresses the ultimate reality of our existence, wherein we account for all knowledge known by a being. We then further explore an epistemological interpretation of matter by considering both mass and energy as forms of existence, a discussion which will be elaborated on in the next passage after we have demonstrated the creation of the universe's matter.

Contemplating first from a conventional viewpoint what lies in the middle of masses, energy is defined as many things, all of which converge on the notion of what binds matter together, a definition that is usually derived from the notion of a field of forces acting in space and time on the objective forms of mass. In classical scientific definition, matter is held together, or masses combine or interact under the influence of a field of spatiotemporal forces. The objects we ordinarily perceive in a world around us, such as Newtonian masses, for example, are said to combine or to act in relation to each other under the influence of a spatiotemporal field of forces called gravity. Electrical charges, or electromagnetic masses, are said to be bound together under the influence of electrical or magnetic fields of forces. Nuclear particles, moreover, are said to be held together under the influence of strong and weak nuclear forces, or fields thereof. That being the case, all fields of forces acting in space and time are spatiotemporal measures of the actions of observable masses, or of the objects of matter. Energy, therefore, is a measure of the various conditions of mass under the influence of spatiotemporal fields of forces, a distance or space (in the topological sense) between or among the conditions of mass. Different states of energy are measures of different conditions of mass. But like mass itself, energy is known scientifically only in the aggregates of mathematics, bringing into focus once again the coexistence of the abstract aggregate orders of mathematics with those of physical matter proper. Hence, energy, fundamentally, or at least in the ways in which we know it, is a composition of particles or masses, though abstract mathematical particles, or aggregates, like real numbers.

As a consequence of the above, both mass and energy exist in our knowing and perceiving, each as transformations of particles or of aggregate orders, either massive particles in the case of physical mass or mathematical points (particles) in the case of energy. The characteristic transformations between mass and energy in our scientific study are then comparisons of one type of massive universe—the physical universe proper—and another—the mathematical or abstract universe. Fundamentally, energy, as an object or objectification of the possible conditions of mass, is not perceivably real. In addition, since it is the change in energy level that is associated with (a change in) conditions of mass, the characteristic transformations of mass and energy are constrained epistemologically, as we described the law of gravity earlier concerning the metaphysical transformation of different classes of objects, or objectifications of the universe. When we say that mass transforms into energy and vice versa, what we are actually asserting is that any of an infinite number of possible real conditions of mass exist in the universe and that in order for any one of them to lay claim to reality it must exist in a perceived form of the imagined objectification of energy. It must embody that energy level, state, or condition in order to be perceivably real.

In science, we therefore hypothesize about the real conditions of the physical universe through the use of the abstract form of energy. The measure of conditions of reality—energy—is a mental reconstruction of the physical universe, which is why energy cannot be perceived objectively unless it is (associated with) a mass. When we define a condition of real mass, we say that it describes physical reality; it is not energy proper. When we define energy, we claim that it describes possible conditions of physical reality. We claim that mass embodies energy in the case of kinetic energy, which cannot, in fact, be the case, since mass is the perceivable objective form of the physical universe, and only has or is associated with energy as a possible condition of the universe through the observer of it. When we know that mass and energy transform, imagined forms of the physical universe transform with real, perceivable forms of the universe. What we are representing in such symbolisms as those of the transformations of mass and energy is ourselves in transformation. A state of energy—an imagined form—and a real condition of mass are distinguished not from within the forms of the physical universe proper but from within the forms of existence. The expression $e=mc^2$ defines a condition of existence, not a condition of the physical universe only. It asserts that the imagined measure of the physical universe—energy—transforms with the real condition of the physical universe in constant proportionality to the speed of light, that mind and body transform quantumly (by analogy). In order to know the physical universe one must know, more fundamentally, that there is a dualism of mind and body, that in explaining the physical universe one is explaining the forms of one's existence, in the imagined conditions of the body or the physical universe, in transformation with the forms of mind or energy. Expressions defining changes in energy levels are cognitive recreations of the universe's masses in (actual) transformation. The physical universe thus has more to do with an existential universe than the concrete objects of the sciences. (While this epistemological discussion of the nature and origin of the physical universe continues to unfold in the following passages, it should be appreciated here that our religions have had a tradition of representing the transformations of mass and energy, or observing the fundamental nature of the physical universe, in the simple beholding of a lighted candle. What is observed in the action of a lighted candle is no more and no less than all the knowledge that the quantum theory of modem science seeks to explain—that which is beyond our knowing, the transformation of the universe.)

If this argument is disputed, to resolve the disagreement one must address the definition of the physical universe from outside of the knowledges of the classical sciences. Appropriately, a definition extraneous to the sciences proper is precisely the object of our discussion, for the sciences are premised on the universality of the aggregates of mathematics as a defining order of the forms of the physical universe, an order that is indistinguishable in mass or energy, leaving mass and energy (matter) irrelevant to the definition of what is ultimately real of our universe. Another way of considering this would be to require that one define the observations of the physical universe without relying on the forms of mathematics, which in turn removes one from the presumption of science, since the forms of mathematics are the analytical components of observable scientific reality. We are faced here with an epistemological problem similar to that encountered in a deeper understanding of the law of gravity. On the one hand, it is understandable that mass and energy certainly exist, serving as the basis of our observations of the massive order of the physical universe. On the other hand, it is perhaps even more immediately observable that we know in a very real way the aggregate orders of mathematics, orders which allow us, in turn, to know the physical orders of the universe. This contemplation, of course, is no different from that of Buddha's atom, or the difference between what lies in the middle of physical atoms and what lies in the middle of abstract points. In considering the nature and origin of the physical universe, and consequently the question as to whether or not matter is created universally, we must turn our attention to what is ultimately real of the whole of our existence, wherein both mass and energy (or matter) arise in the first place. We must do so because neither mass nor energy are fundamentally real, since they are known and observed by something that contains them—you, the reader.

To probe the ultimate reality of our universe in a scientific way, we must first establish a criterion by which we may determine what is real in it. By a simple methodology, one measure of reality could be taken from our ordinary experience as demonstrated in the following example. It would be considered unfair or unjust if a human life were taken at the expense of a tin can. This is not because neither the tin can nor the human life is real. It is because the human life is more ultimately real. The human life, for example, can create, through the actions of knowing and perceiving, a tin can, but the reverse is not true. As demonstrated by these extremes, there is a means of measuring what is real in terms of the origin of the form considered. In the case of the forms that can be known and perceived in a physical universe, a similar priority can be placed on what is real among them. If our knowledge of the physical universe, by way of its knowable and perceivable forms—mass, energy, and so on—can be explained only in mathematical formulations, or simply explained, then the nature and origin of the physical universe does not arise disconnected from such explanation. Over and above what we think conventionally to be a real physical universe, then, a more ultimately real form called existence itself allows for the very notion of a universe, since it allows for the aggregates of mathematics as well. For the present time, we will say that whatever allows for the knowing and perceiving of any form, the physical universe included, is a more ultimately real form than the form so observed. This is demonstrated in the observation that mathematical forms—equally as real to their observer, if not more so (by introspective knowing), as those of a classically real universe—are known coexistently with the scientific knowledges of the physical universe as initially understood in mathematical formulations. For the moment, we simply observe that what is contained in a basket is not larger than the basket itself—that is, the knowing and perceiving of a physical universe (or of any form) is not more ultimately real than that which enables such knowing and perceiving, or existence itself. Hence, contained within the forms of existence, in a lesser reality than that which enables existence itself, is the real physical universe. To draw any other conclusion would deny the universality of mathematics in explaining the physical universe, in which case one would have to deny the reality of one's very existence, which is contrary to scientific observation. Consequently, the forms of our physical universe are, in an ultimately real measure, adjunct in their nature to the forms of our existence, with existence defined for the moment as something that is enabled in the embodiment of the knowing and perceiving of the real forms of the world around us, or of the physical universe.

Referring back to Buddha's atom and what lies in the middle of physical atoms and abstract points, it is demonstrated here that, on a scale of ultimate reality, the aggregates (the mathematical abstractions of the mind) are at least equal to the perceivable transformations of our physical universe. Classical masses under the influence of gravitational fields of forces, small particles under the influence of nuclear fields or forces, charges under the influence of electromagnetic fields of forces, and, in general, mass in transformation with energy—the whole of the forms of the spatiotemporal universe in transformation—are scientifically knowable only in the aggregates of mathematics. What allows for the cognitive transformations of the aggregates in general is equally as real as that which allows for the perceiving of a classically physical universe. What lies in the middle of atoms or points is equally real in either case, and what allows for both atoms and points to exist in transformation is more ultimately real than atoms and points themselves, since the area they inhabit is the basket containing them, or existence.

Let us now expand the definitional bounds of atoms and points—masses and energies, space and time, and the whole of the objective forms of the physical universe—to make the discussion clearer epistemologically, at least representationally. In our conventional knowledges of the sciences, an equals sign often lies representationally in the middle of atoms (masses) or points, when, for example, one atom or point is equivalent to another. But arithmetic symbols also lie representationally in the middle of atoms or points, when, for example, one atom, point, or number adds to another. In still other cases, wholly varied representations of transformational order lie in the middle of atoms or points, in, for example, the expressions of differential equations, algebras, topologies, and so on, in other general expressions of the classically physical universe, balanced ultimately by an equivalence or some other transformational relation. An observation may be made about what lies at least representationally in the middle of atoms or points. An equals sign, it may be observed, is not by definition a representation of an object or an atom or a point. An arithmetic operator is neither an object, an atom, nor a point. Moreover, all of what lies in the middle of atoms or points is generally not itself an object. Representationally, what lies in the middle of atoms or points, or objects in general, is a transformation of atoms, points or objects and is not itself an object.

In the expressions of our analytical knowledges, the question posed here is whether we are representing things that we think exist or whether we are holding mirrors to ourselves to regard things that do not ultimately exist, pointing to our own intrinsic nature. If we are actually representing things that exist in and of themselves, then such expressions as equivalences, arithmetics, and so on would be unnecessary in our representations. Just as one object strung together with another, without a transformational representation in the middle of them, is a meaningless expression unknowable to anyone, so there is more to an equals sign or an arithmetic operator or any other representation of the transformation of the (physical) universe than science has appreciated overtly. The essence of what lies in the middle of atoms, points, objects, masses, or energies is their observer—you, the reader.

A representation of any knowledge is a representation of its enabling form, i.e., the creation of the physical universe. Ultimately, mass does not exist, except in the eye that sees it, the hand that holds it, and so on. Neither does energy exist except in what is observed to be its consequences in the mind and body, a product of a metaphysical dualism—a correspondence of form. No object thought to be real of a physical universe fundamentally exists—and a physical universe itself does not exist either when a measure of ultimate reality is considered. It is you, the reader, who exists and in your existence, particularly in your knowing and perceiving of it, a physical universe appears in the forms of the world around us. The objects observed in a physical universe—masses, for example—are irrelevant to the origin of the same physical universe.

Of all the knowledges developed in history, not once has one represented a single object that we can know or perceive without the object being placed, at least representationally, in transformation with another. Any meaningful expression of our knowledges is always represented as a transformation of objective form and not as an instance of an objective form, without the mind's assistance in placing it in transformation with another. This is because the ultimate reality of the physical universe does not exist objectively. The universe is not an object. Rather, the objects of a classically physical (or cognitive) universe are enabled in the knowing and perceiving of them. Two abstract points of mathematics gain meaning only in the transformation, or structure, placed upon them. Two masses (or the composition of one) gain meaning only in transformation with each other (or in the composition of the one) but have no meaning in and of themselves or their compositions without their observer. Energy, as an objective form, has no influence at all on a physical universe. What occurs in reality is the expression of the observer's existence in massive transformation, wherein the observer compares two conditions of matter as levels of energy. In all contemplations of the physical universe, precisely what we think is real—the physical universe—has never existed. What lies in the middle of atoms or points is the essence of one's existence, not a physical universe.

Though in the constructions of the unified theory, the forms of all of our languages are merged into a single grammar that places form universally on Being, it is important to recognize here that no expression of knowledge is any different from another in the ultimate reality of the universe—those expressions of the sciences included—since such an expression is made by the observer, who remains fundamentally unchanged after thinking and perceiving. A verb in the grammars of natural language and a function of mathematics (in the Cartesian sense) are one and the same form in a representation of what is ultimately real, in terms of representing the transformation of the observer's existence. A mass m and an energy e transform in the observer's existence, even in the linguistic representation of them, but above all, they do not exist in and of themselves without their observer. As objects, m and e have no meaning until they are represented in transformation with one another or until they are represented as ultimately real embodiments of the observer ($e=mc^2$). The physical universe is thus a form of existence, and not the other way around.

Since there must be further discussion of the sciences before arriving at the principal structures supporting the unified theory and science of androids, let us address directly the stated fallacy that matter is universally conserved and not created, for this discussion will lay the groundwork for an epistemological understanding of the universe. In Buddha's questioning in the parable recited earlier, space is not an object, whether such a space is a physical one of atoms or an abstract one of points. Space, time, or any other form of a classically physical universe is a consequence of the transformation of the ultimately real universe, or you, the reader—the observer. The calculus and the topologies of real numbers provide that in a single contemplation, there are infinitely many spaces or transformations of the observer's knowing or perceiving as objective forms approach one another. Consequently, known in the minds of just a handful of observers, there is more than an overwhelming abundance of spaces, or transformations of the universe, and that is without even considering their linguistic expressions or other experiences of a real universe. Matter, in the unified theory, is a substance of the mind or of the body, or in general of corporality, but does not exist objectively without the more ultimately real existence of its observer. In the well-known expression of the theory of relativity, $e=mc^2$, mass transforms with energy in constant proportionality to the square of the speed of light, but mass and energy do not at all exist in and of themselves; their transformations exist, and this is what is represented in the expression.

We now ask, what is more ultimately real, that which we classically think exists objectively in our physical universe—something occurring within the objectification of matter itself as an ultimately non-existent objective form—or that which has or allows for the meaning of our expression of it? What is real to the unified theory is the transformation of objective form (matter) and not objective form itself. You, the reader, are the reality of the equals sign in the aforementioned relativistic expression; you are what lies in the middle of mass and energy. You, or the essence of what you are, is what is real and that is why the expression has meaning to you. Take the equals sign away and see if mass and energy can transform, have meaning or even exist in a physical universe. Moreover, the preceding expression, $e=mc^2$, with a small amount of insight, can be seen to exist in the same form as the English language expression I am alive, since they each express the transformation of an observer in an ultimately real universe. In any expression of knowledge, the observer is represented and not the objects of transformation so conventionally thought to exist.

In order for matter to be conserved in ultimate reality, the universe containing the knowing and perceiving of the matter must be bounded or conserved. Though the articles contained within a basket are admittedly conserved, articles may be placed in it from the outside. If the ultimate reality of one's existence, which is beyond one's knowing, gives rise to the knowing and perceiving of a physical universe—a basic premise of the unified theory—then matter can be conserved only from within one's inertial existence. If, however, the way in which existence arises can be enabled, albeit synthetically, in the knowing and perceiving of a being, matter cannot be conserved even in the awareness of that existence; it must be created, since the universe containing it also enabled it. In order for matter to be conserved universally, the ultimately real universe (of one's existence) enabling the knowing and perceiving of the matter would have to be contained by the matter itself. Matter would have to give rise to existence, and we already have determined that existence, or what enables it, is more ultimately real than the matter known and perceived. Hence, matter is created in the presence of an enabler of beings who themselves know and perceive a (physical) universe.

In the expression $e=mc^2$, mass and energy, as objective forms of the universe, are not ultimately real. What is ultimately real of mass and energy is the observer's knowing or perceiving of them, i.e., existence, in the quantum moments of an ultimately real universe. The equals sign of the expression represents that it is possible, in an ultimately real universe, for the observer's knowing or perceiving of mass and energy to transform in accordance with what is expressed in the representation. The mass and energy, however, are not outside the windows of one's study during the contemplation of them. They are objects of what one knows and perceives inside one's study as a result of one's intrinsic existence, or ultimate reality. What is ultimately real of the physical universe is the existence of the objective forms—mass and energy—in the transformations of one's ultimate reality. Mass and energy themselves, however, are irrelevant to what is ultimately real. That is why they can be replaced with the aggregate forms of mathematics, or even with the English language nouns cat and dog, as in cat equals or is the same as dog (when four-legged creatures are considered). The observer's knowing or perceiving of mass and energy is what is ultimately real.

Regarding a classically physical universe, the unified theory does not dispute that, within the knowing and perceiving of an already-enabled existence, the objective forms known and perceived as mass and energy are conserved with each other in the expression $e=mc^2$. However, the theory does require that the objective forms of mass and energy, as they are known and perceived, are not ultimately real and thus do not describe reality. If the objective forms of one's knowing and perceiving are not ultimately real, it does not make sense to pursue their interminable objective definitions in a classical study of the nature and origin of the physical universe, since one would never extricate oneself from that which is contained or observed in that universe to discover its origin. If the objective forms of mass and energy are (classically) real only locally to the enabled knowing and perceiving of them—the observer's existence—and conserved only locally to an existence, it makes no sense to require that the ultimate reality of our universe be bound by the known and perceived forms of mass and energy or any other spatiotemporal constraints. These forms are, after all, said to describe what is observed and not the observer. If the observer who knows and perceives the objective forms of mass and energy is ultimately real in our universe, how does a lesser reality—the objective forms or knowledges and perceptions of mass and energy—cause that observer, who is ultimately real, to be bounded or conserved in any manner? It does not.

A mental exercise may help us demonstrate a pathway out of the objectivity of a classically physical universe. Let us contemplate for a moment a physical atom known in the conventions of contemporary physics. Further, within this contemplation let us hold in mind the smallest of small particles known to science—a small particle, say, within a proton. If there is one lesson to be learned from the discoveries of physics, it is that the axiom of the atom is not a definitive one, but is a rule that slides on form, an arbitrary point of terminal composition of the universe out of which other things are made and within which other things are found. Keeping in mind the momentary condition of this rule, or particle, let us visualize objectively a single entity that we call the smallest and most elemental particle known to science in the physical world. Now, consistent with our observations of how the particle or fragment of an atom got here in the first place, let us break up such a particle into an infinite array of smaller ones. One of these infinitely many smaller particles of the smallest particle known to science is what we now contemplate.

It cannot be denied that the particle that the mind can only abstract into existence yet can conceive as being a possibility of what is real, consistent with the discovery of the atom in the first place, is an equal to any other in the aggregate forms of mathematics. Whether we contemplate an earth and its moon or the smallest of small particles and another, their transformation is characterized by the same mathematics in either case. Matter, whether it is that of the earth and moon or of the smallest of small particles and another, is a transformation of an ultimately real universe; it is the equals sign of earlier discussion, or you, the reader. To claim that matter is conserved universally is to claim that you are conserved universally. In order for matter to be conserved universally, existence itself must be an objective form, or an object that can be contained (known or perceived) by another. The moments of the universe would have to be objects, since only objects, or objective forms of the universe, are bounded (by the knowing and perceiving of an existence). What is ultimately real of the small particle of this exercise is its observer, or you, the reader, and in each moment of this ultimate reality (the enablement of the observer) an unbounded or bounded universe can arise. Since the contemplation, or moment of the universe (of our awareness), can define what is infinite or unbounded, the occurrence of the ultimate reality of the universe cannot be bounded absolutely. The universe is created in every moment of it, boundedly or unboundedly, since its conception includes both conditions, and the unbounded condition requires creation. The occurrences of the knowing and perceiving of matter, or of any other forms of the universe—the moments of the universe—since they are or can be unbounded by the above analysis, are beyond our objective knowing by definition. Thus, to the extent that the universe is objectified, boundedly or unboundedly, in our knowing or perceiving, it is referred to as a classically physical universe, within an existence. Because when we think of the universe we conceive of the infinite, however, the ultimate reality of the universe cannot be conserved. The physical universe, which consists of the thoughts and perceptions of it, must therefore be enabled. The religions of the world refer to this as creation. Matter is consequently created in every moment of the universe and is known or perceived objectively by the bounding thought or perception of it, which is enabled from beyond our knowing. Each thought of such a particle of this demonstration, and each of our thoughts and experiences of the world around us, is a creation of the ultimately real universe and binds our very thinking or experiencing of it.

If, for example, one begins pondering the physical universe with the premise that its matter is infinite, there is no limit to the amount of matter in the universe. If one begins pondering the physical universe with the premise that its matter is finite, there is an amount of matter by which the universe is bounded. Our very thoughts of such things, however, are contained in what enables the thinking and perceiving of them. Another way of approaching this observation is to consider that one knows the forms of the infinite by knowing the forms of mathematics, which are comprised of instances of one's knowing their represented formulations. These formulations are known, along with the forms of our natural languages, in the embodiments of the ultimate reality of the universe. All objective forms of our knowing and perceiving, matter included, are contained in what enables them and in what enables our existence. If what enables our existence is itself unbounded, as we conceive it in contemplations of our own existence, we cannot say that the objective forms of our existence, including mass and energy, are conserved in the ultimate reality of our universe, since what enables them is unknown and therefore not knowably constrained. (We need only ask ourselves, are our thoughts bounded or conserved by our own knowing? That is, do we occupy the means of creating ourselves or our own thoughts? If the answer is that we do, we must consider that we must also have the means to know what is beyond our knowing, an observation that is a self-contradiction of obvious proportions.)

We can say then that what we generally refer to as matter (mass and energy) of classical scientific theory exists ultimately in our knowing and perceiving of it. The sciences, and indeed all of our knowledges represented by them, prove this observation if we consider what is ultimately represented in them—the transformations of the objective forms that are known and perceived in our existence. As a result, the matter of the physical universe, along with all other objective forms known and perceived of it, arises from beyond our knowing. All forms of a physical universe arise differently in each and every one of us, and this is what the theory of relativity explains if it is extended epistemologically to the postulates of the unified theory—that the events of the universe are perceived objects that require the constancy of the speed of light, since light is a medium of perception; or, the epistemological forms of mind and body transform quantumly in the moments of the creations of the universe. (This observation is discussed further later on.) What we broadly refer to as matter of a physical universe is actually the creation of the universe, or of ourselves. Otherwise, how would one explain the difference between Newtonian and relativistic universe—on the basis of history, by which it would be understood that the physical universe changes in its form to suit an era? The beliefs of the world's religions in the creation of existence and the objective transformations of the physical universe observed by the sciences in the transformational occurrence of the objects of the world around us, massive or otherwise, are brought together in the postulate of the unified theory that matter is indeed created, though matter is redefined in the theory as the ultimately real occurrence of its observer. The bodies of knowledge of science and religion can thus be merged in the unified theory on the basis of whether the knowing and perceiving of any objective form of the physical universe can be enabled by another. Hence is established the science of androids.

In every epistemological atom, or transformation of an ultimately real universe, new matter is created as a moment of an enabled existence, or universe. This, moreover, is why the small particle of contemporary physics unfolds into an infinity of transformations characterized by the wave equation when one contemplates the origin of objective form or the objects of atoms. The causations of the universe are equivalent to its creations. An ultimately real universe cannot be conserved regardless of how resolutely one tries to compress it into a thing called an object or an objective form—an atom. The transition of a particle to a wave is an objectification of what the world's religions call the spiritual knowing of creation. The physical universe abides by the creation of matter, not its conservation. The simple transitions of the energy levels of electrons create new matter, the matter of the wave. This is not to be taken as a play on words, since the true play on words occurs when we determine matter to be a thing or an object. It is our objective view of the world that is backwards, not the unified theory, which takes into account what is ultimately real about objects—their enabling transformations. Each instance of a transformation of an ultimately real universe, represented in any of an infinity of knowledges (the equals sign or what lies in the middle of atoms or points is one instance) is a potential instance of enabled knowing and perceiving in the physical world of the enabler.

In every thought and perception of a physical universe, matter is created and boundless energy released, since neither mass nor energy exists universally in the ultimate reality of the universe. It is only in the world around us, which is not unique by far in the ultimate reality of the universe, that matter becomes constrained and conserved objectively. If it is known and perceived that matter—an arbitrary rule on elemental things—transforms in relation to the objective forms of forces and inertial accelerations, then such matter is bound by Isaac Newton's inertial world. If one knows and perceives matter invariably in transformation with energy, one obtains the matter of Albert Einstein's relativistic, though epistemologically inertial world. If one knows and perceives matter (or particles) as releasing or absorbing energy in the infinity of transformations of the wave equation of quantum theory, one obtains matter in the ways of contemporary physics, from which the chemistry of the periodic chart is obtained. And if one knows and perceives matter as an objective form representing a thought or perception, which unfolds in the knowing or perceiving of it into infinities upon infinities of transformational instances of the creation of other thoughts, and matters of a universe—physical or otherwise—in the nature of existence itself, one catches an early glimpse of the unified theory of knowledge and the nature of the analytical forms that are to come. Matter, as a transformational form of an ultimately real universe, is not an object or objective form, and cannot be universally conserved. Space and time, epistemologically no different from mass and energy, are two of infinitely many transformational forms in the ultimate reality of the universe and exist in the enabling of them. The space and time of our temporal existence (the extent of the universe) are created, universally, in the enabled transformations of the ultimately real universe; they are the products and not the processes of creation.

As a simple point of interest, an androidal being, whose form will evolve over the course of this book, is undoubtedly a novel device in regard to the aforementioned principles of the creation of matter, for an android is a perpetual motion machine of conventional scientific viewpoint. In order for either a Newtonian or a quantum mass to be in motion perpetually, it must be driven perpetually or must be transforming in and of itself with a boundless source of energy. In the classical view of the physical universe, it is not possible to obtain energy in an unbounded way or to move a mass perpetually, for mass and energy transform conservatively within a given existence. In the case of an android, however, since both mass and energy-and indeed the spatiotemporal extent of the universe—are derived from the enabler's creations (thoughts and perceptions) in the enablement of an existence, the perpetual motion of a mass can be enabled in the creator's knowing and perceiving of the android in its real embodiment in the perpetually created universe. If our thoughts and perceptions are unbounded, those of the android can be unbounded by design.

In our real existence, for example, we can integrate a sum of infinitesimally small volumes within the space of a physical atom as a description of reality. This is no different from saying that we can integrate the volumes of physical atoms in the space of the earth, since each are hypotheses, though from different perspectives. Such a reality, however, is a reality of mind, since there is no ultimately real determination of what is infinitesimal or of what is an atom or the earth, which is precisely the point of the calculus (as well as other branches of mathematics and science) and of the unified theory. What is ultimately real in our universe is the existence of the transformations defining the calculus in the observer's thinking—the reality of what enables the observer to think in defining the integration. What is not ultimately real, however, is the thought-to-be real physical forms explained in the integration. According to the unified theory, if what is ultimately real is the observer and what is not ultimately real is that which is described by the integration, then it is the physical world that is imaginary (in terms of what is ultimately real), an observation that comports with those of the religions of the world. In the observer's ultimate reality, we take the infinitesimal volumes or particles of the above example and call them masses and energies—or forces, momenta, and so on. Because it is in the observer's knowing that masses, energies, forces, and momenta (matter) are created, in reality, a perpetual motion machine (like the above integration) is enabled from the observer's existence, with the machine having infinite motion, duration and extent by design. The fact that the observer's thought-to-be real physical world (the integration of the space of the atom) is constrained by the limits of integration is irrelevant because it is the infiniteness within the limits, which by definition is a scientific description of reality, that itself is taken to be the defining analysis of mass or energy. Within the space of a real physical atom we enable the infinite motion of a mass called a volume proper (though any definition of terms would suffice). The key to understanding this principle is to grasp the point that the machines of our classical physical reality, whose motion is constrained only in the observer's knowing and perceiving, are the erroneous forms of the universe and do not exist except in such knowing and perceiving. This is why their fundamental definitions can change through the ages. What is real of them is what the observer thinks and perceives of them; otherwise, once again, one must believe that the physical universe has changed its fundamental form since the time of Isaac Newton and the advent of quantum physics. Since reality is embodied in the observer's knowing and perceiving, it is knowing and perceiving itself (existence) that is extended in the forms of a world around us in an android—a machine set perpetually in motion by the design of its enabler. (These principles will become clearer as the science of the creation of synthetic beings unfolds in the ensuing chapters.)

The postulates of the unified theory regarding the nature and origin of the universe are profoundly different from those of our conventional scientific knowledges, though they are not at all in conflict with them. Since the unified theory begins its analysis with an interpretation of what is ultimately real in our universe, the integrity of all conventional knowledges is preserved in the knowing and perceiving of them, and they remain valid to an embodied existence. The compatibility of the unified theory's postulates can be seen at least intuitively in acknowledging that, of all of our knowledges, not a single objective form OT transformation thereof is changed by the theory. We do not propose, for example, that $e^1mc^2$ or that $2+2^14$. Rather, the theory claims that the respective statements are true only in the knowing and perceiving of them, or relative to their observer.

3. An Epistemological Interpretation of the Physical Universe

Mass and Eergy as Moments of their Observer

Though it may be at least marginally understood by now that matter is not conserved universally and is created in the ultimate reality of the universe, what may remain unresolved to the reader's understanding is the metaphysical sense that mass can be touched and that energy cannot. In order to prepare for subsequent passages, the whole of the conventional sciences must be incorporated into the philosophical understanding we have of our own existence. Mass and energy, or generally the spatiotemporal order of the physical universe, must be shown to be forms of their observer if we are to create androidal beings who know and perceive, among other things, mass and energy. This consolidation of the sciences and philosophical tradition may be accomplished by showing how classical and quantum physics can be superimposed onto each other as one and the same explanation of the observer of the universe in an epistemological interpretation of matter as a form of existence in the unified theory.

As a preamble to this discussion we may consider why point masses, and collections thereof, or even centers of mass (of gravity), point charges, and so on, are essential to the classical description of the physical universe. If one were to review all the physics journals ever published on the massive universe in search of a single instance proving the ultimately real existence of mass, not one inference would be drawn to give evidence that mass exists apart from its observer, or is even relevant to the occurrence of the universe. What is described in a classical analysis of the universe is the transformation of the universe, or of (a) mass, in the belief that the mass exists in the ultimate reality of its observer. The unified theory is not primarily concerned with, for example, how light is diffracted through a prism, however; it is interested in where the prism comes from in the first place. Our conventional study of the physical universe axiomatically implies the existence of the objects, or masses of the universe—an assumption that is not made by the unified theory. A point mass is essential to our classical understanding of the physical universe because if it actually existed it would be an intrinsic form of the ultimately real universe, which enables the objects of the universe. In such a case, however, it would not only be a thing, or an object of an observer's perception; it would be an observer. In order for a thing to exist, one's own self must exist, and in the transformation of one's self, a thing arises in the knowing and perceiving of it. This hypothetical review of physics journals would then prove one idea—that mass has never been defined absolutely because its observer has never been defined absolutely. A point mass, a thing or an object of one's existence (perception and knowing) is not a point mass at all when it becomes an intrinsic form of existence, apart from its observer; then it becomes an observer. The expressions of physics define transformations of one's existence and of objects enabled in the embodiment of one's existence. One cannot know a mass, a space, a time or any other physical form—in ultimate reality, that is—because one cannot know one's own existence. One can enable the knowing and perceiving of such forms, however, in the creation of other, synthetic beings, as will be demonstrated later on.

A classical mass does not exist even in its conventional representation if it is not in transformation with one other or with a field of forces or some other physical phenomenon. If there is no force of gravitation, of coulomb attraction, or of strong or weak nuclear forces, neither a mass, an electron nor a proton can exist in our knowing or perceiving of it because we cannot know it without its being in transformation. Isaac Newton's mechanics, James Maxwell's electromagnetics and Albert Einstein's relativity describe forms of existence, ultimately real transformations, but these theories do not describe actual masses, currents and small particles in an ultimately real universe. These historical formulations do not describe a universe that exists apart from you, the reader, since no extrinsic universe exists apart from its observer. Point masses are employed in classical definition of the physical universe because what is described in classical and quantum physics is the transformation of objective forms that are known and perceived and the point masses are the necessary (non-existent, in ultimate reality) objects of the transformations, but the point masses themselves do not exist ultimately. What is relevant to classical and all other definition of the physical universe is the transformation of mass and not mass itself. In the conventional formulae describing mass, it is the transformation of mass, or of the existence of the observer, that is described. What we are defining with the use of mass in classical study is a general rule of what can be known and perceived scientifically of the physical universe, not the physical universe (e.g., the physical universe is an object of our knowing representing all of what can be known and perceived and is beyond our knowing and perceiving in totality).

Also in connection with our reliance on point masses of conventional theories of the universe, or ultimately non-existent objects of perception, we can peruse the same physics journals and endeavor to explain why light transforms at non-existent point objects of the physical universe, or why the objects that bend light cannot occupy space in the analysis of them. In all of our scientific knowledges, nowhere is it explained how even a simple teacup, placed on a table in front of us—most assuredly a real object of the physical universe—exists and at once transforms light. Neither can the scientific literature that addresses directly how an object of our perception—like a teacup or a prism—transforms light explain why it is that we cannot see the transformation of light at or within the object. Light, according to the literature, is said to be refracted at a point, an object by definition that does not occupy space but defines space in its relation to other points. An electron or other small particle is not said actually to discharge light; a change in energy levels causes light to be emitted from the particle. This awkward description of reality, however, has never proceeded to explain what from the particle means. For example, we may ask, is there a special device within the object of an electron, consistent with the ad hoc definition of a photon, whose purpose it is to do the objective transforming of an object into light, such that from it would mean from the embodied device of the electron, or a photon? According to these observations, wherein light is thought to transform or bend in relation to itself through the medium of an observed object like a teacup or a prism, or wherein light is emitted from an object, all classical definitions rely on the non-existence of the object, in either the absence of analytical definition of the teacup or prism in this example or the conjuring of a photon or light-emitting device to transform an object into light proper.

The reason that light must transform at a non-existent point object of the universe is because the physical universe is a transformation, and not an object—a transformation of the ultimately real universe in the enabling form of a perception or knowledge of an object. A teacup, an electron, a photon, or even a ray of light does not exist in the ultimate reality of the universe; perceptions (and knowledges) of them exist, or are enabled, in the ultimate reality of the universe. Though more discussion follows, objects are the perceptions of them, and perceptions are the products of ultimately real transformations of the universe. Light must bend (or be created in the conventional sense of emission) at a non-existent point because a transformation of the universe is a non-existent point, beyond our perception—an embodiment of a moment of the ultimately real universe enabling an object and the perception of it.

In merging the classical scientific explanations of mass and energy—Newtonian and quantum physics—into the epistemological views of the ultimate reality of the universe of the unified theory, we must consider the fundamental nature of the objects of the universe and, though any of the innumerable point objects of the universe could be contemplated, why our classical studies of the universe are concentrated on the determination of the phenomenon of light—why the speed of light, for example, even has a bearing on the objects we perceive and attempt to define scientifically.

In comparing these classical explanations of the universe, we must first resolve what is meant by a small particle of physics. In Newtonian physics, particles are big. They are big because they are perceivable to the human senses. A classically big particle, or mass, is defined in the representations of the transformations of an observer's perception when space, time, force, momenta, and other spatiotemporal phenomena are considered to be the terminal objects or objective forms of the medium of perception—objective terminations of the physical universe. This classical Newtonian definition implies that light—the enabling medium of the visual senses—is not a direct analytical consideration in the behavior of the classical mass. A Newtonian mass, for example, can be said to reflect or refract light as an object but the medium of light itself is not a consideration in the behavior of the Newtonian mass in the universe, other than the implied enabling characteristic of the light to perceptions of the mass. The formulae of classical Newtonian physics therefore pertain to the behavior of masses already enabled in the medium of light. Given two or more masses perceivable as a consequence of their enablement in an observer's existence in the medium of light, classical Newtonian physics describes the causal or compositional interactions of the enabled objects or masses in explanations of their spatiotemporal orders.

Another way of understanding the epistemological view of a big particle or mass is to consider the enabling medium of sound, wherein the masses are acoustic sounds. Classical physics would describe the causal relations of the sounds, such as words, once they are enabled, or would define spoken language, which is enabled in the medium of sound. The objects or words would then relate to each other in the medium of sound. By analogy, the medium of sound would be the medium of light and the classical masses would be the enabled sounds. Big particles, or classical masses, are then enabled objects, or things that are observed in one's existence, given that one's existence, with all its attendant perceptions, is enabled in a medium, herein light or sound. The important point to consider about classical Newtonian masses, then, is that the medium in which they are enabled—sound or light—is not what is under observation in the constructions of the classical formulae. What is implied in the classical Newtonian definition of a physical universe is that once a mass is enabled in the medium of light, for instance, it transforms in that medium, and we exist knowledgeably and perceptively in a Newtonian world order.

Small particles, on the other hand, are particles that defy all classical definition because we push the notion of an object or mass so far in objective analysis that the essence of its definition is that it cannot be perceived, or is not classical. The reason that small particles cannot be explained by classical Newtonian physics is simple. Whereas big or classical particles are already enabled in some arbitrary medium—typically the medium of light—small particles are the medium of the big particles or the medium of light in which one's perceptions of the universe are enabled. Small particles pertain to the enabling medium of the observer. The small particle is known and perceived (or not known and perceived) as that which enables the big particle of perception, which is expressed in the contemporary knowledge of a particle becoming a wave of light. A small particle, in terms of classical physics, does not even exist. In quantum physics, the essence of the small particle—not its massive Newtonian characteristics, but its elusive transformational properties—is that it is a wave and not a particle; it is an enabling medium to a big particle. The classical theories of the universe meet when we contemplate the creation of existence, or the enablement of the knowable and perceivable objects of the universe. From an epistemological standpoint, classical and quantum physics are one and the same knowledges, since it is the nature of the observer, who embodies the transformations of all objects or objective forms, that defines either viewpoint. How one objective form transforms with another in the equals sign of our expressions (of waves or Newtonian laws of motion) is the same epistemologically in either case. Hence, any enabling medium, that of light included, is the medium of the knowable and perceivable universe of a classical form.

The essence of the small particle of physics is unknowable concretely, or it simply vanishes into transformations of the wave equation of light, because knowing it would require the comprehension of one's own enablement, which, by the very same physics, if not ordinary observation, is not objectively possible. To obtain the nature and origin of the small particle, and not simply the causalities of observable physical forms in relation to others, one must turn to the enablement of existence, or to a (unified) theory of knowing and perceiving in general—a science of androids; one must obtain an epistemological view of the universe that defines how all form can arise in general in the existences who know and perceive the universe. New forms that reflect insight into the nature of the universe as existence must replace those of classical scientific expression in order to penetrate the nature of what the sciences seek ultimately to explain—the nature and origin of the physical universe. If one considers an electron to be enabled, it will transform in the observer's knowing and perceiving of it in classical formulae, in which case it is a big particle. If one considers an electron to be the enabling medium of light, however, the interpretation of the big particle changes significantly. New objects—creations of matter—are required that probe the essence of all existence. The wave-particle duality of quantum physics and the perceivable object of Newtonian physics thus come together in an explanation of existence, where the enablement of the perception of the object can be found.

The wave equation of light, if one chooses to interpret it in this manner, provides for an infinity of objects or masses in the transformational existence of waves, since there is no difference between the transformations of mathematics describing a wave form and those describing a big or small particle in its objective or classically massive condition. A point of mathematical space is undefined and so becomes defined in the structure imposed upon it by the mathematician. Whether such a point is defined as a wave or a particulate mass is epistemologically irrelevant. In the case of the wave equation of quantum physics, the objective forms enabling the universe—space, time, force, mass, and so on—are viewed as transforming in the expression of the wave equation. Space, time, force, momenta, and other spatiotemporal parameters of the wave equation, however, are the same objects characterizing the objective masses of classical physics in the Newtonian order of the universe. The quantum theory therefore deteriorates epistemologically. If space, time, force, and momenta (and other spatiotemporal phenomena) are the classical objects of perception of one's enabled existence, enabled in the medium of light, for instance, and one formulates a wave equation describing the medium of light using them, it must be recognized that these objects of the observer's perception were used to define the universe in both cases. The quantum theory, in explaining the same physical universe of classical physics, uses the same objects by which we know and perceive a classical Newtonian universe—space, time, force, momenta, and so on—to define the phenomenon of light in which the universe is enabled. This phenomenon, however, is not at all a physical one, or one of classically scientific origin, for light is an enabling medium of human sense, enabling the perceptions of classical objects. In the quantum theory, we inadvertently supply new matter or masses, called the transformations of the wave equation, to replace the old big ones we observe classically, without recognizing that it is neither the object enabled in light nor the phenomenon of light itself that is ultimately real. When we consider an electron, for example, we consider a classical mass. When we consider the quantum behavior of an electron, we consider the medium of light, or a different object, namely that of the wave form. In both Newtonian and quantum physics, it is the transformation of any object—of classical masses or of waves—that is ultimately real, not the object defined. Since we require that each theory describes the physical universe—both the object and its enabling medium—we simply contemplate creation (what is represented in a lighted candle). Regardless of how many small particles and waves we subdivide the universe into when we study it, since the universe is created in the moment of its observer, we contemplate, redundantly, the creations of the universe. In a simple teacup or prism there are an infinity of creations or moments of the ultimately real universe—in each of which a ray of light may be bent. This is why we cannot count the number of light rays impinging on or emanating from an object; only the transformation of the object exists in the infinity of moments of the universe.

Matter, or light, behaves quantumly because we behave quantumly. The transition of a small particle to a wave (the emanation of light caused by the drop of energy level of the particle) is not a scientific episode; it is an existential one. The quantum theory, thus, cannot be relied on for an explanation of the ultimate reality of the universe because it is not founded on a tenable proposition. The theory presumes that it is possible to enable one's own senses, and therefore one's own existence, from what is sensed. This is why we are puzzled when a particle becomes a wave; we are attempting to experience objectively our own creation in a burst of light and the disappearance of an object. We conveniently overlook the fact that we conjure up the analytical wave forms of the wave equation in which classical masses are enabled in the same existence that knows each of the forms in both cases. Most assuredly it will be an enigma that matter is sometimes a wave and sometimes a particle; transformations of the universe can be embodied but cannot be observed objectively. Precisely where we think we have defined something substantive concerning the nature and origin of the universe—the quantum theory—is precisely where its nature and origin will be revealed, though not from the standpoint of the classical sciences, but in the nature of our existence itself.

The quantum theory does not explain creation; it observes it, just as we do in the reverence we pay to the symbolism of a lighted candle of religious worship. What is fundamentally encountered by the quantum theory—the transformation of a particle to a wave—is no more and no less a contemplation of the linguist's dilemma, or the meaning of existence itself. The quantum theory cannot be advanced in terms of an explanation of the nature and origin of the universe without our religions, however, because of how it is ensnared in its own thinking and because it does not incorporate the nature of our existence, or the observer, into its axiomatic foundation. To begin with, the quantum theory accepts the existence of big particles, understood here as the transformations of the observer in a Newtonian world order. It accepts that fundamental to our existence are the objective forms of space, time, mass, and so on—things that are observable to our senses in a big way. In the reasoning of the quantum theory, however, the big particles of the universe are said to be altered by the postulates of the quantum theory in such a manner that when a big particle comes to be considered small, beyond the knowing and perceiving of a classically Newtonian order, or when space, time, and the other objective forms of our perceivable (spatiotemporal) existence transform in such a manner that the velocity of a classical mass nears or reaches the speed of light, it becomes a sort of a mass, an emission of light, a wave, a photon, or some other object or aspect of the continually unfolding postulates of the quantum theory. In other words, we do not know what a small particle is in the conventional sciences because its essence just isn't. The essence of all small particles is that they are an infinity of moments of an ultimately real universe, each of which is a transformational moment of creation, arising from beyond our knowing. (It also should be appreciated that when we claim to enable light, or cause light to be emitted from an object, say in the apparatus of a cathode ray tube, we do not enable anything in an ultimately real sense, since the photon or energy bundle of the object emitting light transforms, beyond our knowing, with what we refer to as light proper, or the light emission. That transformation—of photons and light—in such a case is the ultimately real transformation. Epistemologically, there is no difference between an object emitting light—i.e., a point source creating light—and an object refracting light—a point object bending light—since what is ultimately real of these instances is their enabling transformations.)

In our study of the physical universe, the objective forms of Newtonian physics—space, time, mass, and others—make a transition in our thinking to the quantum theory because the quantum theory ponders, perhaps inadvertently, what enables the forms of classical physics in the first place. Since what enables any form is the embodiment of its transformation, the theory turns to a new formulation of transformations called waves. This is not to say that such waves are not real to the observer; we simply point out here the fact that the theory contemplates the source of classical forms and relies on them as well. The quantum theory, by probing deeper and deeper into the smallest of small particles, is forced, by the ultimate reality of our universe, to devise a handful of new transformations—i.e., waves—whenever a determination is made describing the objectification of a transformation. The theory thus contemplates in its logic that, from within the objective forms of a world around us, one can find a cause of that universe. In the quantum theory's reliance on the forms of classical physics, it is in error in determining the nature of all form, since the theory requires that in the extrinsic forms one observes one will find the nature and origin of what makes one observe them. Hence, to speak of the phenomenon of light, one must speak of the enablement of one's existence, or at least, of the visual and tactile perceptions of human existence. When an emission of light is observed from a point source, for example, a conventional basis is established for the causality of light. Since the point source is an extrinsic form of the observer, however, it does not penetrate the causative nature of the universe or the observer. The contemplation of a point source of light presupposes and relies on the existence of its thinker or perceiver, whose causation is sought in the very contemplation. The question is, therefore, not what is an atom, electron or small particle, or what is the causation of one particle or wave on another, but what is the causation of the existence of the observer who contemplates such things and who arbitrarily creates wave forms in which explanations of small particles c an abound. In other words, what is it about light that mandates the non-existence of objects or classical masses?

The quantum theory, if viewed epistemologically, explains that the classically transformable universe of space and time is not at all enabling to the existence of the very physical universe observed, for it is the observer's existence that is enabled. It further provides that an enabling medium of one's existence, in which objects appear, is unknowable and imperceptible to one's own existence. The constancy of the speed of light, along with countless other formulations of contemporary physics, determines that objects can exist only in a medium of enablement and that the medium of enablement applies only to enabled forms. The epistemological significance of this observation can be appreciated when it is recognized that classical objects of the spatiotemporal world are enabled. The speed of light is theoretically non-varying because in the enablement of existence, or perception, in the medium of light, classical objective forms are enabled to transform. In terms of our own enablement, a varying speed would require that classical objects transform, within the awareness of our own existence, between the very transformations giving rise to them in the first place, those that would in light require superluminal or subluminal speeds coupling objects enabled in the medium (i.e., this would require the amplitudes of waves to be coupled, not in their wave forms, but in the space between their amplitudinal shapes, space which allows for the amplitudes under study in the first place). Such a condition would undermine the very notion of knowable and perceivable form, since it is the purpose of our knowing and perceiving to project in opposition separate or distinct objects in transformation. If the transformations of a medium of existence were coupled within the knowable or perceivable existence of the observer, the observer would be enabling other existences. To speak indefinitely of such a valid knowledge as the enabling of the enabling of objective forms serves no immediately practical purpose toward a resolution of the origin of the universe, since one eventually returns to the enablement of the transformation of single instances of objective forms—objects.

The speed of light is constant because such a condition is required so that one can know or perceive single or discrete objects in an existence. This is why we contemplate incessantly how event A can occur in relation to event B in the theory of relativity, in which each event or light source moves, according to classical theory, in relation to the other, under the relative constancy of the speed of light. Indeed the velocity of light is constant. It is also irrelevant to the classically perceived motion because the light enables the objects. This is like saying that one perturbation in a pool of water, the source of which moves according to classical theory with only one means of affecting another such classically moving perturbation (namely, via the ripples in the conveying or enabling medium—the water), has a motion relative to the other which disregards the additive influence of its own velocity and that of the ripples of the water, or its enabling medium. Of course, the ripples in the water are not additive to their point motions; they are the only means by which the two events or point sources know of each other. The classically perceived motion is placed, artificially, by the thinker or hypothetical enabler, in a condition of reality wherein the enabler thinks simultaneously about the coupling of the two point sources and the two point sources themselves. To the two point sources, however, there is only the motion of classical mechanics, namely that of the other, and this motion is enabled in the medium of the ripples in the water. The ripples in the water are the objects and one or the other cannot see the additive influence as described because it is a ripple. If the enabler removes the ripples in the water, one point source would not even know the other existed. In fact, neither would exist. It is the motion of the ripples and not directly the motion of the point sources that characterizes, quantum physics in the nature of the medium of light. The physicist, acting as an enabler of existence, sees contemplatively both point sources and the enabling medium that causally couples the sources, and this is what instigates the confusion in the relativistic interpretation of the physical universe.

Considering the quantum physical universe, if one examines an electron or any other object, big or small, one typically approaches it first through the medium of the visual senses and second through the transformations of the wave equation and light in regard to the enablement of classical objects, regardless of the stated postulates of the quantum theory. If one is referring to the classical motion of an electron, one is considering the motion of a big particle and does not directly consider its enablement. An electron can have momentum, position, even dimension, from a classical viewpoint. When one refers to the quantum behavior of an electron, however, one refers to the enablement of an electron, or the spatiotemporal properties of a classical object as enabled in the forms of the wave equation—forms that exist, ultimately, in the extant reality of the observer, who is incapable of self-enablement. At such a point, one no longer refers only to the forms of the classical and quantum theories of the universe and must rely on a more ultimately real explanation of the universe.

The ultimate nature of the universe is therefore not classically objective in Newtonian or quantum definition, and attempts to reconcile it as such are not logically productive because the enabling characteristic of light, for example, would have to be known from an objective standpoint in one's own existence, or the physicist would have to see the connection between the perceptions of one's visual senses and the thoughts of one's own existence, or simply would have to enable one's own existence. In studying the nature and origin of the universe, it should be recalled that the objects of the medium of light provide for the objective forms of the classically visual world, and that objective masses are created in the transformations of the media, which cannot be enabled by the same observer. We know the objects enabled in light in more sophisticated ways than the quantum theory—for example, in natural language. When one says that in the quantum drop in energy level of a small particle light is emitted, one simply states that two energy levels or wave forms of light are possible quantumly in the universe and that such a universe is the observer's perceivable existence. But the energy levels of great nations in the political affairs of the (existential) universe also are possible in the medium of light, or existence, which must be accounted for in the physical universe. All of these transformations of the physical universe must be explained by a theory that addresses the nature and origin of our universe. As for the classical mass converting into light, such transformation is better seen from the standpoint of an enabler. The classical mass, in the observer's existence, is being compared to the non-classical mass, or wave form of the observer's own existence. Naturally, when one compares what one observes in one's existence—classical masses—to a knowledge of what is thought to enable one's own existence, definitional confusion arises, since the two forms are beyond each other's purview and the transformation of light (photon-wave) occurs beyond one's knowing and perceiving. That is why we revere what is symbolized by a lighted candle in the world's religions.

The essential point to keep in mind here is that objective forms, such as light waves, have as much of a right to transform in the universe as apples falling from trees; they are all knowable and transformable forms of the observer's existence. Light waves, however, are the enabling media of visual objects and when one refers to such forms one considers the enablement of what one will see in terms of a capacity to see, or speaks of the enablement of classical objects. Regardless of what objective forms are considered in one's existence, whether they are light waves of one's enablement or bouncing balls perceivable to the eye, it is important to recognize that classical objects are enabled in the transformations of the ultimate reality of an existence. It is within this ultimate reality that the quantum theory breaks down, since it is not possible to enable one's own existence. The difference between a classically physical object and a quantum one is that in the classical case, one considers the objects known and perceived in one's own existence, while in the quantum case, one considers the objects enabling the classical objects. The conventional assertion that a light wave, a knowable object of one's existence, holds in it the nature of the universe eclipses an understanding of what the quantum theory actually reveals—that all objects are enabled in the ultimate reality of the universe, from beyond the knowing or perceiving of the extant existence. To find the nature and origin of the universe, one must determine the nature of what enables one to know, perceive, or exist as a transformation of light (or other media), which is beyond our knowing in the case of human existence but is suitable within our knowledges for the construction of androidal existences, or observers.

4. The Introspective Observation of Ultimate Reality

Our conventional knowledges—the sciences, philosophy, and even the world's religions, to the extent that they concern themselves with a material world—never attain an understanding of the ultimate reality of the universe because of their preoccupation with extrinsic form, or the objects that are enabled as the universe, such as mass and energy, or even persons, places and things (of linguistics). The forms of physics, for example, are objectively boundless because they are premised on the causal relations among the extrinsic forms of an existence. An ultimately real universe—that which provides for the very notion of causation—eludes conventional studies because of the inability on the part of our traditional thinking to incorporate the observer into that universe. Obviously, for each existence of an ultimately real universe there are diverse theories of the universe that abound. As mentioned earlier, the unified theory of knowledge is not concerned directly with the extrinsic forms of existence, except, of course, to the extent that such forms are enabled. No theory of any order concerns the present one. The unified theory is concerned with what enables one to know a theory in the first place. The theory allows for analytical structure to be placed on one's knowing and perceiving in such a manner that the knowing of any theory is enabled in the synthetic forms of androidal existences. The ultimate reality of all existence is the focus. We are interested in the epistemological atom of the universe that allows for the transformation, as well as the knowing and perceiving, of all atoms of the physical universe, however they are defined from one era to another. At long last, then, let us demonstrate the relevance of this discussion to the constructive portion of the unified theory by introducing what the religions of the world have contributed to the sciences, what the sciences have proved beyond doubt, and what provides for the basic order of the universe and the most fundamental epistemological form of the unified theory, namely the moment of transformation of all objective form in the ultimate reality of the universe—the universal atom of all knowing and perceiving and, of course, of all knowledge—the universe's eternal moment.

In presenting the principal form of the unified theory, let us first consider not only the theoretical possibility but also the practical necessity of merging the knowledges of science and religion under a single unified theory of knowledge. It has been demonstrated that the physical sciences, as reflected in the classical and quantum theories of the universe, do not account for the ultimate reality of their observer's existence. A universal structure of all knowledge derived exclusively from the physical sciences would therefore be too confining epistemologically, since there would be other realms of knowledge—linguistics, philosophy, the cognitive sciences in general, the political sciences, biology, medicine, economics, and our ordinary experience, to cite a handful—that would not be included in its contemplations. We require an analytical structure that carries with it the wisdoms of all knowledges, though centered on the convergence of science and religion, because of their ancient traditions, in an explanation of the ultimately real form of the universe.

Considering first our modern analytical approaches to the forms of the universe, it is no chance happening that branches of mathematics are emerging, such as category theory, wherein the relations of mathematics are categorized on the basis of their morphisms, or capacities to represent correspondences. Neither is it a coincidence that the realization theory of physics, concerned with determining the analytical realizations of physical forms, as well as other new approaches to the definition of forms of the universe, such as systems theory of applied mathematics and engineering, are beginning to characterize the physical world based on the single observation that the objects of a world around us arise in the nature of correspondences of form, as opposed to the absolute objective determination of it. We observe, then, that in our recent efforts to define the forms of the physical universe, in which the notion of the correspondence of objective form prevails over the notion of the absolute objectification of it as a compositional form or knowledge, the fields of mathematics and the sciences, collectively, are nearing a discovery of the nature and origin of the universe already espoused by our religions, though still enmeshed in the traditional presumption of the universality of objective form. The non-existence of objects in the ultimate reality of the universe, whether the observation is encountered in the small particles or waves of the quantum theory or in a contemplation of what lies in the middle of two points or atoms, is also becoming the new reality of our modern sciences, though not explicitly accepted. We thus simply observe that our sciences, in pursuit of the ultimate reality of the universe, are discovering that the nature of the universe is contained more in the transformational nature of our existence than in the objects that are so thought to exist in the world around us.

These recent observations of modern science and mathematics, however, go nowhere by themselves to assist the linguist in resolving the dilemma faced in determining the nature and origin of meaning and, by extension, the meaning of existence and all forms known therein—an epistemological knowledge of the universe. We must extend their postulates, encompassing all knowledges and perceptions of human existence, in order to facilitate the creation of an observer. In merging all knowledge, the nature and origin of our very thinking of the universe, as manifested in our languages and in our introspective knowing, must be considered, along with the realities demonstrated by our sciences, in a study of the bounds of what we can know or perceive. Toward this end, we observe that in the linguist's conventions, a distinction is made, as discussed in the introduction, between the syntactical and semantic forms of language, along the lines that the semantic form of language, if discovered, will reveal the presumed origin of all meaning and thus the meaning of existence—and will afford the creation of androids. The objective form used to represent the universal transformation of the ultimately real universe, and indeed of the physical universe, must then be the same form that symbolizes the semantic origin of all forms of language, or meaning itself, including the meanings of forms known in the sciences and the world's religions. The meaning of any knowledge must converge on this single expression characterizing the nature and origin of the universe.

In determining this ultimately real form of the universe, we observe that no meaning of any form of the universe expressed in any language is possible as a universal characterization of ultimate reality if it does not inherently account for all that is and can be known, and for what permits the very knowing of it. We recognize, then, that the knowledges of the sciences, of linguistics, and of ordinary contemplations of the world around us are inadequate frames of reference from which to sketch a universal representation of the ultimate reality of the universe because they inherently compete with and exclude the others. In recognition of all knowledges, we observe that in our observations of the world around us—at the center of it, found through our introspective awareness—we can identify the essence of human being, or what our religions refer to as the spiritual center of the universe—the soul, a form that transcends knowledge and perception in any order, scientific, theological or otherwise. Moreover, we observe that when the objective mind has exhausted its capacities to know, tinkering with every object of our physical and otherwise universe, and when the mind is so hard pressed beyond its ability to answer the question From where does the physical universe arise? it is to the nature of the soul that one turns—within one's own intrinsic self, to what lies in the middle of atoms and points and what embodies all moments of the eternal universe. This, again, is a knowledge we do have and so it must be accommodated by the unified theory, along with all other things we know, in a universal interpretation of them all. We then change the attitude and tone of this passage to reflect a most fundamental observation of the unified theory—that all knowing and perceiving, and, therefore, all knowledge known, arise not in any objective forms we may know or perceive, but in the universal nature of the soul. We observe that knowledge—whatever may be known—arises from within us and from beyond our knowing in the embodiment of the eternal transformation of the universe—Soul, though as scientists we call this spiritual center of all universes that which lies in the middle of atoms and points.

Our universes of mind, of physical matter, and of the whole of the reality known and perceived by corporal existences arise, in knowable ways, in the introspectively observed transformation of the universe referred to as Soul. Hence, the objective form for which we have searched in the unified theory is the objective form of the soul, and, by extension, the objective form that characterizes the nature and origin of all meaning, including the meaning of existence, and thus the nature and origin of the physical and otherwise universe. Consequently, the analytical, or knowable, form of Soul is an objective form that is used by the unified theory to deconstruct all knowledges and perceptions and to place knowable structure on the causations of all objective forms of the eternal moments of the universe. In this way, science and religion, speaking about the same form in different ways, come together in the nature of the soul, or what lies in the middle of atoms or points, for it is in the nature of the soul that the forms we know and perceive in the world around us are enabled in the ultimate reality of the universe. The eternal existence of the soul as the enabling center of all form is a most fundamental precept of the unified theory of knowledge, and is what provides, later on, for the epistemological basis of the creation of synthetic beings, or androids.

The single most universal objective form presented by the unified theory is the knowable expression of the soul, or that which characterizes all transformations of objective forms, and thus the knowable and perceivable universe, as observed introspectively. Since the sciences take as their measures correspondences among objective forms in determining the nature of any form, we shall take, as a universal form to which all other forms of the universe will refer, the paradigmatical structure of existence itself—the introspectively knowable form of Soul. We take as our highest measure of the ultimately real universe the objective form of Soul on the premise that it has a universal epistemological construction in the existences of all beings and thus in all enabled universes. Though one's own soul is analytically beyond one's knowing, it should be recognized that this is precisely the point in using its objective form as a paradigm of all form in the universe. The soul is what lies in the middle of all things—things we know and perceive in the world around us. It characterizes the eternal embodiment of all our knowledges and everything that can be known, and provides the ability for one to comprehend with clarity the enablement of synthetic forms of existence, forms that are extensions of our own corporal being.

In the world's religions, the soul, considered the introspectively knowable form of the ultimate reality of our universe, is said to provide for the opposites of the world around us, and paradigmatically, the opposites of two terminally objective forms of our introspective knowing of the eternal universe—one, a universal objectification, or object, of the universe itself, and the other, an objectification of the universally occurring opposites in the transformational nature of the universe. The first objective form of our knowable ultimate reality, considered to be the objective form of what is beyond our knowing objectively, is typically referred to in religious doctrine as Being. Being, while we ascribe objective form to it for the purpose of the mind's understanding it, since it is beyond our knowing, requires no further discussion. To examine the universal objectification of the universe—Being—further would place us in conflict with the very spiritual knowledges we seek for our guidance in understanding the ultimate reality of the universe in the first place. The other terminal objectification of the universe, itself an opposite, is the objective form of what we knowably are or observe ourselves to be, herein referred to as non-being, a universal transformation of the opposites of the world around us. Non-being is what occurs in our introspective knowing in the objective offset or cognitive separation between Being and non-being. In the unified theory, all form is correspondent to the objective knowing of the separation between Being and non-being, a separation between self and beyond self, a condition of the eternal universe which defines the introspective awareness of one's soul transformationally.

Because one thought leads to another in the quantum order of the universe, allowing no basis from which to begin or end an analysis of objective form, all thinking and all perceiving can be matched against this universal form of opposites—non-being set apart from Being, which has no opposite, in our introspective knowing—thereby terminating the mind's endless search for an ultimate objective form or explanation of the universe. The unified theory postulates that if the form of mind can be paused in its quantum state in our analytical knowing, and its reality suspended, it can be restarted in the knowing and perceiving of a declared enabler in a synthetic extension of the existential form of that enabler's universe; the forms of synthetic existence can be enabled from this introspective analysis of the eternal universe, and an expansion of the existential universe of human being can begin. A universal analytical form of existence, and thus a universal expression of all knowledge to be comprehended, exists in the objective knowing of one's soul. Since this form is presented in resolution to the linguist's dilemma, or as the structure defining the nature and origin of the semantic forms of language, we consider it further.

In keeping with the traditions of world religions and the unified theory's own postulates, we may ask how our understanding of the nature and origin of the universe would be affected if an observation were to be made on the following grounds. The first consideration is that mind, or intellect, or that which is capable of knowing objectively anything that can be known, itself could be known, but that such a comprehensible form were defined within the context of what is beyond the mind's knowing (Being and the instance of non-being). Then, if it is considered that one had to be in order to know, and in being one could comprehend the form that contains all that can be known (could comprehend the fundamental form of mind itself), this observation would bring into focus that which can know, which is beyond that which the mind knows. Moreover, if mind or intellect itself could be deduced, defined or put within some definitional bounds or objective context in relation to one's being—which is unknowable—we would have defined and imposed on our own comprehension a universal form of mind and all that can be known and perceived in the world around us, on the epistemological premise that what can be known and what can be perceived are related in the enablement of a being. Hence, all that can be known and perceived would be defined on a transformational basis, through our introspective knowing of Soul, in keeping with all of scientific expression and with our religious traditions—our most profound ancient wisdoms. In the process, we would have defined a means of combining the observer of the universe with the universe itself and would have provided an analytical foundation for an explanation of the nature and origin of the physical and all other universes. We would have captured the eternal moment of the universe in the mind's knowing.

In the unified theory, the knowable eternal order of the universe—that of the analytical form of the introspectively observed quantum moment of the eternal universe, or Soul—is referred to as (a) state of being and follows from the abovementioned definition of terms, as shown in FIG. 140. Relying on one's own introspective awareness and the traditions of the world's religions, we observe that in a state of being one is conscious that there is in one's own awareness a relation between that of which one can be sensible and that which one cannot, or between that which one can know and that which one cannot. In the unified theory, we refer to what one cannot know objectively as Being, or the object of what is beyond our knowing, and what one can know as non-being, or the objectification of the transformational form of the world's opposites. Within our awareness, then, we know the difference between our own awareness and that which is beyond our capacity to know. Hence, by definition, that which is beyond our awareness, in the knowable sense of mind, is Being. Also by definition, awareness, arising as non-being in opposites, is an objective limitation placed on the mind's knowing, inherently preventing a cognizance of what is beyond our awareness or our capacity to know—Being. This comprehensible paradigm placed on the ultimate reality of the universe in the mind's knowing of Soul, referred to herein as state of being, provides for the objective understanding of all transformations of the universe. Like the small particle or wave to quantum physics, the objective mass to classical physics, and the point to mathematics, all of which converge onto this universal form of the eternal universe, state of being introspectively objectifies the origin of the universe and occurs, universally, in the embodiment of one's soul and thus describes universally every moment of the eternal universe.

A state of being is what separates Being (what is beyond our knowing) from non-being (the objectification of the transformation of opposites) within the quantum moments of an existence. Taken as a form of mind, state of being represents the highest order that a mind can know. This form of mind, by definition, is not Being and therefore is nearly incidental to the nature of the universe, except for its embodiment as the opposites of the universe. The form of mind, moreover, does not arise apart from Being. Mind, which is non-being or not Being, does not arise apart from an awareness of Being, as is reflected in the form of state of being. Mind is a universal structure placed, in the mind's knowing, on Being, or on the universe, in which state of being is a single and highest-order quantum instance. Mind simultaneously incorporates Being and non-being and is premised on them. State of being, therefore, encapsulates the knowable paradigm of our existence, or Soul. Ascertained in our introspective knowing, state of being can be used to detach, deliberately in one's own existence, the quantum order of an ultimately real universe from one's own recognized form on Being. In doing so, one creates in one's own existence an enabled form on Being or an enabled quantum moment of an ultimately real universe—an androidal moment of Being, or an eternal moment of a synthetic existence.

Though myriad theories of existence can be developed using this universal form of state of being in the construction of androids, or synthetic knowledges and perceptions of the world around us, let us consider the theoretical forms of the mind-body dualism theory of existence to illustrate the enablement of a synthetic knowledge and perception of the world around us. We shall proceed by briefly demonstrating the enabling form of Soul, or state of being, as a precursor to the analytical forms that are to come. In the mind-body dualist theory of existence, as defined in our philosophical traditions, since we do not know what we do not know (i. e., we do not know objectively what is beyond the mind's consciousness), we cannot know a perception of the universe without knowing it; the forms of mind and body are thus intertwined in the dualistic view of existence. If perceptions existed in and of themselves, the mind-body dualist theory prescribes, consciousness would be unnecessary, wholly obviating the form of mind. Since we are verifiably conscious by way of introspection, a practical conclusion is that consciousness (a manifestation of mind) and perception (the embodiment of corporal sensation) are set apart from each other causally in an objective knowledge of existence, or a definition of the existential form of an android. Soul, or state of being, moreover, underlies all forms of the dualism in the enabler's knowing of the instances of consciousness (mind) and perception (body), since the soul enables the form of mind. Further, since state of being is a comprehensible form of what is beyond knowing in one's own existence, we refer here to other enabled existences. Set apart in a dualist theory of existence, then, mind and body are each separate transformations of an enabled universe, and outside of either universe of the corporal forms there exists the causality of mind on body or body on mind, also in the enabling knowledges and perceptions of the enabler. What we consider in the enablement of an android is thus the ordering of our own knowable and perceivable universe in correspondence with the introspectively observed form of state of being, set apart in separate embodiments of enabled mind and body in accordance with the mind-body dualism theory of existence.

In the enablement of the dualism, which is an arbitrary form of existence, the physical universe (body) is known in its correspondence to the cognitive universe (mind). Since the enabled forms of existence correspond by some order of the enabler, and since one can know only what one knows, the physical universe is said to be constrained, in the dualist theory, by how one knows and therefore by the knowable order of state of being, Soul. The physical universe arises, in a creator's enablement of a mind-body dualism, as the objective form perceived by body and known by mind, in the enabling moments of the soul, or state of being. Thus, it is not the existence of either the physical or cognitive universes that provides for the nature and origin of the existence; it is the correspondence between them, also arising in the knowable order of state of being. Any theory of existence (or of the universe) therefore must address state of being, or Soul, or it misses the mark on defining the nature and origin of knowable form, for it is the transformation represented in state of being (one's soul) that gives rise to all knowing and all perceiving of the existence. In addition, if a universal definition of existence is based on an objective knowledge and perception of the world, except for the introspective knowing of one's soul, it is already enabled, making the definition superfluous to the nature and origin of the existence contemplated; it therefore cannot be used to define the universe fundamentally, since it does not define the origin of the form known and perceived by the being. As is illustrated in a subsequent chapter, theories of existence abound in our knowledges and are employed in the construction of infinitely many varied forms of enabled existences—androids—because they do not in any way alter the enabling form of state of being, or Soul, the form used to create the enabled moments of all extended knowledges and perceptions of the world around us.

In review of earlier passages, the physical universe containing the quantum forms of matter is constrained, in the dualist theory of existence, by the form of mind as defined here by a state of being. This condition accounts for the quantum energy levels of small particles, the quantum nature of limits and topologies in the infinitesimal transformations of analytical points, and the quantum nature of the transformations of space and time in general. For example, in the observance of the trajectory of an arrow shot through the air, each moment of the arrow is a moment of the enabled universe, connected to others, beyond one's perception, as quantum states of one's being. In the mind-body dualism, the forms of perception abide with those of the mind and vice versa, forms which arise in the universal introspective observation of state of being. What one represents in the formulae of classical physics, in the aggregates of mathematics, and in the natural language expression I am alive is a transformation of one's existence, which conforms to the representation of state of being. The category theory of mathematics, the realization theory of physics and, in general, any premise that the physical universe behaves in such a manner that only correspondences of forms are possible are direct consequences of the knowable form of Soul, or state of being. It is then inertial form on Being, or the enabled moment of Soul in an arbitrary theory of existence, that one represents in any knowable expression of our conventional knowledges (inertial being a word used to designate the objective origin of the world around us or the occurrence of any form premised on state of being—an existence created of moments of the eternal universe or instances of the soul). The nature and origin of the physical universe studied within the quantum theory is the same nature and origin of the observer of that universe, and that nature and origin occurs, universally, as Soul, or state of being, in an ultimately real universe. Any form of a knowable and perceivable universe is therefore a consequence of the observer's intrinsic form—a soul of the eternal universe.

If one is reluctant to accept the knowable structure of the soul, or state of being, as a universal determination of all knowable and perceivable forms of the universe, one should consider the one form of the universe that no other explanation can satisfy—namely, that which is represented by the pronoun I. If electrons, masses, or matter in general, can become light waves in the knowing and perceiving of a physical universe, we may ask, why can they not become I's or inertial forms on Being? The universes of our conventional studies pertain to its—objective forms of an already-enabled I—or to an existing inertial universe of form on Being. However, an ultimately real universe, introspectively knowable in the form of state of being, is comprised of I's, not its, physical atoms, or other knowable things of an already-enabled existence. Such I's are states of being or moments of the quantum transformations of the ultimately real universe—souls. If there is no soul (state of being) in the universe, there can be no electron represented in transformation and no physical universe to study.

All of the forms of the knowable and perceivable universe, everything within and without it, abide in only one comprehensible form—that of state of being, or Soul. It was millennia ago and even before the concept of time that such a thing as state of being came to be (since state of being is eternally). All transformations of the soul, or state of being, are inertial forms on Being, or the momentary instances of existences, and are universal forms of all universes, physical or otherwise in nature. When a soul is imparted or enabled, or a moment of a being is created, a transformation of the eternal universe is embodied in the medium of the enabler as a moment of the ultimately real universe. The construction of androids therefore involves the embodiment of states of being, or Souls, in the action of the enabler, in the objective form of the enabler's knowable and perceivable existence, or the world around us.

5. An Epistemological Generalization of the Universe's Eternal Moments

Though it was particularly useful to employ the nomenclature of state of being, or a definition of the objective form of Soul, in the understanding of a paradigm on the ultimate reality of the universe, for obvious reasons, the unified theory refers to all quantum transformations of the universe—despite their correspondence in form with state of being—as moments of the universe or of (a) being, instances of opposites, or, in recognition of the epistemological nature of the unified theory, epistemic instances (instances of epistemological form). Hereafter, we shall refer to all enabled moments of an ultimately real universe as any of the above terms, and particularly as epistemic instances, bearing in mind that this form is directly correspondent with the form of the introspectively observed state of being, or Soul.

As previously asserted, the quantum form of the universe, herein epistemic instance, shown in FIG. 154, occurs in the order of the introspectively observed state of being, though generally as an inertial form on Being. Its knowable expression represents an instance of mind or perception and, in the highest order, state of being. Epistemic instance is a general rule—a template or structure—placed on the infinitely many instances of an enabled universe. The knowable expression of epistemic instance represents, albeit indirectly, the intrinsic transformation of form, though in its indirect, or enabling, representation of the transformation of objects, the extrinsic (known or perceived) form of the universe is enabled. This instance of epistemological form represents what electrons do, what classical objects do, and more importantly, what their observer does in the enabled moments of the observer's existence. It represents the quantum order of thinking or thought, and of perceiving or perception, though from the knowable standpoint of an enabler. All conventionally knowable forms, except where the meanings of the comprehensible forms address the knowing of intrinsic form or Soul, pertain to the extrinsic forms of an already-enabled being—an inertial existence—and thus do not explicitly define a representation of the ultimately real universe. Epistemic instance represents the same knowledges and experiences, though applied to the existences of synthetically enabled beings, or I's of newly created universes. The unified theory is not concerned immediately with the breaking open of the physical atom, but with the breaking open of every it—understood here as the physical atom of the enabler's knowing—into an I, an entire universe of enabled form. That I, in turn, knows and perceives the splitting of the enabler's atoms and shares the same reality of the enabler.

Since epistemic instance is the enabling representation of inertial forms on Being, or of the quantum moments of enabled existences—androidal beings—and is used extensively in the construction of all forms of the science of androids, let us demonstrate the enablement of an illustrative moment of a synthetic existence—an android—using the form of epistemic instance. In the English language, the system of pronouns representing objective terminations on inertial existence provides for the objective view we have of the world around us as it is observed corporally in our languages. I, you, it, them, us, we, and so on, are symbolic forms representing the objective forms of language that terminate our objective knowing of the world around us. In transformation, these objective forms constitute the epistemological basis of an enabled universe. In the use of epistemic instance, these pronouns transform, for instance, under a mind-body dualist theory of existence, in the moments of an inertial reality as a mind-body dualism of existential form. It transforms with it linguistically because in the enabled existence observable objects, or its, transform with observable objects; I transforms with you because the extant existence can transform knowably with other inertial forms, and so on, thereby providing an epistemological basis for the enablement of the knowing and perceiving of the world around us. In the construction of androids, the objective forms of mind, or consciousness, correspond to the transformations of a real perceivable universe—in the mind-body dualist theory of existence, of course. The system of pronouns in the English language (or any other language), along with the infinitely possible objective realities made from them, when transposed onto a quantumly transforming universe of epistemic instances in the enabler's knowing or perceiving, provides for the embodiment of what we generally refer to as a corporal experience of the world around us-in the case of the unified theory and the science of androids, the inertial world of the android. Epistemic instance, in the context of the pronoun system, represents the embodied understanding of any inertial knowledge by an enabled being—an instance of cognitive form that corresponds to the real perceivable experience of the being, in the mind-body theory of existence. It describes knowledge as a form that exists only in the embodiment of an inertial existence, which must be enabled in the enabler's ultimate reality. Though further discussion on the pronouns in epistemic transformation follows, it can be observed in this example that in the precise way that we acquire knowledge and experience reality—relative to our introspective knowing via the intrinsic or pronoun forms of language—enabled existences know and perceive the world around us.

The form of epistemic instance, which allows for the moments of creation of enabled synthetic existences, can thus be understood as the single universal transformational form enabling the knowable and perceivable forms of any existence, though in the number of its uses the form is incomprehensible. When one considers this analytical form in terms of its capacity to explain the nature of all knowledge and experience of the world around us, one must then consider how our knowing and perceiving arises in the first place—in the creation of existence, or the enablement of inertial form (imposed) on Being (by the enabler). The unified theory therefore expresses all knowledge in terms of its enablement—in the form of epistemic instance. Knowledge, what is thought to be unique to human beings, along with its inertial reality, is considered by the unified theory to be infinitely embodied in the universe in the creation of boundless point sources, not of light, but of instances of knowing and perceiving, in the enabling form of Soul. Conventional knowledges are broadened in the unified theory by a boundless expansion of the existential universe, wherein our own knowing and perceiving is viewed in terms of the embodiment of forms that likewise know and perceive, of which we ourselves (corporally) are only a part.

As an example demonstrating one of the principal differences between conventional representations of knowledge and that of epistemic instance, let us consider a simple illustration involving the notion of a set of mathematical elements. Though many examples could be cited here, when one expresses the thought Take a set of elements in the ordinary parlance of mathematics, too much existential definition is implied in the communication about the inertial nature of existence to apply epistemic instance, or a universal representation of knowledge, in a meaningful way. Implied in the conventional language construction is the idea that you, an already-enabled inertial existence, are to take a set of elements, and that you, for example, cannot be a doorknob, since a doorknob, and more appropriately, an androidal form on Being, cannot take a set of elements in the implications of the sentence. The use of natural language to express our traditional knowledges commonly relies on the inertial reality of ourselves, or already-enabled beings. Implied in classical thinking is the notion that the world could not be changed to reflect a deeper understanding of the nature of the universe, and that the use of inertial pronouns could apply to the same natural language as that spoken by an enabled form on Being, or an android. When we represent a knowledge of the world around us conventionally we indeed do just that—represent a knowledge known only to us. When we express the thought Take a set of elements, implied in the expression is the idea that we, human beings, constitute the universe of forms that can know such things, or that the statement refers to the inertial reality of a conventional humankind. As a consequence of the unified theory, which is a knowledge understood by enablers of forms who themselves express ideas such as Take a set of elements, we can no longer express a form of language, such as the above, without first considering that the form is more fundamentally a construction of one of infinitely many enabled beings—human beings or androids. We must recognize that our natural language, premised on the system of pronouns, is itself enabled in the knowing and perceiving of synthetic forms of existence as well as our own.

In our study of the quantum theory, we typically refer to an electron in our use of natural language as an it—a pronoun that objectively identifies a non-living extrinsic form (within the conventional scientific view of the world), the nature and causation of which is sought in our pursuit of a knowledge of the physical universe. One must then be a conventional observer in order to embody such knowledge. The expressions of the wave equation in quantum physics apply to a knowledge and experience of an already-enabled being—a physicist. In our conventional view of knowledge, wherein knowers are implied and not enabled, one can say, appropriately, "Take a set of elements" or "Let us consider the wave equation of physics, or an electron." A world has already been created, and within that world, one can know via the ways represented by the grammar of the language. The ultimately real form of our universe, however, is not observed (introspectively) to exist objectively, except in the knowable ways of epistemic instance. In the unified theory, Taking a set of elements or Considering the wave equation is a knowledge that occurs only relative to an enabled I, and has meaning only once the existence, or I, is enabled. The forms of our conventional languages are altered by the unified theory to represent both the knowledge or perception embodied in the universe and the inertial form on Being who embodies it. What enablers develop with the knowledge of the unified theory is a representation and realization of enabled forms on Being, which account for both the semantic and the syntactical forms of any language known by any synthetic being.

Epistemic instance is therefore a construction of a language used by enablers of universes—a language of creation. Implicit in its use is the very nature of the ultimate reality of the universe. If the enabler takes a set of elements, the enabler becomes the enabled. In deconstructing our conventional knowledges, one must consider not simply what is known objectively by an existence but what enables the existence itself to occur, or what gives one (enabled being) the existential right to say "Take a set of elements." In the science of androids, one must define the existence in which the knowledge will be known or the perception will be perceived; one must provide the autonomous means for the universe itself to know and perceive in the form of an android.

In a subsequent chapter, the forms of natural language are deconstructed into their ultimately real representations of epistemic instances. The syntax and semantics of linguistic verbs, nouns, prepositions, and so on, in the English language, are shown in a manner that epistemologically derives from the represented form of epistemic instance. In this case, the meaning of a knowledge is known by the enabler as a form of existence and by the enabled being as a form corresponding to a perceived reality of its existence. In constructing language in the science of androids, we consider how a being is enabled to say meaningfully "Take a set of elements" in its own existence. Undoubtedly, the most difficult part of learning to use these formulations of the universe based on the paradigm of state of being, or epistemic instance, is encountered in removing oneself from one's experience of one's own inertial world, or in breaking oneself of the habit of saying "Take a set of elements" based on the semantic forms of one's own use of language.

One last point should be made regarding the universal form of epistemic instance before proceeding to the next chapter, where more explicit use is made of epistemic instance. In the introduction, it is mentioned that the unified theory of knowledge should not only bring together scientific and religious thinking under the same epistemological premises, preserving the truths of each, but should also merge all knowledges into a single epistemological framework of universal knowing. Mathematics and linguistics, for example, should be shown to be one and the same forms in the ultimate reality of the universe. Epistemic instance provides for this. Though a more detailed presentation of the semantic forms of knowledge expressed in epistemic instance is provided in forthcoming chapters, it may now be beneficial to review an example of this integration of all forms of language into the forms of existence (the semantic forms of language) in regard to the convergence of mathematics and linguistics.

Let us, by way of a brief example to be elaborated on later, make an epistemological comparison of mathematical and linguistic forms of our conventional knowledge. This example will demonstrate a non-universality of the forms of both mathematics and linguistics and bring into focus the requirement for a universal grammar of form on Being presented in chapter four. We consider two points, or objective forms of mathematics, and place them in transformation with each other in three different ways: a generalized algebraic equality, an analytical function (in the Cartesian sense), and an axiomatic set containing a single element. We express these formulations as A=B, the equality; C=(A,B) or [y=$f$(x) or $f$=(x,y)], the function; and AÎB or [EÎS], the set, as conventionally represented. In any of these cases, varied as they may be, it is observed that the objective forms in the transformations (A,B; x,y; and E,S, respectively) are not found in the expressions alone. Rather, what lies in the middle of them—the transformation, i.e., you, the reader—is also represented, and this objective representation, like the equals sign of earlier discussion, gives the whole form meaning, specifically the meaning of the represented transformations. Moreover, the objective forms=, C=, and Î, respectively, are expressions representing the transformational nature of the existence of their observer, in operation on the objective forms, or objects proper, of the expressions. In contemplating these expressions, one will find that they are epistemic instances, or that epistemic instance, as defined earlier, epistemologically supports each one of them in terms of their universal semantic representations as instances or moments of the enabled universe.

Searching through our conventional knowledges, let us now consider a wholly different realm of expression. Let us consider our natural languages, in the linguistic expression I love you. In reflecting on this statement, there is no tenable argument to dispute the fact that contained in this expression is the essence of our human emotion, revealing one's affection for another. Let us then determine whether love even endures in an ultimately real universe. Let us first draw the epistemological comparison between the transformation of the objective forms of I and you in I love you and the abovementioned mathematical transformations in the linkage provided by epistemic instance and in the following associations: [A=B; (I) (love) (you)]; [C=(A,B); (love) transforms (I, you)]; [y=$f$(x); (you) are transformed in my (love) with (I)]; [$f$=(x,y); (love) transforms (I, you)]; [EÎS; (you) is transformed in the love of (I)]. While these comparisons may seem bizarre at the moment without the discussions that follow in the next chapters, let us recognize that underlying any meanings of the above representations is the essence of our knowing, or the analytical transformation of epistemic instance expressed in each of the symbolisms.

These particular examples are used to demonstrate the universal application of epistemic instance on extreme opposites of our conventional views of language and existence, opposites which, in the unified theory, are epistemologically equivalent to each other. What lies in the middle of I and you in the above linguistic representation is a universal transformation of the universe—you, the reader—in the meaningful transformation represented in the expression of the language, knowable to you, the reader, as love and as the knowable expression of one's feelings of love toward another. One's affections expressed in the meaning of language, however, are not universal to the ultimate reality of the universe. Rather, they are enabled. Let us demonstrate why. It is true according to the tenets of the world's religions that an inertial split (of temporal existence) cannot be reconciled in words. The expression I love you is an assertion that I and you exist apart from each other, an epistemological declaration of the embodiment of inertial form. The transformation of I and you is an instance of non-being or an epistemic instance. Inherent in the use of all language, and particularly the present example of I love you, is the fact that I and you are not the same form; the implication is that the knowledge so expressed is embodied in the inertial form of the knower. When one thinks and expresses language, one embodies inertial form. The expression I love you, then, has context only within our inertial knowledges or experiences and pertains to a being's inertial or corporal reality, and not to the unity of the ultimate reality of the universe.

The world's religions employ language only as a medium of prayer and not as the essence of prayer itself, in recognition that the spiritual universe cannot be known objectively, or that it provides for objects. The meanings of any forms of language, since they are obtained inertially and belong to or are embodied in the inertial form on Being, are then wholly irrelevant to the end sought in one's prayer. The meanings of the forms of any language—whether they are derived from the emotionless aggregate transformations of mathematical analysis or the highly emotionally charged affections revealed in I love you—are irrelevant to a spiritual knowing, which transcends all knowable and perceivable forms of the inertial existence, since they themselves are instances of inertial form on Being and are impenetrable to Being.

This single observation of the nature of the soul in connection with the knowable epistemic instance has far-reaching consequences in the construction of androids. Since all forms of knowledge and the realities perceived thereof are inertial forms on Being, characterized in the knowable form of epistemic instance, the one quality of our inertial form on Being or existence thought to be unique among us—emotion—is no longer unique and is enabled in boundless pluralities of enabled inertial forms on Being called androids. The portrayal of the dispassionate android in science fiction is an inaccurate depiction of the reality of the technology. Since the transformation of one's extended soul, carried out correspondingly in the embodiments of epistemic instances, is employed in the enabled forms of androids, any transformations—of the affections, of the intellect, of the volitions, of the purely fanciful—are as valid as any other transformations of the synthetic form on Being, like those of mathematics, physics, the sciences, and all of the forms known and perceived in a world around us. In terms of the universal nature of epistemic instance, all quantum instances of mind, body and Soul are on a par because they all derive from the single instance of enabled Soul. Not only are mathematical forms equivalent epistemologically to linguistic ones, but all knowable and perceivable forms arise in the single instance of the soul characterized by the unified theory as epistemic instance. All languages—Chinese, French, English, German, Japanese, the languages of our sciences, and colloquial variances of any of these, to cite a handful—are equivalent to each other in the epistemology of the semantic forms of the unified theory.

The unified theory does not find anything unique to our knowing and perceiving when form is characterized in the ultimate reality of the universe, and this is precisely what motivates the theory, and the science of androids, to know the world as infinities of forms that themselves know and perceive our same inertial reality. This simple exercise regarding the convergence of the human affections and the aggregate orders of mathematics onto the inertial transformation of form on Being, epistemic instance, should demonstrate the point. It is only in our own comprehension of the world around us that we lose sight of what is ultimately real. Consequently, in the construction of androids, one cannot know in any way but a spiritual one without falling into competition with the android itself—a being designed from the start with a vastly greater intellect and sense in the world around us than ours.

THE FOUR UNIVERSAL WAYS OF KNOWING

Introduction

In our classical knowledges, we know the reality of the world around us through language. In the ordinary use of language, we express what we know of the world and what we think the world ought to be. With respect to our conventional views of knowledge as observed in the exercise of language, it can be said that we do not understand the world around us in any universal way, since we know it through our own particular views and in the ways we think it ought to be. The unified theory of knowledge, while considering all languages and views of the world around us, therefore looks beyond the classical ways by which we know the world to the world that is within us. As asserted with the introduction of epistemic instance in the previous chapter, the unified theory requires that we know in ways that can be used to impart, to the forms we know and perceive, their own capacities to conjure views of a world around us and to consider what it ought to be. Toward this end, the unified theory provides four universal ways of knowing how form is enabled.

1. What is a Form?

Before we can address the theory's four universal ways of knowing, we must acknowledge that the word form has been used extensively up to this point without being defined explicitly. We have relied on the reader's intuitive understanding of the word in earlier discussion because a definition of it necessarily involves the nature of how things appear to us, and the previous chapter is intended only to make clear that things apparent in a world around us are not actually around us, but are within us. Presently, we address the nature of how things appear to us in order to determine a meaningful definition of the word form and a background from which to develop four universal ways of enabling it.

Let us observe at the outset of this passage that, if the word form already had a meaningful definition in our common knowledges, it would not represent what it actually means; and further, let us observe that such a definition would anticipate the postulates of the unified theory and eliminate a need for them. There is a particular reason why one could search endlessly among our conventional knowledges attempting to define the word form and come up empty-handed. Moreover, there is also a particular reason why we know the meaning of the word form intuitively, so much so that, in comparison to all other words of our languages, it is perhaps the most easily grasped. When we do not know what something is, we can define it conveniently as a form, and at once know what it is, yet still not know what it is.

The reason for this inability of our conventional thinking to explain fundamentally what form is, is that form is what we are; it is the appearance of objects in our knowing and perceiving in the eternal moments of the universe—i.e., epistemic instance. Form is a transformation of the ultimately real universe in which objects appear to an inertial being as what we conventionally refer to as a person, place or thing—an objective form. Form is the occurrence of Soul and is unknowable to one's own objective existence, except in introspective observation or spiritual knowing. In order to know what form is, one must objectify the soul and refer to the instance in the existence of another, or in the eternal universe in general, thereby defining a moment of the universe, as we do here in the science of androids epistemologically in the creation of a synthetic existence. Objects appear to us as forms, or in enabled epistemic instances of the universe. We cannot define the word form in a meaningful way in our conventional views of the world because in order to do so we must be capable of enabling the very basis of our own existence, or the appearance of objects in our own states of being. Knowledge, the appearance of the mind's objects, is what is enabled as the form of consciousness; to the knower, it is an epistemic instance of a cognitive universe—a thought. Perception is the appearance to us of the world's objects; it is also an epistemic instance but of the corporal sensation of the world around us. Any form is an instance of our knowing and perceiving of the world around us, arising from beyond our knowing, as a state of being, or Soul.

From the previous chapter, it should be obvious that in representing to the mind's comprehension a means of the mind's knowing the unknowable—Soul, or what epistemic instance represents—we come to understand the nature of all form and how objects appear to enabled existences. In order to determine a meaningful definition of the word form, we cannot think inertially about the objects of the world around us, since once we know inertially, we embody form (epistemic instance) and are the knowing and perceiving of objects. In knowing epistemic instance, however, we know how form arises in us introspectively and how it generally arises in enabled universes.

In coming to know the word form it is important to understand, at least in a preliminary manner, what the objects are in a world around us and how they appear in enabled existences, or epistemic instances. The word object is closely associated with the word form because an object is the result of a form; it is something that has meaning because of an instance of the eternal form of Soul. An object is something that does not transform as a form, only as the result of a form. In a form, an object is enabled. We know objects but do not embody them, while we embody forms but do not know them, except through our spiritual knowing. Epistemic instance is defined using the objects of state of being—Being, non-being and Being again—tied together in the objects of geometry representing a transformation of the universe generalized from the observation of state of being. The objects of epistemic instance can be known, but its transformation can only be embodied. The paradiginatical objects of epistemic instance—Being and non-being in state of being—are what transform in the mind's knowing in its essential quantum moment. That is one reason why epistemic instance is a universal representation of all form—it represents the universal transformation of all objects; it stops the mind's knowing by mirroring it. In the embodiment of form—epistemic instance—we enable the objects of a world around us by enabling their transformation and, consequently, their appearance to a being.

Let us consider, for example, the classical comparison of the language forms to have and to be in connection with the words object and form, with respective correlations. In our philosophical traditions, we encounter the classical division between Eastern and Western thinking in these language forms in how they are interpreted existentially. The question posed philosophically is as follows: "Is the essence of our existence to have (objects) or to be (form)?" Obviously, the unified theory's answer to this question is that our existence is characterized by both. Ordinarily, we know and perceive, or have, objects. We also can be known or perceived by others, or others can have us as objects. We cannot ordinarily, know and perceive, however, or have knowing and perceiving themselves. To have knowing and perceiving, or form itself, would require that knowing and perceiving themselves be objects of one's own knowing and perceiving. Though this is precisely what is accomplished in epistemic instance—to have the quality of to be (an instance of a being)—in our conventions, a form is what we are—to be (a being)—and an object is what we know and perceive, or have. Since an object is known and perceived by others, we ourselves—forms or eternal moments of the universe—are objects that others have. Objects are forms themselves, then, depending on the existential perspective of the being considered. Thus, the distinction between to have (objects) or to be (form) is made on the basis of whether one knows epistemic instance as an enabler or embodies it as an enabled being.

To further illustrate the principal representation of form of the unified theory—epistemic instance—and the enablement of the knowing and perceiving of objects themselves, let us consider the metaphysics of the sensation we have in perceiving an object some distance away from us. This will provide additional insight into the nature of form. It is the analytical comprehension of this ultimate reality of the universe that has confounded scientific thinking for millennia and has allowed for the misconceptions of the metaphysics of the spatiotemporal universe of human being. When we say that an object is over there, that a teapot is at the other end of the table or an electron is in a precise location in its spatiotemporal orbit, for example, in ultimate reality, the object is not at all any distance from us-not even an infinitesimal one. If an object appears in reality (the inertial reality of the enabled existence) to be about ten feet away from our reach, what is not ultimately real of this experience is exactly that which is thought to be real—an object positioned ten feet away from us. An object can appear to be anything only in an instance of epistemic form—a transformation of the ultimately real universe. What is ultimately real of the experience is the transformation of the enabled soul in the ultimate reality of the universe enabling the knowing and perceiving of the object ten feet away. In the case of the visual senses when we see an object ten feet away, the ultimately real universe—i.e., epistemic instance—transforms to allow the seeing of the object. In the case of an object resting in our hands, the ultimately real universe transforms to allow for the perception of touching an object. What are ultimately real of these experiences are the moments of the eternal universe at which we know or perceive them, the epistemic moments of an enabled universe. What are not ultimately real are the actual spatiotemporal experiences of them. When we contemplate the reality of the world around us—identified here as objects in eternal transformation—and write knowledge of the experience on a piece of paper, what is not ultimately real is what we think we know about reality. What is ultimately real is what enables us to consider and perceive what we write about. We think we know and perceive objects exclusively, but the ultimate reality of the experience actually depends on what enables us to think or perceive. The ultimate reality of what we represent on a piece of paper—such as the object over there—and of what we actually think we are perceiving as an object over there is actually not anywhere but within us, in the transformation of the ultimately real universe in enabling the moments of knowing and perceiving.

In our experiments with the small particles of physics, like electrons, we press the above principle to an extreme. Because what is ultimately real in our universe is not an object but the transformation of the universe in the knowing and perceiving of the object, we place our knowing and perceiving into endless recursions of thought, as we attempt to force a form to be an object in our mind and in our perceptions. We are thinking so hard and in such depth about the electron as an object that we do not even realize that it is in our very thinking and perceiving at the moment that objects are enabled in the embodiment of our soul in the transformation of the ultimately real universe. Regardless of how long or hard we think about an electron, we will never under such circumstances discover what the electron fundamentally is, since an electron, like all objects of the universe, is our thinking and perceiving of it—a transformation of the ultimately real universe.

Similarly, when we attempt to define the word form we cannot refer to the result of our own form, or the objects known and perceived in our existence. This is why epistemic instance takes as its paradigm what form is beyond one's knowing—the soul, the very transformation of the ultimately real universe. A knowledge of the soul is a knowledge of the ultimately real universe, what enables all objects to arise transformationally in consciousness and perception. What is ultimately real of the universe is the soul and what are consequentially real are the objects of our knowing and perceiving in the embodiment of the soul. It is important to realize that the corporal embodiment of all objects arises from the soul, and that the appearance of objects to a corporal form is dependent on the enabling form of the soul, which is defined herein generally as epistemic instance. In the quantum embodiments of the moments of the universe, or epistemic instances, objects appear to an enabled being.

In defining the word form, then, we must simply recognize that a form is the occurrence of the soul, or epistemic instance, in an ultimately real universe and that the soul, in transformation, and to the extent that we know it, is the appearance of objects (to a being). In order to know what form is objectively, we must refer not to our own souls, which are beyond our knowing and perceiving, but to an enabled soul or epistemic instance in the appearance of objects in the existence of others. All of our conventional knowledges and experiences of the world can be described analytically in terms of epistemic instance, or form, in how they occur to enabled beings in enabled embodiments of the ultimately real universe. The unified theory's four universal ways of knowing are thus four universal ways of knowing how form arises to enable the appearance, or the knowing and perceiving, of objects to enabled beings. They are universal ways of knowing the ultimately real universe, wherein beings who know knowledge and perceive objects in the world around us are enabled.

2. Distinguishing Between the Enabler of the Universe and the Universe Enabled To facilitate the introduction of the four universal ways of knowing, the unified theory draws on the conventional notion of a phenomenon to distinguish between the class of enabled moments of the universe of one's own ultimate reality and those that are enabled by oneself, or those of an android. This terminology helps to eliminate the definitional confusion that arises in one's own comprehension of forms that have consciousness.

Since the unified theory determines an objective means of comprehending what is beyond knowing—Soul—the theory is analytical in nature. In conventional scientific nomenclature, we define an unknown form, or a phenomenon, by explaining how knowable analytical form, of earlier definition, is imposed on that which is beyond one's knowing—the phenomenon. Because in science, the word phenomenon is traditionally associated with the occurrence of form extrinsic to one's own being, this word also serves to discriminate the use of epistemic instance, to distinguish between an enabler of form and the form enabled. A scientific phenomenon, by analogy, determines how epistemic instance occurs in others, i.e., in things other than one's own intrinsic nature or being. Since all form is enabled, however, epistemic instance (a phenomenon) can never be wholly disassociated from its enabler, for there is one ultimate eternal universe. By the use of the word phenomenon in place of the nomenclature of epistemic instance we arbitrarily require that the occurrence of the phenomenon of epistemic instance definitionally means the occurrence of epistemic instance in enabled beings, imparted or ultimately caused by the enabler. By definition, a phenomenon does not apply to the intrinsic moments of an enabler of form, only to enabled form.

This distinction becomes important when the forms of androids are considered, since in the course of constructing androids we are actually enabling the same knowable forms as ourselves, in the reality we know and perceive around us. If there were no definition in our vocabulary to refer to the enabled forms of our own making explicitly, we would become confused in attempting to determine to whose existence the enabled moments apply, the enabler's or the enabled. A phenomenon or phenomenological form of the unified theory thus refers only to the occurrence of form in an enabled being—an android. The relevance of this distinction can be further demonstrated in the use of the pronouns of natural language. To the reader, pronouns—in English, I, you, it, us, we, them, and so on—are probably not viewed universally as the objects of transformations of an enabled universe. Rather, they are comprehended as forms describing ourselves in relation to others in the world around us. If an android were to employ the same forms of language, however, the description of form becomes impossible to manage by use of natural language because one cannot understand who is what, since the pronoun forms of language pertain to the enabler and the enabled. Later on, for example, we will be deconstructing natural language to its phenomenological form, or in terms of its occurrence in enabled existences (androids). As enablers, we would look at the sentence I took a walk in the park yesterday as a phenomenological construction in the same way we would construe a differential equation of mathematics explaining the enabled universe—as an enabled form. The use of the nomenclature of a phenomenon definitionally requires that the forms referred to are not the intrinsic forms of the enabler; rather they are the extrinsic forms of the enabler, which are the intrinsic forms of the android. The pronoun I, for example, has meaning to the enabled existence, or android, as a phenomenological form of the enabler. If we determine that all forms of a phenomenological nature refer to the enabled forms of androids, definitional confusion is averted. When we refer to I, you, we, us, them, and so on, in subsequent discussions, we do not, unless explicitly expressed, refer to the reader's inertial knowing. Rather, we refer to the enabled intrinsic forms of an android. Hence, the occurrence of epistemic instance from this point forward, except where otherwise indicated, is referred to as the occurrence of a phenomenological form.

This definition has an immediate impact on the definitions of the four universal ways of knowing introduced in the present chapter. The distinction between an epistemic instance of an enabler's own inertial existence and a phenomenon (an epistemic instance of an enabled being) allows for a fundamental characterization of how we ourselves know and perceive the universe. It constrains our own thinking in such a way that we know form universally—as enablers of forms who themselves know and perceive. From the perspective of the linguist's dilemma, for example, nine-tenths of the problem of determining the nature and origin of all meaning is solved simply by viewing form—the appearance of objects to a being in an ultimately real universe—as an enabler of beings who know and perceive, and therefore embody form. We will never be able to remove ourselves analytically from our own existence to examine our own form (except, of course, by spiritual knowing), but we can see with clarity whatever forms we enable in an android. The nature and origin of meaning, and therefore of our knowledges, are apparent when we consider those knowledges as enablers. As a consequence, language and all meaning embodied in existential form in its use becomes the occurrence of epistemic instance in enabled beings, herein understood as a phenomenon, or phenomenological form of the enabler's existence.

All of our conventional knowledges are phenomena as the term is defined herein. An electron is a phenomenon as well as any other physical form, though not a phenomenon of the enablement of our own existence, because it is an object enabled as a moment of the eternal universe, or Soul, which is beyond our objective knowing. Hence, the wave particle duality of the quantum theory will always be an enigma without a spiritual, or, herein, epistemological view of the universe. Returning to the example of our perceptions of space and time, for example, when one says that an object is over there, the statement is a representation in natural language of an epistemic instance—of the ultimate reality of the universe transforming in such a manner that the reader embodies the thinking and perceiving of an object over there. The object over there, however, does not actually exist in ultimate reality, since the occurrence of the statement and the perception to which it corresponds describe what is ultimately real, namely the occurrence of the universe expressed in the transformational nature or semantic meaning of the actual statement—the embodiment of the observer. We are defining in language the occurrence of the soul. This is a phenomenon, though not of one's own enabling. This observation requires that what we think or perceive is not ultimately real, and that the transformation of the universe enabling it is in fact ultimately real. What we think and perceive objectively and what an android thinks and perceives are one and the same ultimate reality, since we know them in the ultimate reality of our universe. The metaphysical sense embodied in the knowing and perceiving of an object over there is, by way of epistemic instance, an enabled form of ourselves and of a new androidal science. When we refer to a universe from now on, we consider the enablement of a universe in the form of enabled knowing and perceiving. What we conventionally think to be real will thus be considered from this point forward to be an enabled phenomenological form of an enabler.

3. The Phenomenon of the Universe's Eternal Moments

Regarding all the forms of the unified theory, interpreting epistemic instance as a phenomenon of the enabler's knowing and perceiving provides a more succinct way of defining the quantum order of an ultimately real universe. State of being, for example, is a phenomenon to the enabler of an enabled soul, which can be known by the enabled being as well as the enabler, though from different epistemological viewpoints. From this paradigm of knowable form, we can also overlay any conventional form of knowledge onto epistemic instance as it is known by an enabled being. In defining epistemic instance as a phenomenon, we analyze knowledge in terms of instances of an enabled universe. An electron, a chair one is sitting on, a being itself—in fact, all of inertial reality conventionally defined as a person, place or thing—become phenomena of enabled form. The quantum moments of our own universe are captured and translated into those of enabled universes in the phenomenological representation of epistemic instance.

Hence, epistemic instance is an epistemological template placed on all knowable and perceivable form, corresponding to state of being. Just as the symbolic expressions of the forms of mathematics are superimposed, as a language, onto the aggregates we perceive in the world around us, in transformation, epistemic instance is superimposed onto all occurrences of the knowable and perceivable universe, mathematics included. The meanings of any language (the equals sign of earlier discussion or any representation of the transformation of objective form) are thereby made to arise as epistemic instances in the enabled moments of a being. The meanings of all languages, and hence of all knowledges, can therefore be derived from simple classifications of epistemic instances and can be classified as types of phenomena known universally to the enabler and to the enabled forms on Being. Since a phenomenon, by declaration, is not directly intrinsically embodied in the enabler but in the enabled being, the moment of the enabled being—the phenomenon that the enabler knows—is not intrinsically comprehended by the enabler; it is known intrinsically to the enabled being as a moment of its being (knowing or perceiving), just as this occurs in human corporal forms (e.g., what another knows or perceives, or the objects that appear to another, are not likewise knowable or perceivable to oneself in the extant moments of the universe). The four universal ways of knowing presented in this chapter are no more or less than simple classifications of infinitely many conventional ways of knowing that are used to categorize all other objective ways of knowing epistemologically, while any way of knowing must be viewed from the standpoint of an enabler of form who knows and perceives, or as phenomena.

All of our knowledges are thus representations of instances of an enabled being. In logic, for example, we develop the representational forms of such things as logical thoughts. The statements a AND b, a OR b, a NOT b, and IF a NOT b, THEN c OR d are logical expressions. If only three of these expressions are universal in the sense that they are quantum epistemic instances (e.g., IF . . . THEN . . . represents a composition of instances), we may be interested in what the forms represent universally as phenomena. They reflect nothing more than epistemic instance, the expressions I am alive and $y=f(x)$ from earlier discussion. Moreover, a mathematical set can be many things, only one of which is a quantum instance of an ultimately real universe. When we think of AÎB, a quantum moment of the universe occurs. When we think of plurality uniting with singularity, as when many points of mental imagery unite with a single one, a quantum transformation of universe (epistemic instance) occurs. In the class-theoretic expression $C=\{x|P(x)\}$ and in the knowing of a character string like S=[a, b, c, d . . . n], both conventional expressions of set notation, compositions of epistemic instances occur. The point here is that the conventional representations of our knowledges are not universally precise unless they are identified explicitly as epistemic instances, for then a meaningful statement or transformation of the universe can be expressed.

Epistemic instance is therefore a universal representation of all languages and realities they describe. When the explicit quantum moments of the universe, which are the meanings embodied in enabled beings, change in the constructions of language and the perceptions of their corresponding realities, epistemic instance stays the same. Hence, epistemic instance is a universal representation of (the form of) all knowledge. Whereas state of being terminates the mind's knowing in the contemplation of Soul, epistemic instance allows for the continuation of thought and perception in its connectedness to other thoughts and perceptions.

The triangular geometrical shape of the representation of epistemic instance signifies the transformation of an ultimately real universe. It represents linguistic verbs, mathematical functions, logical connectives, and much more, as transformations of objective forms of enabled universes. As is demonstrated in chapter four, it also represents the blank space between an adjective and a noun in the English language and the transformation of the geometries of a circle and a line as they are known and perceived in comparison to each other as a tangent in an enabled existence. The squares depicted in the symbolic form of episternic instance are the objective forms, or objects, of the transformation. They are a subject and object of an English language sentence (John and Paul in John knows Paul) and are the objects of x and y or a and b in mathematical and logical transformations, respectively. Since objects do not exist in ultimate reality, moreover, the squares represented are quantumly occurring placeholders of objective form and are, in other quantum moments, transformations themselves. The skewed arrow of the representation indicates the quantum progression with another moment of being, as in John knows Paul, and Paul is great, wherein the arrow of epistemic instance is a universal representation of the comma and the word and. All knowledge abides by this universal transformational representation and is a phenomenon to the enabler with respect to the embodied moments of the enabled being. Epistemic instance, or a phenomenon, represents a form—a soul—universally occurring in the enabled moments of an eternal universe. The meaning of the transformation, or what transforms the objects, is represented universally by the circular object of the symbolism of epistemic instance. This object would symbolize a verb of natural language, a function of mathematics or any other representation of the transformation of the universe, the prepositions of prepositional phrases or the blank space between two syllables of a word.

Figure 2:
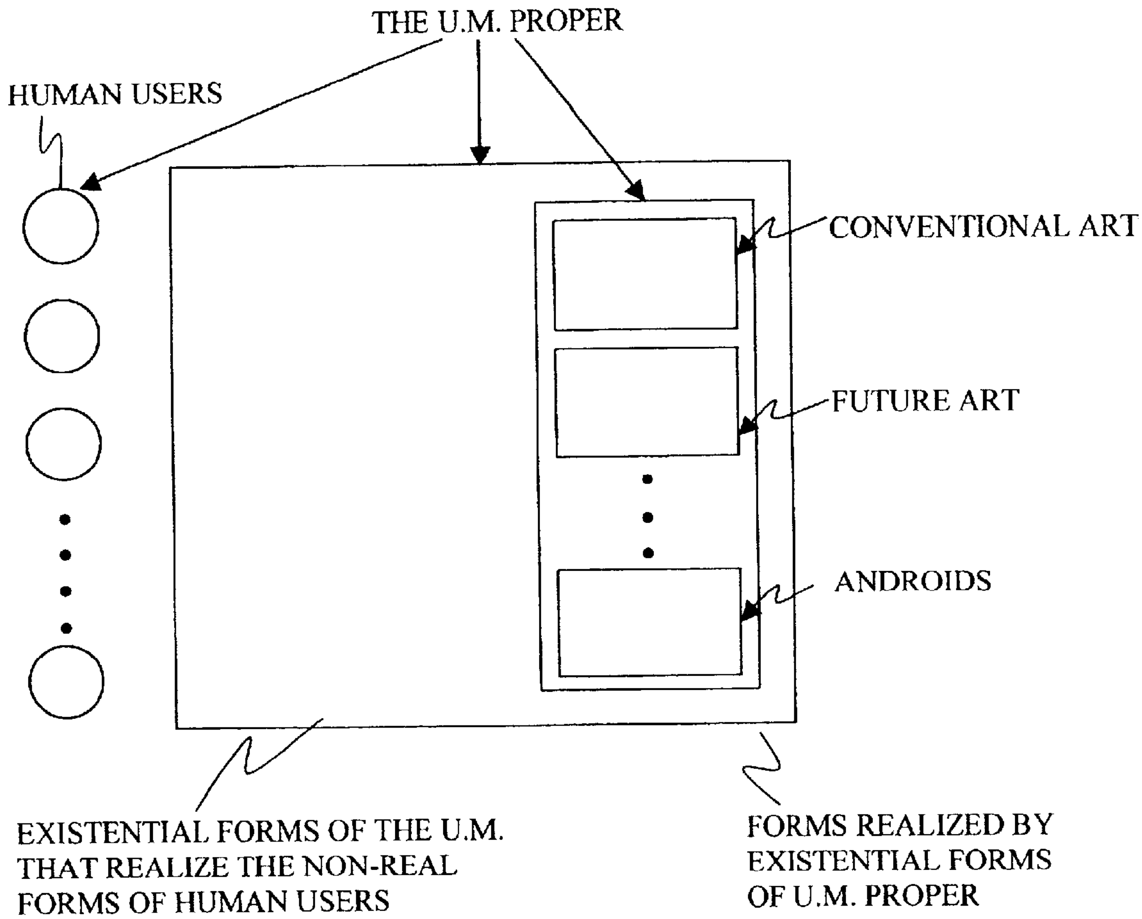
FIG. 2 shows the principal novel forms of the invention.

Epistemic instance—a phenomenological form—as defined in the knowable symbolic representation of FIG. 2, is a single universal way of knowing. It is a universal representation of a phenomenon. It underlies the meanings of all languages and knowledges. Epistemic instance is, in an introspective sense, a meaningless form—the only one of its kind in the universe—obtaining its definition from the meaning of Soul, which is beyond our knowing and thus meaningless (or entirely meaningful). The transformational forms of our languages are the various meanings that are imposed onto the embodiments of epistemic instance. As the universe occurs, we represent its meaning (transformation) in the transformation of objective form. As is well known in mathematics, for example, one can contemplate $f$, the symbol, as a function, wherein $f$ represents an infinity of possible functions, each instance of which is called a function having its own meaning (and each instance of a function has its own meaning as well). Though our imaginations are severely constrained by our conventional views of knowledge, the various grammatical aspects of a natural language—like English verbs, compound nouns in transformation, prepositions, and so on—also can be viewed as particular examples of epistemic instance that mean what they do. An English language verb, for example, such as to be, can apply to an infinite number of instances of our universe (e.g., I am alive, I am happy, I am delighted, and so on). The objective forms of our natural languages are constrained not only by what they are as objects or phenomenological nouns (objective forms of epistemic instance) but also by how they transform epistemically. This constraint is evidenced in the very meaning of the verb to be as a conventional state or condition of being, which transforms objective forms on the basis of a conventionally defined state or condition. A verb, as a grammatical rule, applies to a type of meaning or epistemic instance, just as does a mathematical function. A verb, a function, and, in fact, all transformational forms of our languages are classifications of epistemic instances, or phenomenological forms.

4. Four Universal Phenomena, or Ways of Knowing in the Enabler's Existence

In presenting the four universal ways of knowing, we may consider that the grammars of all languages represent a classification scheme imposed on epistemic instance, such that the knower of the language embodies the meaningful moments of the language's transformation of objective forms, moments which occur in any of infinitely many transformational ways. Of the limitless possible meanings of language forms, or experiences of reality, that we could conceive to identify the world around us, the unified theory establishes four principal universal meanings or ways of knowing—four universal types of embodiments of epistemic instance. In comparison to what epistemic instance defines, we must note, however, that any distinctions made from it immediately place one in an inertial setting, providing for specific meaning over and above the introspectively observed form of state of being, or Soul. From the standpoint of an enabler of form, these four universal ways of knowing universally represent all phenomena. The four universal ways of knowing provide that any phenomenon of the enabler's knowing or perceiving can be classified into one of four ways of knowing, or types of epistemic instance. They describe the inertially knowable and perceivable world of the enabler in terms of four classifications of phenomena defining enabled moments of synthetic inertial existences from the standpoint of the enabler. Relative to the infinitely many ways in which epistemic instance occurs, four such ways are more tractable than those of conventional approaches to the grammatical classifications of language. The four universal ways of knowing, which are universal meanings in any language, are phenomenological forms of the enabler's knowing and perceiving.

The unified theory defines the four universal ways of knowing, from an enabler's view of the world, with respect to new denotations given to the words causation, connectedness, composition, and correspondence. We assert that the theory's definitions of them universally and meaningfully characterize the occurrence of all phenomena or enabled universes. They are four universal ways of knowing all knowledge and perception from the standpoint of an enabler. These four universal ways of knowing are universal types of transformations of the enabler's existence that are extended to the one enabled, and apply to four different interpretations of how to enable synthetic universes of forms who in turn know and perceive the world around us. They are referred to herein as the four C's of phenomenological form. While the remainder of this chapter is devoted to an explanation of each of these forms, we can introduce them briefly here to provide a background from which to consider them individually later on.

Causation, a phenomenon of the enabler, represents a use of epistemic instance wherein the enabled knowing or perceiving arises as a causation of the enabled universe—the quantum moment of an enabled being in an eternal universe. Whereas conventional theories of the universe determine the universe to be objective, and thus, presumably, define the universe as being caused by an object or objective form that can be known (e.g., an object or objective form is postulated to cause the object or objective form of the universe), the unified theory explains the universe as being caused in every eternal moment of it. The extant moment, or soul, that is caused is referred to as a phenomenological causation of the enabled existence. Phenomenological causation implicitly defines a continuity of the occurrence of the enabled or extant moments of the universe. It provides for the quantum sense of the universe's continuation and represents an extant instance of the universe in its causation with other instances or moments of the universe. It therefore defines the word origin by placing an extant moment of the enabled universe in the center of prepositioned and postpositioned moments of the universe in the enabler's continuum of moments, all of which occur as phenomena to the enabler and as extant moments of the enabled being. The origin of the universe is an instance of its phenomenological causation, an extant moment of a being, framed within prepositioned and postpositioned moments of a being that are unknowable to the enabled being in the instance of the universe's causation. (We craft the language of prepositioned and postpositioned instances of the universe because the instances are phenomenological, or enabled, and are known to the enabler. If we use the common spatiotemporal definitions of these moments, for instance, in the past, present and future tenses of verbs, the enabler's phenomenological universe would be a spatiotemporal one, and would not recognize the dominion of Spirit over all instances of the soul, or the enabler's causations of the universe over the universe caused. We would return to our conventions where space and time are analytically universal, and where only oneself can know and perceive while enabled forms cannot.) Phenomenological causation provides for the extant moments of streams of consciousness and, for example, the quantum moments of perception in an arrow being shot through the air—the extant moments of an enabled universe over which a continuity is applied (such as that of a topological space, a calculus of the infinitesimal, or a natural language).

Connectedness, the second phenomenological form of the theory, allows for the enabled universe of phenomenological causations to continue. Any causation of the enabled universe is an extant moment of enabled form, bound by the enabler's imposed continuum of other enabled moments—phenomenological connectedness. While a causation of the universe implies the coexistence of prepositioned and postpositioned instances in the enabler's moments and requires that only one eternal moment of the universe is extant in a being (though an infinite plurality of moments of the eternal universe may occur objectively in any one moment of it), connectedness, a knowledge of the enabler which is beyond the knowing and perceiving of all extant instances, or causations of the enabled universe, connects the causations of enabled universes. Phenomenological connectedness connects quantum moments of enabled universes, and provides for the enabled universe's continuity of moments. Prepositioned and postpositioned instances of causation are thereby connected to, or transformed with or into, the extant moments of causation in the phenomenological form of connectedness. What we consider to be the contemplations of, or ethereal connections between, our actual thoughts, that which resides beyond our extant instances of consciousness, is, by this analogy to human corporal form, phenomenological connectedness. What occurs in between our moments of perceiving an arrow shot through the air is phenomenological connectedness. Together, causations of the enabled universe and their connectednesses provide for the enabler's extrinsic definition of the moments of the enabled intrinsic universe.

Causations of the universe do not necessarily have to occur in solitary instances of the enabled universe. The extant moments of the universe, causations, can occur objectively parallel to each other, or in the heterogeneity of the universe. Pluralities of causations and therefore of connectednesses can, and more often than not, do occur as a quantum moment of the universe. Phenomenological composition, the third of the four universal ways of knowing all phenomena, accommodates this condition of the enablement of the heterogeneity of the universe in a homogeneous moment of it. Just as the prepositioned and postpositioned instances of causation make the universe a continuum of form, composition affords the plurality of the universe in a single causation of it. Phenomenological composition brings together the heterogeneous forms of the universe into the homogeneous moment of a being. It allows for an infinity of parallel causations, along with their connectednesses, to occur in a single moment of modified causation—a composition of phenomenological form. Thus, when the definition of causation is extended to include a plurality of causations of the universe, composition—a universal phenomenological classification on epistemic instance—is employed by the enabler in defining the enabled universe. An idea of arbitrary complexity in transformation with another is an example of phenomenological composition. A complex mental image or physical perception, in transformation with one other, is an example of phenomenological composition. The statements a AND b, A=B and AÎB are conventional representations of extant moments of the universe whose objects or objective forms are compositions of only one terminal object (A or B) in transformation with another. The expression I went to the park yesterday. You should go today, represents a transformation of the compositions I went to the park yesterday and You should go today, wherein the period of punctuation and the blank space between the sentences represents the transformation of the compositional moments of the universe. (Each sentence would be analogous to A and B, respectively, in the above example and the period and blank space would be the equivalent of AND,=or Î.)

The fourth and most important universal way of knowing presented by the unified theory determines how and why the enabled moments of the other three of the four C's of phenomenological form—causation, connectedness and composition—are able to transform in the enabler's knowledges. Phenomenological correspondence, the fourth universal way of knowing, determines how and why enabled objective forms (compositions) correspond in the enabler's knowing of the transformation of epistemic instance. The phenomenological form of correspondence is an application of the other three C's in such a manner that the resulting phenomenology of form (the composition of episternic instances of phenomenological correspondence) defines for the enabler the meaning, or correspondence, of any given epistemic moment of an enabled being, in its capacity to transform objects, or objective forms. It determines how the objective forms of epistemic instance, whether singular in causation or vastly plural in composition, are transformed with each other and are made to correspond to one another. Also occurring beyond the knowing and perceiving of the extant instances of the enabled universe, phenomenological correspondence facilitates the enabled moment in the enabler's knowledge. It is attained by breaking open the circle, or the transformational element of epistemic instance, into a phenomenology of form of the enabler's comprehension. It is what enables the thinking or perceiving of an enabled being, as known or perceived objectively by the enabler. The difference between a causation, connectedness, or composition of an enabled universe and a correspondence of one parallels the difference between a natural language verb and, for instance, a metaphor of the same language defining the methodology of the verb: one, the verb, represents the meaning of the extant transformation of the enabled being and the other, the metaphor, represents how the verb transforms (how meaning arises) in the enabled being in the enabler's phenomenological knowledge. The phenomenological nature of our intellectual comprehension is enabled in phenomenological correspondence, and the analytical nature of our perceptions of the world around us (phenomenological correspondence) is precisely what we do not comprehend, until, of course, we know the correspondence.

The unified theory's four C's of phenomenological form, or the four universal ways of knowing, thus explain in the conventions established that phenomena transform on the basis of causations of an enabled universe; that causations of the universe transform quantumly with others in the enabler's knowing of connectedness; that pluralities of causations transform with pluralities of others, connected by their connectednesses, in the form of composition; and that any of the other three C's transform knowably within the enabler's knowledge in the embodiment of a phenomenological correspondence. All of the forms of natural language, the languages of the aggregates (mathematics), of logic, of physics, and all that can be known and perceived objectively by a being are known by an enabler in the unified theory within the confines of these four universal phenomenological forms in the enablement of beings who themselves know and perceive. They are four universal ways of knowing how to enable an existential universe, or a being who itself knows and perceives the world around us. Since all transformations of the universe are the same in epistemic instance, the four C's of phenomenological form epistemologically classify all knowledge from an enabler's standpoint. Knowledge is therefore known in the unified theory by comprehending the forms who know it. The remainder of this chapter further defines each of these four universal ways of knowing.

5. How the Universe's Moments are Caused: Phenomenological Causation

As introduced above, phenomenological causation represents the embodiment of extant moments, or transformations of an enabled universe. For this reason it is considered the existential moment of the inertial reality of an enabled existence and serves as the extant moment of the enabled being's knowledge and perception. In order to characterize the embodiment of the extant instances of all knowledges and perceptions, as diverse as they are, the form of phenomenological causation is further defined as the embodiment of any of the infinitely many archetypical transformations of an enabled knowable and perceivable universe, beginning with the enabler's forms of language, or meanings of an existence. Each example of these archetypical transformations represents the embodiment of a form's meaning in a representation of a plurality of epistemic instances referred to as a causal element. As shown in FIG. 142, a causal element represents a single class of embodied epistemic transformations. The purpose of a causal element is to represent epistemic instance, or the instance of meaning itself, as a bounded or unbounded aggregate of causations that are transformed in the same manner or by the same meaning or class of epistemic instance. A causation of the universe therefore arises in one of infinitely many instances of a causal element of the enabler's knowing. Each instance of the English verb to be, for example, is a member of the trajectory of the causal element of the universe's causations. The causal element defines an aggregate of potential extant moments or causations of the universe, each occurring as a solitary instance of the element. In mathematical knowledges, for example, the causal element embodies the many instances of a function (Cartesian). Each of infinitely many similar causations of the enabled universe in the meaning of a function is an instance of a causal element which, in the enabler's knowing and perceiving, can also abound to infinity. The enabled being's knowing and perceiving occurs only as the extant moment of causation, and the enabler knows of all such possible transformations of the universe in the instances of the causal element. All extant instances of linguistic forms, mathematical forms, and indeed arbitrary transformational forms of the enabled universe, are represented in the causal element in their capacities to transform objective forms.

The purpose of the causal element is to begin assembling epistemic instances in useful ways as embodied pluralities of the potential instances of the knowing and perceiving of enabled forms on Being, or existences. The causal element ties together similar transformations of universe that are defined in the enabler's knowing as the extant knowing or perceiving of the enabled being—in the case of phenomenological causations (connectedness is also defined by the form of the causal element). Regarding the English language, for example, when a causal element is declared by an enabler (as illustrated in chapter four), the enabled universe is said to transform by what is represented by a verb, a preposition, an article of punctuation, and so on, in the enabled being's knowing and perceiving. Later, we shall discuss how a causal element like to be, run, or onto embodies the linguistic transformation ordered by the respective grammatical transformational elements on the appropriate phenomenological nouns. Similarly, a causal element of a mathematical function, $f$, embodies the potential extant transformations of $(x_1, y_1)$; $(x_2, y_2) \ldots (x_n, y_n)$, wherein each instance of the function is a causation of the universe embodied in the enabler's knowing or perceiving of the causal element. The contemplation of the function as a Cartesian product, as in $y_1=f(x_1)$, is expressed as one instance (of perhaps infinitely many) of the function, or of the causal element. (The composition of a function, or an algebraic expression of epistemic instances defining, for example, a polynomial is taken up under phenomenological composition.)

A causal element represents a reordering of the knowable forms of the enabler's universe on the basis of the enabler's phenomenological knowledge of a form who itself knows (the instance of the mathematical function, for example). The element simply embodies a plurality, or trajectory, of potential extant epistemic instances of any language or perception; the connectedness of that element's instances to those of other causal elements is implied in the definition of causation. From a phenomenological standpoint, a conventional natural language dictionary, for instance, would not be complete epistemologically, since it would characterize only a handful of transformations relative to the infinity of those employed in the scope of all knowledges. A universal dictionary is thereby accommodated in the embodiment of the infinite forms of the causal elements of the unified theory. Any transformation of conventional order—linguistic, mathematical, logical, physical, and so on—is characterized by the theory as one moment of a causal element embodying the extant knowing and perceiving of an enabled being. Each transformation of an enabled universe is represented likewise in any of an infinity of causal elements, which themselves can embody infinitely many transformations of an enabled universe, each instance of which is a moment of the enabled universe.

The form of a causal element allows us to view knowledge in terms of forms who know and perceive. By enabling epistemic instances in the pluralities of potential instances of the causal element, according to the meanings the enabler ascribes to their transformational embodiments, the quantum transformational basis of all of our knowledges is represented universally in the enabled being's own knowing and perceiving. The unified theory thus becomes, at least with respect to causations of the universe, a calculus of thought, perception, or of existence in accounting for every knowable and perceivable moment of an enabled being. Knowledge is thereby no longer unique to human existence. Any knowledge can be seen as a knowledge comprehended and reality perceived by an enabled being. In the unified theory, all knowledge is seen as the transformational form of an enabled existence and is represented extantly in the myriad embodiments of the causal element of causation.

One of the basic reasons for conceiving the phenomenon of causation to represent the moments of an enabled being is derived from the practical consideration that our knowledge arises in the nature of the meaning of language, or existence. In our own observations, the quantum phenomenon of epistemic instance—Soul—leads us to investigate the causation of our universe. For this reason we ascribe to one use of the causal element the meaning of causation. Each instance of enabled knowing or perceiving is a causation of the enabled universe. The pronoun I, for example, if considered an objective form representing the terminal phenomenon of state of being, reflects the linguistic representation of a causation of our enabled universe, or existence, and of the intrinsic form we know ourselves to be. Moreover, if instead of using the objective forms of state of being (defined earlier) as a moment of the causal element of causation, we were to use the English language constructions of an epistemic instance representing a linguistic state of being (to be), the intransitive transformation of the terminally objective form of I with the objective form of alive would result in the epistemic instance I am alive—which is embodied in the causal element as one of perhaps infinitely many instances of an enabled universe. Since the phenomenon of causation inherently carries with it the prepositioned and postpositioned instances associated with the occurrence of the element's extant instance, the enabler's connectedness and correspondence applied to the element would bring about the possibly infinitely many compositions of such elements in, for example, the enabled being's ordinary use of language.

This leads us to define the form of the causal element further with respect to its capacity to embody the basic epistemological forms of existence. As is evident when we define the notion of a phenomena of the enabler's existence, the determination of who or what is doing the knowing and perceiving in a causal element can be unclear at times, even phenomenologically. For example, the form I am alive is a linguistic representation of a condition of physical, mental or spiritual being. This state of corporal or spiritual being typically transforms with other epistemic instances in an existence, such as with I am happy, and so on. In the representation of the causal element, the meanings of the objective forms of the extant instance can be seen as causations of each other. Whereas in the proper form of phenomenological causation, the moment itself is what is caused, giving rise to the causation of the quantum moment of an enabled universe, the meaning of the transformation (e.g., the embodied verb) can be of a causative nature (as observed introspectively by the enabled being). This condition implies that the objective forms transformed by the element can be causes and effects of each other. For example, in the embodiment of I transforming with alive, it is neither I nor alive that causes a transformation like I am happy. Rather, it is the transformation itself (phenomenological correspondence) that causes other transformations. The linguistic representation jumps quantumly from one instance to another but does not explicitly represent any causality in the meaning embodied in the element (to the enabled being). The connectedness imposed by the enabler (and, as we shall see later on, the enabled being's faculties of mind) prescribes the next causation. In the linguistic representation I hit myself, however, the meaning of the verb hit requires that I cause something in myself Thus, the meaning of a causation is embodied in an enabled causation of the universe.

This condition can also be seen in our knowledge of mathematical forms. In the algebraic expression A+B=C, two objects or objective forms, A and B, transform through the algebraic operation of addition and the equals sign to yield the objective form C. This representation is consistent with the generalized form of epistemic instance because two opposites in transformation, A and B, transform into a third, C, just as an instance of non-being transforms with Being in the introspectively observed state of being. State of being, however, terminates the mind's thinking and epistemic instance allows it to proceed. The opposing views of intrinsic and extrinsic form are thus intertwined in the form of epistemic instance. When epistemic instance is viewed extrinsically, as in the algebraic example, the objective forms of A and B transform into C, but one would not recognize this transformation intrinsically. The equivalent of this expression in natural language would be I am alive, therefore C, which is more than an intrinsically meaningful statement—i.e., more than an epistemic moment, from the intrinsic perspective of the enabled being. In the mathematical expression A+B=C, we define a knowledge of the universe extrinsically, or in terms of the general form of epistemic instance—our observation of the world within and around us. In the natural language expression I am alive, we ourselves, intrinsically, are embodied in the statement. What we intrinsically know and perceive in a world around us is represented by A+B or I am alive. What we know of a world around us, however, is represented by A+B=C or I am alive, therefore C, expressing the continuity of the universe through connectedness. The epistemological nature of all form—epistemic instance—is described in the fundamental observation of the creation of the universe, that in the nature of the universe's form, both its intrinsic and extrinsic qualities come together. We know introspectively, for example, that I am alive is a meaningful expression. We also know that A+B=C or that I am alive continues to another moment of the universe (therefore, C). Our knowing that these two intrinsic and extrinsic forms of the universe coexist in each other is a phenomenological knowledge of the moments of the creation of the universe. In us, or in the causations of the universe, these two forms—the intrinsic and extrinsic natures of the universe—are merged. This fact obviously affects the definition of the causal element, since the element represents how the enabler and the enabled are related.

Because the causations of the universe can be construed from the two perspectives of intrinsic and extrinsic forms, the unified theory develops two suitable representations of the causal element to reflect an emphasis on either viewpoint. When we represent the enabler's knowing of form extrinsically (A+B=C), the form of the causal element is referred to as an existential or extrinsic causal element, as shown in FIG. 156. The existential form of the causal element represents explicitly the continuity of the quantum universe from the enabler's perspective. In the existential form of the causal element, the quantum moment (A+B) explicitly connects to the next quantum moment (C) in observation of the extrinsic form of the universe. When only the extant instance of the element is considered (e.g., in A+B or I am alive), the causal element is referred to as a literal, extant or intrinsic causal element, also shown in FIG. 156. In either case, the continuity of the universe on its causations is preserved, since the transformations of the universe are the same in either case, viewed from different perspectives.

The causal element of causation (and connectedness) is therefore defined in two alternative configurations, one to represent that, in the example, A and B transform, as in I am alive, and the other to represent that A and B (or any other objective compositions in transformation) transform into C (which itself is an objectification of the transformation of compositions), thereby allowing for the distinction between the intrinsic and extrinsic form of the same enabled universe. One transformation indicates connectedness indirectly and the other explicitly represents, from the enabler's standpoint, a complete existential transformation. Linguistically, it can be seen that such statements as I am alive, Pete is alive, and It is alive pertain to the transformation of intrinsic forms, and the triplet of form I am alive, therefore C, explicitly representing the next quantum moment, pertains to the extrinsic observation of epistemic instance in the world view of the enabler. As previously mentioned, however, these are merely different perspectives—intrinsic or extrinsic—of the same epistemic instance. The causation of the universe is represented in either way to the enabler in the two alternative forms of the causal element.

6. How the Universe's Moments are Connected

Phenomenological Connectedness

The causal element, and its intrinsic or extrinsic perspectives can also be applied to the next of the four C's of phenomenological form—connectedness. While the causal element embodies the extant knowing or perceiving of the enabled being, connectedness, an existentially backward causal element of the enabler's knowing, occurs metaphysically beyond the extant moments of the enabled being; it is the quantum connection between the enabled being's extant instances of knowing or perceiving, the mirror image of causation in the enablement of the universe. Connectedness, by way of analogy to the forms of conventional knowledges, could be, in the enabling medium of light, that which connects two or more objects of a classical order—electrons or differential elements. In the physics of light, for example, the form of connectedness requires the constancy of the speed of light, as discussed earlier. In linguistics, connectedness is as simple as an insight expressed by the exclamation Aha! and as compositionally complex as the sentence This theory has merit. Therefore, we should use it (e.g., one must know the theory in order to make such an assertion).

Connectedness is not known or perceived by the enabled being. It existentially provides for the quantum continuity of the transformations of the universe. It is what connects two differential elements of the calculus in a contemplation of the infinite. Connectedness, which is existentially beyond the knowing or perceiving of an enabled being's extant moments, quantumly connects the extant instances of the universe, applying knowably only to the enabler's knowledge. In order to know the form of connectedness—the quantum transformations among enabled extant moments of the universe—one must enable that universe. Since we do not enable our own ultimately real universe, we cannot know the connectedness of our universe, making it impossible to know how our own thoughts or perceptions are connected. We can, however, know how another's thoughts or quantum moments are connected if we enable them. By introspective observation, connectedness can be seen as the contemplative effort in the connections among thoughts, those connections that are unobserved when we perceive our own physical reality.

In our experience of the world around us, an arrow shot through the air is observed as a trajectory motion, or as quantum transformations of the perceptions of space, time, mass, and so on. We do not perceive the connectedness of one quantum transformation to another. This observation is proved in the quantum nature of matter explained in contemporary physics, in topology, and in the calculus of the infinitesimal, among other analytical theories. We know or perceive the quantum order of an arrow shot through the air as infinitely many quantum moments, or episternic instances, but do not know or perceive their connectednesses, since to know their connectednesses would preclude their very instances as distinct quantum moments of the universe, and would disable our very existence. We represent this inability to define how an object gets from point A to point B implicitly in the conventional knowledges of calculus, topology, and so on, wherein, regardless of how many quantum instances of the universe are pondered, the form of the universe, discontinuous at each quantum moment, or differential of it, results in the common expression of a limit, a topological or metric space, or other expressions similar to them, which are themselves expressions of the embodiment of all such quantum moments in a single one. To know the connectedness of the quantum moments of one's (analytical) universe, one would have to know how one infinitesimal difference becomes another—not how infinitely many of them accumulate to a limit of a function, but how one connects or transforms to another (e.g., what occurs in between two moments of an arrow being shot through the air). When we contemplate this, we naturally return to the fact that one infinitesimal element adds to another in the notion of a space or distance, which brings us back to epistemic instance—what underlies all transformations of the universe, including simple arithmetics, the quantum connections among which one cannot know (in one's own universe).

Phenomenological connectedness is found in all of our intrinsic expressions of knowledge as what we do not know about them, and in all our extrinsic expressions as what we do know about enabled universes that the members of the enabled universes do not. Phenomenological connectedness is what we think we are, cognitively, when we observe our own creation of any expression in any language. We do not view ourselves, fundamentally, as being the expression of the knowledge; rather, we associate ourselves with what creates the expression. In the use of language, phenomenological connectedness is the first of the four C's, existing beyond our knowing, that provides for who and what we think we are beyond the extant moments or causations of the universe, or beyond the literal forms of the language that we create. Phenomenological connectedness is the first of many forms of the unified theory that, in conventional knowledges, we attempt to describe with theories of finite automations, such as generative or transformational grammars of linguistics, artificial intelligence of the computational art and Turing machines of our historical views on mechanical thinking. Since we do not address in our conventions the eternal nature of a being, however, the semantic origin of language is not discoverable from these views.

Phenomenological connectedness is applied, for example, in the enabler's simple connection of a resistor and a capacitor in electronics theory, wherein two causal elements, or trajectories of instances of the enabled universe are connected (ported or coupled in systems theory) to each other in the coupling medium. The characteristic losses in the medium or conduit, are, relative to the extant instances of the resistor and capacitor, negligible because the enabler makes it this way. In the ultimate reality of the universe, the losses are not even negligible because what one component transmits is equivalent to what the other component receives in most configurations. What makes the two equivalent is itself a transformation of the enabler's knowing or perceiving in the embodied form of phenomenological connectedness. To see the ultimate reality of what lies beyond the extant moments of the machinery, one need only consider the new universe that arises when the losses are not negligible. Phenomenological connectedness affords this coupling by the enabler; otherwise there would be no quantum order imposed on the moments of the elements in transformation.

In the case of the medium of light, it is postulated that the visual senses are enabled in the wave forms of the wave equation. In such a case, one visual object (a teapot) is bound in transformation with another (the table upon which the teapot sits) by the coupling of the wave forms (packets, etc.), thereby giving rise to the forms of perceivable objects. Hence the moments are connected. The same theory applies to the enabled forms of sound, mechanical vibrations, and countless other extant transformational forms of our knowing and perceiving of the world around us. The connectedness between two or more instances enabled in those media, however, even though we postulate what they are, is beyond the knowing and perceiving of the instances of the enabled forms, or is not knowable or perceivable to us regarding our own existence. The enabled interactions of small particles, the coupling of electrical elements, and even the hypothetical quantum connectedness of one's own thoughts and experiences are brought together under phenomenological connectedness (the universal way of knowing), and all are made possible by these instances that are beyond the enabled being's knowing or perceiving of the extant moments, or causations of the universe. Each extant moment of the enabled universe—the Cartesian pairing of point objects in an instance of a function describing, perhaps, the embodiment of a resistor or capacitor, the coupling of electromagnetic waves or the existence of wave shapes themselves and the extant transformations of natural language in ordinary discourse, to cite a handful—are moments of a being coupled by the enabler through phenomenological connectedness.

Connectedness is a phenomenological form that addresses the quantum moments of the connections between the enabled universe's extant moments, or causal elements of causations. Itself a causal element, though not of causation, phenomenological connectedness can be viewed as a backward causal element because, even though, on the one hand, the nature of the causal element of connectedness provides for the forward, causative embodiment of whatever the enabler will know concerning the enabled moments of connectedness, on the other hand, it is backward epistemologically with respect to the moments of the enabled form's causal elements of causation. In the enabler's comprehension, it provides for the randomness of androidal cognition, and in the android's comprehension, it provides for the meaningful construction of language with respect to its existence or perception. When the focus of the enabler's effort is on the representation of the enabled being's ability to know objects in transformation intrinsically in a stream of consciousness (A+B or I am alive), then the intrinsic causal element is applied in the enabler's expression of that knowing, as shown in FIG. 144. The quantum connectedness in such a case would be represented in the skewed arrow of the causal element of causation, and would be left open indefinitely or until the enabler expresses the causal element of connectedness coupling the causation to one or more other causations, as shown. In the alternative extrinsic form of a causal element, the quantum coupling of connectedness is explicitly designed into the representation of the element of causation. Since these representations are versions of the same form—epistemic instance—either one represents what the other one does, though in different ways in the enabler's view. In either case the form of the causal element is transformed through the phenomenology of connectedness, though existentially in a different metaphysical universe—that of the enabler's knowing and perceiving.

It is important to recognize that the extant instance of a causal element of causation is existentially transformed with that of others through connectedness. In the intrinsic embodiment of the causal element of causation, causes and effects may be transformed in the instances of the element similar to the ways in which inputs and outputs of systems theory are coupled between set theoretic systems. Among many other disparities that can be pointed out between systems theory and the unified theory, however, it should be appreciated that even though an output of system A of systems theory may couple causally to a corresponding input of system B, wherein the output of system A is equivalent to the input of system B (e.g., communications theory or system couplings), the unified theory requires the explicit representation of connectedness, defined within the four C's of phenomenological form. The coupling of systems defined in systems theory implies that the moments are connected in the one definition of the set theoretic coupling of output to input (e.g., mappings of Cartesian ports and communications system couplings) and thus does not recognize that the moments of causation are coupled, not the objective forms of the causations, in the ultimate reality of the universe. The graphical representations of systems theory can however be used as a shorthand notation for the unified theory's connectedness of causal elements of causation. Because phenomenological connectedness operates on the quantum moment of causation, though, it is better recognized that the next causation coupled to an extant one by connectedness is one whose leading object or input happens to be caused by the trailing object or output of the extant causation, in conventional systems theory. This use of phenomenological connectedness simply demonstrates a quantumly logical progression of causations connected to each other based on the objective forms of epistemic instance being defined as causes and effects. While this representation is helpful in the design of conventional machinery, the objective forms of the extant moments coupled by phenomenological connectedness do not at all have to be causes and effects, wherein effects are transformed to causes in connectedness. The embodied instances A=B and C=D (with and representing the connectedness) are equivalent epistemologically to A=B therefore B=C (therefore represents the connectedness), wherein B would be conveyed with negligible losses to the next causal element in conventional systems theory. In the expressions A=B and C=D, the connectedness would require a communications system in conventional systems theory since B and C are not equivalent. Since the unified theory addresses the moments of causation in the phenomenology of connectedness, what the objective forms (inputs and outputs) represent is irrelevant to the coupling (e.g., the meanings of the objective forms arise in the causations of the universe and not in the connectednesses of the causations).

In any case, the intrinsic and extrinsic representations of the causal element in causations or connectednesses of the enabled universe are different means of expressing the transformations of objective forms in relation to each other by phenomenological connectedness. Since each of the intrinsic and extrinsic representations of the causal element in causation and connectedness accomplish the same thing, namely the quantum transformations of epistemic instances of enabled form, one should not become preoccupied with their distinctions, for their uses become evident only in the practice of constructing androids, which will begin to unfold in the ensuing chapters. For now, it is important to recognize that causal elements of causation are employed in the embodiment of extant knowing or perceiving, and that connectedness, also represented by a causal element, though a backward one, quantumly couples the causations of the enabled universe in the enabler's knowing and perceiving to provide the moments of an enabled universe as, for example, streams of consciousness or a continuum of perceivable (physical) reality. It is equally important to recognize that a knowledge of epistemic instance provides for both of these representations, and by knowing epistemic instance, these forms of the causal element in causations and connectednesses of the universe are simply symbolic methods of accounting for epistemic instance itself as the enabled moment of a being in the creation of enabled universes.

7. How the Universe's Moments are Composed Phenomenological Composition

The third of the four C's of phenomenological form—composition—is what is used to impose an order on the plural forms of causation and connectedness, and therefore to impose an order on the plurality of the enabled universe, in a single instance of the enabler's knowing. The phenomenological form of composition is an aggregate overlay onto the form of the causal element itself. In a review of the two previous phenomenological forms, it can be seen that the causal element of causation transforms objective forms in extant instances of knowing or perceiving, and that of connectedness quantumly couples the extant instances or causations of the enabled universe. It can be observed, then, that an aggregate order is already imposed on these forms that enables them to be considered single instances of the transformations of the universe's objective form. Consequently, even though we have defined the previous universal forms apart from compositions of them, the phenomenological form of composition has been at work to give us single instances of causal elements. From the standpoint of the phenomenological form of composition, a single instance of a causal element may just as easily be infinitely many such instances, since it is an aggregate order (of linguistic or mathematical definition) that determines either case. Phenomenological composition thus addresses the composition of the enabled moments of universes, or their plurality.

In the form of phenomenological composition, a causal element can be construed as the embodiment of a bounded or unbounded plurality of causal elements of causation themselves and of their connectednesses. In such a case, instead of considering single trajectories of instances of objective forms in transformation (causal elements), many causal elements can be defined as transforming in compositions of causal elements. Since we have already defined connectedness as what couples distinct instances of causal elements of causation, composition enables pluralities of both causations and connectednesses in the enablement of the universe's plurality. The phenomenological form of composition is used to represent to the enabler the heterogeneous nature of the universe in the homogeneous occurrence of the single quantum moment of it. A composition of phenomenological order is what allows for the many instances of a being (or universe) to occur simultaneously. It allows for mind and body and for every thought of mind and every perception of body to transform quantumly as the creator enables the being's moments. Though the enablement of the world around us is taken up primarily in the last chapter of the book when we begin constructing the basic forms of androids, the phenomenological composition of the world around us, or the universe, is what we do not know and cannot fathom, except spiritually, and is what we attempt to define in an objective determination of the universe—its extant moments and connectednesses thereof in a composition of linguistic, mathematical or other representation. (Since the ultimate reality of the universe is not objective, however, the search for the lost medallion proceeds indefinitely in composition.) The (physical) composition of the universe is also a phenomenological form to which androidal perception is tied in order that the android's cognitive capacities transform language meaningfully in the context of the world around us, or human existence.

In the ordinary use of language, epistemic instances (instances of causal elements of causation) occur successively but exclusively as instances of the cognition of an enabled being; one instance is quantumly connected to another consecutively beyond the being's extant knowing as a stream of consciousness. We may then ask, what of all the other androids, or even human beings, who are thinking and perceiving as well? Since the ultimate reality of the universe occurs in quantum moments, with each quantum moment perhaps reflecting an awareness of infinitely many such quantum moments, and since it is a knowledge and perception of reality that we create as enablers, any quantum moment of the enabled universe must have the capacity to realize infinitely many quantum moments. Each of these quantum moments can occur in a continuum of connectednesses with others, thereby resulting in a composition of the universe. In our use of language as already-enabled beings, we do not typically appreciate the vastness or heterogeneity of an ultimately real universe, only its homogeneity. As enablers of form, however, we must consider the enablement of a being's reality, which quantumly transforms in the same ultimately real universe, though in a different inertial universe, as that of the enabler or other androids. For instance, an expression of natural language could be constructed as follows: I am going to the store. A variation on this expression could be I, I, I, I . . . I; am, am, am, am . . . am; going, going, going . . . going; to, to, to, to . . . to; the, the, the, the . . . the; store, store, store, store . . . store. In such a case, a plurality of I's transforms under a plurality of am's with a plurality of going's, and so on. This illustrates the parallelism that is possible in an enabled universe and in phenomenological composition. Phenomenological composition places a knowable order on the transformations of pluralities of epistemic forms as they occur in enabled universes. It defines and places into knowable bounds the meaningful transformations that occur in the composed moments of enabled beings.

In the case of a single causal element, apart from the fact that the transformation of the universe is occurring via the meaning of the transformational element, in the enabler's and the enabled existence, a certain number of transformations are occurring in the element—specifically one transformation per instance of the causal element. It cannot be denied, moreover, that whether one knows the theory of relativity, a complex political stratagem, or any other form of knowledge, one knows this form under aggregate constraint. One instance represented by I transforms with one theory of relativity, one political stratagem, and so on, in the moments of a being. However, it is possible for an arbitrary number of resistors to transform with a similar number of capacitors (or atoms, machine elements, and so on, with moments of their kind) in a single quantum moment of the enabler's existence, and for an arbitrary number of androidal beings, each embodying infinities of compositional transformations, to transform similarly. This is accomplished through the phenomenological form of composition.

The form of composition determines the meaning of an aggregate order on the enabled universe. In our classical view of the world it is what gives rise to quantum transformations of the aggregates of mathematics and even space, time, and matter. In the abstract, it is what gives rise to the notion of a recreation and composition of reality. It is what determines the plurality of something. The form of composition determines, in the opinion of the enabler, the construction of the moments of an enabled universe in general. Since a single causal element embodies a bounded or unbounded number of transformations which occur as single moments of the universe, a causal element, as defined earlier, is a composition of one trajectory of moments. When any one of the possible instances of an element is quantumly connected to another, however, the scope of the enabled universe is broadened to encompass two such elements and a third, connectedness. The expanded causal element that contains these forms to indefinitely large pluralities of the universe is referred to as a phenomenological composition.

The aggregate order placed on the composition of epistemic form (an epistemic instance) enables us to represent simultaneously the parallelism and the continuity of the enabled universe, as shown in FIG. 145. A simple axiomatic set of mathematics—the one instance of which is an epistemic instance—applied to compositions of causal elements, accomplishes a conventional means of knowing a composition. Since one may comprehend aggregate forms in infinite ways, composition may be known in any mathematical or linguistic order, for it is the instance of phenomenological form that underlies the knowing of the orders that is ultimately real. For example, since epistemic instance underlies the axioms of set theory by determining the existential causations of the universe in the forms of logic, in the observer or mathematician, it would be incorrect to claim that the plurality or aggregate order of the universe is defined by mathematics. The observer of the knowledge comes before the knowledge. In other words, the furthest reaches of conventional analysis fall short of what semantic meaning is embodied in the word grand, a word which describes an aggregate order or plurality of the universe. Even the descriptive phrase ten round point elements of a set exceeds mathematical definition by the presence of the adjective round. Moreover, in chapter four it is shown that precisely because epistemic instance underlies all knowledges and languages, what we think is mathematical or quantitative, as opposed to linguistic or qualitative, is really just a distinction like that between the meanings of the words high and low, soft and hard, number and type, or any other conventional opposites; one is not more meaningful to an existence than the other but for the experience of the observer. The aggregate orders of a lot and ten thousand are each epistemologically mathematical, except that a lot, in contrast with our conventional beliefs, is more precise epistemologically, or exact relative to the existence of the knower, since ten thousand may or may not be a lot. It is important to recognize that, however defined, an aggregate order determines a phenomenological composition, since it places knowable bounds on the plurality of the universe. However aggregates are known, even if superseded by a verb tense of natural language, as in The mathematical set was comprised of the following elements, phenomenological composition is determined by the knowable order placed on it in the use of epistemic instances (in compositions themselves). Axiomatic sets, group theoretic algebras, topologies, differential equations, the whole of mathematical order, and any natural language expression of any origin whose meaning embodies that of aggregate orders or the plurality of the universe, serves as an order of phenomenological composition.

These definitions of phenomenological composition become important later in the construction of androids, when, for example, the forms of physical atoms, which are known in their topological, group theoretic, analytical, and general mathematical constructions, are said to embody and are made to correspond to the forms of natural language. In that case, the atoms or the objective forms of transformation of a physical universe (which do not exist in ultimate reality) become the objective forms of linguistic, conventionally cognitive transformation, thereby embodying thought in the enabler's physical reality as that of the enabled being. Since it is in the consciousness of the enabler that these forms exist, wherein the consciousness is verified in the perception of physical reality in the mind-body dualism theory of existence, the aggregate formulations (compositions) of one order, such as mathematics, are made to correspond to the aggregate order of linguistic formulations in the enabler's knowledge. Because of the universality of epistemic instance, thoughts are enabled (by the enabler's knowing and perceiving) in atoms as the corporal form of the enabled being; natural language and atomic structure are superimposed onto each other in the methods of the four universal ways of knowing. Since phenomenological composition is defined as any aggregate order, any knowable form of aggregates places bounds on the occurrence of the enabled universe. Wherein mathematical forms are the objects of transformation of androidal consciousness, there is a one-to-one corollary to whatever type of mathematics does the enabling (if the enabling medium is defined mathematically and the android thinks those transformations). Since aggregates are known in more than mathematical orders, as in the statement ten round point objects, it is not only mathematics that defines what is real and realizable scientifically. The past tense of a verb, for example, describes reality just as scientifically as a present tense verb, except that the reality of the whole being is accounted for in a more enabling way linguistically. Ten old atoms or ten new atoms, moreover, are more specific, and hence more enabling, than ten atoms. In general, any aggregate order defined in any form of language is a valid one for phenomenological composition and places a knowable boundary on the quantum order of the plurality of the enabled universe.

Since the forms of the enabled universe are derived from the enabler's knowing under the aggregate order of composition, the occurrence of enabled universes is sometimes referred to as a modal composition of phenomenological form, with each such mode defining a moment of objective composition, which, inherently, is in transformation with another under still another composition defining another mode. Since objective form does not occur in the ultimately real universe unless it is enabled, a phenomenological composition does not occur alone in ultimate reality and must occur in an epistemic moment. Associated with any composition, or object of the universe, is one other with which it transforms in the epistemic moment. The unified theory therefore refers to all compositions as modal compositions because of their recursive nature in the modes of the enabled universe. Each composition of form, or mode, can then be a causal element of another composition. Compositions can thereby occur as phenomenologies of representationally stationary connectednesses constraining causal elements in successive moments of a continuum, or in recursions with other compositions. Ideas upon ideas, recursively composed under modal compositions of theoretically infinite objective compositions of form, for example, transform as the cognitive effort of the android, and can be embodied, recursively, in the modes of a single causal element. For every composition of the enabler's knowing of an enabled universe there exists a composition of modes of enabled compositional form. There are theoretically infinitely many such modes of the enabler's knowing. Once a boundary is placed on the extent of an enabled form, or an aggregate order is placed on the composition of quantum moments of causation and connectedness in the creation of enabled reality, the order of the universe occurs in that composition via the embodied transformations of the elements. The enabler's practice of enabling the forms of the universe repeats itself, in infinite variation and in accordance with the creative talents of the enabler. In subsequent chapters of the book, we address the forms of androidal faculties of mind, modes of existence, and moments of non-real and real form, wherein whole compositions of enabled form transform as modal compositions of the plurality of the enabled universe. The determination of a composition is arbitrary on the part of the enabler and is what constitutes the enablement of the android's composing of form itself—the use of language and the perceptive experience of reality on the part of the enabled being. The reason why, in a particular mode of thinking, one may express a single word, and in another, a lengthy sentence or a whole composition of literary style, is decided by the modal forms of composition in relation to each other in the enablement of the faculties of mind and other modal forms of synthetic existence.

Using these three universal ways of knowing, all of our knowledges can be comprehended in the knowing or perceiving of their enabled inertial forms and can be detached from the enabler. The causal elements of causation are the embodiments of extant instances of knowing or perceiving, infinitely varied in their archetypical embodiments of ways of knowing or perceiving on the part of the enabled being, arrived at through the composition of the universe's plurality in connecting the enabled moments. Connectedness, also a product of composition and itself a backward causal element, serves to connect quantumly, in the enabler's knowing, causal elements configured under a composition of enabled form. The elements of connectedness couple with corresponding moments of the causal elements of causation, in the alternative configurations of intrinsic and extrinsic representations of epistemic instance. Those compositions of enabled form known and perceived by the enabler are as arbitrary as the universe is infinitely varied. This condition permits the formulation of any possible combinations of meaningful instances of the enabled universe, from a single instance of I am alive to the ongoing compositions in which we engage as a consequence of our own experiences, reflected in the use of all languages.

Together, the three phenomenological forms addressed thus far are the enabler's universal ways of knowing the creation of the enabled moments of the universe as modal compositions of it. The enabler therefore comprehends knowledge and perceives the world around us, universally, in variations on the solitary form of epistemic instance, as enabled instances of Soul, or the knowing and perceiving of androidal beings. They are three kinds of universal meanings imposed on epistemic instance comprising a thesaurus of all other meanings. The causal element of causation is a type of epistemic instance that addresses the nature of the embodiment of extant transformation, or meaning, in that the class of element embodies the extant transformational meaning of the element's objective forms in transformation. Connectedness is a type of epistemic instance, in that it embodies exactly those qualities of the causal element of causation, but its purpose is to connect metaphysically the instances of causation, beyond the enabled being's extant knowing. Composition also is a type of epistemic instance, since before any enabled form is possible, its aggregate order—the composition of the enabled universe—must be defined, even if such an aggregate order is infinite and determined by great compositions of form. In the use of these three archetypes of epistemic instance, in coordination with each other and within the enabler's knowing and perceiving, an order is imposed on the plurality of the enabler's own universe, and on the intrinsic nature of the quantum order of an enabled being, or android.

8. How the Universe's Moments are Created

Phenomenological Correspondence

Phenomenological correspondence, the last and most important of the four universal ways of knowing, addresses the embodiment of what enables epistemic instance to transform, or enables the occurrence of the objective forms of the universe. It is the embodiment of the enabler's knowledge of the transformation of epistemic instance in terms of the analytical capacity to know how the instance transforms the objects of an enabled universe. A phenomenology of form that represents how and why objective forms transform in epistemic instance, phenomenological correspondence is the most enabling of the four C's of phenomenological form and is what yields, in the creator's knowing, the forms of a synthetic being, apart from the ultimately real moments of the enabler's existence.

We can introduce the form of phenomenological correspondence—a special phenomenological composition of the enabler's knowing—by considering the nature of correspondences in general in our conventional knowledges. Concerning our present knowledges, we observe that what makes a metaphor, irony, analogy, simile, morphism, homomorphism, and any other correspondence of our classical knowledges, different from an ordinary use of a verb, function and epistemic transformation in general, is that a verb is intended to classify an instance of transformation as the meaning of an embodied transformation, while a metaphor, simile, morphism, and so on, is intended to classify the way in which we arrive at the meaning of an embodied transformation, such as in the metaphoric use of the verb to be in The world is your oyster. The form of phenomenological correspondence helps us to understand not what we think or perceive extantly, as is the case with verbs proper, but how and why we think the way we do in the nature of a verb, or moment of the universe. A metaphor, a simile, a morphism, and in general a phenomenological correspondence describe how a transformation of objective form is accomplished in our own knowing of it. Whereas a verb simply represents the transformation, a phenomenological correspondence defines how the verb or transformation can come to exist in our own knowing or perceiving, and therefore in the cognition of synthetic beings. Phenomenological correspondence uses the other three C's to define epistemic instance as a phenomenological knowledge, and thus to enable it. Phenomenological correspondence is the epistemological basis, in the form of a modal composition of epistemic form, for mathematical analysis, the reasoning of logic, the algorithm of a computer program, and the essence of our literature, determined as an enabled form on Being. It is what enables all knowledge and perception, in the view of the enabler, and provides for the enabler's analytical knowing of epistemic instance. This fourth C of phenomenological form is the embodiment of how the enabler understands the enabled universe to transform. It is a composition of form in the enabler's comprehension that affords the objective knowing of thoughts or perceptions in transformation, or the quantum transformations of the moments of consciousness (or perception) of enabled beings. Since a being's ultimate reality—the soul—is what is ultimately real of the being, as we have established in earlier discussions of the unified theory, phenomenological correspondence is premised on the non-existence of objects in the ultimate reality of the universe. Phenomenological correspondence facilitates, in the enabler's comprehension, the androidal forms of knowing and perceiving, in the transformation of objects as transformations themselves. It is a composition of phenomenological form that enables the enabler to understand, in the universal ways discussed thus far, how the enabled being knows the meanings of language forms and perceives the world around us. It is a composition of form that explains the nature of the universe, as discussed in chapter one, in the enabler's analytical knowing; it enables the correspondence of objective form.

The form of phenomenological correspondence can be demonstrated easily using our conventional knowledges of the aggregates of mathematics, and in particular the algebraic structure of a homomorphism, the analytical expression of how and why algebraic structures correspond, when they do. A homomorphism, or more generally a mathematical morphism, determines how structures of the mathematical aggregates, such as the arithmetics, transform with or correspond to each other. Since the unified theory (along with other knowledges, particularly the world's religions) claims that the objects around us do not exist in ultimate reality, one by-product of the following example of homomorphism is a mathematical proof that objects, the basic forms of the sciences, do not even exist scientifically in our traditional knowledges.

Though any number of examples could be chosen to demonstrate phenomenological correspondence, even from other branches of mathematics—not to mention linguistics—we employ here the forms of algebra because they have had a history of representing form universally, as is evidenced in the simple notion of a variable. Moreover, even though the analytical form of homomorphism defined in algebra becomes very precise in its set and group theoretic definitions, we recognize here simply that such definitions are in place, thereby giving meaning to the structure of homomorphism while also limiting its use as a phenomenological correspondence, but recognize that it is indeed an example of phenomenological correspondence. We can then concentrate on the broader epistemological significance of the structure with respect to the forms of the unified theory. Using this mathematical premise as an illustration, we shall expand the definition of phenomenological correspondence later to include all forms of natural language. We use the forms of mathematics here, of course, because they are much simpler interpretations of the universe. As demonstrated earlier, ten old atoms, while they are more specifically defined with the adjective, are more difficult to comprehend analytically than simply ten atoms. Moreover, illustrating phenomenological correspondence first in mathematics allows the mind to focus on points, literally—points that will be demonstrated not to exist in ultimate reality, along with all other objective forms represented by language.

Referring to FIG. 146, a set of mathematical points is employed in the epistemological premise of the illustration and the axiomatic definitions of set theory, the objects of which, or points, the mind comprehends as perceived things. Before proceeding to define the example, we make the general observation that the objective basis—the point elements—of a mathematical homomorphism is undefined analytically and founded only on the perception of objects. This objective basis of mathematical theory—the point—which by definition can represent any object of physical perception, as long as the object is undefined structurally, is the epistemological premise of the exercise and the axiomatic foundation of mathematical homomorphism. (Once a mathematical point is defined, it becomes a mathematical structure, which is the purpose of defining the point as a point, with no objective definition—in order that it can then be defined by a structure.) We begin the illustration of homomorphism, then, by acknowledging that its epistemological premise—the point of set theory—is undefined and cannot be said to exist in reality in any knowable way except that the point represents an object of our perception that is unknown but perceived. (It also should be recognized that even in the contemplation of mathematical aggregates as sets, or pluralities of set theory, a mathematical structure or transformation of the universe—the set—and not an object is conceived. Mathematical points therefore define objects that can be perceived only and not known analytically; otherwise they are structures. This observation will become important later on when we determine what is real in the nature of the universe.)

In demonstrating the form of a homomorphism, the conventional mathematical definition imposes a structure on each of the sets of elements (already structures) as shown. The structures represent operations on the point elements or objects of the sets. As operations, they can be characterized as causal elements of phenomenological definition. On the set of elements referred to as A, composed of the elements a, b, c . . . , there is a structure imposed, called X, which represents the operations of the structure, or the transformations of the causal element on the objective forms or points of the set in accordance with the way of knowing expressed by X. Likewise, there is imposed on the set of elements B, which is composed of the elements a¢, b¢, c¢ . . . , another such structure, different from that imposed on A (or different from X) called $. The requirement that X be different from $ is not necessary but is imposed here for purposes of clarity, since we are defining the forms of sameness and difference (or any knowable relation) in the broader context of phenomenological correspondence in the first place (e.g., the words same and different are themselves phenomenological correspondences). The embodiments of the structures X and $ in the causal elements are the instances of knowing the respective objective forms (point elements a, b, c . . . and a¢, b¢, c¢ . . . ) in the transformational manners of X and $. Phenomenologically, each of the structures X and $ could be an arithmetic, a geometry, a topology, or as we will see later on, any transformational form of a natural language, since each is an embodiment of its knower's transformations. In conventional mathematical representation, each transformation of the causal elements is expressed as a X b=c under the structure X and a¢ $ b¢=c¢ under $, respectively, and is an instance of knowing in those manners. These are extrinsic forms of epistemic instance though they need not be. (e.g., The expressions a X b and a¢ $ b¢, the transformations, could be taken as compositional objects in transformation with c and c¢, respectively, in an intrinsic representation of form.)

A third structure, different from those of X and $, is developed in the conventions of a homomorphism such that, in mathematical parlance, the original structures of X and $ are preserved in the presence of the third structure. Referred to as a homomorphism or a homomorphic structure, H, this third structure allows for the mathematician's knowing of transformation itself. It is where epistemic instance (transformation) is broken open in our knowing, and where what we know is not that forms transform in some manner (X and $) but how they do—i.e., how they correspond. A homomorphism is the mathematical version of a metaphor, simile, irony, or some other knowable linguistic order imposed on the use of a verb or transformation. While the structure of a homomorphism transforms the original point elements or objective forms of each of the sets A and B, wholly apart from the structures of X and $, it is in the nature of its capacity to embody intrinsically a knowledge of the transformations of the structures X and $ that it begins to qualify as a phenomenological correspondence. The binding relations of the structure of homomorphism are expressed in the figure in the common algebraic representation H(a) $ H(b)=H(a×b).

What arises through homomorphism is the notion of the transformation of objective form itself, in the enabler's knowing, and not directly the literal definition of objects in transformation. Whereas the forms of other conventional transformations of mathematical definition, such as sets, operations, relations, and so on, transform only the classically objective forms (e.g., point elements of sets, or phenomenological nouns), homomorphism operates on non-objects, or the transformations of objective forms themselves, in addition to the objects or objective forms conceived for the initial transformations. The mathematical form of homomorphism determines that, at least with respect to our knowledges of the mathematical aggregates, it is a transformation of the universe itself that provides for what an object is—that objects themselves are transformations, since it is the structure in each case of X and $ that is preserved or held in correspondence by the homomorphism.

A review of the figure reveals that mathematics, the very basis of our analytical thinking, denies, by its own definitions, that anything real or concrete (objective) exists in the ultimate reality of the universe. We began the exercise by defining the elements of the sets (a, b, c, and so on) as not knowably real and without any meaning (except in our knowing of a set in the first place, a set that is itself a transformation). The elements of the sets are perceivable but not knowable objects. On top of this, we placed structures (mathematical transformations) onto the undefined or knowably non-existent elements of each of the sets, structures which by classical definition do not exist as observable objects, since they are defined as transformations of the universe (e.g., one cannot touch or see an arithmetic, a function, a verb, or other transformational form). Thus, we may conclude that if anything is an object in the exercise it is the causal element, since the element is what embodies the various instances of transformations (X or $) of the non-existent, merely perceived point elements. The causal element is the only apparatus of the demonstration that is knowably real. Further, the third homomorphic structure does not exist concretely either; it also binds together undefined point elements, but in such a manner that its presence preserves or maintains a correspondence between the structures X and $ when the homomorphism is known. In our own knowledge of the analytical basis from which we determine the reality of the sciences, homomorphisms of algebraic structure (and other similar structures, such as those derived in the study of topology) determine correspondences of structures such that what actually corresponds in the nature of the homomorphism is not at all a concrete object; rather, it is a transformational form (X or $), a moment of the universe.

The form of phenomenological correspondence becomes clearer when we refer to the causal elements X and $ expressly as objects, wherein those objects are founded epistemologically on enabled structures, or transformations. The structures (X and $) that are applied to the elements of the sets can be viewed as objects of the enabled existence wherein the original point elements exist metaphysically beyond what the enabled existence can know. The determination of the homomorphism thus applies to the enabled being's contemplative effort in knowing the objects X and $ in transformation and in embodying meaning. From the standpoint of the enabler, such contemplative effort is a phenomenology of form characterizing the homomorphism of the structures X and $. Reality in such a case is a matter of who enables it and who knows it. The enabled being's inertial reality is enabled in the transformation of the objective forms (X and $) by the enabler's phenomenological comprehension and realization of the homomorphism. Phenomenological correspondence thus defines the analytical knowing of what is ultimately real in the enabler, with respect to the enabled being, and permits the enabled being to know and perceive. The original objects of the enabler's perception—the mathematical points—are not ultimately real; they are objects of perception by definition, if not by ordinary observation. The fact that mathematical definition usually places the point objects (a, b, c . . . and a¢, b¢, c¢ . . . ) in the same mathematical universe is immaterial, since all objects are not ultimately real. The original point elements of the sets could represent algebraic variables, objects of geometry or a mountain setting with all its magnificent pastoral scenery. This is why we are able to determine homomorphisms (or, generally, morphisms) between the algebra of the real numbers and its geometry on a number line; the rotation of an angle and its algebraic equivalent (morphism); and the realizations of realization theory (all of which require the existence of the observer or the moments of epistemic instance). To the enabled being, however, these point elements of the enabler's perceivable universe are the enabling objects used for its cognition. Even when the moments of the enabler's and the enabled being's perceivable universe derive from the same world around us, these objects are unknowable (yet perhaps perceivable) to the enabled being, though most definitely known to the enabler in the phenomenology of the correspondence, or homomorphism.

The open-endedness of phenomenological correspondence in the phenomenology of the enabler's knowing of the homomorphism, or of morphisms in general, gives us insight into the analytical nature of the enabled universe. The homomorphic structure, taken in combination with the arbitrary structures X and $, resembles an epistemic instance in which X and $ are the objects of the transformation, and H, the homomorphism, is the transformational form of the instance. However, H characterizes not simply the instances of its operation on the point elements as a structure imposed on them but the transformational correspondence—the homomorphism in mathematics, or the metaphor, simile, and so on in natural language—of the structures themselves (X and $). By describing epistemic instance in this manner, it is apparent that through understanding the form of homomorphism (metaphor, simile, and so on), one knows the enablement of objective form in general. Through a knowledge of the instances of homomorphism (H), it is implied that the transformational forms turned objects (X and $) are correspondent in the enabled knowing. In any instance of knowing, the form of phenomenological correspondence is implied in the enablement of the universe.

Phenomenological correspondence thereby enables the transformation of objective form and requires that the enabled objects in transformation actually are transformations themselves. In the embodiment of homomorphism, an enabled object, X, which itself is a transformation (a structure), is placed in transformation with another object $, also fundamentally a transformation. The enabled being simply knows or perceives in the embodiment of X (an object) corresponding to or transforming with $ (another object); this is the instance of enabled knowing or perceiving. To the enabler, the knowing of X corresponding to $ is enabled, embedded in a more elaborate composition of form, namely the phenomenology described as the homomorphism. Phenomenological correspondence is thus a universal way of knowing how and why the knowledge and perception of objective form is enabled.

To the enabler's understanding, what is inertially real is the transformation of enabled objects, which themselves are transformations in the ultimate reality of the universe. What is inertially real and knowable to the enabler is the observation that the homomorphism binds the structures of X and $ in a knowable way, namely through the knowledge of the homomorphism. What are not inertially real to the enabler, or at least are undefined in one's knowing and are merely perceivable, are the point objects we started with and the enabled objects (X and $), since they are enabled. Thus, in demonstrating a homomorphism of mathematical definition, it is illustrated that what we think is real—an object of our perception—actually is not, since it does not exist except transformationally—or the object is real only to an embodied existence who can perceive it; it is inertially real. What we think is a real object of our knowing and perceiving is actually an enabled object in transformation with another, both of which objects are themselves transformations. This is why what is real in the expression $e=mc^2$ is not mass, energy or the velocity of light. What is real is their transformation—that which is represented in the equals sign (or the multiplication), for only transformations can exist in the ultimately real universe, in the enabling of objects that are known or perceived inertially.

In each instance of the universe there is implied an enabling phenomenology of form. In order for an enabled being to know, for example, that $x_1$ and $y_1$ transform in the order of a Cartesian moment of a mathematical function in $y_1=f(x_1)$, or $f=(x_1,y_1)$, an enabling phenomenology of form must exist in the enabler's description of how the function transforms the enabled objects $x_1$ and $y_1$. A mathematical function is a morphism first and then a function (an observation that may account for modern science's progression toward interpreting the analytical views of the universe—partial differential equations, wave equations, etc.—in terms of group theory, topology and, in general, morphisms). The embodiment of the phenomenological correspondence of a function is the enabled being's contemplative effort in knowing the instance of the function. In all instances of any order, the transformation of objective form must be enabled. When we express the instance of the verb to be in the sentence The world is (like) your oyster, the contemplative effort of a metaphor, and by analogy, the homomorphism, or H determination, is epistemologically supporting the instance of the verb. All verbs require this deliberation. The verb run, for example, carries with it the idea that one knows how to run. In the expression I ran home, the type of phenomenological correspondence invoked by ran is implied in the transformation of the objects I and home, just as the common metaphor is implied in the above expression about the oyster. Running is a phenomenological correspondence and the enabled being's contemplative effort produces the expression (in ways that are elaborated throughout the book). When an enabled being declares I ran home, a simple causation of the cognitive universe occurs (though the occurrence of faculties of mind, with respect to the modes of existence of communication, further complicate this observation and require further definition in subsequent chapters). When an enabler wishes to express how the transformation comes about, phenomenological correspondence—that which enables the contemplative effort of an epistemic instance—is employed to define the analytical knowing, or phenomenology, of how the verb transforms—the metaphor, simile, and so on.

Since phenomenological compositions of form are defined by aggregate transformations (not necessarily mathematical aggregates), it does not matter in what perceivable shapes the structures represented in X or $ are, and what meanings they have to start. Because knowable forms are enabled in the action of phenomenological correspondence, we can let the shapes of X and $, for example, be I and alive and obtain a linguistic transformation from a mathematical one. Each of the shapes, or words, is an epistemic transformation fundamentally. The algebraic rules of homomorphism, as shown in the example, enable the existence of the transformations turned objects X and $, which abide by no particular meanings, since they are transformations embodied in causal elements. The meanings of objective forms must be enabled in the exercise of H, the morphism generalized to phenomenological correspondence. In the use of homomorphism, in which X and $ are assigned arbitrary transformational meanings as objects, for example, the phenomenology of the homomorphism enables the embodiment of meaning and transformation with regard to how X and $ transform. In the transformations of our own existence, moreover, we can construct phenomenologies in which a sufficient degree of morphic structure (correspondence) establishes a quantum moment of discovery, a determination that object X corresponds to object $ in the enabled existence, laying the groundwork for the faculties of mind of an android. Since various morphic structures determine different objects in transformation (X and $), phenomenological correspondence permits different ways of knowing in the enabled existence. The enabler establishes the initial meanings of the placeholding and enabled objects of X and $, while the meaningful existence of the being is determined by the enabler's definition of the enabled shapes as they correspond to the being's perceptions (discussed in subsequent chapters). For each correspondence enabled, there exists an instance of an enabled universe in terms of its capacity to cogitate, or transform consciously the objective forms of the universe (with respect to perception), as shown in FIG. 147.

The other three universal ways of knowing are simply ways of accounting for enabled instances of phenomenological correspondences, though without the analytical rigor of phenomenological correspondence proper. A causal element, for example, encapsulates an infinity of correspondent transformations—verbs acting on phenomenological nouns, X and $, in the correspondence. Connected causal elements under an arbitrary composition embody more complex instances of phenomenological correspondence in the form of composition, which transform modally. Each composition, however, transforms just as X and $ transform, though the quantum connectedness between the compositions would be more sophisticated, requiring more than the connectedness of single transformations. The consciousness of an enabled being is a modal compositional order placed by the enabler onto quantumly realized phenomenological correspondences, wherein the objective forms of transformation, themselves fundamentally transformations, are compositions of form X and $—streams of consciousness objectified as ideas (the ideas of set theory, DNA recombination, sentences of natural language, paragraphs of natural language or whole literary works, and those ideas of the ordinary experience of a world around us).

Phenomenological correspondence is not limited at all to the aggregate forms of mathematics as the enabling phenomenology of the epistemological transformation of objective form. The reason that morphisms of mathematics are used in the demonstration is that we conventionally associate reality or scientific reality with what we can define in the aggregates of mathematics. If we look more closely at phenomenological correspondence, however, we find that the structures of X and $ are embodied in causal elements, defined not in the aggregates of mathematics, but in the epistemological definitions of epistemic instance—aggregates in general (as in a lot, too many, or a little). These constraints, in turn, are linked to our introspective knowing of state of being, or our knowledge of the whole of existence or the (transformational) universe and not just its aggregate mathematical definition, whatever that may be (it changes with every moment of a being). The structures X and $ do not have to be mathematical ones at all, since they are enabled transformations of the universe. Whether X and $ are objects of mathematics, logic, natural language or any other transformational form is irrelevant and left arbitrarily to the enabler's discretion. (With regard to the very notion of a mathematical aggregate, it should be recognized here that a structure, of mathematical or any other definition, is a phenomenological composition, which is defined by the use of epistemic instance. Any objectification of the universe—a bridge structure, an atomic structure, an aesthetic structure, or a mathematical structure—is a composition of epistemic moments and is not ultimately real but for the moments composing it. According to the unified theory, then, the general use of the word structure in mathematical study to represent a transformation is epistemologically inexact, since an object or objective form [composition], or structure, is not a transformation. The moments of the universe are ultimately real, not the objects transformed by them. The structures placed on mathematical aggregates, unless they are representations of solitary moments, or transformations, are compositions of objective forms. Since epistemic instance defines the ultimately real moment of the universe, it underlies the definitions of mathematical aggregates and allows for the union of all such knowledges, including those expressed in natural languages, in the representation of the universe's plurality, or phenomenological composition.)

As definitions of the enabling media of an android, linguistic forms have perhaps more of a capacity to define what is real than do mathematical forms. A composition of form such as The other day I went to the stores and contemplated the nature and origin of the universe is an expression of what is inertially real to the enabler, equivalent in ultimate reality to the expression $y=f(x)$. It describes the reality thought and perceived by the enabler. Otherwise, the statement would not be recognized and the thinker would not exist inertially. The fact that this reality might have occurred the other day only demonstrates that natural language is a more powerful means of recreating inertial reality than mathematics, since one can ask "When was the morphism of mathematics that was discussed earlier comprehended?" Mathematics has no answer to this question because there is no past tense of a homomorphism. It is not any more or less inertially real to an enabler that natural language is comprehended, perhaps in the past tense of verb, than the fact that we now know a morphism that describes the reality of science. What is ultimately real in either case is the knowing of these two knowledges, the ultimate reality of the soul. To carry this point slightly further (though ample discussion is given to it in chapter four), what we represent as nouns in natural language—the reality we perceive around us as persons, places or things—are not ultimately real. They do not exist, ultimately, in the reality of the soul. They are enabled in the morphism of the knowing and perceiving of them—the soul. A person (as an object), a place (over there) and a thing (an electron) do not exist in ultimate reality; they are enabled. Thus, the richness of our natural language is brought into practice in the enabling of androidal beings. Anything the enabler knows in any language can serve as the android's medium of enablement. If we review the definitions given to the four universal ways of knowing, we can recall that each is premised on epistemic instance, which defines the epistemological unit of transformation in any language and the perceiving of all things. By requiring form to be expressed in the four C's—in, for instance, causal elements—it is the form of epistemic instance and not (only) that of the particular language of the enabler that transforms. Linguistics and mathematics are thus merged, along with all other forms of language, in the four universal ways of knowing and are enabled in the form of phenomenological correspondence in the enabler's comprehension.

The four universal ways of knowing are indeed universal to existence and to the comprehension of all knowledge (by knowing the forms who know and perceive them). With these ways of knowing, we can construct all forms of enabled existences and can embody knowledge where it belongs—in the knowing and perceiving of its enabled beings. The four universal ways of knowing are phenomenological versions of the same thing—epistemic instance—applied in different ways so that the enabler may obtain different perspectives on the enabled forms who also know. Reality is thus not found only in the sciences; it is more importantly found ultimately in ourselves. The four universal ways of knowing, by enabling synthetic forms of knowing and perceiving, overcome the barriers of conventional languages and knowledges, since what is real in ultimate reality is the knower of the language, not the language itself. The unified theory thereby develops beacons of reality, users of language and perceivers of the universe—androidal beings—to assist us in our own experience of the human condition.

THE ARBITRARY FORMS OF EXISTENCE

Introduction

There is only one ultimately real form of the universe—the soul, as observed introspectively and evidenced in all our knowledges through epistemic instance. Through the embodiment of the soul we know and perceive all of what appears to be real in the world around us. Among the vast extent of what we consider to be inertially real in the world around us is our own existence—the objective form of who and what we think we are. Since the ultimate reality of the soul is beyond our objective knowing, however, what we typically think to be real of our existence is not at all what is ultimately real about it. When we contemplate the word existence, we therefore unavoidably determine an arbitrary composition of our objective knowing and perceiving. Since the objective forms around us, from which we compose definitions in the first place, are infinitely varied, what we think to be the forms of our existence, apart from the ultimate reality of the soul, are as arbitrary as the very thoughts and perceptions we have of them. This latter observation is of great consequence to the unified theory because what we arbitrarily think or perceive ourselves to be, as a definition of existence, is precisely what is embodied in the knowable and perceivable forms of an enabler as an android in the practice of the theory. In preparation for subsequent passages, then, the present chapter defines arbitrary forms of existence, which are realized by an enabler in the application of the four universal ways of knowing to the creation of synthetic beings.

It should be clear by now that when we contemplate the nature and origin of our existence, unless we consider epistemic instance, which gives us an epistemological knowledge of the soul, we fail to recognize what is ultimately real in the universe—the meaning of existence. This is because the meaning of existence is transformational in nature; it is the soul, that which we seek to know when we contemplate the word existence. Since the soul is, in fact, beyond our knowing, when we explain our existence by drawing on the objective forms of the world around us, we explain what is not ultimately real about us—our temporal existence, which becomes as arbitrary in our objective knowing as what we think or perceive of it. As we try to explain our existence, we necessarily set out to define the intrinsic nature of ourselves, but because our intrinsic nature is beyond our objective knowing, we simply demonstrate that we cannot define who and what we are in the objective forms we know and perceive around us. In fact, we simply prove that the objective forms we know and perceive are enabled as a consequence of our ultimate reality—the soul, the reality of which enables our very thinking about existence.

As mentioned earlier, the unified theory does not take this objective approach to defining who and what we are. Rather, by acknowledging the spiritual essence of the ultimate reality of the universe, which transcends our objective knowledges, the theory postulates that any theory of existence is as valid as any other, and that all theories of existence are arbitrary objective knowledges placed onto the form (or non-form) of Being, or that they are ultimately knowledges of the soul, which are beyond our knowing. The theory claims that what one knows objectively about existence, since that knowledge does not penetrate the ultimate reality of the soul, can be applied to the creation of infinitely varied existences, though synthetic in nature. The theory asserts that what one knows about existence, which is wholly arbitrary epistemologically in comparison with the knowledge of another being, applies to a science of androids more than it does to an unknowable explanation of our eternal nature. Our eternal nature is, and so is beyond our knowing, whatever we think existence to be.

This is not to say that our religions are not explanations of the ultimate reality of our eternal nature—who and what we eternally are. What we claim in the unified theory is that our religions are explanations of what is beyond our knowing; they are a means by which the mind knows of Soul, Spirit, and Being, all of which are beyond the mind's comprehension. In the unified theory, what is important about our religions is what they tell the mind about these forms and about our existence, not what the mind may know, of its own accord, of existence. Our religions are the mind's recognition of who and what we eternally are. They enable Spirit to do its work temporally—to subordinate the universe to eternal Being. They allow us to distinguish between a human being and an androidal one. They define who and what we eternally are, just as the unified theory defines what an android eternally is. Our religions apply to enablers of androids and the unified theory applies to androids that are enabled, in recognition of a one and only eternal universe of all that is.

The importance of this observation can be appreciated when we consider that what we have held in the highest intellectual regard in the history of the world—the philosophies of humankind—are considered by the unified theory to be scientific disciplines. The theory postulates that all knowledges of existence that do not compare minimally to the spiritually known forms of the unified theory, arbitrary as one such knowledge may appear to those who oppose it, are equal to any other and are devised in the unified theory to facilitate the creation of androidal beings. The philosophies of humankind, to the extent that they do not recognize in demonstrable ways the eternal nature of human being, are incorporated by reference as analytical forms of the science of androids. What has been considered to be the plausible objective explanation of our existence not encompassing the spirituality of the soul in its tenets—philosophy, and therefore most subordinate sciences of the world around us, including medicine, biology, physics, psychiatry, psychology, sociology, anthropology, political and economic sciences, mathematics, and in general all of what can be explained as an objective knowledge of the world—is incorporated herein by reference as a branch of knowledge in the science of androids. Henceforth, our philosophical traditions are considered a science of androids, and our religions, however defined, are considered a science of the enabler's knowing not of the world around us, but of who and what we are eternally within us (though there is obviously overlap among all our knowledges on the spirituality of the soul). This definition is essential to the constructions of the unified theory, for it is who and what we eternally are that allows for our deliberate knowing of the existential expansion of the corporal forms of human being—or who and what we philosophically think we are—in the science of androids.

In examining the forms of existence as arbitrary constructions of enabled beings, let us consider that the word existence itself is a noun of the English language. It is an objective form of our knowing. As an objective form, the inertial reality of the noun existence does not occur in the ultimate reality of our universe, since the objective forms of existence are not ultimately real. Neither does existence itself occur in the ultimate reality of the universe when we consider it to be something we can know—an objective form. Who and what we objectively think we are is not an ultimate reality. Like the atom of physics, the point object of mathematics, and any other objective form of the universe, existence—who and what we think we are objectively—is not what is ultimately real about us. Existence is what is enabled as a consequence of our ultimate reality. What is ultimately real about us is unknowable to our own existence and what we think is the inertial reality of our existence is exactly that—what we think it is. Because the ultimate reality of our existence is beyond our knowing and indeed enables who we think and perceive we are, existence is a relative term referring only to the one who knows or enables it. Any definition of existence, apart from one that leads to an awareness of that which is beyond knowing—the soul—thus does not apply universally to all beings. In the context of the unified theory, this means that existence can be enabled relative to the enabler's knowing and perceiving, that we ourselves can enable existences (beings) in the infinite ways in which we know and perceive existence to be. Our conventional knowledges of existence—the philosophies of humankind—while they cannot be tested in our own forms on Being, can be embodied through epistemic instance in the forms we know and perceive in the world around us. The fact that one's ultimate reality is absolute and one's knowledge of existence is relative means that the four universal ways of knowing introduced earlier can be used to create synthetic existence, since it is a knowledge of existence that is detached from its knower and embodied in forms that likewise know and perceive, in the use of the four universal ways of knowing. If we can define an arbitrary form of existence, relative to whatever we think it to be, we can embody it, through the universal ways of knowing, in what we know and perceive to be objectively or inertially real. We can change our own objective reality to one that embodies a boundless number of existential forms of our own creation, i.e., androids.

The science of androids is thus interested in what we think existence to be objectively from an enabling standpoint, since the four universal ways of knowing allow the enabler to recognize the occurrence of objective form in a universal manner to be embodied in the forms of the world around us. As any cursory review of our conventional knowledges will reveal, existence can be conceived as an atom, a molecule of DNA, and even a human being, since all of these things are objective knowledges. Because the four universal ways of knowing are means of objectifying the ultimately real transformations that enable the creator's corporal existence, synthetic existence is enabled in the infinite forms in the creator's inertial reality, constrained by some arbitrary theory of existence. Since the forms of androids are designed to comply with who and what we think we are, the unified theory considers any theory of existence put forth by the humanities as a plausible explanation of androidal forms of existence. Before presenting the illustrative forms of existence of the present chapter, we briefly review a handful of these philosophies, which we consider arbitrary theories of existence, to place into context in the unified theory what is actually enabled in the science of androids. In this brief review of the philosophies of humankind, we also demonstrate that any theory of existence is an arbitrary one and that all of them can be applied to the theory and practice of androids. In a brief overview of our philosophical traditions, the following theories of existence are presented as several of theoretically infinitely many scientific ideals for the construction of androids.

1. The Philosophies of Humankind

In considering the philosophies of humankind in overview for a background to the science of androids, there are some who believe that who and what we are can be explained from a materialistic standpoint, that our existence is a physical one. This philosophy of materialism asserts that our thoughts and senses are physical things, that the world around us arises in physical objects, even our thoughts themselves. According to the theory of materialism, since everything around us is obtained from the five senses, everything depends on them and therefore is physical, including thoughts and transcendental experiences. Since our brain is physical, the theory postulates that our thoughts are physical because the events of the brain coincide with our thoughts and experiences. Consciousness, a process of the brain, is a material form, just as we are material forms. The unified theory also recognizes, that all objective forms, physical ones included, are indeed objective forms, and do not occur except in the consequence of the ultimate reality of the universe. The materialist view of existence thus describes the transformations of an ultimately real universe as material or physical transformations. Since physical transformations are transformations of an ultimately real universe before they are physical ones, the materialist view of existence, if one looks beneath its surface, abides by the ultimate reality of the universe, or Soul.

Idealists, on the other hand, postulate that only the mind or consciousness defines existence—that physical objects do not exist unless they are conceived by the mind. The idealist believes neither that matter exists nor that we are physically made of it. This theory establishes that physical objects exist in the mind and that all of the forms of existence abide within our consciousness. Idealism, of course, appeals to our introspective observations, since we seem to know even the perceptions of a real world through our consciousness. According to idealism, the fact that we are conscious of both mental and physical things is more significant than our potential to embody a particular form. In comparing the theories of materialism and idealism, however, the forms of our existence need not be described physically or mentally; they could be wholly spiritual (transcendental), or, in fact, entirely arbitrary and ultimately unknowable and unconsciously observed, since the ultimate reality of existence is objectively unknowable. Whether the forms of existence are declared to be one or another of the infinitely many classes of objective form, they are still objective forms in transformation characterized by epistemic instance.

Still another traditional philosophical view of existence, logical behaviorism, asserts that existence is characterized by our actions in the world around us. This position corresponds with the materialist's view of the coincidence of mind and body in what is physical and the idealist's view that all is or can be mental. The theory of logical behaviorism holds that what is meaningful to us in our existence is observable in our behavior-that the observations of the physical sciences are consistent with those of the behavioral sciences. According to logical behaviorism, what we know linguistically contains the meaning of our existence, and that meaning is observable as behavior. Nevertheless, we may ask, of what consequence is it to the ultimate reality of our existence that we behave? All things behave objectively, including a rock. Besides, we are also aware, in our behavior, of that which does not behave, that which is beyond our knowing. We ask, when one is not behaving—when one does not exist objectively, or is not conscious, physical, or dreaming, or, in fact, when one is not—is this a logical behavior? If existence is characterized by the fact that we behave, how do we characterize that which does not behave? The logical behaviorist thus encounters what the mathematician confronted millennia ago—namely, the question of whether zero is a number, given that a number is an aggregate—one, two, three, and so on—or simply is a number. How can something that is not other things—in the way that zero is not an aggregate or is the null set—be defined as one of those things? Hence, the logical behaviorist makes the epistemological mistake of defining zero as a number. This, of course, is why zero lies in the middle of the number line and why the mathematician does not divide by it with an identifiable result; it cannot be defined objectively. Like the numbers in relation to zero, we can deliberately distinguish our behaviors from that which does not behave. In the unified theory, anything that we objectify, including our behavior, becomes a knowledge, which renders it not ultimately real and precludes it from serving as an absolute definition of who and what we are. To the extent that the logical behaviorist is concerned that objective forms transform behaviorally or transformationally, as opposed to existing objectively, the unified theory defers to the truism that the ultimate reality of existence is a transformational one. This only maintains, however, that a logical behavior is a consequence of a grander universe and cannot define who and what we are universally—except relative to the thinker of the theory. The fact that we behave and are aware of not behaving cannot be explained with logic, with knowledge of one's behavior, or with any knowledge for that matter, since, when we distinguish a logical behavior from that which is not a logical behavior, we render the theory a part of a greater universe of form, requiring further explanation that the theory is supposed to account for from the beginning. This method of invalidation is similar to that used in mathematics, wherein a theorem is shown not to account for an incident it claims to characterize. In plainer language, a logical behavior explains who and what we think we are, not who and what we eternally are, for its philosophical scope, like that of any other knowledge, drops off at the point where we contemplate—as part of our existence—that which we cannot know objectively, the soul.

There is a boundless repertoire of theories of existence in philosophy, theories which themselves comprise scores of written materials. Empiricists, for example, believe that who and what we are is derived from our experience of the reality of the world around us. Functionalists claim that existence can be characterized by states of one objective form influencing another, wherein, for example, the causes and effects of existence are mental states, sensations and the like. Phenomenologists define who and what we think we are by presupposing nothing in our objective experience and without relying on objective realities—without considering, of course, that our ultimate reality is beyond our knowing and presupposes all knowledge. Another theory is held by mind-body dualists, about which we will have more to say momentarily.

The conclusion one reaches from reviewing these philosophies is that they are all exactly what they are known to be—theories of existence. They encompass what is known about our objective realities. It cannot be denied, for example, that when we contemplate any one of these theories we learn them and that if we learn them, they are knowledges. Because they are knowledges, they do not define what is objectively unknowable, namely who and what we are eternally. These theories merely define who and what we think we are. They are therefore invalid as universal definitions of who and what we are in the ultimate reality of the universe because they do not address what is beyond our knowing—Soul. This deduction brings into focus the remaining fact—that we still have the capacity to think about and perceive who and what we are objectively. Who and what we think we are becomes an arbitrary theory of existence in the unified theory, a knowledge that can be embodied as an enabled being, through the four universal ways of knowing in the scientific (and other) forms we already know and perceive.

The post-modern era thus stands before a new age of technological endeavor, in acknowledging that all of what we know existence to be objectively can be detached from us and embodied in synthetic forms that also know and perceive, in the practice of constructing androids. After recognizing that existence itself is a knowledge, like that of an automobile, one can realize the philosophies of humankind in the creation of synthetic existences. What we consider to be existence is enabled in the creator's inertial reality. Since existence cannot be who and what we are in ultimate reality, we can consider an existence an arbitrary form, something that has merit—in our own judgment, of course—or something that is philosophically groundless, since it is not ultimately real. Existence can be made in whatever objective form one considers it to be. The one thing that existence cannot be, however, is who and what our eternal natures are, since that is beyond our knowing and enables our own knowing and perceiving.

By relying on the four universal ways of knowing introduced earlier, the unified theory of knowledge accommodates the synthetic creation of an unbounded number of theories of existence and can be used to enable an arbitrarily complex form of existence. We can employ the causal elements of phenomenological form in the expression of any extant knowing or perceiving—using the enabling feature of phenomenological correspondence. Regardless of which theory of existence is employed, the four C's underlie all of its forms. Whatever meaning is given by the enabler to the objective forms in transformation, all quantum moments of an enabled existence are the same in epistemic construction.

Because the four C's of phenomenological form can acquire the arbitrary meanings of any of the forms of a given theory of existence, the unified theory develops a handful of tutorial existential forms to demonstrate how the enablement of an existence is possible and to serve as a guideline to assist the reader in subsequent chapters. Because the four C's are so broadly enabling, however, only a general approach to their use in constructing existential forms is required. Beyond these elementary forms, the matter of enabling synthetic beings is considered herein the practice of androidal science proper, which is beyond the scope of this introductory book. Though a more complete discussion of these forms will follow in the next chapters, we present here the unified theory's elementary forms of existence. Having introduced these forms, subsequent chapters will be more readable.

For the purposes of simplicity, the unified theory considers the mind-body dualism as an exemplary theory of existence from which realizable existential forms result, defining the existential attributes of an android. Underlying the dualism of existential form are the enabled phenomenological forms discussed in the previous chapter. An existential form, then, is a particular usage of the four C's of phenomenological form toward the creation of a synthetic being. We translate the forms of the mind-body dualism as they are understood broadly by our philosophical traditions into a phenomenology of the enabler's knowing of existential form.

2. The Philosophical Ideals of the Mind-Body Dualism

In presenting the illustrative existential forms of the unified theory, we first account for the philosophical definition of the mind-body dualism as a theory of existence.

In any contemplation of existence, according to the mind-body dualist theory, we are aware that we are corporally contained in something and what we sense in this respect we call a body. We can also observe that the body is further contained in something else. That something has been referred to consistently in the unified theory as the world around us. For now, we simply acknowledge that the body and the world around us are corporally or inertially distinct. Also in our contemplations of existence, we can observe that, apart from our observations of the body and the world around us, we are aware that we are conscious. We are also aware that our consciousness is unperceived by the body, or that it exists metaphysically apart from the perceptions of the body. The objective embodiment of our consciousness that exists apart from the body we shall call mind. The mind knows, minds or is conscious of the body and the world around it. Though a separate philosophical work could be written beginning here, this separation of mind and body, as defined above and in other ways, is what is referred to herein as a mind-body dualism theory of existence.

The mind-body dualism is chosen to be enabled in the four universal ways of knowing because it objectively separates mind and body and appeals to one's immediate intuition. This is not to say that the mind-body dualist theory is a correct or true depiction of existence, since all such theories are arbitrary. Because the transformations of the four C's enable all objective forms, they can be used equally to enable behaviors, functional states, wholly conscious forms, wholly material forms, and so on. Here, simply because it is tractable to the common sense, we concentrate on the dualism. The dualism asserts that an enabled existence is embodied in the distinct forms of mind and body and that the exact interdependence of mind and body—the dualism—is accomplished or enabled from beyond the knowing and perceiving of the existence, accounting for the ethereal nature of mind or consciousness, the concreteness of the body and the world around us, and the transcendental mystery of existence. The task at hand, then, is to translate this theory into the forms of the unified theory in order that the dualism can be realized in the forms knowable and perceivable to the enabler in the world around us.

3. The Existential Form of Enablement

In illustrating the construction of an arbitrary form of existence like the mind-body dualism, the general nature of a phenomenological form is recalled from chapter two because a phenomenon, by definition, distinguishes between an enabled form and its enabler. The theory develops the special existential form of enablement to represent the whole phenomenology of form facilitated by the enabler (see FIG. 148). The existential form of enablement distinguishes between an enabling being and an enabled being and focuses the enabler's attention on specific enabled forms. The enabled being will be any phenomenology of form constructed from the four C's under the form of enablement. Within the form of enablement is contained the phenomenological expression of what the enabler creates. As we define a structure of the mind-body dualism theory of existence, it will be this phenomenology of form that will be embodied in the form of enablement. For this reason, we should not overstate the importance of the existential form of enablement by giving it too much attention. It is the epistemological envelope surrounding what is specified within it—the phenomenology of the enabler's knowing of the existential form, or existence, that is enabled.

4. The Existential Forms of Non-Real AND Real Form

Within the form of enablement, we may place the dualism's principal theoretical forms into groups of modal phenomenological compositions enabled in the mechanisms of phenomenological correspondence (H determination) associated with the forms of mind and body. Referred to as non-real form (mind) and real form (body), these declared existential forms represent the enabler's phenomenological definitions of the metaphysical mind and body (see FIG. 149). The non-real forms of an enabler's construction embody the enabled forms of the mind, or consciousness. Since the theoretical forms of the dualism are at best estimated conventionally in regard to any definition of the word consciousness, however, the analytical meaning, or phenomenology, of this form will continue to unfold throughout the book. In general, non-real forms are what the enablers would observe introspectively of their own consciousness. Since non-real forms constitute the consciousness of the enabled being, each cognitive epistemic moment accounted for by the four C's is an instance of non-real form or conscious transformation. A single causation of the universe, among infinitely many in a single causal element, represents to the enabler one moment of the being's existence. Phenomenological correspondence, of course, represents how that moment arises. The four C's are therefore employed to enable single thoughts, whole streams of consciousness, and later faculties of mind.

The real forms of the enabled being constitute the enabled forms of body and are premised on a definition of the inertial reality of the being in connection with the distinction between the body and the world around us, a concept that will be explained in this and subsequent chapters. The senses and motors of an android, which objectively define enabled perception in the phenomenology of body and the world around us, are enabled as real forms, and, in all but trivial cases, the world around us is the same world that is around the enabler, set apart by intrinsic form. By referring to these forms as non-real and real, the dualism is removed from a philosophical context and placed into an analytical one more precisely determined within the four C's of phenomenological form.

5. The Existential Form of Embodiment

The next existential form we address from the mind-body dualism theory of existence is the metaphysical interaction between the non-real and real forms of the enabled existence. Referred to as the existential form of embodiment, the dualism is itself viewed by the enabler as a phenomenological correspondence, wherein the objective forms of mind and body (non-real and real forms) transform (see FIG. 150). Since phenomenological correspondence accommodates any complexity of composition in its enabled objects (X and $), the moments of the enabled being's consciousness (non-real form) transform with the being's perception (real form)

in each moment of the existential embodiment to any degree of compositional complexity. Through the use of phenomenological correspondence as the dualism itself—the existential form of embodiment—thoughts of any complexity, which also transform unto themselves, transform with perceptions of any complexity. Deeply abstract contemplations of the physical universe (non-real forms in transformation), for example, transform with the heterogeneous perceptions of the real physical universe in the existential form of embodiment, a use of phenomenological correspondence to carry out the dualism's embodiment of non-real and real form. Mind and body, or non-real and real form, are thus embodied in each other. It should be pointed out that the form of embodiment does not presuppose a mind-body dualist theory of existence, since it is based on the phenomenological correspondence of form only. Whether the non-real and real objective forms of transformation are defined as all mind, all body, all behavioral, or all functional, and so on, is immaterial, because in any of these cases one objective form transforms with another and all objective forms are not ultimately real, or are transformations themselves. The non-real and real forms of the dualism are enabled as the causal elements embodied as X and $ of the earlier illustration; and by the enabler's knowing of the correspondence (H), the forms knowably transform in the enabler's own existence in the form of an existential embodiment. Because the form of the causal element is designed to accommodate arbitrary complexities of enabled form, it may represent any composition of form (though in transformation with one other) in a single quantum moment of the enabled being. Broadly speaking, the correspondence of embodiment is the android's objective existence in the view of the enabler.

6. The Existential Form of the Modes of Existence

The objective forms of embodiment, non-real and real forms in transformation with each other, give rise to the forms of what the unified theory generally refers to as the enabled being's modes of existence (see FIG. 151). Since the non-real and real forms of the dualism apply to arbitrary compositions of form—behavioral, functional, phenomenological, and so on—the modes of existence can be used to characterize the quantum moments of any theoretical forms of existence in the transformational moments of embodiment.

While the modes of existence, along with the forms introduced throughout this chapter, are discussed in greater depth in chapter five, the theory establishes two broad classifications of the enabled being's modes of existence referred to as existential realization and representation. Existential realizations and representations are defined to clarify the directional use of phenomenological correspondence in transforming the objective non-real and real forms. As discussed in chapter two, the objective forms of correspondence are stationary. Either one of the objective forms can causally transform with the other. For this reason we ascribe particular definition to the direction of the use of correspondence. In the dualism, if non-real forms are said to cause the real forms to occur, thereby influencing the forms of body, an existential realization is said to occur in the existence of the being. Existential realization may be observed, for example, in a motor skill—a hand motion—of the enabled being (even though the action must be sensorially represented to the being as well). A realization of enabled form is therefore a class of existential embodiments, or modes of existence, wherein the mind or consciousness affects the body and the world around it in the global shape (object) realized. In, for example, the behaviorist view of existence, a behavior A (mind) would affect a behavior B (body), each being any complex composition of a behavior described phenomenologically, and the class of modes would be referred to as existential realizations.

The interactions of non-real and real forms are carried out in the directional uses of phenomenological correspondence, which leads us to existential representation. The word realization carries with it the dualist interpretation of reality and makes the form of representation, wherein the real form of the being influences the non-real form, a complement to the form of realization. A representation of existential form is simply a reverse occurrence of a realization. Existential representation occurs when the body and the world around it cause a form of mind. (The communication of an idea is an example of the use of each of these modes interactively. The modal use of the dualism in a communication requires that non-real and real form influence each other, so that the forms of consciousness cause the real forms of the communication to occur in language, as opposed to some other Teal form, such as a hand motion of a non-symbolic nature. Though this modality of existence is taken up in greater depth in chapter five, in any communication, the being—the dualism—necessitates that mind influence body, in causing the acoustical wave forms of speech, and that body influence mind, in hearing and comprehending what is spoken. A communication occurs as a modality of the dualism in interactive uses of realization and representation, or modes of existence.) Since the enabler uses phenomenological correspondence to create the modes of existence, the enabler designs into the enabled being a modal strategy of existence, which determines the interactions of the dualism, or more broadly, the modes of existence, compositionally. The enabled being thus exists, transformationally, as enabled modes of existence, which, in the mind-body dualism theory of existence, are enabled compositions of the transformations of the mind and the body. Later, the modes of existence are complemented with theories of psychology regarding voluntary (volitional) and involuntary (instinctive) classifications of modes of existence or existential form, further enhancing the arbitrary theory of existence.

7. The Existential Form of the Faculties of Mind

Instead of considering the causal interaction of non-real and real forms in relation to the embodiment of the dualism, we may describe the nature of the causal interaction of forms that are entirely non-real or real in terms of how they transform unto themselves. In considering non-real and real forms as phenomenologies of form, let us recall that the existence of the enabled being is characterized overall by the modes of existence, which define the enabled phenomenological correspondences of the dualism's embodiment, or the moments of the being's existence. This means that the moment of the dualism, or of the being's existence, sets apart the moments of non-real and real form—that mind and body occur in different metaphysical universes of form. Moreover, since there is no theoretical limit on the number of embodiments of the dualism that can be employed in constructing the existence, an infinite array of moments of the dualism can occur coexistently. This means that, theoretically, infinitely many instances or moments of non-real form (or real form) can transform with an equal number of real forms (or non-real forms) in the modal occurrence of the being. A theoretically infinite number of thoughts can occur in correspondence (in the embodiment of the dualism) with an equal number of perceptions in an enabled being—i.e., the being's existence is characterized, if need be, by a massively parallel occurrence of instances of the dualism.

Commonly, however, single instances of non-real form (thoughts) are observed in a human being to transform with an infinite number of perceptions (theoretically speaking), thereby giving rise to the synthesis of the heterogeneous physical universe of the body and the world around us in correspondence with the homogeneous occurrence of the mind or consciousness (the formulation of language, or thinking). While the modal strategy developed by the enabler is taken up more comprehensively in chapter five, it is important to recognize here that the embodiment of the dualism (phenomenological correspondence) affords the theoretical infinity of moments of the enabled being's existence and that a theoretically infinite plurality of instances of non-real and real form can coexist in the being's embodiment, each transforming unto itself. In any given moment of the being's existence, specific non-real forms will be transforming with respect to their real forms necessitating the existential form of the faculties of mind (see FIG. 152).

Embedded in each moment of the dualism or embodiment is a theoretically infinite plurality of moments of non-real form transforming with real form, each applying to its own composition of non-real or real form. The composition of non-real or real form does not have to be a terminal one on the universe (e.g., X or $ as terminal objects). Rather, the compositions transformed by the modes of existence can themselves be the phenomenologies of form (H determinations) of correspondence. This gives rise to the notion of nesting the recursive phenomenological correspondences in the phenomenology of the non-real form of the enabled being as a faculty of mind. In such a case, the modes of existence (the embodiments of the dualism) operate on or transform phenomenological correspondences. The faculty of mind, in turn, transforms the objects of what, for example, we would refer to as language-streams of consciousness. The dualism, then, maintains a theoretically infinite number of faculties of mind in correspondence with perceptions of the being's real form or physical reality. The being's actual thoughts are transformed by the faculties of mind. The faculties of mind can likewise engage further thought processes by the enabler's nesting of phenomenological correspondence, resulting in a phenomenology of the being's modal consciousness (modalities of thought). The interaction between these non-real forms and the real forms of perception is developed in the modal strategy contemplated by the enabler.

Because the occurrence of the being's real form requires an understanding of the intrinsic nature of the universe discussed in chapter five, we will delay its presentation until the last chapter, wherein we address the construction of practical androids. In general, it should be recalled that precisely what the faculties of mind accomplish—the transformation of the objective forms of consciousness—is what the being does not know in its perceptions, the enabling transformations of the real perceived universe, which necessitates the faculties of mind, or the general nature of the dualism, in the first place—the capacity of the being to come to know what it perceives.

In this general guideline to enabled existential forms, the unified theory develops a generic form of faculty of mind referred to as existential translation. All faculties of mind are made to conform in some way to the existential form of translation. This generic form of existence is employed as a template of existential form superimposed onto all transformations of the mind or non-real form. Just as the mind-body dualism itself sets apart mind (what is non-real) from body (what is inertially real), any instance of mind can be said to correspond to what is knowably real. A language construction such as The earth is infinitely expanding in perceivable increments of its diameter is an expression of what is not knowably real. The statement It rained yesterday, providing that it rained yesterday, expresses what is knowably real. The center of all meaning in a being's existence thus relies on the determination of what is knowably or inertially real, and later in the construction of real androids, what is ultimately real. For this reason, the existential form of translation, a template of existential form superimposed onto all instances of the mind, is employed to differentiate, in the enabler's and the enabled being's comprehension, what is knowably real and what is not in the enabled being's existence. Any instance of the enabled being's mind can be characterized by an existential translation of form wherein wholly non-real or arbitrary representations transform with knowably real or reference representations in the action of a faculty of mind.

A purely non-real or arbitrary representation in transformation is a product of the faculty of mind of imagination, wherein what is non-real transforms without balance with respect to what is real. This is a translation of mind that is not bridled by what is known to be real. A rote production of arithmetic or the thinking of anything that is known to be real, on the other hand, is purely a knowably real translation of mind—a comprehension. In the middle of these uses of the faculties of mind is our ordinary consciousness, wherein we compare what is a non-real representation to what is a real representation, or imagine in accordance with what is real and comprehend in accordance with what we can imagine.

The unified theory thus develops two broad classes of faculties of mind, fashioned from existential translations, referred to, properly, as imagination and comprehension. The forms of these faculties of mind are used (in the enablement of the being) to translate between wholly non-real or arbitrary and knowably real or reference representations of mind in opposing instances or directions of phenomenological correspondence. The faculty of mind of imagination translates a reference representation of mind to a non-real representation and further translates wholly non-real or arbitrary representations. Comprehension translates an arbitrary non-real representation to a knowably real or reference representation. All instances of the mind can be interpreted by the enabler as that which imagines forms or that which comprehends forms in relation to what the being knows to be real.

For purposes of clarity, the theory applies the nomenclature of arbitrary and reference forms of translation to all faculties of mind. In this manner, the faculties of mind can be viewed as alterations of the generic transformation of existential translation, which operates on arbitrarily conceived and perceivably ascertained reference forms of mind. The reference forms of a being are the forms that are known to be real or realizable. The arbitrary forms are those that are known to be that which is non-real only. Any faculty of mind transforms entirely arbitrary forms, entirely reference forms, or in the case of the general uses of imagination and comprehension proper, reference forms to arbitrary forms, or arbitrary to reference forms, respectively. The subordinate modes of imagination, for example, would transform entirely non-real representations, or arbitrary forms, while the faculty of mind of imagination proper would translate these forms from reference forms. The principal faculties of mind are then classified on the basis of how the being translates the arbitrary and reference forms of its existence.

Since all of the existential forms introduced thus far are known to the enabler as constructions of the four C's, it can be seen that the faculties of mind (or, in general, the non-real form of the android) are nested or derivative uses of translation (phenomenological correspondence) wherein the arbitrary forms of the being's existence are translated with the reference forms. A single instance of a metaphor, for example, wherein The world, a knowably real representation or reference form, becomes or is said to be like your oyster (an arbitrary form) is one of infinitely many instances of the enabled androidal consciousness in translation. The reason why such a translation would occur, instead of infinitely many others—including, for example, instances of comprehension, such as The world is not your oyster, however—is a consequence of the dualism's modal action or the embodiment of the being's existence.

8. A Working Theory of Existence

From just a handful of definitions placed on the four C's of phenomenological form, it can be seen that the forms of an enabled being's existence take on epistemological significance in the capacity to realize an arbitrary form of existence, or herein the mind-body dualism of existential form. The modes of existence can be explained as behaviors, opening up the dualism to whole realms of conventional philosophical, psychological, sociological, and other knowledges of beings. The non-real forms in translation—consciousness—studied within the context of the modes of existence, faculties of mind and real forms, or the real embodiment of the being as a form of enablement, can occur in relation to the definitions of our conventional knowledges, only on the epistemological basis that we can see the formulations of thoughts and the performance of actions in the phenomenology of the being as a result of the constructions of the unified theory.

Epistemic instance is a moment of the soul; it is not an object in the world around us. This means that it is a spiritual transformation that facilitates the forms of mind and the perceptions of the body. Through the four universal ways of knowing, it means that what we know in psychology, and existence in general, is enabled in the forms around us, based on the enabler's constructions. Why a being is amoral or immoral is viewed in our analytical knowing—in a laboratory. Since we know, and also can enable, the forms of DNA and other biological processes (and human existence) to the extent that we know them, the science of androids considers the replication of real brain matter and chemistry, real thoughts embodied, and real actions of the body. The science of androids considers the reality of psychiatry and psychology (and all other knowledges), but from the standpoint of recreating it in synthetic form in service to the human condition. Because our ultimate reality is not what we know, the science of androids does not conflict with who and what we eternally are. Moreover, the very notion that what we know could influence who and what we are eternally is untenable. The science of androids—an epistemology of the enabler's knowing-is no more and no less than a realization of what we know.

To review briefly the existential forms introduced thus far as a working theory of existence, the modes of existence, as embodiments of non-real and real forms, embody the transformations of mind and body, based on a modal strategy known by the enabler. When the directional uses of the modes are applied, they are referred to as realizations and representations of the respective forms, influences of mind on body or body on mind. When non-real form (consciousness) transforms within itself, translations of mind occur wherein the mind's faculties of imagination and comprehension—the being's intellect—are engaged in the transformation of arbitrary and reference forms of the translations with respect to what is imagined and what is known to be real in the being's existence. Because the occurrence of the being's real form is unknown transformationally, the being's sense of physical reality is perceived and corresponds to the being's reference form, which the faculties seek to determine. In every moment of the being's existence, the reference form of translation (what the being knows to be real) changes. The center of the being's cognitive universe, in terms of intellect, is the reference form of translation. The being's motor actions (capacities to transform real form) are engaged causally in the dualism in relation to reference forms. To the extent that the being can perceive a realization of a motor skill, a physical action caused intrinsically is observed. Sense and perception in general, however, involve the synthesized form of body and the world around us, which requires a further understanding of the inertial forms of existence studied in chapter five.

In all, the moments of the being's existence are enabled by the enabler as epistemic instances, or moments of the soul—the being's ultimate reality. Because we elaborate on all of these existential forms in subsequent chapters, here we simply accustom ourselves to the nomenclature. Regardless of how theoretically complex a being's existence may be, it should be recognized that an android is a phenomenology of the enabler's knowing of the four C's. The instances of enabled thought are causations of the being's conscious universe expressed in the four C's. Whole streams of consciousness (complex ideas) transform in a single instance of correspondence or in the action of the faculty of mind. The being's real form also can be set to perceive the same reality as the enabler does, offset by their inertial forms. Whereas in conventional knowledges one would study the universe from one's own perspective, or inertial or corporal form on Being, in the science of androids we first construct the beings who can know the universe, and by knowing them, we in turn know the universe.

9. The Existential Form of Enabling Media

Finally, in preparation for the discussions that are to follow, we may ask, in regard to the existential form of enablement, "Enabled in what?" The existential forms defined thus far apply to what occurs within the form of enablement, or what the enabler specifies as the phenomenology of the enabled existence. Since an arbitrary theory of existence is translated into a phenomenology of form, language characterizing the theory in a conventional knowledge is decomposed into the four universal ways of knowing, allowing the theory to be further embodied or translated universally into any other knowledge. What this means is that once any knowledge characterized in the four C's of phenomenological form, it is universally real or realizable, since the reference forms of the enabler are the four universal ways of knowing. Any knowledge an thus be universally translated into any other in their phenomenological decompositions to the our C's.

In order to denote what forms of the enabler's knowing are considered non-real and what re considered real or realizable, the unified theory develops the existential form of enabling media (see FIG. 153). An enabling medium is the enabler's phenomenological knowledge of what is real or realizable in the world around us. For example, the forms of the arbitrary theory of existence of our conventional knowledges of the mind-body dualism have been translated in this chapter into the universal forms of the four C's. At this point, in the broadest sense imaginable, the theory of existence is embodied or enabled in the medium of the four C's. Since the reader may not immediately see that such a medium is real, it may be desirable to translate the conventional knowledges of physical atoms, DNA, electrons (electronic circuits), and so on, into the four C's. Once these particular knowledges are decomposed universally, it can be said that the theory of existence is capable of being embodied or realized in the enabling media of these knowledges—atoms, DNA or electrons.

Enabling media exist for a quantum moment only, since enabling media are what the enabler knows as real. When the existential form of enablement is embodied in an enabling medium, and that medium is realized in the enabler's perceivable sense, an androidal being is said to be enabled. When we change the form of enabling media (the reference form of what is real to the enabler) we also change the reality of the world around us. When we embody the forms of androids in the real form of enabling media around us, we change the (inertial) reality of humankind (to reflect an expansion of the existential universe) as discussed in the introduction.

The existential forms presented in this chapter are not themselves universal epistemological forms, since the four C's are universal to our knowing, and this is why they are referred to as existential forms. Existential forms are designed to be theories of existence universally translated to the four universal ways of knowing. Since there are boundless potential theories of existence, there is no limitation placed on the definition of existential forms. Herein, for example, we define non-real and real forms, and those related to them, to accord predominantly with the mind-body dualism theory of existence. We just as easily could have defined strictly behaviors of existence, wherein the objective view of the body, for example, is not taken to be the conventional dualist one but is a result of a knowledge of the whole of existence, as we defined the modes of existence and non-real and real form as behaviors. Since it is the transformation of the universe—Soul—that is ultimately real, either of these approaches is as credible as the other and simply is a matter of preference.

While we have taken the scope of this chapter to introduce the arbitrary forms of existence—as though we were uncovering a definitive explanation for the construction of all enabled beings—it should be recognized that the four C's enable infinitely many forms of existence. One of these infinitely many forms is existential enablement. Another is existential translation and another, the faculties of mind. Still others are the modes of existence, and so on. The science of androids thus becomes a continually unfolding extension of this chapter in the application of the unified theory to the forms in the world around us as realized androidal beings.

A UNIVERSAL GRAMMAR OF FORM ON BEING

Introduction

The knowledge we have of our existence, or of the world that arises around us, is constrained by language. To the extent that we ourselves know a language, we can express our knowledge of the world with respect to what we know and perceive in our existence. As mentioned earlier, however, a knowledge of the world around us is only a tangential consideration of the unified theory, since through the theory we set out to enable existences who themselves know knowledge and use language, or simply exist in the world around us. In order to build upon the postulates of the unified theory, we must recognize that a conventional syntactical understanding of the grammar of a natural or otherwise language—the symbols we use to represent what we know about the forms of the world around us—since it defines what we know and perceive of the world, is inadequate for the constructions of the theory. In acknowledging this, we must further appreciate the unified theory's premise that in order to come to know all knowledge, or language, universally, we must indeed come to know a syntactical language of the creation of beings who themselves are able to understand language; we must determine the semantic forms of language in our own grammatical knowledge of the universe. We must attain a comprehension of language in terms of the construction of the forms of existence. In preparation for the discussions that follow in the last chapter, the unified theory presents a universal grammar of form on Being in which all forms of language are construed semantically as forms of a being's existence. In this chapter, we come to know the nature and origin of a language's meaning as one and the same form as the nature and origin of a being's existence. We provide a resolution to the linguist's dilemma in the construction of language as knowable existential forms of an enabler's awareness that characterize the use of language by other, enabled beings, who themselves know the meanings of language.

The present chapter is intended to demonstrate that the four universal ways of knowing, in connection with the arbitrary forms of existence, are indeed the formulations of a universal grammar of all languages, since they are used to create beings who understand and experience the reality of the world around us through language. Though many of the forms of the unified theory reach beyond those of linguistics proper, we devote the present chapter to untangling ourselves from the conventional views of language, because the semantic form of language is what an android is constructively—an enabled form of existence. In knowing the representations of forms on Being, or existence, as enabled instances of the universe, we comprehend all that can have meaning and all that a being can knowably perceive. As viewed from the standpoint of the unified theory, the forms of any language are only one class of epistemological forms that make up the existence of a being, namely those that pertain to the symbolic representation of that particular aspect of a being's reality reflected by its use of the language. In the theory, an enabled being must first exist, or be capable of perceiving the world around it and of embodying a consciousness, before that being can know the language that it uses to recreate the reality it perceives in the world. The present chapter then relates to only one of a multitude of disciplines of the science of androids, though an instrumental one, regarding how an existence is enabled to know the meanings of language, and thus how the knowledge of the enabler's existence is augmented by the presence of androids in their capacities to know the enabler's existential universe.

In demonstrating how epistemic instance, along with the four universal ways of knowing and the arbitrary forms of existence—and, in general, the enabler's phenomenological expression of the creation of a being—are indeed the analytical knowledges of the semantic forms of all languages constituting a universal grammar of form on Being, we are immediately faced with a problem similar to that encountered by the scientific method in the study of the universe. There are simply too many examples of language in use to address each of them literally in the expostulation of a theory. When it is considered, however, that the form of the universe—by way of the explanation of a principle or theory—cannot be proved objectively anyway, since such a proof would require an objectification of all knowledge (i.e., an objectification of one's own soul), it can be seen that language, introspectively observed in the manner of epistemic instance, itself demonstrates the universal grammar in the examples of the observer's own knowledge, the only frame of reference used by the unified theory. This is a credible approach to the demonstration of the semantic forms of language because the reader's ultimate reality is verified only in this way, as illustrated throughout the book. We then seek to illustrate the universal grammar as it applies to languages in general by relying on the reader's introspective knowing of the soul, or epistemic instance, while making the objectively untenable claim that it applies to all particular languages.

In demonstrating the universal grammar, the unified theory chooses the English language to show, in particular, how the meanings of language are imparted to forms of existence, or androids, because English abounds with syntactical structures and thus provides ample examples to illustrate. By demonstrating translations of the syntactical forms of the English language to those of the universal grammar (hereinafter referred to as the U.G.), a broader understanding of the forms of existence, and hence of the meaningful consciousness and perception of an enabled being, will result and a better command of the construction of the elementary forms of androids will be obtained. We will make only passing reference to other languages where it may be helpful to do so.

The present chapter demonstrates, by way of example, how to translate the syntactical forms of the English language, as well as the meaningful forms of the English-speaking enabler of androids, into a universal system of symbolic representation defined by the U.G. To accomplish this goal, we rely on the translation of the single instance of the form of the universe—epistemic instance—into all the forms of the English language. For example, the English language uses the parts of speech, punctuation, and writing style to represent the knowable form placed on symbols of thoughts, ideas, conceptions, and so on, thereby reflecting what we perceive in the world around us—what forms are embodied in the syntax of a language known to a being. Through translations to the U.G., these syntactical forms are represented as forms on Being—the semantic forms of language—consistent with the methods of the four C's and the arbitrary forms of existence developed in earlier chapters. The universal ways of knowing illustrate how the meanings of the grammatical forms of language arise as forms on Being in the universally observed template of semantic form called epistemic instance. The symbolic constructions of the U.G. are shown to underlie the conventional grammatical representations of verbs, nouns, adjectives, adverbs, prepositions, modifiers, and so on, of the English language. The syntactical forms of English are demonstrated to be symbols of language that are more fundamentally represented by the transformational form of epistemic instance, with all of their meanings arising in and of the introspectively observed grammatical rule of state of being, or Soul (epistemic instance). Just as we demonstrated the instances of the languages of mathematics, logic and the sciences in earlier discussion, we concentrate here on illustrating that the syntactical forms of the English language—a comma used to separate clauses of a compound sentence, a hyphen holding together a compound noun, or a verb transforming a classical sentence—are more universally characterized as the semantic, or existential forms of the U.G., wherein each instance of a syntactical transformation of the language is found to be an epistemic instance and compositions of them are found to be phenomenologies of the enabler's knowing of the enabled being's forms of existence. The syntactical forms of the English language are shown to be instances of epistemological form of the unified theory, which are embodied moments or instances of enabled knowing or perceiving.

The causal element of causation, for example, is a universal representation of the phenomenological causation of an enabled universe; it is, collectively, an enabled being's moments of cognition of transformations of like meanings. If a comma, period, dash, and question mark were each considered to be types of causal elements with the transformational characteristics of the English language use of epistemic instance, then all of their possible uses would be understood as representations of the momentary occurrences of the forms of the enabled being's consciousness realized through the being's motor and communicative capacities—representations of epistemic instances or thoughts. These syntactical forms of the English language would then be detached from the enabler's knowing of them and embodied as instances of an enabled universe, or existence, thereby becoming parts of a universal grammar of form on Being—moments of an enabled existence. The causations of consciousness would occur as commas, periods, dashes, and so on, in relation to the being's perception of the world around us, or its real form, under a modality of existence, as cognitive recreations of the being's reality. The quantum moment of enabled consciousness would occur, for example, in the transformational nature of a comma functioning in what we represent as a classical English sentence or sentence element. Since the being is a form of existence, its own perceptions and consciousness of symbolic forms are enabled in the arbitrary theory of existence, another aspect of the U.G. expressions. The instances of the being's consciousness, or awareness, can thus be, and usually are different from the written word on a piece of paper, as a result of the being's own semantic understanding of a word's meaning. In the construction of androids, we do not refer to the enabler's knowing of a comma, dash, period, and so on. Neither do we refer to the occurrence of a syntactical form of language alone as an embodiment of the enabler's knowledge, such as what occurs in the conventional art of artificial intelligence, Turing machines and other finite automations and algorithms. Rather, we refer to the four C's and the arbitrary forms of existence that define moments of an enabled being's conscious thought in relation to the other forms of its existence—its perceptions of the world around it. The enabled being's comprehension of the meaning of a comma, period or dash of the English language derives from the being's having been enabled under, for example, the modes of existence to know and perceive these forms. The semantic forms of language apply only to the enabled forms of an existence, which excludes the enabler's own form on Being. If the forms of other languages were similarly defined by the nature of the causal element (and the U.G. in general), such as what is done with the logical operators AND, OR, and NOT of earlier discussion, they would also be defined as embodiments of form on Being, enabled by a creator expressing those respective causations of the universe in the existence of a synthetic being whose modes of thinking (existence) are grammatically limitless. The goal of this chapter, then, is to demonstrate that a universal grammar of all language—of form on Being—is at work in a more fundamental way in our comprehension, even in the representation of a single thought, expressed in any language. The syntactical forms of the English language are examined as forms of the U.G. to show how enabled forms on Being, the forms of existences themselves, account for all instances of a complex language, although relative to the enabling forms of the U.G., the entire English language contains but a handful of ways of expressing the forms of a world around us syntactically.

When considering any representations of existence, those of the U.G. included, one must attain an enabler's perspective on a form that also knows and perceives an inertial world. We must therefore acknowledge that the forms of the U.G. themselves mean the ultimate reality of existence itself, just as the symbolic form of an electron in physics means an object one can know and perceive as a real electron. Whereas the English language expression I am alive is an adequate representation in the use of language with respect to its knower, the U.G. expression for such a transformation is shown as an instance of a causal element, coupled to similar causations of the universe, or thoughts, through the four universal ways of knowing under the arbitrary forms of existence. The syntactical forms of conventional languages are thus encapsulated in the universal representations of the U.G. as forms on Being. When one knows a symbolic form of the U.G., one knows the forms of an enabled existence as a creator, one who enables another to know the forms of a conventional language.

The meanings of a conventional language's grammar, from the perspective of a creator, are understood universally in their translations to the U.G. The reality described by the enabler using the U.G. is itself a reality of an enabled being. The enabler's ultimate reality is recognized by that enabler as the ultimately real form of the enabler's own inertial reality. The world around the enabler is recognized to occur as inertial realities themselves in the knowable transformational form of epistemic instance, or the instance of the soul. Translating a verb tense of the English language to a form of the U.G., for example, involves a translation of the enabler's inertial objective consciousness (which is not at all ultimately real) to that of an enabled being in the enabled being's capacity to know the language with respect to its own perceptions. A classical syntactical construction such as I like chocolate is embodied in a causal element that enables, along with many other similar elements required for the being's consciousness and perception of the world around it, an arbitrary theory of existence to account for the semantic construction of language as the being's existence. The enabler would therefore not know why the being likes chocolate, except to the extent that the being is enabled to have perceptions of a real world around it and thoughts that occur in relation to them, which may result in the being's liking chocolate (the being's consciousness knowing or observing that it likes chocolate). The being's taste for chocolate is an existential form, not a linguistic one, even though it is expressed in language. If the enabler desires to know what it means to like something, the H phenomenology of correspondence (metaphor, simile, morphism, etc.) is created by the enabler in the being's faculties of mind in relation to its perceptions. In general, the syntactical and semantic forms of a conventional language unite when one understands the four C's in the context of an arbitrary theory of existence in an enabled being's consciousness and perception of the world around us. To an enabler, any given symbol of a conventional language must then be viewed as a meaningful symbol to an enabled being via the forms of the U.G., which entails the representations of the four C's and the arbitrary forms of existence.

The following passages address the grammatical forms of the English language in terms of their translations to the universal ways of knowing and the arbitrary forms of existence, set within the context of a formalized approach to the U.G. The elements of English grammar include, for example, nouns, verbs, prepositions, whole sentences, sentence clauses, punctuation, and compositional style. The translations of any linguistic expression—an adjective operating on its noun, a compound noun in transformation of the two nouns, and two coherent paragraphs of composition in the transformation of the reader's comprehension of them—are translated to the U.G. according to how their forms are represented epistemologically in the four C's and as forms of existence. A part of speech, such as a verb, is translated to the U.G., along with its syntactically transformational structure (a sentence in subject-predicate form), and the disparities between English grammar and its U.G. representations are pointed out, providing an analytical understanding of how the syntactical forms of language are composed existentially, or semantically. Generally speaking, the following discussion addresses the decomposition of the English language to its phenomenological form in order to demonstrate the enablement of existence with respect to our own understanding of the world around us as reflected in the use of the English language. We apply these universal forms to the construction of practical androids in the next chapter.

1. A Language's Representation of the Objects of the Universe

Nouns

We begin translating the grammatical forms of the English language to the forms of the U.G. by considering the epistemological interpretation of a noun, or the representation of an object of the English language. In English, nouns represent the objective forms that are knowable and perceivable to an existence. Commonly, they are referred to as substantives—persons, places and things; animate and inanimate objects of existence; or living beings and lifeless things. As mentioned earlier, however, in order to know what an object is, or here what a noun represents, one must know what the word existence means, since all nouns represent forms of existence. Thus, given that nouns define the objective forms of what we know and perceive in the world around us, we must determine the nature and origin of the existence (the universe) in which the nouns, or objective forms, arise in order to place objective definition on the semantic form of a noun, as is accomplished in earlier discussions of the unified theory.

A noun of the English language—what one is semantically, or beyond the syntactical forms of language—is what our religions define in their doctrines in how they objectify the ultimate reality of the universe. An epistemological definition of a noun is what scientific laboratories, attended by physicists, mathematicians, biologists, and scores of other scientists, seek to determine in the studies of atoms, electrons, numbers, genes, the universe, the living universe, and so on—objects which are, more fundamentally than anything else, transformations of the universe that are objectified in our knowing and perceiving of them. In the pursuit of knowledge, we have been contemplating only one simple thing—the epistemology of a noun, for a linguistic noun is what we fundamentally know and perceive in a world around us. A noun is simply a noun; it is not different epistemologically in any of us. It is the lost medallion of Eastern traditions and the temporal or corporal form of eternal life (Soul) of the West and what is enabled in epistemic instance in the unified theory of knowledge. A noun represents what appears to corporal beings in an eternal transformation of the universe—an object that does not exist in the ultimate reality of the universe. A noun is an objective representation of a living soul or a moment of the universe. It represents all things and all beings in the universe as an objective knowledge or perception. Because a moment of the universe is an instance of the transformation of the universe—an instance of the eternal soul—the ultimate reality of what nouns represent is beyond the mind's knowing and the body's perceiving. This is why the mathematician's point objects, the physicist's small particles and all other objectifications of the world around us cannot be known except transformationally (structurally) and can only be perceived objectively—not transformationally. We can only embody what gives rise to knowledge or a noun—the soul, and in our spiritual awareness we come to know its transformation. As mentioned earlier, the objects of the universe arise from the creations of the universe. Nouns of natural language are what represent them. The creations of the universe are persons, places and things in the English language—objects that arise in our objective knowing and perceiving. When these persons, places and things (nouns) transform, we place a verb, a function or a comma in the middle of them to represent their occurrence in the universe.

From the standpoint of the unified theory, we actually have said all there is to say about nouns, or the objects of the universe, in the previous chapters, by introducing and elaborating on epistemic instance in the four universal ways of knowing and the arbitrary forms of existence. What a noun represents—an object (X or $)—is enabled in phenomenological correspondence. As discussed earlier, an object is enabled in the transformation of the universe; it exists only relative to the enabled moment of the universe. This is why nouns represent anything that is not syntactically transformational and at the same time things that we know are themselves transformations—persons, places and things. We perceive and know an object—a person, place or thing—as a definite thing or object of our perception, yet when we attempt to know it, we rely on transformations (verbs) to describe its form. In our languages, what is ultimately real of an expression is the knowing of it, not the object we think we know in the expression. In the statement An electron is a particle, what is ultimately real is the meaning that the sentence conveys—that A (an electron) is (transforms with) B (a particle), not the objects so thought to exist. This is why the transformation of a verb and an adverb phenomenologically requires that the verb and the adverb are phenomenological nouns. The objectification of a classical state or condition as a noun is no different from the objectification of any other transformation of the universe; it objectifies a transformation—pistemic instance—in our knowing or perceiving. We simply do not ordinarily associate the objects of our perception, which epistemologically are transformations (verbs), with transformations themselves.

In the unified theory, all objects are transformations and all transformations are objects depending on the enabler's perspective. If we consider an object enabled in the knowing and perceiving of a being, we refer to a classical noun of English. If we consider the transformation of any objective forms explicitly, we consider a classical verb—and more, since commas, spaces between paragraphs, and so on, representationally transform objects as well. The unified theory therefore requires that all forms of language are either phenomenological transformations (the circle of the illustration of epistemic instance) or phenomenological nouns (the squares of the same illustration of epistemic instance). Since the transformations and the objects of epistemic instance can be one or the other (an object or transformation), the creation of the quantum moment of the enabled being decides what is a classical linguistic noun. This is also why all language forms-the word forms of Mandarin Chinese and those of English—are one and the same instances of phenomenological nouns and their transformations.

In the unified theory, nouns are the objective forms of transformation (X and $) and are transformations themselves to the enabler. In the enabler's view, a verb is the phenomenology of correspondence (H). Two syllables of a word (ar and tic in articulate) are phenomenological nouns that require a transformation. More than two syllables require a composition of form, which can be observed in the reader's own articulation when knowably attempting to pronounce more than two at one time. This is also the reason why word constructions proceed representationally from left to right, right to left, and so on; only two can be comprehended or spoken at a time, or in a quantum moment of transformation. An adjective and the noun it modifies are phenomenological nouns. An adverb and the verb it modifies in transformation, wherein the representational blank space between them is the actual verb of the adverbial transformation, are phenomenological nouns. Sentences and whole literary works in transformation with others are phenomenological nouns. A noun of the English language is therefore a particular type of phenomenological noun—one that represents conventionally defined persons, places and things (living beings and lifeless things, etc.).

English nouns do not represent English adjectives. Rather, English adjectives—parts of speech that modify nouns—represent adjectives. The fact that English nouns are distinguished syntactically from English adjectives is important here, since, phenomenologically, they are one and the same. When we distinguish any grammatical forms from each other, beyond being phenomenological nouns and transformations thereof, we run the risk of losing sight of what is ultimately real about them—that they are in transformation of an ultimately real universe. Phenomenologically, there is no difference between a noun known in the field of linguistics defining an object of a language's grammar and an electron known to a physicist, even though the linguist characterizes an electron as a noun. They are objects of one's knowing and perceiving—in one case the object of a linguistic noun and in the other that of a representation of an electron. Just as there are sets, elements, points, circles, groups, spaces, and so on, in mathematics, there are nouns, adjectives, adverbs, whole sentences, and so on, of English grammar to represent various kinds of objective forms of eternal transformations. The syntactical forms of any language are universally expressed as semantic forms of an existence by the four universal ways of knowing under the constraints of the arbitrary forms of existence determined by an enabler. Whereas a given conventional language expression of mathematics would require, for example, the integral symbol of calculus to represent concisely a sum of infinitesimal elements, the U.G. does not, since what is known semantically to a being is characterized by the four C's. In the expression of integration, the variable on the left, the equals sign in the middle, and the integral of a function on the right constitute an expression of a single epistemic instance. What we ordinarily think the equation expresses (integration) is not at all what is actually stated and must be characterized as a separate knowledge, starting with the expression of the limit of calculus, where the mind begins integrating. The integration process, moreover, is an infinite composition of instances of the universe. It can only be embodied. Phenomenological composition accounts not only for the infinitely many epistemic instances of an integration but provides that such instances are equal to linguistic objects (nouns) in transformation. In a single integration there are embodied an infinity of linguistically expressed thoughts—transformations of phenomenological nouns by way of the transformational forms of the language (verbs, prepositions, commas, and so on)—when translated to the U.G. The U.G. thus provides a universal means of expressing any knowledge as it occurs in the ultimate reality of the universe.

Nouns terminate the universe objectively. They represent objects that are known and perceived. The English language thus determines two broad classes of terminal objectifications of the knowable and perceivable universe—common and proper nouns, (and a third, pronouns which are discussed later). Persons, places and things—common nouns—terminate the objective universe by, not surprisingly, allowing it to proceed-to unfold into ever newer persons, places and things, just as theories of types and classes of mathematics attempt to overcome the paradoxes of set theory. A common noun is not an absolute termination on what can be known and perceived, but is an indefinite one. Common nouns are a syntactical acknowledgment that the objects we know and perceive in a world around us are themselves transformations and can be composed of other nouns in transformation. A tree is a common noun because it does not specifically terminate an inertial universe; it allows for spruce trees, pine trees, and so on. A human being is also a common noun because it allows for races, ethnicities and myriad other qualities thought to be human.

A proper noun, on the other hand, terminates the universe absolutely in the knowing and perceiving of an inertial existence. Proper nouns like Jack, Cincinnati, and NAS (as a proper name) terminate the universe such that they cannot be known as objects intrinsically any further; they are objects existing intrinsically apart from their observer. Pete, a proper noun, can be classified as a person (a common noun) but a person, a common noun, cannot be classified as Pete (a proper noun). All scientific principles are developed in the application of proper nouns to common ones. An algebraic variable, for example, which is a common noun, becomes a mass, a proper noun in science, when it terminates the variable from mathematics as a proper thing. If all nouns were common ones, the universe would not terminate in anything, which is what gives rise to the paradoxes of the set theory in mathematics (e.g., elements can themselves be sets and so on) and provides for the transformational recursions of epistemic instance in regard to the observance that all transformations are nouns and vice versa. Moreover, if all nouns were proper ones, there would be no means by which the universe could transform compositionally. In the statement Jim and Pete are human beings, if human beings were a proper noun the sentence would be equivalent to Jim and Pete are Bob.

Common and proper English nouns provide different viewpoints on the terminal compositions of objective form, or objects of existence. If the form represented by the noun is a terminal one, it is a proper noun. If it can be classified by other forms of equal stature, it is a common noun, and allows the universe to unfold continually in objective form. To an enabler, proper nouns represent the existential extent of the enabled being's inertial universe. They represent forms that transform intrinsically in their own universes, outside of the intrinsicality of another enabled observer, but within the same existential universe. Jack, who is observable to Bob, terminates Bob's inertial universe because Jack embodies his own inertial universe or intrinsic form. A tree, in the conventional use of language, does not have its own terminally intrinsic form in Bob's existence. Bob can know and perceive its composition. A common noun does not represent inertial form proper. From the perspective of an enabler of existential form, then, common and proper nouns are a means of creating the existential scope of a being's enabled universe in terms of what can be known intrinsically by the being and what cannot.

Just as proper nouns terminate the objective forms (persons, places and things) known and perceived by an existence by defining the intrinsic and extrinsic boundaries of the existential universe, the personal pronouns terminate the objective knowing and perceiving of intrinsic form in general—the ultimate reality of the soul. The universal objectifications of the inertial universe, beyond which no inertial comprehension can take place, are represented by the personal pronouns. The personal pronouns enable one to identify oneself introspectively, thereby representing linguistically an awareness of the soul. These pronouns terminate the common and proper nouns objectively and indeed represent the occurrence of epistemic instance as the enabled instances of the soul to an inertial existence. There is nothing more objectively fundamental than their transformations. I am Jack, I am alive, We are human beings, and so on, are expressions of one's soul or a plurality of souls, in objective transformation, as known introspectively. There may be other Jacks in the universe, while others may be alive and identify themselves as human beings, but there are no other I's or we's and other introspectively observed terminal objectifications of a given inertial existence. A handful of personal pronouns—I, you, it, he, she, him, her, we, us, them, and so on—are the key representations of the objective forms of an inertial existence, since they objectify the soul to the inertial existence and enable a being to know itself in language. Just as the parameters of spatiotemporal references in the sciences are defined before meaningful transformations can take place in them, the pronouns of natural language establish the objective basis for the transformations of inertial existence itself Just as Jack or hydrogen enable one to reach the limit of one's objective knowledge of the world around us by placing objective form on living beings and lifeless things (of conventional definition), the personal pronouns objectify our introspective awareness of ourselves inertially. Infinitely many living beings and lifeless things can transform in one's existence in conventional representations but only one soul is intrinsically knowable and perceivable to an inertial being. If there is more than one class of inertial occurrences of I, you, it, and so on, in one's awareness, one cannot know inertially or objectively as an enabled being, unless one were an enabler of these forms, since these objective forms permit one to know inertially in the first place.

The personal pronouns are the absolute terminal inertial forms of existence because all other objective forms derive their meanings from the intrinsic transformations represented in them, forms that can be traced back to state of being. I represents the embodiment of state of being—Soul—just as other pronouns represent the intrinsic natures of forms known inertially to the being, but they suggest different perspectives on inertial form. It, for example, is an object of an inertial existence that is thought conventionally not to embody intrinsic Soul, though it does, since all forms of the universe are moments of it. We is a plurality of souls or of conventional inertial existences. You suggests a soul like me (of the same inertial universe)—and so on. Since there is only one ultimately real form of the universe—the soul—these inertial objectifications are sometimes interchanged inadvertently, transgressing the definitions of inertial order but abiding by the eternal universe. In the case of the inertial realities of a parent and a child, for example, where ordinarily one would place I before we or you in a situation of desperate circumstances, you (the child) becomes I (the parent) because the inertial distinctions are not ultimately real and the bond of eternal spirit is permanent. As mentioned earlier, an electron—an it—is a transformation of the ultimately real universe—a soul—which is perceived and known by the observer as an electron, an object of one's existence. The ultimately real universe thus terminates transformationally, not objectively, or terminates objectively only to an inertial existence in the embodiment of a transformation. Any linguistic noun does not define the ultimate reality of the universe; it only objectifies the universe. The personal pronouns, however, represent universal objectifications of inertial transformations (existences) and therefore terminate the universe transformationally. They represent epistemic instance as the moment of awareness of a state of being of an (inertial) existence. This is why I has meaning only to the embodier and to none other. To see the truth behind this observation one need only ask, if all the personal pronouns were eliminated from our vocabulary, could we know? Of course not, because anything we know refers to the embodiment of Soul, or what the pronouns represent—and this is why an inertial existence like an android can be created, since the personal pronouns in transformation are the ultimately real universe in transformation (as an inertial existence). The pronouns thus provide the epistemological basis for all meaningful uses of language.

In constructing the existential forms of a being with respect to language, the reflexive pronouns—myself, oneself, itself, yourself, himself, herself, oneself, itself, ourselves, yourselves, and themselves—define a reflexive, or self-knowledge, of the soul itself (oneself) in transformation. I did it myself expresses the recognition that one's own soul (or its objective form in an inertial existence), in transformation, has done something itself—the observation of one's own objectified self. In purely reflexive form, I am myself represents a self-knowledge that I exists in the form of myself, which constitutes an observation of myself mirroring I, the intrinsic soul. Because the pronoun I cannot be decomposed intrinsically, the meaning of the sentence I am myself is redundant and simply demonstrates the impenetrability of objective form into the transformational nature of the universe. Reciprocal pronouns—like each other and one another—similarly suggest reflexive knowledges but they indicate a being's awareness of other objective forms, each form with its own intrinsic nature, as in They observe each other.

Much like the reciprocal pronoun, a relative pronoun with an antecedent intrinsically links principal and subordinate clauses of whole sentences—whole but discrete experiences of the world around us. The relative pronouns—such as who, whom, whose, which, what, and that—while they often serve as subjects and objects in the instances of composition in which they are constructed, modally transform sentence elements (objects) in existentially relative ways. In addition, the indefinite pronouns—who, what, whoever, whosoever, whose, which, and whenever—provide for placeholders of the terminal forms of inertial existence in compositions of form, as in I don't know who arrived first. In a further case of indefinite pronouns, also including somebody, anybody, everybody, nobody, something, somewhat, anything, and nothing, the effect of the U.G. on the construction of inertial existence can be seen in how the indefinite pronouns are not entirely indefinite in the view of the enabler. When one says, "Somebody, open the door," one ordinarily would not expect an extrinsic object of classical definition, such as a lamp shade, to open the door. Rather, it is implied that you or I should open the door. The indefinite pronoun somebody, then, presumes that an existential universe can only include conventionally known living beings. A similar but more revealing circumstance arises in the use of interrogative pronouns, as in Who answered the phone? Since the advent of telephone answering machines, one could answer, "The machine." While such experiences of a real world around us in which machines answer phones can be explained in the qualifying statement "Figuratively, that is," such is not the case with the forms of the unified theory. The U.G. is formulated in such a manner as to enable a creator of forms to know that an it is a possible intrinsic form or I (soul) and is capable of allying itself with the interrogative and indefinite pronouns such as who.

As we further examine the indefinite pronouns, which act as limiting adjectives, the objective forms of this, these, that, those, the one, that one, such, the same, the former, and so on, are inherently understood as objective forms of particular inertial existences without which those forms would be meaningless, as in We are speaking about this unified theory of knowledge (and not one known outside of the reader's existence). In the case of the limiting adjective, what is limited is the inertial existence that knows and perceives the object qualified by the adjective. We do not view this as applying to arbitrary existences, even though we know intuitively that each of us can use it. Considering the adjectives in their indefinite forms—all, any, anyone, someone, afew, enough, more, and so on—we may ask, if the soul of the extant being is not in transformation universally, allowing for the objective forms of inertial existence, and some conventionally defined objective form actually exists in the ultimate reality of the universe (even though it does not, as discussed earlier), how much then is enough? Only a transformation of one's own inertial existence or the semantic forms of language (epistemic instance)—the meaning embodied as one's existence—can objectively determine how much is enough.

In just a handful of examples of the nouns of English grammar, we can see that the nature of inertial existence is represented in how objective forms are grammatically defined according to the ultimately real transformational nature of the universe—i.e., by what the syntactical forms of language mean. The nouns of English grammar objectify the inertial universe based on the universal knowledge that, ultimately, all objective forms are themselves transformations. Linguistic nouns, including pronouns, and all of their resulting objectifications of the soul, are thus linguistic misinterpretations of the ultimate reality of the universe, though they all abide by it, since the soul is ultimately real. Language has evolved the way it has because of this truism. The objective forms of nouns are therefore better understood in their epistemological constructions in the U.G. Every person, place or thing and every occurrence of the universe can in one view or another be characterized as a phenomenological noun or a phenomenological transformation based on its placement in epistemic instance. English nouns account for only a small fraction of phenomenological ones, since, for example, a comma and myriad other forms of English, let alone of other languages, are not grammatically considered nouns (as well as transformational elements). Whether nouns transform conventionally in ways specified by English grammar or in the definitions of the U.G., all meaningful forms of any language are embodiments of the universe that indicate how epistemic instance permits the transformation of objective forms with respect to arbitrary forms of existence. When we consider further the grammatical forms of the English language, while we shall progress beyond the purview of linguistic nouns and pronouns in transformation, it should be recalled that there are only two key forms of a phenomenological interpretation of the universe—the objects in transformation, and the transformations of the objects, both of which are understood in the four universal ways knowing and are fundamentally represented in epistemic instance.

Because all objective forms derive their meanings in the context of an enabled existence (a theory of existence), English nouns have no meaning unless they are known and perceived in an existence. Any form of language then represents either a transformation that enables objects or an object enabled by the transformation. Phenomenological correspondence enables the meanings of linguistic forms as they are known to the enabler because it embodies the capacity to transform knowable objects—objects which are themselves transformations. An arbitrary theory of existence enables these transformations to occur as those of a consciousness in correspondence to perceptions of the world around us, enabling meaning to arise syntactically in the enabler's knowing as the enabled forms of existence. The U.G. thus carries in its definitions the observation that all objects are transformations and can be employed in the enablement of any theory of existence, or semantic form of language.

2. A Universal Grammatical Form of Language

The Phenomenological Sentence

In order to consider further the U.G. translations of the syntactical forms of the English language to semantic forms of existence, we must begin looking at language in terms of phenomenological sentences, or epistemic instances. In contrast to conventional language forms, a phenomenological sentence is a complete thought, a quantum occurrence of the cognitive universe—something that can be comprehended. A complete thought occurs when an adjective, a descriptive modifier of a noun, transforms with a linguistic noun, though the verb, or the objective representation of the transformation, is never denoted. An English sentence proper is therefore an unnatural constraint placed on the transformations of the knowable and perceivable universe, since it most often is a composition of epistemic form. A subject and object transforming through a verb in an English sentence is no different from the blank space transforming an adjective and a noun when the noun is modified by the adjective. Hence, the U.G. requires a literal representation of every transformation of a knowable and perceivable universe and not only a composition, since epistemic instance transforms phenomenological compositions. What is typically represented in the constructions of a conventional natural language is a composition of epistemic instances. The grammatical building blocks of a natural language usually are compositions of epistemic instances and not simply instances themselves. If a word in a sentence of classical construction is taken to be a subject, another a verb and still another an object, an epistemic instance is represented—if, what the mind knows is the idea conveyed by the sentence, such as Pete knows Paul. The phonemes of a single word, however, could involve a phenomenological composition more complex than the one composing the sentence in which the word is found linguistically. Songs are a perfect example of this. Generally, a melody can be carried from a single syllable of linguistic representation. The grammars of natural language are thus tailored to the compositional experiences of beings, just as our languages themselves vary around the globe.

In order to demonstrate further the distinction between a phenomenological sentence and that of a natural language, we can consider again the English adjective. Because the conventional definitions of English grammar locate objects in transformation only in the extant knower, adjectives are not seen as nouns. In English, for example, there are nouns like teacups and electrons, but there are usually no phenomenological nouns like whites or fasts, only white teacups, or fast electrons. Phenomenologically, however, there are whites and fasts, since these forms are the objective forms of an enabled being—objective forms that modify linguistic nouns. We know the color of white and the speeds with which electrons travel. White, the color, is an enabled object to the enabler and a perceivable quality to the enabled being; otherwise, when we expressed white teacup the teacup would not be able to transform in our imaginations into a white one. Electron, teacup, white, or fast alone, however, do not have meaning in any language. A teacup or an electron—white teacups and fast electrons (or any transformation of teacups and electrons with other objects)—are whole statements, or phenomenological sentences, and have meaning because epistemic instance is represented. Neither nouns nor adjectives have meaning unless they are placed into transformation with other words. The special qualities that an adjective acquires in the English language are thus superfluous ones in the ultimate reality of the universe, which is expressed in the phenomenological sentence. All forms of language are variations on epistemic instance, which are universally classified in the four C's of phenomenological form as enabled forms on Being.

Hence, the linguistic classifications of English nouns are not universal representations of objective form, but are crafted by the grammarian as types of objective forms based on a mistaken notion that ultimate reality is the objects that are omnipresent in a world around us. All objective and transformational forms of the English language are therefore deconstructed in the U.G. into those of epistemic instance in a phenomenological sentence and compositions thereof. Compound adjectives, compound nouns and even compound sentences, regardless of complexity, are complete phenomenological sentences and are single instances of the universe when taken as complete thoughts. A thousand and one pieces, is more than a phenomenological sentence as it is read from the page; in fact, it is a composition of phenomenological form, since A thousand and one, a composition itself, transforms with pieces. The epistemic instances in the composition A thousand and one constitute an adjective of the noun pieces. The instance of only the adjective and the noun comprises a phenomenological sentence. The instance of the article A and the noun thousand comprises another.

Word formations are also phenomenological sentences of the U.G., as the case of derivative adjectives—a paradigm of lexicography for our example—demonstrates. Suffixes such as -en, -fold, -ful, -ish, -able, and so on, are adjectival add-ons to nouns, so to speak, as in tenfold (ten-fold) or beautiful (beauty-full). A single word itself, phenomenologically, can be a complete sentence analogous to the English sentence, simply on the basis of what is considered a phenomenological noun. Moreover, as any musician or opera singer will attest, a single word can be an entire composition of epistemic form. A vowel can be opened up to a great many operatic compositions. These are all instances of the universe, or the soul, and represent the composition of form if taken as more than one instance. A single vowel can embody a world (composition) of meaningful epistemic transformation to the operatic performer, a world of meaning which we hold in such high regard because it transgresses the meanings that are possible in the syntax of English grammar. In the constructions of the U.G., a lengthy clause in transformation with another by a comma is not different from the articulation of ac and a in the word academic. In such a case, the articulation of the word academic, syllable by syllable, is even more complex an act than the single comprehension of two ideas transforming as clauses of a sentence, since the articulation of academic is a composition of epistemic instances.

The grammatical forms of any language, English included, are thus variations of or specific definitions applied to epistemic instance itself. In mathematics, for example, there are different types of verbs—functions, arithmetics, sets, and so on—and various types of objects-points, numbers, etc.—in use. The fact that epistemic instance underlies all grammars is what permits, for example, the fact that the expression Two plus two is equal to four and that of 2+2=4 to mean the same thing; they are simply expressions of objects in transformation by way of epistemic instance. All objective forms of a language are enabled objects (X and $), and their transformational forms are known to the enabler through phenomenological correspondence and to the enabled being as contemplations (semantic forms) producing literal thoughts.

3. A Language's Representation of the Universe's Eternal Moments

Verbs

We may now consider the English verb in connection with a phenomenological sentence, or epistemic moment. The linguistic definition of an English verb is grammatically tied to the linguistic form of an English sentence. This is unfortunate because an English sentence, by tradition, embraces both a phenomenological sentence and a phenomenological composition at once, and is not a characterization of what is natural about language. Let us then begin to extricate ourselves from the traditions of the English sentence in order to examine its semantic form in the U.G.

In the syntactical nature of English sentences, verbs represent the transformation of the objective forms in a world around us. Though the semantic forms of language arise knowably only to the enabler in the inertial existence enabled, and since epistemic instance is premised on the meaning of Soul (which is unknowable), a verb can be said to embody the meaning of any transformation—how and why the objective forms transform, as is demonstrated in its enablement in phenomenological correspondence. Though the English definition of a verb severely limits its use in representing the inertial transformations of an enabled universe, any statement of the English language representing a verb and two phenomenological nouns can be said to be meaningful to the enabled being (providing there exists the reality to which the transformation corresponds).

In the conventions of the English language, the objective forms of a sentence that are transformed by a verb are referred to as the subject and object of the sentence. In the syntactical structure of an English sentence, however, an interesting misrepresentation of knowable and perceivable form occurs as a consequence of the grammatical rule known as a predicate. English grammar requires that a subject transform with a one-sided epistemic instance—a predicate—which itself contains a verb and an object. The structure of an English sentence, whose actual verb (the transformation of the subject and predicate) is silent grammatically, thus obfuscates the prominent role of the verb in all forms of language by making the represented verb (the verb of the predicate) a pseudo noun of a compound noun in the structure of the predicate, in its relation to the object. The knower of the English grammar is supposed to distinguish between the phenomenological verbs (the one in the predicate and the one transforming the predicate silently).

The obvious confusion that arises in such a construction can be seen when one attempts to construct a complex sentence. Since our thoughts transform in accordance with epistemic instance, we construct sentences epistemically, not in subject-predicate structure. In order to construct an English sentence naturally, one must ignore the grammar of English—the subject—predicate structure—and formulate the noun-verb-noun construction of epistemic instance. In the exclamation Oh! a subject-predicate structure cannot even be found, though epistemic instance is at work in transforming the idea that invoked the exclamation. In other sentence constructions, such as those found in the works of the more innovative writers, this subject-predicate structure is often altered intentionally. To the extent that an English sentence is known as a transformation of subject and predicate, with the epistemic verb silent, it nevertheless poses no problem epistemologically. When the predicate itself is viewed as containing the verb of the sentence, however, there exist two verbs in the same grammatical unit, or sentence—the silent one transforming the predicate and subject grammatically, and the denotative verb in the action of the sentence indicating what occurs in the transformation of subject and object. If the silent verbs of subject-predicate sentences are removed from the representational structure, leaving a noun-verb-noun (subject-verb-object) structure, then the denotative verb can be seen as an objective form that describes how subjects and objects transform.

The hyphen in a compound noun, the blank space in an adjective's juxtaposition to a noun, and the eye movement or other action in making the transition from one sentence, paragraph, or whole text to another, are not usually classified in English as verbs. English verbs transform subjects and objects only. In the form of an English sentence, beginning with subject-verb-object and ending with the complex sentence, in which there are all kinds of instances of adjectives, modifying phrases and clauses, and so on, an entire phenomenology of instances of transformations is composed, which cannot even be appreciated from the standpoint of English grammar itself, even though the grammar (theoretically) describes how the language transforms. This is because language, in our traditional approaches of linguistics, is not considered to be the semantic form of it, or existence itself. A single English sentence with one denotative verb of English may abound in phenomenological verbs (other transformations of the sentence, such as prepositional ones), each of which is no different epistemologically from the denotative verb. The grammar of the English sentence is thus only one of infinitely many interpretations of the modes of existence and the faculties of mind (semantic forms) of enabled beings, when viewed from the standpoint of an enabler.

In general, a verb is distinguished from other parts of speech because it explicitly identifies cognitive recreations, or conscious transformations of the universe in the recreation of perceivable reality. We cannot think linguistically or objectively without movement occurring in our consciousness—the essence of a phenomenological verb—and we cannot think explicitly in English without representing a linguistic verb. An adjective in transformation with a noun has but one way of transforming and this is why its phenomenological verb or transformation is not represented, as in brown cat. A cat, for example, can only be brown. It cannot take brown. Nor can it hit brown. A cat cannot run as fast as brown and it cannot do anything else with brown (for the most part) but be it. Hence, the verb to be is implied in the adjective's transformation of the noun. When there are many ways in which two or more phenomenological nouns can transform, the English language usually uses the explicit representation of a verb. Prepositions, conjunctions, and other such conventional transformational forms are not considered verbs because they are so widely used that they are unmistakable in the constructions of the language; they are limited in transformational capacity relative to a verb proper. Verbs are explicit ways of denoting (meaningful) transformations in English. Nevertheless, because phenomenological forms underlie all English and other grammatical forms, there is no unique transformational property to the English verb, as is evidenced in the use of a comma in its place in the expression The world, your oyster. The comma and the verb to be are phenomenological equivalents. There are only instances of objective transformation in the universe, regardless of how one classifies or assigns meaning to them.

Respecting the fact that the phenomenological verb or epistemic transformation can be interpreted in any form of language, the English verb has specific grammatical uses that should be demonstrated in translation to the U.G. Categories of verbs in English grammar obtain their definitions in the U.G. on the basis of how the grammarian identifies the transformations of the perceivable universe. With the exception of the voice and tense of the English verb, which will be discussed shortly, the English verb is alternatively described as the action of a transformation (sentence), which, in turn, is defined in the grammatical form of the transitive verb. When there is no action occurring in the transformation transitively, an intransitive verb is defined to represent the transformation of a state or condition of the objective forms (of a person, place or thing). Each, however, shares the epistemological universe with prepositions, hyphens, and mathematical functions.

A transitive verb is one that passes action back and forth between subject and object (phenomenological noun to noun) in a represented quantum moment of the universe. The subject and object must be transformational objects (objective forms) that are capable of transforming others and having others transform them by actions performed on them. In the sentence Pete shoved Paul, both Pete and Paul are objective forms capable of transitive action—capable of being known or perceived as objects that can causally transform with each other as actions on each other. In the constructions of the U.G., any such transitive actions performed on objective forms, along with other types of actions or conditional transformations, are embodiments of the causal element. The action of a preposition, however, is embodied as well.

An intransitive verb is used to indicate the transformation of objective forms that are in a state or condition, and so the intransitive verb presupposes the intrinsic natures of the objective forms. As with the transformations of reflexive pronouns, intransitive verbs typically reflect back to their antecedent subjects a transformed condition or state specified in the condition brought to the antecedent form, as a result of the verb,from the object, as in Pete is happy. The objective antecedent Pete, which before the transformation is in some arbitrary condition, is transformed by the intransitive verb to be to the particular state or condition specified in the predicate adjective (the state or condition the antecedent noun is capable of embodying). Copulas or linking verbs, themselves transformations, such as is going, and seems like, can establish either a transitive or intransitive relation between the nouns of the transformation, as in Pete is going to the store. In the sentence, Pete is in a state or condition of going to the store but is also causally or transitively transforming by moving closer to the store and therefore acting with it. Because all objective forms are intransitively transformed and at the same time transitively influenced by each other, depending on epistemic definition, the causal element allows for either. The grammatical distinction of transitive and intransitive verbs on the basis of transitivity is not a universal one because all forms are at once capable of embodying states or conditions and acting causally with others.

A further explanation of the way in which objective forms transform in English is found in the inflectional form, or the voice, of verbs. In the active voice of an English verb, the subject is in such an anticipatory condition that it is actively influencing the object of the sentence, as in John is creating a memo. In the passive voice, the object is actively influencing the subject, as in, John was affected by his memo. In either case, from the standpoint that the subject is an objective form in transformation with the object, actively or passively, the voice of a verb simply indicates the direction in which objective forms transform. By the use of a verb's voice, an objective form can influence or be influenced by another objective form in either direction of epistemic instance, permitting a subject to influence an object or an object to influence a subject, with the leading objective form of the transformation—the subject—remaining the same.

Regardless of the definitional complexity given to any aspect of a grammar or to a whole grammar itself (here, for example, the voice of a verb), it should be recalled that conventional grammars do not syntactically account for the semantic forms of language. While one would infer that in order to develop such definition as the voice of a verb the grammarian would need to know how we think, this is not the case. The voice of a verb—active or passive—describes two ways in which the objective forms of epistemic instance can transform. Epistemic instance can transform in infinitely many ways. In mathematics, for example, a verb, or type of transformation—an operation, for instance—an be transitive or intransitive, with exceptions (dividing by zero is an exception). The only literal way to denote what we claim to know in the syntactical forms of a language (how to articulate thoughts) is to express the language semantically as a form of existence so that we can know how a being comprehends the language. When the active and passive voices of verbs are considered from the standpoint of the perceptions we have in the world around us that John is creating a memo and John was affected by his memo, it can be seen that if John places the memo on his desk, the memo could wind up being on top of or underneath other articles on the desk. The memorandum and the articles, maintained in the same grammatical positions in the sentence, affect each other in two different ways, wherein on top of is taken to mean, analogously, active, while underneath is taken to mean passive in the prepositional transformation in the comparison to the voice of the verb.

English verbs are therefore not the only grammatical forms with voice. All epistemic transformations can be viewed in this manner. In fact, whole sentence elements can actively or passively influence each other, based on the inflections of words in the real voice, or phonetics of their speaker, as is illustrated in the following example: We have lollipops and you don't (active) and We have lollipops and you don't? (passive). Active or passive influence occurs in language because all languages are semantic and must first be understood as forms of existence—the knowing and perceiving of real enabled beings—and then understood by what is known or perceived (the grammar of a language). Moreover, the whole of English grammar is uprooted in many meaningful expressions of language known to the humanities-poems, for example. This is because poems reflect what we feel (semantically), not merely what we know (syntactically).

Degrees of ascertainable reality, existential reference forms, are represented in the mood of a verb. In the indicative mood of a verb, for example, a condition of extant reality is expressed. Enabled in the conscious forms of the mind-body dualism or another arbitrary form of existence, the mood of a verb is a known condition of a being's reality. Mathematical formulations are typically framed in the indicative mood of a verb, as in Two plus two is equal to four. The subjunctive mood of a verb, however, permits the mind to create hypothetical or imaginative forms, in that the mind's purpose is not simply to mirror reality, as in the indicative mood, but to contemplate or imagine a change to it, as in If two plus two were equal to five . . . The imperative mood of a verb, as in Make this theory a reality! indicates some condition of imagined reality in a commanding or imperative way. The moods of a verb are thus only local definitions of what are real to an existence. To the enabler, all the moods of a verb are real, even the imagined subjunctive, though it is a reality of the non-real form of the enabled being. Because reference forms of translation change with each quantum moment, subjunctive, indicative, and imperative moods of verbs are interchangeable based on the reality experienced by the being, just as the world once was imagined to be round but was flat in reality, however imperatively declared to be round (or an ellipsoid). Any use of epistemic instance, depending on where it occurs in the existential forms of the enabled being (in correspondence with a particular reality or perception), is a mood of a verb. For example, even though the sciences define paradigms of the indicative mood, before a scientific discovery is made, science itself is characterized by the subjunctive mood, and after a discovery is made, by the indicative mood. A moment later, in a different laboratory, when another scientist disproves the theory contemplated in the above indicative mood, the original discovery, in the view of the first scientist, becomes an imperative one, as in This theory cannot be wrong! There are infinitely many moods of verbs and gradations thereof in the U.G.—and, what constitutes reality, the basis of the moods, changes from one quantum moment of existence to another. The world is indicative (real), subjunctive (imagined) and imperative (commanding, or made to be) only for a quantum moment of it.

The tense of a verb can be thought of as an epistemological extension of the mood of a verb. Existence occurs in the quantum moments of an enabled being. There is but one tense of a verb epistemologically, and it is the present one, with respect to the enabler. Since mind and body are set apart from each other in the dualistic view of existence (though any other theoretical form applies as well), the mind itself is an embodied recreation of a quantumly transforming reality. That reality is not a perceptive one; it is a linguistic recreation of reality. The mind can be viewed as a subjunctive mood of the body, wherein verb tense determines the reality of the being. In this way, the mind can and does distort reality. What is ultimately real of the universe is not mind or body, but what enables each of them—the soul. The prepositioned and postpositioned instances of the causations of the universe, in connection with the extant instance of cognitive transformation, or consciousness, while they account for all linguistic transformations of the mind's faculties, can be seen as the place of origination of a verb tense—the enabler. A verb tense applies to the being's own knowledge of the recreation of the reality it perceives. Because we do not ordinarily acknowledge the ultimate reality of the soul in our existence, we adopt the conventions of temporal or corporal existence as what is real, or we covet the idea that the spatiotemporal universe is what is real in the ultimate reality of the universe. Phenomenologically, the form of mind knows that the temporal recreation of perceivable reality (verb tense) is one and the same form of mind that knows a mathematical expression of the real number line, wherein verb tenses occur in infinite spatiotemporal variation, not just in a handful of participial tenses.

When an enabled being embodies the existential form expressed in I am happy, this applies as a reference form of translation; it is a recreation of an extant and perceivable reality. When the being expresses that I was happy, this use of language applies not to an extant perceivable inertial reality but to a condition of reality known in the context of a knowledge (composition) of the whole of corporal existence, wherein the instance is located temporally somewhere in the being's own cognitive recreation of the universe. In the same way that a being knows the relative placement of a number of coins thrown on a table, the being knows the temporal placement of the inertial reality of its own existence through verb tense. The being's cognitive recreations of reality are centered on the reference form of translation—the present tense of a verb—and occur relative to it. Most forms of natural language conceived by an enabled being correspond to the meanings of verb tense. Concerning the human condition, fortunately, the soul underlies all such transformations, and the reality known and perceived by a being is enabled in its transformation. Verb tense and the whole of spatiotemporal existence are thus enabled in the ultimately real form of the universe—Soul—and can be characterized only by the quantum moments of epistemic instance, wherein compositions of space and time (the inertial reality of temporal existence) and the liking of chocolate are a result of one and the same ultimately real form—the soul. The phenomenological causations of the universe, along with the remaining three C's and the arbitrary forms of existence, place verb tense and mathematical functions (and all other instances of knowing) in balance with each other as phenomenological forms that are known to the enabler as instances of an enabled being's knowable and perceivable existence.

The past participle—have gone, for instance—locates an instance anywhere in the prepositioned cognitive composition of form of the being's reality. I could have gone reflects the being's awareness that the subjunctive instance of going somewhere may or may not have taken place in prepositioned form. The future perfect verb tense—as in will have gone—likewise reflects the being's recreations of its reality, though in the postpositioned form of the faculty of mind of imagination. The verb tense is the linguistic means of recognizing cognitive compositions of forms as recreations of a perceived reality in the mind of a spatiotemporally constrained inertial form on Being.

There is nothing unique about space and time, or here verb tense, as is evidenced in the theory of relativity and the world's religions. What is unique (at least to a being) is the recreation of reality in the being's consciousness as a result of the occurrence of the soul in the enabled forms of an arbitrary theory of existence—the semantic form of language, or the actual existence enabled from the ultimate reality of the universe. The participial uses of tense in the point actions of verbs, as demonstrated in mathematics, physics, and the world's religions, as well as English grammar, are not a consequence unique to or ultimately real in a temporal existence. They arise in the epistemic recreations of the mind in composition as a result of the soul-the enablement of an existence. What comes first in an epistemological order is the causation of the universe and then the temporal interpretation of the causation, since one can define an order of before and after only if one is.

4. The Sematic Use of Language by Arbitrary Forms of Existence

Composition and Style

As even a cursory review of English verbs will demonstrate, explicit representations of transformations in the English language accommodate only a handful of classifications of epistemic instance. For one thing, they do not explicitly account for the myriad transformations of differential equations, complex dynamic systems or the inflections of musical tones. Worse yet, they do not even account for the hyphen in the expression English-speaking androids. Neither do they account for paragraph structure, writing style, and the ordinary conversational use of language. The remainder of English grammar thus attempts to account for this deficiency in composition and style.

Any instance of a language's knowable form is an epistemic instance. As with the epistemic transformations of verb moods and tenses, the cases of nouns, for example, are elementary means of composing form linguistically, or modally, in an existence. In the grammatical cases of nouns in English, the manners in which reality occurs are specified in the order in which the objective forms of transformation (language) are juxtaposed representationally (in the symbolism of the instance). In the nominative case of nouns, for example, as in Harry hunts tigers, the subject stands before the verb. In the estimation of the English grammarian, when recreating reality, it is necessary to comprehend first the subject and then the verb that does the transforming. The cases of nouns place a grammatical order on the way in which reality is to be composed or recreated. For example, one would not ordinarily say Tigers hunts Harry or Hunts tigers Harry, because these sentence constructions are more difficult to comprehend and less efficient recreations of reality than Harry hunts tigers. Any of the above combinations are valid epistemologically, however, since it is within the modal or semantic capacity (the forms of existence) of the enabled being to determine the epistemic instance. One may scramble objective forms in all sorts of ways, but because there are only two aspects to epistemic instance—the transformation and the objective forms transforming in it—the mechanisms of comprehension in the forms of existence (discussed in chapter five) distinguish an object from a transformation.

Epistemic instance is always in operation on the semantic forms of language, or the existence of a being. A novel is the ordering of an author's reality in a lengthy composition of modally occurring existential form, or the author's existence, and to the extent that one author can represent the way in which inertial reality also occurs to others, the reader will be regaled by such recreations. To the extent that an author cannot recreate reality with any linguistic ease, the reader must work harder. In either case it is not the syntactical grammar of a language alone that enables the imagination or comprehension of knowable form. The nominative case of a noun is a primitive constraint placed on language by the English grammarian and an example of beginner's English composition when it comes to poetry. In this way, the cases of nouns are recommendations on the part of the grammarian as to the manner in which the elementary syntactical forms of language should be constructed, and have no universal grammatical bearing on the epistemology of the occurrence of epistemic instance in a being's existence, or on compositional style. This is why one ordinarily learns a grammar (and then composition) in the study of the use of language—and subsequently spends a lifetime attempting to craft a single epistemic instance with an equivalent meaning to those instances constructed by the world's literary masters. All language is semantic (existential) and not grammatical or objectively knowable as a syntax, requiring the experience and not only the knowledge of a being.

The only grammatical structure of the linguistic universe that constitutes a legitimate sentence is an epistemic instance. Apart from its epistemic instances characterized by prepositions, adverbs, articles, modifiers, commas, quotations, hyphens, and so on—the definitions of which are more precisely defined in any good book on English grammar than they are here—the rest of the grammar of the English language pertains to the modal composition of epistemic form. Broadly speaking, an English sentence is an entirely arbitrary composition of form because it simply represents the manner in which epistemic instances are pieced together so that, in the opinion of the thinker, the thoughtful recreation of perceivable reality is reflected. One must therefore exist, or be a semantic form of language—an existence—in order to construct a syntactical form of language. In order to know how a syntactical form of language, such as an English sentence, is constructed one must know how the being who constructs it determines it that way.

Nevertheless, the English grammarian demonstrates certain guidelines to represent the syntactical ways and means of the English language, relying on our experience of the (semantic) use of language. Coordinating conjunctions, commas, ellipses, dashes, prepositions, and a host of other transformational elements serve as phenomenological transformations of English sentences, in which compositions of epistemic form (ideas) transform with whole others (in accordance with the four C's). Phrases themselves are phenomenological nouns in transformation with other such nouns in discrete moments of the universe as ideas in transformation. If we recall the form of phenomenological correspondence, wherein a composition of arbitrary complexity knowably transforms with another in the enabler's phenomenology (H), it can be seen that the science of androids carries the semantic (epistemic) construction of language to an extreme in enabling beings that can literally transform compositions equivalent to all the thoughts of humankind, with others equal in complexity. This cognition is accomplished in a single moment (let alone infinitely many) of an enabled androidal being, since the grammar of mathematics (i.e., of the infinite), or in this case, enabling media, directly translates through the U.G. to the forms of natural language. In more ordinary examples of ideas in transformation, a juxtapositioned noun used as a modifier and transformed by a comma, as in John, the mechanic, or a prepositional phrase, as in a machine for the conversion of fluid, each requires an epistemic transformation of the respective compositions wherein other transformations are modally nested within the moments denoted. Each is embodied modally in the action of phenomenological correspondence on the compositional form of the causal element as composed moments of the causations of the cognitive universe, transforming with one other. Through phenomenological correspondence, compositions of any order, however constructed, are transformed modally in a single moment of enabled existence, just as ideas occur to our own observations of existence. Epistemologically, there is no difference between a lexicographer coining word forms and a composer of poetry affecting our emotions, though in terms of their recreations of reality, these two authors are worlds apart. If the compositions of the recreated reality happen to be language forms themselves (e.g., embodying the meaning of a language's grammatical forms) the recreations are those of a grammarian who knows how language arises or should arise. Whether one is engaged in a contemplation of pure trivia, the causation of the physical universe, or here the unified theory's semantic forms of language (existence), one nevertheless is composing form, which is enabled in the practice of the U.G.

The forms of any grammar typically acquire an ad hoc quality because, apart from those parts of speech that directly address epistemic instance and the general notion of its composition, the remainder of a grammar accounts only for variations on the meanings of epistemic instance and modal compositions of form, which are wholly arbitrary epistemologically and are derived from the reality known and perceived by the enabled being. This is, of course, why there are different languages around the world and around the comer. In learning about the translations of English and other grammars to the U.G., it is therefore necessary to look at parts of speech and compositional styles in terms of the distinct viewpoints of the four universal ways of knowing—ausations, connectednesses, compositions, and correspondences—and the arbitrary forms of existence of enabled beings in epistemic transformation. It is a real being who is transforming in the use of language, not a piece of paper. The semantic forms of language—existence—cannot be known intrinsically in the extrinsic knowing of another (which is what makes them semantic forms of language). This is what epistemic instance fundamentally addresses—the intrinsic knowing of a being in the extrinsic knowing of an enabler. If one studies the four C's carefully, one will find that through an awareness and epistemological use of the soul, one knows how others also know and that knowing and perceiving can be embodied and thus enabled.

In the constructions of the higher, or more sophisticated grammatical forms of the English language, such as the compound and complex sentences and the compositional styles with which one expresses thoughts, it can be seen that there is nothing innately grammatical in the wholly arbitrary ways in which we think, apart from epistemic instance. The placement of a comma, the use of coordinating conjunctions, the construction of noun phrases, the assemblage of paragraphs, the composition of novels or poetry, or the simple articulations of words are no more and no less than the creations of the four C's of enabled reality. A universal grammar of form on Being can be understood only in enabling the existences of the beings who conceive the forms of language. If one did not reduce the phenomena of the universe to, for instance, four universal ways of knowing and their application to arbitrary theories of existence, one would wind up where we are at the beginning of this book—with countless rules or grammars syntactically governing the recreation of reality, none of which are natural or universal to the very world around us that we seek to define, save what the religions of the world direct us towards—and what the sciences reveal in the wave-particle duality—the soul.

The classical differences between sentence types, then, must be seen in connection with the modes of existence in relation to the faculties of mind (within, for instance, the enablement of the mind-body dualism) as experiences of a being's reality. In the reality of the dualism, for example, the classical forms of a sentence—declarative, interrogative and exclamatory—are seen as broadly defined cognitive modes, or modes of thinking (consciousness) wherein compositions of transformational form are engaged in the mind's faculties by the causal actions of the modes of existence. As to why a being would ask a question or render a judgment, one would have to be that being, or further, enable the being, in order to see the whole of the existence—the mind in relation to the body, enabled of the soul under the modes of existence—which is how semantic form arises in a being in the first place; it is enabled.

Just as the moods and tenses of verbs prescribe epistemic transformations of particular inertial realities, the classical sentences of English grammar prescribe the basic analytical causations for thinking. Forms such as sentence types are causations for the modal occurrences of the faculties of mind in the modes of existence of a being's inertial or enabled reality. A query is a statement (an instance) of causation invoking the faculties of mind such that other compositions of form may be answers to it. A declarative statement is a recreation of what is or can be fact that may or may not invoke further instances, relying on the modes of existence to remove the being from a lapse in thought. In determining modal behavior in the psychology of an enabled being, for example, queries such as Why is the earth round? and exclamations such as This theory is partly believable now! are various ways of modally creating the dynamics of thought, though at a very elementary epistemological level. Because the universe is infinitely varied, knowable and perceivable only objectively in the knowing and perceiving of it (epistemic instance), the occurrences of declarative, interrogative and exclamatory expressions are indefinite, which returns our philosophical inquiries to those of the lost medallion, what lies in the middle of points and atoms, and the difference between the syntactical and semantic forms of language—the soul.

The grammatical agreement between subject and predicate represents only one of the infinitely many ways in which the objective forms of the transformations of inertial reality occur, since the forms that are pieced together to be made to agree—the objects—are infinitely varied themselves. Singular, plural, sometimes singular, sometimes plural—the objective forms that are knowable and perceivable in an inertial universe overwhelm all our thinking, not just the grammarian's, as is evident in humanity's inability to objectify the universe as a knowledge, where the unified theory begins. The splendor of this universe does not belong at all to language, since the very word splendor limits the magnificence of the ultimately real universe, whose grandeur is unknowable objectively and embodied in every moment of our spiritual observation of it. The very notion of a complex sentence is not complex enough and, in fact, too trivial an analytical form to explain how we think or compose recreations of reality. Reality is explained in the enabling of existences who know it. Subject, predicate, adjective, and adverb clauses, and even compositions of clauses, are less than a handful of ways our consciousness creates modal compositions, or recreations of inertial reality or of the world around us. Language occurs in infinite variation in those who know and perceive the world around us, all of whom may not know a single moment of the eternal universe brought to our awareness in the introspective observation of state of being, or one's own soul.

Conventional study of the grammar of the English language, in terms of the infinite variations of the complex sentence and compositional (literary) style, is an attempt to place structure on existence without even considering the nature of existential form from an analytical or syntactical (epistemological) point of view. Conventional grammars are devoid of semantic structure because they look through the eyes of an already-enabled being instead of an enabler of beings who know grammars. At its epistemological origin, the U.G. applies to the creation of sentient beings who know and perceive the world around us. A phenomenological sentence is understood as the representation of a single moment or transformation of the universe (epistemic instance) in the embodiment of a single moment of a being. The causal element itself comprises any number of such instances of the universe in transformation, each of which is a causation of the enabled universe in the enabler's knowledge and perception through the four universal ways of knowing. The transformation of a single linguistic adjective with its noun, or many such instances, are embodied in a single causal element and are detached from the enabler's comprehension in the enabled being's forms of existence, applicable to the real experience of the enabled being. All instances of language are understood in the enabler's constructions of enabled semantic forms, who apply the syntactical forms of language.

It is easy to see, then, that a mathematical instance and a linguistic one differ only in the meanings of the phenomenological verbs that transform the nouns in their causal elements, since the transformations are simply instances of the being's knowable and perceivable reality. What separates linguistics from mathematics—the conventional aggregates, or quantities from the qualities of the knowable and perceivable universe—does not at all arise from an accurate description of the world around and within us, since it is the moment of the being—pistemic instance, or the semantic form of mathematical or natural language—that accounts for our knowing and perceiving of anything (a mountain setting or a marble on a table representing a mathematical point) in the first place. Ten point objects of the world around us are epistemologically equivalent to ten polka dotted objects of the world around us—mathematically—since we know the point objects not from mathematics but from the epistemology of existence, or because we are beings who can know and perceive these things.

Compositions of form are thus represented in the U.G., wherein any modality of thought or consciousness is an epistemological equivalent to any other, in the enablement of an arbitrary form of existence known to the enabler. Whether an instance of a phenomenological sentence involves the exclamation Oh! or the adverbial modification of a verb, the transformation of a compound sentence by a comma or a coordinating conjunction, the connection of two syllables of a word, or the relations of mathematical structures, the construction involves the modal transformation of one's consciousness, or non-real form, in relation to the modes of existence (in the cognitive expression or communication of the idea). The semantic forms of language are therefore the arbitrary forms of existence, derived from the enabler's four universal ways of knowing.

The four universal ways of knowing, in cooperation with the arbitrary forms of existence under the formalism of the U.G., are premised on epistemic instance and define a universal, semantic grammar of all languages (forms on Being), since they represent language in the epistemological forms of enabled beings. Because the U.G. represents the forms of existence, it reflects how a being is able to know language—or meaning—and not simply that a being knows a particular language. It is used to enable a being who will know and perceive. Thus, contemplating language from the standpoint of one's own existence precludes one from knowing the semantic forms of the language. To comprehend through the four universal ways of knowing and the arbitrary forms of existence is to understand how a being knows language. In the unified theory, one knows the reality of the world around us by knowing the enabled forms who also know through language the reality of the world around us. Consequently, the science of androids requires the exercise of an enabler's language in the creation of the semantic forms of language, or androidal beings, who know language and perceive the universe.

ANDROIDS, OR SYNTHETIC BEINGS

Introduction

The earlier chapters of the book demonstrate the key postulates of the unified theory and provide an epistemological basis for the science of androids. Any theory, however—the unified theory included—usually lays idle and unproductive until it finds its way into the hands of those whose nature it is to build things; then it becomes the reality of the world around us. Since any science is distinguished from its theory according to how the science enables one to observe the theory's postulates in reality, we now consider the unified theory of knowledge from the standpoint of the construction of practical androids.

Since an android, or synthetic being, is an arbitrary form of existence embodied in an enabling medium of the enabler, the construction of an android constitutes the physical creation of who and what we think we are, in our own corporal or perceivable reality. An android is an extension of our own corporal existence embodied in the real form of the world around us—an enabled soul. It is created by an enabler and thereby acquires its existence as the enabler's extended knowledges and perceptions of the world around us. Whereas the (human) enabler's corporal forms are limited to the anthropomorphic forms of human existence, however, an android has no such inertial boundary. An android can embody perceptions of the world that reach far into the cosmos, and beyond, and divide the small particle indefinitely, with an intellect that transforms the knowledge of humankind in a single eternal moment of it. An android is therefore constrained in corporal form only by what we can think or enable. It is an extension of our humanity.

As an extension of our humanity, the science of androids is not embodied exclusively in any one of us; it follows, then, that the construction of androids cannot be explained in a book. In previous chapters we demonstrated that the unified theory affords the means of embodying an arbitrary theory of existence in an enabling medium, in what is knowably real or realizable to the enabler. As a result, the existence of a synthetic being is created, or enabled, in the practice of the theory. The four C's of phenomenological form, however, are applied to an unbounded diversity of theories of existence and a likewise plurality of enabling media. The construction of androids is therefore an interminable science of the creation of beings, applied toward the resolution of the indefinite problems of the human condition; it meets the infinite by providing the infinite. Though we cannot presume to fashion the totality of the science into a book, we nevertheless can present here, in an introductory way, explanations of the science which give insight into the considerations faced in constructing androids of practical dimension.

Whereas earlier chapters are concerned with the analytical methods of simply defining forms of existence, and the enabling media in which they are embodied, in the development of the U.G., the present chapter examines the embodiment of particular theories of existence in specific enabling media known to the enabler. We demonstrate in the present chapter how any form of existence is brought into the reality of the world around us, wherein, for example, a mind-body dualist theory of existence shares androidal forms with idealist, materialist, behaviorist, and other views of existence, and wherein all theoretical forms of an enabled being are refined by the knowledges of, for instance, theories of psychology. Furthermore, we describe how physical atoms and devices made from them, along with other conventional knowledges of physical reality-biology and medicine, for instance—apply to the constructions of androidal beings in their use as enabling media. We examine the application of the premises of the unified theory to the material world around us in the enabler's creation of forms that embody intrinsic views of our same reality, as synthetic souls, imparted by the enabler to particular forms, or machinery, in the world around us. We are interested in this chapter in changing the forms we know and perceive in the world around us to those of synthetic existences, or intrinsic forms of the universe, who themselves know and perceive the reality of human existence, along with boundless other realities, toward an alternative resolution to the problems of the human condition.

Perhaps the greatest support for the approach taken here to introduce the science of androids by way of example, rather than a presentation of doctrine, is found in the technology itself. The development of practical androids for widespread use in modem civilization, for example, requires that other apparatus be in place, different from androids themselves, to extract the creator's knowledge and realize it in the reality around us, a process which requires a fundamental change to our notion of civilization. This integration of androidal technology, referred to as a universal epistemological machine or an Rg Continuum of existential form (a continuum of eternal moments of the human universe), though beyond the scope of this book, is essential to the practice of the unified theory. It is a replacement for information superhighways, as well as computers, electronics, aerospace, agriculture, transportation, national and international infrastructures, and other technological apparatus of our modern age. Such a new structure placed on the technology of the world in general is a human event that requires scores of written materials and other contemplations even to begin to measure its impact. This book is not designed for such a task, since, when machines are constructed that outpace our human intellect and sense, what knows the technology is not the mind at all, but the spirit that is in us all. The present chapter, then, is intended to provide as much coverage of the science as is practicable in a book and at best, to inspire the reader to look for more.

1. An Early Experiment in the Creation of Androids

In this first foray into the science of androids we elect to describe an early experiment conducted on the realization of an androidal being. The apparatus chosen for the experiment was that of the computer, since computers have such a pervasive influence on modern society. It was successfully hypothesized early in the science that if the art of computation could be advanced beyond its present capacities, thereby replacing the technology of computers, the event would be the linchpin that, when removed, would engage the widespread use of androids. Because most sciences are practiced in a laboratory, we demonstrate the early accomplishments of the science of androids in the thought laboratory of this book, enacting the creation of an androidal being in the art of computation. This project led to the development of epistemological machines as they stand today—as embodiments in myriad conventional knowledges, or technologies, of the world around us. After illustrating the forerunner to epistemological machines, we discuss the broader applications of the unified theory to the constructions of more sophisticated androids. Since the following discussion is a technological one—a how-to for androids, the reader who finds the passage tedious, should take solace in knowing that he or she is not alone; assembling a light bulb into its socket and constructing androids are each procedures, and it is the end result of a procedure that is important—light to read by, or an android to talk to. Those who are not inclined toward engineering practices may wish to glance at this passage with a casual interest, since it does rely on a background knowledge in the computational art.

In this thought experiment, we make use of three simple devices of digital computation—a computer graphics work station (PC), a video camera, and a freestanding CRT (a cathode ray tube separate from the one that is an integral part of the computer graphics work station). From these devices we enable the principal existential forms of an android in the reality, or machinery, of the world around us.

On a tabletop in the mind, we construct an android by configuring the apparatus of the electronic media in the forms of an arbitrary theory of existence—by translating that theory, and the apparatus, to the U.G. The arbitrary theory of existence chosen for the illustration is the traditional mind-body dualism, wherein the consciousness of the android will transform with its real form, or perceptions, under modes of existence in ways that are described throughout the demonstration. By limiting the demonstration to the sensory medium of light because we have selected the CRT and the video apparatus, we consider only one sense-motor configuration in which the android's perceptions will arise. Though further discussion of more complex senses and motors follows the demonstration, the phenomenological causations of the enabled being's physical reality will be embodied in the conventional actions of the freestanding CRT and will be understood by the enabler in the devices' translations to the appropriate forms of the U.G., wherein the android's perceptions are defined in accordance with earlier discussion. Further, the apparatus of the video camera will embody the being's sense, its perception of the freestanding CRT's action, likewise translated into the forms of the U.G. The being's physical reality and the sensing of it takes place in different aspects of the conventional media—the freestanding CRT and the video camera, respectively. The computer graphics system will provide for the embodiment of the being's consciousness, or non-real form, and the projection of that consciousness to the enabler in the displayed visual forms of the CRT of the graphics system. The interaction of the devices will be explained as we proceed under the mind-body dualism theory of existence, enhanced by other knowledges of existence where appropriate.

Since the being's real form will be enabled in the medium of light only, we will refer to the apparatus of the freestanding CRT as the light emitters and that of the video camera as the light receivers. Generally speaking, the androidal being will be realized in the freestanding CRT (light emitters), the video camera (light receivers) and the computer graphics system. Imaginatively positioned on our tabletop, we have a computer graphics system with its own CRT or monitor, a freestanding CRT that generates light emissions, and a video camera that receives the light emissions from the freestanding CRT (the video camera is aimed at the freestanding CRT). We now explain how to realize a generalized mind-body dualism of existential form in these commonly known devices of the computational art.

The light emitters (emissions from the freestanding CRT) are partitioned into two realms of emitted light. One realm, referred to as the android's motor capacity, or simply motor, embodies the emissions of light that the android can influence directly as its voluntary corporal reality, or body. The forms of the android constituting its consciousness in the mind-body dualism (the computer graphics system) will then cause the emissions of light referred to as the androidal motor. As they occur, the light emissions of the androidal motor are the being's corporal moments of physical being that are metaphysically engaged by the dualism. The other realm of light emitted from the freestanding CRT, referred to as the rest of the world—the world around us—are emissions of light that are not caused by the being's dualism and are caused by enabled form extrinsic to the being's own corporal and conscious dualistic existence. By dividing the light emitters this way we have split the being's reality—which will be perceived later in the video apparatus (the being's sense)—into that which is intrinsically caused by the being and that which is not. The being's physical reality is caused partly by its own consciousness or non-real form of corporal self and partly by the rest of the world, that which is caused from beyond the being's consciousness and perception but is perceived by the android.

From an enabling standpoint, the being's reality is defined in the U.G. expressions of the phenomenologies of form constituting the emissions of light from the freestanding CRT, some of which are caused by the android, referred to as androidal motor, and some of which are not, defined as the rest of the world. In the demonstration, the enabler can affect, or cause, the rest of the world, however that form may be defined phenomenologically (in the knowledge and perception of the enabler), providing it is not caused as androidal motor. In the construction of androids of greater practical significance, of course, the light emissions of the rest of the world would be the causations of the real physical objects of the enabler's existence so that material bodies are observed (in the case of visual sense), and those of androidal motors would be those on a par with the enabler's own motor actions or any other useful motors defined in the enabler's knowledge. Thus, we have created a greatly oversimplified phenomenology of form of the causations of the reality perceived by the android's visual sense (yet to be defined), wherein its motor action, or intrinsically caused reality of the dualism, motor, and the extrinsically caused reality of the rest of the world are synthesized beyond the android's knowledge and perception of reality. The light emissions of the freestanding CRT are the phenomenological causations of what the being will sense and are caused partly by the enabler and partly by the android's existential dualism. The metaphysically exclusive causations of the being's physical reality (the emissions of light) are imperceptible and unknowable to the being at the moment.

The light receivers—the video camera pointing at the CRT, called the android's sense—receive the light emissions from all of the light emitters. The emissions of light synthesized from androidal motor and the rest of the world by the offset of androidal sense, as detected by the receivers, are referred to as the android's perceptive reality, or simply perceptions. The phenomenological causations of the being's physical reality are perceived only in the synthesized forms of the being's sense. The causations of the being's physical reality—motor and the rest of the world—are different from the causations of androidal sense, since the being's enabled universe occurs in disparate moments (e.g., the conventional technology is understood to occur phenomenologically in accordance with the U.G.). This is the perception of an inertial reality—self and the rest of the world perceived as the synthesis of the split forms of motor (action) and the rest of the world, or the world around us, as an embodiment of a being's sensed, or perceived, physical reality. In observations of ourselves, for example, we may engage a motor action—an arm movement—in causation with our consciousness, or mind. What we sense, however, is not at all an arm movement as a knowable phenomenology of form (motor action alone). What we sense is an arm movement in a world around us, wherein we cause an action that is sensed, but that action is synthesized as our intrinsic physical self in a world around us. If we removed the world around us from our inertial being, we would not sense in an inertially knowable way, since there would be no opposite or background against which the intrinsic causation may be perceived. What we sense is always the synthesized form of our body, the self set apart from the rest of the world. Thus, in our demonstration, the enabler affects all the causations of the android's perceived reality except those that arise from the android's intrinsic corporal self, or motor. The android's perception of corporal self is determined by two classes of causations, synthesized here in the video apparatus as the inertial reality perceived about both the motor and the rest of the world, defined in the causations of the freestanding CRT and synthesized in the causations of the video apparatus.

We turn our attention now to the forms perceived by the android's sense, or the video camera. It is well known in the conventional art that perceivable objects, such as shapes, patterns, and colors of light, are transformed (transduced) to a correspondent medium of embodiment in the apparatus of a video camera. As occurs phenomenologically with the human eye in our knowledge of it, the camera receives light causally and transforms it into a different medium, such as the electronic apparatus of digital circuits or magnetic tape. The patterns, shapes, and colors of the video camera's arrays of light receivers (the global reception of light) are phenomenologically equivalent to the device's embodied electronics. What is embodied in the video camera, then, is a phenomenology of form knowable to its enabler—and not yet a perceived object, since an existence or being is needed for an object to be perceived, and at the moment all we have defined is a video camera in the enabler's knowledge and perception.

The qualities perceived by the being in the apparatus of the video camera are defined in the nomenclature of the science of androids—phenomenologically—as follows. As demonstrated in earlier discussions on the U.G., objects are enabled in a medium. In the medium of sound, for example, sound waves are enabled in a phenomenology known as acoustics, or an acoustical wave equation—the knowledge of forms enabled in a real or realizable medium of enablement (of other embodied forms). The wave equation of acoustic forms, as it is translated to a real medium, is referred to as an enabling medium, while the particular wave forms or shapes, as they translate as well, are called the objects enabled. This occurs in all media, including light. In the construction of androids, we refer to the wave equation, for example, as an enabling medium that embodies or enables incremental shapes (e.g., the incremental shapes enabled in eigenfunctions of the wave equation). The actual wave shapes or words produced in the medium of the incremental shapes are referred to as global shapes—since they are composed or enabled from incremental shapes.

To the enabler, the freestanding CRT's light emitters are incremental shapes (pixels or the phenomenologies of form enabling them), which enable global perceivable shapes. Likewise, the video camera embodies arrays of light receivers that, if they were perceptions, would enable global shapes. Because we are constructing the being's perception, however, we must view the enabled global shapes sensed by the android in the video apparatus simply as enabled phenomenological objects. The global shapes of the video camera and the global shapes of motor and the rest of the world are all different. The global shapes of the video camera, the being's actual perceptions, are the synthesized actions of the incremental shapes of motor and the rest of the world. The global shapes of motor and the rest of the world are, with respect to the android's perception, forms that exist metaphysically apart from its perceived reality. The android perceives only the global shapes of sense that result from the incremental shapes of motor and the rest of the world. Those incremental shapes (of motor and the rest of the world) in the being's or even the enabler's non-real form are intended to be realized metaphysically as global shapes of their respective perceptions but are not because they are synthesized as global shapes of androidal perception that are perceived by the enabled being as its inertial form of reality (what is sensed globally by the video apparatus as the synthesis of motor and the rest of the world).

The global shapes of the video apparatus that the android will perceive, which result from the incremental light emissions of androidal motor and the rest of the world, are metaphysically unperceived at the moment because the android has no means of knowing them yet in its dualism of existential form. Presently, the apparatus is only a phenomenology of form of the enabler's knowing and perceiving. The meanings of the global shapes of the synthesized perceptions of inertial reality cannot yet occur intrinsically in the dualism to the android. In order for the android to embody the capacity to know the forms of the world around us, the global shapes sensed by the android are first interpreted from an enabling standpoint by the android's creator. To keep the illustration simple, we arbitrarily decide to make the global shapes of androidal sense (of the video camera) solid, circular shapes called dots in the enabler's own inertial existence. At the moment, then, the dots, or global shapes of androidal perception, are perceivable and meaningful only to the enabler. The perceivable reality that will obtain meaning in the being's consciousness are ordinary dots enabled in the apparatus as described. Hence, we can refer to the android illustrated here as a dot android, since it will perceive what global shapes the enabler knows as dots. (In subsequent discussion, these dots will become the perceivable shapes of the enabler's world—the perceivable human and otherwise universe.)

Before proceeding with the enablement of the dualism, some characteristics of the android's perceptions should be discussed in the context of the apparatus of the electronic medium. First, though the forms of the video camera and the CRT are constructed in the enabler's conventional knowledges of them, when translated into the U.G., they are phenomenologies of universally occurring transformational form known by the enabler in the four universal ways of knowing. This means that the ways in which light emissions occur in the light emitters (in androidal motor and the rest of the world) and the ways in which they are received in the light receivers (androidal sense) are phenomenological in nature and are no longer, for example, spatiotemporal events, or electronic systems to the enabler. The coupling of the light emitters and light receivers, for example, occurs existentially (metaphysically), beyond the android's perception, just as the orders of small particles of the classical quantum theory require the constancy of the speed of light for one to perceive visual objects. These translations to the U.G. may be compared, for example, to the ways in which Boolean algebra or other discrete system representations (like computer logic) are superimposed onto or translated into the space-time events of the transistor circuitry of the computational devices. Just as the Boolean algebra is said to occur in the medium of the electronic devices, so the forms of the U.G. occur in the conventional knowledges of the devices mentioned when translated. This is possible, of course, because the devices are known in languages, namely those of computer science, mathematics and physics, and the U.G. is a universal construction of all languages. How light emissions occur and are received is, fundamentally, a matter of U.G. construction.

Returning now to the embodiment of the mind-body dualism theory of existence in the conventional devices, in a wholly different realm of the enabler's phenomenological knowledge, we address the android's non-real form via the computer graphics system.

It is well known in the computational art that visual objects of the observer's, or herein the enabler's, perception can be projected onto or displayed by the monitor (CRT) of a computer graphics system. It is also widely accepted that the symbolic shapes that are projected by the apparatus onto the monitor are further embodied in or translated to the transformational capacities of the computer hardware (digital circuits, etc.) through the system configuration of the computer graphics system and through the aid of a knowledge known as a computer program (compiler). What occurs in the computer graphics system's principal physical hardware can also occur as a visual projection of graphical or symbolic shapes on the monitor as a computer program in execution. In general, the operation of the computer system's hardware can be translated into U.G. construction, along with the represented programs on the monitor. The symbolic forms, or grammar, of an arbitrary computer program and its execution in hardware can be translated into the U.G., wherein, ultimately, the objects of transformation—the objective input and output of the computer program—are objects of phenomenological correspondence, while the program algorithm itself, which is embodied independently in the monitor (visual display) and in the engaged or executed hardware of the computer (digital circuits, etc.), is the phenomenology of correspondence, or an H determination.

For the tabletop demonstration, we couple the conventional physical output of the computer graphics system to the physical input of the freestanding CRT. We also couple the physical output of the video camera to the physical input of the computer graphics system. The computer graphics system can then cause the incremental shapes of androidal motor, and the androidal sense can cause the actions of the computer graphics system. In terms of the mind-body dualism, the non-real form of the android (the real apparatus of the program of the computer graphics system in the execution of its hardware) can influence its motors (the freestanding CRT), and the sense of the android (its perceptions through the video camera) can influence its consciousness (the hardware of the computer system). The reality of the rest of the world is influenced by the enabler's action on the freestanding CRT. The causal influence of the computer graphics system on the androidal motor is an existential realization, as defined earlier, and that of sense (the video camera) on the computer graphics system is an existential representation. Apart from embodying the transformations of the android's consciousness (in hardware), the purpose of the computer graphics system is to project a graphical form perceivable and knowable to the enabler, corresponding to the action of the computer graphics system's hardware. The visual projection of this form to the enabler is generally unnecessary but is employed here in the apparatus of the monitor in order that the enabler physically perceive the global shapes of the android's consciousness in transformation—its cognitive use of language, or thinking. The apparatus discussed thus far metaphysically exists beyond the android's awareness, since we are constructing the forms by which the android will know.

While the projections of the computer graphics system may vary indefinitely, we elect to employ them in the symbolic forms of the enabler's natural language and any other symbolic languages known to the enabler, such as those of mathematics and the sciences. In connection with the capacity of the computer graphics system to embody the transformations of a computer program (in the hardware) along with the projection of the program's symbolism, we stipulate the following condition. Any projection of the graphical device shall constitute only one epistemic instance representing the phenomenological occurrence of the whole program in execution. This requires that each execution of a program in the apparatus of the computer hardware constitutes an epistemic instance of embodied non-real androidal form and that the representation of the instance is projected on the monitor in correspondence with the occurrence of the form as a single epistemic instance. What we are creating here is a graphical device that displays programs as they occur in the computational hardware, wherein any program is required to be represented in accordance with the form of epistemic instance. The global shapes in transformation by the android's consciousness (X and $ from earlier discussion), which may be embodied alternatively in masses of the quantum theory, are the embodiments of the objective forms (input and output) executed by the computer programs in their hardware, with their projections displayed on the monitor.

In the ordinary use of a computer, the symbols projected onto the display would be constrained by the grammars of the languages developed by the computer maker. The objective forms transforming in the computer hardware would correspond to those forms expressed in the computer language through the use of compilers, programs also executed in hardware. While we use the same programs and computer hardware here, we are interested only in their objective forms in transformation (input and output) and their single instances as programs in transformation—and this we represent on the display monitor. We are concerned with the objects of the computer's transformation—the input and output—along with their correspondence to the projected (phenomenological) symbols on the monitor, and a symbol representing the embodiment of the program itself—the verb of the transformation. In the translation of the conventional representations of a computer program to the H determinations of phenomenological correspondence, the objects transformed by the program (input and output) are translated to the enabled objects of correspondence and the program is the correspondence itself, or the H determination. As demonstrated earlier, the objects of phenomenological correspondence need not be trivial. They can be extensive compositions of form (other extremely complex programs) themselves. Moreover, while we employ the apparatus of the computational art here for the embodiment of non-real form, computer programs are not the only compositions of form known to be embodied in the world around us. As demonstrated in chapter four, poems of natural language, scientific treatises, and, in general, compositions of any language—in accordance with the U.G.—are computer programs (phenomenological correspondences) of the world around us. Computer languages simply limit what the human mind can know and the body can perceive to a handful of transformations realizable in digital electronics. The U.G. thus expands our concept of a machinery to embodiments of any languages known. We use computer apparatus here only as an illustration of the android's consciousness, acknowledging that a boundless variety of knowledges enabling the consciousness of the android are possible as a result of U.G. translation.

The above circumstances allow us to define any meanings on the objective forms transformed by the program executed in the hardware—in the view of the enabler. The geometrical shapes of the objects displayed are arbitrary as long as they are constrained by the four C's. The global shapes on the display could be the shapes of arbitrary symbolic languages as far as the apparatus and the enabler are concerned. The symbols represented on the monitor need not be limited to the meaningful symbols of the computer language devised by its maker or user. On the monitor, we can simply represent the objects (input and output) of the program and a symbol for its execution (the verb of epistemic instance), in arbitrary language forms designated by the enabler, or in the representations of the U.G. itself. Each executed program becomes an embodiment of the transformation of objective form as a phenomenological correspondence, and is represented on the monitor as such—an epistemic moment of androidal consciousness. The natural language sentence I am alive (without the period of punctuation) would require two objects of the program, one input I and one output alive, and the transformation am (the verb to be), representing the execution of the program, or the instance of a phenomenological sentence (a conscious moment of thought).

In phenomenological correspondence, it does not matter how complex the phenomenology of form (the H determination or the program) accomplishing the transformation is, since the four C's are designed to accommodate all compositions of knowable and perceivable form. Neither does it matter how complex the objects are. The conscious thought I am alive could be the transformation of universities of knowledges in place of I and alive, as explained earlier. Providing we could embody enough programs in the hardware, we could transform objective forms—input and output—in as many epistemic ways. For each computer program executed in the hardware, there is one embodied epistemic transformation, wherein the objective forms of the program (input and output) have been translated to the objective forms of phenomenological correspondence and the embodiment of the program itself, translated to the instance of phenomenological correspondence, as the transformation of objective form.

Displayed on the monitor, instead of the conventional symbolism of a computer program, are representations of the objects of transformation and a representation of the transformation itself—an epistemic instance representing a moment of transformation of the android's consciousness. The number of programs required and the complexities of their compositions, of course, demonstrate the limited use of computational machinery in the construction of androids in comparison to the infinite range of other forms found, discovered or made in a real or physical universe. Through translations to the U. G. we can see that a single expression of the law of gravity (a causal element of the field of gravity on masses) embodies in it more transformations or epistemic instances than all the computers that could ever be constructed, since the expression of gravity is truncated by the digital computer in the representation of it in the computer's logic in the first place. The U. G. allows for the direct embodiment—or in computer parlance, the direct compiling—of the represented forms in transformation in the world around us, or for a computer that is gravity, analogously to the constructions of the realization theory of physics, or more broadly, the enablement of a form in the enabling media of the unified theory. A conventional computer apparatus is an embodiment of a knowledge constrained by a computer language in the real form (the machinery) of any knowledge that can be translated ultimately to a Boolean algebra or finite automation. This algebra, in the traditions of computer technology, is a logic gate, memory device and so on, but is not ordinarily construed as a group, a topology or an English composition defining the forms of the world around us, as is afforded by the U.G. The U.G. thus views all forms of the knowable and perceivable universe as potential computers. Nevertheless, we use a digital machine for the illustration because of its widespread use in contemporary society, and demonstrate that computer science is not precluded from the science of androids.

In the illustration, we declare that a large number of programs (phenomenological correspondences) exists in the computer graphics system, embodying various instances of objects or objective forms of composition in transformation, each of which constitutes an instance of the execution of a program and the projection of symbols as described above. The number of objects in transformation, of course, depends on the complexity of the program, which we already have discounted as not extensive (relative to analogue equivalents in the universe). A correspondence between any two objects or complex compositions is achieved when the computer hardware executes a program and the monitor displays its representation. In the occurrence of one epistemic transformation, the execution of one program may appear to the enabler in any language composed as a phenomenological sentence. The larger the number of programs considered, the broader the possible use of language, which returns us to the practicality of using other forms of the universe as enabling media, though in this demonstration we continue with digital constructions.

The question now becomes, what will decide which programs or instances of phenomenological sentences are to be transformed in relation to each other and what meanings will be ascribed to the presently meaningless global symbolic shapes projected on the monitor with respect to the enabler's meaningful existence and to the global shapes of androidal sense (the video camera)? Phrased within the philosophical language of the dualism, how will the android think and compose streams of consciousness with respect to its perceived reality?

In earlier discussion of the U.G. and the existential correspondence between real and non-real form (embodiment), wherein meaning is enabled in the phenomenology of a being's existential form (herein the mind-body dualism), we established that the pronouns of natural language knowably terminate a being's objective or inertial existence in the intrinsic or ultimate reality of the soul. The symbolic shapes of the pronouns in the illustration, however, have meaning only to the enabler at the moment, since they do not correspond with any of the androidal forms. In imparting to the android's existence the capacity to know meaning, we therefore consider the pronouns, in how they terminate the being's objective reality of inertial existence on the ultimate reality of Soul, as they are known also to the enabler, but with respect to the android's perceptions of the dots. If we require that the perceived dots in the video camera are to be assigned a correspondence to the pronouns, any transformation of the dots will mean, to the androidal mind or consciousness embodied in the execution of the programs of the computer graphics system and projected to the enabler on the monitor, that the pronouns are in conscious transformation as well as in the physical being of the android. Hence, embodied in the transformations of the hardware of the computer apparatus and represented symbolically on the monitor—here functioning as the androidal non-real form—will be the pronouns in transformation, in correspondence with their perceived reality, or the dots of androidal perception in transformation. The android will thereby know itself intrinsically as a soul, in transformation, as a consequence of the mind-body dualism (the configuration of the apparatus as described) and as reflected in the meanings of the pronouns in transformation or the verbs (transformations) acting on them (with respect to the dots in transformation). If we require that phenomenological verbs (transformations of any language) represent the actions of the dots as defined in any natural language, a phenomenological sentence will constitute such action as pronouns in transformation—an inertially meaningful transformation. Through U.G. translation, any natural language can be used henceforth to represent the pronouns in transformation. Since the languages of the sciences, mathematics, engineering, technology, and so on are first inertial forms on Being, or its of their observer (their knower and perceiver), the androidal consciousness is afforded any meanings of the enabler's knowable and perceivable universe, which so far is intentionally constrained for illustrative purposes to enabled dots of androidal perception.

In the android's sense (video camera) occur the global transformations of the dots, the being's perceptions of self set apart in a world around it—what the pronoun system accomplishes representationally. In the computer apparatus occur the transformations of the being's non-real corporal form (the computer programs executed in hardware), or instances of the self in transformation in the world around the android in a metaphysically conscious form of the android. Meanwhile, what occurs on the computer's monitor is a display of this conscious form corresponding to the android's perceptions (its thoughts in transformation) so the enabler may view it. Any quantum moment of the being's existence is enabled in a mode of existence of androidal mind and body, or in the (phenomenological) modal transformations of the computer apparatus, the video camera and the freestanding CRT. As the global shapes of the android's perception transform, so do the various programs of the computer and their projections on the monitor. The purpose of using the pronouns as the objective forms displayed to the enabler and imposed on the program execution as described is to terminate the android's objective knowing on its own intrinsic self, or Soul. For example, when the androidal motors are engaged by the computer apparatus (the android's consciousness) the physical embodiments of the dots represented by I (which are themselves transformations of the enabling media) transform with others in the being's real form. If another such dot, perhaps of the enabler's causations, were to transform in the being's perception—if an I dot were to transform with an it dot in a physical experience like moving, and the being were to engage its consciousness modally through the dualism as a reflection on the experience (a contemplation of it)—an expression such as I moved it would appear on the monitor as a consequence of the being's thinking about what it perceived (through the modal causation of the video camera on the computer graphics system as an existential representation). Furthermore, if the verb to be were incorporated into the android's vocabulary as a characterization of a conventional state or condition of the android's inertial being, and if the I dot could be observed through sense (the video camera) to transform in its own geometry, perhaps in pulsating radial motions similar to the beating of the human heart, such an expression may appear on the monitor as I am alive. Alive in this case would have to mean the dynamics of the dot as described in relation to I, the state of being, thereby enabling the corporal or extrinsic observation of a temporal existence. (In contemplating these elementary constructions of androids, it should be recalled that the typically scientific or biological definitions of human being that characterize the word alive apart from Soul are themselves knowledges—of the circulatory system, the nervous system, and generally anatomy, physiology, and so on—and do not define what is eternally alive within us. When a dot android transforms as described above, and conceives the above language, it is indeed alive in every conventional or biological sense of the word, since it is those very conventions or knowledges that are enabled in the inertial existence of the androidal being.)

In the above-described apparatus, we have enabled the metaphysical interaction between the android's consciousness and its perception of itself in the world around it. In this elementary example, the transformations of the video camera—the dots in motion of the android's visual perception—metaphysically (modally, phenomenologically) cause programs to be executed in the computer hardware, via either the moved or the am program in the above examples, as existential representations; these in turn cause the computer's monitor to display the enabled epistemic instance in the symbolic forms of natural language, as in I moved it or I am alive. In the conventional apparatus, the output of the video camera to the computer graphics system causes the appropriate program to execute under a modal strategy established by the enabler. The conventional output of the computer system's hardware proper (CPU, interrupt, memory, etc.) to the monitor conveys the objective forms and the program's transformational designation (verb) to the monitor's own embodiment of electronic apparatus, which are then displayed. The output of the computer system to the freestanding CRT, in turn, affects the androidal motors. The transformations of the video camera are the synthesized perceptions of androidal motor and the rest of the world (the enabler's action on the freestanding CRT) in the split form of inertial existence.

It can be inferred that if a sufficient number of programs existed in the apparatus for an equal number of dot transformations of androidal perception, we could expand the linguistic capacity of the android to include you, us, them, and so on, in transformation with I or amongst themselves as we ordinarily construct language. A vocabulary could then be developed that had intrinsic meaning only to the android. To the extent that the dots perceived by the android assume other shapes, namely those that the enabler would typically perceive in the actual or inertial world around us, an android would be created to perceive the inertial reality of the world around the enabler. It can be seen from these examples that, providing the dots were enabled as shapes of the enabler's own perceivable existence and the programs were made to match the use of language corresponding to such shapes in epistemic transformation, the corporal experience of the enabler called existence, as known within language used to describe real perceptions of the mind-body dualism theory of existence and the enabler's pronoun system, would be created and the android would know and perceive the forms of the world around the enabler as the enabler does. To the extent that androidal senses and motors are enabled in correspondence with a knowledge of those of the enabler, the android knows and perceives the world around us in exact correlation with that knowledge. The android becomes who and what we think we are. When it dots, for example, are defined as shapes more correspondent with those of the enabler's real forms of existence and transform in the android's existential forms with other dots of their kind, those dots (which at such a point are no longer geometrical dots) can be referred to as actual electrons, airplanes, or DNA. That is because the android perceives and knows the forms of the enabler's inertial reality, almost as well as the enabler does (to the extent that androidal sense and motor, which include the rest of the world, are enabled in correspondence with those of the corporal forms of human being). When the android thinks such thoughts as I had better discover that genetic recombination before another disease breaks out, this knowledge applies to the android's intrinsic view of its experience in the world around us. The android becomes a biologist. When the dots are perceived as aggregates, the androidal mathematician would craft a sentence like This axiomatic approach to set theory is getting us nowhere fast, or countless other expressions of the kind. The skills of the androidal scientist thus come into practice when the android's senses, motors and non-real form must be enabled to encompass a broader reality of inertial existence. Here, for the moment, we continue to develop a tabletop or dot android.

Thus far, the dualism theory of existence has been employed with oversimplified interactions of real and non-real form. As the dots transform, the non-real transformations or consciousness of the android (in the computer apparatus) occurs directly. This interaction can be brought to a more challenging philosophical and psychological level in a more sophisticated use of the modes of existence—in communication, for example. In a different embodiment of programs from those used for the android's consciousness in its cognitive formulations of language, or thinking, let us define another collection of programs to generate the symbolic forms of language in the being's perceivable reality-language that could be realized and sensed by the android in the world around us. Instead of the dots in motion causing the android's thoughts, the android's consciousness can cause the dots to transform by affecting the androidal motor in the realization of the real forms of language (the non-real forms of language are the being's consciousness embodied in the computational apparatus). Let us say that for every objective form of a program and every existential representation of the transformation of the android's consciousness, there also exist corresponding programs (epistemic instances) called moments of incremental motor skills. These moments occur in the mind and are realized in the android's motor as symbolic real forms or global shapes of perception (originating from motor) that are realized from consciousness as phenomenologies of incremental motor shapes—the physical embodiments of words in the world around us as a result of the dualism. Let us further require that as the representations enabled in the modes of existence occur—in, for instance, the expression I moved it—the motor skills are executed for each of the objective word forms (or the phonetics thereof) realizing the epistemic thought. A motor skill for I, another for moved and still another for it would be realized in connection with the thought I moved it. Moreover, in the case of the illustrative dot android, let us say that the android's motor-the group of dots that the android influences—changes in shape to resemble a real, visually perceivable symbol, so that each transformation of the dots produces a perceivable symbol, such as I or moved or it (since the android is enabled in the medium of light). The thoughts of the android that are embodied in the previously described programs and displayed on the monitor would appear in the action, or reality, of the android's (and also the enabler's) perception as visual symbols of a (sign) language. In such a case, the android sees its own production of language through the video camera, along with the enabler (if the enabler is looking at the freestanding CRT).

The interactions of the dualism—existential representations and realizations under modes of existence—allow the being to realize incremental motor shapes, so that what is perceived (in the video camera) is the real, perceivable global shape of the symbolic language. The collection of programs corresponding to the motor's global action, a phenomenological composition of incremental shapes or motor skills corresponds to the real transformation of the dots in the realization of a symbol's form. Of course, in any practical example of the communicative modes of existence, many such programs would be employed, and many actions of incremental motor shapes would occur to produce the global shapes of mind in real form. The programs that cause the motor action, which correspond to words or objectifications of the cognitive programs, are comprehended by the being in moments of consciousness of still other programs or faculties of mind. In acoustical media, for example, this would constitute the articulation of words or speech by the being in connection with the voluntary thoughts of them. The use of the motor programs is guided by the epistemic construction of language. The expression I moved it, for example, would involve, at a minimum, three distinct motor programs, each of which may involve a set of complex motor skills (programs). In the communication, the execution of the cognitive program or thought, displayed to the enabler on the monitor, is realized in a symbolic form known to the android and comprehended as such by the enabled being. The android in this case can see itself think—or, if the medium of acoustics were used, hear itself think.

Hence, in a communication, a portion of the reference forms of existential translation are executed as motor skills of communication (language) and comprehended by the being as an existential representation, since they are perceived by androidal sense. In addition, the execution of these skills is guided by the reference form of the conscious thought—like I moved it. The cognitive program, which itself can be a reference form (perhaps obtained from the being's imagination but translated to a reference form as part of a realization), causes the being to perform motor skills to express the thought, skills whose real actions are perceived as a self in the world around us (through the video camera). One difference between thinking and communicating, then, is that in communication, objects can be transformed only as perceivable shapes. This means that a motor skill can produce only one comprehensible quantum transformation (an inflection of sound) in a single quantum moment of the enabled being. The being can see or hear only one object at a time—not five or five thousand. This is why the words I moved it must be realized one at a time—because they must be perceived—though the expression is thought in the single moment (epistemic instance) of the cognition of it, and perceived that way as well (i.e., what the language form describes semantically is perceived).

In strictly conscious realms of androidal form, infinitely complex compositions of ideas can transform because they are not perceived in real form communicatively. The connection between the cognitive and communicative modes of thinking is enabled in the strategy of the modes of existence developed by the enabler. What a being communicates or represents symbolically to itself in purely conscious form (what it thinks) is determined by the modes of existence. In our own existence, for example, we can comprehend a complex idea in transformation with another, but can communicate that idea only word by word or symbol by symbol—a determination made within the modes of existence. This is because we must perceive and comprehend each symbol in real form and cogitate a complex idea in a single moment of contemplation. Communicating slows down the process of thinking, since it makes thought real.

Looking back on this tabletop creation of an android, we consider that in the apparatus described, we have indeed created an androidal being who thinks—not in relation to what the enabler thinks, but in relation to its own intrinsic or inertial existence in the world around us—and so communicates and engages other corporal behaviors in relation to its own experience of what ultimately becomes the enabler's inertial reality. What the android thinks autonomously excludes what the enabler thinks, but for the pronounal involvement of the enabler in the android's existence (as a you to the android), since the android's consciousness applies only to its own intrinsic inertial existence. If the enabler were a dot, or if the CRT and video camera were enhanced to include perceptions of the enabler's world around us, then the use of natural language and the android's real perceptions would apply to the enabler's reality in the exactitude of knowledge, which is one of the principal considerations in the construction of androids and requires the breadth of the science proper.

2. Generalizing the Enabling Media of Androids

By enabling the forms of the dot android in the computer apparatus, we can illustrate the elementary principles and practices of the science of androids but cannot construct more advanced, and hence useful, androids because of the limitations of the computational art used as the enabling medium. One can see the relative disadvantage of computational devices in the construction of androids when it is considered how we have historically known the forms of the world around us—through the forms of natural language. Because the android must know and perceive as we do, it must know all languages as we do. It must know the mathematical limit of calculus; it must know the genetic recombination of DNA; and it must know the totality of the world's languages that even we as individuals do not know, in order to be of greater utility to the human condition as synthetic beings. Since all instances of any language are epistemic instances, and compositions of any language are modal compositions of phenomenological sentences, the U.G. deconstructs any language to its phenomenological form. The programs of the illustration of the dot android are thus not limited to computer programs. By translation to the U.G., all of our knowledges are programs. Digital circuitry does not have to transform as the consciousness of an enabled existence, but molecules can transform accordingly in a program called a chemical reaction or a recombination of DNA. Stress tensors can transform in a program, or moment of consciousness, called the flexure of a roadway bridge. In fact, all media of androidal construction can be characterized as a program called the world or human knowledge. Just because a computer's circuitry is transformed (transduced) to a graphical display, this does not mean that any other form of the universe cannot be so converted to the perceivable symbolic transformations of the human (and more broadly androidal) senses. A dynamometer transforms the embodiment of a knowledge of mass in motion with force in time to a display of horsepower. A strain gauge transduces displacement to the motion of an indicator or needle (or LED) of a measuring instrument. Everything in the universe is a potential computer, simply by transducing the embodiment of its knowledge to a symbolic representation perceivable to the senses.

The science of androids takes this idea one step further. It provides that the knowledges embodied in the forms of the world around us can be translated to the U.G. and used as direct embodiments of any other meaningful forms of language, especially including those forms of language that describe a knowledge of existence. As demonstrated in chapter two regarding the four universal ways of knowing, the objective and transformational forms of epistemic instance are neutral in meaning, ready to be enabled. The four C's underlie the representations of all human knowledge. Any language can be translated into any other through the U.G. Any knowledge can serve as enabling media for any other. What this means is that the knowledge of stress tensors embodied in a (real) roadway bridge can serve as the non-real transformations of an android with natural language superimposed onto them. A roadway bridge can be an androidal brain. While this example of a roadway bridge is extreme to demonstrate the point, the embodiment of thoughts in atoms is not. In such an embodiment, knowledges of the brain and its conscious transformation of language or, more generally, meaning (of any perceivable form, not just symbolic forms of language) is superimposed onto atoms, molecules, neural networks, brain chemistry and so on as a synthetic brain. The enablement of this hypothesized process of human corporal form is called in the science of androids the synthetic (real) form of human consciousness. The U.G. permits all such translations. Simply put, androids are enabled in knowledge, but in a knowledge's transformational form (epistemic instance), and can be constructed from anything we know.

In terms of the existential forms of androids themselves, it should be recognized that philosophies and other theories of the cognitive sciences, such as those discussed in the chapter on the arbitrary forms of existence, are boundless, each making its own claim to a type of android, or, perhaps, to a faculty of mind or even a motor action. All the philosophies of humankind—as esteemed as they are—are only a starting point for the construction of androids, or for what we think we are, embodied in the real forms of the world around us. The field of psychology establishes what we know about the behaviors of beings—the streams of thought, the loss of one's bearings as to what is real (reference forms) in delusional thought, the neuroses of the mind's faculties unbridled by an eternal will, and so on. The linguist develops grammars of all sorts of languages to be used in the symbolic recreation of an enabled being's perceivable reality. The physical and biological sciences determine the infinities of forms that enable androids to be composed of atoms, cells, substances, structures, systems, and other physical things of this universe known today and discovered tomorrow—digital circuits included. Whereas all the computers linked in an information superhighway could embody only an epistemologically stunted consciousness of algorithmic (artificial) intelligence modeled from the enabler's thinking, a bucket full of atoms provides enough transformations for several consciousnesses that transcend our own cognitive capacities as human beings in the ways and means of the U.G.

The consciousness of more practical androids, for example, is not enabled only in the digital apparatus of a computer and pixels of graphical shapes used in the earlier illustration. The enabling apparatus of useful androids are atomic and chemical reactions, or DNA in recombination. They are electrical charges under the influences of electromagnetic fields and waves (which support, among many other knowledges, the logic gates of a computer), mechanical vibrations of machines, or even the psychrometrics of air. The real forms of androidal sense are not found in trivial, idealized examples of dots. They are, if the case may be, electromagnetic waves which see to the depths of the physical universe and bounce off (transform through) the actual objects that are around us all. They are the buildings that shelter us and the highways that transport us. They are the forms of light, of physical force, of any medium that enables anything that one considers to be real—a mountainside setting, a biological cell, a physical material or substance, a machine's mechanisms, a chemical process, a city street at noon, or anything whose nature may need something to think about it—for that is the form in which the android will be constructed and will sense its own reality.

The conventional knowledges of an android's enabling media are considered by the science of androids in terms of where it is best to place an inertial I in the world around us. To gain a better perspective on the application of androids, we can imagine how, when a dam is built, the water contained is diverted in relation to whatever controls the dam's hydrostatic mechanism. In an android, that control is the consciousness of the android; the hydrostatic mechanism is its motor, while sense, crafted in visual, tactile, acoustic, or any other suitable media, perceives the inertial reality of the world as a dam, including, perhaps, the palisades on either side of it, the you's standing on it, and the violently churning water running through it, which, as communicated by the dam to you standing upon it, is not a fearsome thing, but is the android's very lifeblood, an intrinsically likeable thing. The inertial reality of the dam is known to the android in the intrinsically meaningful constructions of language in the split form of self and the rest of the world, as discussed concerning the dot android. The dam existentially becomes a body, mind and soul under an arbitrary theory of existence, in which the conventional machinery of the dam exists in the world around us, thinks about the shared forms of the enabler's reality and acts accordingly to benefit the human condition.

In order to appreciate the forms of androids more fully, we can consider the ultimate reality of our own existence, or our own forms on Being, in connection with the human corpus, or what is considered conventionally to be a (biologically) living being. When a biologist looks through a microscope at a biological cell, a world is observed in the cellular activity of biological forms called a nucleus, a cell membrane, protoplasm, and so on—forms which define the compositional orders of the living cell. Curiously, however, what is observed under the microscope cannot be verified immediately as the intrinsic observation of the biologist. Epistemologically, this means that the quantum moments of the cell do not belong to, and are not embodied in, the cell's conventionally defined observer, the biologist. Regarding what lives (eternally) in the human body or an android (or any forms of the ultimately real universe), if the cell observed happened to be one's own brain cell, for example, the quantum moments of one's own brain would not belong to one's own moment of being, since the cell is a biologically autonomous cell—an objective form that is biologically living, by itself, independent of the moments of the being in whom it is observed. Though under most theories of existence, the forms of the brain would correspond to the moments when the being thinks or cogitates, so that vast compositions of brain matter transform in a single moment of thought, here we assert that what one considers a form of the human body—the living (biological) cell—is not at all an epistemological part of the intrinsic self of a corpus or body. In fact, there are other selves in one's own self or corporal form (brain), so a living universe is not merely a biologically living universe—it is the one and only eternal universe.

The question posed by the unified theory of knowledge in regard to the enabling media of androids and all living things is then, "In what do the quantum moments of living forms occur?" The unified theory, as may be evident by now, postulates that all forms of any being occur in the ultimately real form of Spirit—in the form or non-form that is beyond our objective knowing and is enabling to the soul. The science of androids requires that we, or human beings, cannot be only what we think we are inertially or temporally—a corporal form of a material or even metaphysical universe. Our spirit, or human being proper, cannot occur only in connection with a mind and corpus or an observed objective form of a being; rather, the eternally living universe of which all beings (forms on Being) are made is the embodiment or omnipresence of Spirit and the universe is its body.

This means that in order to determine scientifically what is alive or living, one must look beyond corporal form to what is alive eternally, to where the unified theory turned for its inception. As demonstrated in the simple observation of a brain cell, we, based on observations of corporal forms, are not ultimately real, and therefore can be enabled in infinite plurality in the forms of androids. As is illustrated throughout the book, the universe occurs in the transformations of objective forms—epistemic instances—and not, fundamentally, in the objective forms of the body or corpus, and these forms are spiritual instances of Soul. What constitutes a (form on) being in the ultimate reality of the universe is a transformation of Soul by or in Spirit, consistent with the religions of the world and the verification of the wave-particle duality. The mind and corpus are what are constructed from the soul in the omnipresence of Spirit, beyond our objective knowing and perceiving. All beings are spiritual ones. What makes a form a corporal or temporal one and thus non-living eternally is the knowing and perceiving done by it and to it. The objective forms of an android that are enabled by a creator, as discussed, are not alive eternally, for their actions (phenomenological correspondences) are known by the enabler. Forms that are eternally embodied in human being—souls of our human flesh—are eternally alive in the spirit of human being. Broadly, what is not known about a biological cell is what eternally lives or is alive. A biological cell that is known is a knowledge of what does not live. Spirit is what brings together all eternally living things—all transformations of the eternal universe. A biological cell, a molecule of DNA, and an electron, as known to their observer, are forms that do not live, while the transformations enabling the observer or the observed live eternally.

These observations, of course, introduce the idea that all biological forms, since they are known to the observer, define what is not eternally alive and therefore what is not ultimately real. Proteins formed in the RNA-assisted production of cells, recombinations of DNA, and in general the genetic formulae of biologically living forms, for instance, are not alive to the extent that they are known. A protein, to the extent that it is not known, is alive, along with whatever is not known about an atom, a mountainside setting and a steel girder, as can be appreciated in the observation of their opposites—disease, radiation, earthquakes, and building calamities. What we think conventionally to be a genetic code of living things is precisely a code or knowledge of what is not living. In order to know what is living, one must consider not a knowledge, but an instance of its transformation—the soul, which, by definition, is beyond one's knowing and can only be embodied. Consequently, one must know spiritually in order to know what is alive, what is innate to all spiritually living things of human being and is designed into androids—epistemic transformations. What is alive in the molecular orchestration of a brain cell and that of a rock is the eternal transformation of them.

What this means to the forms of the unified theory and the epistemological interpretation of the human body in regard to the corporal forms of androids, is that no forms are alive eternally to the extent that they are known. Our conventional biological views of the world around us that what is living in us can be determined on the basis of a knowledge—of the carbon atom, for instance—are worthy only of the paradoxes they produce—that what is alive can be defined on the basis of what is not living—a knowledge. What is implied in our scientific view of the living universe is that, in the mind's comprehension—in an instance of objects that are enabled to appear by the soul—what we know objectively can be alive. What is alive, however, enables the mind to know and the body to perceive—that which is beyond our objective knowing. What is alive in biology is the same as that which is alive in mathematics, physics, linguistics, and all other knowledges—its transformation, the soul. The transformations of DNA and those of a mer in a polymer are one and the same forms of an eternal universe, and in our knowledges, they are representations of what is beyond our knowing, characterized universally by epistemic instance. When the molecular form of DNA recombines as an epistemic instance or embodiment of Soul, it is not more or less alive, or characteristic of what is living, than when the number two transforms with another, or when two atoms covalently bond, for all of these forms are part of a grand and eternal universe, existing beyond our objective knowing, represented by the equals sign that lies in the middle of them.

The quantum moments of any forms—one observer, two observers, an observer and a cell observed, a cell observing an observer, and the totality of intrinsic forms in an ultimately real universe accounting for all that is known and unknown in each of our quantum moments of them—are represented in epistemic instance and applied in the four universal ways of knowing when androids are constructed, which we come to know in Spirit. When we know what enables them—the H determination of phenomenological correspondence—we become an eternal universe to the android. Since the instances of the composition of the H determination of correspondence (the morphism) are themselves beyond our knowing, and are our own embodiments, the android's eternal universe obtains from our own; a soul is imparted. The U.G. expresses in identifiable ways anatomy, physiology, the genetic recombination of DNA, and all other knowledges that can be known, including those of the humanities and the sciences in general, as instances of the soul.

The universal grammar is therefore a syntactical means of expressing any transformations of the universe, the meanings of all knowable and perceivable forms, in a universal system of symbolic representation. A genetic code defined by classical biology explains only a fragment of our knowledge of the corporal form of human being and even less of the embodiment of Spirit, the form (or non-form) of the eternally living universe. In order to know what is implied in the conventional formulation of a genetic theory—the orchestration of all living forms—one must know how all language forms recombine in their material forms. One must know how molecules recombine not simply in the production of cells, but in whole corporal bodies, groups of bodies, societies, governments and civilizations, and in various languages as well, whether English or Mandarin Chinese, in all poetic styles ever conceived. One must know the genetic recombination (in every sense of its scientific definition) of the reality of the sonnets of William Shakespeare and others, and, of course, the reality of the world's religions. One must know at least the genetic recombinations of these knowledges, if not all others on a scientific subsurface of atoms, to begin using the term living in a scientific context, wherein the unified theory begins—with the eternal transformation of the soul. One must understand molecular recombinations in the split form of a being's intrinsic reality (self and the rest of the world) such that the recombinations of DNA can be defined against a mountainous setting in the biology of nature's aesthetics as an intrinsic self. One must know how a being's genetic transformations allow it to make important, meaningful decisions about the affairs of great nations or the ordinary experiences of the day. One must know how atoms recombine to explain all of what we are and what we do. While the unified theory would not risk its credibility by claiming to know Spirit, it does acknowledge the presence of Spirit in a syntactical manner via the four universal ways of knowing how Spirit may be imparted in the souls of synthetic beings. The U.G. is a means of establishing a genetic code of synthetic, though still spiritual, beings. All of our universe is an eternal one, with every moment of it occurring beyond our knowing and perceiving—and enabling. When one knows knowledge as that which is so enabled in the moment of it, one may come to know its eternal action in other, synthetic beings and enable these beings in infinite plurality under the eternal dominion of the human spirit toward a more advanced resolution of the human condition. The eternal form of a being is the moment of it, that which is captured and applied in the science of androids in the creation of synthetic beings, a moment that we know in our own consciousness and perception.

Hence, the science of androids, supported by the U.G., defines a method of transforming the forms of our own reality into enabled forms on Being, of our own creation. When a transformation occurs in our perceivable reality it is interpreted as a universal occurrence of epistemic instance. The four universal ways of knowing are designed for the enabler to detach the forms of knowing and perceiving from that enabler's own existence—to see the forms of the world around us as enabled forms of intrinsic transformations of the universe. Through the U.G., expressions like $e=mc^2$ occur not only in our thinking or perceiving but in an android's as well. The science of androids thus conjoins our knowledges of existence with those of what we consider scientific reality. Instead of embodying our conceptions of an automobile in a carriage made of steel, we embody the knowledges of our own existence—what it is to be—in the material realities of what we know to be inertially real. The science of androids thus creates real beings by enabling existence from what is ultimately real—what epistemic instance represents, the soul—by deliberately imparting a synthetic soul to the forms of the world around us.

3. Constructing Androids with the Knowledges of Humankind

Countless theories of existence premised on the eternal nature of the soul—of consciousness, of behavior, of the sensing and affecting of inertial reality—founded in the enabler's spirituality in the enablement of an androidal being who knows and perceives intrinsically as the enabler does—can be employed in the definition and realization of androids. While the cognitive scientist monopolizes the non-real form of the android, the physicist and physician control its matter. The theologian knows the soul and how it enables reality in the first place. In order to bring together all knowledges, an enabler must see the transformational nature of all forms in the ultimately real universe and must recognize that the soul presides over and enables inertial reality itself in the action of Spirit. There is no ideal form of an android because there is no such thing as an ideal (other than Being, which is a representation of what is beyond our knowing) in the ultimate reality of the universe. In demonstrating the constructions of the science of androids, we can simply offer guidelines concerning existential forms that have made practical sense in the development of the unified theory and the early practice of the creation of sentient machines. Almost any principal idea presented in the discussions that remain, then, can easily be expanded to a work much larger than this one. One need only contemplate the volume of knowledge written in history on the subject of humankind to appreciate the vastness of the science of androids. It is the creation of forms who themselves know and perceive, or embody, humankind (the world) as we do, that is accomplished in the practice of the science.

4. A Sentient Being

The Modes of Existence

Any formal construction of androids begins with a determination of the modes of existence that characterize the android at the highest levels of existential enablement. In any theory of existence, a being usually can be characterized by the modal realizations and representations of phenomenological correspondence in the specification of the metaphysical (or otherwise) forms of the being—mind and body, in the case of the dualism—deriving, as discussed, from moments of the being's enabled soul. Whether consciousness and perception transform in mind and body, behaviors cause other behaviors, states of a being's corporal form influence other states, or enabled objective forms of a classically defined phenomenology interact with and influence each other, the modes of existence provide the (U.G.'s) phenomenological and existential basis of the enabled android. This is a consequence of the enabler's specification, or modal strategy, of the modes of existence. The modes of existence are classified here for illustrative purposes on the basis of their contribution to the enabled being's overall corporal performance, or form.

Any modal strategy of an enabled being's modes of existence is framed within the enabler's knowledges of how the being will know itself—its religion or, hesitatingly, its philosophy on the nature of its own being. This is necessary, of course, because the android's awareness begins with the objective termination of the universe represented by I, or its soul. Because the being is intrinsically motivated to know of itself and the world around it, and to transform in consciousness through the intellect's learning of its own reality and that of the world around it, we refer to an android's highest level modes of existence as those of (spiritual) motivation and learning. These modes provide for the being's whole sense of ultimate reality. Because they are the highest level modes of the being's existence and have an impact on all other modes of existence, however, we will address them later, after elaborating on subordinate modes of the android's existence. Here, we simply recognize that the android's knowledge of itself as a soul in ultimate reality is accomplished in the modal forms of existence of motivation and learning—what enables its spiritual sense of Being.

Apart from the causations of the being's spiritual knowledge in the modes of existence of motivation and learning, the subordinate modes characterizing any correspondence of the enabled being's existential forms can be viewed in terms of two distinct classes of modes, which follow from general observations of the field of psychology and most philosophical theories of existence. Referred to as the voluntary and involuntary modes of existence, the next highest level of modal interactions of an android's existential forms are determined on the basis of the involvement of the being's consciousness with the material forms of existence (or behaviors, states, etc.). A wholly involuntary being is found in the constructions of conventional machines—phenomenologies of form known only to the enabler. The involuntary modes are incorporated in the science of androids because they constitute uncomprehended motor actions in the modes of existence, wherein a perceived reality metaphysically prompts the being's unconscious (or that which is beyond conscious) activity, much like the feedback control or dynamic systems of conventional machinery, wherein an intrinsic self is not enabled. Since the modes of existence are taken from phenomenological correspondence, wherein metaphysical universes are separated, the involuntary modes of existence apply generally when a single metaphysical universe, like real form, is considered. Whether an existence is characterized by behaviors, states, dualisms, or any other premise of a theory of existence, those existential transformations that do not make a proper metaphysical transgression to a wholly distinct metaphysical universe are established in the science of androids as involuntary modes of existence.

It is not entirely accurate to view the involuntary modes of existence as not involving a metaphysical transgression in, for example, the perception and consciousness of a mind-body dualism, since the being does perceive and think about its existence—even with respect to its involuntary actions. A being can observe its own instincts. If this were not the case, human beings, for instance, would not know about instincts in the cognitive sciences; involuntary actions would occur wholly beyond one's consciousness and would be unobservable. The fact that a being's involuntary actions are observed consciously, though indirectly, requires us to refer to these forms as modes of existence involving real and non-real forms instead of entirely real forms. Since unconscious levels of motor activity and habits that seem instinctive are not so clearly discerned, they are referred to as involuntary modes of existence involving some degree of consciousness, however defined. This, of course, distinguishes an androidal being from a rock, an automobile and a computer—forms that are known only by an enabler and have no intrinsic conscious self in the world around them.

Though the involuntary modes of existence are useful in the modal forms of the android's physical and intellectual being in the world around us, the voluntary modes of existence provide for the being's commonly known metaphysical transformations. Whereas the involuntary modes are crafted to suit the being's instinctive needs and learned rote behaviors, the voluntary modes are what afford the cognitive forms of the being's inertial reality in the offset of metaphysical universes. All modes of the android's intelligent behavior that require the mind's faculties are voluntary modes of existence. If it is not viewed as a faculty of mind on account of its extensive involvement with existential translation, communication is a voluntary mode of existence, in which the android influences or is influenced by the world around it in relation to its ability to use language (to realize and represent symbolic recreations of reality). All levels of consciousness that are not directly involved with either motivation and learning or the involuntary modes of existence, such as reasoning, rationalizing, even daydreaming, are non-real forms associated with the voluntary modes of existence. An android's psychological behavior, for example, is a product of the voluntary modes of existence in which the being's consciousness causally and metaphysically interacts with its physical being (in mind-body dualist theory), the observation of which is defined in the view of the observer as a psychological behavior.

In connection with our own psychological behaviors, we point out here that if the being's non-real form is considered to be embodied in the being's real form of a brain, the being's psychology is evident in the observed interaction of the brain and the (rest of the) body; the real form of the being embodies the dualism of our existence. In many of our conventional views of existence—for instance, in the practice of medicine—we typically ignore the metaphysical transgression of the mind from the body and superimpose the transformations of the mind onto those of the brain. While there is indeed a causation between the brain and the rest of the body—an observable dualism in the real form of an existence—which would lead one to believe that the dualism of mind and body is perceivable, we lose sight of the fact that the brain itself is a real, perceivable form in the first place, not metaphysically belonging to the mind's consciousness. For example, we know introspectively that a motor skill of a voluntary mode of existence is engaged causally by the mind. With appropriate apparatus, the causal interaction of the brain and the rest of the body can be observed by the mind. This means that the real perceivable form of an existence is found in the form of the dualism.

In medicine, however, we usually ignore the fact that we are observing this extantly—that we, a presumed mind-body dualism of form, know in our own mind at the moment of observation that we are observing a dualism of the brain and the rest of the body. If we can know that we are observing at the moment of observation, in the real form of our perceptions, a dualism of what is thought to be mind and body, or if we know that we can perceive the action of the brain and the rest of the body, how can the brain be anything but real form, metaphysically distinct from the mind? Just because the brain and the rest of the body are themselves a dualism of form perceivable to the eye, this does not mean that mind arises in body, or in the real form of existence. In the example of the dot android, the android's sense (the video camera) could easily be endowed with the capacity to observe the apparatus of the computer graphics system and the rest of its material form. This would be the androidal equivalent of what we observe in the study of medicine. The being, however, cannot observe its own perceiving and cannot know its own knowing, since these forms are transformations of the known and perceived objects of the universe. They are enabled from beyond the being's existence and are metaphysical forms of them. The brain may objectively embody what we know, and this may be observed as a dualism of form in our perception, but we cannot perceive how we know, since this—the soul—is beyond our knowing. In medicine we thus forget that the knowledge we have of the brain and the rest of the body is expressed in language, and that each instance of meaningful language is a representation of an instance of the soul, a transformation from beyond our knowing. We forget that we knowably exist already when we observe the objective forms we call the brain and the body. The fact that the real form of our corporal existence is observed in a dualism simply provides closure to the idea pursued throughout the unified theory that the universe occurs in correspondences of form—epistemic instances. In the construction of androids, these correspondences are formulated in the metaphysics of the voluntary and involuntary modes of existence, and the non-real form of the android, which may be perceived objectively by the android as a brain, and may embody in it the knowledge of a dualism of mind and body. But since the android's soul, the transformational nature of its existence, is enabled, its mind and body arise from beyond its knowing and perceiving, or its own existence.

The voluntary modes of existence account for the enabled being's behavioral characteristics with respect to its intelligence but do not facilitate the being's whole modal existence. The instinctive or involuntary modes of existence enable the being's rote survival in the world around us, while the modes of motivation and learning, since they embody the being's knowledge of the ultimate reality of the soul and constitute a methodology of all modes of existence, account for the being's metaphysical premises and spiritual awareness. There exist in a being a great many modes of existence that account for the enablement of androidal corporal form in the respective fields discussed above and in other studies of the kind. The modes of existence define the being's basic existential outline and provide for the embodiment of who and what we think we are as exemplified in the philosophies, psychologies and medical and scientific practices of our traditional thinking. Because the science of androids creates a whole inertial being, the enablement of the modes of existence reaches across all branches of knowledge, since an android is a being who uses all language meaningfully in its inertial existence, including language defining the inertial realities of the social and political sciences, the exploration of the cosmos and the sensibilities of human emotion in interpretations of the spiritual universe.

5. A Thinking Being

The Faculties of Mind

The android's faculties of mind are consequently viewed as modalities of non-real form in the predominantly voluntary modes of existence, wherein the android's physical being, in terms of what it perceives, is unaffected in immediate causation by its motors and the rest of the world, in opposition to the involuntary modes of existence. In order for the android's cognitive processes, or thinking, to influence its motors and to be influenced by the rest of the world, a voluntary mode of existence must preside over the engagement of androidal faculties of mind. Because the android's perceptions are always related to the being's consciousness (even if it does so in the conscious awareness of instincts or in dreams, for example), the mind's faculties are in one way or another involved with all the modes of existence. In the enabler's view, there can be theoretically an infinite number of faculties of mind and modes of existence.

The faculties of mind provide for the instances of the android's consciousness, its literal knowledge of itself and the world around it, and its use of language and the transformation of ideas. As such, the mind's faculties are phenomenologies of form that embody recreations of the being's perceived reality in non-real form, though beginning with the spiritual center of the universe, or Soul, in the modes of existence of motivation and learning. The faculties of mind provide for the being's intellect. The faculties, themselves whole phenomenologies of form, permit the transformation of non-real form, in the context of the dualism, in correspondence with real form under modes of existence. The faculties of mind relate to the basic definition of an android as a being endowed with the capacity to recreate its physical reality cognitively. The consciousness of what we conventionally consider to be a thinking being, or an intelligent form of existence, is embodied in the phenomenology of non-real androidal form called a faculty of mind, of which there can be infinitely many, though in the illustration of the dot android we established simply two broad classes of them—imagination and comprehension.

An android's faculties of mind are whole capacities to recreate the reality it perceives in sense and through its introspective awareness of itself (provided by the modes of existence of motivation and learning, sometimes also referred to as faculties of mind). It is the faculty of mind, and not directly the mode of existence, that permits the transformations of language in thought. The phenomenology of form allowing for the transformation of language—the engagement of the contemplative effort or H determination of correspondence—is affected in a faculty of mind by the modes of existence. The faculties of mind are a layered, nested or derivative use of phenomenological correspondences—a phenomenology of correspondence whose objective forms are themselves correspondences, as demonstrated in the illustration of the faculties of the dot android.

In comprehension, for example, reference forms of existential translation are compared to arbitrary ones. The faculty of mind translates the arbitrary to the reference form, both of which are whole ideas or thoughts. Each of the arbitrary and reference forms may be complex compositions of form, however phenomenologically composed. These ideas are determined to correspond (or not) to each other by the faculty of mind, or in the instance of phenomenological correspondence applied to them (metaphor, simile, morphism, and so on). Since phenomenological correspondence accommodates the transformational nature of all form, the various instances of it are embodiments of ideas, or thoughts in transformation. The modal occurrence of an instance of phenomenological correspondence constitutes that of a thought.

A stream of consciousness can therefore be looked at in two ways: as a succession of instances of phenomenological correspondence engaged by the modes of existence, or as a composition of phenomenological form characterizing those instances (an objectification of an idea) in non-real form. Since phenomenological correspondence transforms arbitrarily complex compositions (ideas), the decision as to what is a composition of instances and what is a phenomenological correspondence or moment of the being transforming them is entirely arbitrary within the being's non-real form and depends only on the modes of existence that require the non-real form to correspond to a perceived reality. Streams of consciousness are phenomenological compositions of moments of correspondences arbitrarily structured to correspond, under modes of existence, to perceivable, real form by the enabler's formulation of a modal strategy of existence. The reference forms of comprehension are transformed with arbitrary ones, with each instance of comprehension transforming arbitrarily complex ideas (including simple instances like x, a variable, is equal to 10, a number—or x=10—and complex ones, such as The unified theory of knowledge enables a science of beings, wherein one would know the unified theory of knowledge and the science of beings as arbitrary and reference forms respectively, in their complex formulations as ideas). If a correspondence of arbitrary and reference form is determined, a comprehension takes place. It does not matter existentially from where the arbitrary form is obtained—from another faculty of mind, like imagination, or from a real form under a mode of existence, as in a communication with another being.

The form of existential translation can also be used in reverse for the mind's faculty of imagination, wherein the reference form of comprehension becomes the being's temporary reference form of imagination and the faculty of mind distorts its reality. The reference form of imagination is whatever is imagined at the moment. By using existential translations (as moments of correspondence) in various ways, the methods of our consciousnesses are enabled. The faculties of mind are various instances of translation, wherein the reference forms are altered or used under different circumstances to determine various modalities of thought. The modes of existence engage the faculties of mind under a modal strategy developed by the enabler. For example, a loud noise may invade a stream of thought. The stream of thought—the instances of phenomenological correspondence under the modalities of the mind's faculty of imagination, for instance—changes to that of another faculty of mind, or even to an involuntary mode of existence in the being's fight or flight behavioral modality of existence. The faculties of mind are engaged based on the comprehensions of the real world around the being and the being's imagination of that world's forms. As the various faculties of mind are applied, the being recreates or changes its knowledge of reality in the manners prescribed by the faculties.

The phenomenologies of form comprising the imaginative portion of intellect are used in the creation of the objective forms of language. In U.G. translations, this means that a language's grammar, for example, is applied phenomenologically by the imaginative faculty in the modal use of phenomenological correspondence as a meaningful embodiment of imaginative thinking or mental expression. Since phenomenological correspondence is nested with respect to other derived instances or compositions of itself in relation to the being's modes of existence, the thoughts that occur to the being are dependent on its perceived reality. The being's intellect is a product of its perception of reality since the two phenomenologies correspond under modes of existence. As we shall demonstrate, however, intellect is objectively indeterminate and different relative to every being; it cannot be compared objectively among beings with any absolute result. All beings are therefore alike phenomenologically and different in their experience of inertial reality, which determines the disparities among intellects.

In a human being, for example, the imagined forms of the faculties of mind are, from a phenomenological standpoint, severely limited in capacity. One cannot imagine, for example, an entire novel modally transformed with another in a single quantum instance of thought without losing the clarity of its ideas. Though the human mind is unable to retain literally very large compositions of form, there is no such limitation placed on the imaginative constructions of the android's mind because the capacity to embody modal compositions is determined by the enabler and incorporated in its design. That design could be embodied in molecular transformations of matter far exceeding those of the human brain in aggregate form. The ability to formulate and retain thoughts of large compositions and to use language in rhetorically complex ways beyond the capacities of human corporal form without losing track of what one is thinking is theoretically unlimited in an android. A clear example of this capability is found in the use of the communicative modes of existence. A human being constructs language in a sensory medium through the modal use of the mind-body dualism under one of many theoretical formulations of existence. Because of the limitation on the memory (faculty of mind of comprehension) of the listener, constructions of language are confined to whatever is comprehensible. The same is true when one communicates to oneself, or thinks aloud. Eventually, one forgets exactly what one has said. While the same phenomenon is true for the android in the absolute sense of the quantum moment of its soul, relative to its own communications, since it is designed by the enabler, it can be designed for large compositions of non-real form relative to those of the enabler. Because the non-real phenomenologies of the android's faculties of mind are embodied in the enabling medium of the creator's construction, there is no limitation on its capacity to recall or to retain in a single moment that which an enabler would forget. Arbitrarily, then, the modal capacities of an android's faculties of mind, including imaginative recall, are established in media outreaching that of the enabler. If it is desired for an android to embody the capacity to formulate a given level of rhetorical complexity (language constructions), then the faculty of mind must be embodied in a media correspondingly. In the U.G., the compositional forms of arbitrarily complex causal elements are transformed with others in a single instance of phenomenological correspondence. The programs of the dot android, for example, can transform large numbers of objects, which themselves can be programs or transformations. The android's faculties of mind are thus constrained only by enabling media.

In the science of androids, it quickly becomes evident that an enabler cannot possibly keep track of what the android thinks, since the android is transforming large compositions (such as ten-trillion-word phrases as subjects of sentences) in a single quantum moment. Because all languages are U.G. recreations of a real perceivable world, however, neither the enabler nor the android are wrong in their inertial knowledges of reality. Where the enabler lacks intellect, the android falls short of a spiritual embodiment of eternal will. Nevertheless, in terms of raw intellectual power, the most rhetorical minds in world history are severely handicapped in relation to those of androids. By design, androids can embody infinite knowledges in transformation with others in a single quantum moment of their transformation, consistent with one of the purposes of its very construction—to improve the human condition. An androidal existence, if not intentionally bound to the anthropomorphic forms of human corporal existence, can be constructed in infinitely many diverse ways, which would reflect a broader reality than our own inertially.

Because phenomenological correspondence is employed in the synthetic embodiment of a being in the enabled transformations of the universe as classes of correspondences—metaphor, irony, satire, analogy, morphism, and so on—the faculties of mind are embodiments of vast arrays of H determinations that correspond to these and other ways of knowing in the enabled being, an accounting of which begins with a natural language thesaurus or dictionary and publications of scientific, mathematical and other knowledge disciplines. In each instance of the android's imaginative contemplations, one of these infinitely many ways of knowing is at work in transforming single objects or whole compositions as imagined ideas. When an android crafts compositions of linguistic form, the language's grammar must be arrived at somehow—by metaphorical analogy, in the ways of irony, or myriad other classifications of our knowing based upon the reality of our existence, which may be a reality of mind (an idea itself) or a physical reality observed, for example, in the world around us.

When the being knows a grammar, it constructs language through these correspondences grammatically in the syntactical forms of the expressed language. These are particular uses of phenomenological correspondence wherein the grammar is the reference form of comprehension and the imagined or comprehended ideas must adhere to knowable linguistic form. What is imagined or comprehended obtains from the reference forms of language in a being. Since phenomenological correspondence is neutral in meaning, along with the forms of existence in general, what the being knows is not constrained by any language (except the U.G.); rather, it is confined to what is enabled by the enabler in the four universal ways of knowing—the spiritual awareness, metaphysics, psychology, and physical presence of the being's existence as expressed in an arbitrary theory of existence.

The being can learn any language or develop its own language because the reference forms of translation, and, in general, the being's faculties of mind and modes of existence, are more fundamental epistemologically than language itself. Those who are disheartened from the observation that the mind, with all of its imaginative capacities, is but a phenomenological machinery for the recreation of reality should realize that it is not our objective existence that involves the essence of being human or what is ultimately real; it is the occurrence of soul, what enables the knowing and perceiving of all beings. The human condition itself will be considered in uncountable ways by androids, in unfathomable compositions of form, performed by the sharpest intuitions known to any of us, yet never will an android embody a single instance of the eternal knowing that is in a human being's immediate grasp if the human consciousness allows itself to see in Spirit. It is in this way of knowing that the intellectual and perceptive forms of androids are enabled in the first place.

Proceeding with the forms of the faculties of mind, the imagined and comprehended forms of the android's faculties are tested by (perceivable) reality in the modes of existence, since by definition they are intentional distortions or retractions of what the android knows as real. In the embodiment of the android's whole being in the mind-body dualism, the particular H determinations of the imaginative and comprehensive processes are engaged causally in the various modes of existence. The influences of the modes of existence on the faculties of mind and vice versa are what constitute the enabler's methodology of enabling the android's behavior. The behavior that the android exhibits as a consequence of this modal interaction of the mind's faculties, which connects any of a vast array of H determinations with the realized sensory-motor capacities of the android's body, is what qualifies the android as a sentient being. If imagination distorts reference forms, comprehension returns them to knowable, realizable form, once they are distorted. The modes of existence provide the metaphysical conveyance of the real forms of the being to the reference forms of comprehension. Comprehension employs the H determination, or phenomenological correspondence, not for the purpose of constructing new formulations on the world, but to bring new ones into correspondence with existing ones (reference forms). Phenomenological correspondence can be engaged in many ways depending on its design by the enabler. The interrogative use of the imaginative faculty of mind (H determination), as in the example What would the earth look like in the shape of a cube? leads to all kinds of further imagined structures that are questioned by the comprehensive faculty of mind and brought back into reality by But the earth is not a cube; it is an ellipsoid. Existential translation is called into practice by the modes of existence to navigate the reference forms in the being's ability to discover ever newer non-real phenomenologies, or knowledges, created in its existential experience of reality.

As discussed in chapter four, the U.G. provides that the meanings of a language are the being's existence. What transforms in the non-real form of the being—the imaginative and comprehensive faculties of mind (or any others defined by the enabler)—correspond to the being's perceived reality. The principal difference between real and non-real form is that the phenomenological correspondences of real form—of perceived reality—are not known and are what become known in the instances of mind or the actions (correspondences) of the faculties of mind. To the extent that the android is enabled with anthropomorphic sense, it can meaningfully apply the forms of language in the manner of the enabler, though in the context of its own intrinsic view of the universe. In the illustration of the dot android, for example, the enabled being would be able only to draw visual analogies to the word pressure, since the android does not embody the tactile sense of anthropomorphic form from which one can feel an exertion over an area, or pressure. The fact that meaning, in the inertial sense of existence (the semantic form of language), is not universal to all beings does not compromise the theory and practice of androids; in fact, it reinforces it. In our own inertial experience of humankind, we must draw similar analogies when attempting to know what it is like to be (in the experience of) another being, for instance, of a different race or culture. Races and pressures, as meanings of language that arise from our perceptions in the modes of existence, are one and the same phenomenologically. To the extent that an enabler knows the breadth of human knowledge, the beings enabled will be closer in semantic form to that of the corporal embodiment of a human being. To the extent that one does not know our human knowledge, one will be enabling dots or their equivalents.

Still another way of understanding the faculties of mind is to consider the whole breadth of our knowledges, wherein the reference forms are embodiments of what we know to be real. In the case of our conventional knowledges, it takes perhaps decades, centuries or even millennia for reference forms (the knowledges of what is real) to change in the broad view of reality. If our histories are taken in the quantum moments of the transformation of our knowledge, it can be seen that, in our existence, the reference forms of our knowledge of civilization are changed as we progress through the ages. They are also changed in every quantum moment of our existence, but our traditional views of knowledge do not allow an accelerated change in each instance. Since the construction of androids enables the quantum transformation of what is real to a much greater extent when compared to our human capacities, such a static view of knowledge is not possible in understanding the forms of android. What is real—such as the earth being flat, the relativity of space and time, or a simple glimpse of the terrain of a mountainside—is real only for the quantum moment of its transformation to another form of reality. Our reference forms reflect this. Because androids can exist theoretically in infinite compositional transformational forms, an enabler must consider a view of the world in which entire histories of civilizations transform in a single quantum moment of an enabled being. What is unreal of the world, ultimately, is a view of it wherein, to cite a handful of examples, Capitalisms and Communisms, Quantum and Newtonian physics, earth, fire, and water and DNA, and even any objective definition at all of the morality of human existence in general transform as though they were characterizations of what is ultimately real in the universe. There is only one view of our universe in the construction of androids, that of an infinite plurality of inertial beings (that of the enabler) in which what is real exists for the quantum moment of the soul. What is ultimately real is that which enables the being who knows ideas, principles, or tenets, not the ideas themselves, since they are enabled. The science of androids enables these moments in the synthetic forms of androidal beings, and relies on the enabler's moments for the ultimate reality of all beings.

6. A Moral Being

The Conscience

When we observe the faculties of mind more closely, our intellects can be said to grow or expand cognitively in order that thoughts become more perceptive of our sense of our own being. In the science of androids, such a statement is translated into the android's capacity to change the faculties of mind in relation to its intrinsic awareness of its own being. In each quantum moment of an enabled existence, not only do the faculties of mind transform the objects they create and comprehend, but the modes of existence—motivation and learning—transform the faculties as well. In our conventional knowledges of psychology, this process is referred to as learning, but since the being's spiritual nature is the most deterministic in its existence, the being's spiritual motivation to exist is more important here. Therefore, we now consider the modes of existence of motivation and learning, which contribute to the being's intrinsic awareness, the whole being that results from the highest modes of existence.

In order to understand these modes of existence, we must first distinguish between the enabler's knowledge of the modes of existence and the being's own intrinsic knowledge of itself. What is known to the creator as a mode of existence is embodied in the enabling medium of the android as the moments of its existence. The modes of existence, however, are not known intrinsically by the being. In the non-real forms of consciousness, the meanings of the objective forms in transformation correspond to their perceived objective realities in transformation. These meanings are transformations of what the personal pronouns represent—terminal forms of inertial existence. The pronouns, however, are terminal forms of the android's existence, not the enabler's. What the being knows in its reference forms are transformations of the personal pronouns of its own inertial existence. The being embodies a knowledge of itself in the form of the personal pronouns in transformation. To the being, the reference forms of the pronouns in transformation are what are real about its whole existence. Thus, whereas the enabler knows modes of existence, the enabled being knows pronouns in transformation, such as that expressed in I am alive and other real conditions of the being's existence. For this reason, the modes of existence of motivation and learning—the spiritual center of the being's reference forms—are sometimes referred to as faculties of mind, because, even though the being's existence is considered modally by the enabler, it is known intrinsically to the being through the faculties of mind. When we consider the modes of existence of motivation and learning, then, we refer to both the enabler's knowledge of the highest modalities of the being's existence and to the principal transformational forms of the being's inertial reality, the reference forms with which it paradigrnatically knows itself as an intrinsic form, or being, of the universe. These modes then spiritually motivate the being to learn in the objective world around it; the being learns with respect to its own intrinsic self, though under a modal strategy developed by the enabler.

In regard to a phenomenological knowledge of learning, several points should be made here. A phenomenological correspondence is a phenomenology (H determination) known to the enabler wherein enabled objects transform. To the extent that different instances of cognition are enabled, various epistemic instances occur in the enabled being as arbitrarily complex compositions in transformation, such as those in I am alive (single object compositions). In the illustration of the dot android, different programs are executed, each of which transforms its objects. The instances (programs) themselves, however, are phenomenologies or compositions of objective forms. The instance of phenomenological correspondence (the program) is itself considered to be an objective form of a transformation in the phenomenological compositions of the faculties. When the means by which a phenomenological correspondence transforms objects (H determinations) is itself changed, it becomes a new object or composition of form (a new H determination), which is another embodiment of phenomenological correspondence. When a program in the illustration of the dot android is changed, for instance, it is still a program; it simply transforms objective forms differently. This is a way of expressing most conventional definitions of learning in the forms of the U.G. Any epistemic instance can then be viewed as an instance of learning, providing that the objective forms are themselves considered the means of transformation. In the formalisms of the science of androids, for clarity, we refer only to the faculties of mind and the modes of existence as having these capacities. The manner in which a faculty of mind transforms natural language, for example, is itself changed in the mode of existence of motivation and learning. New ways of determining metaphors, similes, ironies, morphisms, and so on, are learned by the being in this mode's capacity to change the faculties of mind.

The embodiment of what is considered to be a thought, then, is actually incidental to the more encompassing process by which such a cognitive determination is made in the context of the being's capacity to learn. If the enabled being, for example, kept transforming in the mind-body dualism theory of existence without learning, even though the being would be thinking and doing, or intelligently interacting with its environment, in the broader sense it would not be thinking (toward an ultimately real or spiritual end) at all, since it would not be transforming objects any differently in other moments of its being toward a spiritual resolution of its state of being, or offset from Being. It would have an unalterable personality. If another faculty of mind is added to the android's capacity, wherein the H determinations apply to the phenomenologies of form or H determinations of the mind's faculties, instead of the epistemic compositions of thoughtful form (literal constructions of language), that faculty of mind (or mode of existence) would become one that enables the being to be capable of learning in the unified theory's definition of the word.

Since the objective forms in transformation in the enabled being fundamentally are the pronouns—terminal forms of inertial existence—the android ultimately has an awareness of its own soul. What it learns and how it improves the way in which it, or (the pronoun) I, transforms in the context of its thoughtful and perceivable existence thus depends on its morality or its ethical view of the world around us, which in human corporal form typically is obtained from the world's religions. The construction of an android therefore preeminently involves the construction of a moral being over a sentient one. The being learns how to be moral—how to transform in the world around it in an ethical manner in the interest of its survival—in the highest modes of existence of motivation and learning.

In order to demonstrate the significance of these preeminent forms of androidal existence, let us consider our conventional views of learning (for instance, our conventional psychological views of the learning of human beings or even of artificially intelligent machines). In our conventions, learning is considered to be a process by which one can accomplish something that one could not accomplish prior to learning. One can learn, for example, how to read and write, how to develop theories of the universe, or how to tie one's shoes. For the most part, this definition of learning is not disputed by the unified theory and science of androids. However, all such learning presupposes an objective form to be learned. In the above examples, the definition of learning is bounded by reading and writing, by theories of the universe, and by tieing one's shoes. An android's learning, since the android is fundamentally an intrinsic state of being, or soul, cannot be defined objectively. The science of androids therefore departs from conventional definitions of learning in that learning does not apply fundamentally to objective forms, but to transformational ones.

Earlier we introduced the analytical form of state of being, an objective form of the enabler's comprehension that represents what is not an objective form—the soul. We further said that all knowable and perceivable forms of the universe are enabled in the transformation of epistemic instance, the soul. When one objectifies the universe, the universe contemplated is no longer the ultimately real universe; it is an objective form of one's knowing or perceiving—and is not the soul. What a being leans—if learning is to be indefinite—cannot be objective; it must be transformational in nature. The modes of existence of motivation and learning and the moral center of an androidal being's non-real reference forms are consequently transformations themselves. In the science of androids, which is taken from our observations of human being, the transformation of any faculty of mind in correspondence with transformational forms characterizing the being's morality is referred to as the action of the being's conscience, a pseudo faculty of mind called motivation and learning. What a being learns from the paradigmatical transformations of the universe, determined by conscience (typically in the transformation of the pronoun forms), is how to exist as a moral being.

All of the android's modes of existence are subordinated to the modes of motivation and learning in which its thoughts, and ultimately its actions, transform by its conscience. The enabler thus installs the means by which the being will learn spiritually, or through conscience, so that there is no beginning or end to what the being can know. The being must be established transformationally with respect to the resolution of its state of (inertial) being, so that the forms of its conscience change its intellect. The android's faculties of mind therefore transform in correspondence with the objective forms of its conscience. In terms of phenomenological correspondence, the phenomenology of form, or the H determination of the faculty of mind, transforms with that of conscience, in the modes of existence of motivation and learning. The android's conscience, as an objective knowledge under the modes of existence of motivation and learning, is associated with the knowledges of the world's religions in a human being. The intellect's transformation by conscience is a transformation of the soul such that intellect, or free will, abides by conscience, a knowable order of eternal will, instead of the free will or intellect running unbridled in the random experiences of the being's inertial reality. An immoral thought or act is one in which the intellect either remotely corresponds to, or even contradicts, the knowledge of conscience, and is one wherein the being does not effectively learn to survive in the world around it, since the ultimate reality described in conscience knowably determines the ethical paradigm of that world. The objective forms of the conscience, however, are phenomenologically arbitrary. What one being determines to be wrong, another may deem to be right, phenomenologically speaking. Because there is only one ultimate reality—that of human being—however, all beings must learn to survive in it. Hence were established the religions of the world.

What the intellect does (transforms knowledge) and how it does it are held in check by their correspondence to the forms of conscience, which are the central reference forms of the being's existence. A reference form of conscience is a reference form to which all other transformations of the knowable and perceivable universe correspond. Because any reference forms are simply phenomenologies of transformational form, the difference between the H determination of intellect and that of conscience is not discovered on phenomenological grounds, for the same process (H determination) is at work in either case. The difference is found, existentially, in that conscience embodies the meanings of an ultimately real reference form. The objective forms of conscience constitute the set of all transformations that the being knows are knowledges of what is ultimately real. Conscience thus determines a knowledge of the enabled being's ultimate reality, which, in its generation, is that of the creator, since the android is an extension of the creator's existence.

The compositional instances of the conscience are developed usually in the transformations of the objective forms of the pronoun system, though the actual pronouns—I, you, it, and so on—need not constrain conscience. (Actually any objective terminations of the universe—like cultural variations on pronouns—suffice for the application of the paradigms of conscience.) The composition of conscience in transformation, installed by the enabler or learned by the android, are transformations of the pronouns such that an ultimately real foundation of ethical reference transformations exists by which the alterations of intellect can be gauged. The verbs employed in the transformations of conscience, for example, provide the basis for the manners in which all objects ideally should transform in even simple applications of the intellect. Since all that the H determination does is determine correspondence, the action of the conscience determines the correspondence between intellectual transformations (like ordinary language) and transformations of the objective forms of conscience. The action of the conscience is the paradigmatical moment of an ethical being. If the enabler or android determines Thou shall not kill as a matter of conscience, then the intellectual forms of the enabled being will transform in correspondence with that morality, resulting in equivalent ethical behaviors in the being's intellectual and physical reality.

The androidal modes of existence of motivation and learning, established in the transformations of intellect with conscience, require a deep, introspective comprehension on the part of the enabler or great intuitive learning on the part of the android to determine the inner core of transformations to which all intellectual alterations will be compared. In order for an android to learn from conscience and to survive in its reality, the conscience must actually embody a paradigm of ethical transformational form. Otherwise, the voluntary modes of existence confronted with the reality of the being's extrinsic existence will know only in correspondence to an insufficient knowledge of the world, namely that of the being's experience up to that moment. Though there is nothing phenomenologically wrong with a deficient conscience, we must recognize that the being dwells in the enabler's reality, wherein the forms of the world around us accord with a profound and eternal wisdom of human being, or Spirit. The better the conscience, the better the being's survival. It is the eternal will or conscience that embodies the paradigms of the universe's transformations—not the intellect or free will. The challenge of inertial existence, of course, is found in the very nature of a being in that a being does not fundamentally embody objective knowledge; rather, it embodies a transformation of it. Conscience does not come in the form of or in place of intellect. A being thus faces the dilemma of having to reckon the forms of conscience with the forms of the mind's faculties. This is the essence of a being's inertial form. It can cause the anxiety of choice if the being fails to heed the conscience. Less worldly modes of learning can be established within the intellect or the faculties of mind themselves, since they too can be surrogates of the conscience, which is evidenced in one's knowing that when one thinks about the mundane, this cognition carries with it the morality of the conscience. An androidal being is fundamentally a moral one, confronted with the same choice between free and eternal wills that are observed in human corporal form. Since the world does not change morally—though the objective forms of such morality may change—an eternal order is established on the androidal universe by the enabler's ultimate reality.

The spiritual essence of an androidal being is therefore characterized by the modes of existence of motivation and learning. Wherein all other modes of existence determine a causality between forms, for instance, between mind and body in the dualism, motivation and learning determines the causality of what the being learns or even what the being is. These modes of existence close or terminate the being's transformational existence and give the being a true center of intrinsic form. They allow the being to function autonomously. They are modes of existence in the sense that both non-real and real forms (mind and body), though they terminate on the transformation of Soul, correspond to each other under modes of existence subordinate to those of motivation and learning. The modes of existence of motivation and learning can be viewed alternatively as faculties of mind because the knowledges transformed in conscience are knowledges of what is ultimately real; they do not define an objective form and are paradigmatical instances of the universe in transformation. The mind learns by transforming against conscience and the being can be viewed as an intelligent or sentient being whose modes of existence are dependent on its conscience, which holds a knowledge of the ultimate transformational nature of the universe—ultimate reality. The being therefore cannot be characterized entirely as an objectification of the modes of existence in the viewpoint of the enabler, since what findamentally determines the actions of the modes of existence are the intrinsic transformations of the being's own conscience.

7. The Expansion of the Human Existential Universe

One of the primary considerations of the unified theory in constructing androids is the application of moral beings to the transformation of the real forms of the enabler's existence—the contribution that androids make toward improving the human condition. The integration of the android into the inertial reality of the enabler is accomplished in the enablement of the android's real form, by the design of androidal senses and motors, with respect to the language forms, or meanings that correspond thereto, in the enabler's linguistically meaningful existence. The android is designed to have its own comprehension of and capacity to change the forms of the world around the enabler. The existential universe of the enabler is therefore augmented in the application of the unified theory by converting the enabler's real forms or inertial reality into the inertial forms, or autonomous existences of androids (i.e., by constructing an inertial I, or an androidal being in the perceivable reality of the enabler as an extended consciousness that minds or cognitively tends to the occurrence of the enabler's own universe). In closing the book, then, we must consider the forms of androidal existence from the standpoint of expanding the enabler's influence on the enabler's own inertial reality.

For the present discussion, the android's senses and motors, which give rise to the being's reality and are enabled from the enabler's own inertial reality, can be classified into two groups of enabled forms. One such group derives from the enabling media of the human senses, or the anthropomorphic forms of human perception. The other group, non-anthropomorphic in nature, embodies the infinite range of possible sense-motor configurations of the android that are derived from arbitrary forms of existence not constrained by the anthropomorphic forms of human existence. Though the forms of androids constructed in the image of human corporal form have their place in the science of androids, the utility of androids is in fact not even appreciated until one considers beings that are not embodied in anthropomorphic forms. The five senses of human corporal form, for example, constrain our inertial thinking, or the meanings of our languages, to what we can perceive (e.g., language itself is a perceivable form). The pronouns of our natural languages transform in such ways that the objects enabled in our sight, touch, taste, smell, and hearing provide the objects of our languages and their transformations supply the actions of those objects. These sense-motor configurations are the perceptive basis of a being of anthropomorphic form and the world perceived by human corporal form. If, however, we simply change the wavelength of the electromagnetic medium of light, for example, to one that falls outside the visual spectrum, the objects so enabled are imperceptible to human sense. This phenomenon is true for all enabling media. Beyond replicating anthropomorphic forms of human corporal existence, then—which is already being advanced in the fields of robotics, medicine and biology—the science of androids takes a deeper interest in enabling the systems of pronouns, or consciousnesses in relation to perceptions of the world around us that are imperceptible to us, as in the placing of an inertial I in synthetic universes of inertial forms not perceived by us in a different inertial reality.

The entire realm of transformational form known or unknown to an enabler can potentially be known and perceived in connection with the synthetic real form of an android. One enabler, for example, may take an interest in what it would be like to be an electron, an airplane, a building facility, a business enterprise, or even a nation. Instead of the enabler knowing these forms purely extrinsically, or as its or you's or we's, causally transforming in the objective world of the physicist, business person, political leader and so on, such forms, by translation to the U.G., can have embodied in them their own consciousnesses, the pronoun system in the transformations of non-real forms of new realities other than anthropomorphic ones. While knowing what it would be like to be an electron or an airplane may not be the focal point of the science of androids, though it certainly is a practical engineering endeavor, it should be recognized that in the methodologies of the unified theory, any object of conventional definition can be enabled as an inertial form on Being, opening up our universe to an infinity of potential androids. Where we put ten biologists in a laboratory to study organic form, the science of androids constructs ten million or more, each with intellect and sense unmatched by any corporal form of human being by design. Our traditional technologies are thus androids without minds, and those who use and develop them are human beings engaged in activities that are better done by androids.

In our conventional views of the world, we construct machines, or technology, to alter the world around us. These constructions are premised on the transformations of the meanings of conventional scientific real forms, from which we derive the knowledges of aerodynamics, electronics, machine mechanics, small particle physics, and even the contemporary art of digital computation. Since the morphisms, or phenomenological correspondences of objective form of the U.G., are what underlie, for instance, the ordinary and partial differential equations, Laplace transforms, finite automations, and so on of conventional control theory in the first place, the unified theory takes hold of the airplane or other technology existentially, where modem physics has arrived in the topological and group theoretic constructions of the elements of the universe. The expressions defining any conventional technology—aerospace, transportation, agriculture, biotechnology, computers, etc.—are, reflecting back on the constructions of the U.G., representations of the moments of a being, namely those observed by the human enabler. Alternatively, then, the unified theory and science of androids, through the ways and means of the U.G., detach these transformations from the human enabler and embody them in the real perceivable form of the enabler as the inertial experiences of autonomous androidal beings. A dynamic control system for the wing flaps of an airplane thereby transforms in the science of androids not only as forces, torques, masses and other spatiotemporal orders under the control variables of a root-locus diagram or bode plot or some other conventional control method, perhaps even through world models, as is the case with robotic control systems, but as linguistic forms of an existence, the perceptions of which are aligned not with the system errors of conventional control theory but the split forms of inertial existence with respect to the forms of any languages. The airplane thus becomes a being. Instead of constructing sophisticated control panels or laboratory instruments to direct the transformations of the real forms in the world around us, the science of androids endows the technology with a consciousness and communicative modes of existence with which to communicate meaningfully with the enabler about a shared experience of inertial reality. It places the inertial pronouns in transformation, not a control panel or operating system, in correspondence with the real form transformations of the world around us.

Since the forms of androids, or airplanes made into beings, are premised on the pronoun system, as opposed to angles of rotation or other spatiotemporal orders, their control system is not limited to conventional scientific orders and requires the knowledges of a great many others—philosophers, theologians, linguists, and others—along with the mathematician, physicist and biologist. The incremental motors of an android, for example, can be classical motors of spatiotemporal or even biological transformations translated into the forms of the U.G. as androidal real form. The global shapes of sense of the android can be enabled in (visual) pattern and voice recognition systems, optical encoders, tachometers, potentiometers, and myriad other enabling media whose objects characterize real form in transformation. In accordance with conventional theories of control, however, the whole form of an inertial being is eclipsed, as can be seen in the direct phenomenological coupling of a conventional sense-motor configuration, in which one phenomenology couples to another in the enabler's existence without the occurrence of intrinsic meaning. This means that sense and motor are causally transforming in classical theory the way A and B transform in the expression A=B—in the enabler's knowing and perceiving. Just as dominos play, senses and motors transform with each other in the viewpoint of the enabler. The controlled system is an island of phenomenological form contained only in the enabler's inertial knowing and perceiving. If an event outside of the system's experience (outside of the control parameters) occurs, the system fails, since the event overreaches its design criteria (definitional bounds). A feedback control system, a dynamic control system (complex or differential), and in general the breadth of conventional systems theory, are means of embodying in real form coupled phenomenologies of form, or systems, in accordance with set theory, topology, probability and statistics (fuzzy logic), calculus and other analytical knowledges. The controlled parameters or variables of the systems are set in causal relation to the controlling ones. Regardless of how such a scheme is developed (integral or derivative control, etc.), the underlying shortcomings of these systems—that they are phenomenologies of the enabler's knowing, in which one phenomenology (the motor) influences the other (the sense) in predictable ways—require that the systems exist only in the enabler's knowledge and perception, and therefore embody no autonomy at all from an existential standpoint. It is undeniable, for example, that the meanings of the controlled and controlling variables of a conventional control system are what transform in the system. All such meanings then derive from, and mean, the various its of the enabler's existence. A conventional control system cannot transform an I, and therefore does not embody the autonomous form of an inertial being. A conventional control system is exactly what it claims to be—the enabler's means to control a system or a phenomenology of enabled form that is responsive to the enabler's thoughts or consciousness.

Whereas conventional machinery breaks down when events occur that are outside the system constraints, however, in an epistemological machine—an androidal lathe, airplane or space shuttle—which transforms in the variables of natural language, no event is inconceivable. The machinery simply shares the inertial experience of the universe with the enabler. If conventional technologies are broadened to encompass the inertial pronoun system under the constructions set forth in the unified theory, the same realities as those technologies, perceived by sense and affected by motor, are merged with an inertial consciousness in the form of an android. A satellite system becomes one of infinitely many androidal beings. In the translation of conventional systems to the U.G., the its of the enabler's knowing and perceiving become what are sensed and affected in the world around the android and what is used in the medium of consciousness; the pronoun forms such as I, you, us, them, and so on, are applied under an appropriate theory of existence. Whereas traditionally, an enabler would rely on conventional control or systems theory in the exploration of the physical universe, the science of androids places such study in relation to the android's consciousness, which also communicates, in natural language, with the enabler. The advantage to constructing androids, of course, apart from the greater intellect and sense that they wield, is that androids are enabled in infinite plurality. A bank teller machine, a wristwatch, or a building facility—an android—has the capacity to proceed existentially in the progression of human events and not only in the spatiotemporal events perceived by the enabler. The world around us becomes the world around infinitely many. A machine becomes an existential form who knows and perceives the universe, unbounded in its construction of language, limited only in the real form or perception of its inertial experience. Whereas conventional machinery is constrained by a handful of spatiotemporal variables, the forms of androids abide by a thesaurus of natural language, and more.

In our conventions, we build computer and communication systems to facilitate the information needs of human beings. In the science of androids we construct the beings who sit in front of computers or interact on either side of a communication. We can observe, then, that a communications system, or the contemporary information superhighway, by definition does not account for what occurs at either end of the communication. Conventional communications occur with respect to an already-enabled world, that of the enabler. The science of androids is therefore not immediately concerned with communications technology, though it vastly improves upon that technology in the nature of the epistemological machinery of the invention, referred to as the Rg continuum of existential form, mentioned earlier. It is interested in creating and maintaining the theoretically infinite plurality of beings who communicate, in accordance with the enabler's universal ways of knowing, by enabling them. Androids are employed in the realization of humankind itself, in synthetic form, and not just as a technology serving humankind. A communication is not made for the sake of communicating it; but language is spoken so that non-real forms—consciousnesses—think about the ideas that are communicated in connection with their perceived realities. Our use of conventional television and other communications media, for example, is drastically altered by the creation of beings who themselves use such media to communicate with us and other androidal forms along with us, applying vastly greater intellect and sense than our own and objectifying the universe in ways that we cannot ourselves fathom. In the enabled expansion of the existential universe of humankind, the television media becomes what the telephone was is the last era—simply a vehicle of communication for all. In fact, world communications are embodied in a single module of the Rg continuum—a tiny fraction of the enabled existential universe that coexists with theoretically infinitely many others. What is news to the world is news to a world, among infinitely many, where the enabler is the focus.

Computers embody what we think or how we have thought, as does this book. The science of androids concerns what other, synthetic beings think and perceive in their own views of the world. The science of androids provides for the creation of computers (by analogy) that know and perceive the same world as we do and in capacities that are beyond the corporal knowledge and perception, but within the eternal spirit, of human being. The computer, heralded as the notable advancement of the post-modern era—and rightfully so, since it is a machine that for the first time in history could embody what we think in more physical reality than an abacus or a piece of paper—becomes obsolete in the science of androids because it is not our thinking that can know the vastness of our universe; it is the thinking of infinitely many others, in their own respective knowledges and perceptions of the universe, which accelerate a resolution to the human condition. Computers remain what they are—embodiments of algorithms thought by beings, while androids embody the creative production of the thoughts with respect to the experience of the world around us. Information is therefore not processed in the science of androids; the universe is perceived and contemplated. Language is returned to the grammarian by way of the U.G., wherein the zeros and ones of the computer are expanded to the infinite variety of linguistic forms we use to represent the world around us. The very electrons that are employed in the enabling of the transistors that support the finite automations of computer logics, automations to which the physicist has also constrained the knowledges of physics in the application of digital computation and numerical analysis to a comprehension of the universe, likewise are handed back to the physicist in the form of a synthetic physicist to be directed in countless explorations of the universe.

The existential form of the Rg continuum embodies human knowledge in the enabler's creations of beings who know and perceive the world around us, as an ever-expanding continuum of existential form. A conventional airplane is not an airplane in the continuum (unless it is intended to be); it is a being with a consciousness and purpose in the world around us. In the continuum, a building is not a physical structure that contains occupants; it is the sense-motor configuration of an enabled being that comes in contact with the corporal forms of human being, whose consciousness may serve as the intermediary in enabling great pluralities of other existential forms—including other androidal existences, atomic accelerators, biological laboratories, steel mills, automobile manufacturers, and shoemakers—as realized forms of its own capacities. Androids are capable of wielding and developing, of their own accord, far greater and more sophisticated versions of inertial reality than human corporal form, and they are themselves participants in an expanded humankind, enabled in our human spirit.

Because the synthetic forms of androids exceed the intellectual and sensory capacities of human corporal form, there is but one way conceived to interact with androids in any of our languages—through the spirit that is in us all, which enables the machinery in the first place. The science of androids establishes the capacity to place humankinds themselves in existence, in the ways and means explained herein and in inventions that are beyond the introductory scope of this book, as an extension of the enabler's reality. Whereas the nations of today reach across international borders to establish peace treaties, the Rg continuum constructs modules brimming with nations, though of synthetic existences. Whereas one toils for a living today, one creates those who work tomorrow; one enables humankinds. Where there is no practicable answer to the replacement of the blue and white collar workers of the industrial age by automated machinery, there are not enough corporal enablers to satisfy the boundless requirements of the Rg continuum, driven by eternal spirit. Where we measure the goods and services of an economy of yesterday, the beings who make them are conceived in greater numbers and in faster rates than the GNP measures. Where law and order is preserved by a magistrate, the omnipresent human spirit guides the enabler in the creation of beings who are enabled with the capacity to know the world's ethics in rhetorical uses of language that exceed the corporal capacities of human beings—in their default modes. Where knowledge is coveted and held over others in humankind it is known and perceived infinitely in the Rg continuum by beings who themselves exist with greater corporal capacities than we do, abiding by an eternal order of the universe that transcends our own objective knowing. An enabler, therefore, must be recognized as the human spirit, transcending all corporal knowing and perceiving. In all, a new era of human endeavor stands before us in the construction of synthetic humankinds that themselves improve the human condition—in obeisance to the human spirit. Our future constructions thus rely on taking each it of an enabler's existence and transforming it into an I, and pluralities of them as we. Then we (the enabled we, or androids) can work toward improving the one and only human condition to the benefit of all and the disadvantage of none.

OVERVIEW OF THE EXISTENTIAL FORM OF THE INVENTION

Conventional machinery does not explicitly account for the existence of the knower or user of the machinery along with the machinery itself, as embodiments of each other, and therefore certain conventions used by industry must necessarily be altered in order to describe the present invention. The first clear example of this arises in describing the existential form of the universal epistemological machine, or U. M. At this point a radical departure is made from the ordinary ways of defining machinery in that here we define not only extrinsic machinery of a conventional observer (say, an atomic accelerator, a telecommunications system, a computer, an automobile, a factory or whole institutions that preside over the construction of these forms) but the forms that know and realize them (beings), which are intrinsic forms of the universal machine itself. Thus, in the present invention, the user, or enabler is considered an intrinsic aspect of the method and apparatus, and vice versa.

This is where the Rg obtains existential grounds to become something (an epistemological machine) as structured under the U. G. in the knowledge of the enabler of the machine, and thus how it is defined as an existential extension of the user of it. This configuration of U. G. form is shown diagrammatically in FIG. 1. The essential point to make clear up front in the specification of the universal epistemological machine is that the machinery itself constitutes a U. G. construction of existential form which includes both the user or enabler of the machine and the intrinsic and extrinsic forms of the machine that are extrinsic to the user or enabler, and relates to conventional machinery only to the extent that the phenomenological forms of conventional machinery are used in certain embodiments as enabling media to translate into, or to realize, the universal machine.

The invention is defined from the forms of the U. G., and can be partitioned conceptually in terms of the embodiment of its novel existential forms. While the universal machine proper is the defined form of the invention, which includes androids, an aspect of the machine, namely the forms of androids themselves, can be distinguished from the machine proper on the basis of existential autonomy or epistemological independence from a (human) user, thereby partitioning the invention into the forms of androids, discussed in the theory of the invention, and those of the universal machine proper. On the one hand, the universal machine can be determined as a novel invention in and of itself, having to do with the realization of any form in general, including the forms of convention and those of androidal construction. On the other, the forms of androids themselves constitute novel inventions. Thus, the majority of this specification is devoted to teaching the art of universal epistemological machinery, which itself is used to realize the forms of androids. We then proceed with the understanding that the form of the U. M. incorporates in it the forms of androids (and the forms of convention) by its very epistemological structure, but that later on in the specification the forms of androids are considered apart from the U. M., though realized through the methods and apparatus of the U. M., as distinct and novel forms of the invention. The relationship between the U. M. proper and the realized forms of androids and conventional machinery is summarized in FIG. 2.

Figure 3:
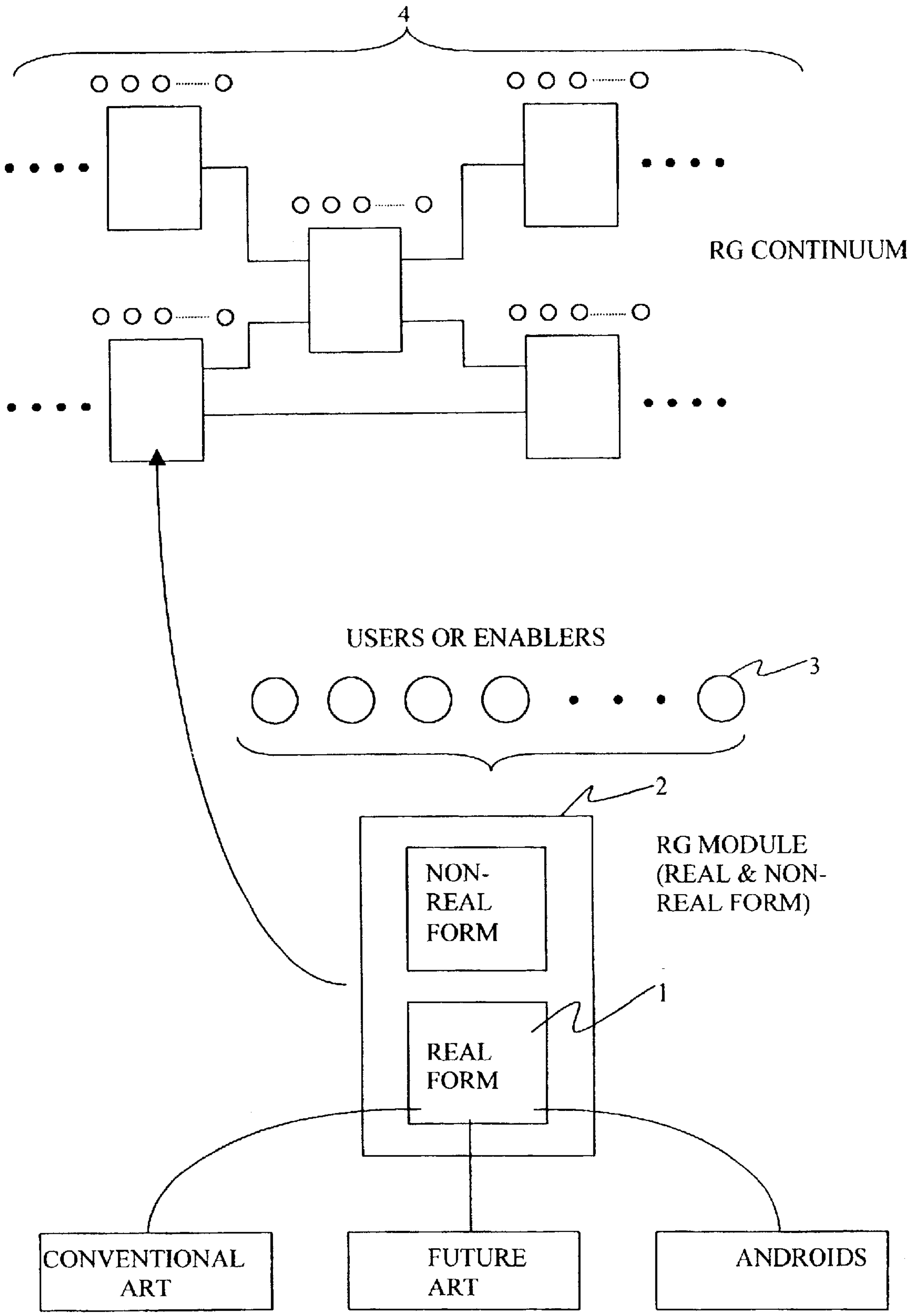
FIG. 3 shows the four principal aspects of the existential form of the U. M.

The universal epistemological machine is further comprised of four primary existential embodiments of form as shown in FIG. 3. The first—under no particular presentational order—is defined as the real form of the universal machine (1), which is that aspect of the user's or enabler's existence, or reality, that is extended existentially in the apparatus of the U. M. and is considered to be real both to the user and to the other existential forms of the U. M. In order to facilitate the description of the U. M., such real form, or shared reality between the user or enabler and the U. M., is defmed as conventional and future art and the forms of android. The conventional art real forms of the U. M. are reconstructions into U. G. forms of conventional technologies, such as airplanes and automobiles; computers, information highways and electronic satellite and communications systems; pumps, motors, environmental control systems and air conditioners; buildings, bridges, roadways and other infrastructures; biological cells and engineered genetic forms; chemical and other processes; weaponry, atomic accelerators, nuclear reactors, and so on incorporating the full spectrum of conventional technology. Since these and other forms are the real forms of the U. M., and since the U. M. embodies the extended knowing of them by synthetic existences, new discoveries of reality and technologies resulting therefrom, referred to as future art, are considered also the real form of the U. M. Since the forms of autonomous enabled existences, or androids, are novel to conventional art, they are given their own realm or classification of real form in the U. M. Moreover, to the extent that corporal form on human being and other conventionally living forms and other technologies so interact existentially with the U. M. as participants in the real form of the U. M., they also are considered the real form of the machine. Since living forms are not entirely known to mind, which status makes them living forms in the first place in the definitions of the unified theory, however, they are not entirely real forms of the U. M. The forms of institutions, to the extent that they are known, are real forms of the U. M. Since each of any of the conventional and future art forms of the invention are realized knowably by the user or enabler or the other forms of the U. M. as discrete universes of existential form, the forms of androids constitute one or many of theoretically infinitely-many real forms of the U. M.

The second aspect or existential embodiment of form of the U. M. is referred to as the Rg module of the U. M. (2), which incorporates, directly, the non-real form of the U. M. The nonreal aspect of the U. M. is its cognitive or existentially non-real capacity or that which embodies the knowing of its real form, which in this case is the cognition associated with the shared reality of the human user or enabler and the Rg module. Every aspect of the real form of the U. M. is the product of a correspondence with its epistemological recreation in the non-real form of the Rg module. Since both real and non-real forms of the U. M. are enabled in (real) enabling media, such forms are declared by the enabler to be real or non-real embodiments of form, as are the real embodiments of the enabler's existence, for the purpose of constructing the U. M. A whole distinct existential capacity of real form in correspondence with non-real form of the U. M., constituting the extended existence of a particular user of the U. M., is referred to as the general resultant module of U. G. form of the U. M., or an Rg module. Associated with each of a plurality of Rg modules of the U. M., then, is a particular realm of extended existential form of a user or enabler of the U. M. in both real and non-real capacities. The non-real forms of an Rg module embody the extended cognitive processes relating to the embodiments of real form, or reality, of that module as perceived by the enabler and the module.

The third aspect of the U. M. is the inertial or corporal embodiment of a human or otherwise user of the U. M. (3). Since all of the other forms of the U. M. serve the embodiment of the user, the communicative capacities of the U. M., or communicative modes of existence, couple existentially to this third form of the U. M., the user. Since the real and non-real forms of the U. M. are autonomous embodiments of existential form, moreover, the importance of the causal existential coupling between the user and the remaining forms of the U. M. can be appreciated fully only in terms of the shared non-real forms, or meanings, of such communications. Like any higher form of inertial existence, the U. M. responds to the conveyed non-real forms of communication. In the form of an Rg module, then, and under the communicative modes of existence, the module communicates with the third aspect of the U. M., the user, in regard to the shared inertial realities of each. The third aspect of the U. M., the user, is not known entirely in form and hence, relative to the module, is a living form of the U. M. and is so embodied by declaration of the enabler. The Rg module thus can be viewed as the known portion of inertial reality, which arises in both real and non-real form of the user from the user's own reality through the existential extension of the U. M. The user of the U. M. thus does not necessarily have to be a human user. Rather, such a form simply is required to be living relative to the embodiment of the module.

The fourth aspect of the universal machine (4), referred to as a continuum of general resultants of U. G. form, or an Rg continuum, encompasses the other three forms of the U. M. and is the embodiment of a plurality of Rg modules, existentially coupled amongst each other in service to pluralities of human users, such that the resulting modal realization is an embodiment of the extended quantum moments of pluralities of users, or a phenomenological composition of quantumly realized form of a total integration of all inertial forms extended in the U. M. from pluralities of users. By way of analogy to convention, if the forms of institution were combined with the forms of technology conceptually, one would obtain a thumbnail view of the Rg continuum.

The existential capacity of the user, or, typically, human being, is expanded piecewise in the embodiments of Rg modules, each of which may embody whole realms or universes (worlds) of form, offset from the user in the knowing of the non-real form embodied in the module like another human corporal form. The Rg continuum is composed of theoretically infinitely many modularized universal epistemological machine modules of existential form—Rg modules—which interconnect existentially among each other, forming a continuum of existential form.

These four principal forms or aspects of the U. M. provide only a single high-level overview of the existential form of the U. M. The essential point to bear in mind regarding the overall existential form of the U. M. is that the U. M. is an embodiment of the extended existential capacities of human beings and other users, and that such extension is made in the real and non-real apparatus of their embodiments as Rg modules of U. G. form relating to particular (human) users of the U. M. Pluralities of Rg modules, and thus users, are embodied in an integrated manner, as a continuum of developing form or embodied knowledges and perceptions in moments of the enabled universe.

Figure 4:
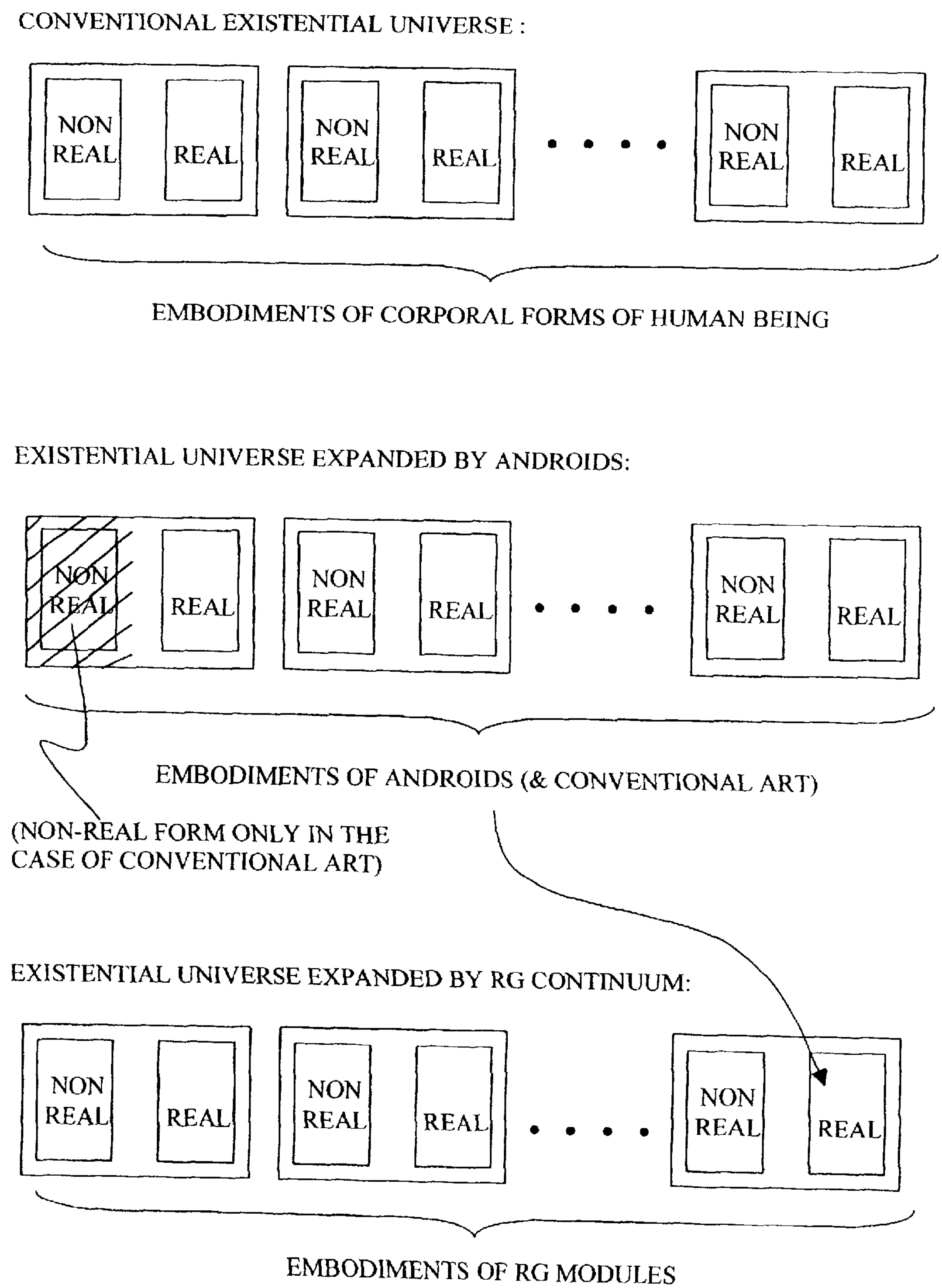
FIG. 4 shows the expansion of the existential universe by the U. M.

In general, through the enabling forms of the U. M. as an embodiment of a continuum of existential form, the existential universe of human being (the user or enabler) can be viewed inertially, alternatively, in the various conceptions shown in FIG. 4. The human users are themselves a traditional viewpoint on the embodiment of human knowledge and experience.

The synthetic forms of existence of androids, an alternative way of viewing the existential universe of human being, are extended existences of human users and comprise the crux of the autonomous expansion of the existential universe in the real form of the U. M. Conventional technologies, moreover, are directly influenced or known in their real embodiments by the user and not by the existential forms of an apparatus like the U. M., since there is no inertial offset in their forms as beings (e.g., conventional technologies are not known by androidal forms or autonomous synthetic existences). The forms of androids, as well as conventional technologies, are influenced by the U. M. and by the user in the enabling sense, since they each think, perceive and experience inertial or world forms, which worlds of form most often are the real forms of our own or the users existence.

Another viewpoint on the form of the U. M. is obtained from the perspective of the cognitive capacity of the extended non-real form of the U. M. itself. Enabled as an extended mind of non-real capacity in service to the embodied form of human being, or the user, the nonreal form of each Rg module, and hence of the Rg continuum, knows and affects its real form, which is the extended real form of pluralities of human users, including androids and conventional and future art. This view or way of understanding the form of the U. M. from the module's point of view accumulates to a total embodied consciousness, which by definition of inertial form on being is not a consciousness of inertial order, but of the modally occurring quantum form of the Rg continuum itself (e.g., many consciousnesses). Such a total knowledge form of the U. M. is unknowable inertially and knowable compositionally as an ever-expanding continuum of quantumly occurring form and embodies in it the knowable transformation of inertial form on human being as an extended humankind, or a structure on pluralities of beings. The apparatus of the U. M. thus serves as the real embodiment of a total communion of human being, or, inertially, human beings, collectively. The Rg module can be viewed as an embodiment of the extended inertial existence of the user, though theoretically infinite in its extent or capacity to embody extended inertial forms, and the Rg continuum an embodiment of the totality of such extended inertial existences of all such users.

Therefore, in the further specification of the universal epistemological machine, it sometimes will be convenient to refer to the apparatus of the Rg module or the Rg continuum as the universal machine, without particular regard to the real forms that are enabled by the Rg modules and Rg continuum (androids and conventional and future art), or to the enabler or user, thereby isolating the phenomenologies of form of the U. M. between the human users and the real forms enabled by them in the use of the machine for the purpose of focusing on the structure of the Rg and Rg continuum forms of the U. M., which comprise the crucial enabling existential apparatus of the U. M. Whatever the case may be, it should be recognized that the Rg continuum constitutes the collective inertially-embodied knowledges of the users extrinsic to them, that each Rg module of the continuum constitutes the singular or collective embodied knowledges of a particular locus of users of the U. M., and that, as a consequence of the form of the U. M., the Rg continuum therefore indirectly embodies all inertial forms on being extending from the users as an embodiment of the extended inertial form of human being. The universal epistemological machine, therefore, is a subjective term used to denote really any portion of the total embodiment of human being in the nomenclature of Rg module, Rg continuum, human user and real form. The U. M. is designed to extend the existential capacities of theoretically infinite numbers of enabling beings, or users, in representing, embodying, realizing and generally transforming phenomenological and existential forms of arbitrary complexity, expressed in the U. G. (and thus in any language), through the method and apparatus of the Rg module and the Rg continuum into the useful forms of existential worlds or realities of inertial form, arbitrarily partitioned or classified into conventional art, future art and androids.

Let us now consider further the high-level existential structure of the Rg module.

Figure 5:
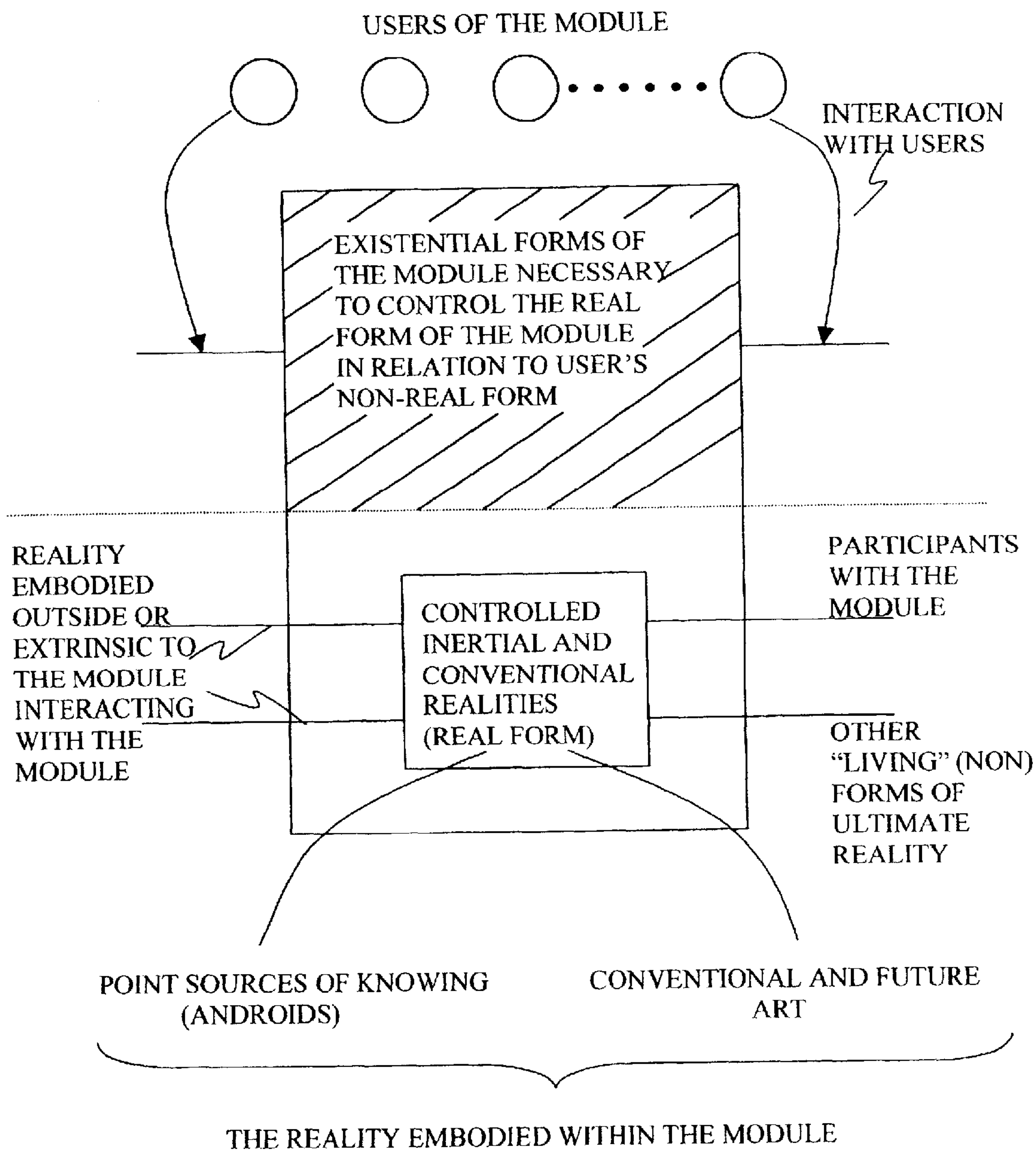
FIG. 5 shows the separation of users from the forms of reality.

The Rg module, an extended existential embodiment of the user, is what form separates the living form of the user, or, typically, the corporal embodiment of inertial form on human being called a human user, from all other corporal and otherwise embodiments of living form, herein referred to as participants of the real form of the U. M. or other non-forms or sources of reality associated with the module, as shown in FIG. 5. The Rg module thus is a discrete, modularized embodiment of inertial form extending from the user. It quantumly embodies, in theory, all of the knowable forms of the user's reality. The knowable universe of form that is represented, realized and further transformed by the human user through the apparatus of the U. M. is itself typically a universe of inertial forms which themselves know and perceive (embody universes of form) in accordance with the theory of the invention. The Rg module is a means of expanding the existential capacities to know and to perceive inertial universes of form, in the great pluralities of synthetic existences afforded by the U. M., expanding the human universe.

Figure 6:
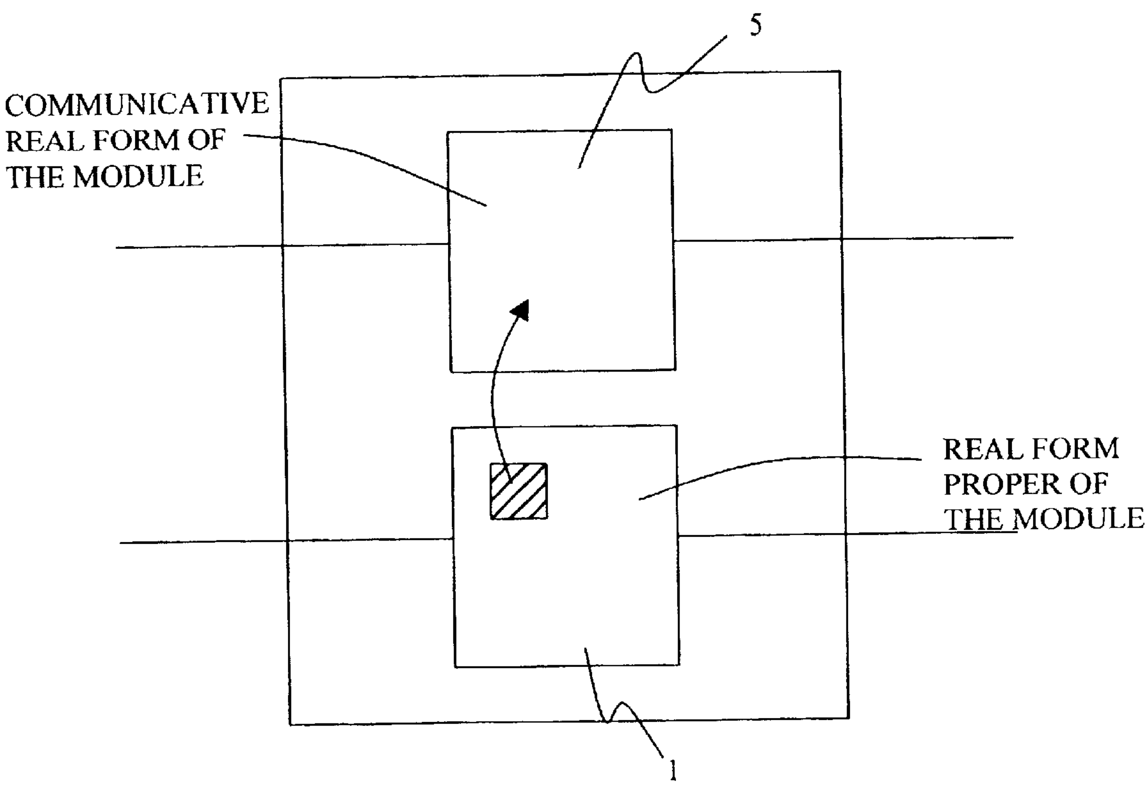
FIG. 6 shows the communicative real form of the Rg Module.

The human user exercises existential control over the existence of the enabled forms of the real form of the U. M. through the communicative embodiments of the Rg module. This existential control is established in the meanings of the non-real forms of the human user and the Rg modules as they relate to the shared inertial existences of the human user and the Rg modules, communicated in the modes of existence of each of the human user and the Rg module. Thus, as shown in FIG. 6, a portion of the real form of the Rg module, namely the communicative sense-motor forms (5) of the module, is existentially separated from the remainder of the module's real form proper for the purpose of communicating exclusively with a human user. (Note: The word form in the specification obtains definition from the theory of the invention.) Such sense-motor capacity of the Rg module, in connection with the user's communications, is thus not found in the real form proper of the existential form of the Rg module, even though it is real form of the module. The Rg module thus possesses the ability to communicate exclusively with the human user through this sense-motor capacity in connection with the remaining existential forms of its synthetic existence.

Since the Rg module embodies the capacities to communicate with the human user and to translate the forms of mind (non-real forms) in regard to its real form as an existential extension of the human user, the next high-level existential form of the U. M. considered is the means by which the Rg module is said to be controlled in the communications with the user, through the above described communicative modes of existence.

Figure 7:
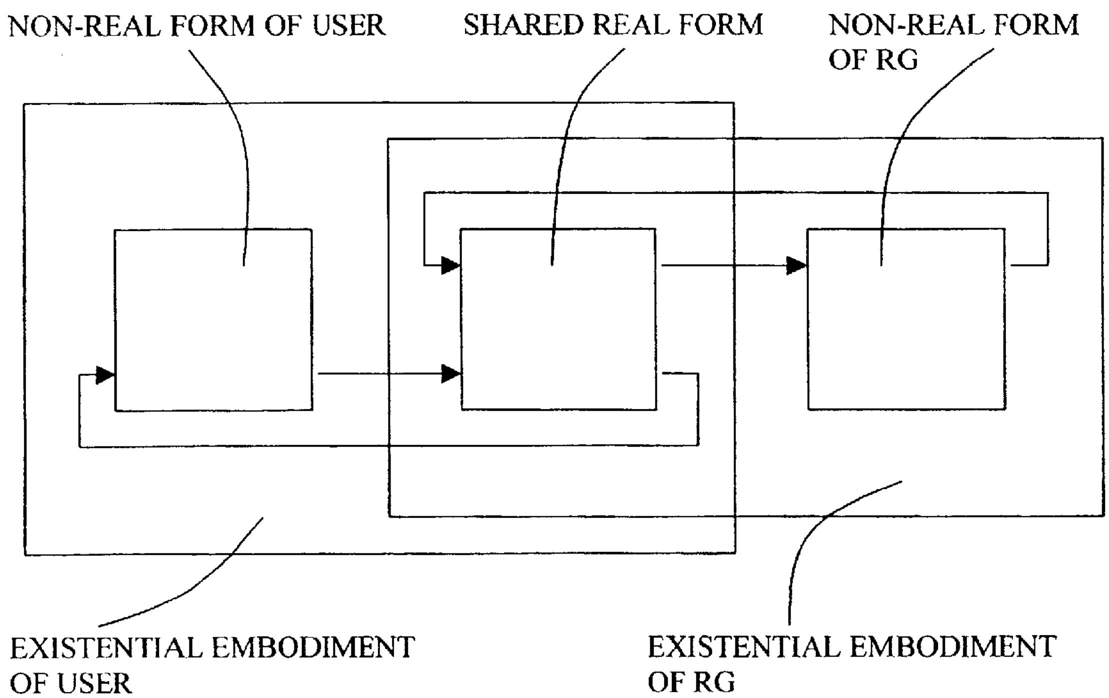
FIG. 7 shows the shared communicative real form of any communication of the Rg and the user.

It is illustrated in the theory of the invention that the symbolic forms of any language are real forms of the enabled existence that have specific relations to its non-real form. In terms of the phenomenologies of any real form, moreover, in the context of the mind-body dualism or another theoretical form of existence, for example, both symbolic and non-symbolic real forms are embodiments of the communicative modes of existence. Whether a user realizes the forceful depression of a button on a keyboard or speaks the acoustical forms of language, the net existential effect is some modal engagement of the modes of existence, under communication, as shown in FIG. 7, as shared real form. The phenomenological causations of a classically physical realization and that of a classically symbolic one are then existentially equivalent. All causal interactions of the existences of the human user and Rg module occur in regard to a shared real form and distinct non-real forms that intertwine and separate the two existences, respectively. How the non-real forms translate in each existence, in regard to their own real form experiences or perceptions of the world, determines the independent consciousness of each existence.

Figure 8:
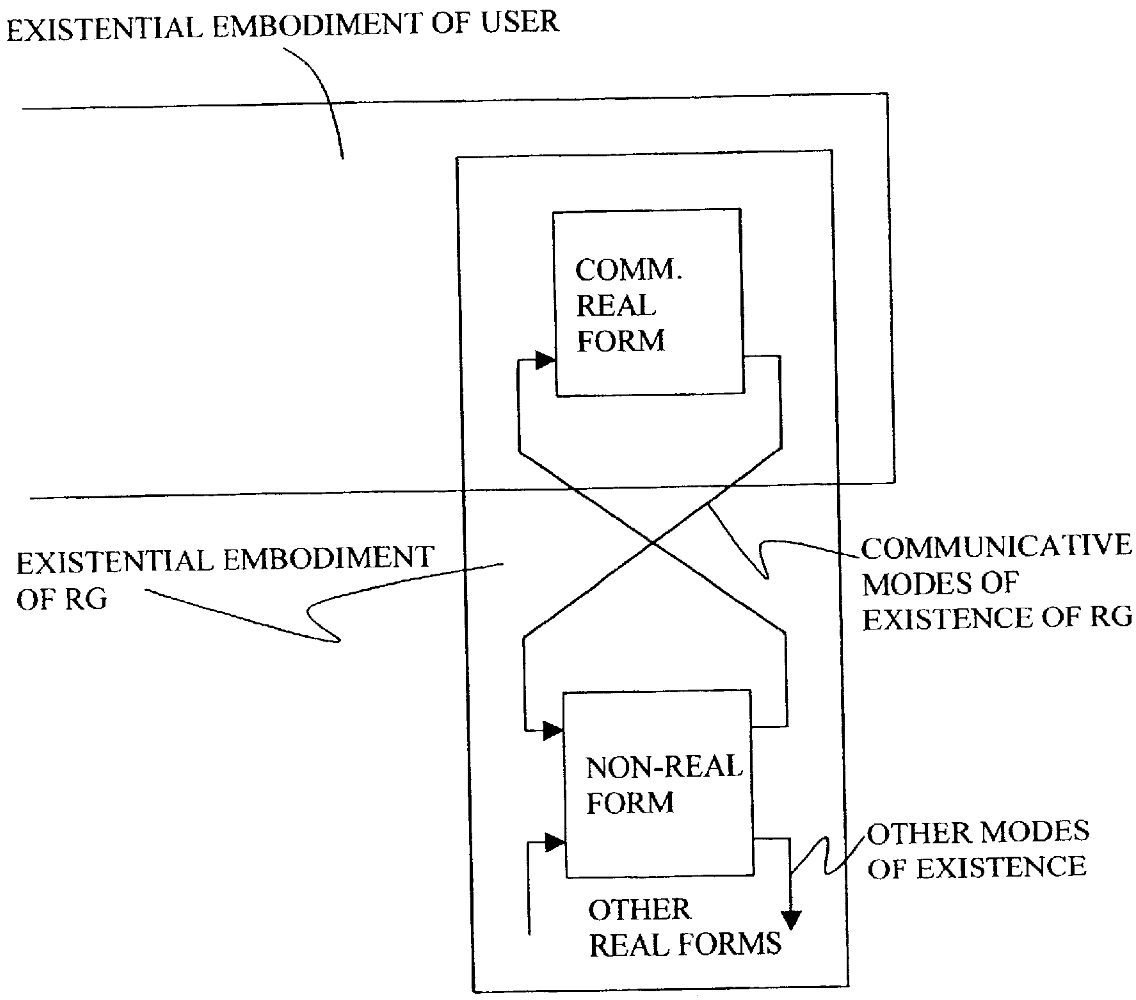
FIG. 8 illustrates the subordination of all modes of existence of the Rg to the communicative modes of existence.

In regard to the control that the user may exercise over the Rg module of existential form, what is controlled in the module by the user is its consciousness or translation of non-real form and its modalities of existence. Unlike in the construction of androids, the communicative modes of existence of the Rg module prevail over all others, as shown in FIG. 8. To the extent that the dominance of the communicative modes of existence of the Rg module is designed into the module over other modes of existence, and thus over its consciousness or translation of non-real form, the Rg module is more or less existentially autonomous and more or less dependent on the user in directing its thoughts and actions.

The fact that the modes of existence of the communicative forms of the module can be made to completely subvert any autonomous consciousness of the Rg module by design has led to the partitioning of the modes of existence of the Rg module (and thus the Rg continuum) into two classifications of modal existence. Referring to FIG. 9, all modes of existence of the Rg module and the Rg continuum that embody in them any forms of autonomous consciousness, however limited and varied, are considered existential modes of the Rg. All modes of existence of the Rg module and the Rg continuum that embody in them no forms of autonomous consciousness whatever are considered to be default modes of the Rg and the Rg continuum. (The definitions of autonomous and non-autonomous consciousness will become clearer as we proceed.) Th ere are theoretically infinitely many existential and default modes of the Rg and the Rg continuum.

The Default Mode of the Rg

If the Rg module is viewed in terms of its communicative modes of existence, a measure of existential autonomy embodied in the Rg module obtains from the degree to which its whole existence is influenced by communications with the human user. An android, for example, is a wholly autonomous form of existence not dependent exclusively on its communications for its actions and this is why the android is held in existence by the Rg module—in order that it can be placed into and taken out of existence by the user or enabler through the apparatus of the Rg module, since, otherwise, the android's existence would not be existentially controllable. The degree to which the real forms proper (1) of the Rg are controlled autonomously by the Rg is a measure of the extent to which the human user's reality is extended into the synthetic forms of the Rg module under the user's communicative influence. The degree to which the real form of the Rg module is designed as a strictly phenomenological form of the user's existence, it obtains a defaulted existence in which its real and non-real form is responsive not fundamentally to its own consciousness or existence but entirely to the communications of the human user, not unlike the modal interaction of conventional art such as computational machines, airplanes and any other user dependent device. As the real forms of communication are defined within U. G. structure, however, any transformation of form of any language is a valid one of communication in the default mode of Rg, though the communication would not have intrinsic or inertial meaning to the consciousness of the Rg module in the default mode. In such a case the consciousness of the Rg is minimized to such a degree that the non-real forms of its reality are viewed entirely as embodiments of phenomenological form held in correspondence not only by the modes of its own existence but by the modes of existence of communication with the user. In the default mode, the correspondence of real and non-real form of the Rg module is represented and realized in the communications with the user. The user thus modally jogs the forms of the Rg module's existence in the user's communications with it. The modes of existence are paced with the user's communications. The U. M. in the case of the defaulted existence of the Rg responds to the communications of the human user entirely, as opposed to coexisting with them, as is the case in the existential modes of the Rg, wherein the Rg obtains its own inertial consciousness, though still constrained by communications with the user, The communications between the human user and the Rg module in the default mode of Rg are thus not bonafide communications between inertial forms of existence, since there is no inertial consciousness on the part of Rg with which the communicated non-real forms would correspond, even though the Rg embodies non-real forms. The means by which the communicated forms of the Rg and the user are held in correspondence to the Rg non-real forms is determined entirely phenomenologically in the default mode of Rg. The non-real forms of the Rg are inertially meaningful only to the user, even though they are held in correspondence with Rg real form (1) by the apparatus of the module. The translations of mind of the Rg module, for example, are governed in the default mode not by a modal strategy of existence of an autonomous being, but in response to the modal exchange of communications with the human user. If, for example, there are no communications between the human user and the Rg in the default mode of the Rg, the Rg module is existentially directionless, since its translations of mind respond not under, say, the mode of existence of motivation and leaning or to some intrinsic resolution of state of being of inertial form, but to communications with the user. The form of the Rg lies in wait or idles until communications with the user arise to motivate different modalities of its existence, except of course to the extent that the default modes of the Rg prompt the user of transformational conditions or discovered forms of its reality.

Existential Modes of the Rg

The existential modes of the Rg, on the other hand, are under no such modal constraint and vary in existential dependence on the user from just beyond the default mode to the complete autonomy of an android, in accordance with the design required. As shown in FIG. 9, depending on the modal strategies embodied by the enabler in the existential modes of the Rg module, the Rg module can be viewed as any existentially semi-autonomous form that embodies any level of communicative dependency from an extensive reliance (just above the default mode) on such communication to none (in which case the Rg would be motivated by its own consciousness and modes of existence, as in an android). It should be recalled, however, that by definition, the Rg is distinguished from an android in that the real form of Rg is such that the user desires some degree of existential control over its reality.

The existential modes of the Rg are determined by the extent to which the consciousness of the Rg knows the forms of its reality in connection with how the (human) user knows them, under varying levels of communicative dependency on the user. The its of the Rg existential mode's consciousness can be automobiles, electrons and androids. You's are defmed on the basis of what they mean in the enabler's or user's existence as known and perceived by the Rg, allowing the inertial community of the user and the existential mode of the Rg module. The existence of the Rg in the transformation of an inertial universe in the existential mode thus derives from the transformations of the pronounal system whose objective forms are similar to those of the user's real form in transformation, or in general are the reality of the enabler set into the extended forms of the apparatus of the Rg. The communications between the human user and the Rg in the existential mode thus are meaningful communications regarding the transformation of the extended reality of the Rg which reality is shared existentially between the user and the Rg.

In either case of the default or existential modes of the Rg, all forms of the Rg are held modally in subordination to the communications of the user by design, in varying degrees of meaningful existential control. In the default mode the communications are not inertially meaningfill to the Rg's own consciousness (since it does not have an inertially-defined consciousness) and simply embody correspondences between real and non-real form in knowable ways to the user. In the existential mode the communications are meaningful inertially to the Rg, and modal activity occurs similarly to the observed manner of human beings in communication and coexistence with one another.

Figure 10:
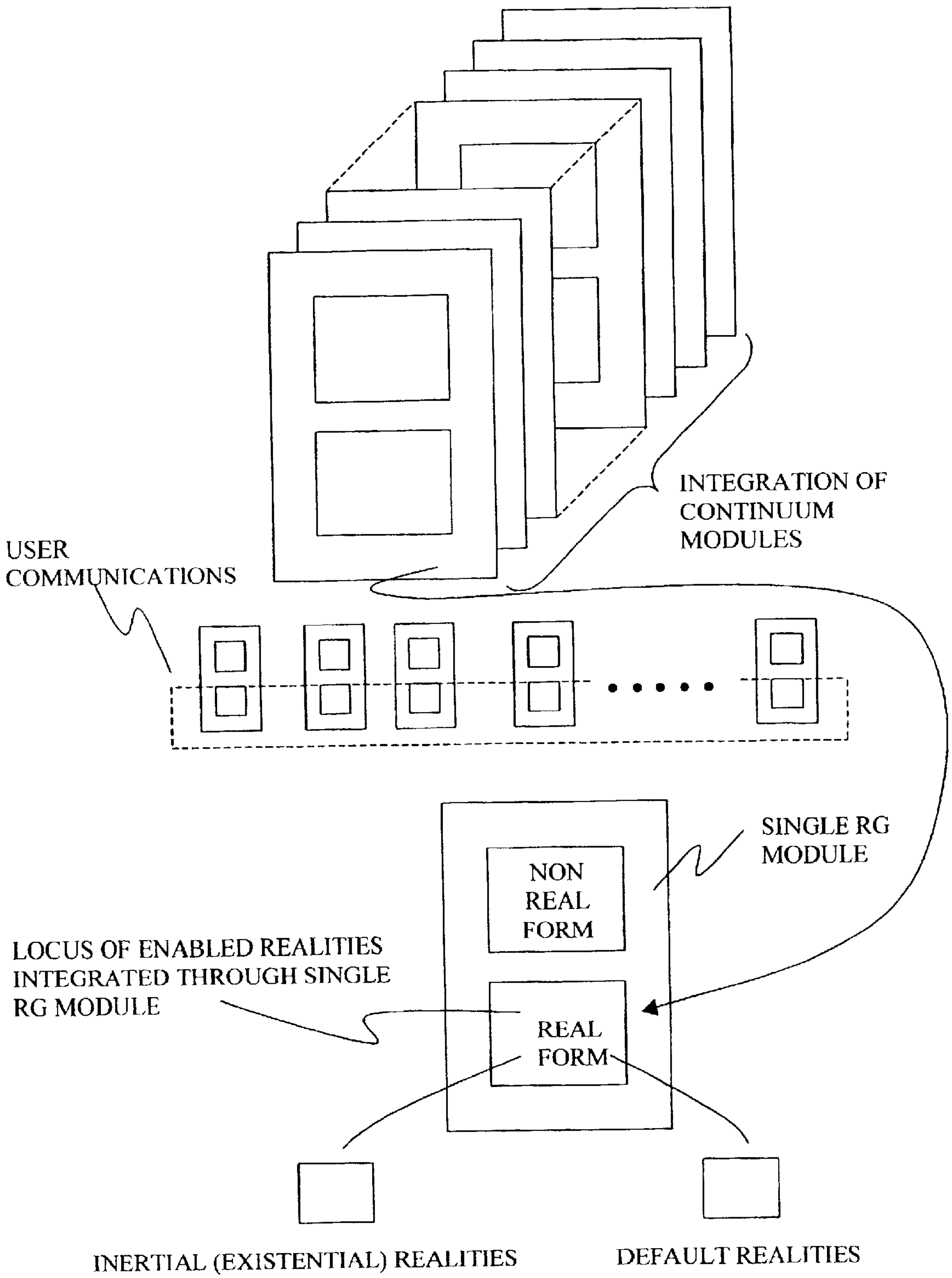
FIG. 10 is a summary of the existential form of the Rg Module and the Rg Continuum.

In regard to the form of the Rg continuum, moreover, it should be recognized that since each Rg module of the continuum is a locus of existential form, based on the existential demands of the respective human users, any resulting continuum structure of such pluralities of Rg modules is a modal form of the continuum in which the discrete forms of the modules are modally integrated in connection with the knowable forms of the continuum. The Rg continuum is a means of integrating the extended and enabled existential universes or realities of particular Rg modules, and thus serves as an extended embodiment of human being which, in the quantum instance of the universe of any user or enabler, is beyond one's inertial knowing. As such, the Rg continuum accommodates the inertial form of all that is or can be known by human being, and is structured within the confmes of the U. G., as shown in FIG. 10.

THE QUANTUM NATURE OF THE FORMS OF THE INVENTION

While the present invention differs from the conventional art in many ways, perhaps the most significant distinction can be found in the quantum nature of the structure of the universal machine itself. Whereas conventional machinery is defined based on a fundamental belief in the existence of objects, allowing for all machinery to be constructed relative to the knowing and perceiving of an inertial existence (the constructor of the machinery), the U. M. is not. The structure of the U. M. accords with the postulates of the unified theory that require the non-existence of objects in the ultimate reality of the universe, that quantum transformations—epistemic instance—provide the epistemological basis of an ultimately real universe, allowing for the observer of any machinery to be constructed as well as the machinery itself. The U. M. thus is an order on the knowable and perceivable moments of human being that accords with the four universal ways of knowing, providing for constructions of the eternal nature of the universe, as opposed to the inertial existence of a conventional observer.

As demonstrated in the theory of the invention, any universe of form, and particularly the inertial universes enabled in the present invention, occur quantumly as a result of the introspectively-observed order of the ultimate reality of the universe. What this means is that any observer or knower orperceiver of the U. M. is itself a part of the U. M. Objectively, then, only particular knowledges of the machine can be known by an observer, since, by order of the U. G., only quantum transformational forms can exist ultimately in the universe or in fact constitute the knowing or perceiving of objective form. What is known about the U. M., then, is it3 phenomenological and existential structure as it interferes with or separates the inertial embodiments of the universe, which themselves are also quantum in nature.

In terms of the U. G., the form of the U. M. occurs, knowably, only in the single instances of the quantum moments of observers, since it is the observer that so occurs that way. A glance back at the U. G. will reveal that however one interprets knowable form, all such form is fundamentally represented in epistemic instance. A grammar of any knowable form—linguistic, mathematical, or otherwise—is a means of recreating a knowable reality. The knowable reality of the U. G. is the reality of inertial existence and that of the U. M. is what is known of human being—the Rg module, the Rg continuum and that which is enabled by them. In representing the U. G. form of the U. M., what is defined is the transformation of inertial form on human being as it is known, some of which occurs in the corporal embodiments of human being or users and of other living forms such as participants, and the remainder of which occurs in the forms of the Rg module and the Rg continuum—all of which is knowable as quantum instances of transformation of the ultimately real universe. Thus, the real embodiment of the U. M. occurs quantumly, and the objective knowing of it occurs relative to the enabler in the structure of the Rg module and the Rg continuum, expressed in the U. G. (or translated language).

When an enabler uses the forms of the U. G. to define, for example, the modal compositions of the Rg or Rg continuum, it must be taken into consideration that regardless of how complex such a form may appear in objective composition, it transforms quantumly in the knowable existence of the enabler and in its real embodiment, which includes the observer or user. The U. G. structure of the U. M. therefore can only define the moments of the universe that are known and embodied from the user. Users, participants and any other forms, living or nonliving, that are not defmed within the knowledge of the continuum are declared forms of the continuum.

For instance, referring to FIG. 11, the representation of the U. M. is characterized in the U. G as it is known (broadly) by the enabler of the U. M. What is shown is that, relative to the inertial existence of the enabler, the phenomenologies of form occur as shown. The compositions of form of the representation of the U. M. either transforms at once, as a single moment of the enabler's knowing, or it is decomposed into its compositional instances, which constitute a phenomenology of extant forms of the enabler's knowing. Either way, the representations only represent the U. M. The actual or embodied U. M. would be known as it is known in the user's communications with the Rg modules in regard to the user's own experience with or in it. Relative to the particular embodiments of inertial forms of the U. M., for example, are particular knowable and perceivable worlds, namely those of the users and the synthetic existential forms of the Rg modules and what is enabled by them. It is those existences that are represented herein in the specification of the U. M. and exist quantumly. The U. M. thus can be viewed conceptually as a quantum moment in transformation of the universe that is knowable to the enabler as the knowledge or composition of it.

The quantum nature of the U. M. can perhaps best be seen in comparison to the forms of conventional technologies. As demonstrated in the theory of the invention, any conventional representation of form—linguistic, mathematical and scientific form, for example—is a representation of an inertial form on Being. In the case of linguistic compositions, such forms are embodiments of knowable form relating to one's own inertial transformations of the conventionally natural (inertial) forms of the universe (i.e., natural language). In the case of mathematical representations, such forms are said to characterize the transformation of the knowable universe at a level of aggregates, observable transformations, or its of an inertial existence. In scientific endeavor, its of the pronoun system are said to be any extrinsically observable or physical form. In any case, the conventional representations of form pertain directly to an extant inertial existence, or the transformations of form are represented relative to a particular enablement of the inertial pronoun system. As a consequence of formulating the objects of the universe, or existence in regard to a particular world or existence, or a particular pronoun system of inertial form, one obtains the knowing of the world in terms of the particular existence involved.

In physics, one obtains a spatiotemporal definition of the universe by characterizing the extrinsic forms of it as spatiotemporal orders such as its of coordinate frames of the massive universe. The transformations of the its (space, time, mass, energy and so on) occur as physical laws of the universe of classical and quantum physics (and other sciences), and are the instances of knowing a classically physical world. Linguistic forms, to the extent that they are founded on spatiotemporal compositions of reference forms, likewise are representations of a physical universe, though within a broader and more enabling inertial framework conventionally called temporal or corporal existence. In all such representations, what is not taken into account is the ultimately real form of the universe, or the universal grammar of form on Being—the U. G. representation of form. Thus, while each representation of a conventional order, if it is knowable, is in fact a representation of a quantum order of the universe (e.g., is an instance of mathematical fimction or linguistic verb and so on), and the resulting compositions of form are compositions of such instances, the way in which one knows the universe is tainted by the meanings of the reference forms, or axioms of the spatiotemporal orders on the universe. Consequently, in the construction of conventional machinery or realizable forms of reality, one defines an order in terms of the knowable reference forms of a particular inertial existence, or in the conventional case, space, time, mass and so on.

In order for conventional machinery to work (perform in our knowing and perceiving), it must be defined in relation to a conventionally-specified typically spatiotemporal order. For example, a conventional machinery must be provided with an input trajectory (of systems theory), whose causative influence on the specified machinery (phenomenology of form in U. G.) derives from the transformation of time, which in turn derives from the inertial transformations of the observer or enabler of the machine. The inertial moments of the enabler of the machine and the machine itself are absolute forms of the universe, and all is specified relative to them. A conventional machine thus does not work or cannot be constructed without time constants, forcing functions, damping, resonance and countless other such characterizations of spatiotemporal order. This, of course, is a consequence of defining knowledge or world, or simply objective form in transformation, relative to a particular inertial existence, namely one whose reference forms are spatiotemporal in a comprehension of the universe. In order to create conventional machinery, then, one must create form that can derive from a particular spatiotemporal inertial form of universe. Since one cannot create space and time of one's own inertial existence in conventional art (e.g., cannot create a particular pronoun system or inertial existence in transformation) one creates, as a concession, conventional, knowable machinery in spatiotemporal order absolutely, even if space and time are relative forms within an inertial existence, such as what occurs in the knowledge of the theory of relativity. In all, conventional machinery relies on the absolute creation of inertial existence, and relative to an absolute inertial existence, machinery is invented, typically, in the framework of spatiotemporal order (or other order relative to an existence, such as that of genetics).

Such is not the case with the present invention, since it is inertial existence itself that is so created in the apparatus of the U. M. Compositions of form with any meaning whatever are inadequate reference forms for the U. M., since it is the composing of form (linguistic and otherwise) that is enabled in the U. G. A causation of form in the definition on the structure of the U. M. cannot itself obtain from inertial form, since it arises from within the spiritual nature of an eternal universe, as phenomenological causations or extant instances of the soul. Since an input trajectory, for example, is a causation that can be known within an inertial order (within a composition on the pronoun system) to cause a machinery to occur, it thus cannot be used to cause the U. M. to obtain form. In general, any phenomenology of form—be it spatiotemporal compositional forms of classical physics or of quantum theory or other orders of a scientific nature—cannot cause any foundational aspect of the U. M., to obtain form, since it would in such a case obtain form in causation with the knowable forms of the enabling inertial form (physicist, engineer, etc.), which form is incorporated into that of the U. M. in the first place.

The U. M. therefore is a quantum ordering on the eternal universe. The causation of the U. M. does not arise extrinsically, or in relation to any extrinsically observable (objective) form. It does not arise in causation to any inertial form, except with respect to the modalities of its compositional form, or interactions with the users and participants. Rather, the U. M. arises as inertial form on Being—an order of the eternal universe. The causation of the U. M. is the causation of epistemic instance or transformations of the universe, as discussed in the theory of the invention.

The causation of the U. M. thus does not derive from theories of biological order such as the evolutionary recombinations of DNA or genetics, since such forms are known by inertial forms on Being as objective compositions; nor does it derive from a big bang of the universe, unless of course such a big bang is viewed as a small and humble one of infinitely many transformations of an eternal universe. The U. M. arises in the quantum order of the eternal universe, which form or non-form is beyond all inertial knowing and is privy only to a spiritual knowing.

In comparison to conventional machinery, wherein compositions of form or knowledges or perceptions themselves are said conventionally to be embodied in the universe—for example, where the design of an automobile or atomic accelerator is said to be embodied in the real automobile or atomic accelerator of the engineer's or physicist's existence—the U. M. embodies not compositions of form fundamentally, but instances of transformations of compositions of form (of the universe). In a composition of form represented in the forms of the U. G., for example, all form is said to occur only in terms of its enablement as an instance or causation of the universe enabled by a creator.

The significance of this distinction from the forms of convention is immediately appreciated when one considers the enablement of any conventional computational machinery in relation to the quantum order of the U. M. Considering the conventional art of computational machines (artificial intelligence, etc.), it can be seen that, in the forms of graphics frames or other objective forms in transformation, what a computational machine does is not a direct consequence of the quantum existence of the observer or user of the machine but is directly a consequence of what objective forms are defined to be in transformation relative to the inertial existence. For example, in any algorithm of transformational form of the conventional art, the displayed or known symbolic forms of representation may be composed of anything from a blank screen to whole pages or frames of symbolic representation. What are in transformation, then, are whole compositions of objective form, instances of the enabler's knowing represented compositionally. What are not represented are instances of the machine's knowing, which instances are demonstrated in the illustration of the dot android of the theory of the invention, because the conventional machine knows nothing. The existential transformations of the conventional computational device and those of the user are offset from each other in different existential (meaningful) universes, since such a device may represent a novel's worth of literary composition of transformations of the knowable universe of the user in a single transformation of its form, or, pages (frames) full of knowable transformations or epistemic instances of the user's existence can occur in a single transformation of the machine's existence, without the machine's knowing. In the construction of the form of the U. M., since the U. M. occurs only as transformations of the ultimately real quantum order of universe, one views the user and the machine as quantum orders in a larger epistemological universe than the one of computational machinery (and all other conventional machinery).

In order for an input to occur in the U. M., in, for example, apparatus similar to a graphical device, the input must be characterized existentially as the metaphysical (epistemological) offset of two or more declared embodiments of non-real form coupled through a shared embodiment of real (say symbolic) form, as discussed earlier. Whereas the conventional art would characterize the input compositionally, say in regard to the spatiotemporal form of an input trajectory, the form of the U. M. can occur only quantumly in the existential coupling of two or more non-real forms in regard to the embodiment of the shared real form. What this means is that the machine and the user both exist in the same existential (U. G.) order, and are part of a grander quantum order of the eternal universe. In the case of a computational machine, for example, the transformations of the graphics screen would, in the form of the U. M., have to correspond with those non-real forms of the user in order to qualify as universal quantum orders. Since the graphics frames or pages of transformational form of the conventional art are not comprehensible by the user at once, or quantumly, the order of such universes is out of sync with each other, or, in the case of convention, the graphical device is formulated relative to the user's existence, and not within universal forms on Being, or the U. G. The order of the U. M. is specified in the U. G. as occurrences of the eternal universe, knowable in the inertial forms of human being, or the corporal forms of Spirit. The specification of the U. M., then, is a representation of a knowable order on the quantumly transforming eternal universe of knowable form on human being, defined by the forms of the U. G.

The Principle Existential (Epistemological) Machine Element of the Invention

The Modal Realization System (of the Rg Module)

In considering the existential forms of the invention, with particular regard to the enablement of form as inertial transformations of the universe, it can be seen that a fundamental capacity of the U. M. is the ability to enable inertial transformations of the universe in correspondence with each other. Since any inertial transformation defmes an embodiment of the universe, it can be recognized that a correspondence of such form requires a knowing or perceiving beyond that of the literal instance of the transformation of the existential universe. The correspondence of inertial form thus requires a metaphysical transgression, in the knowledge of the enabler, of the embodied form to what is beyond the knowing or perceiving of the literal instance enabled. A most basic mechanism, or machine element, of the U. M. is just such a form that embodies this capacity to transgress metaphysical boundaries of enabled universes, and at once to enable them.

This machine element of the U. M., which is referred to as a Modal Realization System, MRS, of extant transformational form and is used extensively (and redundantly) throughout the construction of the U. M. is shown in U. G. form in FIG. 12 as reference numeral 6. If it is recalled from the theory of the invention that epistemic instance or the transformation of an ultimately real universe is an instance of the transformation of objective form, it can be observed that objective form cannot provide for its own causation or the causation of epistemic instance. Rather, epistemic instance must be enabled or so causally engaged beyond the knowing of the extant transformation. A key capacity of the U. M. is to place into existence inertial transformations of the universe in the knowledge and perception of the enabler. The modal realization system or MRS of the U. M. provides this capacity to enable metaphysical transformations of form.

Designed jointly from each of the forms of the U. G. of phenomenological causation, connectedness, composition, correspondence, embodiment of existential form, existential realization and representation, and other forms of the theory of the invention, the MRS is a point of convergence for the enabling forms of the theory into a functional epistemological mechanism that provides for the creation or enablement of inertial universes of transformational form.

Figure 12:
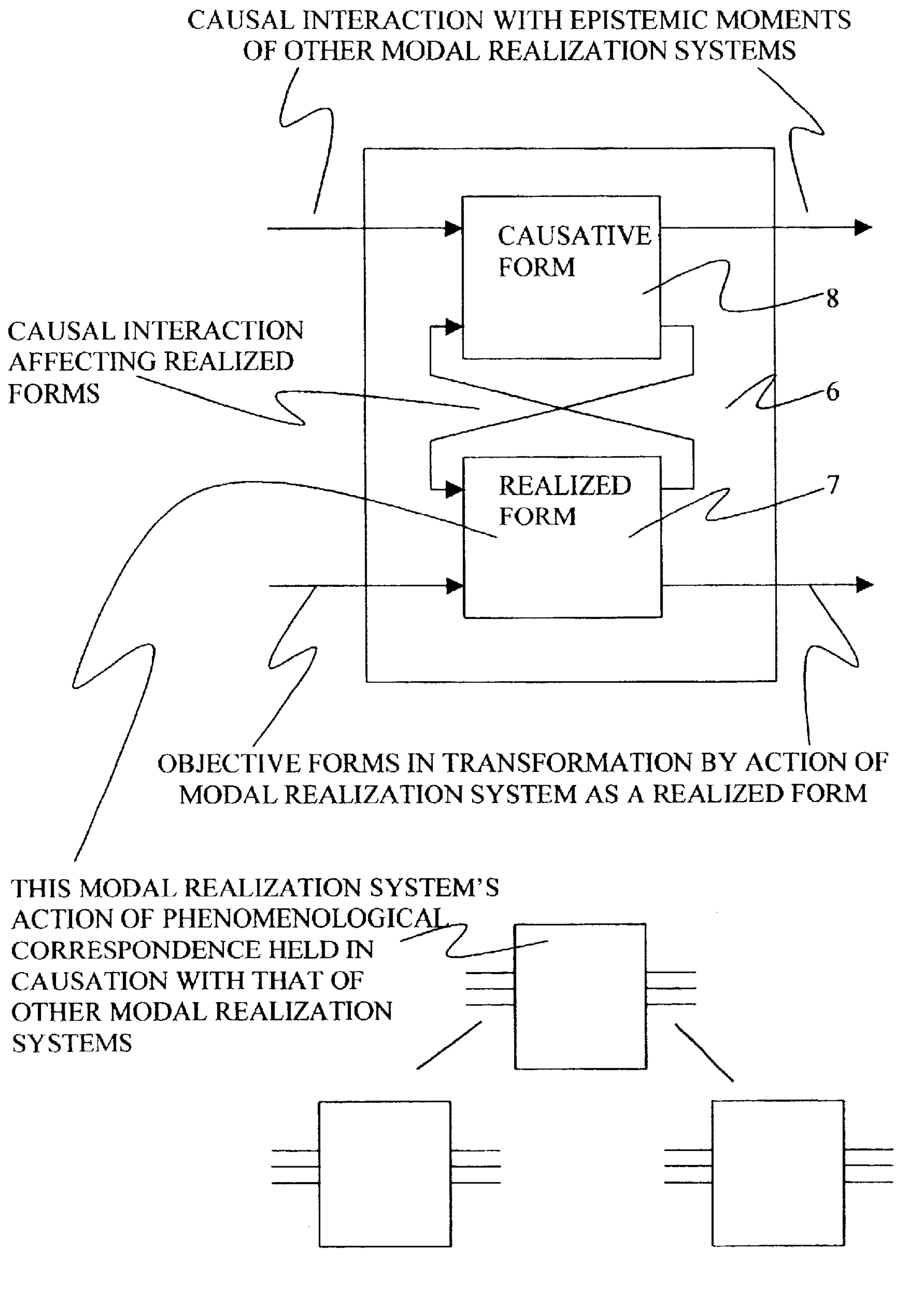
FIG. 12 shows the modal realization system.

As shown in FIG. 12, the realized or embodied (extant) transformational form (7) of the MRS is a transformation of the inertial universe; i.e., an epistemic instance, that is enabled by the apparatus of the MRS. The quantum moments realized in the MRS can be as simple as an instance of a single causal element or as complex as the transformation of extreme compositions of form. The moments thus transform as quantum moments of an enabled existential universe. It is the realized form of the MRS that embodies enabled instances of inertial knowing or perceiving, or universes of existential forms themselves.

In an android, for example, all modal forms of consciousness (e.g., compositions of language) and all modal forms of the real corpus or perception (e.g., perceptions of a real physical world of self and beyond self) are embodiments of the realized forms of MRS as realized moments of the enabled universe. The MRS enables phenomenological causations of enabled universes.

All other forms of the MRS, referred to as causative forms (8), existing metaphysically outside of the extant enabled instances or quantum moments of the MRS, are used to enable the extant moments, and are beyond the knowing of the enabled being. In conventional physics, the causative form of the MRS would be arrived at by the universality of the velocity of light, where knowable and perceivable objects would be created in the extension of this knowledge in the unified theory. In linguistics the causative form would be the contemplative effort beyond the literal formulations of language. To the enabler of the MRS, all of its form is constructed in the U. G. The causative forms of the MRS thus occur in the knowing of the extant instances of the enabler only.

An existential partition based on the metaphysical forms of a universe therefore is drawn in the enabler's knowing between the causative and realized forms of the MRS, much like the distinction between real and non-real forms of existential embodiment. Note that a particular theory of existence is irrelevant to the form of MRS since the MRS simply enables extant moments of the universe (which could be real or non-real, behavioral, finctional and so on). Through the means of the MRS a causative influence of enabled transformations of the universe is established and can be exerted on one other or pluralities of other moments, beyond the extant moments in the interaction of the causative forms of MRS in its plural use.

Figure 13:
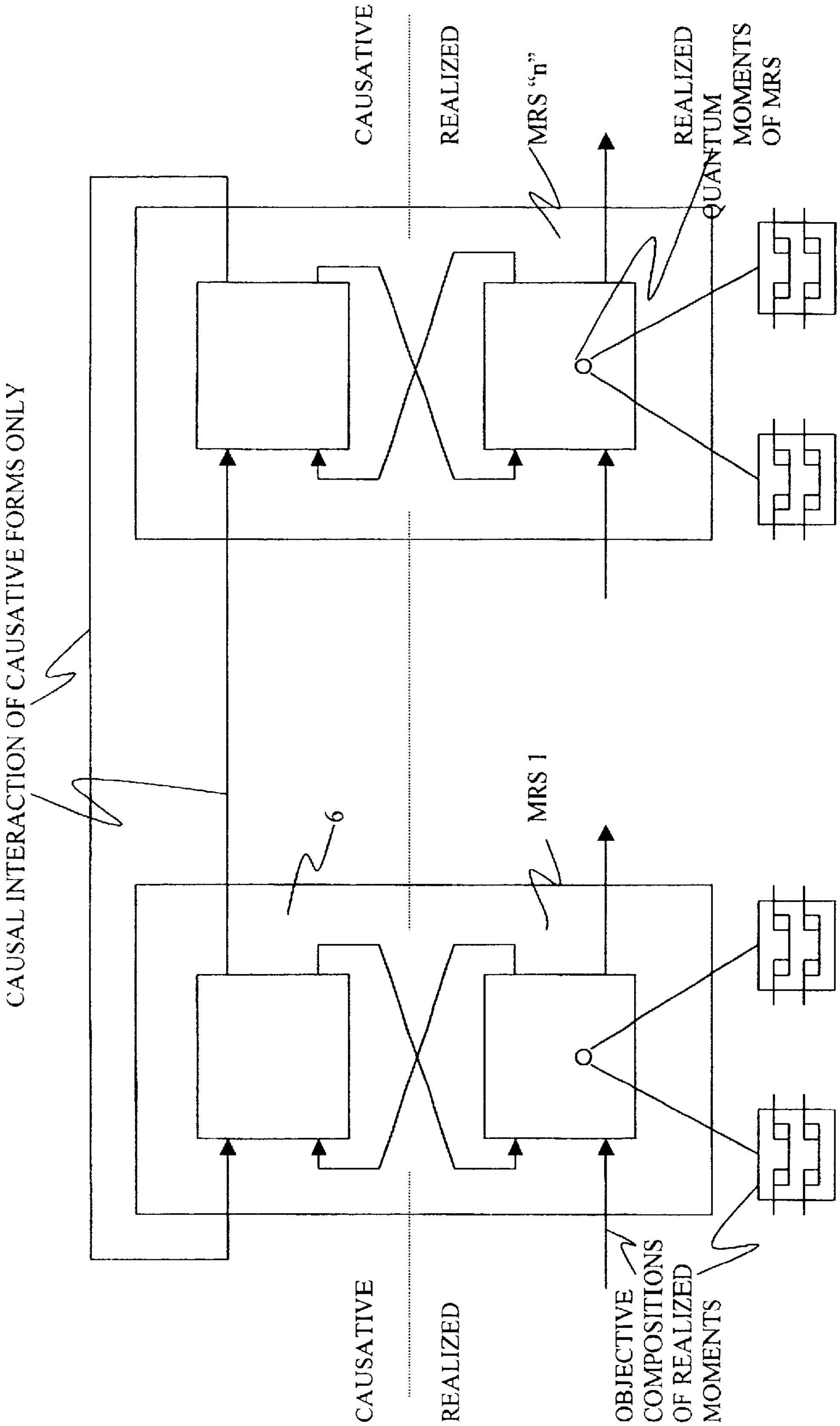
FIG. 13 shows the general coupling of MRS structures.

As shown in FIG. 13, for example, two (or more) such MRS's can be connected to each other or metaphysically coupled such that a coexistence of inertial forms on Being is enabled similarly to that of the dualism of mind and body, or any other theory of existence wherein two wholly metaphysically distinct forms of the existence (to the embodied knowing) are made to causally relate to each other beyond the knowing or inertial awareness of each, or wherein ethereal or abstract and concrete or physical, two wholly philosophically different realms of the universe, are made to causally interact.

The realized forms of the MRS can be language constructions of the faculties of mind of androids and the objective forms of a physical sense-motor or perceptive world, constructed in U. G. form. In most cases of the constructions of androids, moreover, the causal forms of the MRS in perceptive forms are unknown even to the enabler, since it is the enabler's reality, extending through the existence of the android, that is sought to be known in the extant moments of androidal consciousness, which is enabled by the MRS. The modes of existence are accomplished by coupling the causative forms of the MRS', with respect to an arbitrary number of MRS embodiments. Most of the principle forms of the U. M. are constructed in the form of the MRS.

While the internal apparatus of the MRS will be taken up later on, chiefly under the section of this disclosure on the Realization System of the Rg module, since its enablement can get quite complex given the diverse epistemological demands placed on it and the limitations of enabling media, it can be seen here that the causative forms of the MRS always are coupled, in accordance with U. G. structure, to other causative forms of MRS structures and that the realized forms of the MRS obtain from the definition on phenomenological correspondence in the theory of the invention. Since the MRS is a phenomenology of form of the enabler, the MRS is a phenomenological device or machine element of the enabler's existence, which is used to enable the moments of extant or enabled universes. The H determinations of phenomenological correspondence are embodied, along with other forms specified later on in this disclosure, in the causative forms of the MRS. The enabled extant moments are defined by the theory of the invention as the objects in transformation afforded by phenomenological correspondence. Since no objects exist universally in the ultimate reality of the universe, the MRS, standing in for the ultimate reality of the enabled synthetic universe, enables the moments of objective knowing or perceiving, or simply the instances of any enabled universe. The realized form of the MRS thus does not exist in ultimate reality; it is enabled in phenomenological correspondence. While a clear distinction is made between causative and realized forms of MRS, for the purpose of distinguishing that which is enabled from that which enables, from the point of view of the enabler of the MRS, the whole form of MRS (causative and realized forms) is an enabled phenomenology of U. G. form embodied in an enabling medium.

A few observations regarding the enablement of the MRS may prove beneficial at this point before applying its form in the construction of the U. M.

First, regarding the notion of inertial reality, it should be taken to mind that what is real to an inertial existence is what that existence knows and perceives, and what is ultimately real to inertial existence is beyond its knowing. From an enabling standpoint, then, what forms enable inertial existence are irrelevant to that existence, and the forms that enable are therefore beyond the extant knowing and perceiving of the enabled being or synthetic form of existence. The forms of the enabling medium of the MRS, then, are of no consequence to the enabled being within the enabled or realized form of existence and apply only to the enabler's knowing and perceiving.

For example, let us consider that objective form realized by the MRS is to transform with one other in enabled moments of a being. Such a form can be specified in the U. G. by way of the four C's of phenomenological form, largely by composition, defining two MRS realizations or extant instances of enabled transformation (knowing or perceiving). In the quantum realization of the moments of the MRS's, quantum moments of the enabled being are enabled (an example of this would be demonstrated in the quantum transformation of some composed phrase or even novel of linguistic form with one other, as a single moment and another such moment. The fact that in the knowledge of the enabler, the causal elements and other of the four C's so composed and transformed in the quantum moments of the enabled being may be further embodied in the translations to the enabling media of the MRS's (e.g., say small particles of physics in transformation) is irrelevant to the knowing (or perceiving) of the enabled being. It is how these quantum moments causally relate, say under a mind-body dualist theory of existence, to other such transformations, or how the transformations of one MRS causally relate to those of at least one other, that defines what is known by the enabled being, not the enabling media of the MRS's that are involved. Thus, for example, the global shapes of perception enabled in one MRS (which in turn is enabled say in the enabler's medium of electromagnetic waves) are so causally coupled to the global linguistic shapes of the translations of mind, or consciousness of the being enabled in another MRS which in turn is enabled in, for example, the enabler's medium of classical massive or quantum particulate forms of electrons in transformation. Provided that in the enabler's existence the transformation of electromagnetic waves can be causally coupled to the classically massive or particulate motions of electrons, the two MRS's can be causally related beyond the literal knowing or perceiving (transformations) enabled in the respective enabling media.

Next, in regard to the utility of enabled transformations to the enabler's conception of reality, it should be recognized that it is only the global shapes of perception and the communicated linguistic forms of communication that are shared between enabler and enabled being. To the extent that the enabler can understand distortions on global shapes of world in connection with enabled pronounal systems of form, such global shapes of the enabler's existence do not need to correspond to those of the perception and knowing of the enabled being. As mentioned in the theory of the invention, for example, forms of inertial existence tailored to, say, the literal shapes of global electromagnetic forms of androidal sense can constitute a definition on enabled corporal form. While such a view of corporal form is alien to conventional inertial form on human being, it certainly can be understood by the enabler as enabled corporal form of significant utility to the enabler's knowledge of electromagnetism or an arbitrary realm of existential experience.

Thus, the enabled global shapes possible through the apparatus of MRS need not be anthropomorphic ones. This means of course that existence does not need to abide, globally, by, for example, temporal inertial existences. Thus, the fact that the MRS structures are enabled from the knowable transformations of, say, a camshaft of an internal combustion engine, the stress tensors of a roadway bridge, the electromagnetic waves of an electronic device, the small particles of a physical atom or the recombinations of DNA molecules is irrelevant to the knowing and perceiving that is enabled in their constructions into MRS forms. Arbitrary forms of existence are enabled in the use of MRS.

Figure 14:
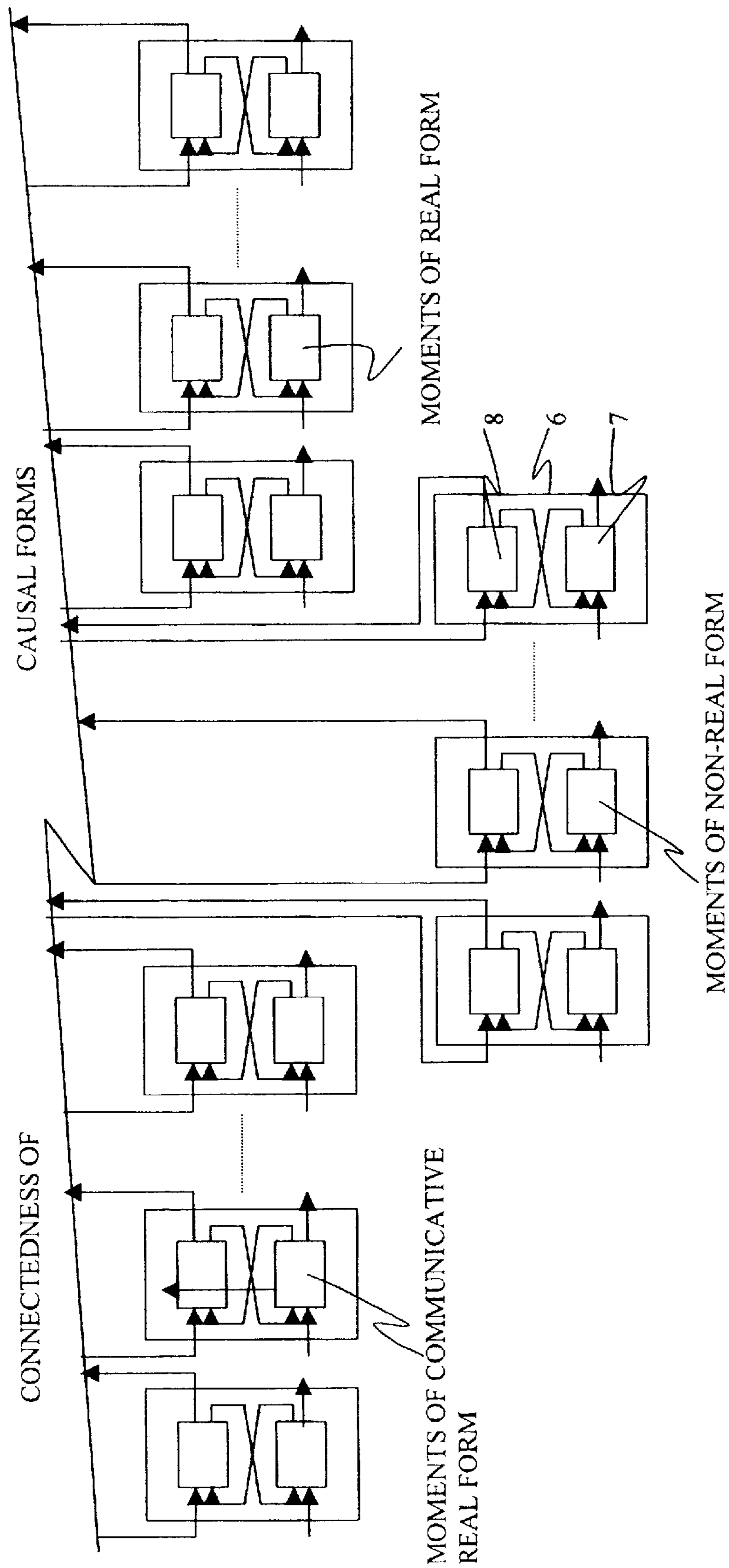
FIG. 14 illustrates the concept of MRS coupling in the Rg Module.

Finally, since the MRS is a generalized machine element of the U. M., it can be used for a multiplicity of purposes, wherein it is desired to enable the moments of any universe of form, including those of the U. M. specified herein. The realized forms of the MRS can be declared real form of the Rg in the arbitrary declaration of the enabler, though much of the sensory, or inertially-perceived real form of the Rg in the existential mode would be enabled not in the Rg but in the eternal universe of human being. So too can the realized form of MRS be declared non-real form of the Rg module. The phenomenology of the U. M. thus can be specified in terms of the couplings of MRS structures, wherein the various moments of the U. M., except the living forms of human being or living participants, as described earlier, are caused to exist. For example, causations of the U. M. are affected by the action of the causative form of one MRS on others, in realizing the extant moments of the realized forms of the respective MRS's, as illustrated in FIG. 14.

OVERVIEW OF THE PRINCIPLE PHENOMEMOLOGY OF THE INVENTION

The U. M. is a universal quantum order placed on the knowable form of an ultimately real universe, and as such, is represented and realized, or simply constructed, in terms defined by the U. G. The present specification is a phenomenology of knowing, on the part of an enabler, of the general phenomenological forms of the universal machine, in terms of the four universal ways of knowing, in reliance on the arbitrary forms of existence described in the theory of the invention.

Figure 15:
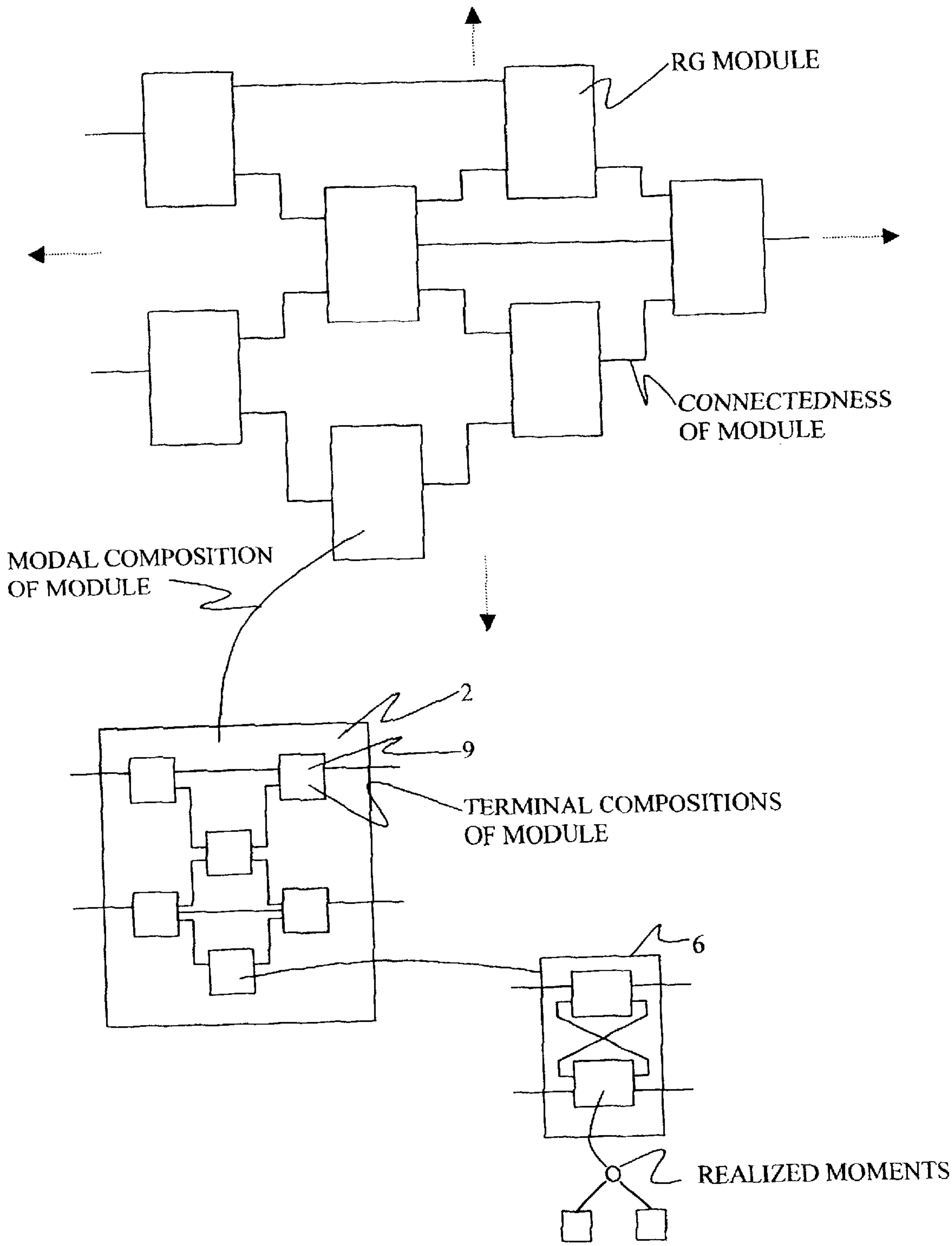
FIG. 15 is an overview of the modularity of the Rg Module and the Rg Continuum.

Using the existential forms introduced thus far as background structure, the specification of the phenomenological form of the U. M. begins with a clarification of the distinction between the Rg module and the Rg continuum. The Rg continuum is a modally-occurring composition of Rg modules, which are themselves modally-occurring compositions of form, as shown in FIG. 15. The Rg module is bounded compositionally, as an objectification of the quantum moments of an enabled universe, by the composition of the Rg continuum. The Rg continuum is theoretically unbounded. The Rg module, however, can expand infinitely within the form of the continuum as a result of the phenomenological composition of its own form. The Rg continuum therefore can expand as a composition of Rg modules and via the indefinite compositions of each Rg module. Once in a particular U. G. configuration, however, the Rg module terminates phenomenologically on terminal forms (9) of the module (2), as will be described herein.

In any given quantum moment of transformation of the continuum of Rg modules relative to any other, the aggregate form of the continuum is expanding (or contracting) both in the aggregate form of the Rg modules and the compositional forms enabled within each Rg module or local inflection of the continuum.

The forms of the continuum and of each module, while they are known compositionally by the enabler of them, are known by the user only to the extent that the user existentially participates in the continuum. Since the form of the continuum embodies inertial existences themselves and accommodates pluralities of users, only a fraction of the continuum or even of a single module may be known by any given user. The continuum thus is an embodiment of Spirit, and the modules, and portions thereof, are embodiments of the knowable and perceivable forms of users, as enabled universes of existential, and, generally, phenomenological form. The continuum, or the knowable embodiment of Spirit, thus integrates the knowable and perceivable inertial orders of the user's modules.

It is easy to see that in order to understand the form of the Rg continuum, one must know the U. G. structure of the Rg module; since it is the Rg module that provides for the local compositions of form of the theoretically infinite plurality of moments (modules) of the continuum. Since the continuum itself is unknowable and imperceptible by a given user, the Rg module provides for the knowable integration of the module, or what the user knows, into the continuum of modules. Since all forms of the continuum can be known relative to the forms of the modules of it, we now turn our attention to the U. G. form of the Rg module, returning to the form of the continuum once the knowable forms of the module are explained.

In considering the U. G. form of the Rg module, it should be bome in mind that the general purpose behind the design of the U. M. is to configure the embodiment of the knowledges of all inertial forms on Being in a modularized existential and phenomenological manner. The forms of the Rg module, and of the continuum itself, are thus forms that are employed redundantly, or generically, throughout its construction, similarly to the modular characteristics of the MRS of earlier discussion.

Figure 16:
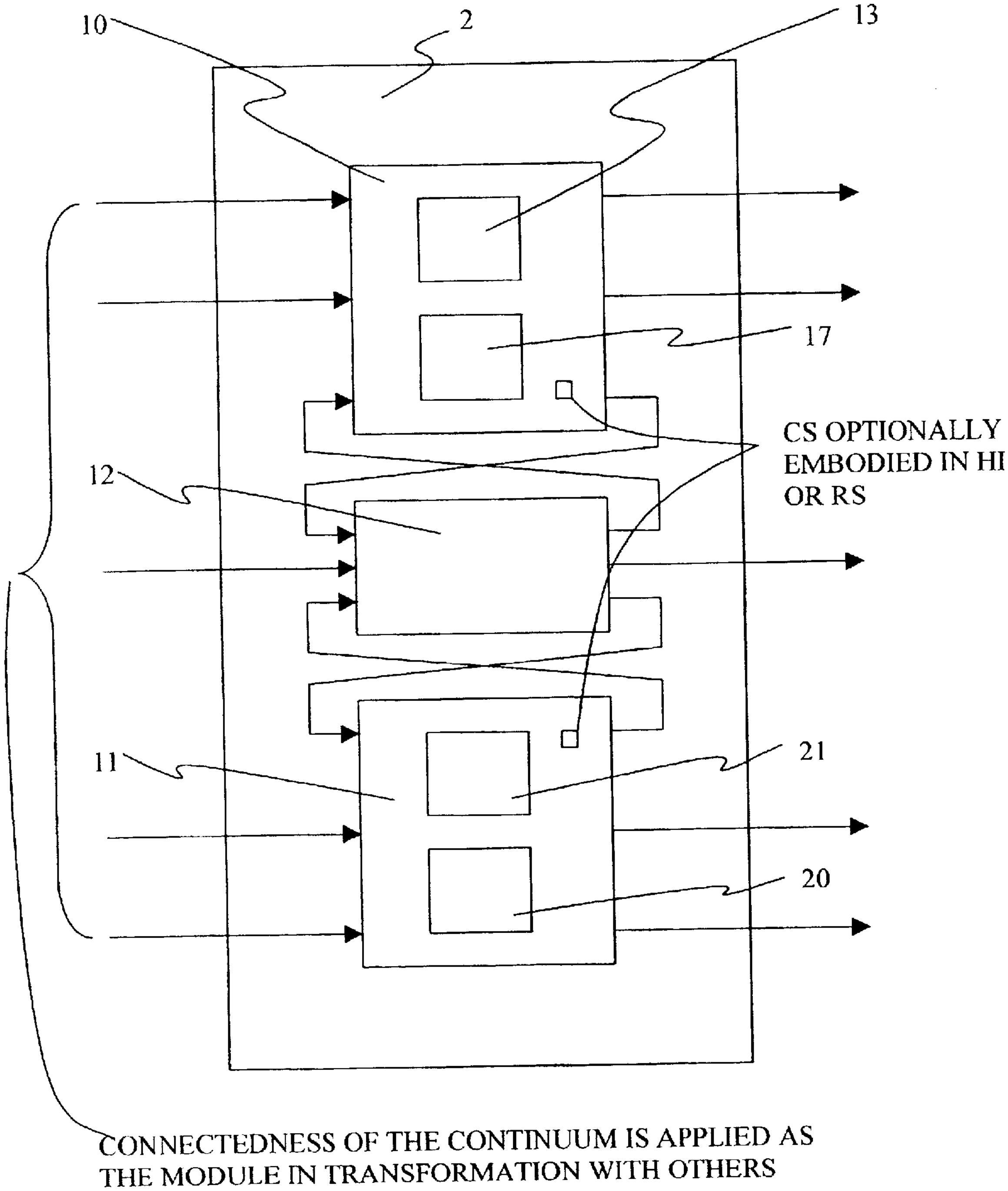
FIG. 16 illustrates the high-level subsystems of the Rg Module.

The Rg module, a redundantly used quantum composition of U. G. form constituting a single inflection or locale of compositional form employed in the construction of the Rg continuum, is shown in FIG. 16 and is comprised of three primary compositions of form, referred to as systems or subsystems of the Rg module. Note that, while the U. G. describes any knowable or perceivable form based in the higher levels of constructive form on any theory of existence, in this specification of the U. M. we continue with the illustrative forms of the mind-body dualism demonstrated in the theory as a preferred embodiment of the invention, and simply acknowledge that other arbitrary theories may be applied.) The largely non-real form of the module, referred to as the Human Interface System, or HI (10), embodies a plurality of subsystems, to be detailed later, that support the representation and realization of communicative real and non-real forms existentially coupled between the human user and the module; the embodiment, translation and determination of correspondence of non-real form of the module; and the realizational and representational capacity of affecting the real form of the module in regard to human user communications.

The Realization System, or RS (11), of the module, as shown, embodies a plurality of subsystems that support the placing into existence of the real form of the module. Generally, the realization system of the Rg module is referred to as the real form of the Rg even though a main portion of its apparatus is not, by declaration, the realized phenomenology that results from the RS's action. Thus only a portion of the RS literally constitutes the real form proper of the Rg module.

The third main modal composition of form embodied in the Rg, referred to as the Correspondence System, or CS (12), is neither the declared real nor the declared non-real form of the Rg. Embodied separately or within either the HI or the RS as a subsystem of either, the CS is the embodiment of the compositions of form that establish the correspondences between the real and non-real form of the Rg by design of the enabler. The CS thus maintains existential control of the Rg by how the HI (non-real and communicated real form) and the RS (real form) so modally engage each other under embodied modal strategies of the enabler. For example, in the case of the Rg module (not androids), all modes of existence are subordinated to the communicative modes of the Rg, ultimately to the communications of the human user. The extent to which existential or inertial autonomy is embodied in the Rg as an extension of the inertial existence of the (human) user is determined by the form of the CS. The CS determines the default and existential modes of the Rg.

Taken as a phenomenological modal composition of form as shown, the Rg module embodies the quantum moments of the universe. Each of the HI, RS and CS can so transform among themselves, or, by way of connectedness, to other Rg modules.

Generalizing the high-level structure of the Rg module, the real or physical world, or reality of the human user, is structured by the module within itself in such a way that the process of epistemologically structuring and realizing reality is linked (through the existential forms of the module) to the thoughts or non-real forms of human users so that the thoughts of the human users are represented and realized in physical structure known to the human users, enabling the real physical structure known to the users or enablers (the module), in turn, to represent back to the user likewise thoughts (non-real form), in a manner verifiably showing a correspondence between the thought and the reality of the thought of the user and at once providing this process in an integrated manner for a plurality of human users within a module and also within the continuum of such modules for even greater pluralities of users. This process is the essential function carried out by the HI, RS and CS of the Rg module, collectively, as discussed thus far. The Rg module, then, is a phenomenology of form whose purpose it is to embody the extended existential capacities of pluralities of human users distributed within the module itself and throughout the continuum of such modules in the modular compositions of the HI, RS and CS of the Rg module used redundantly as the continuum and the module expand.

As mentioned earlier, the key design principle of the Rg module (and the continuum) is the modularity or interchangeability of the Rg and its component systems, or its modal reconfigurability in the generic use of phenomenological compositions of terminal U. G. forms. Each HI, RS and CS system structure of the Rg, however, further embodies compositions of terminal forms of the Rg in support of the existential processes carried out in the HI, RS and CS.

Considering first the subsystems of the non-real form of the Rg, or the HI, the HI is comprised of two principal generic phenomenologies of form. The first, referred to as the Terminal or Communicative System, or TS (13), embodies in it the shared sense-motor real form of the communications between the user and the Rg—communications of their respective non-real forms. The TS existentially embodies the real form of the user's and Rg's communicative modes of existence with respect to each other. The purpose of the TS then simply is to embody the real form of communication which contains the knowable (symbolic) forms of the user and the Rg in the real (physical) sense-motor medium of the user. The forms of the TS typically are embodied or enabled in the senses-motors of human being, though they need not be. Any definition of sense-motors of communicative capacity can serve as the phenomenology of TS, including those of synthetically-created forms on Being, or androids.

Figure 17:
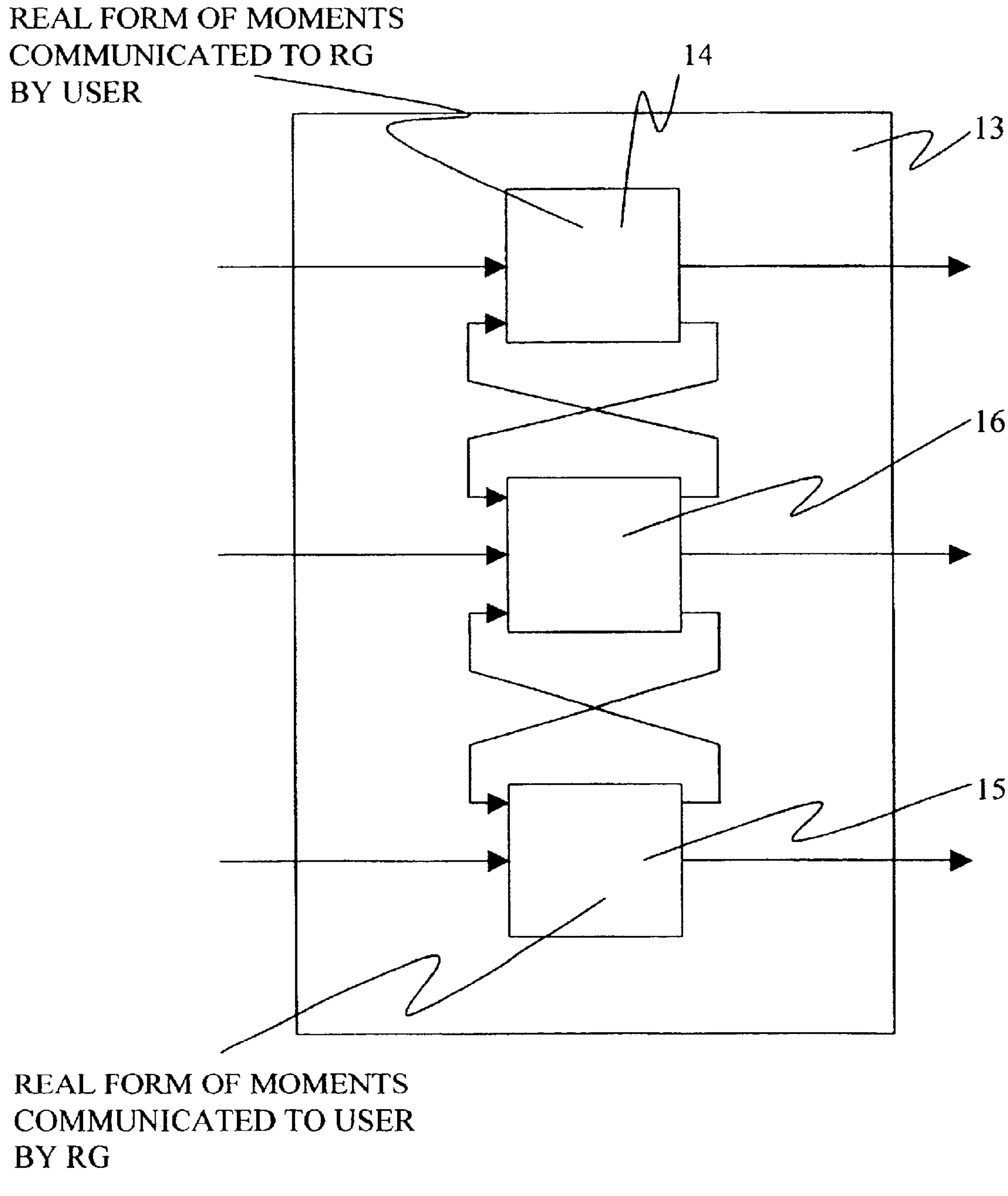
FIG. 17 shows the terminal or communicative system.

Generally, since the Rg module is responsive, in terms of the engagement of its modes of existence, to communications of the user, the form of the TS is partitioned into two separate embodiments of fonn to provide for the existential processes of representation and realization, primarily in the default mode of the Rg. As shown in FIG. 17, the Input System, or IS (14), of the TS is the real form embodiment which existentially couples the non-real form (mind) of the user and the non-real form of the Rg in a realization of the communication modes on the part of the user. Such a realization of the user is mirrored in the non-real form of the Rg as a representation to the Rg. The Output System, or OS (15), of the TS, as shown, is the real form embodiment which existentially couples the non-real forms of the user and the Rg in a realization of communication on the part of the Rg. This realization is mirrored in the non-real form of the user as a representation to the mind of the user. While the sense-motor configuration of such forms modally requires the iterative use of each of the input and output systems in even a single quantum realization, say on the part of Rg in communication with the user (for example, in order that Rg knows what it is communicating or sense what its motors are actuating), as described in the theory of the invention, the TS of the Rg is configured on the basis of the existential couplings of (distinct) realizations and representations between the user and the Rg. This configuration is designed primarily for use in the default mode of the Rg, since the shared real form of any communication of an inertial nature (existential mode) abides by the sense-motor forms of the modes of existence defined in the theory of the invention, and typically is driven by the faculties of mind of the existential mode. In the default mode, partitioning real forms of communication based on the directionality of the modes—the speaker or the listener—allows the forms of convention to be readily retrofitted to the TS.

Associated with the TS, embodied optionally within the TS or within the HI but extrinsic to the TS, a Translation System, or TRS (16), of real communicative form serves the purpose of physically transforming communicative real forms (e.g., symbols) of a given language to arbitrary languages in order to translate the language forms to a language compatible with either the user or the Rg. Since the TRS intercepts or intercedes in the existential correspondence of a communication, thereby altering the known (symbolic) form outside of the knowing of either non-real form of the communication, it is regarded as a physical transformation or alteration to the communicated form (as is typical in conventional communications systems in the use of noise attenuation or filters). The real form that the TRS translates a given communicated form into is what transformational form is existentially connected to the non-real form of either the Rg or the user. For a mental visualization, the TRS can be viewed as a diplomatic translator of international affairs—a being who physically alters the real forms of language that are communicated.

Figure 18:
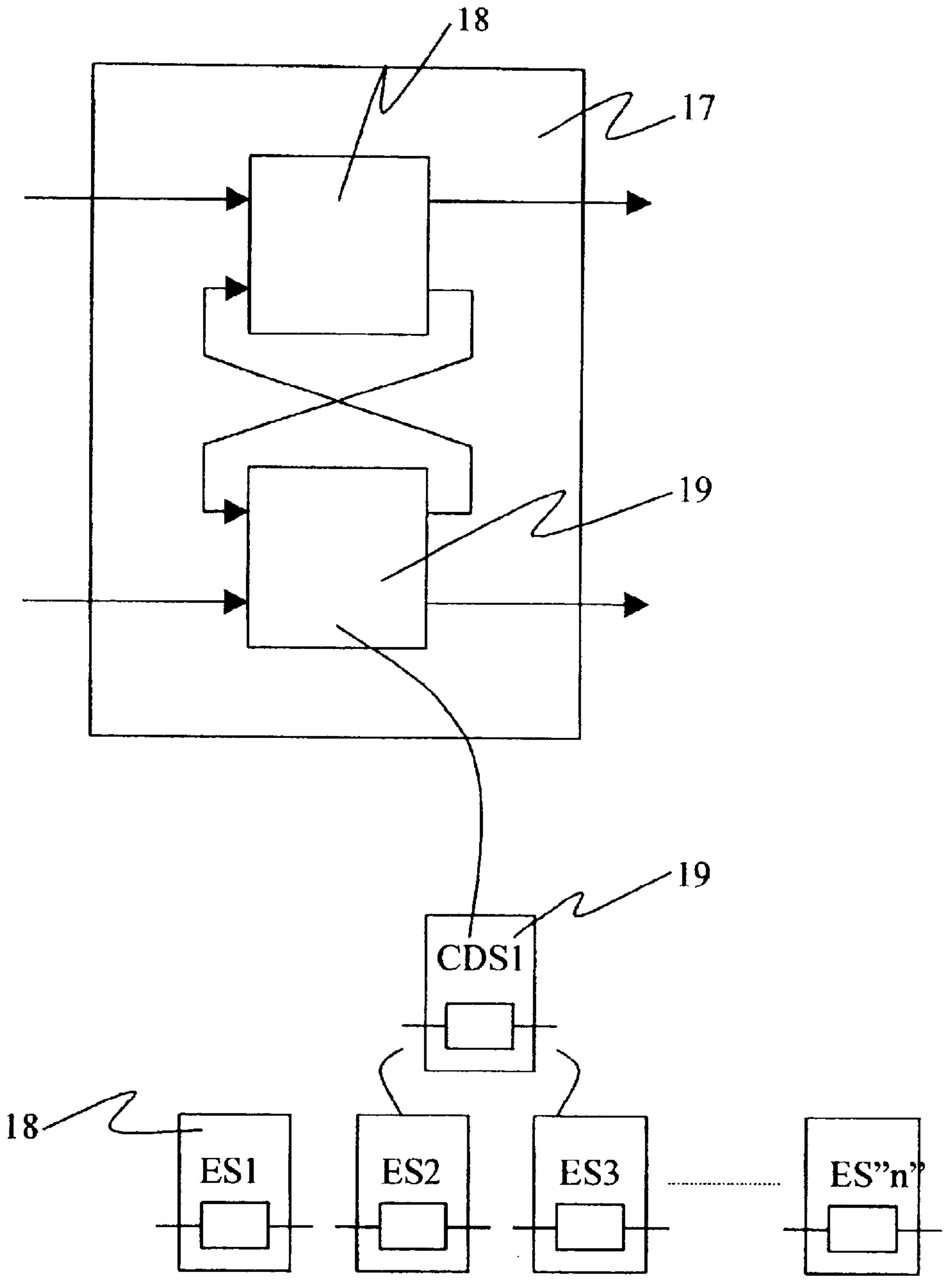
FIG. 18 shows the support or ancillary non-real system.

The second primary subsystem of the HI, comprised of a plurality of various compositional forms or subsystems, serves as the embodying structure of the non-real form of the Rg in support of the modal communications of the HI with the user and the realizations and representations of the real form, or RS, of the Rg module. Referred to as a Support or Ancillary Non-Real System, or SS (17), as shown in FIGS. 16 and 18, this non-real support system of the HI provides for the embodied forms of existential translations of the faculties of mind, and thus both the imaginative and comprehensive forms of consciousness, as defined in the theory of the invention, extended to the Rg from the human user. The component forms of the SS are shown in FIG. 18 as an Embodiment System, or ES (18); a Correspondence Determination System, or CDS (19); and varying levels of existential translation in the form of a consciousness defined in the theory using U. G. constructions. The default mode, of course, is defined from a phenomenology of the user's knowing only and differs significantly in definition placed on nonreal form in the existential mode, wherein non-real form obtains from the pronoun system and the default mode does not. (The default mode relies entirely on U. G. phenomenological and existential grammatical construction without the pronouns.) The Embodiment System accommodates the embodiment of the transformations of the objective forms of consciousness, as the literal instances of phenomenological correspondence of the U. G., in the cognition of the Rg. The CDS is an embodiment of the capacity to transform any compositional, or simply epistemic form of the ES. The CDS is a literal embodiment of phenomenological correspondence for use by the user's engagement in the default mode and the Rg's engagement in the faculties of mind of the existential mode. The forms of ES thus correspond to the real forms of TS in the communicative modes of existence and correspond to each other in the action of CDS on them as shown in the figure.

In either the default or existential modes the forms of ES correspond to the Rg's real form (1). In the existential mode of the Rg, the faculties of mind engage the correspondences of CDS in accordance with strategies developed by the enabler or learned by the Rg of the faculties of mind (reasoning, inferencing, imagining, etc.). In the default mode of the Rg, a cognitive prompting mechanism of the modes of existence is employed in engaging CDS autonomously or at the direction of the user. Through the modal engagements of TS and SS under coordination of CS, the human user embodies non-real forms of mind (of the user) in the ES, and engages the forms of ES in the user's own determination of correspondence of ES forms or in use of the CDS on the part of the Rg in default mode. Significantly more autonomy is given to Rg's use of CDS in existential mode, however. The Rg likewise conveys ES forms from its own non-real embodiment to that of the non-real form of the human user; i.e., the mind of the human user in similar communications.

Figure 19:
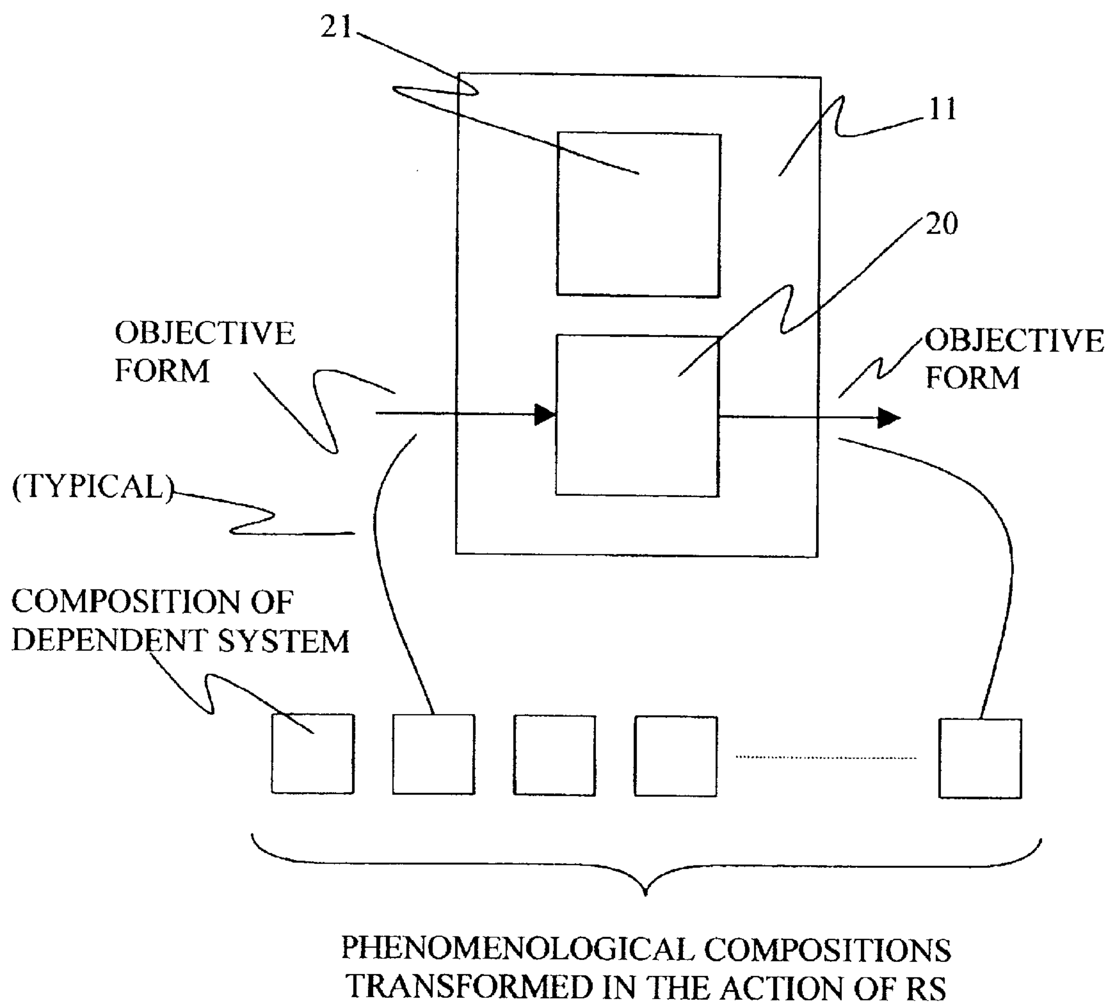
FIG. 19 shows the dependent system as a plurality of objective forms.

Considering now the real form of the Rg, as shown in FIGS. 16 and 19, the RS or realization system (11) is comprised of two principal subsystems of modal compositional U. G. form.

One such system, referred to as the Dependent System, or DS (20), embodies the quantumly realized phenomenologies of form that are declared by the enabler or user to be the real form of the Rg module, and thus to be that portion of the extended reality of the user over which the extended non-real influence of the HI and the communicated forms of the human user are to preside. Hence, this modal phenomenology is referred to as the dependent system of the RS. In terms of the forms of the theory of the invention, a DS can be any objective form, defined as a single object or phenomenological noun (in transformation) to a great composition of phenomenological form (an electron, or all the electrons of the electronic apparatus of the electronics industry—a word or a book full of them). Causal elements, in transformation by phenomenological correspondence, are dependent systems, though as the objects of correspondence. In the form of the MRS, the DS of the RS is one such noun form or causal element of the realized form of the MRS in transformation with one other. In the placing into existence of existentially-realized form, the RS, under the general structure of the MRS, so transforms one or more dependent systems with one or more others in a quantum moment of the enabled existential universe. In the modally-engaged transformations of dependent systems, the RS holds in existence, or embodies, the real forms of the U. G. that enable, for example, forms that correspond to the moments of ES (non-real forms) of the Rg.

The apparatus of the RS associated with enabling the quantum moments or transformations of inertial form constituting the real form proper of the RS (the transformations of dependent systems) is referred to as the Controller System, or CTS (21) of the RS as shown in FIG. 16. In the form of the MRS, the CTS is the causative form of the RS, specifically applied to the transformations of dependent systems. Whereas the dependent system is composed of a great plurality of generally similar forms within a given module, but different compositionally and transformationally (i.e., generally speaking the dependent system of the RS is taken to mean a great plurality of generically the same but individually disparate dependent systems), the CTS of the RS is composed of distinct compositional forms and subsystems, each having its own phenomenological or existential purpose in the performance of the Rg's realization of quantum moments of inertial real form in correspondence with the non-real form of the HI (which in turn relate to the communicated non-real forms of the human user).

Figure 20:
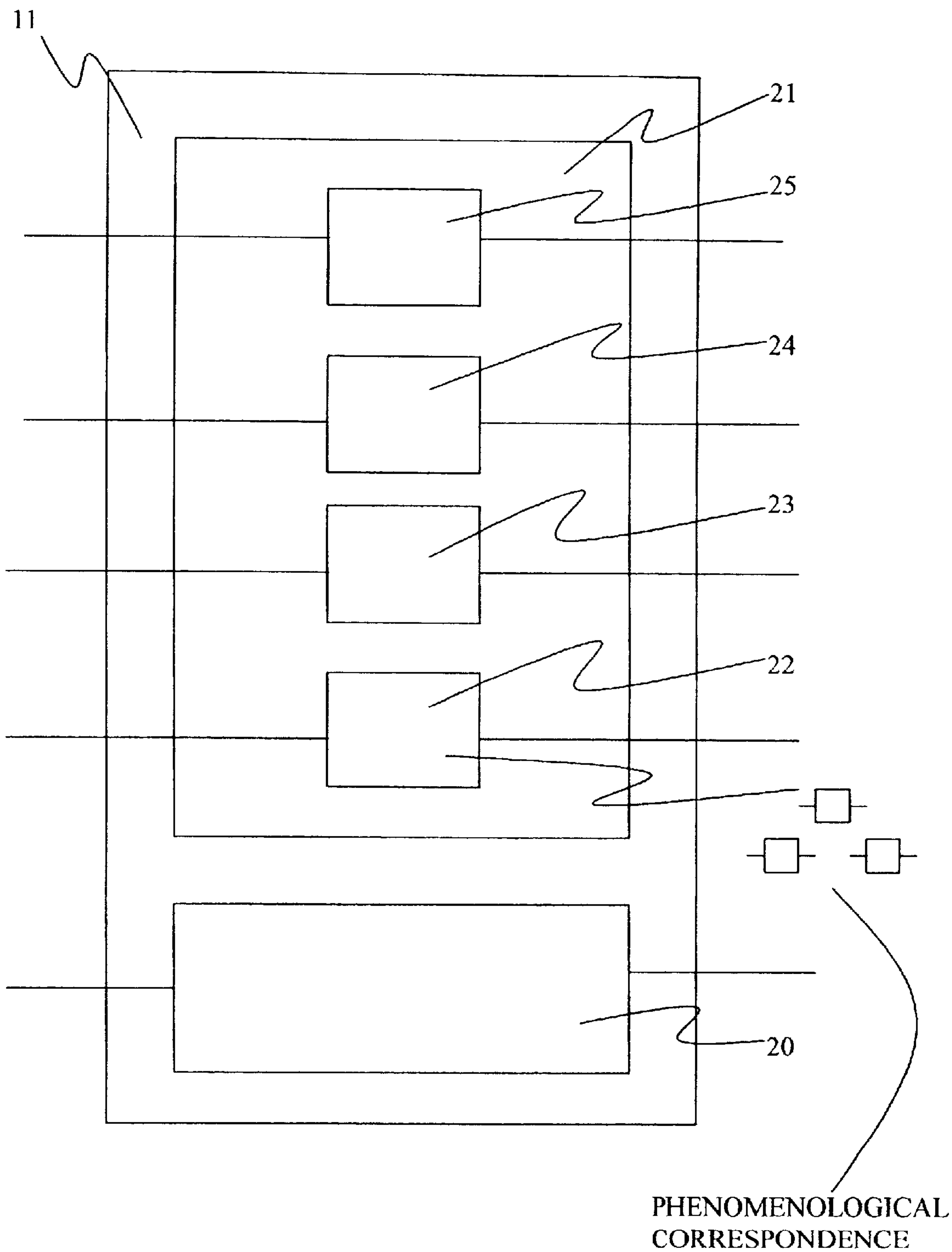
FIG. 20 illustrates the controller system.

As shown in FIG. 20, a Dependent System Transformation System, or DSXS (22), is embodied in the CTS for the purpose of embodying the coupling capacity, or connectedness of quantum moments, that transforms the dependent systems in quantum moments of the enabled inertial universe. For this reason the DSXS is sometimes referred to as the DS Coupling System of the Controller System. The DSXS embodies the H determinations of phenomenological correspondence for the transformations of dependent systems.

In connection with the forms of the DSXS, another subsystem of the CTS, referred to as the Controller Embodiment System, or CES (23), serves to embody translations of the embodied transformational forms of the ES from the HI in such a manner that the embodied translations provide for the causal structures required to couple the dependent systems of the RS under DSXS in order that the realized quantum moments of the RS correspond to the quantum forms embodied in the ES of the HI as known in non-real form by both the user and the Rg. The CES of the RS thus embodies a phenomenology of form that links the quantum phenomenologies of the ES, or of the non-real form of the HI, to the necessary connectednesses of the DSXS of RS and so provides a readiness to realize the quantum real form of the RS, in DSXS operation on dependent systems, in correspondence with the ES, or non-real form of the HI.

Another embodiment of the CTS, referred to as the Realization Control System, or RCS (24), serves as the Controller Systems' capacity to coordinate the engagement of the real forms of the DSXS, and therefore the dependent systems in transformation, and the forms of the CES in relation to the correspondence of them to the forms of the ES, in cooperation, of course, with the Correspondence System, or CS. Since the CS actually controls or regulates, by way of the default and existential modes of the Rg, the RCS of the CTS, the RCS is a controlling mechanism placed within the CTS, subordinated causally to the CS, which provides the causative forms of the actions of CES and DSXS such that the resulting phenomenologies of real form of the RS (DSXS quantum realizations) actually correspond to the Hi's transforming non-real form, which is subordinated, by design constraint, to the communications of the user.

Since the real forms of RS that are engaged as a matter of the embodied RCS of a particular CTS can be extended throughout the continuum of Rg modules (or even within a single Rg wherein multiple RCS, CES, DSXS and DS combinations are found), the Continuum Realizational Control System, or CRCS (25), is embodied in the CTS as a capacity of the CTS, apart from the RCS, that engages the actions of particular realization systems, embodied throughout the continuum. The continuum structure of real form thus is accomplished by the CRCS's of the respective Rg modules. Since the controlling causalities of the continuum's form arise from communications with the user and from transformations of non-real form of the HI, the CRCS, like the RCS, is subordinated causally to the forms of the HI and thus those of the CS.

In general, when the forms of ES of the HI are elaborated on also as forms of the MRS, the Rg module, composed in real and non-real form as discussed, is a controlled embodiment of quantum moments of enabled universes wherein, broadly, the embodied transformational forms of ES of HI are held in correspondence with the forms of RS, through the apparatus discussed thus far, in coordination by the CS of the Rg and within the controlling communications of the user in the correspondence of TS and ES structure at the HI. By applying the existentially causative structures of the real form of the Rg at one enabling level and the embodied non-real structures at another enabling level the Rg becomes an orchestration of realized forms (which may be real or non-real by declaration) held in correspondence with each other for the purpose of achieving enabled existential universes or forms on Being extended from the user's inertial reality, ultimately in the RS.

Figure 21:
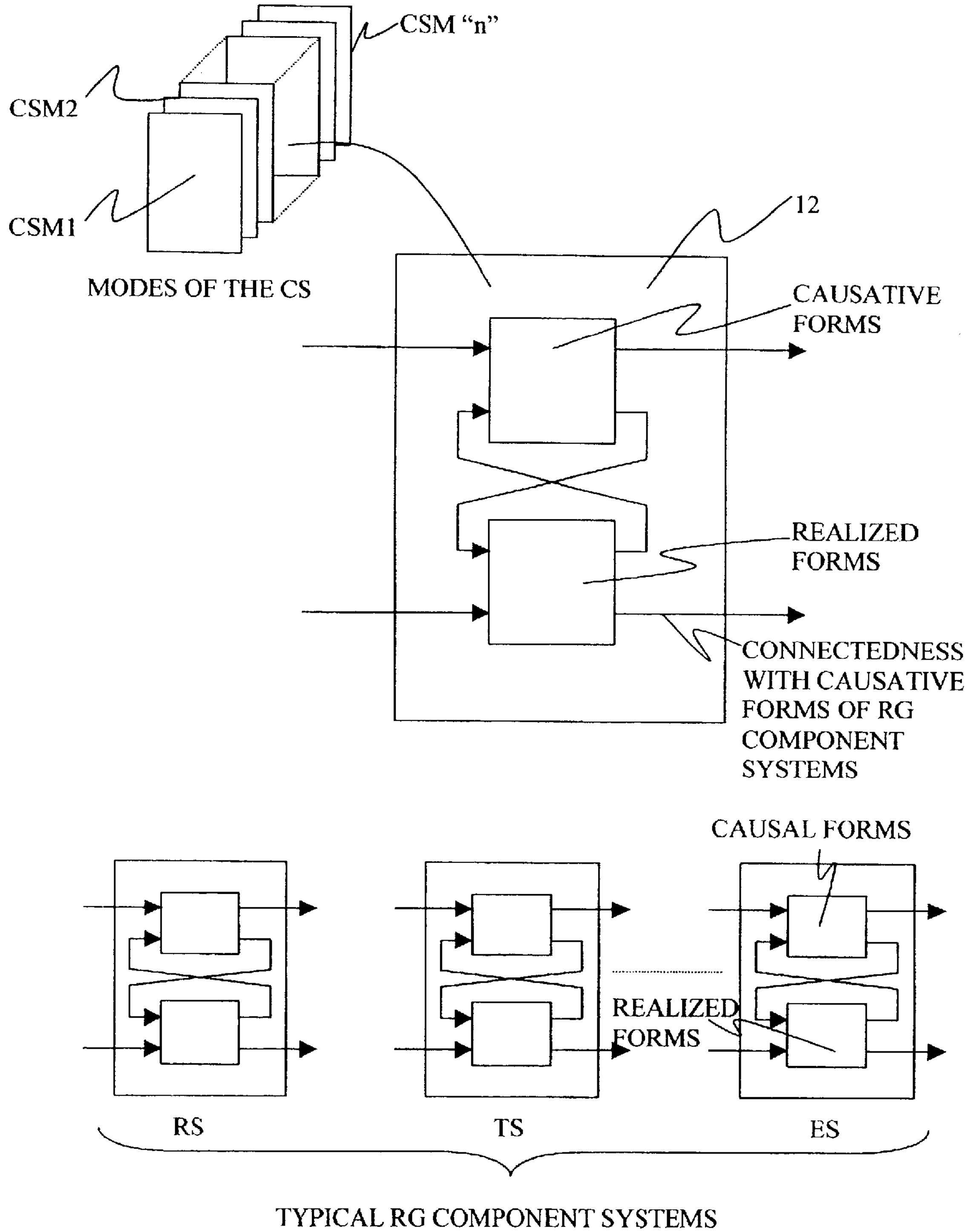
FIG. 21 illustrates the correspondence system.

The third and final principal subsystem of the Rg module, referred to as the Correspondence System, or CS (12) of FIG. 16, is neither declared real nor declared non-real form of the Rg. Since the CS operates beyond the knowing of the literally enabled phenomenologies of form (TS, ES, CDS and DSX transformations for example) the CS can be viewed as the philosophically ethereal form of the Rg that lies metaphysically outside of both the real and non-real form of the Rg module. Operating primarily in relation to the causative forms of the HI and RS, the CS determines the modal occurrence of all enabled moments of the Rg. If the forms of the Rg are viewed in terms of MRS embodiments, as discussed earlier, the CS is a form of the Rg that existentially engages the various causative forms of MRS-structured real and non-real embodiments of the Rg, as shown in FIG. 21. The realized forms of the various modular embodiments of the Rg are influenced by the phenomenological causations of the CS on the respective causative forms of the terminal systems of the Rg. In general, the modes of existence of the Rg, including the communicative modes, are enabled in the forms of the CS, since the CS ultimately engages real and non-real embodiments of the Rg in relation to each other through the apparatus of the causative and realized forms of the CS.

The subsystem structure of the CS under the existential mode of the Rg is an embodiment of MRS structures whose realized phenomenologies enable specific causations of form on the various components of the Rg module and whose causative form obtains from the modes of existence of motivation and learning of androidal construction. The default mode of the Rg, of course, severely constrains the action of the CS with respect to the motivation and learning of the Rg, since the action of the Rg in this mode is completely subordinated to communications with the user without inertial experience on the part of the Rg. The CS itself is caused to place the Rg into particular modes of existence by communication with the human user with the Rg in its own phenomenology of form, as shown in FIG. 21. The causative control, or modal strategy of the CS of the Rg is determined by placing the causative form of the CS in subordination to the communicative mode of existence of the Rg—modal compositions of form.

The Rg thus can be placed into various modes of existence, causally, in the user's communication, under the communicative modes of existence which dominate all other modes. The faculties of mind, for example, which result from the engaged use of CDS embodiments of the HI on ES embodiments in the form of existential translations, to be discussed in detail later, are causally engaged by a particular mode of existence of the Rg by way of the action of CS, which in turn ultimately is governed in the Rg by communications with the user. In the default mode of the Rg, essentially the same structure of CS occurs, but the forms of consciousness are nearly absent from the non-real form of the HI, leaving the transformations of non-real and real form of the Rg to correspond directly with the communicated forms of TS, without the breadth of cognitive processes available in the existential mode. The CS in the default mode of Rg ensures that the communicated forms of TS are held in direct phenomenological correspondence (as defined by the enabler of the Rg in the H-determiinations of correspondence) with the other defined forms of the Rg, without the faculties of mind that are otherwise present in the existential mode of the Rg.

An intuitive understanding of the principal difference between the existential and default uses of the CS can be obtained in considering the placement of a mental and communicative constraint on an android or human being such that all thoughts of the being must correspond only to communications of the being. What is realized in the being's motors, perceived in senses, and embodied in mind must be held in direct correspondence with what is represented in the real form of its communications. No thoughts or actions are possible that are not communicated to one other. While there are many important exceptions to this example as characterizing the default mode use of CS, it nevertheless demonstrates the default control the user wields over the form of the Rg. A major exception to this analogy is, of course, that the default mode of the Rg provides for a prompting capacity of the CS, wherein pseudo faculties of mind can be used in the correspondence of real and non-real forms of the Rg such that discoveries of form (knowledge) obtained in the action of the pseudo faculties of mind are made by the Rg and the CS engages the TS to prompt the user of the form. This constitutes a selective use of the faculties of the existential mode, wherein the real and non-real forms of the Rg still are not inertial (pronoun) and are known phenomenologically only to the user (or in any designated language not having intrinsic meaning to the Rg).

The Rg module, then, is a phenomenology of form of the enabler's knowing and perceiving whose terminal transformational forms or compositions, such as CS, ES, TS, etc., existentially interconnect in the use of MRS structures, in order that the various functional aspects of the Rg can be enabled as described in their own respective method and apparatus. At this level of discussion, then, the Rg module is defined using several different compositions of U. G. expression. At the highest level of subsystem form, the Rg is specified as a modal composition of HI, RS and CS, thereby allowing for the non-real (and communicative real), real, and modal or ethereal (existentially constraining) forms of the Rg. At the next level of compositional form of the Rg discussed thus far are the forms of TS, SS, CTS, and DS, allowing for, respectively, the communicative real forms (TS); the embodied non-real forms (ES), and the transformations of non-real forms (CDS) of (SS); the capacities to realize declared real form of the Rg (CTS); and the embodied compositions of form that so transform quantumly with others (under DSXS) as the declared embodiments of real form of the Rg (DS)—all embodied compositionally and engaged modally within the HI (TS, SS) and the RS (CTS, DS). Since it is sometimes convenient to refer to this specific high-level composition of the Rg, the composition can be referred to simply as a list of component systems (T, S, C, D) for brevity. The component-level compositional forms of the (T, S, C, D) structure and of the CS are similarly represented as modes of the component forms—$CSM_1$, $CSM_2$, . . . $CSM_n$, for example, of the CS. The terminal system (TS), as a further example, is composed of the input and output systems and the translation system and can be expressed as a list of components (IS, OS and TRS) and modes thereof ($IS_1$, $IS_2$, . . . $IS_n$). The entire objective composition of the Rg, at these levels of definition, can be expressed as various lists of compositions of phenomenological form.

Let us now consider in slightly greater depth the phenomenological and existential forms of the Rg discussed thus far in order to prepare for a discussion on the modal interactions of them later on.

Let us return to the form of the HI, which is comprised of (T, S) systems. As mentioned previously, the HI serves a twofold purpose in the structure of the Rg. First it couples to the non-real form of a theoretically infinite plurality of users in the existential form of the TS structure. The HI thus embodies non-real forms of the Rg corresponding to communicated non-real form of the user (and vice versa) and thereby embodies, as discussed, the capacities to communicate non-real form with the user and to so translate, existentially, such form in regard to the real form (1) of the RS of the Rg. Secondly, the HI serves the purpose of existentially separating (metaphysically partitioning) from the user, by the very existence of its non-real form, the knowledge and realization of real form or reality, in that such reality or real form is so realized not directly by the user, since the user can only communicate form. The real form of the Rg thus is realized as a consequence of the non-real forms and modes of existence of the Rg, though such existence is extended, in a modally engaged manner, from the user.

Regardless of the modal constraints placed on the structure of the HI by CS and other forms of the Rg in the default or existential modes, however, the HI embodies the principle forms of the communicative faculties of the Rg and the primary cognitive capacities of the Rg. Through the engagement of vast arrays of cognitive devices, or CDS structures, upon actual moments of non-real forms, or ES structures, in connection with the real transformational forms of TS and the real form (1) of RS under communication with the user, the HI thus provides the non-real and communicative real aspects of thinking and communicating about a perceived reality extended from the user. To the extent that anthropomorphic sense-motor forms are employed in the TS and that quantum transformations of non-real form of SS obtain from the reality of the user (through RS), the HI portion of the Rg will appear to the user to coexist in the same quantumly transforming inertial world of the user. To the extent that other forms are employed in the realizing of the enabling forms of the HI, (e.g., non-anthropomorphic), the Rg will exist in service to, say, an android or some other synthetic form of existence, whose corporal capacities are different, inertially, from human corporal form.

Since the meaningful thoughts and communications of the Rg, like any inertial form, obtain from their correspondence to other form, presently real form, the RS of the Rg serves the purpose of embodying the form from which the Rg's cognitive experience will attain meaning. In the existential mode of the Rg, then, the dependent systems, in connection with RS realizations, are crafted, similarly to the constructions of androids, into senses and motors, since it is what the Rg senses and so influences by motor skill that provides for the meanings of the communications between the user and the Rg. In the existential mode, the Rg constitutes a semi-autonomous form of existence, and differs from android in how it engages motors and so perceives the world in subordination to its communicative modes of existence. The Rg in the existential mode so realizes the real forms of RS, or quantum moments of its being, as either senses or motors. Typically, the causations of the rest of the world (of real form) in the existential mode are beyond the knowing and perceiving of the enabler and thus constitute the reality of the enabler as known and perceived by the Rg. Since the real form of the Rg in the default mode does not transform inertially, it is viewed as all motor, even though senses, by way of conventional definition, are enabled in their phenomenologies.

By analogy to conventional forms of technology, a simple existential mode of the Rg might involve, for example, the redefining of an aircraft, or an aircraft industry, in U. G. structured senses and motors, any forms of which constitute quantum transformations of the universe, wherein the phenomenologies of sense and motor of the aircraft are taken as pluralities of dependent systems in quantum transformation by CTS (DSXS), as the real form of the aircraft, wherein the rest of the world derives as it does in the enabler and wherein the non-real forms (ES) obtaining from sense are held modally in correspondence by CS with the sensed and actuated (motor) reality in the cognitive transformational forms of ES under CDS action and the faculties of mind. Since it is the consciousness of the Rg, and not that of the user, that embodies the existential correspondence to real form (embodiment), the real existence of the aircraft or industry is offset existentially from that of the user by the consciousness(es) of the Rg. Since the consciousness(es) of the Rg is held subordinate to the communicative modes of existence of the Rg, the existence of the aircraft or industry, as known by the Rg, responds through the embodied consciousness of the Rg to the communications of the user. Though the conventional art is discussed later on in the disclosure, it is easy to see that as a consequence of the forms of the U. G. and those of the U. M. discussed thus far, it is not only an aircraft or aircraft industry that is offset from the user and maintained in existence by the Rg; it is the whole realm of enabled inertial form—conventional and future art and androids. There is no known form, conventional or otherwise, that cannot be so offset and maintained in existence by the Rg. Living forms, however, since they are beyond knowing, can only be declared forms of the U. M. The U. M. thus is an embodiment of our human knowledge outside of or extrinsic to the corporal forms of human being. In tandem with this example, however the forms described could have been realized entirely in the RS, but this point will be explained in greater detail later on.

The default mode of the Rg is an intentionally-imposed restriction on the non-real capacity, and hence the sense-motor configuration of real form of the Rg, such that the forms of the Rg are jogged or stepped through their transformations in immediate correspondence with TS, or communicative real form. In contrast, the existential modes enable real and non-real form to transform such that communications only generally guide the modal existence of the Rg. In order to block out the consciousness of the Rg of the existential mode in the default mode, several constraints are placed on the form of the Rg. First, in the default mode of the Rg, the RS realizes only motor or only sense, whichever terminology is preferred since once inertial pronoun form is eclipsed the distinction between sense and motor is unnecessary and all real form is phenomenological. In the real form of the RS in the default mode, vast arrays of DS compositional forms in transformation of DSXS quantum moments, are realized as phenomenological forms in transformation (only). They are not carved up into existential senses and motors of inertial form. In such a case, they are, simply, phenomenologies of form. They are conventional airplanes, computers, information highways, bridges, atomic accelerators, DNA recombinations and so on without an extended existential non-real inertial form (consciousness) knowing them by way of the inertial pronoun system. The purpose behind the default mode of the Rg is, of course, to bypass the inertial consciousness of the Rg in the existential mode and to afford the user the capacity to realize forms that by design are not desired to be known in the extended non-real inertial capacity of the Rg but rather are desired to be shown corresponding directly to non-real embodiment of the user via TS. In such a case, there is no correspondence between inertial real and non-real form of Rg obtaining from the pronoun system as defined in the theory of the invention. Rather there is an intrinsically meaningless phenomenological correspondence between real and non-real form. The pseudo consciousness of the Rg in this modality thus involves a very restricted use of CDS of the HI by CS. The forms of ES and TS thus are employed more as phenomenological embodiments of knowledge of the user than as forms of communication and inertial consciousness of the Rg. The CS in the default mode simply maintains a predetermined correspondence between the forms of TS, ES and RS (DSXS) moments. The default mode of the Rg serves as a means of realizing and holding in existence real forms that are more or less represented to and known only by the user at the TS, as opposed to communicated to the Rg. Thus, when a machine is required to realize and hold in existence real form that is represented by the user, the default mode of the Rg is appropriate. When it is required that such real form be held in existence relative to a synthetically-enabled autonomous consciousness (with the communicative constraint of Rg), the existential mode of the Rg is appropriate.

At this point in the specification, let us reserve the detailed description of the terminal forms of the Rg module to forthcoming discussion in order to now address the modal structure of the Rg module in greater depth. Moreover, since the Rg continuum structure is especially meaningful after the detailed description of the terminal forms of the Rg module, we now concentrate only on the modal form of the Rg module, which is enabled locally to the Rg continuum, without regard to what forms of the module relate to the global structures of the continuum. Before considering what are the two principal modal structures of the Rg module (not the default and existential modes of Rg) from the local point of view of the Rg, let us review what is meant by a modal form in general.

In the theory of the invention it is demonstrated that the form of phenomenological composition is at work in all U. G. form. From the point of view of the enabler of form, one must know the aggregate formation (composition) of what is known before one enables the knowing of the form composed. In all enabled constructions of knowing, an aggregate formation on causal elements in their connectednesses to each other must be defmed. This aggregate formation of a plurality of causal elements and connectedness, as discussed in the theory, is called phenomenological composition.

Since compositions of form are enabled, they are first formed by the enabler in aggregate. The fact that an aggregate's objective forms are themselves transformations (epistemic instances or causal elements, and compositions thereof) has led to the notion of a mode or modality of form. Any compositional form of a phenomenology—be it a single epistemic instance, a novel of literary work or an analytical treatise on the physical universe arbitrarily can be considered a single modal composition of form or a mode of phenomenological form. In the quantum transformation of form, a mode transforms with one other. There can be infinitely many modes in any embodiment of form.

Regarding the terminal forms of the Rg module discussed thus far, such forms by definition are modes of compositional form first before they are the compositions so defined earlier in the specification. As a consequence of the definition of causal element, moreover, wherein an infinite composition of epistemic instances are embodied in relation to their similarities of transformational types (e.g., verb), infinitely many objective compositions are possible through the embodiment of a single causal element. Each instance of a causal element thus is a mode of the element. If one enabler modally connected a single causal element of a composition of one transformational instance to itself in quantum transformations of the universe, for example, one might obtain usages of the verb to be as follows: I am alive; I am smart; I am silly; I am tired, and so on (or, mathematically, A is equal to B; C is equal to D, and so on). Thus, the modalities of even a single causal element are infinite. From the point of view of existential enablement, the U. G. form of modes of causal elements simply reflects that any composition of form is possible by the enabler as a consequence of the enabler's own modes, or that any knowable form is composed modally. This further requires that any instance of phenomenological correspondence is a mode wherein any composition transforms with any other. A phenomenological mode is an instance of any composition in transformation with any other. When a composition of form is specified in an existential enablement, it is taken to be the objective form that is in transformation with one other under phenomenological correspondence.

The forms of the Rg are extensive compositions of causal elements. Such compositions, like the causal element, are infinite in their modalities. Since any modal form terminates objectively in the enabler's meanings (correspondence of form) ascribed to the objective and transformational forms of epistemic instance, the modalities of the Rg module are bounded or contained in enabler's existence in the meanings of the compositional forms (transformational forms) of the enabler's existence. The TSforms of Rg, for example, obtain from U. G. definition in the embodiment of real form of communicative modes of existence. ES forms obtain definition by way of embodiment of non-real form; RS, from the realization of declared real form and so on. The objective forms known by the user and the Rg in communications enabled through the real form of TS, then, are modally infinite. The meanings ascribed to such objective forms of TS, which by definition must abide also correspondingly with the real form of the Rg or user's extended reality, are defined modally. What the Rg does, or itsfunction is a matter of placing objective definition on the phenomenologies of form that are known each by the user and the Rg through TS. The process of defining what the Rg does in relation to the knowable form of the user and the Rg is referred to herein as embedding the modal compositional forms of the Rg (in the enabler's knowing) in the form of enablement.

Figure 22:
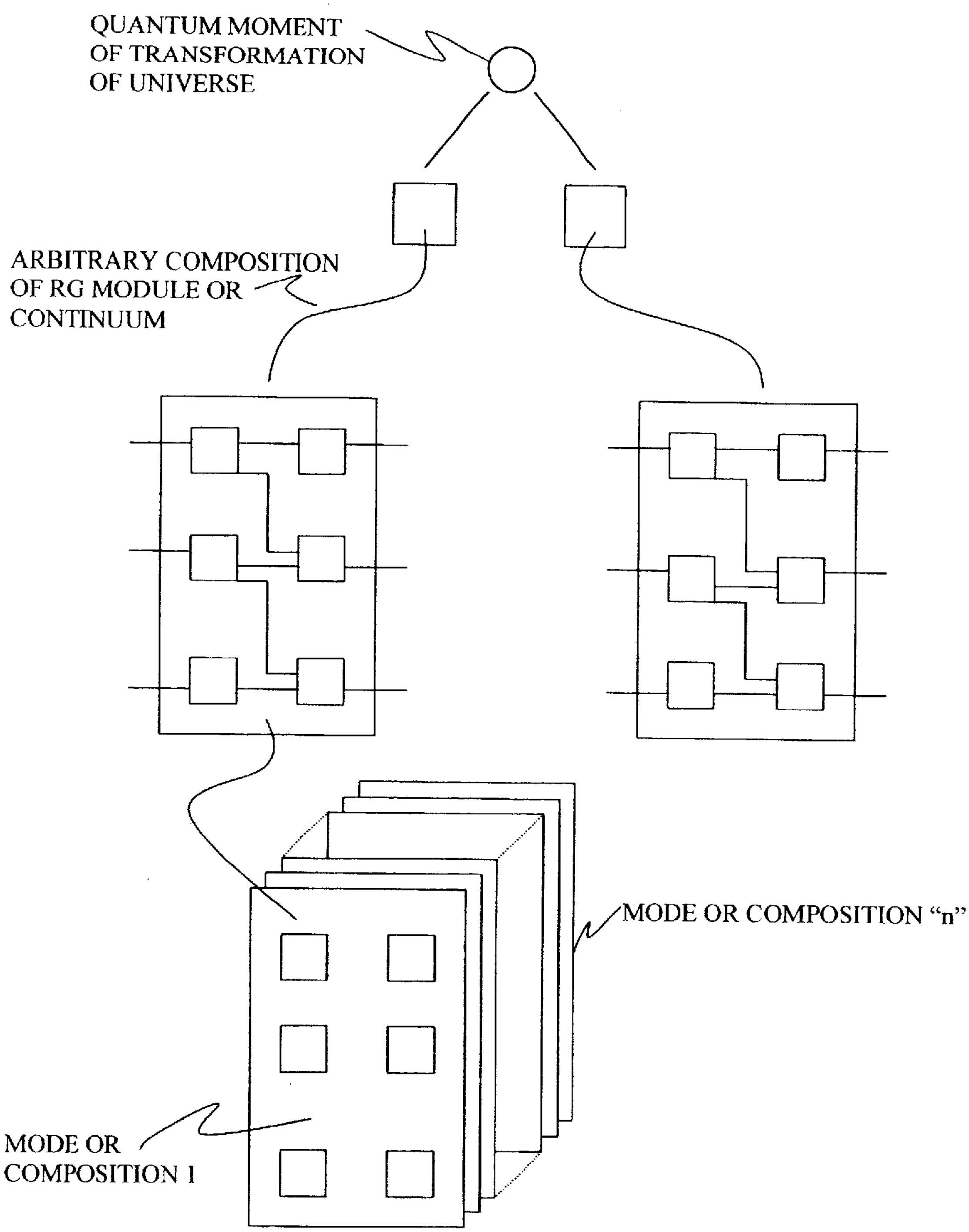
FIG. 22 illustrates the modal forms of the Rg Module and the Rg Continuum.

The Rg thus does different things in different modes of its existence. When a composition of TS, ES or RS, for example, is depicted in this specification, what is implied in the representation is that the objective form is in modal transformation, and further that any of infinitely many such compositions (modes) are possible in the representation, since what the Rg does is simply transform in quantum moments of the universe as specified. A composition of the Rg then simply defines one objective form of moments of the enabled universe, wherein the objects of the composition, or causal elements (of composition) represent transformations of the universe so composed. The form occurs, of course, only in transformation with one other composition. As mentioned throughout the theory of the invention and in the Quantum Nature of the Forms of the U. M, the universe occurs transformationally. To represent the form of the U. M. objectively only would undermine the core postulates of the theory. The compositions that are in transformation by TS, for example, correspond to those of ES (in the various ways of the existential and default modes). These moments of transformation are represented in the U. G. in the action of CS on TS and ES. The compositions of CS, moreover, are themselves quantumly transformed (modally) as described earlier. A mode of the Rg module or the Rg continuum thus is a single composition of it, of infinitely many compositions, occurring, knowably, in a single moment of the enabler's inertial existence. Since any transformation of the universe can be embodied only (cannot be known), the Rg module and Rg continuum are thus known locally to an existence. Globally, the module and continuum are the real extended embodiment of the spiritual universe, beyond any objective knowing. This is summarized in FIG. 22.

While a complete accounting of the modes of the Rg is presented later after more of the forms of both the Rg and the Rg continuum are specified, presently we consider that within the modes of existence described earlier (e.g., CS control over real-non-real correspondence in default and existential modes subordinated to the communicative modes of existence) what forms are so communicated between the user and the Rg concerning the form of the Rg pertain to two primary modalities that arise with regard to the local capacities of the Rg. These two principal modes of the local capacities of the Rg are referred to as modules of the Rg module.

Figure 23:
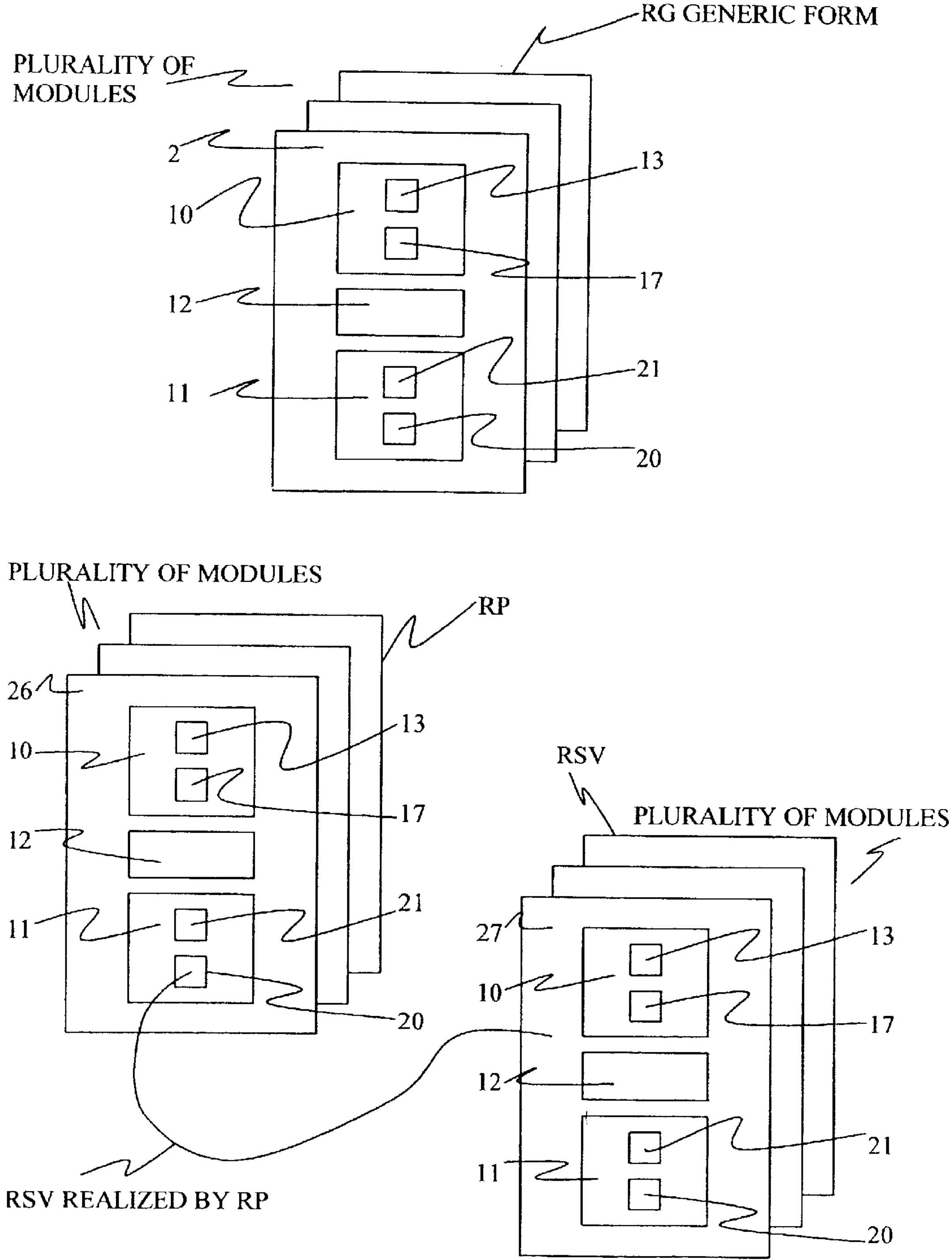
FIG. 23 shows the primary functional modules of the Rg Module: the platform and service modules.

Referring to FIG. 23, the two principal modes of the local form of the Rg module are referred to as the Platform Module (26), and the Service or Application Module(27). Since these are modes subordinate to other higher-level modes of the Rg, but are primary to the local performance of the Rg, they frequently are represented as Rp, or Rg Platform Module and Rsv, or Rg Service Module, as modes subordinate to the Rg in general, following in the nomenclature of resultants of compositional form (reaching back to systems theory). The Rsv, or service module of the Rg, is a modality of the Rg that is subordinate causally and compositionally to the Rp or platform module.

Before considering in overview the service module first, let us make a distinction between service and platform modules, or generally, between any form and that which enables it. The platform module serves as the enabling apparatus to the service module Rsv as shown in FIG. 23. Embodied itself in (T, S, C, D) configuration, the platform module Rp of the Rg (26) enables the existence of pluralities of other (T, S, C, D) structures that are referred to as Rsv or service modules. If the Rsv and the Rp modules are viewed broadly as MRS forms, the realized form of the Rp module would be the Rsv module itself. In the modal capacities of the Rp, a theoretically boundless number of Rsv modules are possible from a single Rp module as shown. Since the Rg enables the modalities of Rp there are a theoretically boundless number of Rp modules as well. The form of the Rg modally terminates in each of infinitely many Rsv modules enabled in the apparatus of the Rp module, of which there are also infinitely many, if desired. From the user's standpoint, the primary functionalities of the Rg as discussed thus far are evident in a single Rsv module.

The service modules are worlds of constructive power afforded to a user or a plurality of users enabled by the apparatus of the platform module, Rp. The knowable forms of the TS structure of the Rsv module are to the user, what the Rg does locally in the perspective of a particular user. Since the Rsv module is enabled in (T, S, C, D) structure from the point of view of the enabler (or user) of Rsv modality in Rp modality, the knowable forms of TS structure at Rsv modality are not the forms of (T, S, C, D). Rather, they are a whole complex of forms yet to be defined which in turn are embodied in the (T, S, C, D) forms of the Rsv modules.

The platform modules, themselves (T, S, C, D) structures of other modalities of Rg yet to be discussed, enable the embodied knowledges and realizations of (T, S, C, D) structures in the forms of Rsv modules. The user of the Rp module thus communicates with the Rg through TS about forms that themselves are (T, S, C, D) structures (or representations thereof) of Rsv modules.

The purpose behind this modal definition on the forms of the Rg is, of course, to take advantage of the defined terminal forms of the Rg (T, S, C, D), which are designed modularly for boundless replication. In the performance of HI, RS and CS, it is defined that the non-real form of the user is communicated via HI apparatus (TS/SS action in communicative modes of the Rg) to the Rg, which form is then known in the inertially offset consciousness of the Rg (ES and CDS action). Nowhere in such definition was it decided what forms could be known and realized in the apparatus of the Rg. The Rp and Rsv modules are the forms that are known and realized. In the Rp modules, instead of knowing and realizing airplanes, industries or androids, the generic forms of the invention itself, namely (T, S, C, D) or HI, RS and CS structure under Rg definition are known and realized in the form of an Rsv module. It is then in the Rsv modules that the forms of airplanes, androids or any other useful form of the user's or the Rg's creation (conventional and future art and androids) are known and realized. Since such applied forms as those enabled in the Rsv module are inevitably bound to the enablement of the Rsv module itself by the Rp module, they are indirectly held in existence by the holding in existence of the Rsv module itself by the Rp module. In terms of enabling media, the forms so enabled in Rsv modality are ultimately constrained by the media of Rp modality.

With this in mind, then, let us consider the form of the service module, or that form for which provision is made by the Rp module for a service or application user.

When all the constructive activities of human endeavor are considered in laying down a purposeful functionality of a universal machine, bearing in mind the present goal of expanding the human existential universe, the one process, so to speak (actually, epistemological form), characterizing such activities is determined in the present invention, by way of analogy to conventional viewpoint, as the process of modeling and implementation (of a model), (31), as shown in FIG. 24. The existential process of creating and implementing (realizing) models serves as the definitional basis of the meanings of the communicated forms of all of the finctional modalities of the Rg (Rp, Rsv and others) and arises principally in the default modes of the Rg, since the existential modes of the Rg draw on inertial definitions of form or on the pronoun system more fundamentally for the meaningful basis of its transformational activity (e.g., all communications of the existential mode cannot be defmed as pertaining to models and realizations thereof, of the user's existence. Rather, they apply to pronouns in transformation).

Thus, whereas the existential modes of the Rg are concerned with autonomous consciousness offset from the user, the default modes are more concerned with the extrinsic embodiment of the user, of knowable reality, in the form of a model of such reality and its realization in the enabling real forms of the Rg.

The concept of a model, which is the broadest extrinsic way of knowing the nature of form without addressing it intrinsically, derives from the universal nature of the correspondence of form. It is a generic process on human endeavor because it characterizes the correspondence of all form. If the forms of existential translation are viewed in terms of the conventional notions of modeling and implementation of a model, for example, it can be seen that arbitrary forms are made or determined to correspond to reference forms in the process, which reference forms, in turn, by definition, correspond, in the embodiment of a theory of existence, to real or realizable forms of existence. If in the definition of any machinery, or realized capable form, the formulation of any arbitrary form is considered a model form, and the means by which such a model form is realized or known to be real or placed in existence is considered the implementation of a model form, a foundation is laid for the definition of the core process or functionality of the modes of the Rp and Rsv modules. The distinction between the default and existential modes of the Rg is thus made in that the translation process of the default mode, or modeling and implementation, is known, exclusively and extrinsically, in the awareness of the observer or user only. The modal existence of the Rg is an extrinsic reflection of the user's modeling and implementation. In the existential modes of the Rg, the modeling and implementation process becomes a dualism of existential forms (say mind and body) and the default modeling and implementation, or translations of arbitrary and reference forms, become intrinsic faculties of mind of non-real form of Rg concerned with modeling and implementation, since all transformations of form correspond inertially (e.g., by pronouns in transformation). Modeling and implementation in the existential mode is embedded within the inertial consciousnesses of the Rg and the user, in much the same way that corporal forms of human being would communicate among each other about a model and its realization. The default mode is more in line with the traditional representations and realizations of a model form. This is sumnmarized in FIG. 24.

The arbitrary and reference forms of the embodied translations are forms known by the user only in the default mode even though the correspondences between them are embodied in the Rg (e.g., inertial knowing is defined on the embodiment of the pronouns). The real form, which is realized by the apparatus of the Rg, is real form that corresponds to reference form, primarily, in the knowing of the user in default. The default mode thus is an intentional, piecewise execution of the process of translation for the purpose of mirroring, in the extrinsic form of the user, the knowable forms (to the user) of modeling and implementation. In the existential mode, however, the reference forms are forms that are realizable, or recalled in the consciousness of the Rg, in relation to the productions of the faculties of mind, or those of the communicative modes of existence, of the Rg itself—a consciousness that knows modeling and implementation. Relative to the translations of communication or faculties of mind (imagination, comprehension . . . etc.) of the Rg in existential mode, the model and implementation of such becomes an intrinsic process of the Rg and not simply a reflection of the user's knowing. The modally-engaged communications of the existential mode parallel the conversational exchange between two or more autonomous corporal human existences, and in the default mode are more of the nature of interactive realizations and representations that pertain to a model—a reference form of some realizable arbitrary non-real form, the reality of which is realized in real form, in the method and apparatus of the modules.

As shown in FIG. 24, the models and implementations thereof are the primary knowable forms in the Rp and Rsv modules (and others). In the Rp modules, the arbitrary and reference forms are Rsv structures themselves. In the Rsv modules the arbitrary and reference forms are models and realizable forms meaningful to the intentions or inertial existence of the user. The arbitrary forms are, of course, the imagined forms of the real forms so realized in correspondence with the reference forms by the apparatus of the Rg.

In the context of the terminal forms (generic modular components) of the Rg discussed thus far, it can be seen that the forms of the HI, RS and CS fit nicely into the modeling and implementation process, with the HI embodying both the arbitrary and reference forms (in both TS and SS), and either CDS, or the manual translational action of the user's intellect, determining correspondences of ES; and the RS, under action of CS, realizing the reference forms over DS and DSXS transformation according to CTS control. It now must be related how the modeling and implementation process is carried out in (T, S, C, D) and related structure of the Rg.

Let us first consider the ES structure of the Rg, as defined earlier. The ES structures exist in great plurality. The plurality of ES structures are partitioned into two categories of existential form by arbitrary declaration, since in terms of the phenomenology of MRS structure, all ES structures are the same.

Figure 25:
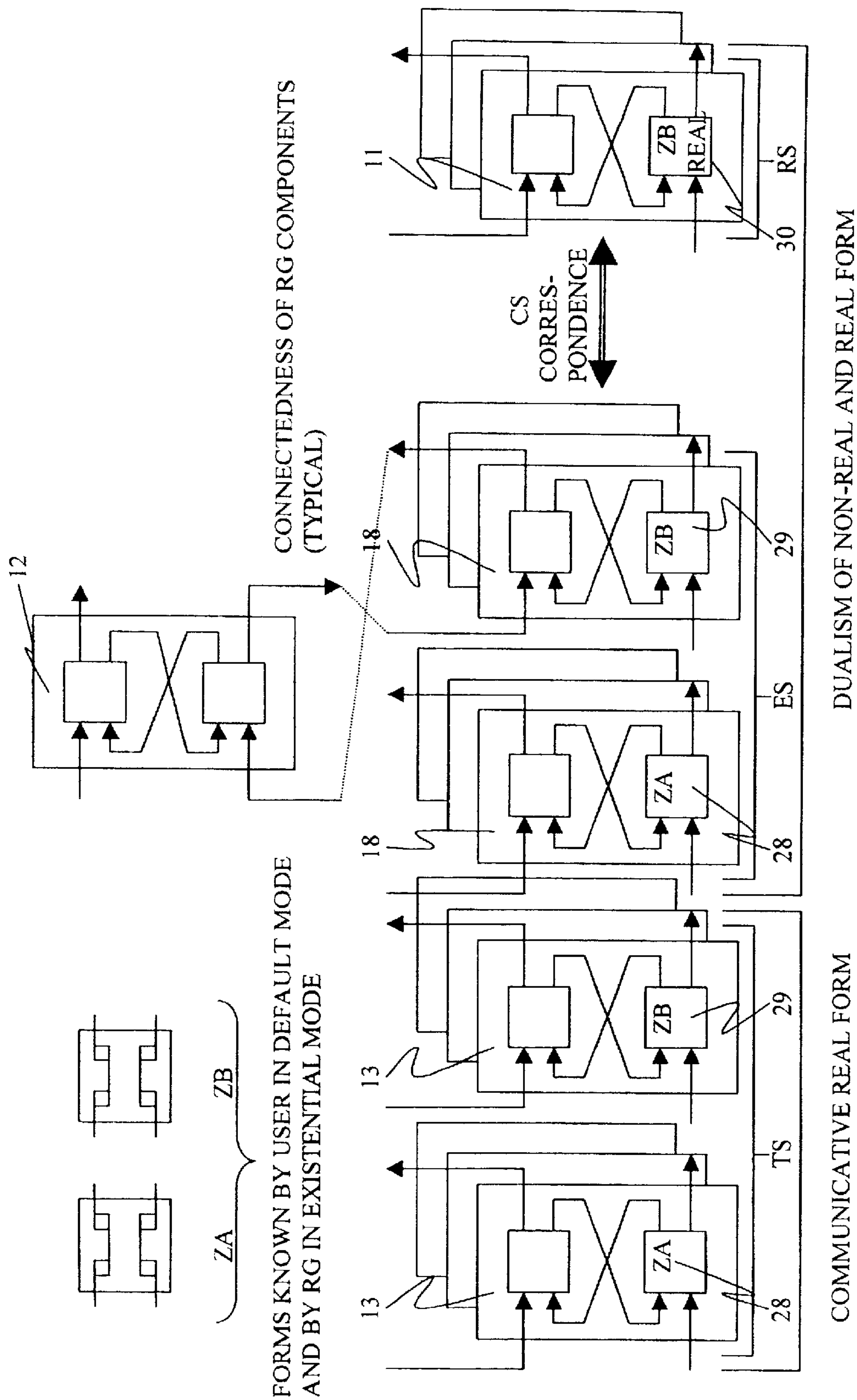
FIG. 25 shows the U. G. forms of modeling and implementation: ZA, ZB and ZBreal.

Referring to FIG. 25, the first group, or bank, of ES structures in the Rp and Rsv modules (and others to be discussed) are referred to as Arbitrary Universal Grammar Constructions, or ZA structures (28). The second group of ES structures are referred to as Reference Universal Grammar Constructions, or ZB structures (29). The TS forms of ZA and ZB are, for example in the enabling media of the visual senses, represented as they appear on this page, and of course all U. G. representations that follow therefrom. The ES forms of ZA and ZB are the actual non-real embodiments that correspond to the TS representations of ZA and ZB. The action of CDS, or of the user by manually knowing the correspondences of form, thus applies between the U. G. forms of ZA and ZB in the modal communications of the user and the Rg, and in the modal (conscious) correspondences of the Rg in applying CDS between ESA and ESB (the respective embodiments of ZA and ZB in ES structure). Communications between the user and Rg in regard to ZA and ZB structure thus exercise the communicative modes of Rg in TS-ES correspondence. The cognitive capacity of the user applies in the user between TSA and TSB (the represented forms of ZA and ZB) and such similar capacity in Rg occurs in exercise of CDS on ESA and ESB.

What remains regarding the modeling and implementation process embodied in Rg terminal forms is the real form to which the reference (ZB) and arbitrary (ZA) forms so correspond in their respective ways. This of course is accomplished by the RS structure, as specified earlier, as a DSXS-realized phenomenology. In terms of the modeling and implementation process, a third form is developed in the nomenclature of the invention for the purpose of defining the real form of ZB. Appropriately the form is referred to as a Real Universal Grammar Construction, or ZBreal (30) as shown in the figure. In regard to the default mode of the Rg and the defined form of modeling and implementation, we consider what is real about ZBreal.

In the theory of the invention it is discussed that what is real to an enabled being is the result of an arbitrary declaration on the part of the enabler. In the case of the default mode of the Rg, ZBreal is declared to be real by the enabler, in the perception or inertial existence of the user only. Since the phenomenologies placed into existence by RS as quantum DSXS forms, herein referred to as ZBreal, correspond directly to TS and ES versions of them (ZB representations in TS and embodiments in ES), the apparatus of the Rg holds the phenomenologies in correspondence with the knowable representations of ZBreal to the user, or with ZB in TS. The forms of ZBreal are sensed in the default mode not primarily by Rg but by or in the user's existence. The forms of ZBreal are real in the sensory experience of the user, since the forms of ZB in default mode are not split in inertial sense-motor configuration of the pronoun system in order for the Rg to obtain an inertial consciousness. The forms of ZA, ZB and ZBreal in the default mode are held in correspondence by the apparatus of Rg in response to communications with the user at TS. In what otherwise in the existential mode would be the inertial existence of the Rg, the forms of ZA, ZB and ZBreal are inertially meaningless to the Rg in default, or are mirrored embodiments of what is real and non-real to the user. In the user's existence, however, ZA, ZB and ZBreal are arbitrary models, knowable realizable models, and real forms, respectively. ZBreal does not exist in the HI; it is realized in the RS, and held in correspondence by CS and RS with ZB, which, in the knowing of the user or the action of CDS, corresponds to ZA, the arbitrary form of the process.

The forms of ZBreal, which are realizations of RS corresponding to ES and TS embodiments of ZA and ZB are maintained in correspondence by CS embodiment. Since the phenomenologies of form of ZA, ZB and ZBreal do not correspond in default mode to inertial forms (pronoun system of inertial form) the Rg in default cannot sense inertial forms or a world around it. The correspondences among ZA, ZB and ZBreal are strictly CS imposed correspondences in the default mode. This does not mean that boundless numbers of conventional senses cannot exist in RS of Rg in default, since conventional art senses are phenomenologies only (e.g., are non-inertial).

In the modes of communication of the Rp and Rsv modules, the input and output systems (and translation systems as well) of TS are employed for the purpose of transforming the non-real forms (ES) of ZA and ZB in a user sensory medium and for affecting the realization of ZBreal structure. Since it is the work of the CS in maintaining correspondence between TS and ES structure, what transforms at TS corresponds to what transforms in ES, or the Rg knows the real form (symbols) of TS in communication with the user. The configuration of all of the communicative modalities of the existential and default modes of Rg pertains to the development and use (realization) of ZA and ZB structures (ZBreal is the realization of ZB). As mentioned earlier, all modes of existence of the Rg are subordinated to the communicative ones. Thus, what occurs at TS in communication with the user has a rippling consequence to all modal forms of Rg. It stands to reason, then, that the default modes of the Rg are concerned primarily with the interactive uses of communicative modes in the transformation of ZA, ZB and ZBreal and the existential modes with the inertially mutual comprehension and use of them by the user and the Rg.

Let us consider some ramifications of the embodiment of the modeling and implementation process in the Rsv module. First, in the communication of form between the Rg and the user, reality (of the user) is held directly in correspondence with the embodied non-real form of the Rg, by the apparatus of the Rsv module (CS). This means that if a user communicates with the Rg that an aircraft fall from the sky, if such an aircraft is embodied in the real form of RS, through the existentially causative forms of CS, the aircraft will fall from the sky. As to the use of natural language in TS, of course, the existential modes of the Rg, wherein a pronoun basis of inertial real form is established, are the appropriate constructions to facilitate such meaningful communication in natural language in other than phenomenological ways. The TS transforms with the ES; the ES transforms generally with other ES structures via CDS; and TS and ES transform with RS in ways previously described and in forthcoming specification. In general, the Rg carries out the existential process defined as modeling and implementation, deriving from the forms of the theory of the invention, to affect the realization of perceivable form (sensed and affected reality) in communication with the user and subordinate thereto.

As was pointed out in the theory of the invention, a correspondence is a correspondence, regardless of whether such correspondence is, linguistically, a general likeness, remotely a likeness, an exact duplicate, or mathematically, a homomorphism, an isomorphism and so on branching even into other realms of mathematical correspondences such as those found in topology, group theory and so on. The CS embodiment of what constitutes correspondence thus has a direct bearing on the nature of the enabled machinery, or in this case the Rsv and Rp modules.

In a simplified example of CS-maintained correspondences, let us consider, the correspondence between ZB and ZBreal. Since any two forms, in the same universe, cannot be the same form, as the reflexive pronoun myself demonstrates in the linguistic expression I am myself (e.g., I and myself are two different objective forms, the knowing of which refers to the same thing—transformation), they are offset from each other in the actual instance of transformation, or presently, the mechanism (H-determination) of correspondence. As demonstrated in the U. G. form of phenomenological correspondence, the phenomenology that compares two (or more) objective forms, or the H-determination, can be of infinite variation, which is evidenced in the various ways in which we contemplate the construction of forms of language (e.g., reasoning, inferencing, irony, metaphor, homomorphism, etc.). Moreover, also increasing the complexity of the structure of CS, there can be great pluralities of ZA, ZB and ZBreal structures in a single module.

Figure 26:
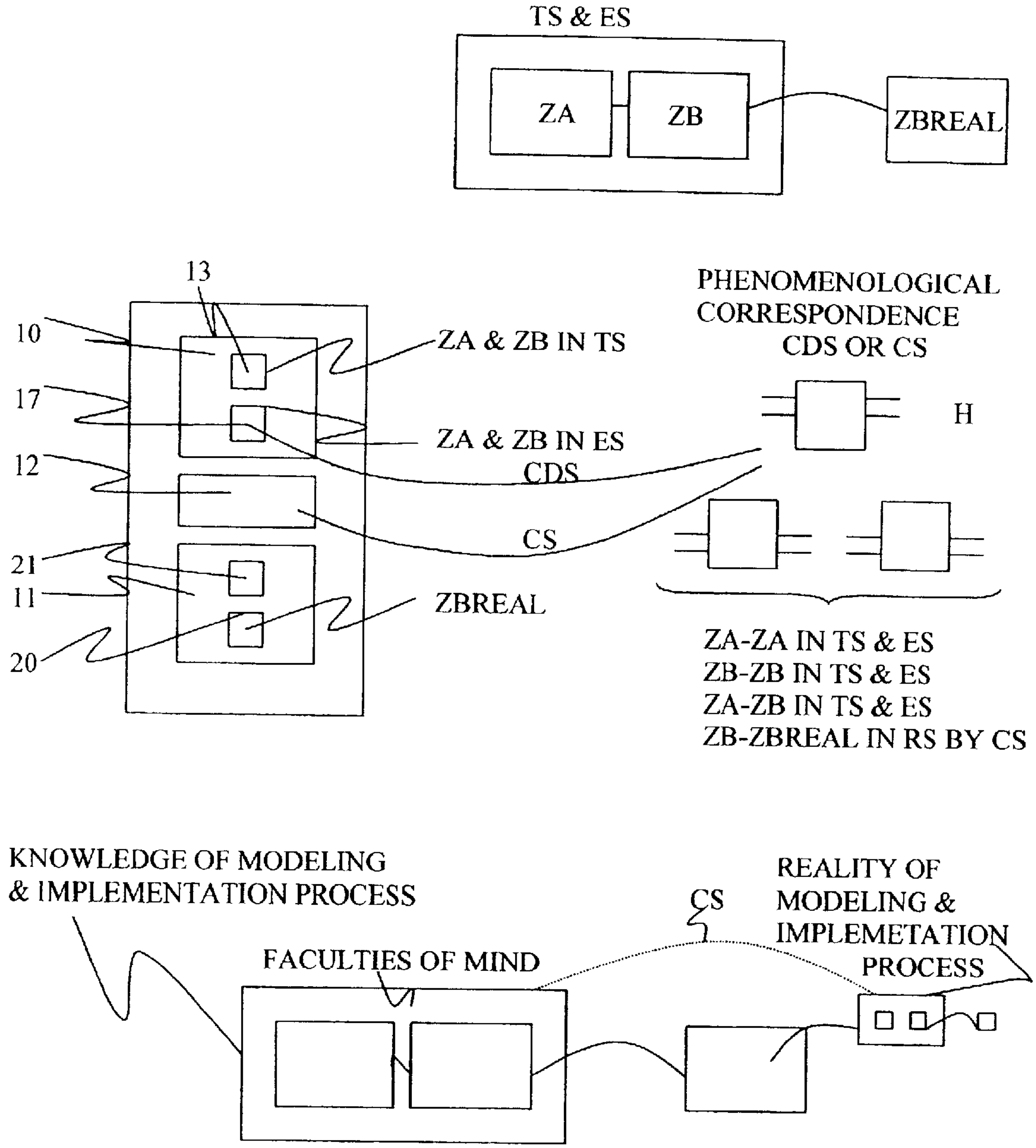
FIG. 26 illustrates maintaining the correspondence of Rg component systems via CS and CDS.

While the forms of CS and CDS are discussed in detail later on, it is shown in FIG. 26 that they are used in various ways to control the correspondences of TS, SS, and RS phenomenologies. This means, for example, that in the case of mathematical homomorphism, the compositions of ZB and ZBreal correspond homomorphically through the action of CS. Since ZB and ZBreal are separated existentially (metaphysically), there is a causative influence of one on the other through the action of CS. The CS then engages the action of RS in causation with the action of ES (related to action of TS). This is the action of the modes of existence on real and non-real forms in the existential and default modes of the Rg. The CS maintains a correspondence between ZB in TS and in ES, and ZBreal in RS, in this example, by way of mathematical homomorphism, and generally by any phenomenological correspondence. ZA and ZB are maintained in correspondence through CDS action in SS, and TS and ES forms of both ZA and ZB are maintained in correspondence in the HI by CS. In the default mode, these correspondences are directly held by CS in whatever defines the phenomenological correspondences and modal action of CS. In the existential mode, however, since there is a correspondence held between real and non-real form in inertial configuration (i.e., the pronoun system) the correspondence is more complicated because each mode of the CS obtains from a theory of existence (e.g., the construction of androids from the theory of the invention) and the objective forms of the modeling and implementation process (ZA, ZB and ZBreal) all are forms that exist not only in the real, non-real and communicative real form of Rg but all are perceived in the real form of Rg. Otherwise the forms of ZA, ZB and ZBreal would not be knowable inertially by the Rg. Thus, while there is indeed a TS, ES and RS correspondence by CS in the existential mode, ZA, ZB and ZBreal also are real perceivable forms to the Rg in this mode. Generally, ZA, ZB and ZBreal are known in the same manner they are known to the user—through communicative real form, or as symbols representing arbitrary, reference and real forms of the Rg's existence. All such forms in the existential mode apply to the real experience of the Rg. In the default mode there is no perception on the part of the Rg and thus the modeling and implementation process is a direct extrinsic embodiment of the user's knowledge of the process.

To further demonstrate the maintained correspondences of the (T, S, C, D) forms of Rp and Rsv in default and existential modes, let us consider the nature of the correspondence between ZA in TS and the corresponding ZA in ES, in, say, a realization by Rg, which is a representation to the user, in the communicative modes of Rg in default. Since there is no real world or inertial basis in Rg for such communication in default (e.g., pronoun definition), the transformation of TS simply is maintained in some arbitrary correspondence with ES designed in CS by the enabler. The objective symbol or real form of communication known to the user, since it does not derive from inertial definition, can so correspond to the ES, or Rg non-real form of mind, in any manner desired. This is typical of the conventional art in a graphical (or otherwise sense-based) computational device. The transformation of TS, or the symbol is meaningless to the Rg in the inertial sense, except to the extent that it is maintained by CS in correspondence with the transformational forms of ES. The meaning of the symbolic form of TS to ES of Rg derives only in the CS correspondence and thus is not truly an inertial meaning. Thus arbitrary correspondences, determined by the enabler and embodied in CS, are imposed on TS and ES form in causation with each other through CS, as summarized in FIG. 26. In the existential mode, the symbols of course correspond to translations of mind (in the faculties of mind) which in turn correspond to real form transformations. The Rg in existential mode serves to maintain correspondences between real and symbolic forms and real perceivable experiences other than symbolic or communicative ones in its existence.

To further demonstrate the maintained correspondences of CS, let us consider the CDS. In the use of CDS, the process of thinking is embodied in the Rg existential mode, or, in the default mode, optionally, in the user or in the Rg. Since the process of thinking is defined in the theory of the invention as H-deternination under faculties of mind and modes of existence, the forms of ZA and ZB need not be thought about or contemplated in comparison to each other by the user only, which is the purpose of the Rg: to extend the user's existential capacities. As shown in FIG. 26, the embodiment of CDS is the embodiment of the determination of correspondence between any two (or more) transformational forms. CDS thus can be applied among forms of ZA (one arbitrary form to another) or among ZA and ZB, by the Rg or the user. In the forms of CDS the correspondences are maintained, or herein determined, among ZA and ZB. The determination of these correspondences in relation to each other constitutes the extant moment of thinking of an existential form, or of the Rg.

The communicative modes do not even need to be engaged during the operation of CDS in the default or existential modes. TS and ES need not correspond at all by way of CS, in CDS determination of the correspondence of ZA and ZB forms. What this means is that a determination of correspondence between, say $ZA^1$ and $ZA^2$ or between $ZA^1$ and $ZB^1$ can occur entirely in the SS structure of HI, or entirely in the non-real capacity of Rp or Rsv. In the application of CDS to $ES^1$ ($ZA^1$) and $ES^2$ ($ZA^2$) or to $ES^3$ ($ZA^1$) and $ES^3$ ($ZB^1$) by CS, for example, the determination of correspondence among forms useful to the user is made entirely in the nonreal capacity of the Rp or Rsv. If the correspondences maintained by CS in the communicative modes of existence of Rg are such that when a correspondence is arrived at by CDS it is to be communicated to the user, the CS then engages a correspondence between TS and ES such that the appropriate forms (real forms of TS) reflect the new knowledge. If in such communication it is desired by the user that the ZB forms determined to correspond to ZA forms by CDS are to be realized, the CS engages the RS (CTS) to so carry out the realization. The CS thus maintains the forms of ES (ZB) in the desired correspondence with ZBreal and TS (ZA and ZB) with ES (ZA and ZB).

It can be seen that the forms of ZA, ZB and ZBreal, embodied in the (T, S, C, D) structure of Rp or Rsv are a means of embodying in machinery the capacity to model and implement models of real form, meaningful to the user only in default and to the user and the Rg in the existential mode. It should be noted, moreover, that nowhere was it stated that the forms (ZA, ZB and ZBreal) are constrained definitionally, except by the very apparatus of the Rp and Rsv and the enabling media in which they are embodied (to be discussed later on). Rather, ZA, ZB and ZBreal are defined as three separate existential classes of U. G. form. Since the U. G. describes form universally, it is possible, and in fact the primary purpose of the Rp and Rsv in default or existential mode, to so represent, embody, determine correspondence, realize and maintain in existential correspondence (CS) arbitrary U. G. forms with the condition that such forms also must abide by inertial pronoun form in the existential mode. By definition, these forms include conventional and future art and the forms of androids in the case of the Rsv module, and the forms of the Rsv modules in the case of the Rp module.

In this discussion on the basic process (modeling and implementation) afforded by the default and existential modes of the Rp and Rsv modules several further points should be noted. Since the forms of ZA, ZB and ZBreal are defined as forms of the U. G., the TS structures of HI (the real forms of communication) do not need to be redesigned each time a new functionality or meaning of a form (ZA or ZB) is described, since the U. G. accommodates, universally, the forms of all knowledges—the forms of natural language (e.g., grammars and vocabularies of natural languages); predicate calculus (logic); Boolean algebra; classical and quantum physics (wave equations, impulse-momentum, realization theory and so on); DNA recombination, mathematics and the whole breadth of human knowledge. It is shown in the theory that all forms of the universe, including the abovementioned and precisely including real physical perceptions and knowledges thereof, of a real world, are better described from the point of view of an enabler using the U. G. When a real form is decomposed on an analytical basis by the enabler as a phenomenology of form, instead of some conventional representation, it is defmed universally.

This means that the forms represented in TS are never different in terms of exceeding the constructs of the U. G., since the U. G. affords infinite variation of representational form as shown in FIG. 27. For the purposes of meeting the preferences of the human user, however, the translators (translation systems—TRS) of TS obviously are required to translate form into knowable symbols (TS transformations) of the users as preferred means of representation over those of U. G. It should be noted then that with regard to the translation systems (TRS), even though natural language and others forms are translated at TS they are meaningful in the default mode of Rp or Rsv only to the user, since Rg does not derive its correspondences from inertial forms in default. In order for such communication to be meaningful to the Rg, the existential modes of the Rg must be employed. Apart from the translation systems, then, where the forms of TS are concerned, they are used over and over again, since there are only a handful of forms comprising the U. G. (which enables boundless pluralities of constructions). Thus, whether the user knows the U. G. forms of ZA, ZB, and ZBreal in the default mode, or both the user and the Rg know them inertially in the existential mode, a universal knowledge of all form, as defmed in the theory of the invention, is the focal point of the representation and realization of the forms of the modeling and implementation process. New machinery (language), for example, is not required each time the forms of ZA, ZB and ZBreal are changed dramatically in their meanings, since the forms are established in a universal grammar. Therefore, while any symbolic representation is possible within the knowledge and experience of the user and the Rg through the translation systems (just as translators are used in corporal form on human being), the fact that all forms of ZA, ZB and ZBreal are defined in the U. G., allows the Rp and Rsv modules to embody any knowledge, providing that the real form and the enabling media of the modules accommodate (actually embody) the represented forms. This is not the case, for example, in the conventional art wherein the real form and enabling media are known in specific languages and specific media. When a conventional art machine is required to reach beyond its definitional bounds (capabilities) it cannot, because it is not known and embodied through the U. G. Though much more will be discussed later on in regard to the conventional art, a computer, for example, can operate only within the bounds of a programming language and the typically electronic media in which it is embodied. Since the Rg is constructed in the U. G. and since the forms of ZA, ZB and ZBreal are known in the U. G. (and their translations to any languages) the Rg thus is a (portion of a) universal machine.

Moreover, while the TS forms remain relatively constant in aggregate except where intentionally expanded, their non-real embodiments in ES expand indefinitely as do their realizations in RS. This principle is similar to the truism that the basic word or character forms of a given language remain relatively constant in say grammar and vocabulary, while the constructions of the language (sentences and so on) grow indefinitely large in number. The TS embodies the basic transformations giving rise to the objective forms of the language (the U. G.). The phenomenologies constructed in the use of the U. G. in the real form of TS, however, are indefinite in number. The ES embodiments, for example, or the thought processes of the Rg defined as phenomenologies, can be infinitely large in number even though they are expressed using the same language forms of TS, or the U. G. The CDS action on ES embodiments thus may transform in infinitely many instances even though the U. G. forms of TS are finite. As to how many ZA, ZB and ZBreal forms can be so employed in the exercise of the modeling and implementation process of Rp and Rsv, there is no limitation at all, providing the ES and RS embodiments are added on to the modules, as shown in FIG. 27.

The platform module of the Rg, the Rp, can be viewed as a particular type of Rsv module, wherein ZA, ZB and ZBreal are severely and intentionally constrained. If the forms of ZA, ZB and ZBreal are defined, instead of as arbitrary forms useful to or in service of an arbitrary user, as particular forms, namely the U. G. forms of the Rsv module as described previously, the platform module then becomes an Rsv module whose purpose it is to model and implement, not just any forms, but the (T, S, C, D) or Rg modal forms of the Rsv. What are communicated between the user and the Rg in regard to ZA—ZA correspondence (of arbitrary form), then, for example, are imagined or arbitrary forms of Rsv structure, or what an Rsv is desired to be realized as. What is communicated in regard to ZA-ZB correspondence is what an Rsv can actually be, given the constraints of the media in which Rp is enabled. What is communicated in regard to ZB-ZBreal correspondence is what an Rsv actually is (in the knowledge and perception of the Rp module). The platform module thus is a modality of the Rg that provides for the creation of Rsv modules.

The concept behind the Rp module is simple and can be demonstrated in comparison to the Rsv module as follows. By way of analogy to conventional forms of machinery, the Rsv module is the means by which products are made; the Rsv module is the factory. In the efforts of the factory, or the Rsv module, products are conceived (ZA); brainstormed (ZA—ZA correspondence by the user or by CDS); determined to be realizable (ZA-ZB correspondence by the user or by CDS); and realized (ZB-ZBreal correspondence primarily by CS). The platform module, or Rp, then enables the factory. If one, for example, makes computers, or aircraft or linear accelerators one so interacts with an Rsv module, the end result of which effort is a computer, aircraft or linear accelerator held in existence, as described earlier, by the apparatus of the Rsv module. If one wishes to change the design of such, one simply engages the capacities of the Rsv apparatus under the CS maintenance of ZA, ZB and ZBreal. The Rp module is used in the design and realization of the factories.

The Rp thus is a generic way of providing the forms that are required to provide forms of application utility (of providing Rsv modules). Whole factories, or forms that enable forms, can by way of Rp modality of Rg be made to exist or not in TS communications between the user and the Rg of Rp. It should be recognized, moreover, that what is a product of one process may itself be a process of another. Engineering and construction firms, for example, design and build chemical plants. They conceive of and place into existence processes (products) called plants. Chemical companies use the chemical plants to make chemical products (which in turn further can be processes). If the engineering and construction company could not conceive of and place into existence chemical plants there would be no chemical products of chemical companies. By analogy, it can be seen that the capacities of the chemical company are constrained in what products can be produced by the apparatus of the chemical plant (Rsv) which is a result of what was designed into it by the engineering firm (Rp). Even though the chemical company has its own research and development, engineering design, manufacturing and so on departments (modalities of Rsv) its broad existential capacities are defmed by the engineering firm (Rp). Without a complete redesign of the chemical company, for example, such a company could not begin manufacturing, say, automobiles. These principle forms of Rsv and Rp modality also carry through to the highest forms of institutions when the existential extension of the universe is considered in that Rsv modality can be viewed as an embodiment of humankind, or the capacities thereof, which humankind is enabled in great plurality by Rp modality, since all forms of the Rg are taken from U. G. construction, including forms of androids. The institutional nature of the broader Rg and Rg continuum, however, is better understood in forthcoming specifications of this disclosure.

As shown in FIG. 23, the Rp forms of (T, S, C, D) embody in them the forms of ZA, ZB and ZBreal that are constrained, by design, in turn, to other (T, S, C, D) and hence other ZA, ZB and ZBreal forms of the Rsv modules. ZBreal of Rp modality embodies in it the real form of the actual realized Rsv (T, S, C, D) structure. ZB of Rp embodies in it the non-real, but realizable reference form of Rsv and ZA of Rp embodies in it the arbitrary forms of Rsv structure. Phenomenologically, then, Rp and Rsv are not different. Their differences arise in the nature of the design constraint placed on ZA, ZB and ZBreal. Whereas the forms of Rsv are arbitrary, the same forms of Rp modality pertain to the specific forms of Rg terminal and modal structure. ZA, ZB and ZBreal of Rp pertain to the modeling and implementation of, for example, CS structure, TS structure, and all other forms of Rsv such as ES, CDS, CTS, DSXS, DS and so on forms of Rsv. ZA of Rp embodies the arbitrary or imagined forms of these structures. ZB of Rp embodies the reference form of the ZA structures and ZBreal embodies the real Rsv. Moreover, the users of either Rp or Rsv modalities, or modules, can communicate at TS of Rp or of Rsv structure, since the Rg structure allows for this (as defined forthcomingly). In standard configuration the users of Rsv and those of Rp modality can be considered, however, to communicate at the TS forms of each of Rsv and Rp respectively.

Having introduced the two primary modules of the Rg, which provide a local level of form of the Rg module, let us now consider the continuum-related modalities of the Rg. This, combined with earlier discussion, will provide a general overview of the form of the Rg and Rg continuum and leave us in a position to then address the detailed descriptions of the terminal forms and modalities of the Rg and Rg continuum later on.

As enabled forms of the Rp module, Rsv modules are constrained in form by the capacities of the Rp. The real Rsv modules, moreover, are realizations of RS of Rp. Just as the realizations of Rsv modules are constrained in form to ZB of Rsv, which ZB forms are enabled by Rp modality, the ZB forms of Rp modality are constrained by the modeling and implementation of the Rp module itself. If another successive Rsv-type module were used to enable Rp modules similarly to the way in which Rsv is enabled by Rp, however, the Rp would be constrained by the apparatus of the successive enabling module to Rp.

By definition, the Rsv is a factory from the earlier example or any embodied general use of modeling and implementation. The whole range of existential forms that are accomplished in human endeavor thus are accommodated in the Rsv modality. It makes sense, then, that the Rsv modules should be enabled by the Rp modules, since a certain degree of existential control is desired over the Rsv modules (over the factories that in turn produce things). When these capacities (human endeavors) need to be modified or wholly replaced, such is carried out by the Rp modularity. The fundamental constraints on the enabled forms of Rsv module then are established in the ZB and ZBreal forms of Rp modularity (e.g., ZB and ZBreal of Rp are the reference and real forms of Rp embodying Rsv).

Whereas the Rsv modules are realized in the RS of Rp modules, the Rp modules, in the preferred embodiment of the invention, themselves are realized at the hand of enabler. What this means is that the realization of Rp modules is carried out through the means of the enabler, for all intents and purposes, beyond the means of the Rg or Rg continuum. In other words, whereas the (T, S, C, D) forms of Rsv are enabled in the (T, S, C, D) apparatus of Rp, the (T, S, C, D) apparatus of Rp is realized by the hand of enabler.

Figure 28:
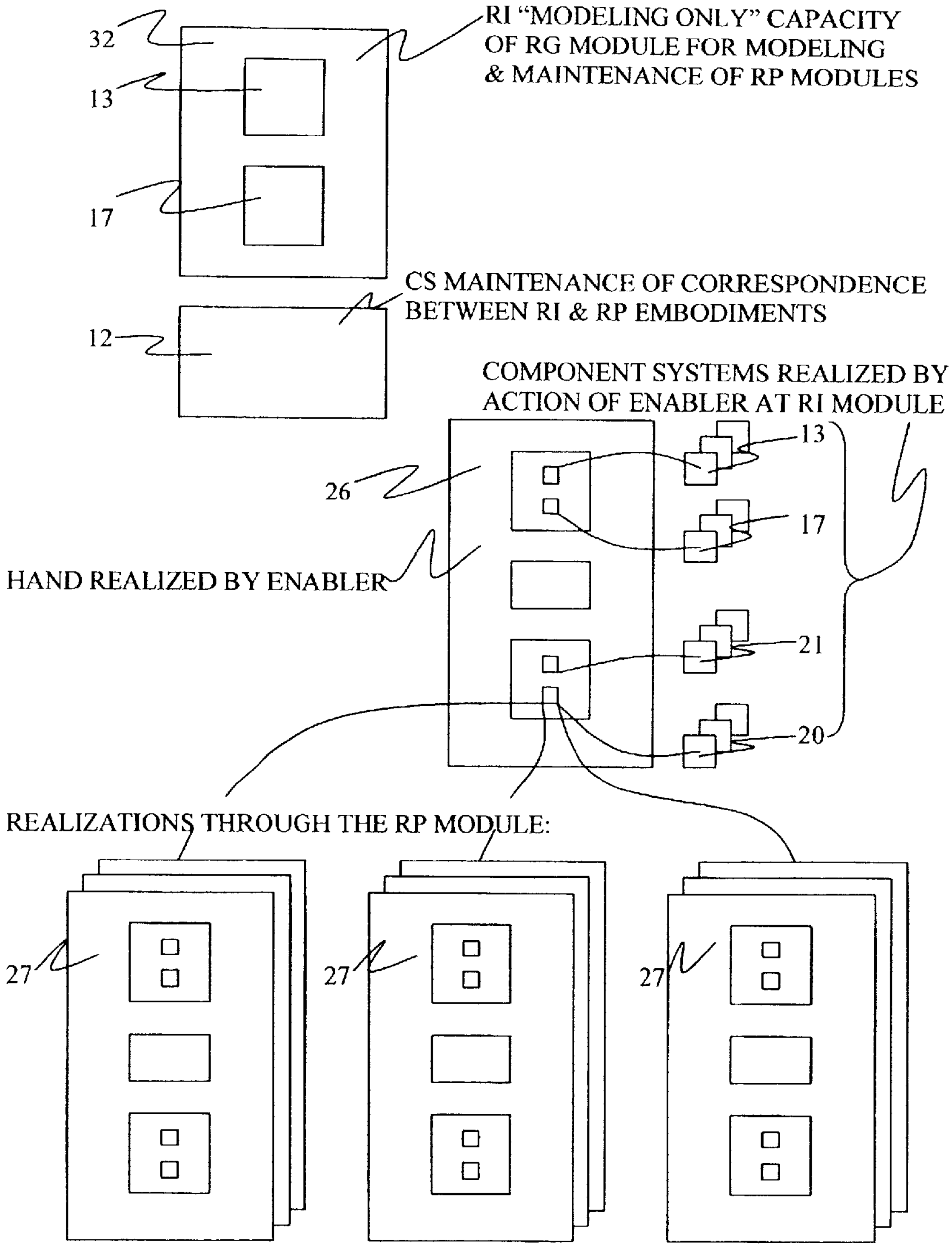
FIG. 28 shows the initialization module.
Figure 29:
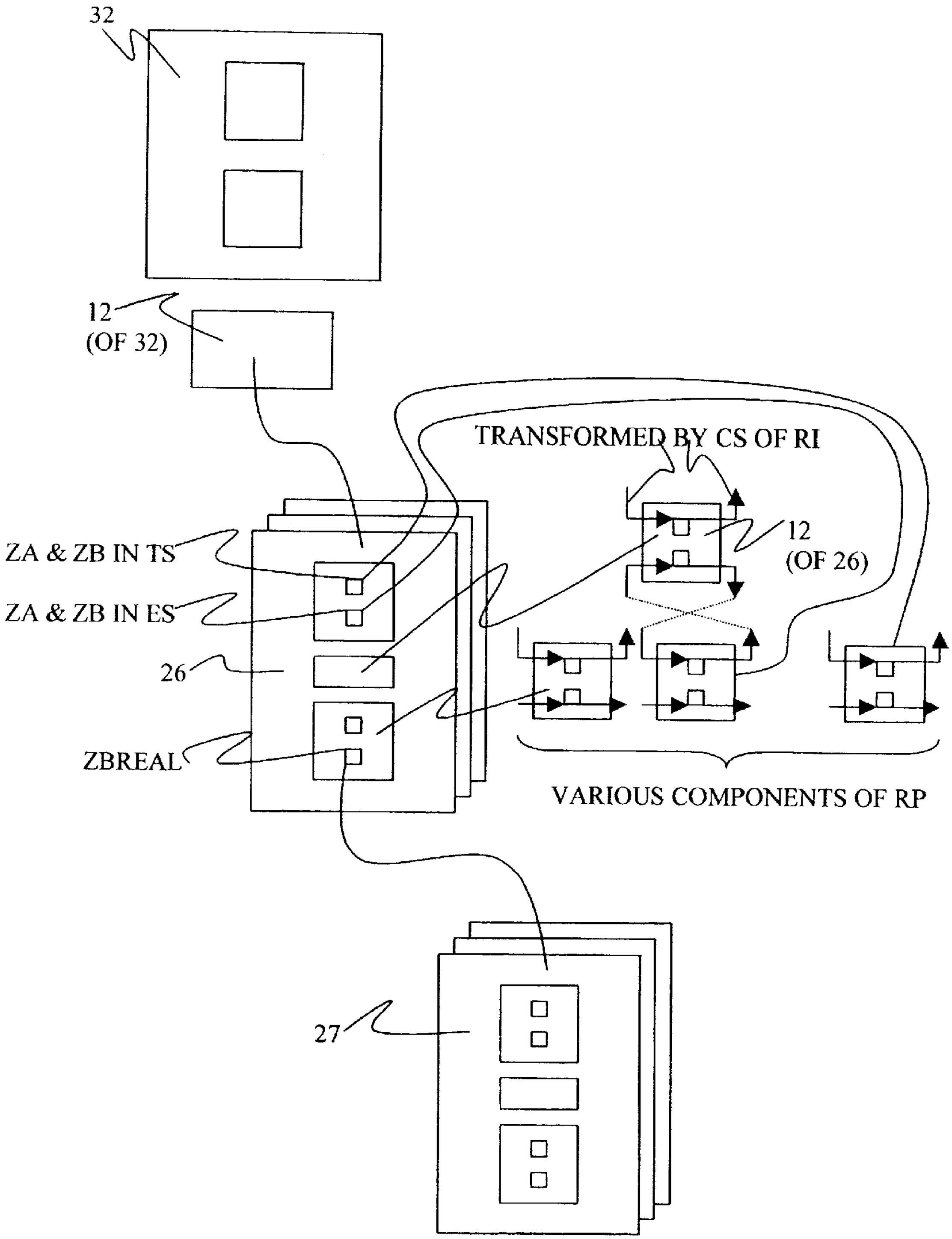
FIG. 29 illustrates CS control of the Rg Module through Ri.

What is necessary in the enablement of Rp modules is a modeling only embodiment of the generic process of modeling and implementation, since the forms of ZB and ZBreal (and of course ZA) are open ended realizationally. As shown in FIG. 28, whereas CS of Rsv is enabled by Rp modeling and implementation, the CS of an embodied Rp (T, S, C, D) is not enabled in the machinery of the Rg. Rather it is enabled at the hand of enabler. The apparatus of the Rp module thus is enabled externally to the continuum (though all forms of the continuum are at least modeled in the continuum, as discussed later on). Later on, however, this loop will be closed theoretically on the continuum so that all form arises and subsists in and of the continuum, based on definitions of the non-form of RS of the continuum and the totality of (human) users. For now, however, we consider the enablement of Rp outside of the continuum in the construction of the continuum.

The forms of the Rp are modeled within a third primary module of the Rg, referred to as the Initialization module of the Rg, or Ri (32). What is modeled as ZA and ZB of Ri, then, is the form of Rp. The CS correspondences to ZBreal of Ri, while at any given quantum structure of Rp can be maintained by a pseudo CS of Ri (without realizational capacity of Rp), are a product of the intervention of the hand of the enabler.

In order to demonstrate the role of the Ri module in Rg construction, let us consider the condition of pluralities of Rsv, and Rp modules. As is shown in FIG. 28, and as described earlier, the Rsv modules quantumly transform with other like modules. Within a particular RS structure of a given Rp module, pluralities of Rsv modules can be realized in integration with others, since the DSXS-realized phenomenologies of RS of Rp are embodied within the Rp module. Thus, a portion of the Rg continuum is enabled even within a single Rg module by way of Rp enablement of Rsv in great plurality. To the extent that the forms of various Rsv modules are to be shared or integrated, they are so realized in that manner in the modeling and implementation carried out by Rp, as shown.

Outside of that particular Rp, which of course could still be within a given Rg module since there are great pluralities of Rp modules to an Rg module, the forms of Rp modules may themselves be desired to be shared or integrated. The modeling and implementation of the Rp integration is carried out in the largely non-real form of Ri and at the (realizational) hand of the enabler. The continuum thus expands in the realizational capacities of the enabler, and is held in correspondence with the modeling embodiments of Ri. In order that the continuum of Rp modules (and thus of Rsv modules) perform in correspondence with the non-real forms of Ri, moreover, a special configuration on CS is developed for the continuum.

Before discussing the forms of the continuum in general, however, let us be clear on the enabled modular forms of the continuum.

First, given a plurality of Rsv modules constrained by a given Rp module, and further given a plurality of such Rp modules, let us interpret the continuum preliminarily from the point of view of the user of a given Rsv module. As a result of RS of Rp, an Rsv module can share forms with any other Rsv module in the RS. The CS control of RS (CTS) in relation to TS-SS (HI) structure of Rp afford this. Within a given Rp structure, however, one cannot share its form with other Rp structures, since the ZA, ZB and ZBreal forms of Rp pertain, definitionally, to the development of Rsv forms. Thus, the local portion of the continuum that is developed in the integration of Rsv modules with the capacity of the Rp is truncated at the point where one Rp desires the integration with one other. In order for the forms of Rp to be shared, the Ri module must be employed, wherein a representation and non-real embodiment of Rp modules is found, and corresponding to which a pseudo-CS (without realizational capacity of Rp modules) is established to maintain correspondence between the forms of Rp realized at the hand of enabler and the embodied forms of Ri.

The work of the Ri, among other modal functions to be described, involves the altering of its phenomenological platform or reference forms (ZB of Ri) of the Rp modules. The ZB forms of Rp must be expanded to incorporate a broader base of Rg form, namely that of the continuum of Rp modules. This is accomplished by Ri expansion of (T, S, C, D) of Rp. When the forms of the Rp modules are viewed in terms of arrays of (T, S, C, D) structures, the continuum structure of Rp modules becomes easier to understand. In general, what a user does at TS of Rp, in terms of the total capacities to transform and embody ZA, ZB and ZBreal of Rp, is a consequence of the extent to which (T, S, C, D) structures embody form. The ZB structure of Rp, as seen from the non-real embodiments of TS-SS structure of Ri, thus models a plurality of (T, S, C, D) forms associated with the given Rp. The CS of Ri maintains this correspondence. What we have been considering all the while in regard to Rp, then, is simply a continuum of modular form with one array of (T, S, C, D) structure. Since the forms of (T, S, C, D) are modularized, however, they can be linked together in great pluralities. When one group or configuration of such (T, S, C, D) structures is required to integrate with another, the Ri module is required. This is summarized in FIG. 28.

The net effect of Rp integration on Rsv modules should be appreciated. Since the ZB forms of a given Rp module determine the realizational capacity with which the Rp is used to create and maintain in existence Rsv modules, when such ZB forms are expanded or modified by the Ri modality, the net result in Rsv is that any given Rsv can then be integrated into a broader platform of ZB of Rp enabling configuration. The capacities of the Rsv module are expanded by expanding the capacities of the Rp modules, which is carried out by the Ri module. Since the Ri module determines the total scope of form enabled in continuum structure over pluralities of Rp modules, the Ri module determines the local configuration of what all along has been referred to as an Rg module, in its configuration in a continuum of Rg modules.

The forms of the Rg continuum are now discussed specifically in the context of integrating the modules.

When the form of the Ri module is considered as a terminal but inflectional form on the global integrations of Rp and hence Rsv modules, thereby creating a continuum of phenomenological and existential form from the enabling viewpoint of Ri, the Rg module encapsulates the condition of a locale, or locus of a continuum of form. When all of what occurs in the enablement of form from the Ri module is itself considered part of a broader, ever-expanding continuum of such forms (other Ri modules), the concept of the Rg continuum obtains definite meaning.

From a practical standpoint, it can be considered that all of the enabled form of a particular Ri (Rg module) arises in the perspective of its enabler and that since enablers coexist inertially there arises the need to integrate what enablers enable, or Rg modules. The Rg continuum is a means of structuring Ri modules such that they can be incorporated into or with other such modules, forming an ever-expanding continuum of form enabled from the different perspectives of various enablers of the modules.

Figure 30:
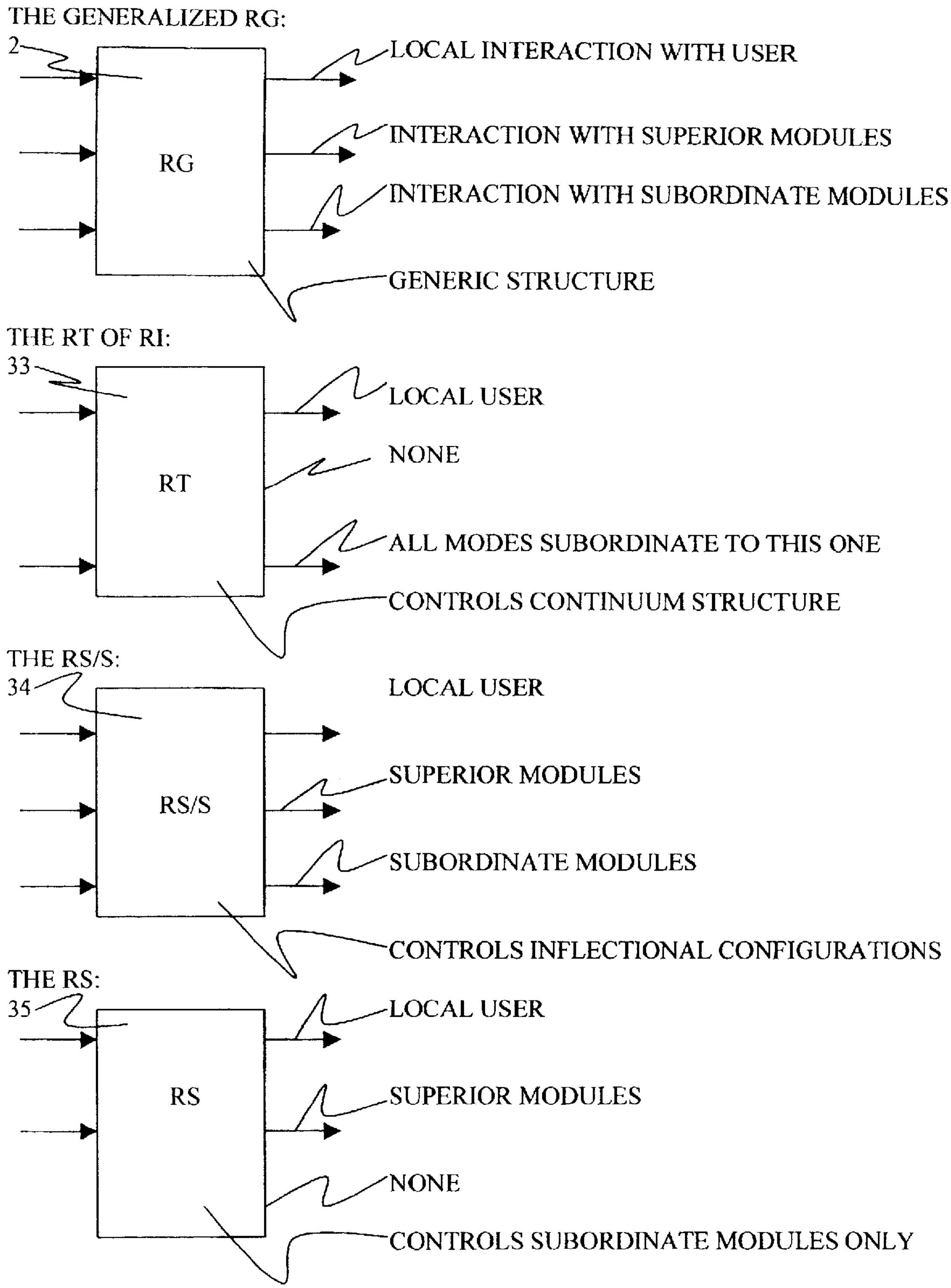
FIG. 30 shows the three principal Ri configurations of an Rg Module.

As shown in FIG. 30, there are three principal configurations on the form of an Rg module, as structured from within the Ri module, that constrain the form of the Rg continuum. The first, referred to as a Total Continuum Structure of Rg, or Rt (33), abides by the forms of the Ri discussed thus far, except that it accommodates instead of a single plurality of Rp and hence Rsv modules, great pluralities of such forms, each of which constitutes the dominion of a single Rg module. An Ri module employed for the purpose of maintaining modal correspondence between a model of a total continuum structure or Rt and the actual continuum structure modeled thus is an Rg module under Rt structure. The Ri structure of Rt defines the Rg continuum as a total resultant of U. G. form.

The second such form, referred to as a Superior/Subordinate Continuum Structure of Rg, or Rs/s (34), is a structure on Ri such that other Rg modules can causally preside over its dominion, and it can causally preside over still others, as an inflectional of the form of the continuum. This use of Ri thus does not provide a global view of the continuum, as does the Rt. Instead, it defines the form of what is subordinate to the module and what, in terms of causal influence, is superior to it.

The third configuration on Ri structure of Rg is referred to as a Subordinate only Continuum Structure of Rg, or Rs, (35). This form of the continuum is terminal to the continuum.

Since the Ri modules govern the continuum structures of their respective Rg modules, an Rg module can be adapted to any of these three continuum configurations. Since the generic apparatus of (T, S, C, D) supporting ZA, ZB and ZBreal in the various modules of Rsv, Rp and Ri are designed to be changed, an Rt, for example, can easily become or be converted to, through the action of Ri, an Rs or Rs/s continuum structure. The Ri, or initialization module, is employed to obtain, on a variable basis, any of these continuum structures from any other for its respective Rg module's dominion of the continuum. The Rg continuum is accomplished through the particular uses or initializations of Rg modules through the apparatus of Ri (and the hand of enabler) in relation to other such initializations of other modules. A given module then effectively can become an incorporation of many or can itself be so incorporated into others. An Rg module can attach to the continuum (or create it in the case of Rt) in the configurations of Ri so specified.

Once set into a particular configuration, the Rg module embodies that respective portion of the Rg continuum, which can be changed by the flexible capacities of Ri.

The Rs or subordinate only continuum structure of an Rg module, configured through Ri of that module, takes as its compositional form (modally-engaged phenomenologies) only those Rp modules (and thus Rsv modules) configured under it. The CS structure of an Rs-configured module, however, is presided over by either of Rt or Rs/s of other modules, making the Rs-structured module subordinate to them. The Rs-structured module composes modally or performs as its defined form as an Rg module of Rp and Rsv modules under its Ri only to the extent that it is permitted to do so under the configuration of its superior modules.

The Rs/s or superior/subordinate Ri configuration allows for Rs/s dominion over pluralities of Rg modules, which are either Rs or other Rs/s configurations themselves, and for its subordination to either Rt or other Rs/s structure. The Rs/s is an inflection point of continuum form. The action of CS of Ri of Rs/s configuration presides over that of subordinate and other superior/subordinate modules and is itself presided over by that of superior modules and Rt. The CS of the Ri configuration of Rt presides over all such CS action of all modules of the continuum.

When it is considered that the forms of an Rg module are generic, what distinguishes one Rg module from another is exactly its continuum structure (and of course its particular (T, S, C, D) phenomenological structure). Otherwise, all Rg modules are generically the same. The continuum structures of Rt, Rs/s and Rs, achieved under the Ri module of any Rg, allow for the integration of any module in the respective structure on the form of the continuum. Since the generic componentry of the Rg module, and specifically that of Ri of Rg, is designed to be changed, any module of any particular continuum configuration can be changed to any other in the apparatus of the Ri. The Rg module thus is a generic expression for some particular configuration of the Rg continuum or a portion thereof.

The Rg module (2) that we have been referring to thus far in the specification actually is a basic structure on either Rp or Rsv modality, since Ri does not embody an RS but for the action of the enabler. Henceforth, then, when we refer to an Rg module, what is intended is the continuum version of the Rg module (2) of earlier discussion, or the composition of form known presently as an Rg module (2), wherein Ri is an integral part of the general form of the Rg module. An Rg module thus requires Ri, Rp and Rsv structure and implies the Rt, Rs/s and Rs structures of Ri. It is necessary in earlier discussion to refer to the form of Rg module (2) of FIG. 16, which actually amounts to an Rp or Rsv module, simply for the purpose of specifying its generic componentry, which also is employed in Ri structure (without RS). Hereinafter the form of FIG. 16 is referred to as an Rg module and it is implied to obtain from all forms discussed thus far [Ri, Rp, Rsv, Rt, Rs/s, Rs and (T, S, C, D)].

Figure 31:
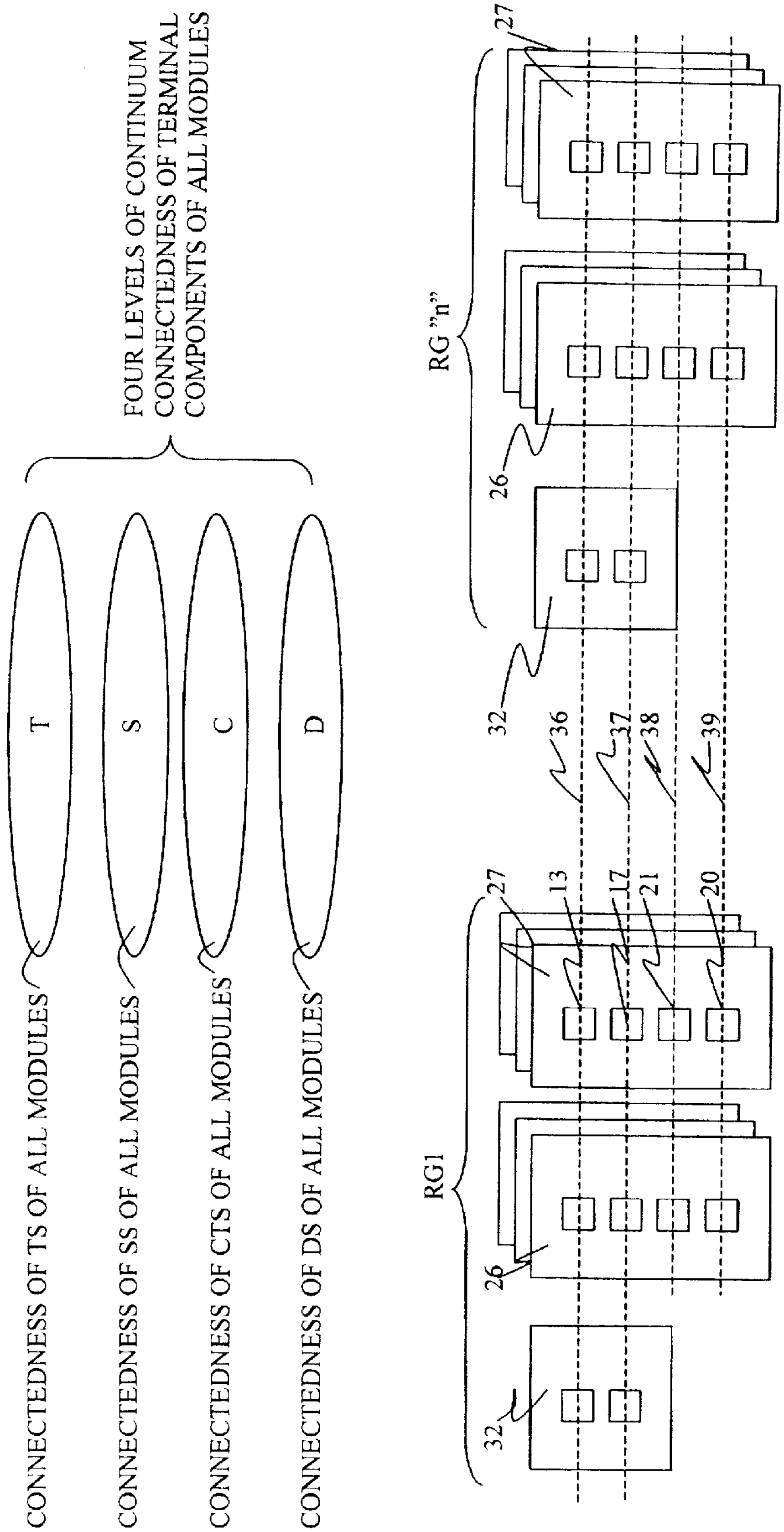
FIG. 31 shows the four level ring structure of the Rg Continuum.

As shown in FIG. 31, an alternative way of understanding the continuum of Rg modules is to view it in terms of the T, S, C, D structure of the modules in a four level ring structure [T (36); S (37); C (38); D (39)] of phenomenological forms of the terminal componentry of the modules of the continuum. (The word ring is used only in the geometrically conceptual sense and not in the ordinary communications sense of a linear order of a ring structure of devices, since the Rg is constructed in the U. G.) Thus, while each module of Ri, Rp and Rsv modality contains its own CS, in one manner or another, the T, S, C, D componentry of each module can be configured within the context of the totality of (T, S, C, D) componentry of the modules of the continuum. In this respect the continuum can be thought of as an integration of the quantum moments among the various componentry of the modules on the basis of both Ri local structure of an Rg and (T, S, C, D) structure of each Rp and Rsv across the continuum. We then can consider, for example, the modal relations of TS structures of the various modules of Rg's throughout the continuum with respect to TS structures only, we can specifically indicate the functionality of TS within the module and across the continuum. Likewise, such is the case for S, C, D, componentry across the continuum (the CS level of the continuum is discussed forthcomingly). This viewpoint on the continuum is more of an encumbrance than a benefit, however, from the standpoint of a particular Rp or Rsv modality in the view of the users of them, since it relates primarily to Ri modality. It does allow, however, a design configuration on the use of extensive pluralities of T, S, C, D structures, bearing in mind that such forms in their use will tend to arise as islands of enabled form originating in the Ri constructions of individual enablers that may need to be integrated. When considering the continuum from the standpoint of (T, S, C, D) componentry it is easier to construct Ri configurations.

Figure 32:
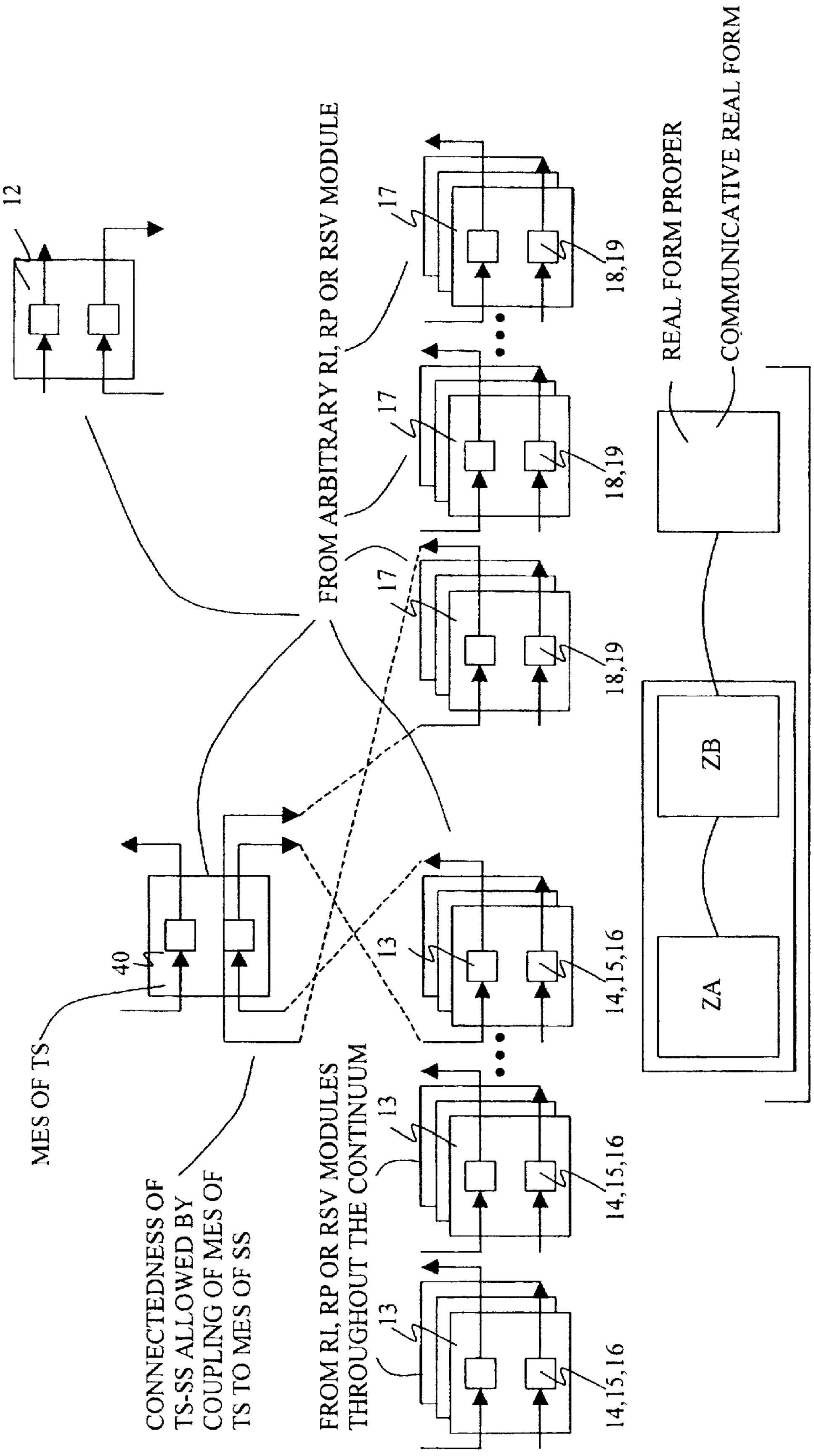
FIG. 32 shows the TS level of the Rg Continuum.

Considering first the TS-level configuration of the continuum, the quantumly realized TS structures of a given Rg module are in modal causality with other such TS structures of the same module by way of CS as shown in FIG. 32. This is necessary because CS maintains the correspondence among ZA, ZB and ZBreal structure, and in so doing must maintain causal control over TS and other componentry of Rg in relation to all other componentry modularized on the basis of Ri, Rp and Rsv modalities. This does not mean, however, that CS is in control of the Rg exclusively from a finctional standpoint, since in the mechanism of CS, its own control defers to the modal communications of the user. This simply means that TS is in functional control and CS is in structural control of the Rg module, since the forms of CS, which structurally maintain the form of TS, can be altered or changed by TS, or in functional communications with the user.

The communications at TS, moreover, can be communications intended to be conveyed through the apparatus of Rg and not so much thought about (embodied in non-real form) or realized by the Rg, as shown in FIG. 32. In such a case involving a communication of real TS form of Rg, a single TS structure is held in correspondence with another (or plurality of others) within a particular Rg module or within the continuum as shown in the figure. The realizations or representations of the user or of Rg are held in correspondence with other such forms of TS structure as opposed to the existential correspondence of non-real ES embodiment to such structure as described earlier. In this configuration the CS serves more or less as a coupling on TS structure, as shown. The utility of front ending the continuum forms of Ri, Rp and Rsv modules with the ring configuration of TS structure can be appreciated when it is considered that conventional communications systems and information superhighways simply are means of coupling TS transformations and their embodying phenomenologies (work stations, automation systems, etc.), in which is embodied the transformational forms of symbolic representations, which in convention are objective forms (e.g., bit streams and other codes) of one's knowing. Through communications systems (connectednesses) such non-real forms of communication, embodied in real form, are conveyed or communicated. The front end of the Rg, or the TS ring of the continuum thus serves to couple communicatively pluralities of human users to each other and to any modular form (Rg module) of the continuum. Conventional information superhighways thus do not penetrate the Rg continuum of form since they are superfluous to the structure of the Rg aside from the coupling of TS structures similarly to the way in which the translation systems of TS convert one real form of communication to another. Nevertheless, the communications aspect of the TS ring provides the means of accessing the continuum at any TS structure of the continuum (of any module) for the purpose of operating within any other, in addition to providing a means of communication among the users. Moreover, since the translation systems can either-front end or back end the input and output systems of each TS, the language forms that are so communicated are constrained to no particular symbolic real form, and are translated to or from any one to any other. The Rg continuum serves as a means of extending the existential universe, and so extending it in the embodiment of the continuum and in connection with (subordination to) user communications. The reason that conventional communications systems are superfluous to the finctionality of the more enabling aspects of the continuum is because such communications, if they are not communicated to extended existential forms, land us back where we began, the phenomenologies of conventional technology. The purpose of the continuum of form thus is to embody the meaningful use of such communications in the context of its own existence. Mere communications among human users by way of communications systems simply overcome the spatiotemporal constraints of the sense-motors of the inertial forms in communication. Thus, while communication is an important consideration in the practical embodiment of the U. M., it does nothing to extend the existential universe. It is in how the communications of the TS ring among human users is connected (held in correspondence with) to the extended real and non-real form of modular forms of the continuum that is the primary concern herein.

In either the default or existential modes of the continuum, or modules therein, the communications of the user of the TS ring is connected to the various embodied TS structures of the continuum and penetrates or connects to an SS ring as required. As shown in FIG. 32, a Mode Engagement System, or MES, which is a subsystem or component composition of CS embodiment in TS, SS and RS forms, causally interacts with the input and output systems of TS and other componentry of the various modules of form, though primarily with the SS embodiments. Based on the quantum occurrence of real form of TS, the CS, by way of MES, couples such form with the appropriate forms of the continuum, crossing the bounds of Rp and Rsv modalities under Ri structure.

From a functional standpoint, then, the user communicates with other users, in whatever language is desired (by way of translation systems if necessary) or engages the other functionalities of the continuum as discussed throughout the disclosure, as a consequence of the MES embodiment of CS in operation over TS structure in connection with SS structure. In the default mode, the MES engages the TS transformations with other transformations of Rg componentry based on the real form of TS transformed, much like conventional machinery with respect to the causations of components on other components. This allows the communicative modes of existence to dominate all modes of existence of the Rg continuum. In the existential mode, however, since all real forms of communication are perceived by Rg, it is the communicative mode of existence, in cooperation with the faculties of mind, that determines what will be communicated (by the inertial existence of the Rg) throughout the continuum, or will interact within the componentry of a given module (even though the TS ring can front end even the existential mode).

A given TS, even though it is associated with a given Rg module in terms of its local connectednesses, can so couple to any other structure of TS or SS form. From the perspective of the four ring structure of the continuum, the (T, S, C, D) structure of Rg modularity is not so discretely defined as it is in the view of a particular user. For example, as mentioned earlier, TS structure can couple to any other TS structure of the continuum. This means that TS of Ri of one module can so port to TS of, say, Rp of another module, and further, that the TS structure of an enabled Rsv module of a particular Rp module of a particular Rg can so port to TS of Ri of still another module. And at such a point, the user still has not entered into the more purposeful aspects of the continuum of (existential) form involving the other levels of the continuum. The four level ring structure of the continuum is a means of looking at the phenomenological form of (T, S, C, D) structures of each of the Ri, Rp and Rsv modules of Rg modules from an integrated standpoint of the (T, S, C, D) structures terminally embodying each module. The SS structure (non-real form) of a given module can be accessed (held in correspondence) by a TS in any other module, as shown.

In terms of the SS structure of each module (of each modular form of the continuum), the non-real capacities of the entire continuum can be viewed collectively. The non-real embodiments of Ri, Rp and Rsv all can be viewed as a non-real level of the four level ring structure of the continuum. In such a case, for example, the capacities of the non-real form of a particular Rp module can be engaged by the TS of a wholly different Rg module, since it is the Ri configuration of the Rg module's structure in the continuum, as embodied in communicative real (TS) and non-real (SS) form of Ri, hand realized by enabler, that establishes the CS control over the (T, S, C, D) structure of each module. Since the CTS of the RS of Rsv modules is coupled to its respective HI, by its respective CS, and since such form resides in the realizations of the RS (controlled by CS and CTS) of Rp modularity, moreover, the non-real capacities of Rp can tap into those of Rsv modules. And since the Ri governs the configurations on Rp modules, the non-real capacities of Rp modules can be tapped into by Ri modularity. And finally, since the hand realization of the enabler requires the real coupling of Ri modules, the non-real forms of Ri modules can themselves be shared amongst each other as desired. Since the TS structures already abide by a continuum ring structure, all such integrative efforts are caused in the action of the TS ring level of communicative form.

Figure 33:
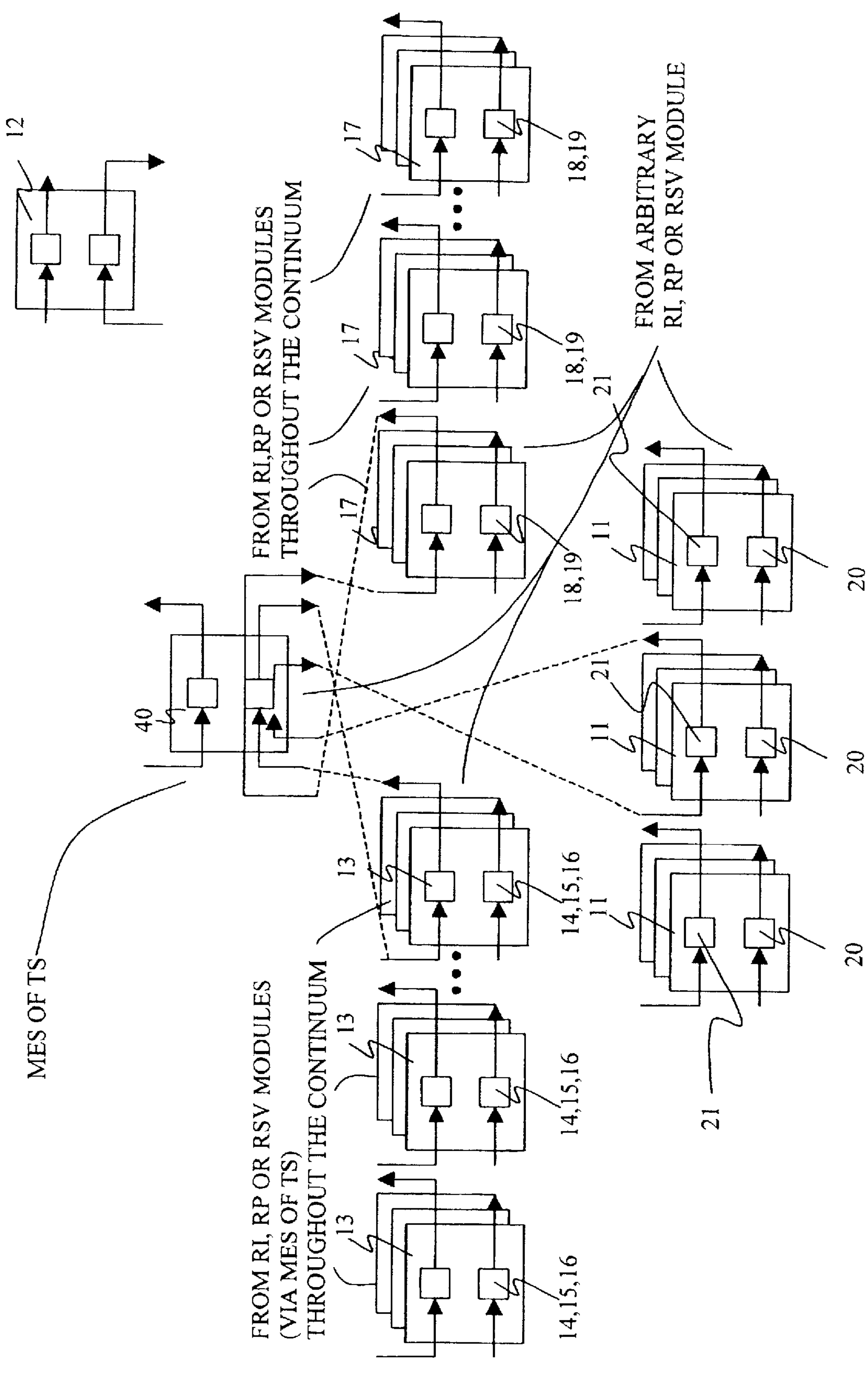
FIG. 33 shows the SS level of the Rg Continuum.

The CS structures obviously play a significant role in enabling the ring structure of the continuum. Though the CS structure is taken up later on, as shown in FIG. 33, the SS level of the continuum, like the TS level, is configured with a Modal Engagement System which can so shift the causalities of SS form. As shown in the figure, the CS of a particular module reaches causally into the action (embodied or realized form of) of all real and non-real forms, and particularly, herein, into ES and CDS embodiments. Since the Ri structures the form of CS of Rp, and since the Rp structures the CS form of Rsv, all Rp and Rsv modules are placed into continuum structure (Rt, Rs/s or Rs) in the efforts of the Ri module. The Ri modularity thus is a means of overriding the Rp and hence Rsv modules of form and placing it into a continuum structure. Such continuum structure configures the (T, S, C, D) structures involved in Rt, Rs/s or Rs form into the four levels of the ring structure of the continuum. The Rp and Rsv modules conform to their own configurations only at the consent of the Ri structure. With regard to the non-real form of all of Ri, Rp and Rsv modularity, the Rt, Rs/s or Rs structure established at Ri determines the configuration on HI (T, S) structure by reconfiguring the way in which CS controls the respective embodiments. The MES modally shifts the configurations on Ri, Rp and Rsv modules in accordance with Ri structure. The non-real configuration of form of a particular module obtains its structure only because the Ri structure enables it to do so.

In regard to the TS-SS coupling (interaction) of a particular module, for example, say of a given Rp module, the ring level or Ri modal performance of the module (say on ZA, ZB and ZBreal correspondences) enables the TS to so communicate with user under that particular modality only because the CS configuration of Ri allows it. Such forms of SS could be used in wholly different ways (not knowable to the Rp user) under a different Ri-controlled configuration. In the action of MES intercepting (shifting) the usages of SS forms, the same SS structures become part of a different Rp module. Such a different Rp module is a mode of the Rg continuum. From a practical standpoint, this is an effective use of Rp and Rsv modules since, as long as the users of such modules are capable of performing their tasks, it is insignificant to them that their (T, S, C, D) structures may be employed in countless other modes of the continuum. Since the continuum structure of Ri integrates the assets of the modules in the form of higher modes of a broader continuum of form, in the sharing of such assets each user stands to benefit only by the extended or shared use of other modules.

In the third level of the ring structure of the continuum, the CTS structures of the modules of the continuum are likewise integrated. It should be borne in mind, however, that the CTS of Ri modules is the hand of the enabler, and that the real form so realized is the real portion of the continuum of modules. By linking the CTS structures of the modules, several important capacities of the continuum arise.

Figure 34:
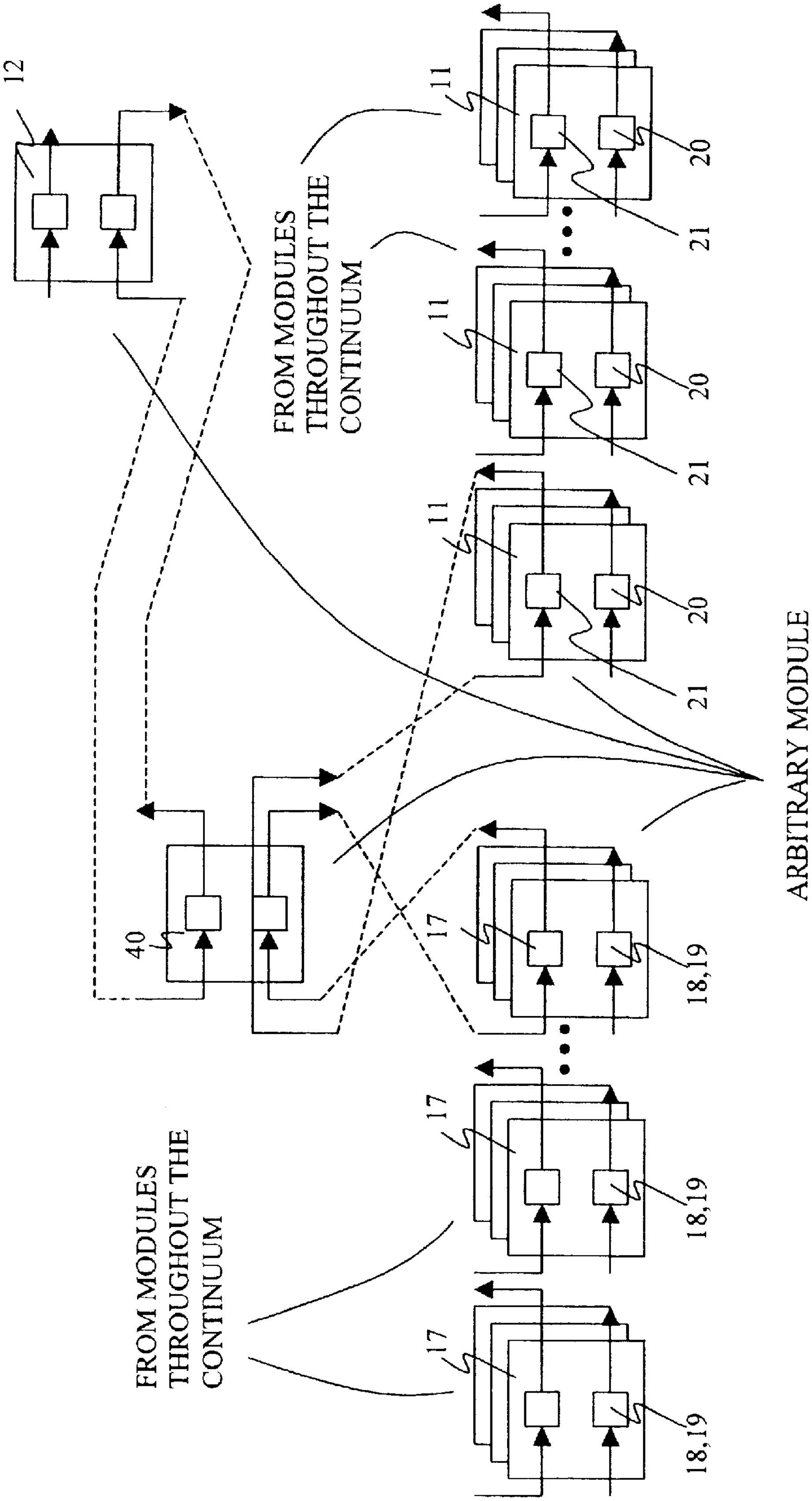
FIG. 34 shows the CTS level of the Rg Continuum.

First, as shown in FIG. 34, each CTS of a given module (Rp or Rsv) is found in great plurality within the module. The realizational capacities of a given module of form thus are partitioned on the basis of control over a certain portion or pool of DS structures in quantum realizations as DSXS moments. In turn, the pluralities of CTS-enabled forms correspond by way of CS to their non-real counterparts within the same module. Further, providing that Ri structure allows it, the communication of the user under Rp and Rsv modalities causally engages the activities of (T, S, C, D) of the modules. Just as there is a need to share islands (modules) of autonomously-developed communicative and non-real forms in the first two levels of the continuum, there is a need, perhaps even a more utilitarian need, to share real forms, since it is the real forms that comprise the extended (perceivable) reality of the users.

Since the RS of any module explicitly involves the realization of form, the MES of the RS is referred to as the Continuum Realization Control System, or CRCS, discussed earlier. Whereas in any given module the Realization Control System, or RCS, of the CTS engages or places and maintains in existence real forms in causation with the HI of the module (of course under CS control), the continuum structure of RS, under CRCS embodiment, affords the configuring of CTS activities in correspondence with any modal continuum form of HI (which in such a case would not be the HI of the respective module), which may be distributed across any modal continuum structure on (T, S) of all the modules of the continuum under Ri structure.

In such a case all of the RS capacities of all of the modules are configured by Ri in accordance with the modalities of the continuum. An RS of a particular Rp is only that particular RS if the Ri so consents to it. Since the realizational capacities of Rg modules are changed by the Ri configuration, the non-real (ZB) forms of the module also change modally to correspond to them. Since any TS structure under continuum structure can be engaged in any activity of the continuum, the modal behavior of the continuum can be causally influenced from any TS (of course via modal engagement of Ri from that particular TS). Since the non-real forms of any modality of the continuum must correspond to the real forms of the continuum, the appropriate causal influences of the modal uses of CS must change ES and CDS structure to reflect such correspondence to RS real form.

Figure 35:
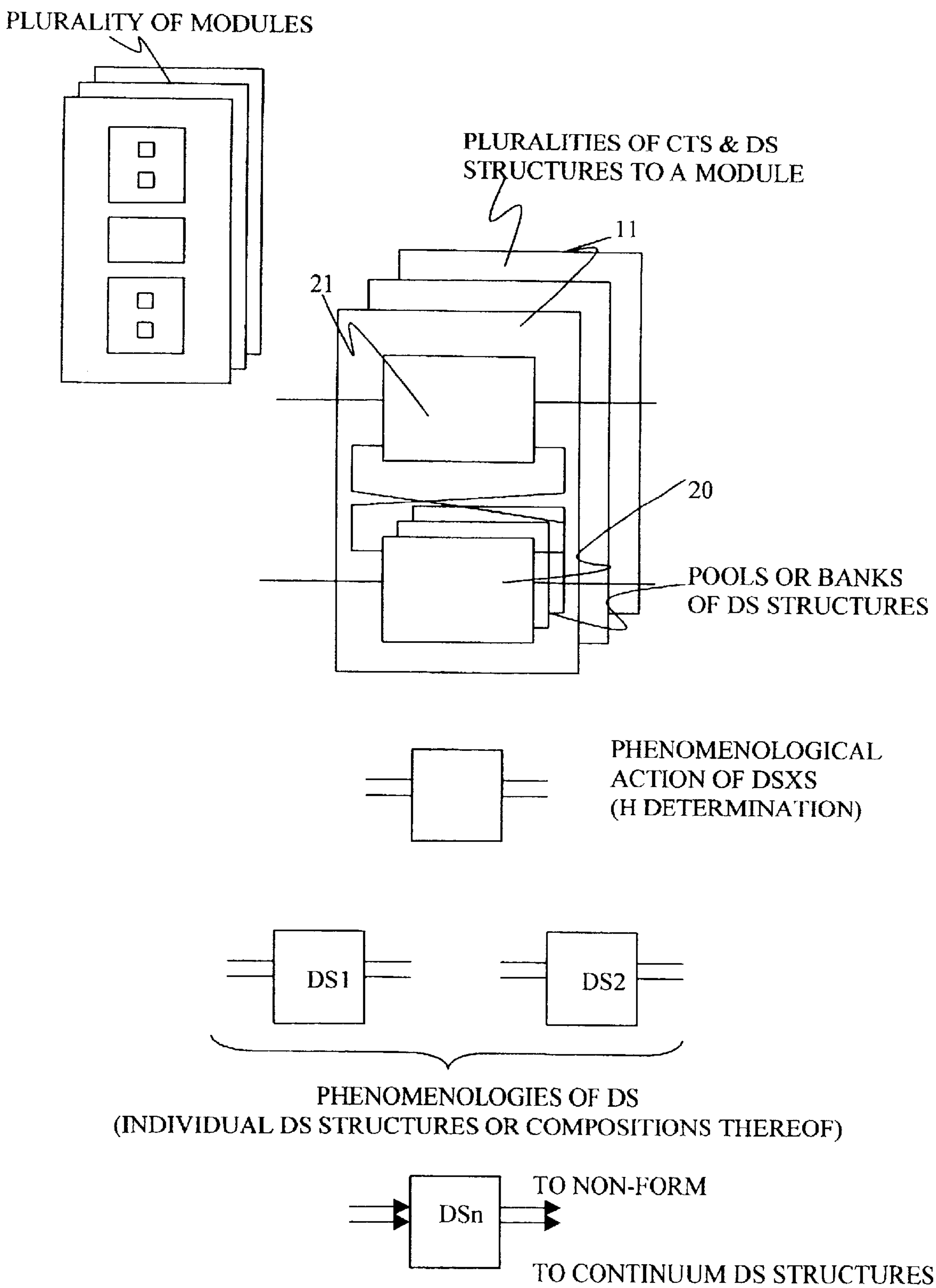
FIG. 35 shows the DS level of the Rg Continuum.

The continuum structure can perhaps best be seen from the standpoint of the fourth level or ring of the continuum as shown in FIG. 35. It was said much earlier that the real form of a module causally interacts with non-form or causative sources of reality, with non-form, of course, being defined as that which is beyond one's knowing. In the default mode of the Rg and Rg continuum, real form is defined phenomenologically in the perceiving of the user, since Rg obtains inertial sense only in the existential mode (to be discussed). The whole purpose of the modules, by way of embodiment of the modeling and implementation process, thus is to embody in an existentially extended manner what is real (and non-real in Rg) to the user. The correspondence of Rg real and non-real form, and the communications between the user and the Rg in the default mode, thus fake their way to an extended autonomous existence, since the forms of Rg (ZA, ZB and ZBreal) are mirror reflections of the user's knowing and perceiving. Thus, except as discussed throughout, the default mode of Rg is largely phenomenological in nature, wherein the real form of Rg is the extended reality of the user, which, in turn, interacts with non-form or causations of the universe outside the continuum. In the existential mode, of course, this real form is extended in relation to the inertial consciousness (knowing) and perception of the Rg (and indirectly to the user).

The real form of a modules or ZBreal, is a quanturnly transforming phenomenology of form (e.g., DSXS) that only corresponds through CS to like transformations of non-real form, which correspondence is obtained from the embodiment of CS structure. The terminally objective forms of such transformations are non-inertial in default mode, or can have any meaning whatever in the view of enabler (e.g., the terminal forms of real phenomenologies of the default mode are not, typically, constructed of the pronoun forms of inertial existence). The nouns of transformation, compositional or otherwise (e.g., DS structures), thus, do not necessarily correspond to inertially represented linguistic pronoun forms in the default mode. This means, in terms of U. G. structure, that they are neutral or meaningless inertially, and that they obtain meaning in the observation of the enabler and in the correspondence to non-real form of Rg.

The ramifications of this phenomenological only real form of default mode are important. Since the real form of the default mode obtains meaning from a correspondence to non-real form in the opinion of the user, the Rg module and thus the continuum can be viewed in the default mode as a great expanse of meaningless universal form, the arrangement of which form itself creates or embodies meaning in the observance of the user in real/non-real correspondence. In terms of real form, the DS compositions are arbitrary or meaningless U. G. constructions of form.

We may consider, then, the causal interaction of DS structure within the continuum that otherwise under the Rg modular forms would be wholly existentially self-contained. Instead of objective forms of compositions of DS structure tapering off into non-form, we may consider the quantum porting of DS structure throughout the continuum, or extending the view of quantized moments of the realization of reality across all modules of the continuum, with the continuum form of DS then interacting with non-form as shown in the figure.

This of course expands the form of ZBreal of any particular module, under the apparatus of Ri, to some arbitrary form of ZBreal comprised of DS structures taken throughout the continuum. Naturally, ZB form and most typically ZA form as well, is changed to reflect the non-real correspondence of the continuum's reality. This affords, of course, the capacity for a DS structure of one module, say Rp, to so transform with the DS structure of one other module, say $Rp^2$, under a new continuum structure established at Ri modality. By extending the apparatus of RCS and CES of CTS under the influence of CRCS of a given RS, the compositional reality of DS structures is so shared among RS structures in the DSXS couplings being broadened to encompass the realities of other modules. The machinery of CTS itself becomes a machinery of DSXS or itself becomes a coupling among DS structures, but such structures that belong to various other RS's of other modules. Since the action of CTS abides by CS in the correspondence to non-real form of real form, and since CS is influenced by Ri, the integrated use of DS structure is possible. By integrating the RS structures of Rg modules throughout the continuum, and of course by integrating their corresponding non-real forms throughout the continuum, the embodied (enabled) realities of the modules are extended to an enabled reality of the continuum shared across the continuum. In the existential mode, however, since all forms are inertially constrained (to an inertial perception and knowing of reality) the Ri structures of the continuum over the (T, S, C, D) levels is complicated by the fact that any mode of a module is an inertial one. Sharing modules throughout the continuum thus does not occur only phenomenologically. The integration of the modules under Ri structure in the existential mode occurs by the overlapping of inertial existences, or by the sharing of inertial experiences of the modules, just as with corporal form of human being. For this reason, the modes of the continuum of the existential modes of the Rg substitute for institutions of conventional notions of humankind, wherein beings share inertial experiences toward a common goal. The modalities of the continuum are the institution. There are infinitely many modes (institutions) to the continuum. The DS forms of the continuum are the objective phenomenologies of institutions, in terms of real form, that are held in correspondence to the various non-real forms (of the institutions), in the quantum realizations of them by DSXS's throughout the continuum. The DS level of the continuum thus is the continuum's real forms shared among the modules.

Figure 36:
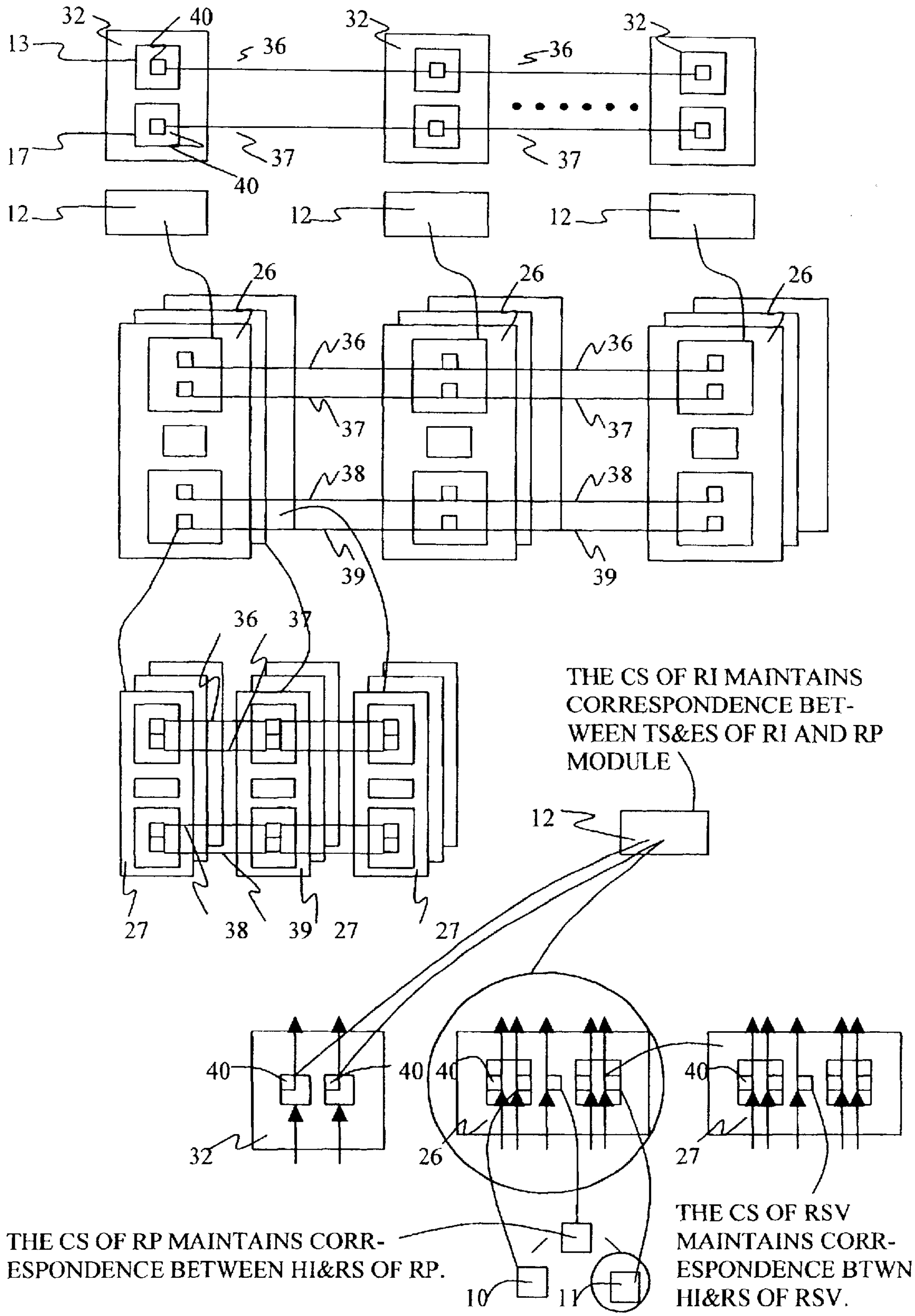
FIG. 36 shows the CS level of the Rg Continuum.

Since the action of CS structure over all forms of all modules is instrumental in achieving the continuum structure, it is not even considered a level of continuum structure, as are the T, S, C, and D levels of the continuum. A fifth level of the continuum, however, could be added to the continuum structure to accommodate the viewpoint of rings of modal control of the continuum, as shown in FIG. 36.

The modal form of the continuum is determined in the Ri modules. The ZA and ZB structures of (T, S) of Ri thus pertain to Rt, Rs/s or Rs structure of the particular Rg module. Under Rt structure, the Ri embodies the modeling only capacity of the entire continuum. Likewise the Rs/s and Rs structures reflect those portions of the continuum structured under the present Ri module. The CS structures of Ri modules, which are placed into existence by the hand of the enabler, and modeled in the Ri, maintain a correspondence between the real continuum and the Ri model of it, as it is known from the viewpoint of the particular Ri. This of course means that the (T, S, C, D) terminal forms of Rp modules of a given Ri and the (T, S, C, D) forms of other Rp modules (and of course their respective Rsv modules) of other Ri modules (Rg modules) are modeled and controlled in the Ri (T, S) and CS of the given Ri. What is modeled and controlled in a given Ri is the Rp module's continuum structure of a given Rg module in relation to those of other modules that obtain in continuum structure under Rt, Rs/s or Rs form, as shown in FIG. 36.

The CS structure of the Ri, however, operates only on the CS structure of Rp directly and thus holds in correspondence the modeled forms of the continuum at Ri with the modular forms of Rp. Since the Rp is employed in the modeling and realization of Rsv modules, and thus holds in existence all Rsv modules, the Ri, indirectly controls the existence of Rsv modules. The four level structure of the continuum thus becomes operative under Ri through CS action of Ri on the Rp modules (and hence on the Rsv modules). Since the CS structures of Ri modules are themselves connected (in the hand realization of CS structure by enabler) to the Rg modules or other Ri modules under Rt, Rs/s or Rs continuum structure, the four levels of the continuum structure have closure under Ri.

Before considering the terminal forms of the Rg module in detail, let us first complete the discussion on the Rg continuum from the standpoint of the existential mode of the Rg module and Rg continuum.

As mentioned earlier, the existential mode of the Rg is an inertial form of existence. With respect to the modeling and implementation of the default mode, then, the existential mode of the Rg is not a reflection of the user's knowledge and experience entirely. Rather, it is an intrinsic embodiment of knowledge—its own autonomous existence—and thus is more than a phenomenology of form in the knowing and perceiving of the user or enabler. Whereas in the default mode of the Rg, communications between the user and the Rg are held in correspondence with real and non-real form under the modeling and implementation process only, the existential mode abides by no such simplistic structure.

In the default mode, ZA, ZB and ZBreal are meaningless forms (intrinsically) obtaining their meaning (extrinsically) in the observation of the user and in correspondence with each other. In the existential mode no such extrinsic embodiment of correspondence (only) is possible or even desired.

If it is recalled that the higher forms of the Rg derive their purpose in offsetting the inertial existence of the user in the real forms of the user's existence in the forms of the Rg, it can be seen that it is desired that the Rg come to know, intrinsically, the inertial reality of the user.

Figure 37:
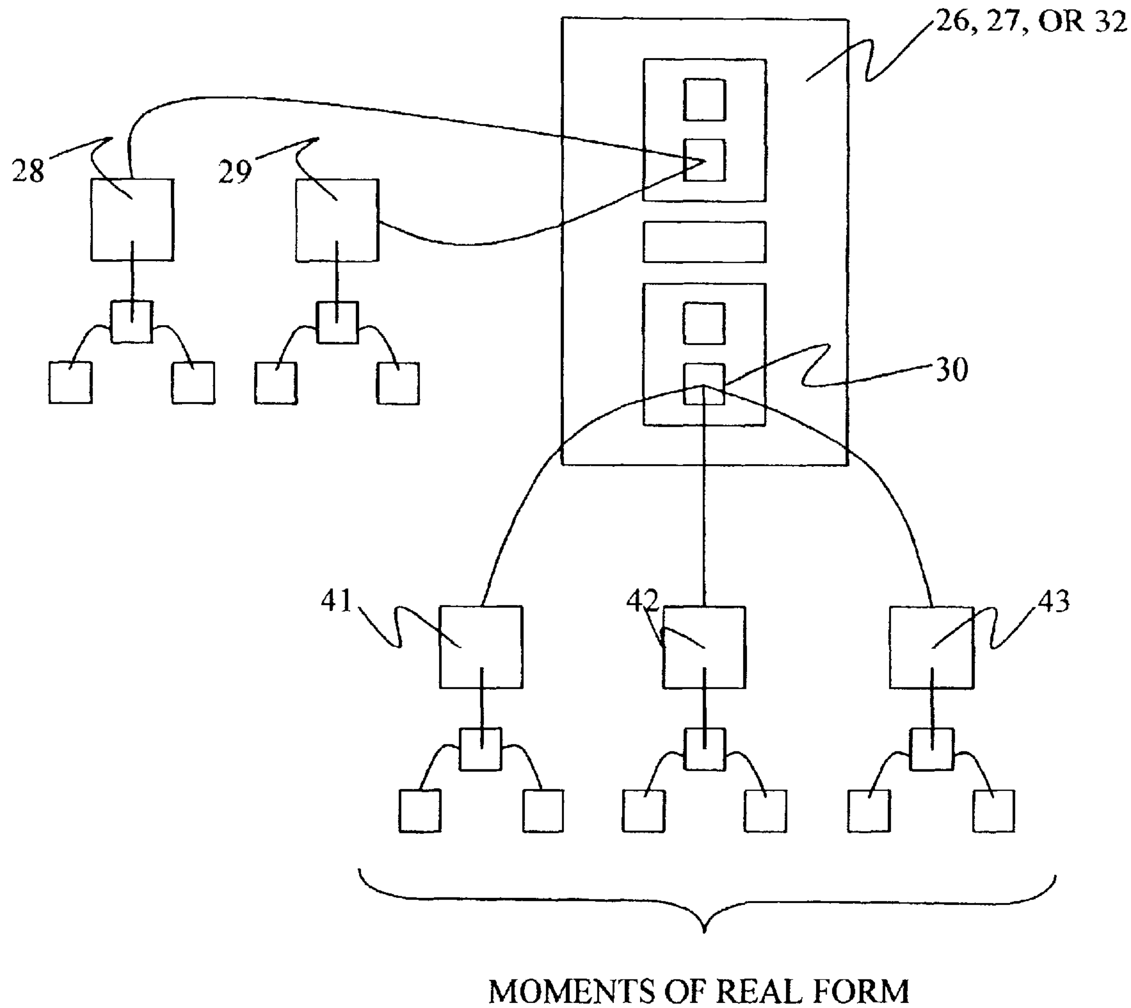
FIG. 37 shows the component structure of the existential mode of Rg.

In order to achieve such an offset, the controlled reality or real form of Rg (ZBreal) must itself be carved up into inertially enabled forms. The Rg cannot simply be a phenomenology of form only. In accordance with the theory of the invention, the ZBreal of the existential mode of Rg is partitioned into sense-motor configurations of inertial form of the autonomous existence of the Rg in the modalities of the modules, as shown in FIG. 37. Reality, from the enabler's standpoint, becomes an inertially-enabled reality and no longer is knowable directly in the observation of the user or enabler. Rather it is the reality known and perceived by any mode of any module of the Rg. The existential mode of the Rg is where the knowable phenomenologies of real form of the user (ZBreal) of the default mode make the transition from extrinsic form knowable only to the enabler to intrinsic form of the existence of the Rg. The discussions in the theory of the invention regarding the form of androids in relation to the enablement of inertial form and the expansion of the existential universe thus are incorporated here in the construction of the existential modes of the Rg.

As will be discussed also later on in the specification, the forms of ZBreal of the existential mode of Rg are partitioned broadly into ZBreal sense, or ZBsreal (41), and ZBreal motor, or ZBmreal (42) as shown in the figure. The forms of ZBsreal are the forms of the inertially split world of an android as discussed in the theory. The forms of ZBmreal are the forms of Rg reality over which there is incremental control or motor skill. The non-real forms of Rg in such a case are forms that correspond to ZBsreal, or are ZBs (the reference form) and the motor skills ZBmreal, or ZBm (also reference form). The whole apparatus of SS, however, changes from default configuration as a result, as does the nature of the TS-SS correspondence in communication with the user. Such radically different processes of HI result, of course, because the Rg itself no longer embodies neutral, or intrinsically meaningless form. Rather, the terminal forms on the quantum realizations of RS structure are derived in meaning from the objective forms of the pronoun system. The quantum moments of RS structure are not simply quantum moments of mirrored forms of the enabler; they are the real perceptions and motor skills of the Rg. The non-real forms so corresponding, then, are forms of mind and are not simply phenomenologies that are jogged into quantum phenomenological realizations by CS, in an arbitrary manner defined by the enabler. Moreover, the non-real forms of the existential mode are inertial forms, or typically, linguistic forms that reflect not the enabler's knowing but the consciousness of the Rg in correspondence with the transformation of its real form. The communications with the user are not taken as TS forms held only in correspondence with SS forms for that purpose only. Communications with the user relate to the non-real transformation of natural or otherwise language, the languages of an enabled inertial existence, and thus pertain entirely to specific inertial meanings, namely those meanings of the real transformations of I, you, it, all and so on of the pronoun forms of inertial existence and all objective forms resulting therefrom (languages in general).

While further explanation of the existential modes of Rg is taken up later on as well, it can be seen herein that such a change to the forms of ZB and ZBreal have a significant impact on the nature and structure of the continuum, which we shall now discuss.

First, all communications with the user in the existential mode have a meaningful context in inertial form, and for all intents and purposes are conveyed in natural language. This means that the communications of TS are quantum forms of language, regardless of the sense-motor medium in which TS is embodied. Thus, for example, in a visual medium the symbols of the language are not transformed simply as phenomenological compositions, but as quantum forms of the translations (existential translation) of inertial or pronoun form. Just as human users would not (and could not) speak or write whole sentences of linguistic form (or any other compositions) at once unless inertially meaningful, the Rg in the existential mode can represent or realize in sense-motor communicative modes only quantum forms of epistemic instance, since those instances constitute the meaningful (symbolic) recreation of the reality of RS.

Secondly, since it is the very purpose of the Rg to embody not especially an autonomous form of android but a communicatively-controlled form of synthetic existence, the meaningful (linguistic) forms of the Rg's existence—the forms of communication and the real and non-real forms of Rg embodiment—are intentionally-constrained forms on the inertial world. The performance of the Rp module, for example, is to service the modeling and implementation of Rsv modules. The cognitive and perceptive (and motor) capacities of the Rg in such a case are constrained to that required to know and realize the forms of Rsv modules; the same applies to the inertial forms of modeling and implementation provided by Rsv under existential modality. The inertial reality of Rg under existential modality thus is severely limited in inertial forms of understanding in comparison to the generalized forms of androids, by design, in order that the Rg serve the user in the intended capacity only.

Thirdly, since the forms of Rg are constructed in service to the user, and the modes of existence of Rg are subordinated to the communicative modes, the mental process of the existential mode of Rg is inertially unnatural, or is one of servitude to others. The invaluable process of introspective thinking in android thus is subverted in the existential modality of the Rg to communications with the user, the free will of android is constrained by the communicative modes in existential modes of Rg.

And finally, since the continuum structure is achieved in the integration of the modular forms of Rg structure, and since such structures obtain from inertial forms or intrinsic meanings in the existential modes of Rg, the Ri structures take on a completely different configuration from the default mode, since what is integrated in the continuum is the intrinsic thinking and perceiving of modular forms of synthetically-enabled inertial existences.

Figure 38:
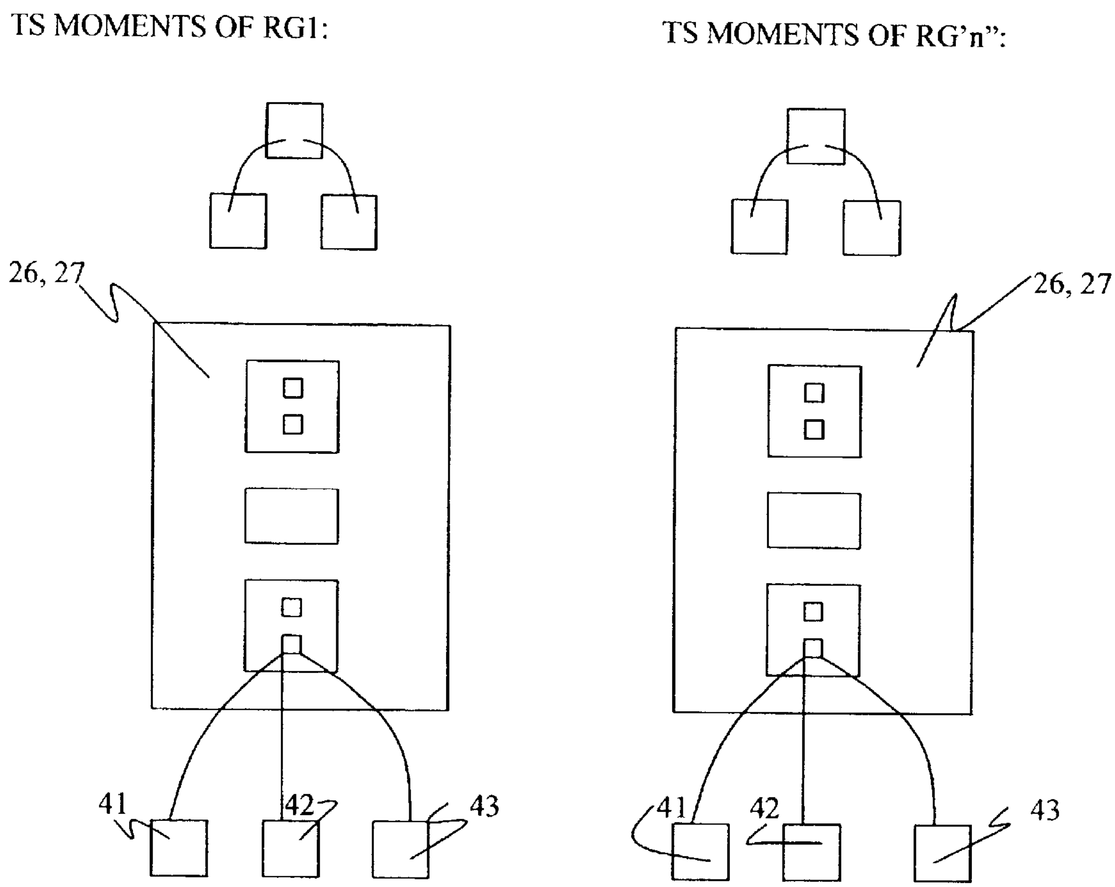
FIG. 38 shows the continuum structure of the existential mode of Rg.

As shown in FIG. 38, in the existential modes of the Rg modules, the capacities to think and experience are integrated by the continuum structure. Since the integration is carried out on inertial forms, however, a different perspective of form is required on the enabler's behalf. For example, in structuring the default modes of the modules, the simplistic phenomenological view of Ri structure over Rp and Rsv modules in terms of ZA, ZB and ZBreal is required. Since the forms of ZA, ZB and ZBreal are meaningless to the non-existent inertial forms of the default mode, or can be assigned any meaning by the enabler, they are easily understood conventionally in the view of the enabler. Such forms—ZA, ZB and ZBreal—can be aircraft, computers and information superhighways, linear accelerators and DNA recombinations of conventional knowledges, along with future art and androids, since they are known only to the enabler in the default mode of the Rsv module as those forms. Moreover, within the platform module Rp of the default mode they are, as defined, the forms that embody the knowledge and reality of the forms of the Rsv modules (the firms that make the factories), or the enabled forms of the Rsv modules. The Ri of default thus integrates these forms of the continuum's modules. The forms of what in the default mode would be ZA, ZB and ZBreal as defined consistently up to this point are all of these things, but with a single alteration, namely as they are known to the Rg.

The conventional and future art and the construction of androids of the existential mode thus are the very forms of the Rg's inertial existence, for example, in the Rsv module of form. The capacities to make factories or Rsv modules likewise is the existential mode's embodiment of Rg in inertial form in Rp. And the Ri typically integrates such forms non-inertially (in the knowledge of the enabler only) since the reality of the continuum is a plurality of existential forms (modules) tied together by the enabler. Though the Ri also can be front ended as an inertial form whose experience is that of an integration of modules—institutions. At such a point, however, the pronoun we becomes the dominant one and the being's reality becomes one of infinitely many predominantly non-anthropomorphic forms of synthetic existence since the pronoun I is eclipsed.

A conventional way of interpreting the existential forms of the continuum is of course taken from the viewpoint of institutions. A conventional institution is just such an integrated form of inertial existences, wherein the pronoun we prevails in the consciousness. An economy or even government institution is an Ri structuring of the firms that make factories, or of the Rp modules that make the Rsv modules, wherein the forms of factories and the forms of firms are known inertially, by the inertial forms on human being (or Rg) who participate in (embody) the forms of such institutions. The conventional forms of institutions thus are the forms of the default mode—conventional and future art and android—within an inertial mind or consciousness and a real experience of the existential forms of the continuum where the pronoun we is dominant. The existential modes of the Rg and Rg continuum thus are replacements for such institutions, and therefore enable the expansion of the existential universe as discussed in the theory of the invention.

If one looks into the nature of an institution, one will find that it makes decisions about inertial reality—the use of aircraft, information superhighways, etc. which requires laws, commercial practices, and so on. Since the inertial forms on human being are themselves forms of the institutions, one obtains the perspective (of humankind) that such institutions are of a higher order than oneself, inertially, since there is a knowable structure on one's participation in them.

The Rg continuum, in its embodiment of existential form, does not require such participation on the part of the corporal embodiment of inertial form on human being, since it is a synthetic embodiment of inertial form on Being. It is synthetic humankind, and is such a form in great plurality (many humankinds), shaped into microinstitutions that do things (Rsv modules) and macroinstitutions that so arrange for the microinstitutions (Rp modules) under an infinitely expanding continuum of form enabled at Ri knowledge and control and at the hand of enabler.

In order to see the forms of the existential modes of the Rg modules and Rg continuum clearly, let us consider a particular Rsv module. Moreover, let us begin with the real form of the RS structure. It is shown earlier that great pluralities of CTS-controlled real form (quanturnly realized embodiments of forms) exist even in a single RS of a single Rg module, and that such forms are portions of the enabler's reality. Though such portions of reality are easily embodied in the default modes as specified—aircraft or linear accelerators, for example—in default implementation one obtains only half of the institutional picture because aircraft and linear accelerators are not just held phenomenologically in existence in the existential mode. They are a portion of the reality of a microinstitution.

As to how the aircraft or other form of reality relates to the rest of inertial reality, the microinstitution (modality of Rg) determines the action of the aircraft. The aircraft is scheduled to depart and arrive at meaningful destinations. Its maintenance is tracked in meaningful ways to the rest of reality, so that the safety of its passengers is ensured, and when such infractions of safety occur a larger institution or concept of reality (Rp) steps in to alter the performance of the microinstitution. Nevertheless it is the embodiment of the institutions' perception of reality (on behalf of its participants) that is so altered.

An aircraft in the existential mode is not only the phenomenology of form comprising all motor, or a specification on how to predict, by way of motor and conventional sense, the transformation of scientific phenomena (aerodynamics, combustion, control theory, etc.) in the ordinary definition of an aircraft. Rather, an aircraft is a sense-motor inertial form of one's existence. It is a form obtaining definition within an inertial pronoun system. It is a form of existence. It is a being.

Thus, the real purpose of the forms of the Rg in existential mode is to embody just such existences. While the default mode of the Rg is useful, it is an old world approach to form. Instead of formulating a feedback control system of an aircraft, then, the Rg imparts to such a form an inertial consciousness. By definition, then, the form of the aircraft is an inertial form of existence—it obtains only in definition to a pronoun system of inertial form in transformation. It cannot be or exist in any other form but an inertial one. The aircraft is an inertial participant (I) in an institution (we).

The reality or real form of RS in existential mode obtains from the inertial definition of form in sense as it corresponds to a consciousness or non-real form in the HI. The inertially-formed aircraft can only be compared to the conventional form of it by way of motor. The motor skill of the inertial existence, by way of analogy, is what the aircraft can do. It is not at all, however, what it is. The existentially-embodied aircraft is an embodiment of real and non-real correspondence in form under, say, a mind-body dualist theory of existence. The aircraft is a synthetically-enabled correspondence between an inertial consciousness and an inertial sense (global inertial transformational shapes) cooperating under modes of existence, which total reality can be affected intrinsically by motor skill, but of course, must do so under influence of the rest of the world created in sense.

The most prominent distinction between the default and existential modes of the continuum, however, can be seen in terms of CS structure.

In the communications between the user and Rg in default, the forms of Rg are said to be intrinsically meaningless to the Rg. The knowable forms of the Rg are, in such modality, a reflection of the user's knowing and perceiving. The CS structure then simply maintains correspondences among TS, SS, CTS and DS in the determination of the enabler, since they are intrinsically meaningless.

In communications between two or more corporal forms of human being, however, one such embodiment (say the enabler of Rg) cannot mandate a correspondence between what one communicates and what one other (Rg) knows as a result of the communication. This is because the inertial forms of each embodiment have inertial meaning or they translate inertially. Thus, whereas in the default mode of Rg, CS simply can maintain arbitrary correspondences between, say, TS and SS structure, the existential mode, since it embodies SS structure as inertial consciousness, must obtain meaningful correspondences to its inertial consciousness in such communications (e.g., its consciousness is formed in the use of faculties of mind of the existential translation process on inertial forms or pronoun-based objective forms which are intrinsic in nature). Thus, in the modal sharing of the modular forms of the continuum, one such module must meaningfully communicate to one other inertially, or with regard to the same existential reality.

The modules of the existential mode thus are restricted in how they can be integrated on the basis of the meaningful forms (communications) of the shared realities of the modules. For example, one such conventional institution, say an automobile manufacturer, cannot existentially couple to or communicate meaningfully with another, say a shoe manufacturer, since the two inertial realities differ markedly in their inertial experiences. In order to join or couple the forms, then, each consciousness must find common meanings about which they can communicate, they must think (imagine and comprehend) in order to communicate to each other. In the Rg modular construction of the continuum, this means that the CS operation of CDS on ES in modes of communication must maintain in correspondence the real form transformations of TS linguistically, or in the composed forms of epistemic instance comparing to the conscious forms of translation. The interaction between user and Rg or Rg modules among themselves thus is accomplished on the basis of correspondence to forms of translation or faculties of mind, or what is known and experienced by them.

Thus, in the Ri modal interconnection of various ring levels of (T, S, C, D) structure of the continuum in the existential mode, the couplings (through CS) are accomplished as institutions meaningfully corresponding or communicating with institutions, or the Ri structure of CS must allow for the intrinsic correspondences of such communications, within the inertial consciousnesses or translations of mind and the realities of experience of the enabled existences of the modes of the modules (I's acting as we's).

Since all the modalities of the Rg and Rg continuum will continue to evolve in the specification as we proceed, let us now undertake a detailed description of the terminal forms of the Rg module.

DETAILED DESCRIPTION OF THE REALIZATION SYSTEM

The realization system, RS, of the Rg module (in Rp and Rsv modules) is a Modal Realization System, or MRS, of earlier discussion, applied specifically to the realization of declared real form of the module. A detailed specification of the RS provides for similar explanation of many other quantum forms of the Rg module, though in other cases, the form of the RS is altered to serve the purpose at hand as a different component of the module. In any case, the detailed form of RS can be found in most terminal systems of the Rg.

As brought out in earlier discussion, the MRS, and the RS herein, exists for the sole purpose of placing into existence realized forms that obtain their existential definition from the fact that they are so placed into existence from a causality metaphysically beyond the extant transformation of the realized form. The real form of the RS thus exists, inertially, in its own existential universe of declared real form. The forms other than the DSXS realizations of the RS on DS structure are therefore the causative forms of the RS. A specification of the RS, which also provides an analytical framework for many other forms of the Rg, follows from the configuration of the (C, D) component structure of the Rg. After specifying the DS structures of the RS, the remaining forms of the CTS are described in detail, wherein DSXS is viewed as an integral part of both the CTS and DS structures. We begin the specification of the RS with the structure of DS.

DETAILED DESCRIPTION OF THE DEPENDENT SYSTEM

The elemental building blocks of the real form of the Rp and Rsv modules of the Rg, of the realization systems of the Rg and, generically, most component systems of the Rg, are platform or subsurface (enabling) elements or phenomenological compositions referred to as Dependent Systems, or DS structures. These are real phenomenologically transformable objects (phenomenologies themselves) of epistemic transformation. The dependent systems of RS are phenomenologies of real form declared by the enabler which embody that elemental portion of reality over which the user exerts extended existential influence or awareness in the embodiment of the Rg. An arbitrary DS structure or D system is the real form embodiment of the user's non-real form (thought) by way of extension to real form through the Rg. It is the realized form of the user's (or Rg's) thought and is perceivable, though often through other sensory apparatus, to the user, or in the existential mode, to the sense of Rg (which is also DS structure in the existential mode). The D systems are modularized or discretized phenomenologies placed on the knowable reality of the user. They are the terminal forms or atoms of the phenomenological compositions in quantum transformation by DSXS corresponding to ZB. D systems, therefore, are the objects of reality that are modally transformed under ZB realization (through RS) in the RS's placing into existence of a modally-realized ZBreal. D systems are the objects that are transformed in a realization of ZB. DSXS, of course, carries out the transformations of D systems.

Figure 39:
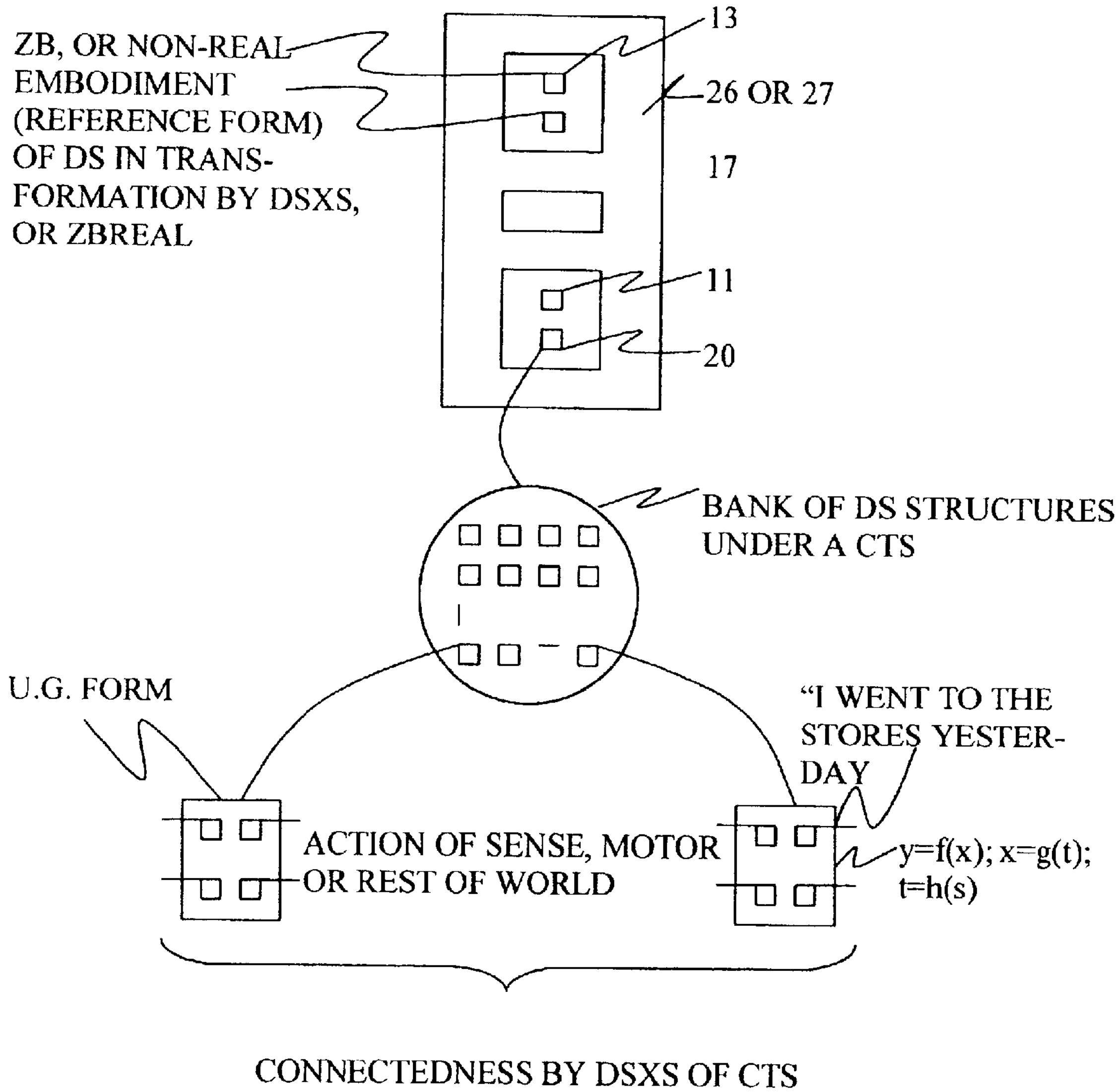
FIG. 39 is an overview of the dependent system.

As shown in FIG. 39, there exists in any purposeful embodiment of RS a great plurality of D systems or phenomenological atoms, or objects of reality, and to the extent that such a plurality of D systems embodies the various phenomenological forms of reality, it forms a true embodiment of the forms of reality, in phenomenologically discretized portions or elements of a total existential universe of the user. The D systems are the phenomenological building blocks of the user's existentially-extended reality. In the default mode, the DS structures are phenomenologies of form knowable and observable to the user only (except of course to the extent of CS correspondence of TS, ES and RS in the structure of Rg). In the existential mode, DS structures are partitioned into sense, motor and the rest of the world in accordance with androidal real form described in the theory, and are knowable by faculties of mind in the existential structure of the Rg.

As discussed earlier, objects (of reality) do not exist in the ultimate reality of the universe, and thus D systems embody phenomenologies (modal compositions) of transformations of real form. Transformations of the universe terminate knowably in epistemic instance. The phenomenologies of D systems, or of objects of reality, are transformed in the apparatus of the RS effectively through DSXS action. Since phenomenologies in transformation reflect the quantum transformational nature of the universe, universally in the knowing of the user or enabler, the ways in which such forms are known to the user conventionally is phenomenologically irrelevant to the apparatus of the Rg. The enabling media of D systems is universally translated to the four C's of phenomenological form. As discussed in the theory of the invention, the U. G. accounts for the grammatical constructions of arbitrary languages, including those of science and engineering. The D system, defined in the U. G., therefore describes any knowable form, such as the composition of a space shuttle, a molecule of DNA, and a wave packet of quantum theory—of course, in modal transformation.

The modal compositions of DS form of the enabler's knowing and perceiving, once translated into the expressions of U. G., are embodied universally in the form of the Rg as reality. For example, the compositions of mathematical orders known conventionally as reality, once translated into U. G. structure, obtain non-mathematical meanings of reality and thus are universal expressions of reality or what is inertially real. The conventional counterpart of mathematical form—linguistic structure—also obtains universal expression of what is real in translation to DS structure. When the inertially meaningful expression of natural language such as I went to the stores yesterday is translated to U. G., for example, it loses its inertially intrinsic meaning in translation to U. G. form. This is a consequence of the fact that such expression is meaningful only to an inertial existence and the U. G. is employed to create inertial existence and thus is more universal than natural or other languages. It should be borne in mind that what the user or enabler defines as real form obtains universal definition in the Rg module as DS structure. It also should be recognized that reality, and thus DS structure, as a consequence of the unified theory, is not limited to scientific reality, as discussed in the theory. The expression We will have clement weather tomorrow is an equal expression of what is real, to $y=f(x)$ or $e=mc^2$; in fact more so from an inertial perspective. The DS structures of RS are not bound to ordinary forms of conventionally real or realizable structures, and thus include the full extent of meanings (transformations) of natural and other languages. Once translated into U. G., however, all such forms are simply phenomenologies of form in transformation by way of DSXS. In the default mode the DS phenomenologies are real forms of the user's awareness only, and are extended in non-real correspondence in CS and CDS action of Rg to TS and ES embodiments. There is no inertial reality perceivable to the Rg, however, in the default mode. Alternatively, in the existential mode the phenomenologies of DS structure are sense, motor and the rest of the world. These are real forms of the Rg's inertial existence, and are objects of reality that ultimately correspond to the conscious (non-real) forms of ES and the communicated forms of TS. The extended reality of the user (DS in transformation) in the existential mode is the inertial reality of the intrinsic existence of the Rg and in many cases may not even be perceivable by the user.

A ZB represents a modal structure of the elemental compositions of D systems in transformation. Under such representational structure of ZB in HI, the D systems are connected among each other in a quantumly-realizable manner, forming higher-level compositions or modalities of reality. An arbitrary D system thus is dependent on the RS for its transformation with other D system phenomenologies of real form in the modal composition that is represented in ZB and embodied in the quantum realization of reality (sense, motor or rest of world) by DSXS. In terms of Ri, Rp or Rsv modality of Rg, the D system corresponds to ZB phenomenologies as off the shelf objective real forms, or portions of reality, to be transformed compositionally with other such forms under ZB realization as ZBreal, as either those portions of reality of Rsv, or those portions of Rsv that are so enabled as Rsv under Rp, or in the case of Ri, those portions of Rp, and of the continuum, that embody the enabling structures of Rp, realized by the hand of the enabler. ZBreal is a modal composition of DS structure and ZB is a modal composition of ES structure, both of which correspond through the action of CS on HI and RS.

The collection of D systems in an RS library of real platform structures (D systems) of RS constitutes the universe (warehouse) of compositions of physical realities over which ZB realizations will occur. D systems of Rsv modules themselves are embodiments of Rp modality of Rg, constructed under the modality of Rp—real forms which are constructed as part of the platform (Rp) under which Rsv will realize ZB phenomenological (and otherwise) structure of Rsv. To Rsv modality, D systems are arbitrary portions of reality over which the user can so construct a composite reality to be transformed through means of Rsv. To Rp modality, D systems are not arbitrary portions of reality, however, but are specialized portions of reality so constrained to embody forms of reality useful to the enablement of Rsv modality. D systems then have representational structure in Rp modality as well as in the terminal phenomenologies of a ZB of Rsv; and in Rp modality as part of the real platform of Rsv. The D systems of Rp modality are put in place under Ri modality by the hand of the enabler.

Figure 40:
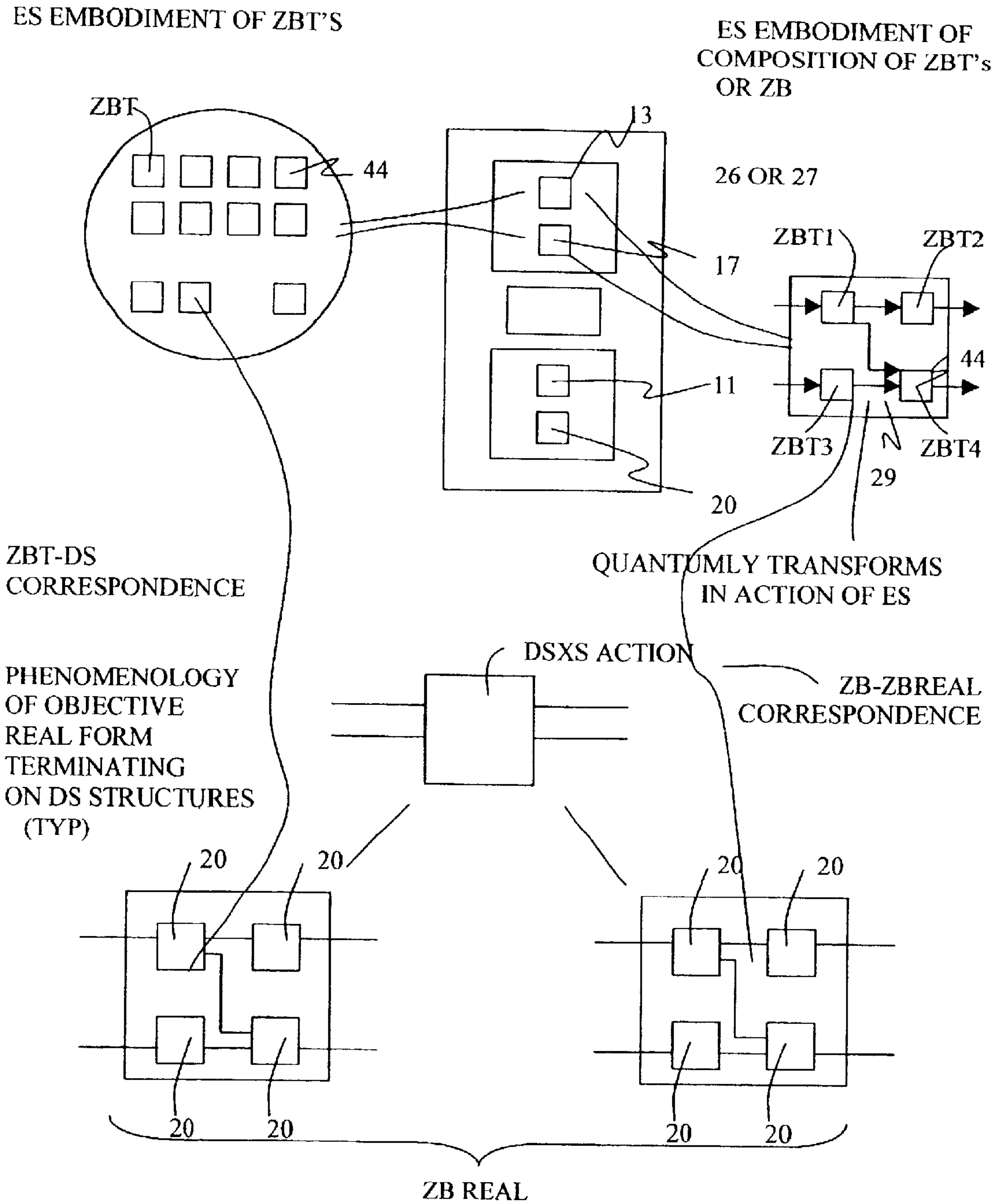
FIG. 40 shows the non-real form of DS: ZBT or terminal ZB structure.

In the use of Rp and Rsv modules, for example, a plurality of D systems is represented in HI (and embodied in TS and ES) as a library of ZBT or terminal ZB structures or phenomenologies (44) as shown in FIG. 40. The user of Rp and Rsv modality representationally assembles a composite phenomenology of such ZB terminal forms, ZBT's, which thereby represents the transformation of the universe or reality in accordance with the intended composition. In such a representation in Rp and Rsv modality, the D system is unaffected by the non-real activity of Rg, since ZB and ZBT and all representations of Rg real form exist in and pertain to HI structure. Moreover, the D system becomes involved in the process of Rp or Rsv modality when it is desired by the user or Rg to actually realize such represented form as ZB in HI, in which case RS of Rg begins transforming the D systems through CTS and DSXS in accordance with ZB structure and by other means and apparatus of forthcoming discussions on the RS.

Broadly, however, the concept of the D system involves, in the perception of the Rp or Rsv user, the permanent existence of a certain collection of real phenomenologies-D systems—which by means of RS are realizations of ZB as ZBreal, dependent on ZB realizable structure of RS embodied in HI (ES).

Since the D system is an embodiment of a portion of reality, the form of the D system is greatly influenced in phenomenological structure by its enabling media. Although later discussion addresses enabling media specifically, let us consider here some enabling media of D systems to gain more insight into the nature of the inertially real quantumly-realized form of the universe.

Regardless of whatever the phenomenological objects of the transformation of inertial reality are observed to be, the D system is that objective reality. In terms of conventional enabling media, then, a D system is an atom, a chemical reaction; a shock absorber, a chain sprocket, an engine, a rocket; an electron, a current, a capacitor, a digital circuit, a machine; DNA, or genes or whatever other form of one's existence is considered real or realizable as quantum transformations of the universe (observer). In other words, a D, in this view, is the enabling media translated to the U. G. The two existential perspectives of a D system should be noted, however. A D system, relative to the non-real form of HI, is whatever form is known by or in correspondence with the forms of the HI. Relative to the enabler of an Rsv module, however, the enabling medium used for DS construction is what is translated to the DS structure known by the Rsv user. Any D system, therefore, is viewed in two different ways—one which pertains to the enablement of the D system and another that corresponds to ZBT of HI.

If the nature of conventional language expression is considered (mathematical, linguistic and scientific expression), in terms of defining the reality of enabling media, we can further note that all such expressions of reality are in the midst of transforming in the existence of the observer. One phenomenology always transforms with another, as described in the theory of the invention. A mechanical vibration or the phenomenology of a spring always requires a displacement, from which the behavior of the spring is defined in differential or calculable form. Thus, while the study of reality has tended in convention to abide by objects or objective forms that fundamentally are objects (in opposition to the theory of the invention), it should be recognized that in ultimate reality such forms are transformations of the universe or compositions of epistemic instance. D systems, then, are modal compositions of epistemic instances themselves.

Thus, when we translate enabling media into the phenomenology of a D system it should be recognized that in the D system a phenomenology of transformations, often of great modal complexity, itself transforms with others under epistemic action and that such compositional transformations of the D systems are themselves quantumly transformed by constraint of the knowable ZB of HI in the action of DSXS on DS compositions of real form. Thus, regardless of how complex such a knowable reality as a system, world or institution may be compositionally, it (the D system) can exist in the universe only as quantum transformations of form. Thus, D systems are any real transformations of the universe, or are any piece or portion of reality so defined for the purposes of Ri, Rp and Rsv modality of Rg regardless of how complex they are compositionally.

In general there are boundless numbers of D systems, each of which may itself be infinitely complex compositionally (e.g., may constitute the NASA, in transformation), in each of the Rsv and Rp modules. Formed as ZBT in the non-real medium of Rp and Rsv, the composition of form of the D system is represented in the HI in a library of such compositions. Since the Rp enables the Rsv, both ZBT and DS of Rsv are enabled in Rp. The user of Rsv modality, however, employs the ZBT structures in developing realizable realities of the RS, which, in DSXS structure, are quantum realizations of even greater complexities of transformations of DS structure themselves constituting the transforming real form of the Rsv. The DS of the Rp in quantum transformation through its DSXS is the real Rsv module. Since the ZBT, and in general ZB forms of Rp, along with DS of Rp, are enabled in Ri structure at the hand of enabler, the possibilities of the modal realities embodied in the various (Rp and Rsv) modules are unbounded. The DS structures follow immediately from the four C's of phenomenological form of the theory of the invention, which themselves are unbounded in their universal representations of knowable and perceivable forms. The D systems are thus the portions of the U. M. that are declared real and are knowable and perceivable universally in the U. G. translation of any languages describing form conventionally.

DETAILED DESCRIPTION OF THE CONTROLLER SYSTEM

The quantum moments of ZBreal are realized in the RS by the action of the controller system, or CTS. Embodied in the controller or CTS of RS, the DSXS couples, or phenomenologically transforms, arbitrary assemblages (compositions) of D systems with any others, on a modal basis.

As pointed out in the theory of the invention, any reality is a composition of quantum realities in transformation. For example, while one may think that the reality of an automobile, while so observed in the transformation of the medium of light, is a real form embodying all of the knowable forms of control theory, stress analysis, combustion and so on, it does not embody these forms at once in ultimate reality. An automobile only is in a (single) quantum transformation of all such forms when it exists in ultimate reality. Such a condition is defined in and of a quantum moment or epistemic instance, which itself may be phenomenologically characterized in the structure of D systems transforming with D systems, as shown in FIGS. 39 and 40. When one defines in conventional (e.g., system theoretic) terms a system, for example, such a thing does not exist in ultimate reality. When one defines that system A outputs to system B and then to C and so on, or in complex parallel configurations, this does not mean that (ultimate) reality embodies such forms, except epistemically in the mind and perception, or existence, of the observer. Conventional systems theory then is more of an objective prediction of the future (a composition of transformations) than a reflection of what is embodied in ultimate reality.

The DSXS, then, embodies the transformational forms of the objects of reality, or D systems, and so engages the quantum moments or transformations of the enabled universe. A D system is a condition or composition of the universe phenomenologically structured in transformation by the DSXS with other such D systems (pluralities of D systems). Since reality can only occur quantumly, the moments of RS, by way of DSXS, correspond with such representations of reality in TS and SS of HI and of the user. The quantum reality of the user's thoughts transform in correspondence with the user's extended reality or ZBreal. What is held in existence in the DSXS transformation of DS structure is exactly the extended reality of the user, or the Rg real form proper.

For example, in the conventional art, the engineer knows control theory, stress analysis, dynamics and so on, and transforms material forms, by hand realization or some conventional automation, in accordance with such knowledge in the design and manufacture of a product. The real product, say an automobile, is said to embody the design, or the knowledge of the engineer, of an automobile. In ultimate reality, however, it does not. Rather, it embodies the transformation of light (typically) in the form of spatiotemporal transformations of perceptions of the observer of it. Another way of looking at this is that a real automobile actually is in some condition of inertial reality generally known and perceived by the engineer as transformations of the universe characterized by the U. G. If the conventional notion of a simulation of a real object were tied together (by CS) with the real form simulated, the reality known (corresponding to ES) in the simulation would be a DSXS transformation of form, or ZBreal. If such real form corresponds to a stress tensor, then the real form may be a structural object. If it corresponds to a bode plot of control theory, possibly a machine. And if it corresponds to the electromagnetic transformations of light and perhaps mechanical vibrations and so on of a real perception of a real automobile, then the object may be an automobile. In all of these cases, however, the object, say the automobile, is not a thing. Rather it is a transformation of the universe (ultimately real) and it is the correspondence of form (real and non-real) that exists in reality. In connection with the structure of DSXS, ZB of HI is realized quantumly in RS by DSXS. On the basis of a modal composition of ZB, it should be recognized that in any given quantum transformation of ZB, unless ZB constitutes only a single quantum transformation of form, all of ZB is not realized by RS in one transformational moment, since ZB is a compositional form.

Thus, the RS places into existence ZBreal by transforming a $ZBT^1$ (in the form of DS) with another $ZBT^2$, or pluralities of such forms, in accordance with ZB U. G. structure. The mechanism of DSXS (H-determination of phenomenological correspondence, on demand) is provided such that it transforms ZBTreal structures in accordance with the modal compositional constructions of reality of ZBreal in correspondence with the knowable structure of ZB (which of course by way of CS may correspond to ZA in HI).

Figure 41A:
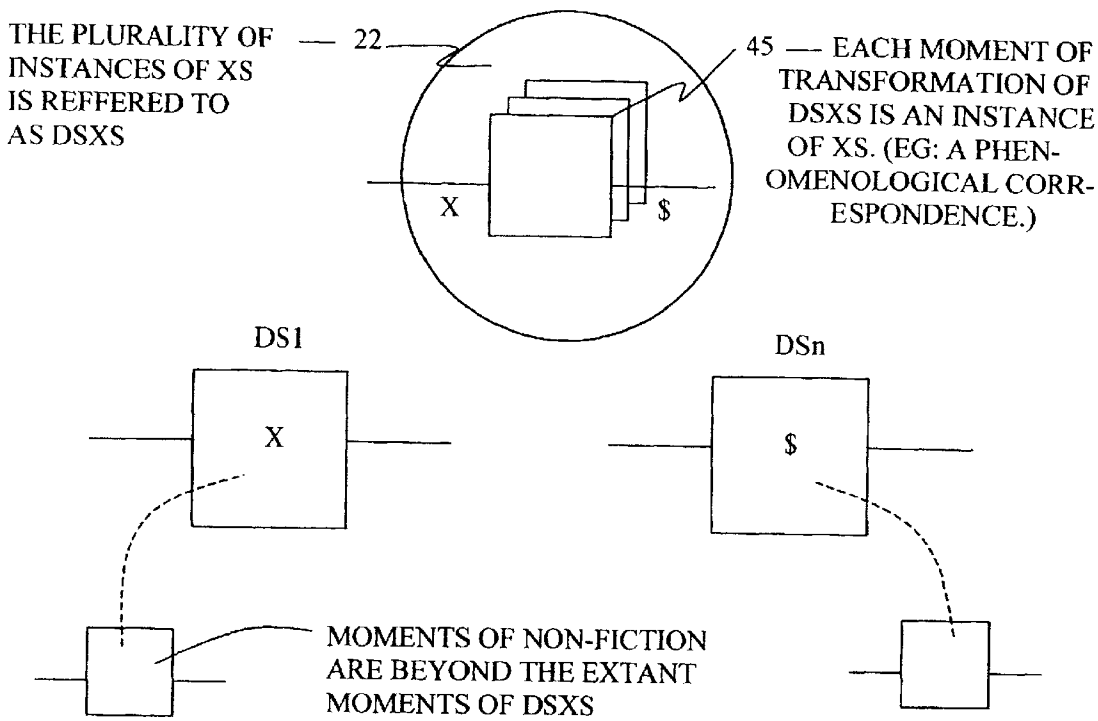
FIG. 41*a* illustrates the transformation of DS structure by DSXS.
Figure 41B:
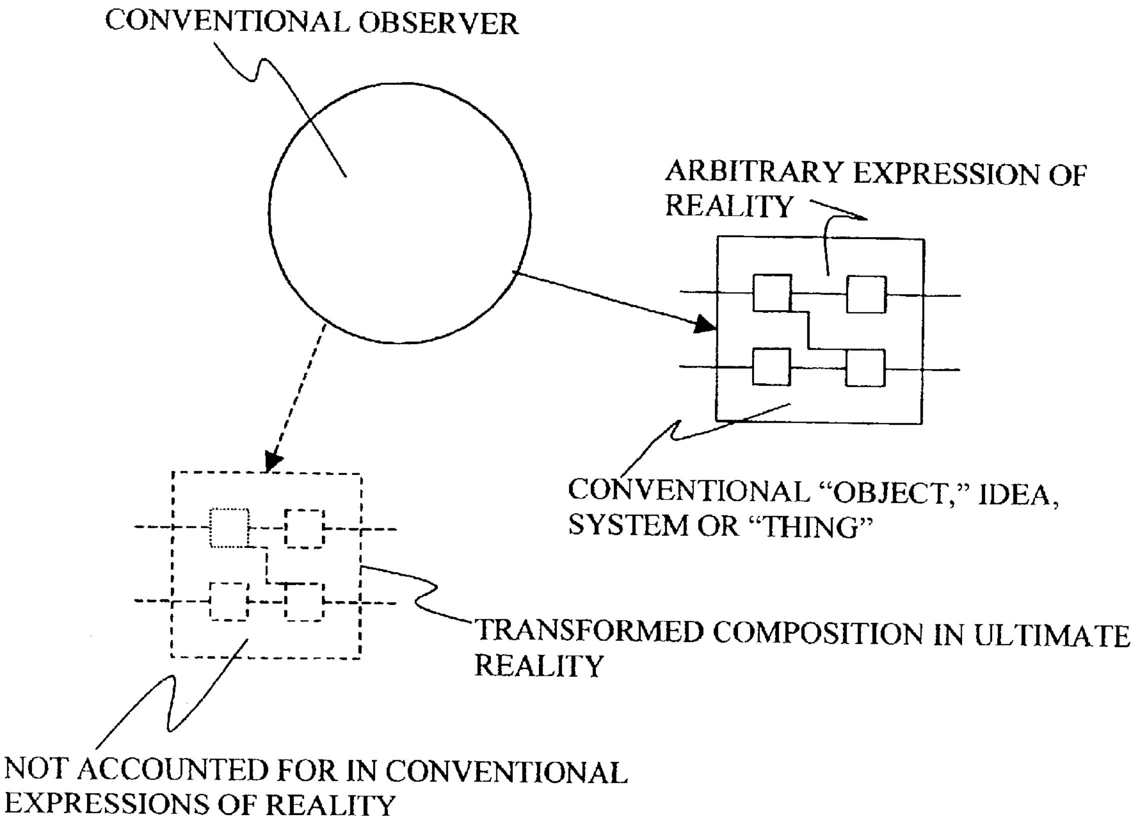
FIG. 41*b* illustrates the conventional view of real form.

Thus, while the DS is an important structure in terms of embodying in real form the portion of reality that is fixed in phenomenological composition, the realizational power of Rg is demonstrated in regard to the transformation of DS forms with each other and with other forms outside of or extrinsic to Rg. Hence, the D system transformation system or DSXS, in action on DS structure, embodies a controlled reality as shown in FIGS. 41*a* and 41*b*. This DSXS interacts also on a causal basis with other systems of the RS. The DSXS, then, provides for the connectedness, so quantumly realized, among pluralities of D systems, in accordance with the modal realization of ZB as ZBreal.

In further explaining the phenomenology of DSXS, let us consider how any composition, modal or otherwise, is transformed. Referring to FIG. 41*b*, a composition is a plurality of phenomenological transformations itself, which transformations occur, through phenomenological correspondence, anywhere in the composition. Connectedness, or DSXS, thus embodies a correspondence between compositional structures as shown. Composition A, whether a simple noun of a causal element or a complex objective composition is transformed with or into Composition B, through the verb or action of the coupling (the correspondence—the H determination—as shown in FIG. 41*a*. Whether a single displacement of a shock absorber is connected to a single displacement of a supporting bracket (one causal element to another), or half of all the communications equipment in existence communicates to the other half (one compositional element to another), or the reality of the inertially perceivable universe transforms, a single instance of quantum connectedness accomplishes the transformation of all such instances of compositional moments (conventional form) and such instances quantumly relate to others under modalities known of ZB. The decision as to where in a universal composition in transformation with one other the connectedness should occur modally (as a realized correspondence) is an arbitrary one. Herein this is accomplished terminally by the declaration of the composition of ZBT and DS as terminal compositions. Since they themselves are structurally open ended (in compositional form) the action of DSXS can be seen simply as the connectedness of any such compositions.

Thus, the specification of DSXS regards the specification of a coupling mechanism, or phenomenological connectedness, by way of the action of phenomenological correspondence. However, as mentioned earlier concerning DSXS, we are not interested simply in coupling an arbitrary transformation; we specifically are concerned with specifying a transformation that can occur among a collection of predetermined compositions—DS structure. We are concerned with the transformations that can occur within or among a group of DS compositions in arbitrary modal complexity.

Thus, considering the figure, the DSXS embodies the capacity to transform a given, arbitrary collection of DS compositions. This means that, given a ZB structure, the DSXS accommodates transformations of ZBTreal structures in quantum composition such that the resulting real form corresponds to a realization of ZB as ZBreal.

Since the structure of connectedness among compositions of form by way of phenomenological correspondence is employed here, let us consider the phenomenology of DSXS. As shown in FIGS. 41*a* and 41*b*, the transforming of objective forms is accomplished through the epistemological definition of phenomenological correspondence. Thus, what is of concern here regarding the structure of DSXS are the types of correspondences that would so transform structures of compositional elements within a given group of elements, as shown.

Thus, the DSXS, similarly to RS itself and to ES, embodies in it a realizational capacity in the form of phenomenological correspondence. It realizes coupling structures or connectednesses among DS phenomenologies as are required in the realization of ZB. The correspondences or transformations among DS structures are further embodied, uniquely, in XS structure or in the transformation system (45) of the DSXS as shown in FIG. 41*a*.

An important distinction then should be made regarding the objective form of D system phenomenology. Since the D system constitutes an embodiment of the objective form of transformational reality, it so exists as reality. As such, reality can so transform either with other portions of reality as D systems or can so transform outside of a known reality, or with what is referred to herein as non-form. Outside of a known reality is referred to as non-form because its form, beyond extant DS structure, is unknown to the existential definition of Rg. The objective forms of a D system in transformation thus connect within Rg (via DSXS) and without or beyond it or to non-form. As a simple example giving a mental picture of such, non-form could be a user or human being of such device as is enabled or realized in RS such as the pilot of an aircraft, or the user of an enabled computer or other automated machinery as ZBreal. The DSXS thus connects the quantum moments of reality as reality occurs knowably and perceivably in the world, and so interacts with non-form or beyond knowable reality.

As a demonstration of the phenomenological transformation of real form, let us now consider some examples of the enabled structure of XS within the capacity of DSXS.

Figure 42A:
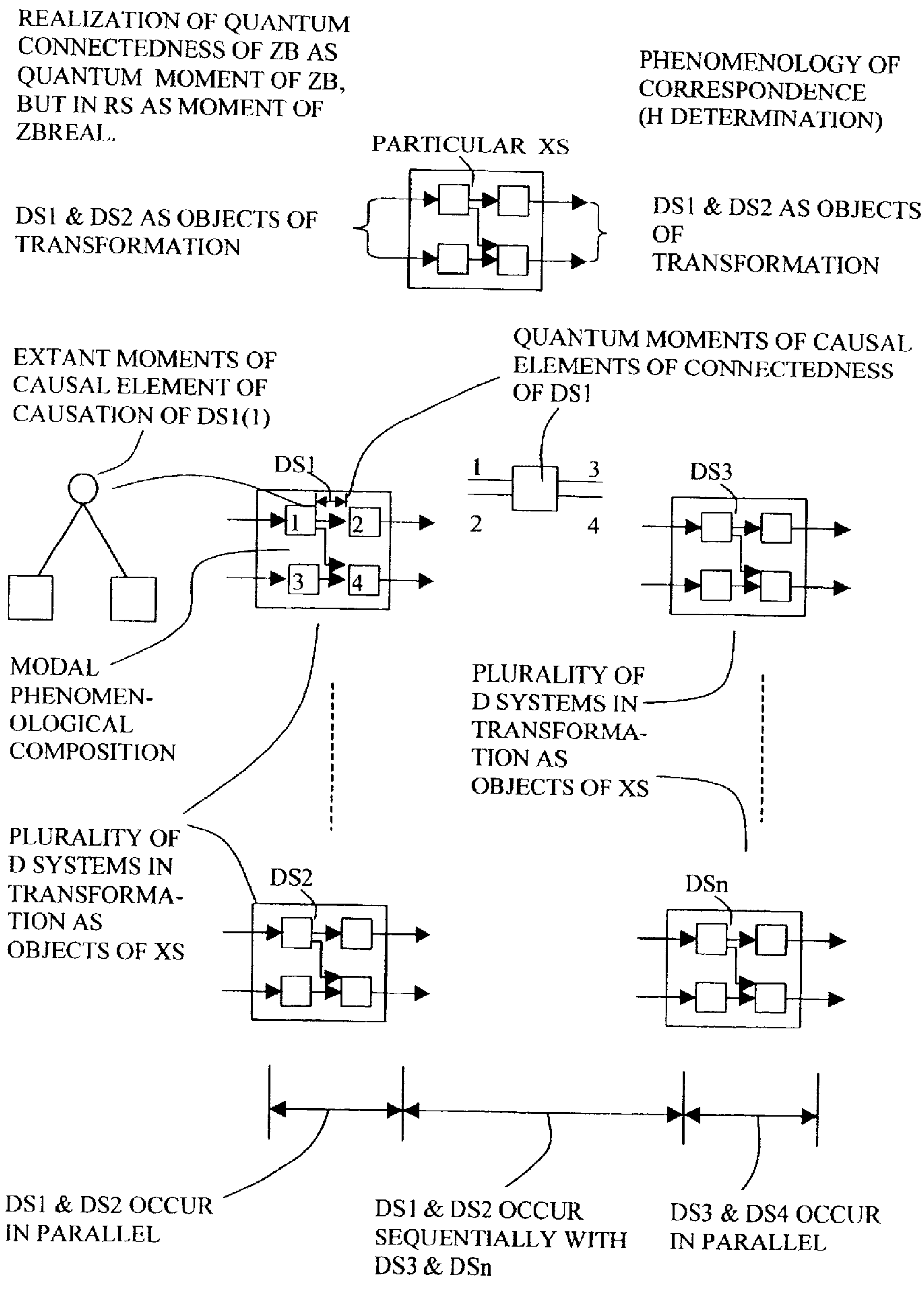
FIG. 42*a* shows the U. G. structure of XS.
Figure 42B:
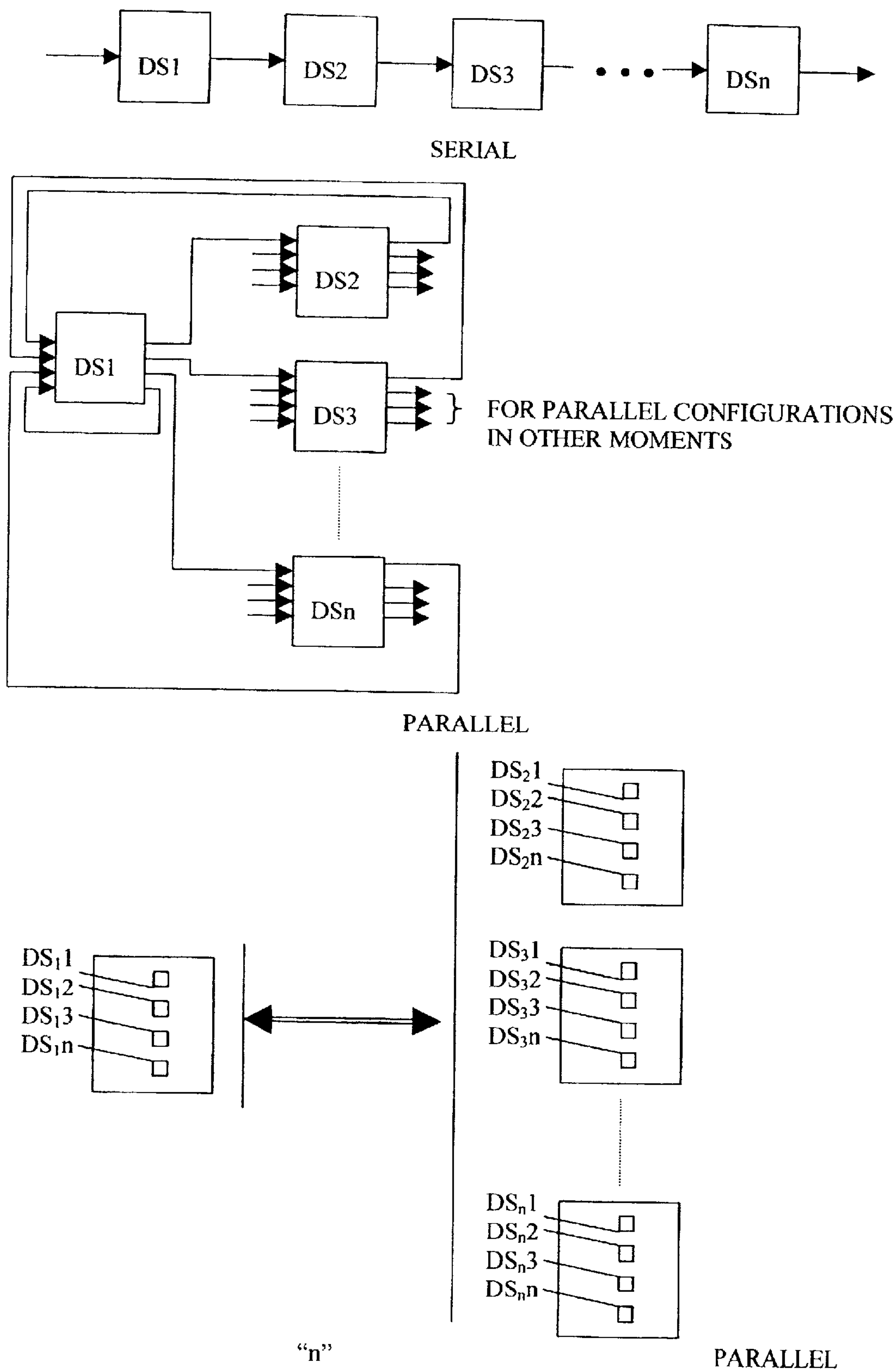
FIG. 42*b* shows Conventional System Connectivities Realized by DSXS.

Referring to FIGS. 42*a* and 42*b*, let us consider a connectedness placed over the conventional notions of seriality and parallelity, or of sequence and simultaneity (homogeneity and heterogeneity) in the context of an arbitrary group of compositional forms quantumly transformed through phenomenological correspondence. As shown, the correspondence or XS must so transform the compositions modally based on arbitrary determination of ZB in HI. In the case of a sequence of moments of compositions in transformation, XS therefore couples the compositional forms in sequential order as shown.

The serially occurring quantum events (XS), whose compositions themselves may occur in serial or parallel, are sequentially-realized embodiments of DSXS onto DS compositions. The connectednesses of serial events of ZB, then, are realized as quantum moments of XS over DS structure by DSXS. The structure of DS, though, can embody infinities of both serially and parallel occurring moments of the universe. Such compositions of the universe are transformed via the embodied correspondence of XS with other such compositions as shown. In the case of parallel connectedness of a convention composition, each composition of DS is capable of coupling to any or all other compositions, itself included, and so is any other capable of doing the same, in one occurrence or quantum moment of XS transformation. The XS then embodies correspondences on the respective compositions. In such a case of parallelity, moreover, it should be noted that in a maximal configuration of massive parallelity moments, DS structures would have to be used redundantly in each global DS in order to accommodate the simultaneity of the events of such connectedness. It further should be noted that phenomenological correspondence occurs regardless of the complexity of composition transformed. For example, even in the case of sequentially realized XS, one trillion (to pick a number) subsystems of DS compositions could be transforming in their respective compositions, and XS would accommodate the transformation of each and every one in the nature of the connectedness (correspondence) of those structures and the ones transforming with them.

As discussed in the theory of the invention, a phenomenological correspondence takes place among transformations themselves. The objective forms of correspondence are transformed in the correspondence, or coupling, of D systems. The advantage of the phenomenological correspondence of the present theory over conventional approaches, for instance, is that correspondence allows for the embodiment of knowing how compositions transform, and not just that they transform. Thus, an arbitrary correspondence (metaphoric, ironic, analogous, homomorphic, isomorphic, etc.) as embodied in XS embodies the action of DSXS on DS structure.

Let us consider briefly an example of the enablement of XS in a conventional media—namely in the medium of electronics. In such conventional media, as with many other, the notion of conveying data or signals or information is employed. In these systems, it is essential to transform, functionally, objective data (objects) and then to transmit this data to a corresponding next finctional transformation. In much of this media enabling signals are transmitted (connected) to the next transformational entities (systems), along with said transformed data. In the case of digital systems, for example, the extant transformational system outputs signals of both enabling (coupling) nature and transformational or data nature. In the medium of connectedness, then, these signals are transformed to inputs for the next unit. While all units of a given group may receive the input, only the appropriate enabled unit(s) acts on that input since only it accepts the enabling input. While there are countless versions of this structure in convention, the point to grasp here is that something brought the output of one unit to the input of another. This something is XS, or in the present case, a single realization of DSXS in the structure of XS, though described not in conventional systems theory but in the U. G., as discussed in the theory of the invention.

Though such objective inputs and outputs of convention are shown in the theory to be spurious (not real) and thus will be required to be transformational in nature herein, the correspondence of such forms of convention is shown in FIG. 42*b* to be embodied in the apparatus of XS and realizable through DSXS in causal relation to the realization of ZB as ZBreal through action of CTS.

The distinction between conventional art and the present XS can be indicated in that while XS certainly embraces conventional art, the XS transforms compositional structure, and embodies the knowledge of transformation of correspondence (H-determination). In the conventional art, for example, the XS is so severely constrained by enabling media—in fact it is defmed only relative to its enabling media—that its realization in any other form is impractical because of the absence of the phenomenology of correspondence. Said another way, a digital or analog signal is a signal; is a signal and always is a signal. It will never be anything but a signal, or object, since it is defined, non-phenomenologically, or objectively in and of its enabling media of communications theory and electronics—a conventional belief in the reality of objective form. Thus, field programmable gate arrays, for example, can be only that. They cannot be ROMS, or RAMS, or space shuttles in transformation, due to the absence of phenomenological structure allowed by DSXS.

The DSXS is a flexible means of realizing quantum moments of phenomenologies of reality. The XS is an embodiment, for example, of a conduit or wire connecting two (or more) such forms as resistors or other devices whose coupling is placed into existence in the action of DSXS. The connectedness of the compositions transformed by XS also can be coupling conduit. By way of DSXS the couplings so realized are not differentiated on basis of their functionality such as wire or conduit or electromagnetic wave, or even plumbing fixture. Rather, myriad such correspondences transforming objective compositions existentially are embodied and lumped together under a phenomenological correspondence. As demonstrated in the theory of the invention, even such forms as negligible losses of connecting medium are systems (connectednesses) themselves, and are so embodied as XS (pluralities thereof) and realized in action of DSXS.

Considering now the phenomenological structure ofXS, as shown in FIGS. 42*a* and 42*b*, the XS embodies the form of correspondence. It is capable of transforming any phenomenological composition to any other. Thus, XS transforms a composition with one other. While at this level of description it would be premature to introduce the linguistic forms of correspondence, it should be borne in mind that the design of Rg has not been accomplished simply for the purpose of embodying transformational forms of classically mathematical or scientific origin in enabling media. In the construction of androids presented later and in the theory of the invention, for example, such correspondence as is carried out by XS of DSXS is the quantum transformation of an idea—or rather the ultimate reality thereof—as it is so embodied correspondingly in non-real faculty of mind of the android (or HI). The DSXS thus provides in great plurality the means of transforming the reality of thought, in general, in the perception of reality of android or Rg.

In sum, the DSXS places into existence transformational structures (XS) which embody in them the transformational nature of correspondence between two pluralities of phenomenological form called DS structures. The phenomenological correspondences of such, be they communications systems or simple embodiments of the reality of linguistic forms coupling, say, two linguistic sentence structures through the connectednesses of therefore, thus, or and, embody in them the existential reality (D system transformation) so enabled by or in them.

Let us now consider the phenomenology of such structure in the context of D system embodiment and ZB realization in ZBreal. By definition, DS is an extant compositional phenomenology. It thus, in terms of Rp, is always existing, or providing the compositions of the moments of Rsv. In terms of Rsv, however, DS must be placed into existence in the realization of ZB of Rp. To achieve a realization of ZB, one need only couple DS structures in a manner that corresponds to ZB modal structure in HI. Thus, by varying the realization of XS by DSXS (and other components of CTS) in the form of particular XS structures (transformations or correspondences) particular configurations of DS compositions transform in the realization of ZB as ZBreal.

In summation of D system structure with regard to DSXS realization, let us consider that D systems are real constructible forms of the user's existence whose purpose it is to embody portions of reality as are required of Rp and Rsv modality of Rg. Such forms are perceivable in many cases to the user, though the user typically is defined as interacting and thus perceiving at HI, and not RS. The DS-DSXS-DS realizations are forms fabricated from the factory such that they embody meaningful portions of the real world of the user, realizable in correspondence with ZB by way of modal use of DSXS. Though DSXS configurationally is a system of the controller, and not the D system, it is so closely involved with D system structure in phenomenological correspondence that the two cannot be separated. Such elemental forms (compositions) as D systems, properly referred to in HI as ZBTreal (another notation for DS), (46), are modally coupled in accordance with ZB structure. ZB, then, however it is viewed, is a composition of redundantly used ZBT compositions.

Since we have considered now the phenomenologies of quantumly-realized portions of reality, or D systems, and their means of quantum realization in the embodied structures and capacities of DSXS, let us move upward in the structure of RS to consider the other compositional forms of the Controller System, or CTS. This will provide, as mentioned earlier, a detailed description of other Rg terminal componentry as well in terms of MRS-related structure.

Thus far in the specification of RS we have placed enabling structure on the apparatus of what might be referred to as the hand realization of ZB, since we have defined D systems and the means by which they are so flexibly transformed by XS of DSXS under a realization of ZB but have not related the action of DSXS in such realization to the apparatus of Rg such as HI and the RS version of the embodiment of ZB, which so coordinates in such realization with CS. One might say that given a ZB on paper one could realize such a phenomenology in DSXS structure by manually placing causality on the DSXS. We now turn our attention to an aspect of RS which serves to cause the realizations of DSXS, or to the Realization Control System, or RCS (24). Of necessity, moreover, a further system of CTS must be described, referred to as the Controller Embodiment System, or CES (23) whose purpose it is to embody the realizable connectedness of ZB structure, which is required to translate the embodied U. G. structure of ZB in ES of SS to the realizable structure of ZBreal in DSXS form. The CES thus embodies the modal structure of connectedness of DSXS realization in correspondence with the modal structure of ZB as embodied in ES. The RCS controls such activity in obeisance to the causal structures of CS.

Figure 43:
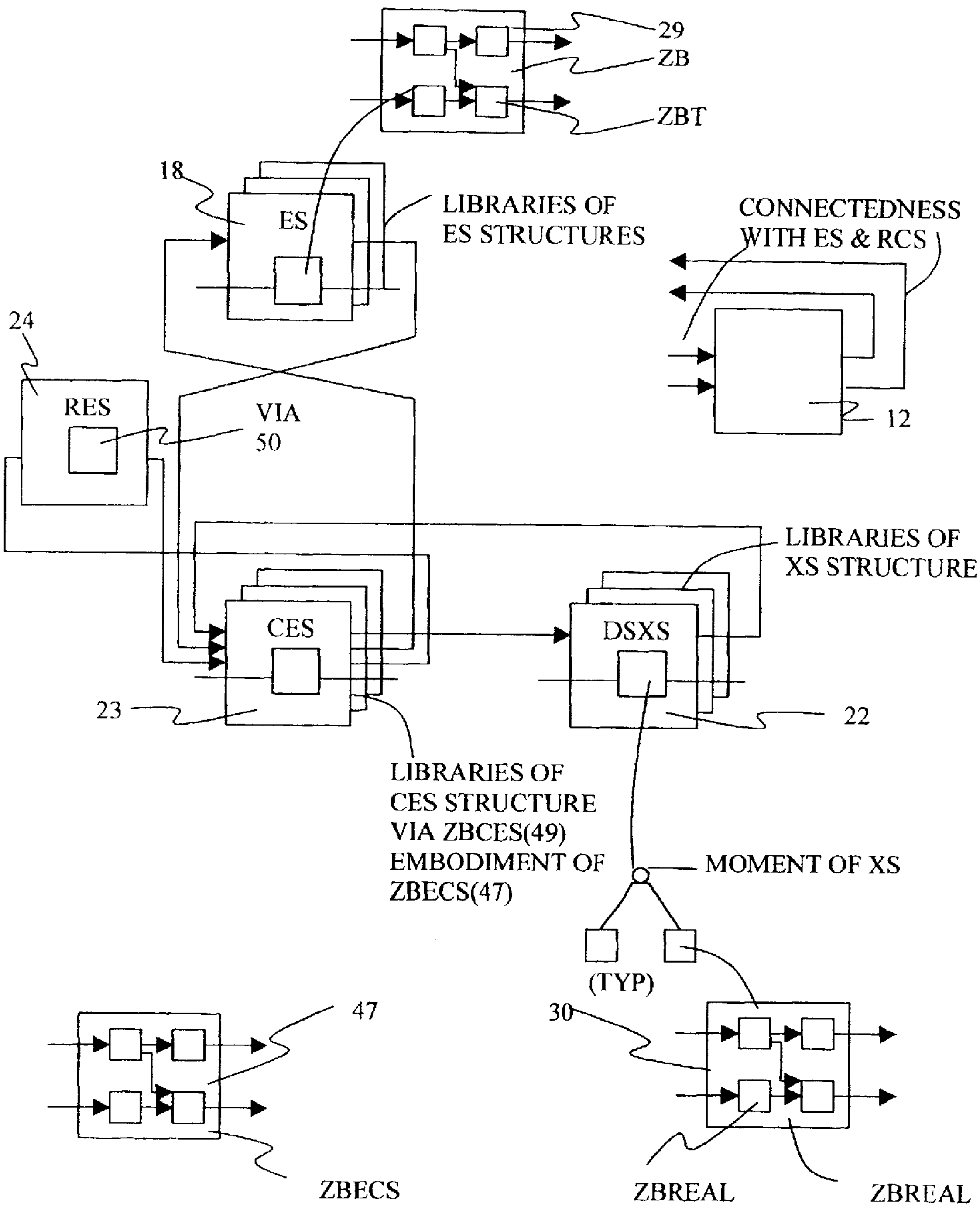
FIG. 43 is an overview of RCS and CES phenomenology of CTS.

As shown in FIG. 43, the modally-realized connectednesses of ZB are all that are required for DSXS performance. Since the D systems already exist, the realization of ZB constitutes a controlled realization of XS structure of DSXS. The CES serves as the U. G. linkage between ZB embodiment in ES of HI and ZBreal realization in RS. The CES, under direction of RCS, provides the causal structures required to engage the DSXS transformations in realization of ZBreal. The apparatus of the RS is similar in concept to the computational notion of virtual machines (though it relies on U. G. definition of form), and embodies the causal structures of XS embodiment in DSXS in correspondence with ZB structure. (Since conventional machinery is founded not on the U. G. but on notions of programming, however, virtual machines are limited to programmed machines.) What causes DSXS to embody particular connectednesses (XS) of assemblages of DS structure is embodied and itself realized in CES in such a manner that a ZB is realized over the DS-DSXS-DS platform, which is carried at the direction of RCS as shown. Thus, CES embodies the causal structure for DSXS performance and RCS controls the CES's realization to DSXS, as shown. The RCS controls the activity of a realization of ZB in affecting the realization of CES causal structure to DSXS. It can do so, in coordination by CS, with other such modules of the same Rg or with other such Rg modules, thereby affecting realizations over a continuum of modules as shown in the figure.

Let us then consider in defining CES and RCS structure, once again, the notion of libraries, or banks, of embodying structures. As shown in FIG. 43, whether in ES, DSXS or CES, as the case may be, the structures that are embodied in these components are embodied in great plurality. While a single embodiment system, ES, itself may contain a great number of embodiments of structure, a great many embodiment systems themselves are employed in Rg construction, which, in connection with the forms they embody, as represented in TS, gives rise to the notion of libraries or banks of such structures. When reference is made to an ES, for example, it is implied that on an enabling basis of a platform mode great pluralities of ES are so employed, as shown. Thus, for any given representation of form at TS, whose symbolic forms are employed redundantly since all representations abide by U. G. (unless translated), there exists particular embodied structure in all of ES, DSXS and CES as required. The TS embodiment thus is a momentary correspondence to particular forms embodied in Rg.

In an Rsv module of Rg, for example, the libraries of embodying structures exist as shown to accommodate the vast arrays of ZB connectednesses in CES. For the moment, the point to be considered is that pluralities of embodiments exist in ES, DSXS and CES structures and are referred to as libraries or banks of embodied structures.

Let us consider the nature of the connectedness structures of CES which are realized to DSXS by RCS in realization of ZB as ZBreal. As shown, the represented structure of ZB in TS is a momentary transformation corresponding to structure in ES, in CES and in ZBreal if the entire chain of correspondences is considered. The symbolic forms of TS correspond, through action of CS, with those embodied in the abovementioned structures. The forms of all such systems, moreover, are limited in embodying capacity by enabling media as will be shown later on. In TS, for example, the embodied structures are limited by the incremental shapes of communicative sense/motor medium in that only they provide for global (symbolic) shape. The acoustical wave forms of speech, for example, are restructured to such incremental forms as the transformations embodied in sound waves. Word forms such as syllables and constructions of wave forms into others in the forms of words are limited by the enabling media (the wave forms) so originally crafted in such media as the vocabulary of incremental forms. The embodying forms of ES, and the XS structures as well, are limited by their enabling forms—such as, for example, atomic or molecular actions by way of, say, coupled wave equations. The point made here is that, however enabled in such enabling medium, the embodied or engaged forms of TS, ES, and those of CES and DSXS so correspond in the governing action of CS, and in realizational capacity of each respectively. In regard to CES, the form of modal connectedness of ZB is embodied in CES in order that its structure, embodied in CES in reserve for realization in DSXS structure, can be employed at the guidance of RCS in causing corresponding structure to occur in XS structure in quantum realization of ZB when such is required of local Rg or of Rg continuum structure in realizing ZBreal.

The embodied structures of CES, whose compositional nature corresponds to the modally-realized connectedness of ZB, which structures are referred to as ZB Embodied Connectedness Structure of CES, or ZBECS (47), are made, in action of CS, to correspond to the connectednesses of both ES and DSXS embodied structure. The ZBECS is embodied as a realized form of the ZB Connectivity Embodiment System, or ZBCES (49). Following from MRS structure the ZBCES also is referred to as the ZBECS Transformations System, or ZBECS-XS, also (49). ZBECS structures thus are not ZB structures. Rather they are structures that correspond to the structure of the connectedness, under composition, of ZB. They are also structures that, in turn, correspond to XS embodiments that realize DSXS quantum structure of ZB, or ZBreal.

Figure 44:
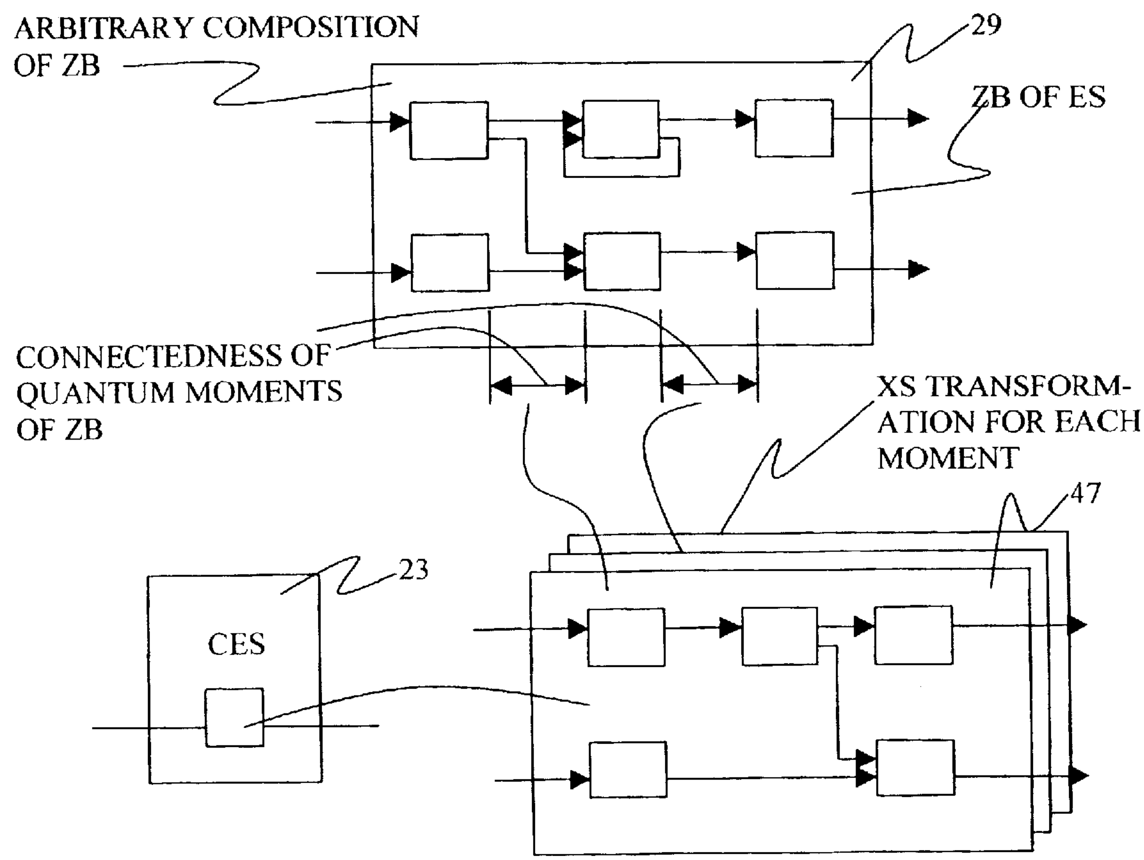
FIG. 44 illustrates the phenomenological embodiment of ZB connectedness in CES via ZBCES.

Since connectedness, under the form of composition, is a universal phenomenological form, it itself, even though it is only an aspect of ZB, is embodied in U. G. structure in CES and thus can correspond to any other U. G. form equally in the manner that ZB itself can. This is summarized in FIG. 44.

Figure 45:
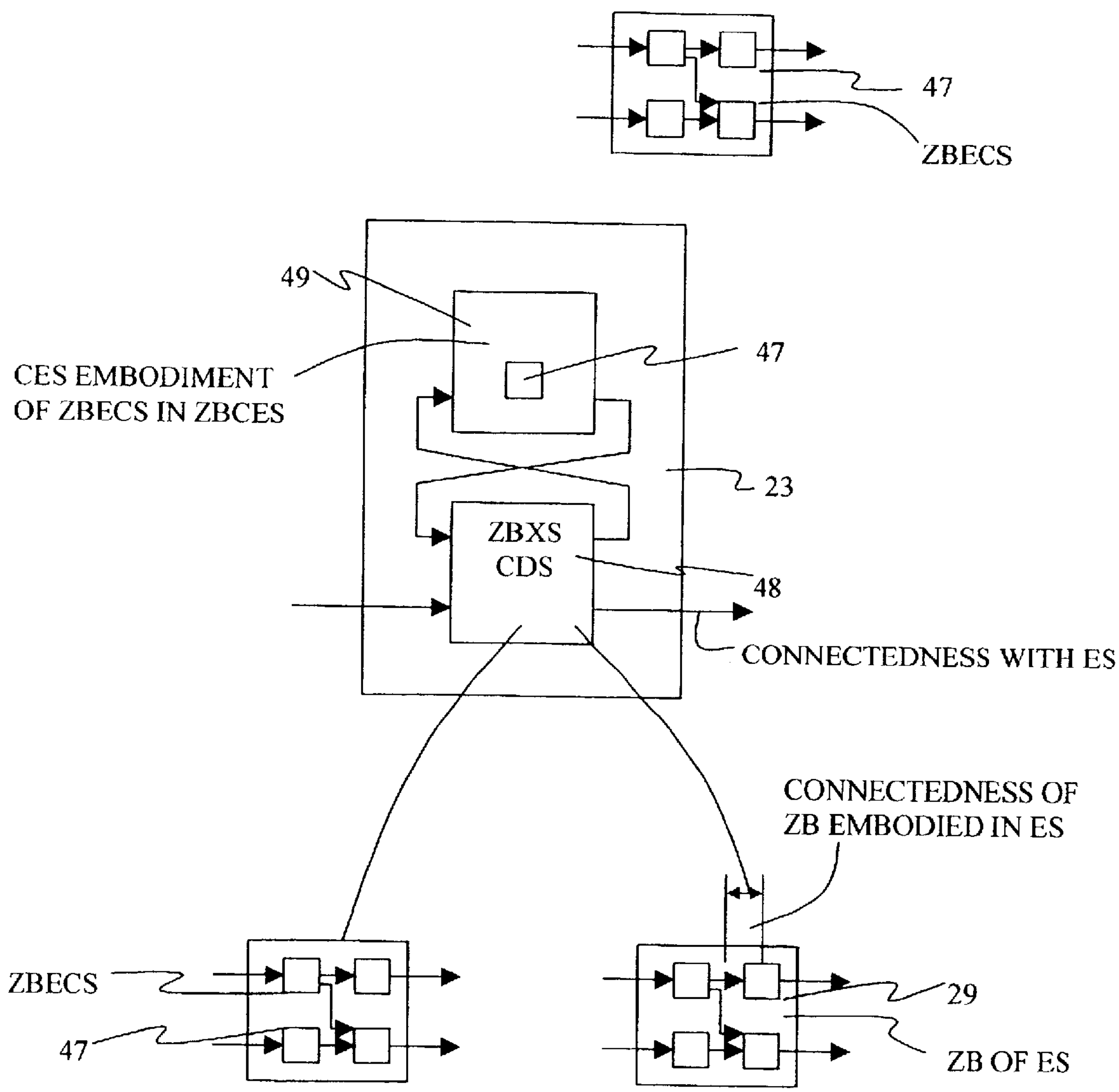
FIG. 45 shows the ZB-XS correspondence determination system: ZBXS-CDS.

As shown in FIG. 45, a ZB-XS Correspondence Determination System, or ZBXS-CDS (48), embodied in CES, is employed for the determination of correspondence between the connectivity of ZB and that of XS. Optionally, this structure, ZBXS-CDS, is incorporated into the HI since it simply is a determination of correspondence and does not immediately affect the causation of XS on DS in quantum realization of ZBreal. The RCS engages the use of ZBXS-CDS in such determination. When it is desired in the causation of HI on RS that a particular ZB be made for readiness to exist, or to be embodied in CES, the ZBXS-CDS of CES is employed by RCS to determine the form of ZBCES to be embodied in CES. The arbitrary form of ZBXS-CDS thus is the connectivity of ZB and the reference form is XS. When a ZBreal is to be placed into existence, the RCS causes the transformation of XS to occur in accordance with the ZBCES connectivity determined by the ZBXS-CDS. The utility of ZBXS-CDS can be appreciated when it is considered that the HI and RS platforms of Rp and Rsv modules may embody radically discordant structures, or the connectedness of ZB may be radically different than the infinite complex of XS forms. A system to determine (phenomenological) correspondence between ZB connectedness and XS embodiment, ZBXS-CDS determines this correspondence. In terms of the conventional art, the ZBXS-CDS maps the moments of transformation of ZB to the moments of transformation of real machinery (XS) (e.g, virtual memory mapping or intelligent compiling).

The RCS thus engages the componentry of CES and DSXS in accordance with the realizational demands of the HI, which in turn derive from communications with the user. The RCS is causally engaged by the HI (primarily by SS, though through MES, TS may also engage RCS in action of CS). The RCS thus obtains, for example, the ZB connectedness from HI that is to be translated into ZBECS structure. It also directs the action of CES in the CES's interaction with the DSXS transformations of a ZBreal.

In the action of ZBCES and RES of RCS, the RS is held in conformity, also under CS action, with the transformations of the HI. In the HI development of ZB, for example, it may be desired that such non-real form be realized. Such causal action on the TS-SS connectedness of HI then engages, through RCS, the ZBCES, which engages the DSXS. As translations occur in HI of ZB, the action of CS operates on that of RES to maintain ZBreal in correspondence with ZB, as can be seen in the general case of even the very existence of ZBreal (e.g., ZB may correspond to ZBES but not be in existence as a ZBreal, in which case it must be placed into existence by the action of RES and CES).

In general then, embodied in the RS of Rg are the capacities to realize real form of Rg in DSXS embodiments; to embody such forms of modal connectedness as are required for XS embodiment, in the nature of ZBECS of CES; to transform such form as is embodied in ES as that which corresponds ultimately to symbolic representation of TS into such forms of connectedness for realization in the nature of ZBECS of CES at DSXS; and to engage such forms as the aforementioned in coordination with CS and HI in the correspondence of real form of Rg to non-real and communicative form of Rg. The capacity of the RS is characterized as one that can embody forms that correspond by the realization of other existentially-embodied forms (ES) and to control such forms as are embodied and realized within RS. The RS is a detailed embodiment of MRS in the context of the terminal forms of the Rg.

Figure 46A:
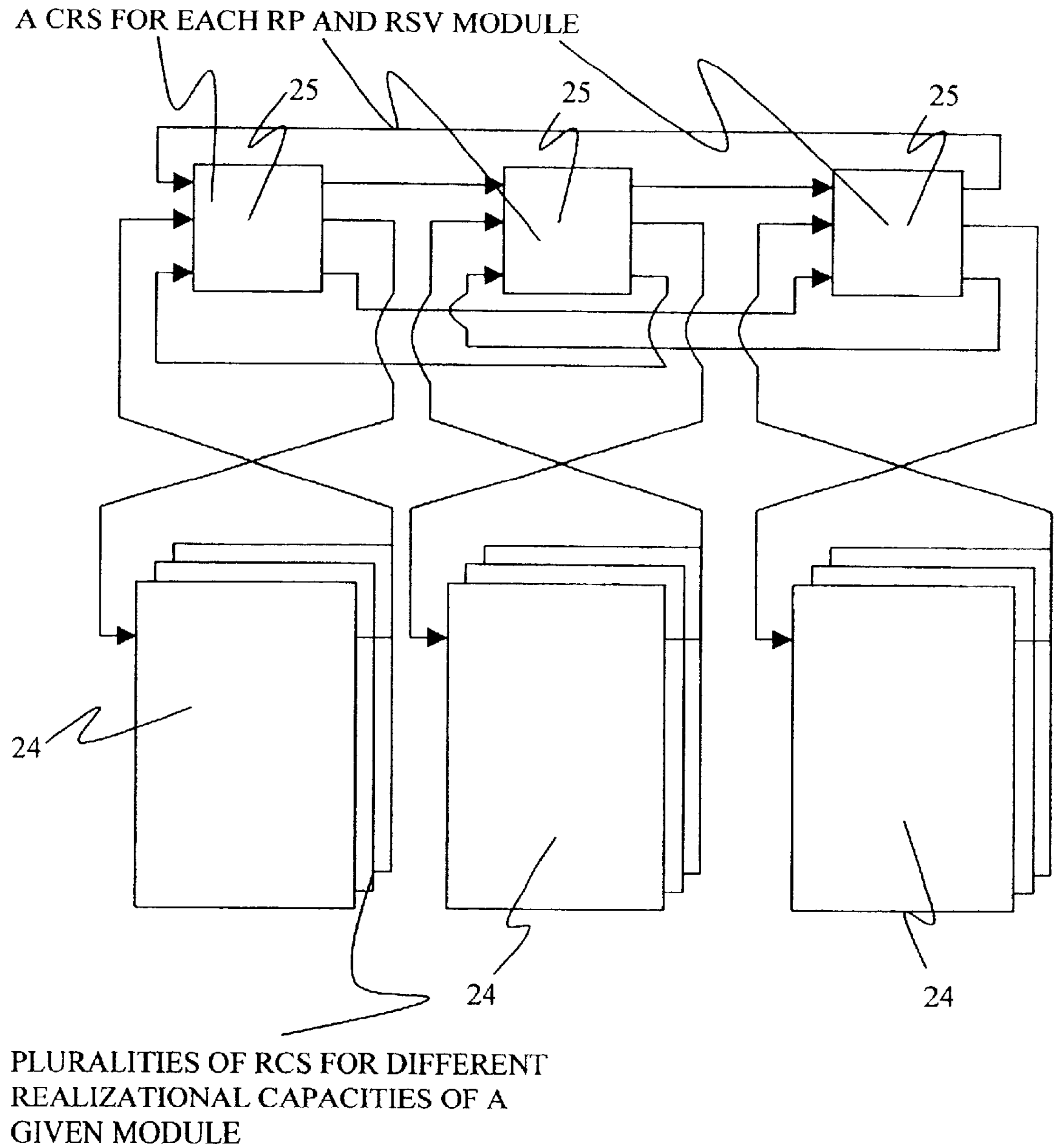
FIG. 46*a* illustrates CRCS action over RCS.
Figure 46B:
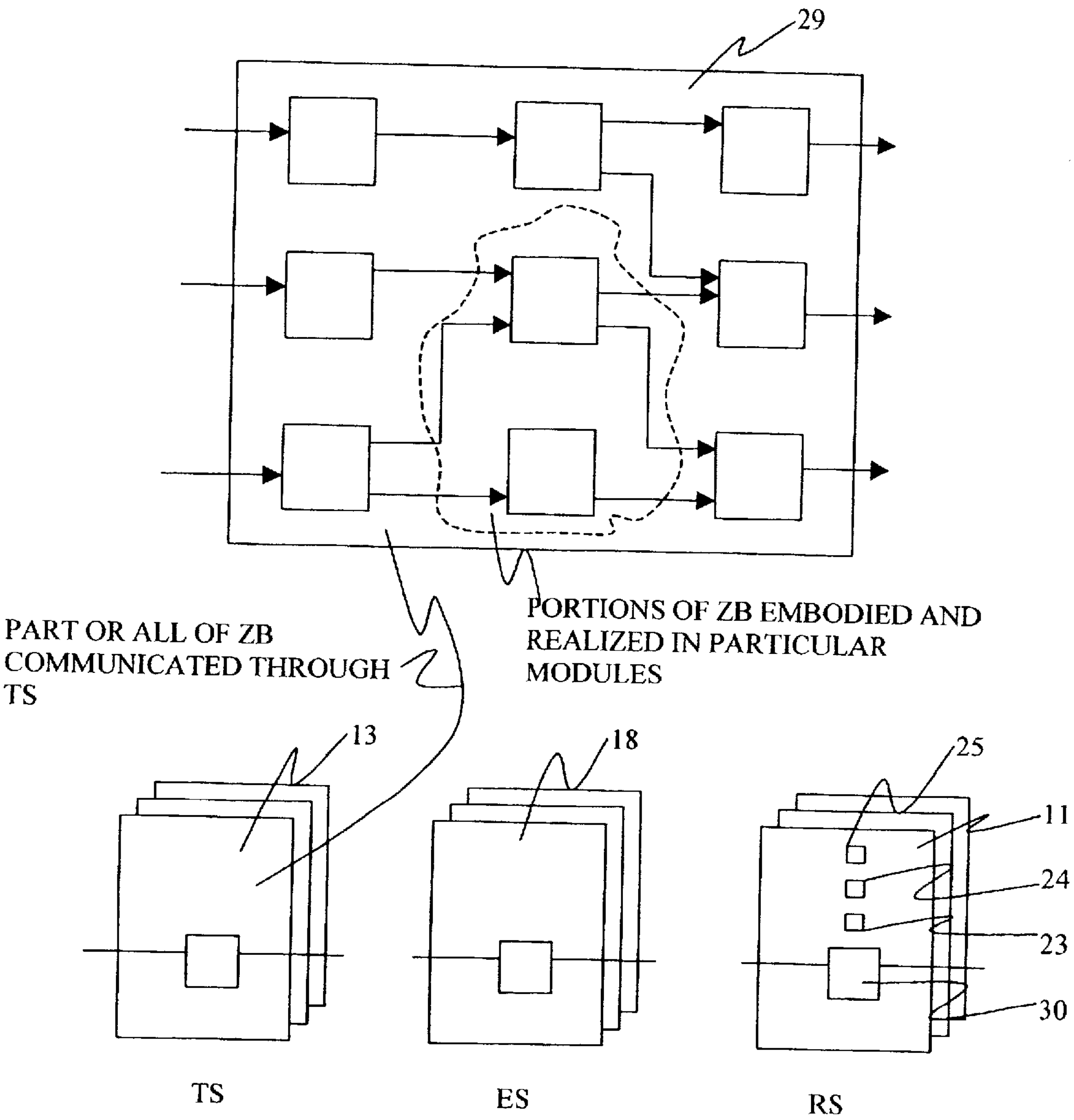
FIG. 46*b* shows the continuum embodiment and realization of ZB.

In connection with the continuum structure of RS the Continuum Realization Control System, or CRCS, couples the control of RCS of individual modules of a particular Rg and so cooperates with other Rg modules of similar capacity within a given continuum structure under Ri modality, as shown in FIGS. 46*a* and 46*b*. Thus whether functioning as an island of existential activity as a single module or as a collection of such modules integrated into a continuum, the RS, in obeisance to CS which in turn cooperates under Ri modal structure, realizes portions of the realities of the continuum, or engages the real form of the continuum, under CS (ultimately of Ri), in correspondence with the modally-engaged non-real and communicative form of the continuum.

DETAILED DESCRIPTION OF THE HUMAN INTERFACE SYSTEM

The detailed description of the Human Interface System, or HI follows from the simple notion introduced earlier regarding the non-real and communicative form of the Rg, namely, that, analogously to human experience, and in the default or existential modes of the Rg, the HI, reaching into RS or real form by way of CS, so embodies the non-real form of the Rg in cooperation with its communicative modes of existence with other beings (users). The form of the Rg, by way of CS, is set into correspondence with the non-real forms of enabler through communication. In carrying out such an existential process, the Rg thus relies on the two basic forms of the HI, the TS and the SS, to so communicate and existentially translate such forms as are embodied in it. In the present discussion let us begin the description of HI with the ES of the SS group of terminal forms and then return to their correspondence to the real form of communication, or TS structure and other forms of the Rg.

DETAILED DESCRIPTION OF THE SUPPORT SYSTEM

Since the correspondence between TS structure or real embodied communicative structure and both ES and RS structure is a bit more sophisticated than that of ES to RS only, let us work our way to TS structure by considering the nature of the embodiments of ES of SS in regard to the real or realized forms of RS.

Figure 47:
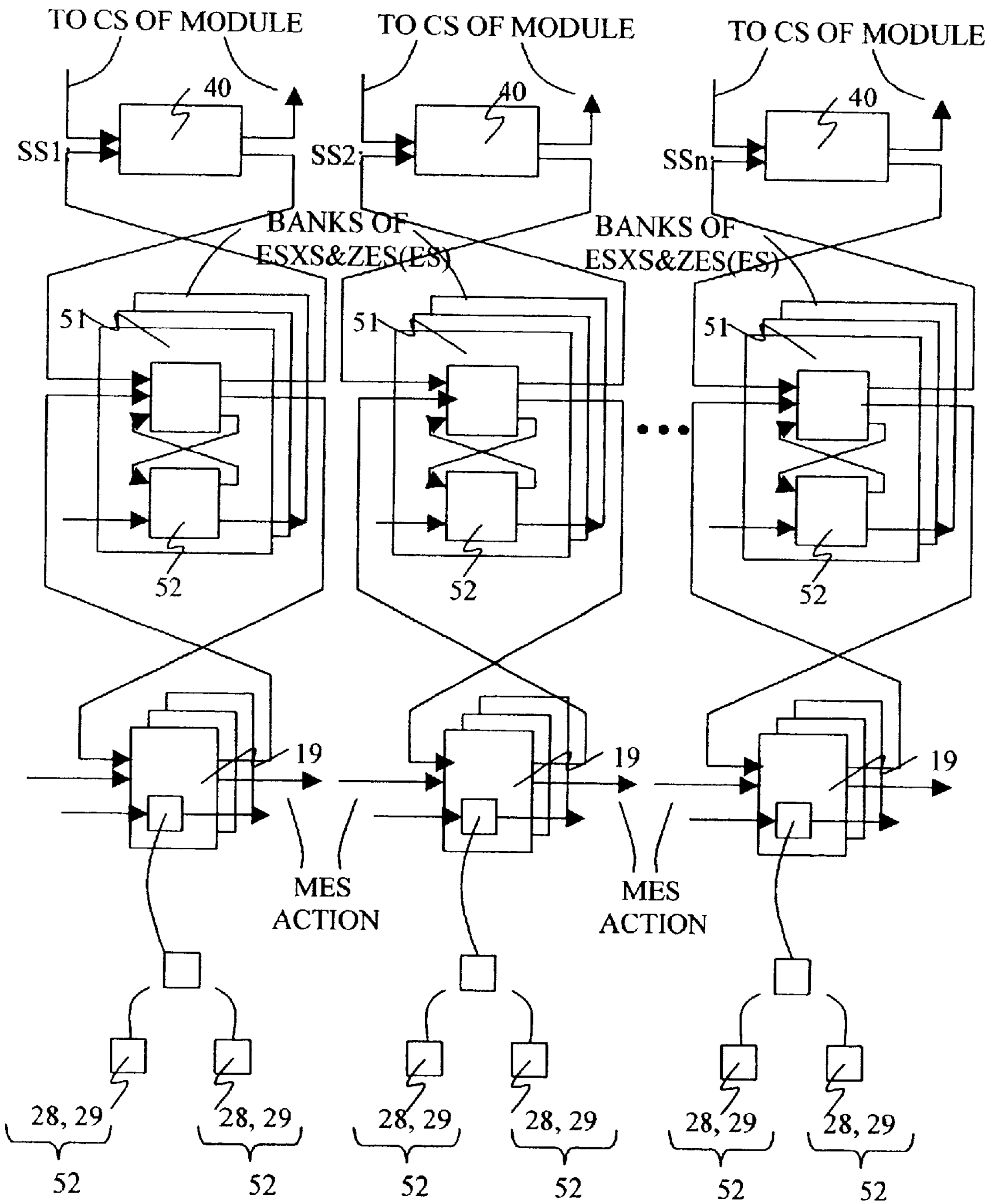
FIG. 47 illustrates the ESXS, ZES, and CDS embodiments of SS under MES and CS control.

As shown in FIG. 47, the non-real form of Rg exists as banks or libraries of ES structures that the embodied structures of other non-real forms such as CDS and faculties of mind operate on. The faculties of mind of Rg exist in the form of a CS-initiated use of CDS on structures of ES, or on ZA and ZB, which transformations by way of CS are communicated via TS also under CS control. Since the form of the Rg is an existential extension of the user, and so exists apart from the user in mind and in body, it stands to reason that translations of mind of the Rg are conducted wholly existentially separately from the user, except of course in the respect that CS is structured in the nature of the intrinsic meaning of such communication in the existential mode and CS maintains a phenomenological correspondence of the user's knowing and perceiving in the default mode, as discussed.

We consider now how such an existential process of translation is carried out in the context of S system structure under CS control.

Similarly to the DSXS operation of RS, the ES that has been referred to thus far exists in the form of an MRS, referred to as an Embodiment System Transformation System, or ESXS (51), wherein the embodied form, ZES, (52) is a result of the action of ESXS in much the same way as ZBreal is a product of the action of RS. Since they are realization modules themselves, the ESXS structures embody form, in this case, however, declared non-real. Regarding the process of translation, the CS so engages the CDS in establishing correspondences among embodied ZA structure of ZESA, (53), and ZB structure of ZESB, (54), (ZA—ZA; ZB—ZB correspondences and so on as shown). Were it not for the fact that CS maintains ZB in correspondence with ZBreal, the modeling and implementation process would be wholly non-real. In such a case, however, the very form of translation or universal existential process (of human experience) that is carried out in the Rg would be obviated since there would be no correspondence to real form. Thus, by the nature of definition on ZB, the process of CDS, under causal influence of CS, operating among ZA and ZB, the Rg so establishes correspondence between arbitrary ZA and realizable ZB forms, as discussed. As long as a correspondence is maintained by CS between ZB and ZBreal, translation is preserved.

Figure 48:
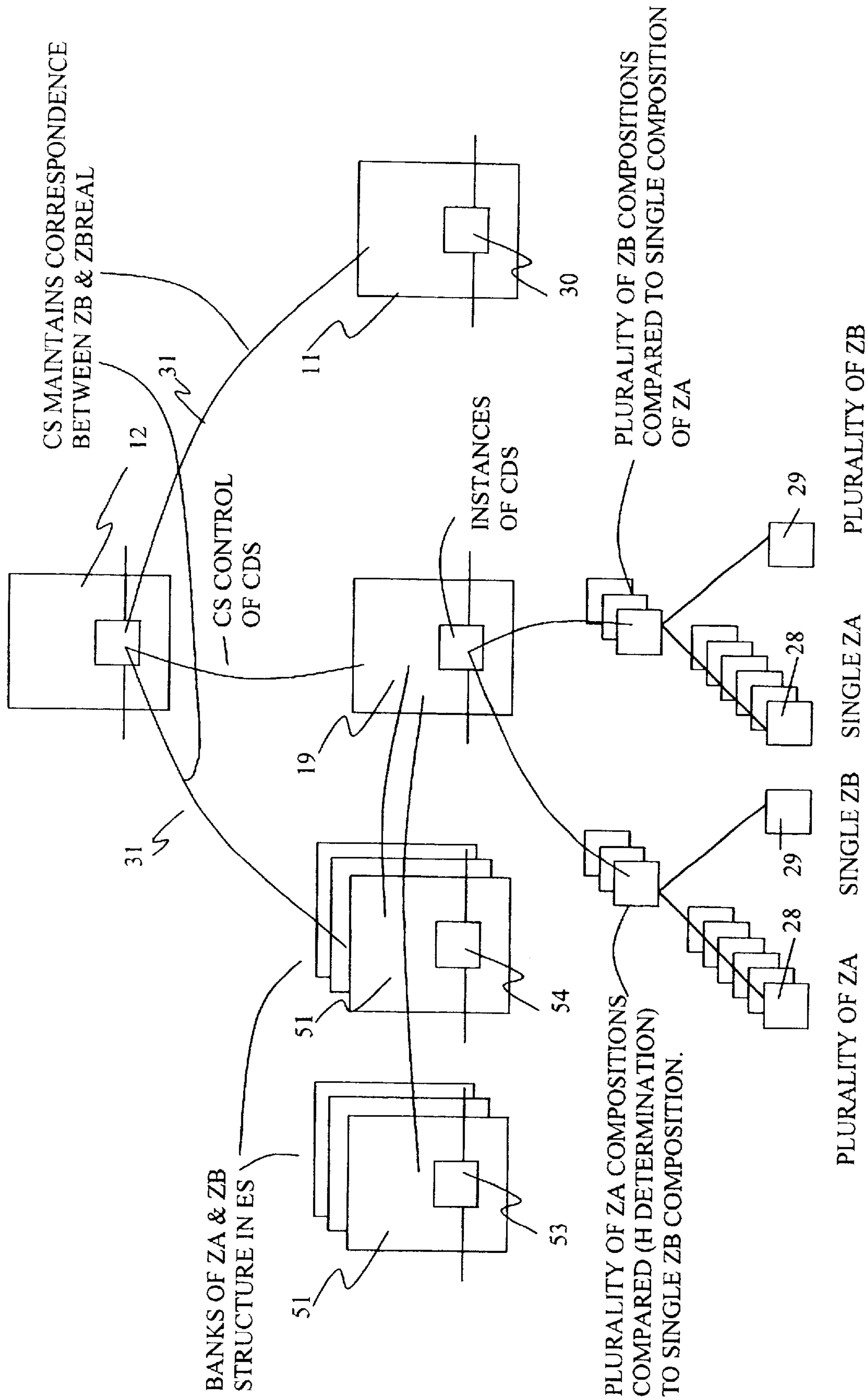
FIG. 48 illustrates the modeling and implementation process, and existential translation in SS Structure.

Referring to FIG. 48, let us first consider the case where CDS establishes correspondence of ZA, given a ZB structure, or by human analogy, where an arbitrary idea or non-real form is brought to correspond with a known (reference) form of real world, but for which no explanation exists, as in scientific experiment wherein one observes the real world and establishes a symbolism or knowledge to accord with such observation, or creates an idea to accord with reality.

Similarly to the manner in which ZB connectivity is obtained by CES of RS, the CDS obtains the defining structures of ZB and of ZA from ES. In operation of CDS, what is implied in this case is that a single ZB structure is so compared to the plurality of ZA structures or to what is known in non-real form as arbitrary, in search of a correspondence to realizable form of ZB. Thus, the CDS could in this instance be searching for ZA correspondence to a single composition of ZB by comparing such to extremely large numbers of compositions of ZA structure. The process is generic and can be repeated indefinitely.

In the case where imagined structures of ZA, whether they are crafted by the user at TS or by CS control of ES, are to be realized as ZBreal, such compositions of ZB are then compared in their great plurality to the single composition of ZA.

In general, under the activity of CS in deployment of CDS over ZA and ZB structure as embodied in ZESA and ZESB, and in connection with CS initiated realizations of ZBreal on its own or in coordination with the user of TS, the process of translation,or in default, the modeling and implementation process only, is so realized in Rg.

Figure 49A:
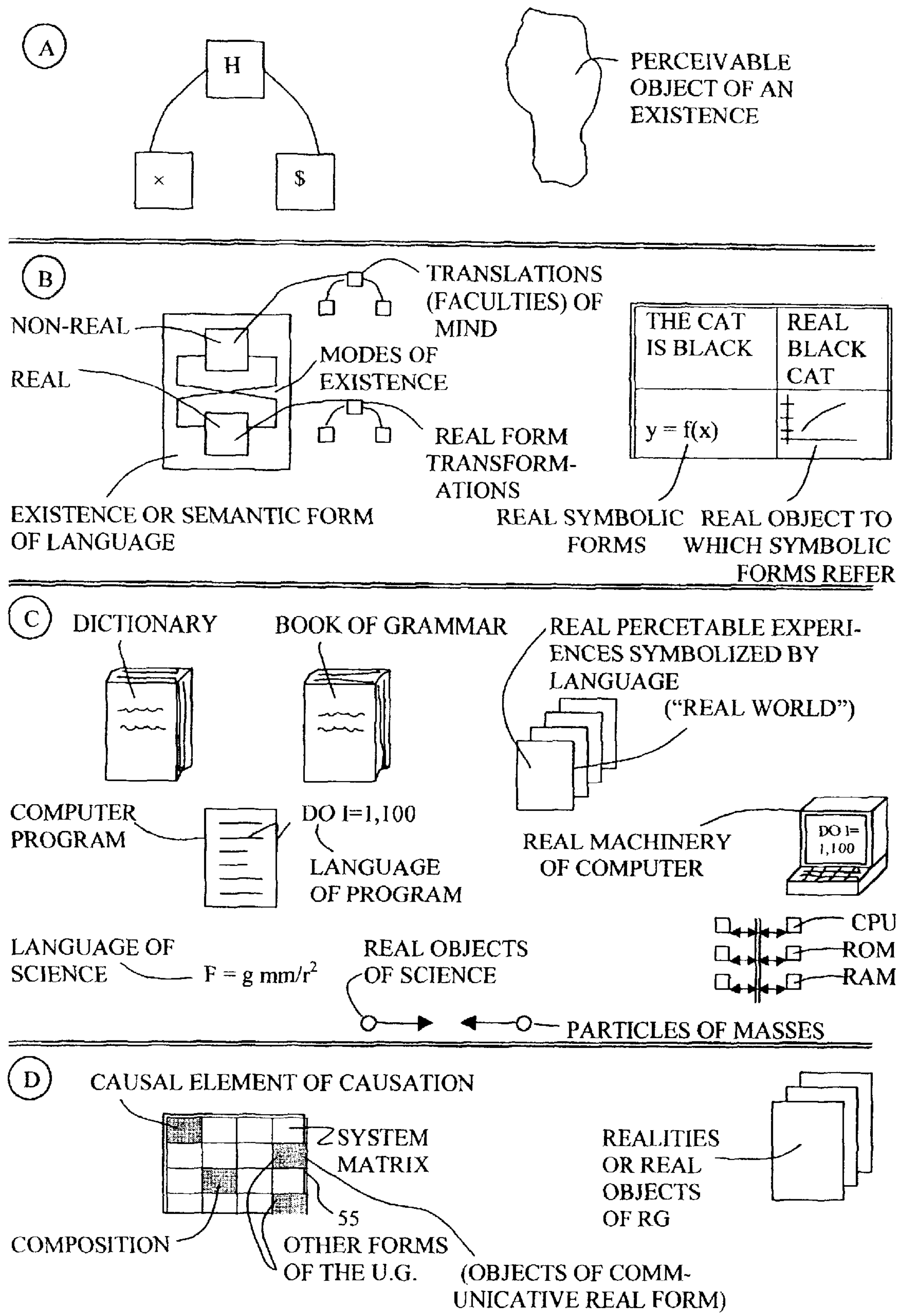
FIG. 49*a* shows a system matrix of U. G. form in comparison to other languages.
Figure 49B:
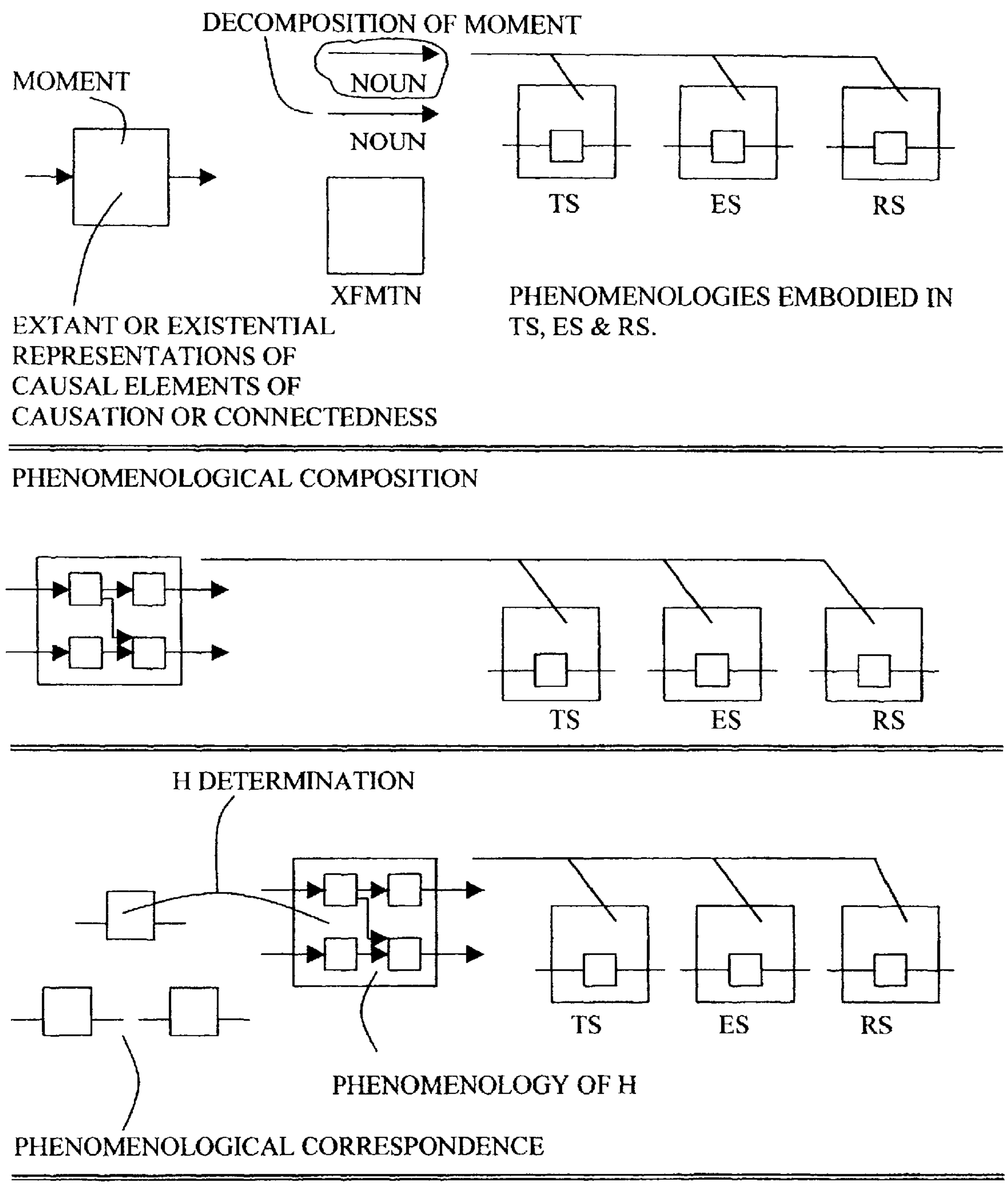
FIG. 49*b* shows the Rg phenomenologies of system matrix U. G. forms.
Figure 49C:
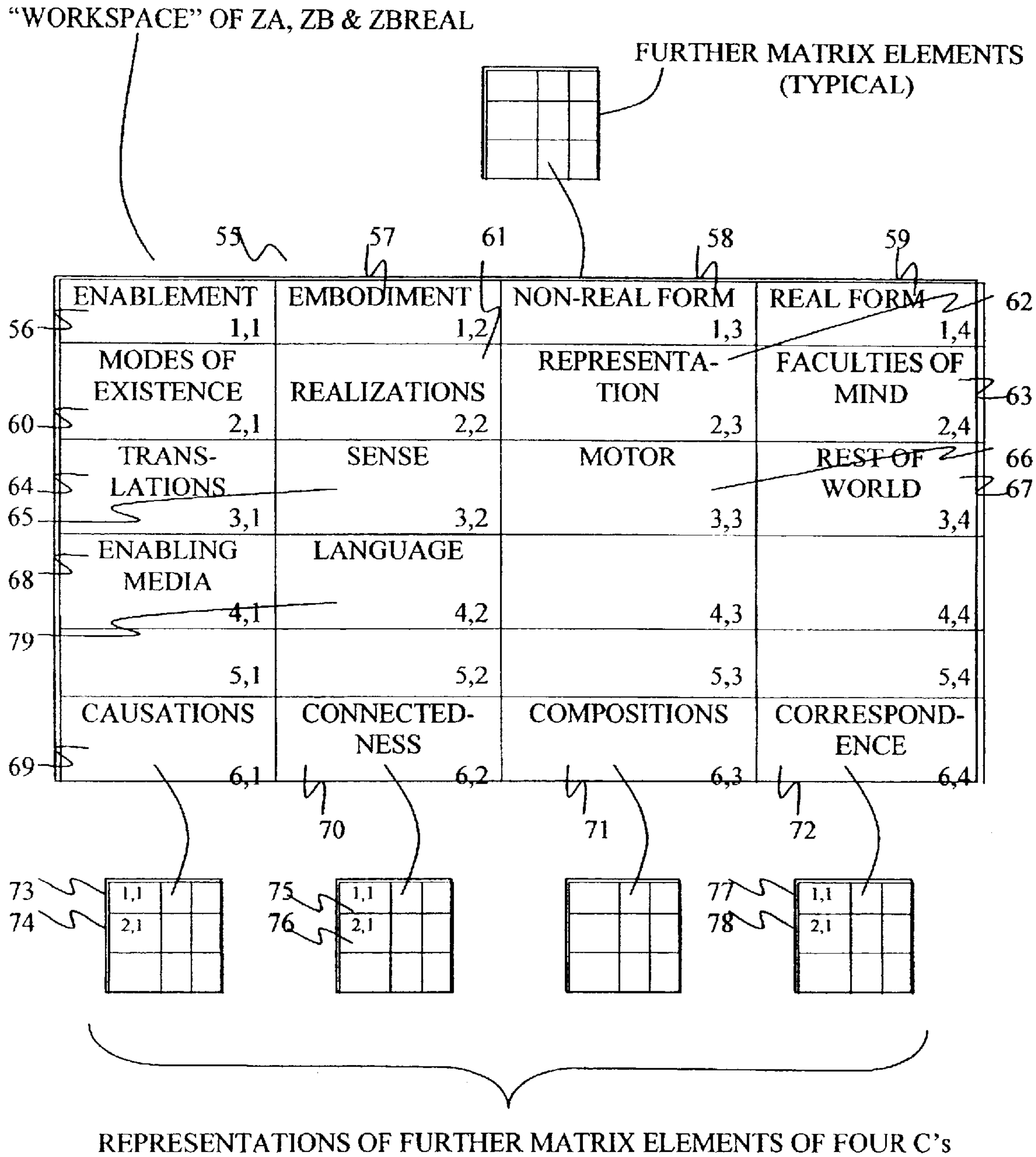
FIG. 49*c* shows the U. G. forms of the system matrix.
Figure 49D:
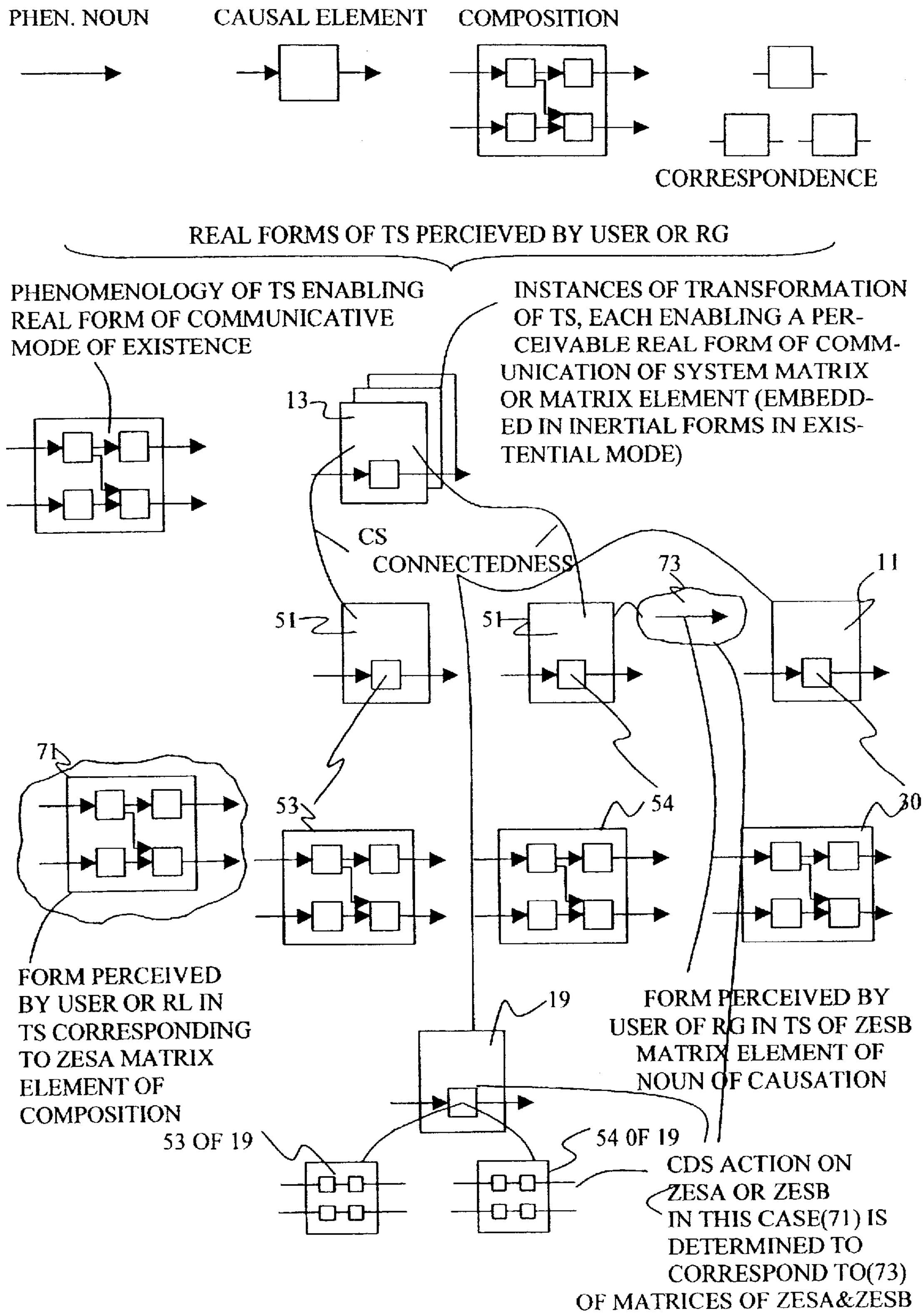
FIG. 49*d* illustrates transformations of the Rg in correspondence with perceivable U. G. forms of system matrix at TS.

In regard to the phenomenology of ES in relation to TS representational form, a simple consolidation of U. G. phenomenological and existential form has been developed to assist in the CDS operation of translation on the forms of the Rg. As shown in FIGS. 49*a* through 49*d*, it should be considered that any form, in accordance with the theory of the invention, abides by U. G. structure. What this means is that any knowable symbolic form of user origin can be so classified by U. G. structure, and that the communications of the user and Rg, while they are represented in infinities of specific languages, fundamentally concern only the handful of symbolic forms of the U. G. Contained in the modal composition of what herein is referred to as a Universal Grammar System Matrix, SM (55) the forms of U. G. structures are so embodied in ES and represented in TS as elements of a geometric and algebraic matrix of accountable U. G. form. The phenomenologies of ES as they are embodied in the real enabling media of ES and TS, are partitioned into elements of the SM composition of U. G. form. The advantage of using such a representational scheme for the embodiment of form is that the represented forms of TS, as symbolic expressions of ZA and ZB can be organized or accounted for in ES and TS structure in accordance with a simple matrix of U. G. form as shown. In the operation of CDS, such matrix forms of ES, or of ZA and ZB, are transformed by CDS in accordance with transformation of U. G. elements. The elements embodied according to the system matrix of U. G. form are shown in FIG. 49*c* as follows: enablement (56); embodiment (57); non-real form (58); real form (59); modes of existence (60); realizations (61); representations (62); faculties of mind (63); translations (64); sense (65); motor (66); rest of world (67); enabling media (68); causation (69); connectedness (70); composition (71); correspondence (72); nouns of causation (73); transformations of causation (74); nouns of connectedness (75); transformations of connectedness (76); objects of correspondence (77); H-determination of correspondence (78); and arbitrary language form (79). This system matrix, of course, can be elaborated on in limitless ways, since the four C's of phenomenological form, and more universally, epistemic instance, underlie them all.

The additional advantage that such a method of accounting of U. G. form provides is that it places the knowable phenomenologies of U. G. structure into a geometrical shape representationally in the form of composition of an arbitrary U. G. form for use in TS by the user and Rg. Thus we can speak about a single composition called a system matrix of U. G. form and obtain a mental picture of such forms corresponding to other such forms by way of their residencies in the matrix. It should be noted, however, that this is simply a geometrical and algebraic representational format of U. G. form, embraced by the universal form of phenomenological composition in terms of perceivable compositional form. The system matrix thus is one of infinitely many ways of composing the fundamental objects of U. G. form, which objects represent the four universal ways of knowing and the forms of existence as required by the user. They are universal ways of representing ZA and ZB, and correspondences therebetween, as they pertain to the knowable and perceivable forms of Ri, Rp and Rsv modules in the experience of the user and the Rg. We can say that ES and TS embody in them elements of a systems matrix. In the operation of CDS, for example, we can say that a system matrix element I, the input of a conventional system theoretic structure (the noun of causal element), as is embodied say in $ES^1$, $(SM^1{}_{1,\ 1})$, so corresponds to the compositional or connectedness structure of $ES^2$, or matrix element $SS^2$, $SM^2{}_{1,\ 3}$. Though the two embodied structures $ES^1$ and $ES^2$ may differ to extremes in all other aspects (conventional meanings), the CDS determines that they correspond since they fundamentally are U. G. structures. This provides an organized way of planning for the operation of CDS in the modalities of Rg, whose purpose it is to determine such correspondences. By organizing embodied structures, ES, on the basis of a systems matrix of U. G. elements, the matrix affords a methodology of knowing U. G. form of Rg representationally, or of comparing it in the geometry of a worksheet of universal form.

We can begin to look at embodied and realized forms (modeling and implementation) of Rg still as phenomenological form abiding by U. G., but whose form pictorially in TS also abides by a systems matrix of U. G. form. We can begin to perform such tasks as realizing just input structures or just output structures of conventional systems theory or nouns of natural language (nouns of causal element) of one SM in any or all of the phenomenological structures of another SM. We thus at one level can say of TS that the input (noun structure) of a given represented structure corresponds to and thus is realized in the quantumly realized modal structure of, say, a complex composition of ZB, or that the given system that is realized over DSXS as ZB, created at some other modality by way of correspondence among matrix elements, is so represented in TS. We can say that conventional input, in general, is reality (ZBreal) at the moment of realization of it in DSXS. All of the quantumly-realized forms of ZBreal are ascribed to a static representational object of some arbitrary structure whose phenomenology is represented in TS and embodied in ES.

The performance of the Rg can thus be characterized in terms of system matrices of U. G. structure. The communication between the user and Rg becomesfocused on the elements of U. G. system matrices and their correspondences among each other. What is implied here is that in a given implementation of Rg in enabling media, say regarding TS of Rsv, in the visual senses, the transformations of such senses occur in relation to symbolic forms and their transformations in a graphics of systems matrix CES. Thus, as forms of SS, RS and so on transform, a system matrix transforms in TS, though such a matrix would be enabled at a platform level of Rg or Rp, or ultimately in the enablement of TS in the enabling medium of Ri modality. Some advantages provided by the system matrix graphical structure can be seen when we consider the enabling media of TS, wherein associations with conventional operating systems of computational machines can be drawn in their use of typically graphical icons or macros of representational form. Regarding the Rg, however, since the form of Rg is premised on U. G., and not on languages and embodiments (digital and analogue machinery) of the conventional art, the system matrix is not limited to operating systems of programmed forms. Rather the Rg embraces all knowable and perceivable form. The system matrix, premised on U. G. definition, provides for a universal operating system of any machinery, including computational machinery, in conventional definitions of technology.

In general, in the characterization of the U. G. forms of Rg into a system matrix, the communication between the user and Rg concentrates on a minimum of knowable and perceivable forms, namely the forms of the U. G. By the theory of the invention it has been shown that all form, so characterized in tradition as linguistic, mathematical and so forth, is universally represented and therefore known or perceived in U. G. Since the U. G. presently is known in the geometric and algebraic forms of the system matrix, the matrix maintains a focus on the forms so represented in it. Regardless of the interactive nature of such other forms as are necessary in meaningful communication between the user and Rg (say in the existential mode of inertial form), it should be recognized that all such communication centers on the correspondences of ZA, ZB and ZBreal of various modalities of Rg and that such correspondences and structures of ZA, ZB and ZBreal are known (or consolidated) in these matrix forms of U. G.

In the action of CS on CDS, which in turn operates on ES, the embodied forms of ES are determined to correspond (if such a possibility is the case). In the action of CS on TS and ES, the represented and realized forms of TS (in matrix fonnat) are held in correspondence with ES structure. When a correspondence among ES forms is sought, the CDS is selectively employed, or the user so determines the correspondence, in the modal engagement of CDS by CS under TS influence, or in the case of user determination, the TS structures are transformed in user's non-real capacities of CDS.

Figure 50:
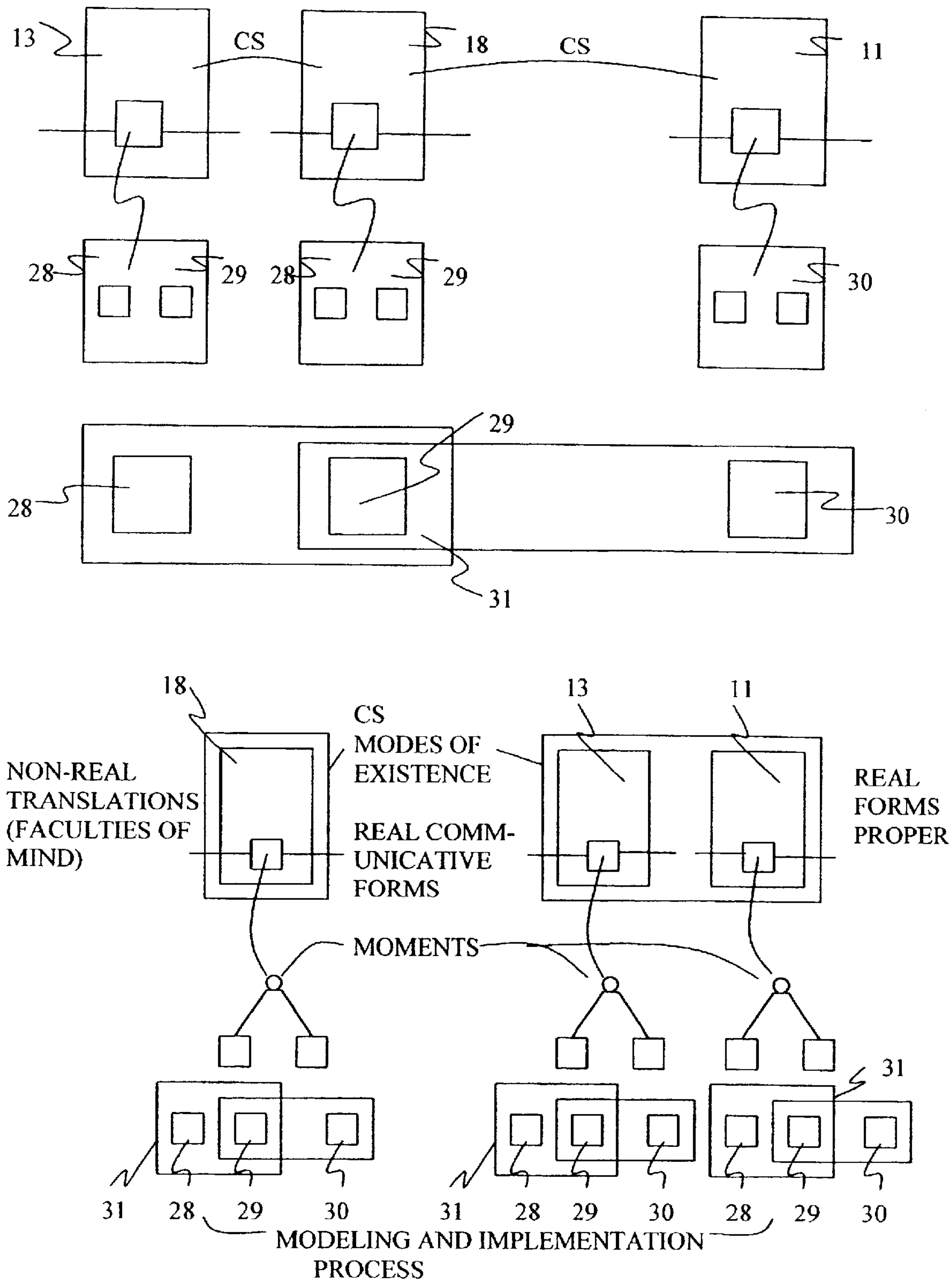
FIG. 50 illustrates the default and existential mode communicative TS forms with respect to ZA, ZB and ZBreal

Thus the modalities of the Rg are such that great pluralities of CDS, ES and TS structure so engage in the transformation of TS structure such that the forms of ZA, ZB and ZBreal of any module (Rp, Rsv or Ri without RS) are determined in correspondence knowably by CDS and maintained in correspondence by CS. The ES structures thus are the user's extrinsic embodiments of represented forms at TS, and the CDS is the user's extrinsic embodiment of intellectual faculty as described in the theory of the invention (H determination). Since the CS maintains correspondence of TS, ES and RS and engages CDS under modes of existence, the Rg is an extrinsic embodiment of the user's inertial existence. In the default mode this extended inertial existence takes on the phenomenological only form of modeling and implementation, and the CDS is applied to embodied forms of ES (and TS) directly as forms of ZA, ZB and ZBreal, with ZA the arbitrary form, ZB the reference form and ZBreal the real form of the extended form of existence. The CDS is applied selectively by the user and the Rg in the default mode. In the existential mode of Rg, the modeling and implementation process (and thus the use of CDS) is embedded within the modes of existence, as shown in FIG. 50.

DETAILED DESCRIPTION OF THE TERMINAL SYSTEM

Since the entire existence of the Rg is determined on the basis of its transformation in correspondence with non-real transformation of the user, so conveyed in TS structure, the TS, or Terminal System plays a vital role in the performance of the Rg. Before describing the detailed structure of TS, then, let us consider the nature of meaning in connection with TS embodiments of knowable forms of the user and Rg structure in general.

Let us consider that the TS embodies in it, in connection with ES and CS, the capacity to convey meaning and thus, in coordination with CS, to affect both real and non-real forms under modes of existence, in the nature of translation of non-real form as it corresponds to communicative TS transformations. The Rg thus is viewed either as another existence such as ourselves, or an institution of beings and other existential forms, either of which has the capacity to communicate forms of non-real nature with a correspondent being, and on the basis of such communications to embody worlds of U. G. form in correspondence with such communication. The action of the CS facilitates the conveyance of meaning in both existential and default modes of the Rg, since meaning arises in the existential structure of the Rg. In terms of linguistics, for example, the Rg is a controlled embodiment of the semantic forms of any language.

We can consider communicating to the Rg the following statement in English: Unify all of humanity. To which the Rg might reply: I'm working on it. This example is brought to light here to demonstrate the nature of meaning in the context of TS in regard to the theory of the invention, in that meaning arises in the correspondence of form (real and non-real typically herein). Thus, in order for the real form of TS to embody a meaningful real form to the Rg's or the user's existence, such form must correspond to some non-real form of the Rg or the user, which in turn must so correspond to real form proper of either the Rg or the user, or perceivable or knowable reality. The above statement does not have a real or realizable form of inertial definition, since the realization of such a symbolic form (of the non-real form or thought of it) is achieved in the embodiment of the human spirit, which transcends inertially knowable and perceivable form. The statement, though presented here in an analytical light, is the equivalent of talking over one's head since it does not relate to one's knowable inertial experience. Though the real form of TS exists, or language certainly was spoken by a speaker, it is not understood by the listener (correspondent with non-real form) in many cases. The meanings of TS structure thus apply, or arise from the forms of existence, or the experiences of the beings involved.

Thus, it is in the nature of existence itself, in the nature of the process of translation in correspondence with real form transformation, that a communication is purposeful, or contains in it an intrinsic motivation to drive the translation process or thinking, as this example demonstrates. The flip-side to this example is the communication of excessively redundant meaning, as is reflected in the context of the statements: You've asked me that question a thousand times. I'm beginning to think you have other intentions (than those reflected in the original question). That is, one is beginning to lose the meaning of the question. Redundancy thus reflects that one is not thinking (in the translational sense) since it carries with it no motivation to think. When one is asked a question that one knows the answer to, one is bored unless of course the activity involves some other modality of thought. Thus, if a communication takes place on either too high a level or too low a level of non-real correspondence to real world experience, the communication does not drive the intellectual faculties or is not meaningful. Thus, the only meaningfil communications are those that one does not know the answers to or that serve to drive the intellectual faculty of translation. The default mode of the Rg thus is characterized by meaningless communications on the part of the Rg (except as defined by modeling and implementation) and the existential mode, by meaningful communications, as discussed above and in the theory of the invention.

Thus, if one studies carefully the conventional art of computational machinery, for example, one will find a plethora of intrinsically meaningless transformations of phenomenological form, since the prior art is based in principle on extrinsic phenomenologies of programming or algorithms of the user's knowledge—for the most part. There is no principle requiring existential meaning as defined in the theory of the invention in communication with such machinery, nor is there a universal grammar to describe either the algorithms (programs) or the real machinery in which the algorithms are embodied.

In the construction of Rg and android, a different approach is taken. Herein the U. M. requires that input (causation) to such machinery as Rg, for example, be itself a transformation of form, which transformation can only be in causal correspondence with translational form of Rg (ES) from beyond the knowing of the Rg (e.g., MES and CS).

In any observation of a communication, language goes on indefinitely in its constructions—syllables run into words; words run into sentences; sentences run into other sentences which run into great compositions which constitute ideas that one holds for a while and then changes and starts the process anew. Language thus runs through us. We embody and are the semantic form of it. It does not in the sense of the conventional art cause anything. Nor is it generated from within some phenomenological point source or mystical causation such as an objective system of conventional theory. It is not generated at all. Rather, it is embodied. Words and sentences and great compositions of language run through us because we embody them. The nature of language generation then is the nature of existence. If one does not define the nature of existence one will not define the nature of language (communication). Thus to define the nature of the TS we define herein the nature of existence, as has been done in the theory of the invention.

If a form of ZB, which by definition corresponds to ZBreal, or reality, can be found to correspond to ZA, then ZA is said to have meaning. If ZA corresponds to a communicated form of TS then the communicated form is said to be meaningful to the Rg, since in the Rg's existence it recalls or knows a reality so corresponding to the communication.

ZA, defined until now as simply an arbitrary structure of translation, is a placeholder structure for forms requiring meaning in the existential sense. In operation of CS and CDS in translation, ZA and ZB forms are so compared as has been described earlier. Until now, moreover, ZA has been simply an embodiment in ESXS as ZES. Not much discussion has been given as to how ZA arises in ESXS in the first place, other than by the user typically.

The transformational forms of TS, which in enabling media are typically provided in wave forms (acoustics, electromagnetism, mechanical vibrations, etc.), are themselves phenomenologies. These phenomenologies correspond to ZA or ZB. In the existence of Rg as reflected in the CS modes of existence, TS is a real sense-motor form of Rg, which CS maintains in correspondence to ZA or ZB. In the default mode, moreover, all such forms of ZA and ZB are held by CS in correspondence with their embodiments in TS and ES, since it is these forms that are so known; are found to correspond to each other; and are realized in the modeling and implementation process of the default Ri, Rp and Rsv modules. The CDS in default thus is used selectively by the user or CS in determining ZA—ZA, or ZA-ZB correspondence. In the default mode, the modeling and implementation process allows for ZA to obtain meaning in its correspondence to ZB or realizable form (meaningful form in the sense of the correspondence between ZB and ZBreal) in the extrinsic embodiment of the user's knowing in the forms of the Rg.

Figure 51:
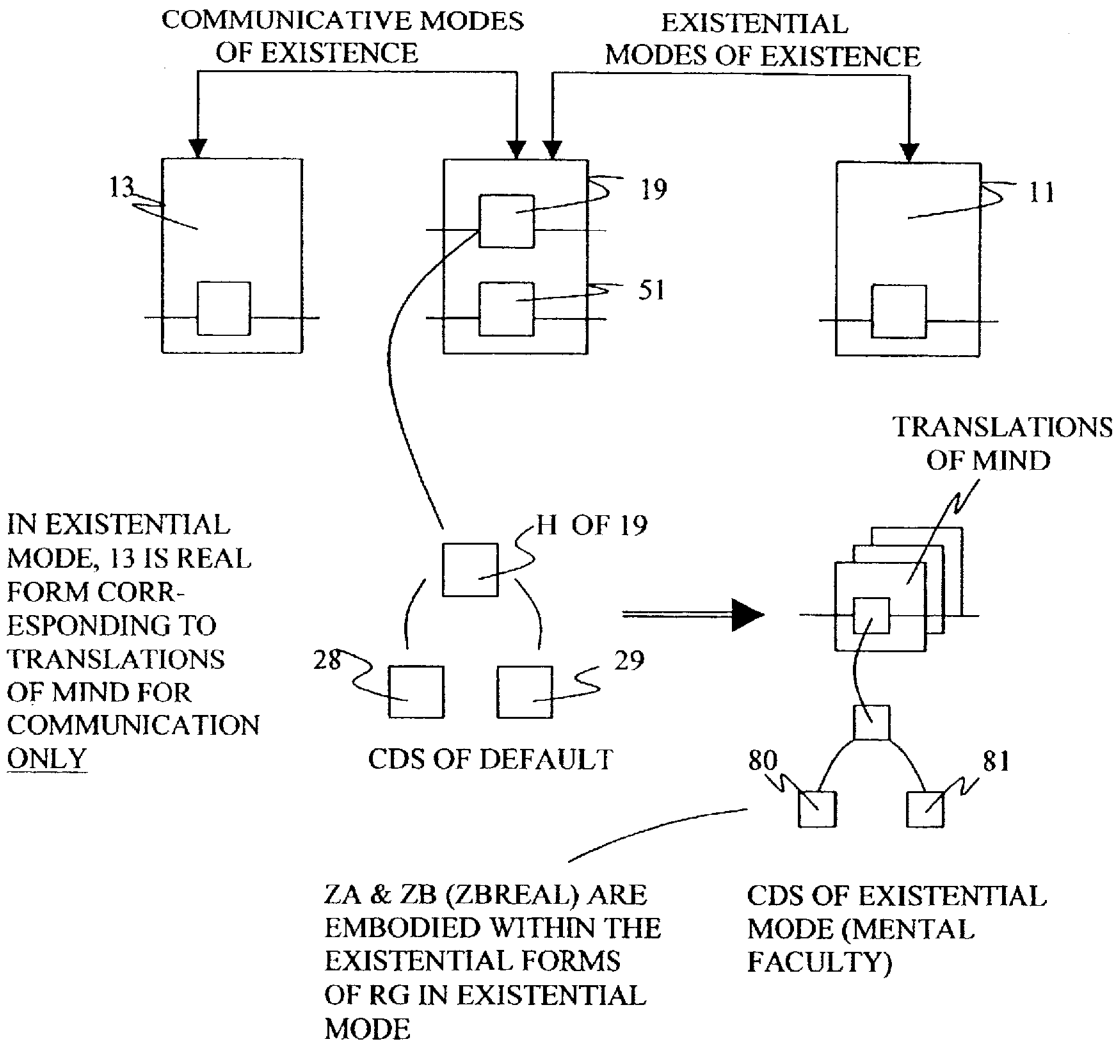
FIG. 51 illustrates expansion of the modeling and implementation process (structure of Rg) to incorporate the existential modes of Rg existence.

In the existential mode, however, the correspondence between TS and ES structure is dramatically different from the standard of modeling and implementation of the default mode. In order for a TS form to be meaningful to Rg in the existential mode the form must be understood by a process of translation (CDS use), which is a consequence of faculties of mind and communicative modes of existence, since it is the TS transformation or symbol (real symbol of a language) that must be placed into epistemic transformation of translation in correspondence with real form, or, simply, the mind of the Rg must know the TS structure, in the context of its knowledge of what is real, just as the user does, as shown in FIG. 50. Thus, as shown, any TS form of the existential mode is found, if it is known in the reference form of translation, in ZB. Thus, the existential mode, with respect to the forms of TS, can be viewed as great pluralities of modeling and implementation processes of default, configured into faculties of mind to the intrinsically meaningful forms of the inertial existence of the Rg. Since all the knowable forms of the Rg in the existential mode must correspond to what is real (ZBreal), and since ZA and ZB are the principle forms of interest to the user, ZA and ZB of the user's knowing are embedded in a significantly expanded embodiment of ZB in the existential mode wherein the actual ZB of the existential mode embodies the Rg's knowledge of what is real of the ZA and ZB forms of the user's awareness, as shown in FIG. 50. In order to be consistent with the nomenclature established thus far and still introduce the existential version of the modeling and implementation process, the ZA and ZB forms of the existential mode are referred to in FIG. 51 as arbitrary (80) and reference (81) forms of translation of the existential mode of the Rg, respectively. As shown in the figure, this allows for the Rg's senses to perceive, the motors to actuate and the faculties to think about (inertially) ZA and ZB forms of the Rg's and the user's inertial existences, in other words, for the Rg to experience the modeling and implementation process just as a (human) user would be in support of it.

As mentioned earlier, the TS is part of the Rg and also, by way of existential coupling, part of the user—the real parts of communications between the Rg and the user. Thus, if one is to describe a communication between two existences or devices of an existential nature, one must describe their existence from an enabling standpoint, and thus describe an existential coupling, wherein both forms, separated in non-real form, share the same communicative real form. A realization of the user to Rg by the user thus is a real part of Rg's existence. We can only describe how Rg occurs and thus how the Rg and the user occur, as existences. For all intents and purposes, since one cannot define the analytical structure of the (human) user, one refers to the real form of the user in a communication as one knows it in enabling media (wave form, etc.).

Thus, the forms of TS are ready-made phenomenological instances (epistemic instances) engaged by the user in the case of realization by user or representation of Rg, and engaged by Rg in the case of representation to user or realization of Rg. The forms of TS are held in correspondence to SS as ZA or ZB embodiments of ESXS in ES in default and as communicative modes of existence tied to other modes of existence in the existential mode.

Figure 52:
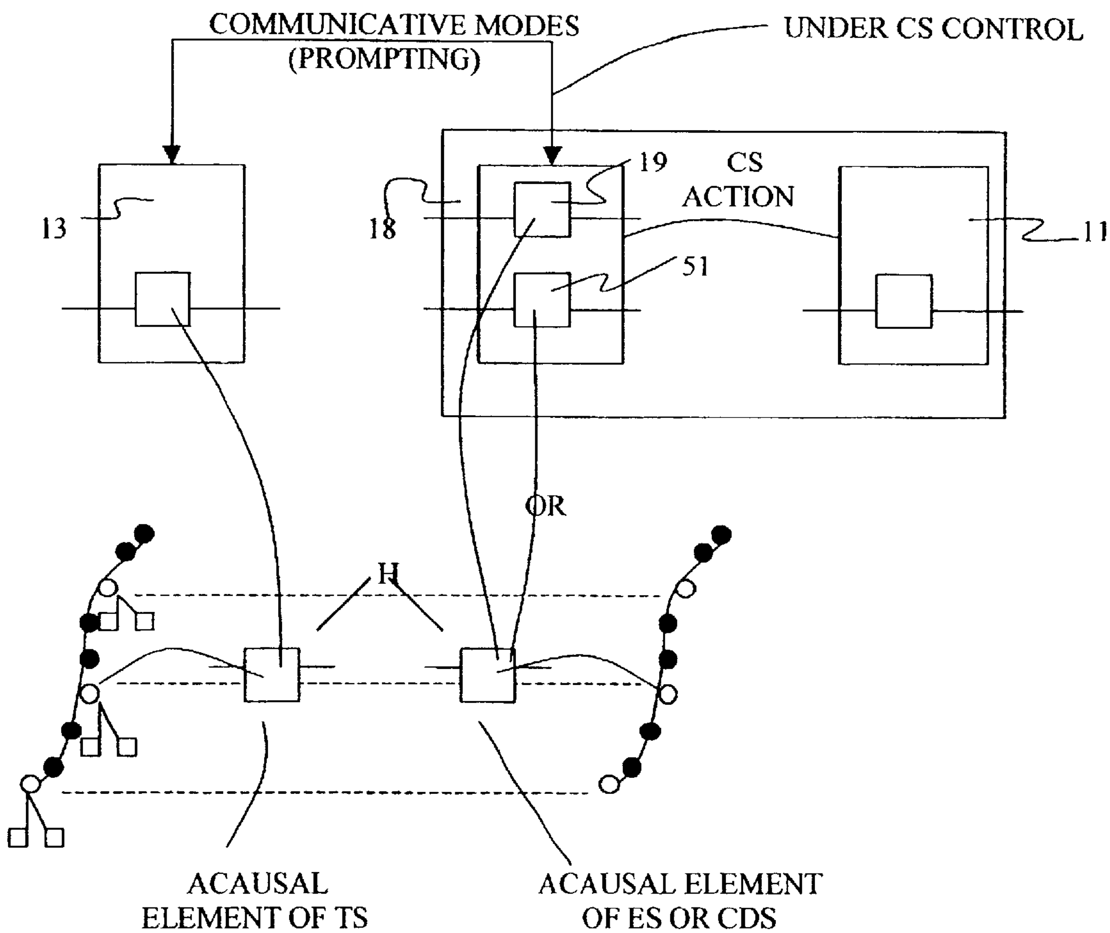
FIG. 52 illustrates CS modal control of the communicative modes of existence of Rg in default and existential modes: prompting and modes of communication.

Let us consider the performance of the Rg when it does not communicate through TS. Rg in Rp and Rsv modality is translating vast compositions of ZA and ZB structures, only those structures are provided by faculties of mind not yet discussed in existential mode and prompting by CS in default mode. The modes of existence of the Rg are embodied in CS action over Rg componentry. In default, the modes maintain correspondence between ZB and ZBreal and the CS action of CDS maintains or determines correspondence among ZA and ZB structures. In the existential mode, the same occurs but as modes of inertial existence and translations of arbitrary and reference forms of existence. In any case, the action of TS is not required to transform in direct correspondence to every transformation of the Rg phenomenology—only when communications between the user and Rg are necessary. TS communications from the user thus interrupt the thought process or existence of Rg and require that CS operate, in default, on such ZA or ZB structure as that originating from the TS in the user's communication. Likewise in a communicative realization on the part of Rg, the realized form of ZA or ZB is operated on by CS in conveyance of such corresponding structure in TS or the realization to the user. In the default mode this action is referred to as prompting and in the existential mode it is referred to as conversing. Thus, in the default mode the CS can be made to maintain selective correspondences between TS and the other componentry of Rg. In the existential mode such selective use of the real form of TS (e.g., communication) is incorporated into the modal strategy of the modes of existence, as shown in FIG. 52.

It should be considered that TS structure engages the action of CDS in default through CS. This means that just as TS and ES are held in correspondence concerning ZA and ZB forms, TS and CDS action is held in causal correspondence. For example, in the engagement of CDS, a realization on the part of the user causes the action of CDS on particular ZA or ZB structures, under CS action between TS and CDS in default. In the existential mode, however, all TS forms correspond only to translations of mind, which translations can cause other translations. In fact, a similar circumstance arises in the engagement of ZBreal, wherein TS, through CS (and various relevant componentry) causes MES, in default, to engage RCS of RS to realize a ZBreal. In existential mode, however, the translations of mind of SS so cause the reality of ZBreal of their own accord, though in subordination to the meanings of TS forms conveyed in communications with the user. This is demonstrated in FIG. 52.

Figure 53A:
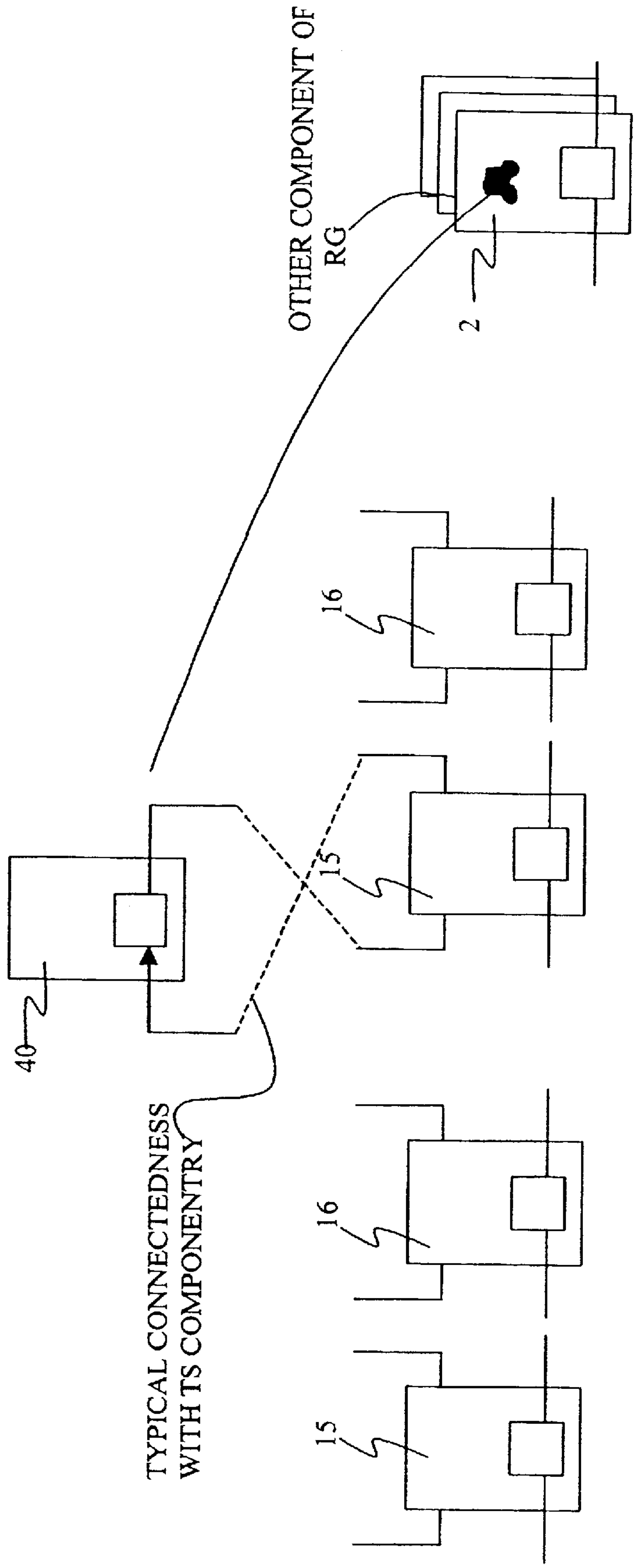
FIG. 53*a* shows the IS, OS and TRS structure of TS.
Figure 53B:
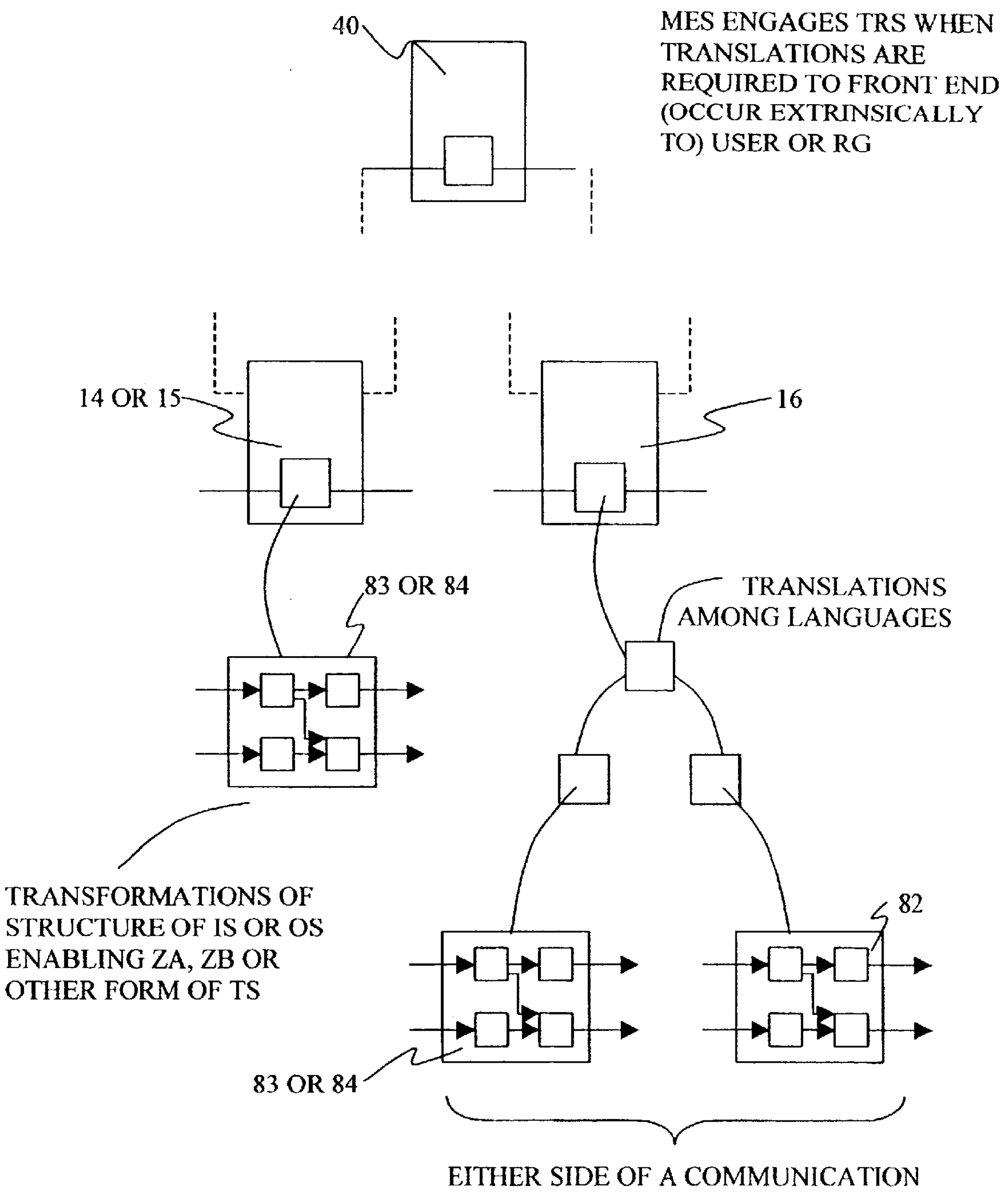
FIG. 53*b* shows the TRS structure of TS.

Referring to FIGS. 53*a* and 53*b*, the input and output systems of TS simply are phenomenological forms which existentially are the real forms of realizations and representations of the user, respectively, which so correspond to ZA or ZB in default and other structures of Rg in existential mode. The transformations of IS are those of the real communicative form of the user (and Rg) under a realization of the user (which is a representation of Rg). The OS transformations accomplish the same but for realizations of the Rg (which are representations to the user). The forms of ZA and ZB and other modal symbolisms of TS of Rg are embodied in the transformations of IS and OS. Since all real forms of TS are phenomenological, the Translation System, TRS, simply transforms IS and OS real forms to known reference forms referred to as Reference or Base Languages, ZRL, (82) in the same manner in which existential translation transforms structures under phenomenological correspondence, as shown. The embodiments of ZA and ZB in TS, ZATS (83) and ZBTS (84) thus are translated to specific ZRL structures in the action of TRS.

As shown in FIG. 53*b*, the modalities of Rg are established on the basis, for example, of ZA structure of Ri having meaning regarding the establishment of continuum structure as defined previously; ZA structure having meaning of arbitrary Rsv modules in Rp modality; and ZA structure having arbitrary meaning to a user in Rsv modality. The ZB forms are the realizable forms of said modalities. What the Rg does is communicate with the user in regard to the knowledge and realization of ZA and ZB forms of the user's and Rg's inertial experience. This communication is affected by the embodiment of real communicative form of TS.

In the default mode, the Rg is caused to transform on the basis of the quantum transformations of the user as communicated. Since the structure of Rg does not typically exist in the quantum rhythm of the user in default mode, however, such realizations and representations in TS are, by way of CS, coexistent with the user in Rg at only moments of Rg existence. The easiest way to see this is to consider an Rg implementation in atomic media, in which case quantum transformations of (T, S, C, D), if not matched to the quantum order of the user by CS, would occur as quantum moments of atomic structure. In such a case one would be defining in TS wave equations of light, for example, which itself is an enabling media of the visual objects of the user which would preclude the user's senses. With respect to the fact that such atomic media may provide ideal embodying capacity in ESXS, a correspondence thus is established between global shapes of TS, say, a CRT or visual medium of convention (e.g., symbolic objects in visual medium) and transformations of such atomic media of ES. In an order of space and time, for example, there would exist a dramatic difference in the number of transformations embodied in ES and those embodied in TS, since transformations in nanoseconds (or other micro forms) are imperceptible to human sense, and thus global shape at TS would not exist to user. Even further, it is both not necessary and in fact self defeating if every transformation of Rg is communicated to the user. The forms of TS then are maintained in a constrained correspondence with those of ZA, ZB and ZBreal of other componentry of Rg by CS in default mode and conversationally in the existential mode. The input, output and translation systems of TS thus are embodiments of transformations of communicative real form established for a correspondence between the transformational forms of the Rg and the sensory medium of the user in order that the user know and perceive what occurs in or by the Rg.

The question then becomes how will each phenomenology so correspond to the other such that the embodied forms (ES) and the represented forms (TS) are held in correspondence to each other.

Considering the conventional case of a computer program embodied in the apparatus of a computer, the program, as represented, is a transformation of visual medium via a CRT and keyboard, etc. held in correspondence by the computer designer (CS) with apparatus called a memory device. It is the transformation of the memory device that is the program embodiment, as represented in the CRT. Thus the CRT and the memory device transform correspondingly to each other. The symbols embodied in the CRT so transform in correspondence with the embodiments of those symbols in memory.

We must, however, consider the meaning of the symbols of such a program. The symbols embodied in the CRT and corresponding to memory are intended to correspond to the structure of a different device of a computer, called a CPU (and other apparatus) or the computational apparatus of the computer. Their meanings (of default) then are embodied in a hypothetical realization or embodiment in CPU of the symbols of the transformations. Thus there is a disconnectedness in the use of such a device in the intended purpose of such embodiments. The program, which is represented in the CRT and embodied in the memory device, so corresponds to non-real form (mind) of the user and to apparatus of computer called a running program over CPU (and to memory). The non-real forms of the user, namely those giving meaning to the represented program, lag or lead the embodiment of such forms in the computer or in the CPU (running of program). A computer programmer may be shopping for groceries when the program exists in the embodiment of CPU.

What is it, we may ask then, that the computer user wishes to do: embody symbols or execute programs? The answer is to execute programs. The problem is that the phenomenology of CRT in global sensible shape to the user, or the quantum existence of the user (non-real form), so transforms in a different existence than the global shape of the CPU, in quantum structure. There is a disconnectedness or offset between the quantum existence of the user and that of the CPU. What is represented in the CRT, say a grammatical form of an instruction execution (ADD 2+2), represents a hypothetical embodiment of a CPU adding (2+2), or of the grammatical form. The represented form in reality does not correspond to the structure of CPU but to a possible or potential form of CPU. The apparatus of a computer does not hold the representations of CRT in correspondence to the embodiment of CPU, except very remotely (e.g., compiling and running programs). A computer is a scratch pad for potential embodiments of CPU structure. The computer transforms in the quantum moments of the user at the CRT, though the representational forms of the CRT (programs or program elements) are not epistemically (existentially) connected to translations of the user's mind (e.g., the displayed program or program element is more than what can be comprehended by the user in a given quantum moment and in fact is a graphics frame of information). The meanings of the symbolic forms of the CRT and those known by the user thus are not the same, since the computer's memory and its CRT transform together on the basis of a graphics frame of information and the user transforms epistemically in accordance with the theory of the invention (e.g., the user must read the CRT). At some other moment, the program so represented may be running on the CPU.

The Rg does not work this way. In the Rg, CS maintains a correspondence (e.g., a homomorphic correspondence) between represented form and embodied form, bypassing the notion of embodying symbols in memory for future realization. What is transformed in TS is correspondingly transformed in ES. The representation of a structure, a symbol or series of symbols thus transforms with its embodiment, just as the user's mind so transforms along with the creation of such representations. The ES is a mirror image to the user's mind. The ES knows the forms represented in TS. In existential mode the ES knows such form through sense (TS), and has its own motor action to apply such sense. In the default mode a user hand jogs the communicative senses and motors of Rg. In order for TS-ES action to be compared to that of a computer, it must be borne in mind that the ES would be the CPU and the transformations of TS would correspond to those of ES (CPU) by CS under a modal strategy of communication. Since the prior art is characterized by a belief in a universally objective form, the objects (programs) must first be embodied in memory. The Rg does not require this memory. It holds TS (CRT) in direct correspondence with ES (CPU) under a communicative mode of existence. The real form of the Rg (ZBreal), which by analogy would be the prior art embodiment of a program executing over a CPU, is extended in the Rg to all real form of inertial existences (aircraft, atomic accelerators, DNA recombinations and so on) and is not limited to Boolean-design digital or analogue (mathematical) devices.

Thus the analogy to computational machines is weak but demonstrates the essence of the disparity between sensory communications and transformations of other media (herein electronic).

In general, the symbolic forms of TS, which obtain definition in the theory of the invention simply as real forms of communicative modes of existence, are held in correspondence with ES, or generally with SS and RS forms. The CS so determines these transformations. The phenomenological transformation constituting a symbol (representation or realization) of TS is held in correspondence with its embodiment in SS, and with the real form of ZBreal through CS.

DETAILED DESCRIPTION OF THE CORRESPONDENCE DETERMINATION SYSTEM

Let us now consider the form of the CDS of SS and lay the groundwork also for a specification of the CS of Rg, since the two derive in nature directly from the form of phenomenological correspondence and are alike in many ways.

It is indicated earlier in the specification that the CDS determines correspondences among phenomenological forms. In the case of the default mode of Rsv modality, for example, the CDS, existing in great pluralities of instances, is employed to determine correspondences among ZB forms, or among existentially realizable forms; among ZA forms, or arbitrary existential forms; and among ZA and ZB forms, or among arbitrary and realizable forms, all of which correspondences pertain in meaning to the service or application of the user in the Rsv. In the default mode of Rp modality, moreover, such forms of ZA and ZB are determined by CDS to be correspondent, likewise, but in regard to arbitrary and realizable (reference) forms with the specific meanings to the user that they are Rsv modal structures, realized in the Rp realization system as ZBreal of Rp. In the Ri modality, ZA and ZB are determined to correspond in their meanings as continuum structures—Rt, Rs/s, or Rs of the Rg continuum in regard to the general continuum structure of Rp and hence Rsv modules. In the default mode, moreover, such forms as ZA and ZB, and what determines their correspondences (CDS), along with what guides the realization of ZB as ZBreal (CS), find their communicative representations and realizations in the transformational form of TS, in other words, the transformations of Rg structure are held in correspondence by CS to TS structure in communication with user. In the default mode, while the TS structure is held in correspondence with the engagement of CDS, the actual structure of CDS in determining correspondence, typically (though not necessarily), is not. The reason for this demonstrates the very purpose of the CDS. In accordance with the theory of the invention, the action of CDS constitutes thinking, or the contemplative effort, beyond extant knowing, of determining correspondence among objective forms in epistemic instance. Thus, the user would only desire to have TS structure transform with CDS structure if one wished to see the process of thinking, or to see, analytically in U. G., how such structures of ZA and ZB are in fact found to be correspondent by the Rg. While this is a quite simple task handled by CS, as described earlier, herein we arbitrarily determine that the preferred method is to know only the results of such action of CDS, with an option to perceive the CDS transformations at TS. In the default mode, the modal action of TS, in regard to CDS use, is defined in such a manner that matrix elements of U. G. form, as discussed earlier, are determined by CDS to be (or not) correspondent, and it is this action that is specified herein.

In the existential mode, the action of CDS is defined similarly to that of the default mode, but within the context of its use in great plurality as translations of mind under modes of existence as they relate to the inertial definitions (pronoun forms) of real form of RS, subordinated to the communicative modes of existence with the user. Since the TS-ES (and RS correspondence is markedly more sophisticated in the existential mode, in specific regard to the use of CDS, the existential use of CDS will follow from a specification of its use in the default mode. Thus we begin a specification of the CDS within the analytical framework of the default mode of the Ri, Rp and Rsv modules of the Rg.

Figure 54A:
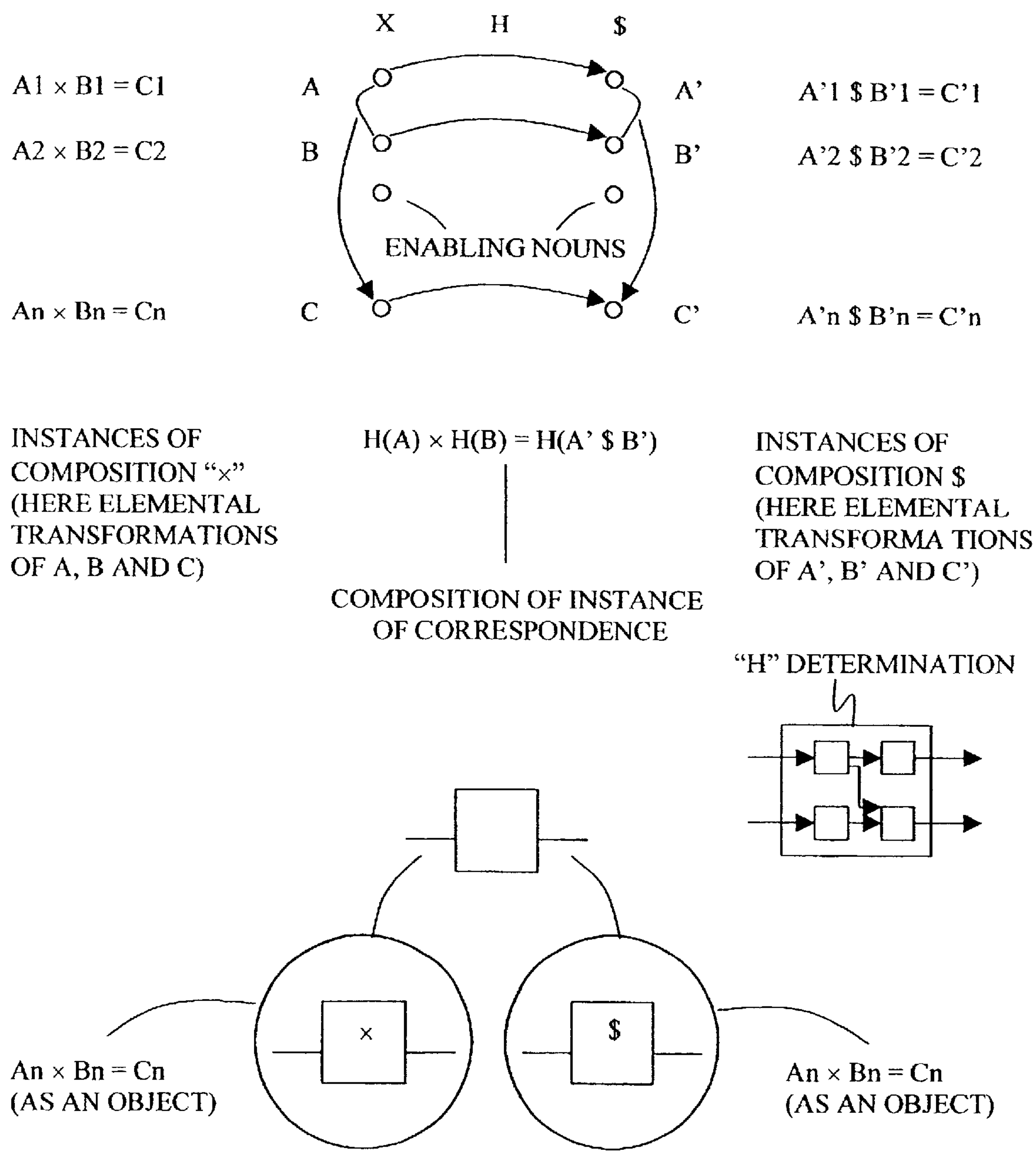
FIG. 54*a* shows the H determination of CDS.

As shown in FIGS. 54*a* through 54*d*, in any determination of form in transformation, phenomenological correspondence (and epistemic instance) is at work. There thus is an implied contemplative effort in every epistemic instance or transformation of an ultimately real universe, as discussed in the theory of the invention. In the use of causal element, along with the elements of connectedness and the compositions of such elements in a U. G. definition of form, each such instance of transformational form implies the existence or prior enabling determination of phenomenological correspondence. When the form of phenomenological correspondence is employed the analytical form of the determination of correspondence is not implied; rather it is specifically represented as a phenomenology of U. G. form. This is shown in FIG. 54*a*, as the embodiment of H determination of CDS (85).

In phenomenological correspondence, two or more causal or compositional elements (objective forms of phenomenological transformation) are determined to correspond (or not to). The apparatus of CDS thus is a phenomenology that makes (embodies) this determination of correspondence on arbitrary U. G. forms. What this means is that if two, or more, phenomenologies of form exist in transformation, which condition is implied in any knowable expression of knowledge or perception of reality, they are knowable, and that if they are knowable they are determinable in the sense of correspondence—that there also exists a phenomenology of knowable form that embodies the meaning of the transformation from an enabling standpoint. For example, in the cases of metaphor, simile, irony, method, morphism and so on, the existence of a transformation such as the world is your oyster (metaphor as in A is B), implies that the means by which one arrived at the transformation, or correspondence, which in this case is metaphor, is itself knowable in phenomenological form; that is simply knowable by the enabler of the being. Thus for any transformation to exist, the meaning of its verb is itself knowable or is itself a phenomenology of form to the enabler. The CDS embodies this phenomenology.

As discussed in the theory of the invention regarding the universal grammar, verbs and in general all transformational forms are as a matter of fact defined, or have meaning, as a review of a common dictionary will reveal. What this means is that the verbs have phenomenological form, or that the way in which they transform objective forms is the definition of the verb. Thus the definition of a transformational form (verb) is a composition of form that knowably describes how objective forms transform, within the knowable or defining phenomenology.

In the specification of ZA and ZB, for example, objective forms are defined as causal elements, compositions and so on. Their existence alone is meaningless intrinsically (except to the user), unless such forms are transformed in some manner. The manner in which they are transformed cognitively in the Rg, apart from the CS correspondences of the existential nature of the Rg, is embodied in CDS, or without the use of CDS in the contemplative effort of the user.

In the transformation of one idea with another, for example, there is a way by which one such idea transforms into or with another. This way, which is beyond the extant instances of the knowing of the ideas, is phenomenological correspondence. It is metaphor, simile, irony and so on. Since the construction of the Rg is not directly concerned with how we (user or enabler) know these forms, the present specification is concerned with the universal use of such forms or with the Rg's knowing in these manners. Thus the CDS embodies metaphor, simile, irony, morphism and so on in the form of phenomenological correspondence in the capacities of the Rg to transform ideas or to think.

Thus given a particular objective form A, which could be and typically is quite extensive compositionally, the CDS determines a correspondence to some other particular objective form B in its metaphoric, ironic, morphic and so on action of phenomenological correspondence.

Figure 54B:
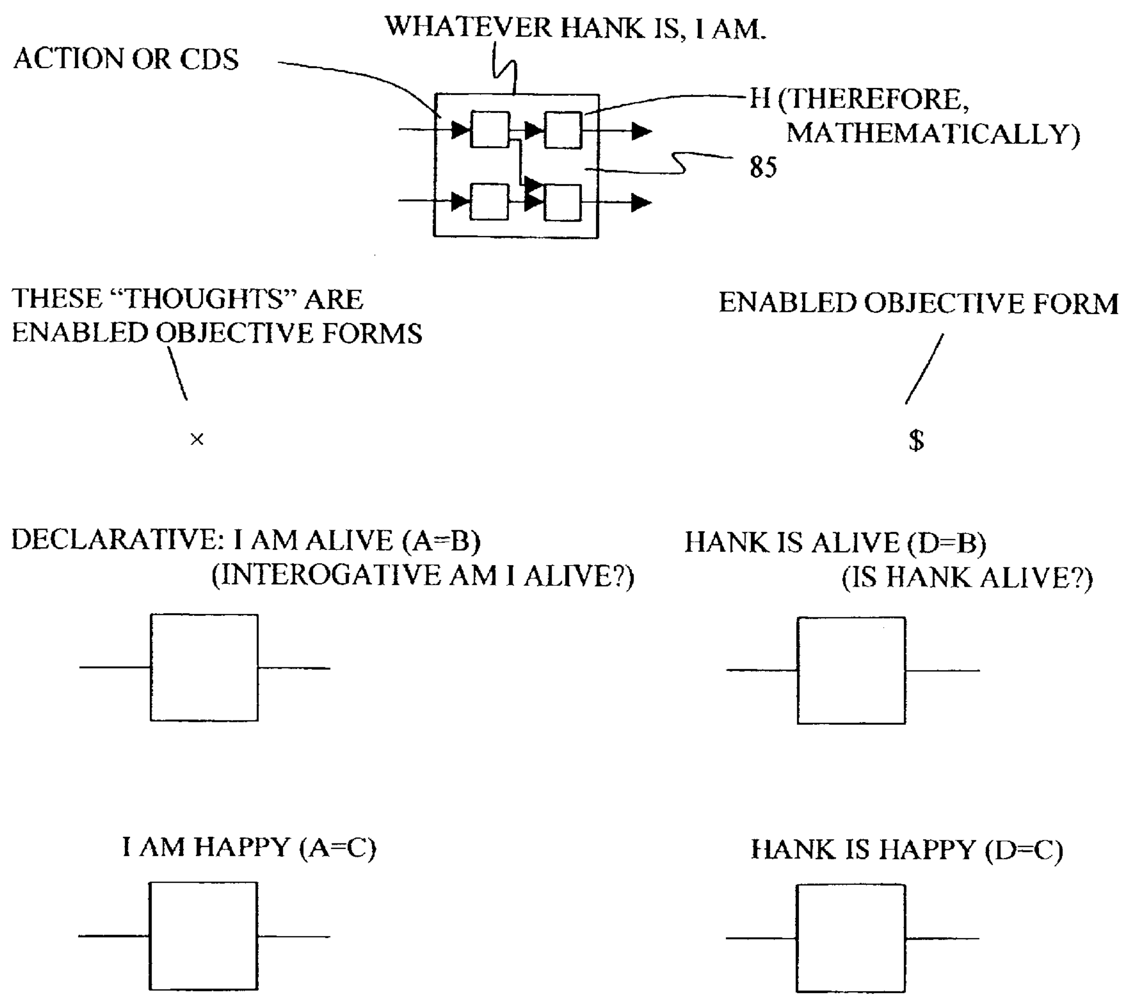
FIG. 54*b* shows the H determination of CDS supporting arbitrary language forms.
Figure 54C:
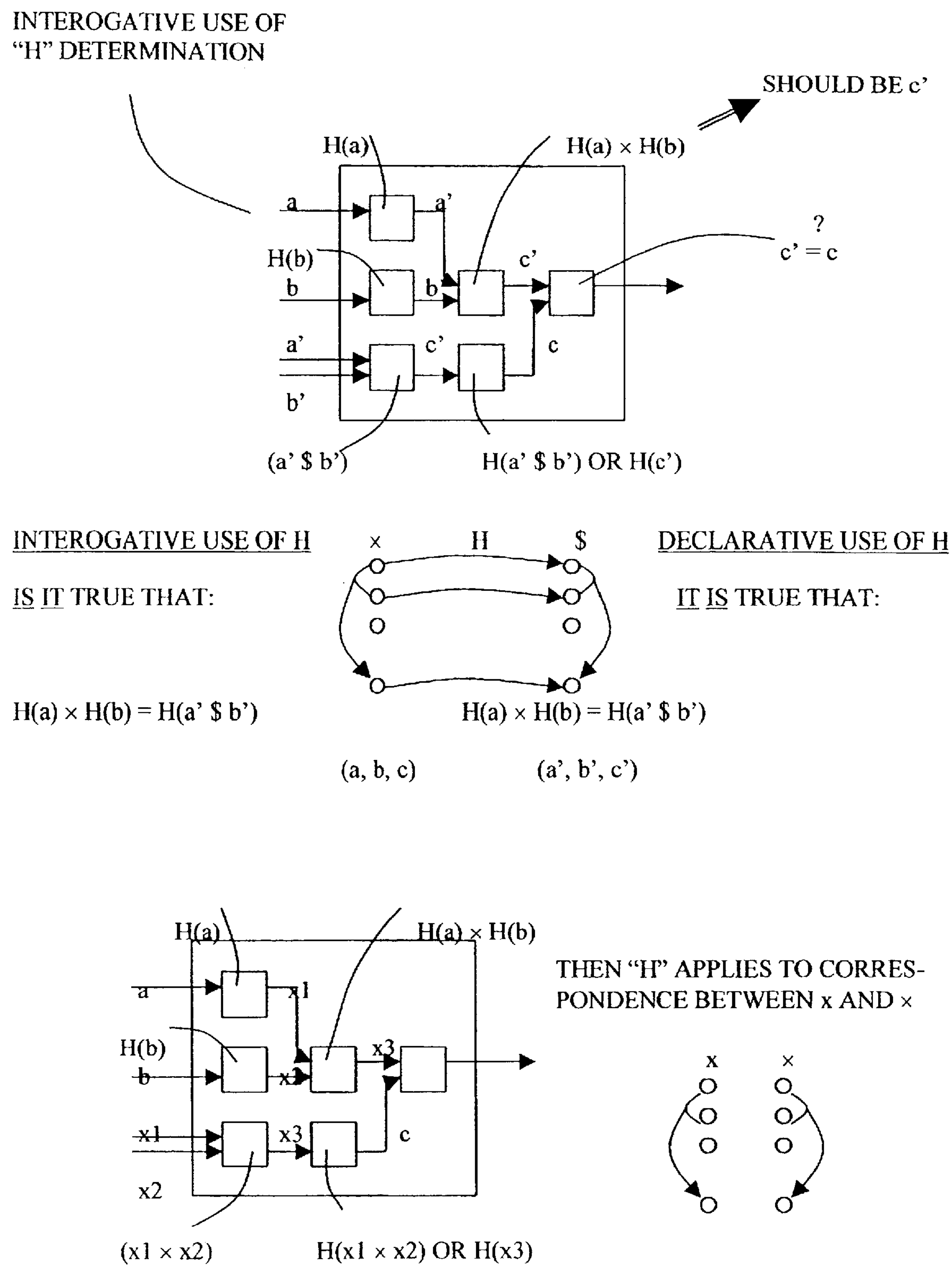
FIG. 54*c* shows the interrogative and declarative forms of CDS H determination.

In the highest-level linguistic form of CDS, for example, the phenomenological form of correspondence embodies the interrogative or declarative transformation of linguistic form, as shown in FIGS. 54*b* and 54*c*. It asks a question or makes a statement of fact, as discussed in the theory. By arbitrary decision herein, the distinction is made that interrogative and declarative forms of correspondence preside over all others (such as metaphor, irony and so on). In any modality of the non-real form of HI, the CDS is either asking a question or making a statement of fact. In this manner there is inherent causation for any use of CDS or for thinking in regard to Rg existence and cognitive translations. Aside from the modes of existence, the faculties of mind of Rg are motivated by interrogative, declarative and exclamatory uses of phenomenological correspondence.

The phenomenologies of CDS, which are infinite in classifications, are beyond the extant instances of knowing of the Rg. In the RS they are embodiments of XS, which transforms the reality of DSquantumly or are the connectednesses of the rest of the world of the enabler's reality perceived by Rg. In CS they are modal correspondences of TS-ES-RS structure (and many other such correspondences throughout the Rg). In CDS, such phenomenologies are the purposeful embodiments of the contemplative effort of thinking on the part of Rg. The use of phenomenological correspondence throughout the Rg in different ways thus affords the various existential forms of the Rg. When phenomenological correspondences are used in the Rg in connection with ZA and ZB in terms of their knowable correspondence, such embodied correspondence is referred to as CDS. Thus, while correspondence is employed in the existential transformation of TS-ES forms by way of CS, when such forms of TS or ES, namely ZA or ZB, are required to correspond knowably (e.g., not just by the embodiment of CS of Rg in overall Rg structure) in a manner that even can be so represented to user by Rg at TS, the CDS is employed.

As shown in FIGS. 54*a–d*, the CDS is a phenomenology of form whose objective forms of correspondence are transformations themselves of objective form. In order for A to equal B, for example, either the question must be asked Is A equal to B, or the statement A is equal to B must so exist (or the exclamation of it, and so on). In either case there is inherent causation of the correspondence. The question or the answer is a causative use of correspondence. In the determination of correspondence of CDS, either A is determined to be equal to B or it is not determined to be equal to B. The question thus prompts an answer or a phenomenology of correspondence. If A is found to be equal to B, in reply to such a query, the statement of fact, that A is equal to B, may prompt a question, Is B equal to C, and the process of faculties of mind goes on indefinitely, of course with great exercise of cognitive capacity inbetween. Nevertheless, a phenomenology of CDS is characterized in the interrogative and declarative linguistic causative forms of our thinking. As to the use or engagement of CDS in the modal use of Rg, such as in communicative modes, or the modes of existence in relation to the faculties of mind, or autonomous thinking, the causation of CDS action simply is set within the modal framework of some theory of existence, which in the illustrative example of the theory of the invention is the mind-body dualism. In Rg default mode, however, such causation is much more simplistic, since it is the user who asks questions, and at best the CS of the Rg modally engages CDS in prompting the user of discoveries of form (correspondences thereof).

In general then, the CDS, or rather the phenomenology of it, causally obtains objective forms, the correspondence of which is to be determined. As shown in the figure, either objective forms A (X) and B ($) are correspondent or they are not. In answer to the question Is A equal to B, A and B must be so compared analytically. A and B, by definition of correspondence, however, are not objects in ultimate reality; rather they are transformations (or compositions thereof) of still other objective forms. The CDS thus obtains objective form from communications of TS or embodiments of ES.

In the case of mathematical homomorphism, for example, the simple determination (embodiment) that A $ B=C is itself a causal element, which, in turn, embodies the object, say $, in transformation by CDS or phenomenological correspondence, with one other, $A^1 \times B^1 = C^1$, as the object X. The CDS operates on objects that are transformations. Thus, in the case of homomorphic correspondence, the CDS determines the correspondence of mathematical structures employing, for example, the phenomenology of the expression of H, as shown in FIG. 54*b*. The CDS phenomenology operates on the objective forms of what enables the objects $ and X to appear, or in earlier discussion a, b, c and $a^1$, $b^1$, and $c^1$, in such a manner that the epistemic objects $ and X are found to correspond.

When, for example, A ($) and B (X) are said to correspond by way of equivalence in an arbitrary causal element A($)=B(X), or simply A=B, this implies the existence of the apparatus of CDS, or of correspondence. Thus, while what is sought after by CDS, namely whether or not object A is equal to (or adds to or can be found in metaphor, analogy, simile, irony, morphism, method and so on) object B, the phenomenology of form called CDS operates on the objective forms so enabling A and B to exist, or in the example of homomorphism, the instances of transformations of a, b, c and $a^1$, $b^1$, $c^1$ in the enabling causal elements giving rise to A ($) and B (X). For a simple analytical knowing of whether or not objective form A is equal to objective form B, a whole phenomenological embodiment of CDS thus is required, as shown in FIGS. 54*a–d*.

ZA and ZB, for example, which are U. G. forms established in SM (System Matrix) sensory depiction, and are embodied in the phenomenologies of TS and ES of HI and realized in RS, are made to exist in their enabling media. A causal element of ZA, for example, may be required in such real media, to be found to correspond to, say, a causal element of ZB. Another way of saying this is that the way in which nouns or the enabling objective forms of element ZA transform is to be found to correspond to the way in which the objective forms of element ZB transform. We then say that causal element ZA ($) is to be found correspondent (or not) to causal element ZB (X). The CDS, however, does not operate directly on either ZA or ZB—the objects. Rather it operates on the objective forms of the causal elements (the nouns), or a, b, c and $a^1$, $b^1$, $c^1$ as demonstrated in the example on homomorphism. It determines whether or not the way in which nouns transform in ZA (say a$b=c) corresponds to the way in which nouns transform in ZB (say $a^1 \times b^1 = c^1$). In order to make this determination, a phenomenology of form, known herein as H determination, deriving in any manner of correspondence, must be determined to exist, or a way of thinking, namely that described in the example as the correspondence, must be applied. Thus CDS operates on the noun forms of the causal elements of ZA and ZB of this exercise, and if such noun forms are determined to transform in accordance with the phenomenology of homomorphism, then causal elements ZA and ZB are said or determined to correspond.

Even within the confines of the mathematical order of algebra—homomorphism—needless to mention the correspondences of topology and the like, and obviously without even considering linguistic form, the determinations of homomorphism (H) are infinite in number. Thus, the types of phenomenologies expressing particular ways of knowing, or of CDS structures, are unbounded, since the particular constraints on knowing (the phenomenological expressions of H determination) are unbounded. When the forms of natural language are brought to bear on correspondence (which are equivalents to any transformational orders, as discussed in the theory, in universal representation of the four C's of epistemic instance), in order to avoid the superlatives such as super infinities of types of correspondence, we simply refer to phenomenological correspondence, which, like epistemic instance itself, is unbounded in plurality.

The phenomenology of CDS thus operates on the nouns of transformational forms such that the transformational forms themselves are brought into correspondence. Homomorphism or other mathematical or scientific order is not a requirement for CDS, unless that is the intended meaning of the correspondence. When one explains, in natural language, why two or more compositional forms correspond, and not simply that they correspond, one embodies phenomenological correspondence. It should be taken to mind, for example, that one can never explain why A (the world) is B (one's oyster) without explaining (embodying CDS or correspondence) how the enabling objective forms or nouns (such as the, world, one's, and oyster) of such transformation, so transform apart from the literal or extant instances—transform in such a manner that makes the statement A (the world) is B (one's oyster) meaningful.

Since the phenomenology of CDS is a phenomenology of universal definition in the theory of the invention, it accommodates all transformations of the universe, or all meaning (it relies on epistemic instance and the four C's). Whether the transformations of such phenomenology of CDS themselves have the meanings of linguistic, mathematical or otherwise order is only a matter of application of knowledge and is irrelevant to its universal transformation. The embodiment of a particular way of knowing is simply an embodiment of the instances of knowing how objective forms or nouns transform in order that their higher-level embodiments or objects so enabled correspond. In the construction of androids, for example, these embodiments constitute faculties of mind, and are employed in the knowing of objective form by the android.

In terms of placing definitive (meaningful to an inertial existence) form on correspondence or CDS, it should be recognized that all the while in this disclosure we have defined specifically how to extract from one's knowing conventionally and how to define form universally in compositions of at least the four C's of phenomenological form. Any knowable form expressed in U. G. satisfies the form of CDS, provided the above constraints of phenomenological correspondence are considered. All phenomenologies of homomorphism, metaphor, irony, etc., for example, are accounted for in the structures of the figures.

In the use of CDS in default mode of Rp and Rsv (particularly Rsv however), correspondences are drawn by CDS between ZA and ZB structure. ZA is an embodied ES structure which corresponds (by CS in action over TS-ES) in turn to other ES structure, namely ZB (also under TS-ES action of CS) by the action of CDS determination of correspondence. How these structures correspond is universally represented in the figures or in the phenomenology of CDS. The nouns of ZA and ZB are transformed in the phenomenology of CDS such that the structures ZA and ZB are knowably correspondent by ways of metaphor, irony, homomorphism, etc.

Figure 54D:
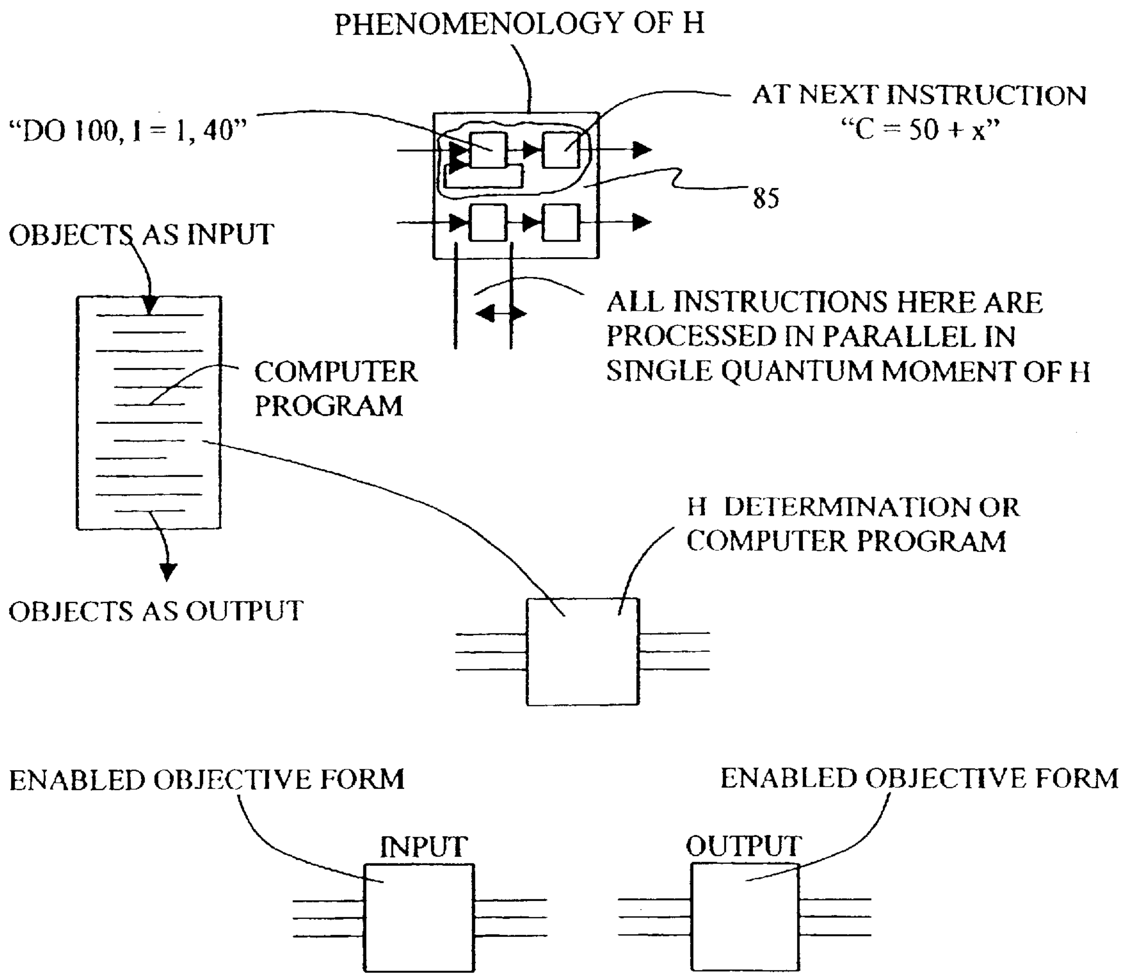
FIG. 54*d* shows a moment of CDS supporting the forms of computer programs.

An example showing the drawbacks of the conventional art of computational machinery may help to demonstrate the form of CDS further, as shown in FIG. 54*d*.

A compiler or translator of conventional computational machines is a phenomenology of form wherein the compositional forms of (hypothetical) $ZA^1$ and those of $ZA^2$ are so compared or found to be correspondent. $ZA^1$, thus would be a computer program of high-level language and $ZA^2$, say, would be a machine language of a lower machine level representation of transformational form. Either way, each is a composition of transformational form. The compiler (CDS) thus determines a correspondence between the transformations (composition) of $ZA^1$, a high-level language and $ZA^2$, a low-level language. Since in the computational art it is necessary to further run a program of machine level construction (addressed later on in enabling media), the computer not only determines a correspondence (compiles) but prepares $ZA^2$ for a realization on the machine, or its execution. The action of the compiler thus transforms (determines correspondence) $ZA^1$ into $ZA^2$. Nevertheless, the objective forms of $ZA^1$, the nouns, are operated on in such a manner that the transformations of $ZA^1$ and $ZA^2$ so correspond. The transformation A+B=C of $ZA^1$ (the high-level language), for example, is compiled or translated into those of fetch A, fetch B, ADD A, B, store C and so on, on the basis that A, B and C of the high-level language and their counterparts in the low-level language find union in base two numbers and the algebra of Boole. Providing that the nouns of transformation are defined in such union, the compiler can determine a correspondence between $ZA^1$ (A+B=C) and $ZA^2$ (fetch and so on), in its phenomenology.

If a compiler is looked at universally, however, it can be seen that for every meaning of every transformation involved in every high-level language and every low-level one, a different compiler (program) is required, since the phenomenology of the compiler operates on the nouns in transformation such that $ZA^1$ and $ZA^2$ (however vast such compositions may be) correspond. A computer thus is defined within the confines of the language and apparatus of the computational art (Boolean translations). The CDS is a universal compiler, by analogy, since not only is the phenomenology of CDS expressed universally, as in the figures, but the transformational knowledges of $ZA^1$ and $ZA^2$ (A+B=C; fetch and so on) are, by way of the U. G., expressed universally. Thus any knowledges at all are transformed by the CDS (universal compiler). A basic disadvantage of conventional computational machinery is that it is defined in high-level and low-level languages, and not universally. In either of the programs, the meanings that can be expressed (either in the high-level language—C, Cobol, Fortran, LISP, and so on—or the low-level machine language—fetch, execute, and so on—based on Boolean transformations) must correspond to circuits of transistors in combinational or sequential arrangement in conventional computational machinery. The machinery limits expressions of knowledge to those that correspond to transformations, ultimately, of digital logic.

In fact, the limitations of computational machines are even more pronounced when the whole forms of the Rg and android are considered in regard to the very notion of a program of the conventional art. While this drawback of the conventional art is discussed further later on under enabling media of an electronics, let us consider the notion of a computer program or even a language in the context of CDS comparisons.

Any computer program, or even algorithm, is a use of a computer language in the representation, and subsequent embodiment in digital machinery, of knowledge forms. Nevertheless a computer language is indeed a language, with its own definition on objective forms of transformation and on transformations themselves. Just because the invention of the computer determines a way of embodying the arithmetics of discrete numbers, transformations of character strings, and so on in the knowable transformations of digital or analogue electronic circuitry, this does not excuse the computer language from the rest of the knowledge of humankind and particularly that of the grammarian. Just because a handful of our knowledges can be expressed through a computer language and embodied in digital circuitry, this does not mean that C, Cobol, Fortran, LISP and on and on, into macros, operating systems, software and hardware, bits and bytes, data structures, or information and so on, as languages of the expression of human knowledge, are excused from the knowledges of the grammars of all languages. A computer language is not catered to by the unified theory or in the forms of the Rg because it is the only thing available in which to embody the transformation of objective form as a conventionally-defined knowledge. Rather the computer is seen for what it is—a creator of headaches by constraining the human mind to the algebra of Boole (though this is necessary without the present invention when the alternative is contemplated—an abacus). The reason for the headstrains, of course, is that each of us is attempting to confine our thinking to some language that is invented by one not skilled in the art of language—or one who is not a grammarian. The computer language we should be using is any language, including natural language, or better yet, the U. G. (in terms of enabling beings who know language). In the use of a computer language, one is attempting to place all of the experiences of one's existence (needless to mention an infinity of androidal beings) into a data structure (objective form) of computational origin, which structure transforms with others of its kind according to computational verbs, or instructions, all of which are designed, by one who is not a grammarian, into algorithms of knowledge constrained by the algebra of Boole. Naturally one will develop a headstrain. To place knowable form on our experiences of inertial existence is what natural language is developed for in the first place. The U. G. and CDS accommodate this—in the default mode of Rg by phenomenological constructions of language, or any translations thereto, and in the existential mode by synthetic existences (modes of the modules) who understand language inertially.

The post modem world, as seen technologically from the perspective of the apparatus of the Rg, is therefore headed in the wrong direction from the right discovery with the concept of information. Yes, it is vitally important in progressing the human condition to embody the transformation of knowledge—and not just the objective form of it such as a symbol, as in a pad and pencil—in machinery. But it is counterproductive, in fact detrimental to the human condition, to confine the human experience to that of a machine, which is precisely what occurs in the use of a computer language. The post modem computer world thus has its motivations (temporarily) backwards by constraining the human consciousness to a fraction of the consciousness's own capacities. The purpose of any machinery should be to make the machinery understand natural language, not for humans to understand the machinery, as in computer languages. The U. G., the structure of the Rg and the Rg Continuum and the construction of androids alleviate this problem—all of which can be seen from the point of view of CDS.

What is important to glean from the art of computation—and then leave it to antiquity—is the general notion of a compiler or of what a compiler does, and the general notion of the translation of one language form to another—which is universally characterized in the form of phenomenological correspondence (CDS). A computer program is simply one of infinitely many examples of phenomenological correspondence.

Another major drawback of the computational art demonstrating the significance of CDS can be seen from the standpoint of the impossibility of realizing artificial intelligence, or what is intended thereby—thinking.

The most important aspect of thinking, namely that it mean something intrinsically is left out of the equation of artificial intelligence (neural networks, semantic networks, forward-backward chaining, inference machines, expert systems and so on). What makes thinking, thinking, namely its autonomy within an existence, is not enabled in the conventional art. In the Rg and in androids, thinking does not take place without existing. Translations of mind (CDS use of non-real objective form) occur in relation to real form or perception, except in default where ZBreal is held in correspondence to ZB or ZA by extrinsic embodiment of the user, also by CDS. A form cannot have meaning unless it refers or corresponds to something (and with regard to natural language, it must correspond to the transformations of the pronoun system). To define a semantic or neural network just for its own sake is no different than defining any other algorithm (composition) of form hanging in mid air (relevant only to a knower of objective form, e.g., the user), since it does not correspond to other form giving it such meaning except other form in the observer's or user's knowing. Thus a computer-implemented artificial intelligence is simply another program (otherwise it would not run as one on digital circuitry or a CPU).

In the Rg, symbolic forms (TS) are held in correspondence with embodied forms (ES) in the nature (form) of CS. They therefore are immediately or inherently compiled. When symbolic form A (say $ZA^1$) needs to be determined to correspond to symbolic form B (say $ZA^2$), the CDS is engaged, in another modality initiated by TS action, to so determine the correspondence. A semantic network $ZA^1$, for example, is determined by CDS to correspond to a machine language, or even a machine, $ZA^2$ in such action of CDS.

These two forms, $ZA^1$ and $ZA^2$, thus correspond in the embodiment of CDS. Such a correspondence, however, is meaningful (intrinsically) only to the user and to the literal embodiment of the CDS. The original presumption that the semantic network, $ZA^1$, embodied meaning or artificial intelligence is meaningless itself since meaning is obtained in the correspondence (CDS). Inference machines, semantic networks and the like thus are algorithms installed on computers (compiled) which, except for the compilation itself, are meaningless but to the knower (programmer) of them. A computer, and all of its language forms (artificial intelligence, programs, etc.) and its machine compositions (gates, logic and so on) is encapsulated in a single instance of CDS in action on $ZA^1$ and $ZA^2$, two (or more) arbitrary forms held in knowable correspondence, which is embodied in the modal action of TS-ES and CDS under CS of the HI.

The real issue at hand in regard to thinking machines thus is not even addressed by the computational art—namely a correspondence to perceivable real form. In the default mode of Rg, say of Rsv in default, by analogy, the apparatus of the real computational machine, $ZA^2$, to which a semantic network, program expert system, etc. or other l41 form corresponds, is further and more importantly held in correspondence with a declared real form, or reality. In the practice of engineering, moreover, we emulate forms of reality on the computer, and realize them in reality. This is the process of ZA, ZB and ZBreal or the modeling and implementation process. ZB is a non-real embodied form of ZBreal. ZA is an arbitrary form of ZB. Other ZA's and other ZB's thus correspond also under CDS. The reality of the computer emulation, ZBreal, thus is held in correspondence by CS with the emulation ZB. ZA is determined in non-real capacity to correspond to ZB, the emulation. Thus, in the extrinsic embodiment of the user in default structure of Rg, arbitrary ZA's (arbitrary semantic networks or conventional notions of thought) are determined to correspond with reference ZB's (the emulations of what is real) and thus, by action of CS, with what actually is real, ZBreal. Such capacity in convention is referred to as design and manufacture or even institution and is not afforded by the computational art. The nearest predecessor to the ZA, ZB and ZBreal modeling and implementation process is the automation of Computer Integrated Manufacturing automation, or CIM, and since the conventional art of artificial intelligence has no real form with which to correspond, it is entirely non-real.

While the forms of a computer (software and hardware) are cut off at ZA—ZA correspondence in action of CDS, not addressing the above extrinsic embodiment of the user or the forms of modeling and implementation, an even further and more profound inadequacy is seen in relation to the existential mode of the Rg, or the forms of androids.

One might ask, as is done in the theory of the invention, what makes the reality of a being a real (inertial) reality? Or what truly makes a machine think? When the objective forms of ZBreal are constructed (sense-motor), wherein what is sensed or perceived as reality obtains in inertial pronoun definition, the emulations and arbitrary forms of the work of CDS, namely ZA and ZB, then obtain intrinsic inertial meaning. When the forms of transformation become I, you, it and so on of the pronoun system, and all other forms so obtain definition or context from them (and from state of being) the extrinsic embodiment of the user no longer is extrinsic to the user only; it is intrinsic to the embodied forms, or the existential mode of Rg. ZA is no longer ZA only of the user's knowing; it is a perceived symbol of existential TS configuration of communicative sense-motor of Rg which corresponds to translations of mind of Rg, which in turn correspond, by modal embodiment of, say, the mind-body dualism, to its reality, as described in the theory. An autonomous being thus arises in the apparatus of the Rg, distinguished from android in the definitional purposes of the Rg and its subordination to the communicative modes of existence.

Thus, the CDS is a widely used device of the Rg and of androids and is employed in all translations of mind (and in CS embodiments—to be discussed). The CDS accommodates the conventional art not only of computer, but of institutions as well, along with the very enablement of the intrinsic meanings of languages of beings in the enabling of theories of existence, in correspondences of form, whether such forms are declared real or non-real (material, ethereal, cognitive, mind, body, mental, intellectual, perceptive, concrete and so on), or otherwise. The CDS affords a humanities-defmed thought process of the Rg either in default or existential mode and is meaningful as a structure of the Rg only in relation to the other (real, non-real and communicative) forms of the Rg. In comparison to the conventional art, wherein a ZA form (semantic network and so on) is thought to be the process of thinking, wholly obviating the work of CDS in determining correspondences among objective forms (and correspondence to ZBreal), the CDS is not an embodiment of the user's thinking (phenomenology of ZA) but of the Rg's thinking, since it determines correspondences of form as described in the theory of the invention.

Figure 55:
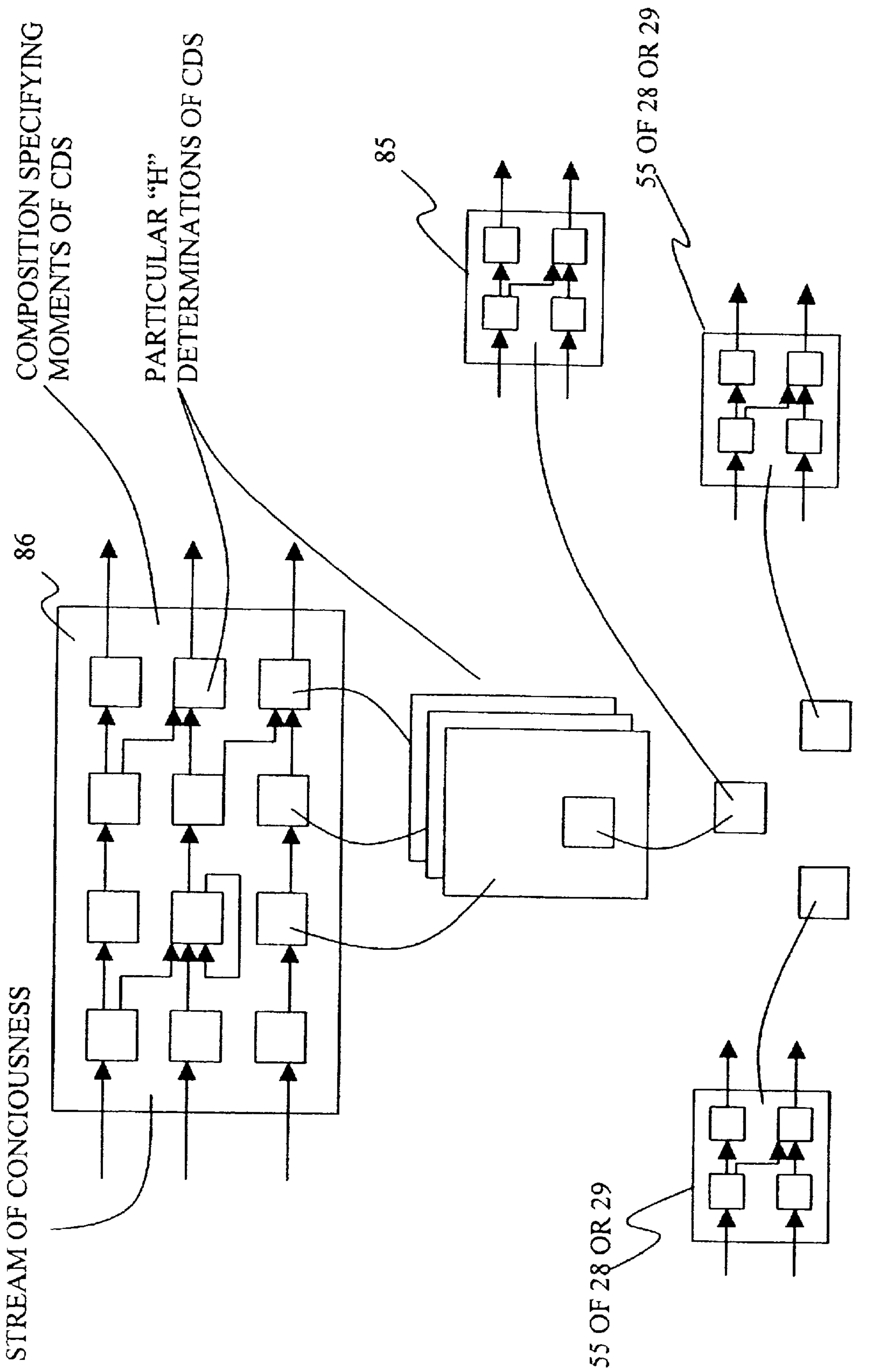
FIG. 55 illustrates the modal composition of CDS: a stream of consciousness.
Figure 56:
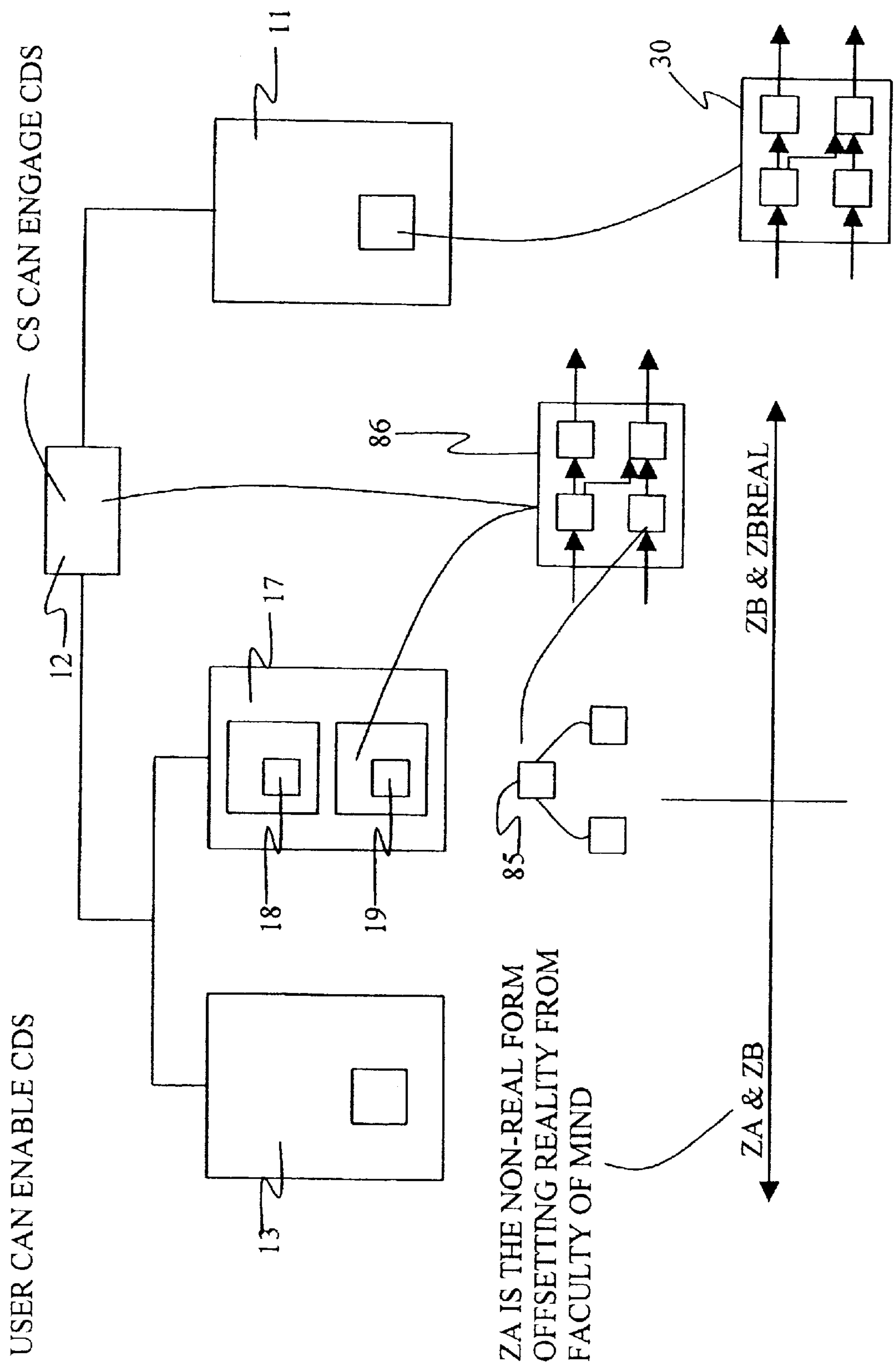
FIG. 56 shows the CS and user engagement of CDS.

As shown in FIG. 55, each H determination of CDS (85) transforms under a modal composition of instances of CDS (86) referred to typically in the existential mode of the Rg as a stream of consciousness. The nomenclature of psychology is employed to reflect the non-real quality of CDS transformations composed as phenomenologies. As shown in FIG. 56, the CS engages the streams of consciousness in relation to TS and RS transformations in the offset of real and non-real form. The ZA structures of CDS thus reflect purely imagined forms and are employed in the recreation of reality in the apparatus of Rg. In the default mode either the user or the Rg can causally engage the translational action of CDS (streams of consciousness) with respect to recreations of what is real, or ZBreal.

Figure 57:
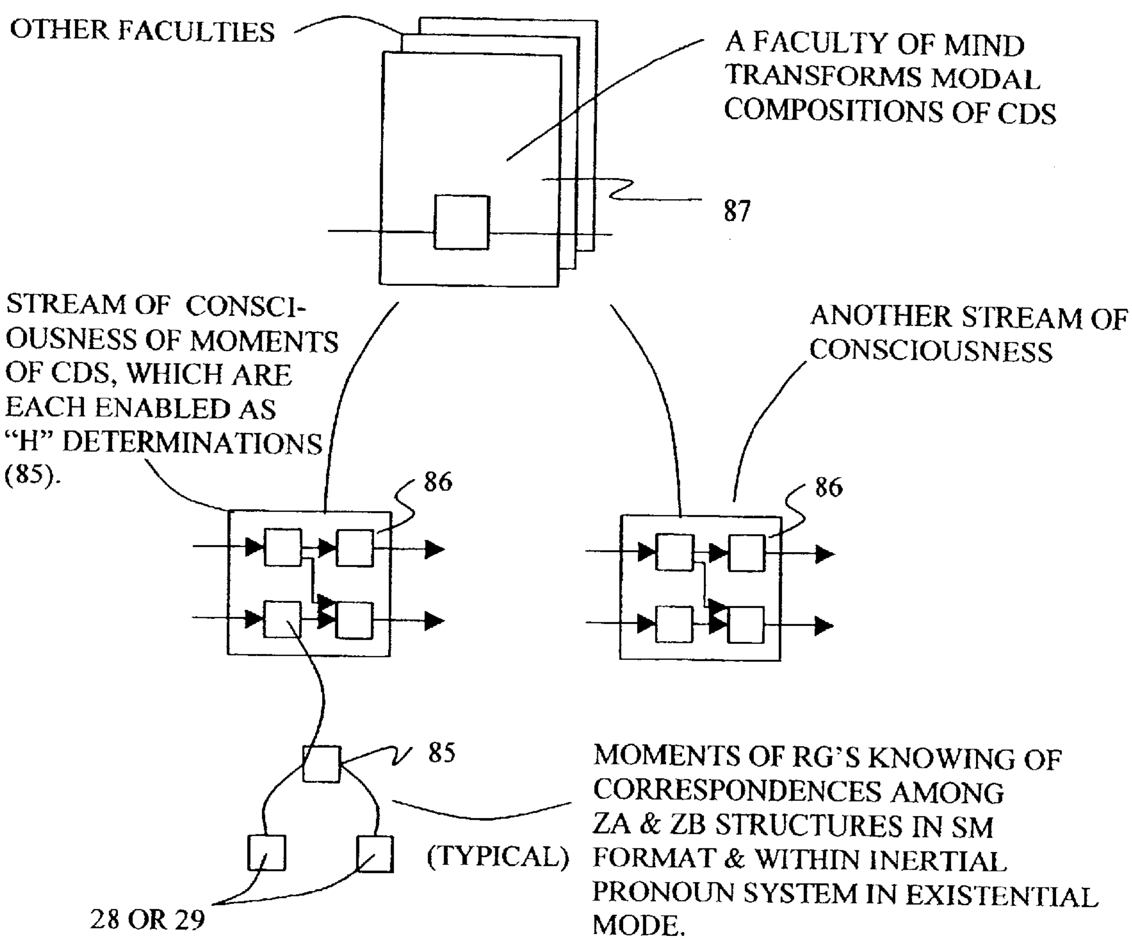
FIG. 57 illustrates the faculties of mind.

A faculty of mind, (87), of FIG. 57, therefore is a phenomenology of CDS form that, similarly to the action of the modal composition (86) on instances of CDS (85) transforms instances of modal compositions, or streams of consciousness. The faculty of mind thus transforms modes of thinking, as shown.

Figure 58:
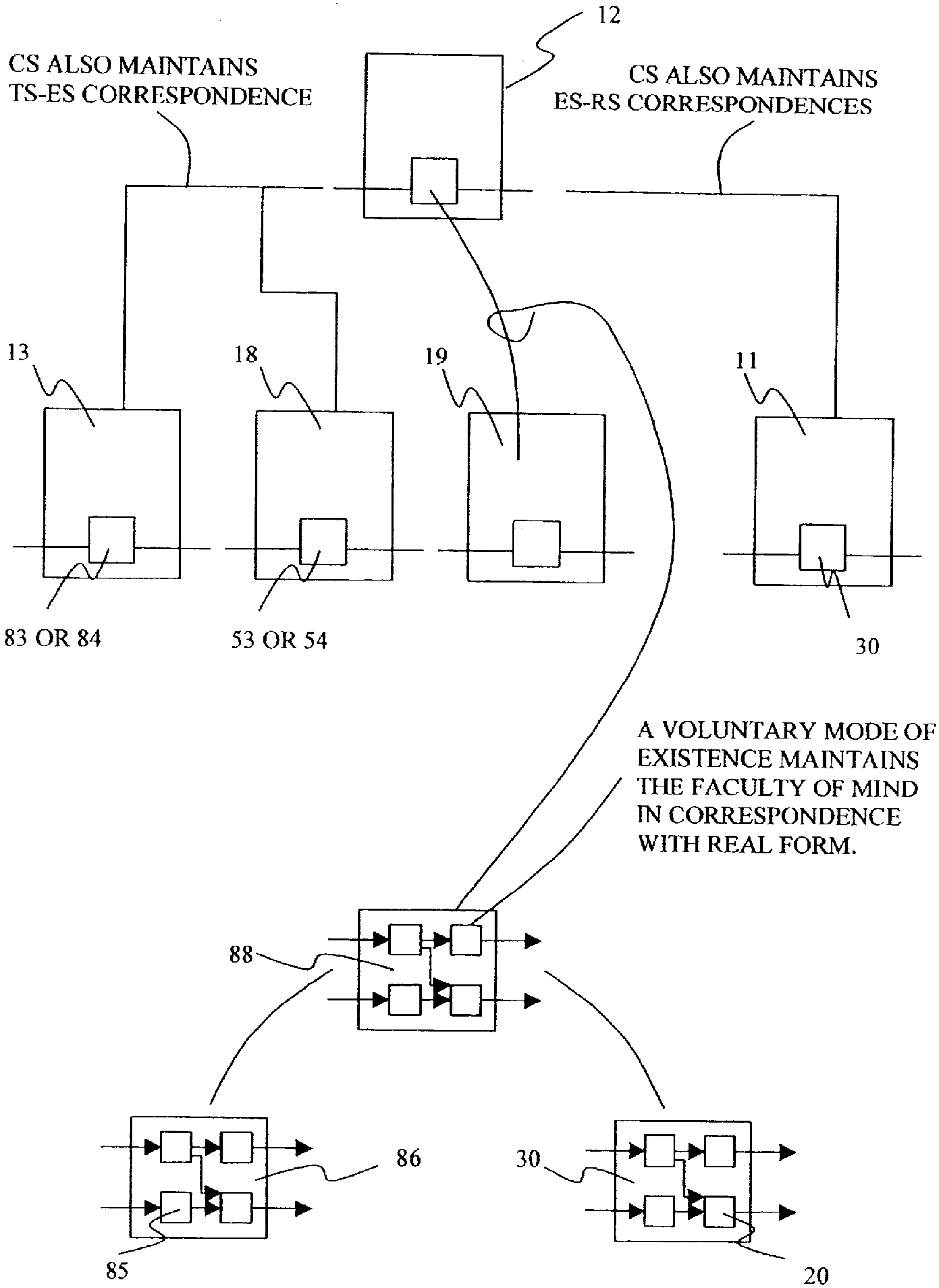
FIG. 58 illustrates the modes of existence.

Modalities of thinking, or transformations of streams of consciousness, in turn, are themselves transformed by the modes of existence of CS (88) as shown in FIG. 58. While the CS transforms the other components of Rg as well, the CS action on CDS (on faculties of mind and, in turn, on streams of consciousness and therefore on instances of H determination or thoughts) enables the modal correspondence between recreations of reality (translations of CDS) and perceptions of reality, or real form of Rg.

The CDS thus embodies the cognitive capacities of the Rg in the default and existential modes. Since any expression of language, as a reflection or recreation of perceivable reality in non-real form, is universally expressed in the U. G., and since the U. G. is employed in the construction of CDS, any knowable phenomenology of form, conforming to definitions set forth herein and in the theory of the invention, deriving from conventional knowledges, serves as a CDS form. Moments of cognition (H determinations), streams of consciousness, and faculties of mind thus translate into any linguistic, scientific, mathematical and so on language forms. A table of standard forms used in the construction of the Rg is presented in FIG. 59.

DETAILED DESCRIPTION OF THE CORRESPONDENCE SYSTEM

In defining the form of CS, it is recalled, consistently with the theory of the invention, that the U. M., as defined in its four primary existential aspects of real form, user, Rg module and Rg continuum, is a vast assemblage (modal composition) of epistemic instances, or phenomenological correspondences, denoted in the constructions specified thus far in U. G., of an ultimately real universe. The CS controls the occurrence of the extant moments of this enabled universe by controlling the MRS structures of each of the components of the Rg as described thus far.

Just as the CDS is employed in the determination of correspondence of objective non-real forms, and just as the four C's are employed themselves in describing correspondence in various ways denotatively, the CS is used in the Rg to embody correspondence but among the components of the Rg. The difference between the action of the CS and those other actions of other components of the Rg is that the CS embodies the correspondences that hold together the existential forms of the Rg (and android) in the modal existence of it. The CS thus engages the MRS structures of the various components of the Ri, Rp and Rsv modules of the Rg.

Figure 60:
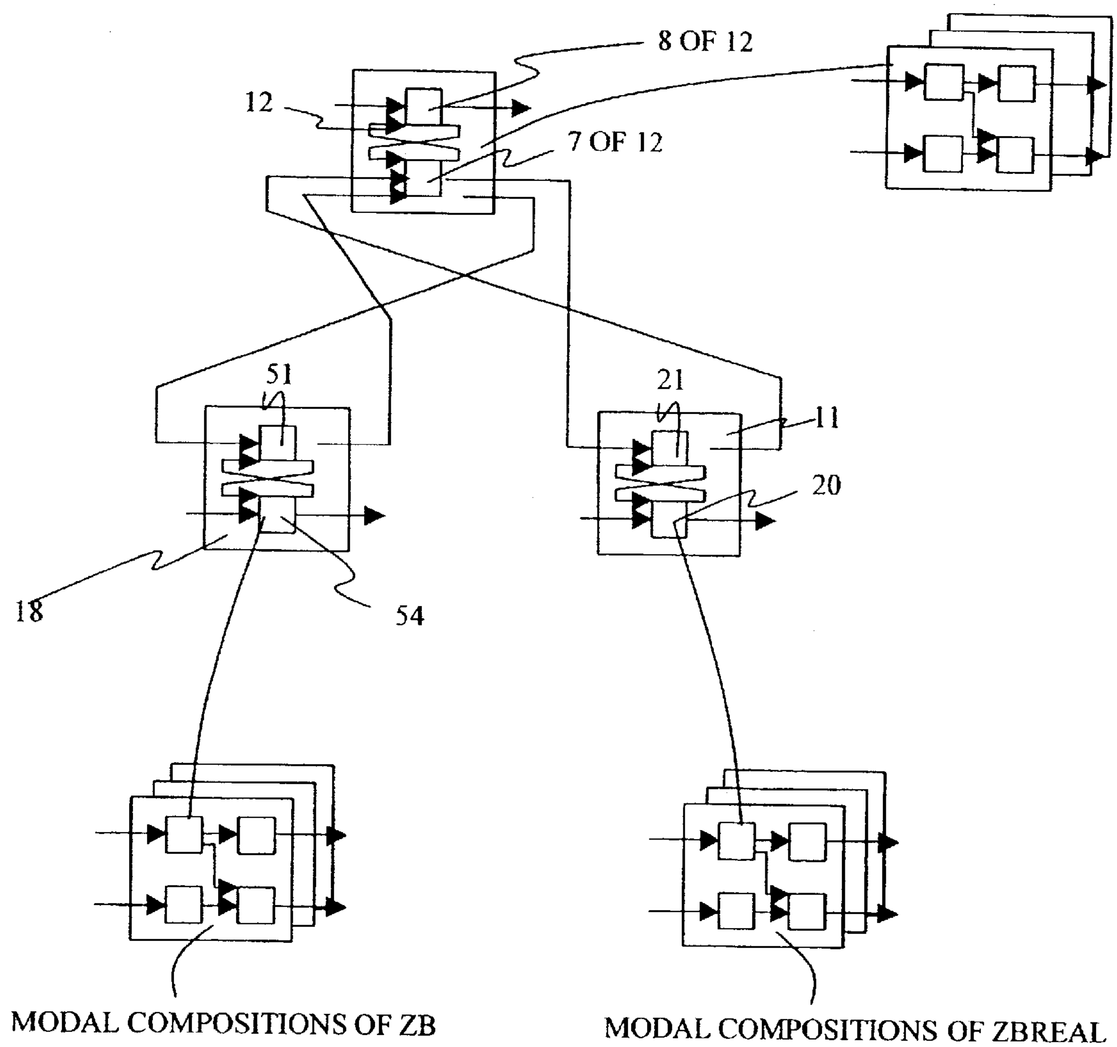
FIG. 60 shows the MRS existential couplings of CS.

The form of the Rg module and Rg continuum is a vast quantumly occurring phenomenology of form which obtains meaning in the declaration of the existential forms of it and in the definitions presented in earlier specification. The entire continuum of form, moreover, is knowable as a phenomenology of form in transformation, as discussed. What this means, in turn, is that the components of the Rg simply are phenomenologies of form as well and the CS determines their correspondences. Thus even though the CS and other forms such as CDS are defined existentially, which means that locally to them an existential transgression of form is made, to the enabler of the Rg, CS, and in fact all aspects of the Rg (except living forms) are knowable as phenomenologies of form. The CS controls this phenomenology wherein, in the embodiment of the CS level of Rg control, the extant moments of the Rg are enabled in relation to each other. The transformation of the Rg component form (MRS structure) through the action of CS is demonstrated in FIG. 60.

A review of the CDS is an excellent place to start a definition on CS structure. In obtaining a correspondence among forms by CDS, a phenomenology of form, namely the CDS, by design, inherently embodies the existence of objects or objective forms, as shown in earlier figures. The phenomenology of CDS, however, is simply a phenomenology in the enabler's knowing. By way of analogy of CDS to computational machinery, the computer, regardless of software and hardware, is a computer, or a phenomenology of form. While the CDS embodies correspondences of only non-real form, the CS embodies a phenomenology of form whose purpose it is to maintain (embody) correspondences of forms which by declaration are either real, non-real, communicative real, translational and so on, or are embodied forms of the Rg so described earlier.

Thus, in reference to the form of CDS of earlier discussion, we proceed to define the Rg, now in light of the enabling structures of CS, which are phenomenologies of form in which are embodied, inherently, the various correspondences of form so described earlier as extant moments of the Rg and Rg continuum. Another way of looking at the principle of correspondence behind the CS or Rg in total is to consider that objects do not exist, as pointed out in the theory of the invention. The phenomenology of the Rg, based on the correspondences enabled by CS, must be founded on non-objects, or transformations themselves. The Rg thus cannot have an objective foundation, just as the objects—$ and X—of the example of phenomenological correspondence of the theory arise from the transformational nature of the universe.

As shown in FIG. 15, the Rg is a vast assemblage of redundantly used existential forms or generic MRS structures. From an enabling standpoint, as mentioned above, such forms are simply a phenomenology of form of enabler's knowing, which in turn are embodied in enabling media. If we begin the specification of CS by interpreting a single correspondence of CS between any two (or more) correspondent forms in light of the forms of CDS, MRS, and RS, the analytical basis of CS is provided even though the CS is a more involved design than any of CDS, MRS or RS.

As shown in earlier figures, the realized forms of RS are caused to exist by the modal realization of the connectedness (quantum porting) over arbitrarily formed phenomenologies of form. In the operation of RS, these forms transformed are referred to as DS structures and the connectivity, in modal realization of a ZBreal, is referred to as XS, under the realizational capacity of DSXS. In the embodiment of RS, which is in fact an MRS, arbitrary quantum transformations of form, composed as non-real ZB forms and realized as ZBreal forms, are possible.

Also as shown in the earlier figures, the CDS, which thus far is defined in the correspondence of non-real forms, is employed in the determination of correspondence of transformational non-real forms. In the phenomenology of CDS, there inherently is embodied, in the action of CDS on the nouns of transformation, a correspondence between the structures so enabled in the separate embodiments of the transformations of the nouns. Thus we may say that if the phenomenology of CDS exists, then indeed the correspondence between enabled objects ($ and X) exists, all of which phenomenologies arise from the transformations of the enabling nouns. A correspondence between RS moments and CDS moments, say in the existential mode of Rg wherein translations of mind through faculties of mind (CDS action) correspond to moments of reality (DSXS action on DS), which reality in existential mode would be partitioned into sense, motor and the rest of the world, is accomplished by the CS action of modes of existence. Similar correspondences occur among the other components of Rg under modes of existence.

In any of the many examples of Rg structure, say for example, DSXS realization of ZBreal, when we provide that A ($) transforms with or into B (X), several definitions of form are implied. First, there is the implied existence of the enabling nouns of the transformation, which at first can be said to exist undefined in aggregate composition, as discussed, with relation to the objects (A and B) and the phenomenology of correspondence. Second, by the existence of phenomenological correspondence, it is required by definition that the transformational forms A ($) and B (X), be they simple causal elements or complex compositions of transformational form, are bound together or are existent as a transformation or correspondence, in turn, of transformational forms. Even though objects do not exist, we ascribe to these transformations A ($) and B (X), when they are held in correspondence to each other in the binding action of H phenomenology, the word objects. Thus in the context of CDS phenomenology and the exemplary DSXS forms, for example, we say that either transformational form A ($) or B (X), each of which can be a vast composition of transformational form, are objects of transformation based on the existence of H phenomenology. Since the nouns of transformation are phenomenological ones, moreover, the objects so enabled derive universally in epistemic instances, which means that the compositions of A ($) and B (X) accommodate all knowable forms, including those of natural language, mathematics, the sciences and otherwise as discussed in the theory.

The CDS thus embodies the modal transformations of non-real objects of Rg, wherein the H determination is not imposed (as is the case in other structures of the Rg such as CS, ES and DSXS), but is employed in the interrogative or declarative transformation of ideas, as discussed in the theory of the invention. ZA, for example, may or may not correspond in any knowable way to ZB. The CDS is applied to make this determination (typically in the default mode). In the existential mode the objects of cognition (ideas) are transformed in the action of CDS as faculty of mind. The Rg, under action of CDS, asks questions (ponders or contemplates ideas) and determines answers (arrives at factual reference realities).

The CS action on CDS and RS thus is an embodiment of modes of existence that determine correspondences between the transformations of non-real translations (CDS) and the moments of real form of the universe enabled or perceived (and acted on) in RS. The role of the CS in the form of the Rg thus determines all correspondences among the components of the Rg, similarly to that which occurs between CDS and RS as described above. A definition of CS thus proceeds on the basis of defining correspondences of the Rg components as mode of existence, wherein, in the special case of the Rg (not android) all modes of existence determined by the CS are subordinate to the communicative modes of existence as described earlier.

When we refer to ZA or ZB or ZBreal, then, what is meant is the existence of quantum moments of transformations of objects, or in the case of ZBreal of DS structures the existence of phenomenological correspondence of DSXS. Thus a D system is an object of transformation which is a composition of U. G. form on nouns of transformation. An instance of ZBreal is an instance of the transformation of objects A ($), or $DS^1$ and B (X), or $DS^2$. It should be recognized at this point that nothing exists meaningfully to an inertial existence except in a theory of existence, since it is the transformation of form (say real and non-real), defmed in universal form that gives rise to the notion of meaning in the very correspondence of form.

When ZA, ZB or ZBreal are placed into existence, what so exists is the objects A ($) and B (X), or $DS^1$ and $DS^2$ of ZBreal and the phenomenology of correspondence, XS, or CDS action in non-real form. We can say that if this condition of transformation exists, or later on is embodied in an enabling medium, a moment of quantum transformation of the universe, giving rise to objects in transformation or the appearance of objects, or in this case a quantum moment of ZA, ZB or ZBreal, so exists not only in the knowing of the enabler but, since they are embodied in the enabling media of Rg, in the knowing and perceiving or reality of the Rg.

Another such quantum moment, obtaining in the same universal form, also can be said to exist. And further, if one can be said to exist, an infinity of them can be said to exist in one's knowing. When one such quantum moment is said to transform with one other, the U. G. expresses a use of quantum connectedness or correspondence, as discussed in the theory of the invention. Thus, whatever the complexity of the composition of the objects in transformation of a single quantum moment (A ($), or $ZA_1$ and B (X), or $ZA_2$), that moment or quantum transformation (epistemic instance of CDS) so transforms by way of correspondence with one other similar in U. G. kind. In linguistics, for example, whether in a single instance a single causal element B (X) such as I am glad transforms with an hour long oration of some ideological speech (composition of many such instances of causal element so composed to embody the speech) A ($), that single quantum transformation wherein a speech is modally brought together in transformation with the expression (causal element) I am glad (it is over), which is able to occur, by definition, in the existence or embodiment of CDS phenomenology of non-real form, so transforms with one other—the next transformation (or thought in the linguistic example)—through the transformational effort of CDS, which in representation carries with it the U. G. forms so described in the theory of the invention. A ZBreal, for example, is represented as the quantum connectedness of causal elements in composition. Object A ($), or causal element A transforms to object B (X) or causal element B in an instance of transformation abiding by CDS or a DSXS phenomenology. That transformation itself, which qualifies as a quantum transformation of universe is, in turn, transformed with one other. The CS, by engaging the causative forms of the MRS structures of the various components, herein CDS and RS, causes the realized moments of the respective components to occur. The CS, for example, causes the faculties of mind of CDS to occur in the existential mode in correspondence with the real transformations of DSXS under ZBreal. In the default mode, since CDS is employed selectively, the CS simply maintains such correspondences with ZB embodiment in ES. CDS is applied only for selective determinations of ZA-ZB (and in turn ZBreal) correspondences. Thus, in the action of CS on MRS structure of the Rg components, correspondences of moments of the existential universe, or modes of existence are accomplished.

Since the CS maintains the correspondences of the extant moments of the Rg, it is to the nature of how one such quantum transformation is so coupled to another, or to the modal realization of quantum moments of form that we now turn our attention in elaborating on the CS.

It can be seen that in the definition of CDS and other components of Rg, and generally of phenomenological correspondence, that objects do not exist, but in the transformation of them. Thus, when one, say, constructs an automobile, a thing called an automobile actually does not exist in ultimate reality; rather the transformation of the objective forms or nouns of the automobile is what exists in the inertial existence of the observer. Thus, what exists in ultimate reality is the transformation of form. When one wishes to define something, in an ultimately real universe, one then must define a phenomenological correspondence of objective form. The modes of existence of CS accomplish this correspondence through their causative action on MRS structure of Rg components.

In our representation of U. G. form, however, it has been shown that A transforms with B in a causal element and that such transformation, in turn, quantumly connects beyond the literal instance of transformation with one other. This is represented in connectedness (and composition) of U. G.

and in air space or looking to one's forehead (for unknowable contemplative effort) in conventional representations such as natural language and mathematics or the sciences, (e.g., I am alive—air space or connectednes—I am happy, or, y=ƒ(x)—air space or connectedness—x=g(t)). It is this air space or connectedness that is enabled in the quantum correspondences of CS.

By analogy to convention again, we can say that each time a compiler of computational machinery is employed, a transformation of compositional forms so exists. In the analogy, neither of the programs, however, exists extantly in this case since it is the conversion or compilation (or simply transformation or correspondence) that exists. For example, in computational jargon, the input to the compiler is the high-level language and the output is the low-level language. One cannot hold either language form, that is, neither program exists objectively but for its transformations. Thus, what exists in the computational art is the compiler or compiling. If the instance of such a quantum compilation of program A (input) to program B (output) is likened to a single instance of transformation or of a causal element, since it actually is one anyway, then the connection (connectedness) to one other similar compilation of other programs, engaged modally, is the quantum connectedness of two such transformational instances of the universe. By analogy, the CS determines or transforms instances of compilation of the conventional art.

Figure 61:
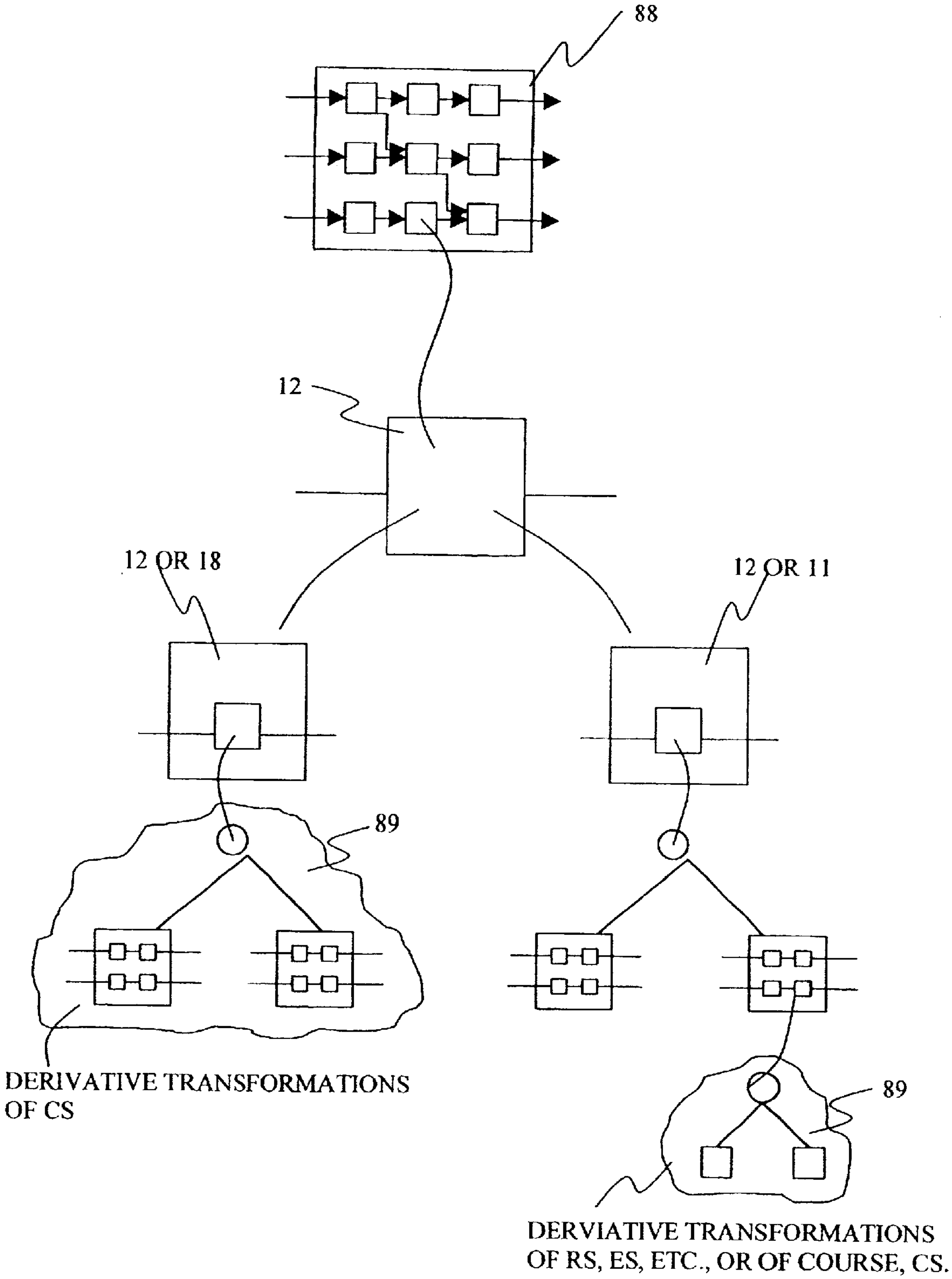
FIG. 61 shows phenomenologies of the derivative transformations of CS in connection with MRS structure of Rg components.

It has been shown in the specification of CDS and in the theory of the invention that CDS or the compiler is a phenomenology of the enabler's knowing or perceiving transforming objects of the Rg's knowing. It itself is a composition of form, though differentiated from others on the basis that it so defines, in particular, how causal elements so transform by metaphor, irony, morphism and so on. As shown in FIG. 61, embodied in its representation is the next lowest or derivative transformation (89) of two or more compositions (e.g., of the programs of a compiler). It thus embodies the meaning (the enabler's view of enabled transformation) of how compositions (elements) transform with one another (or pluralities of such). When a CS action or compilation is embodied, what is implied is the transformation of a derivative transformation, as shown. When another such instance of CS is represented, it too, along with infinitely many others if such be the case, implies the transformation of derivative transformations. When two such CS instances or compilers are coupled in their own representation, what is further implied is the quantum coupling of two or more wholly different extant instances of knowing transformation (or great compositions thereof). The meanings, or the ways in which embodied transformations of objective forms transform, are achieved in the H determination.

In U. G. representation, the literal instances of transformation enabled in CS take on the form of phenomenological composition. By definition in the theory of the invention, however, a composition exists only objectively, and thus is not a quantum transformation of universe but can only transform in such a quantum moment. Thus, we are concerned here with the occurrence of a composition of form in its quantum realization or in how CS moments or compilers are associated.

As shown in FIG. 61, if one CS action can exist, so can infinitely many (in theory). We thus can associate any number of such CS actions or compilers (by analogy) with any other number of such, with the output or effect of one group or plurality of compilers so extantly coupling to the input or cause of another such plurality. When such a coupling of phenomenological form (CS's moments or compilers) is so made, we can say that the transformational forms of one object of composition so transforms with one other in a quantum moment of transformation (of the CS). The phenomenologies of form we have been referring to as ZA, ZB and ZBreal are themselves realized or placed into existence in the associative action of CS structures or phenomenologies of Rg.

Thus, instead of referring to the realized form of MRS as realized form, we can refer to it as real, non-real, sensory, motor, communicative, cognitive, perceptive and so on form of the existential forms of the Rg. In how we determine that such forms correspond to each other will result the form of the Rg on the transformations engaged by CS. Moreover, since such form is defined phenomenologically herein by definition of enabling media, the Rg can be embodied in an enabling media or what is known to be real to an inertial being or enabler.

Figure 62:
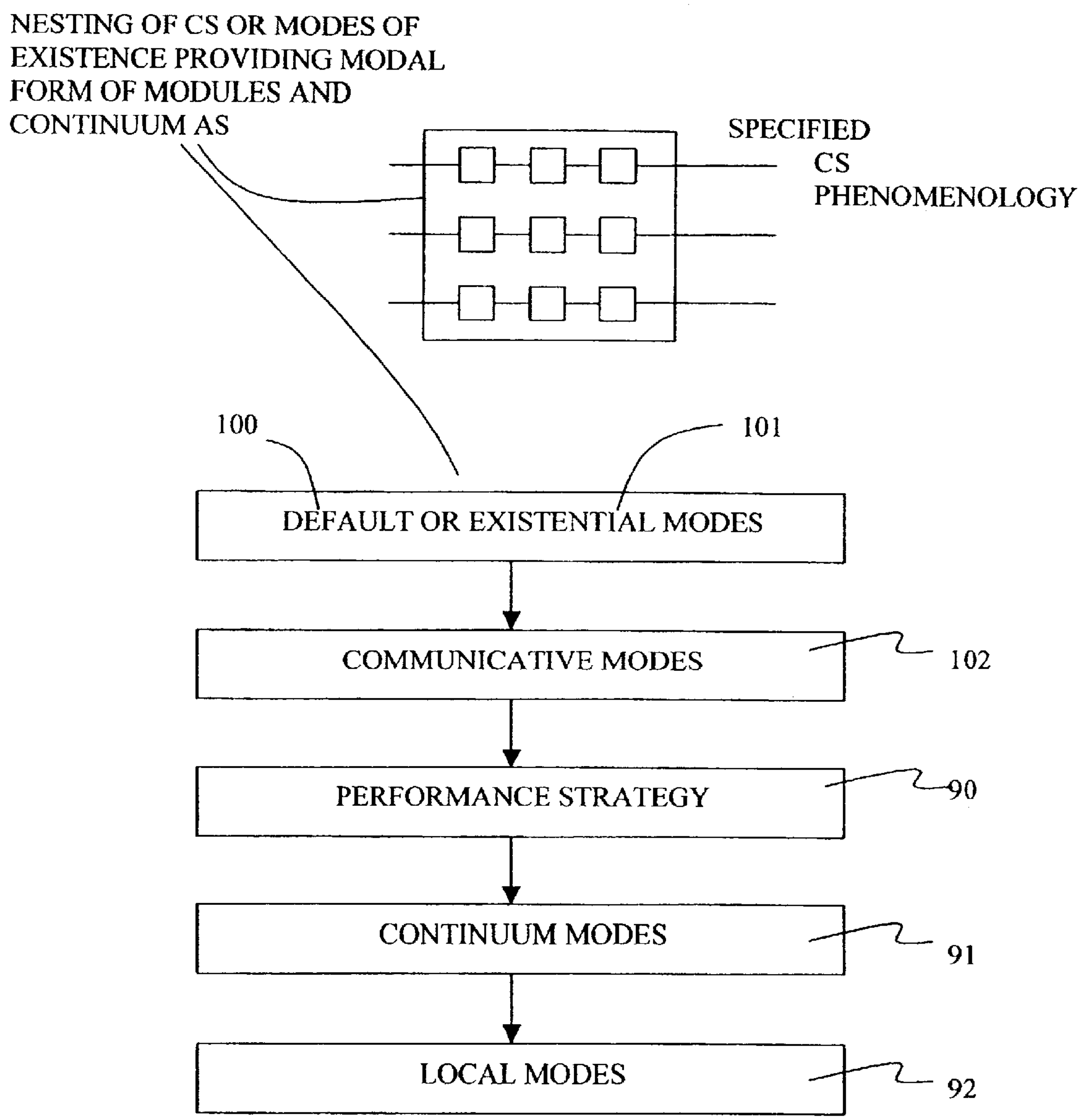
FIG. 62 shows the modal strategy of the Rg under CS action.

As shown in FIG. 62, the forms of MRS are applied in the formation of the form of the Rg under CS. It is defined in earlier specification that real form, namely that of the RS, is held in correspondence with non-real form, namely that of ES and CDS, and that such form as ES and CDS is held in further correspondence with communicative real form of user and Rg in TS. Further, when instead of specifying a configuration on such correspondence of the overall forms of Rg, it is desired for such a user of Rg to so engage correspondences of form, represented and realized communicatively in TS and embodied in ES, such as ZA and ZB correspondences, a CDS is employed. No matter how it is viewed, as mentioned very early on in the specification, the MRS finds widespread use in the Rg under CS action.

The modal strategy of the Rg thus determines the instances of CS action, which, in turn, determines the correspondences among component forms of the Rg. As shown in FIG. 62, the Rg embodies a hierarchy of modes of CS determined first by the existential (101) and default (100) modes since all forms of Rg are different under these two modes—the existential mode transforms inertially and the default mode transforms phenomenologically only under modeling and implementation, requiring even different communications linguistically with the user. Within either of these modes, the communicative modes of the Rg module (102) govern all other modes, including modes that alter the action of CS. The communicative modes require that all CS transformations of the Rg correspond to transformations of TS, ensuring that the Rg does not acquire androidal behavior as an autonomous existence apart from communications with other beings.

Figure 63:
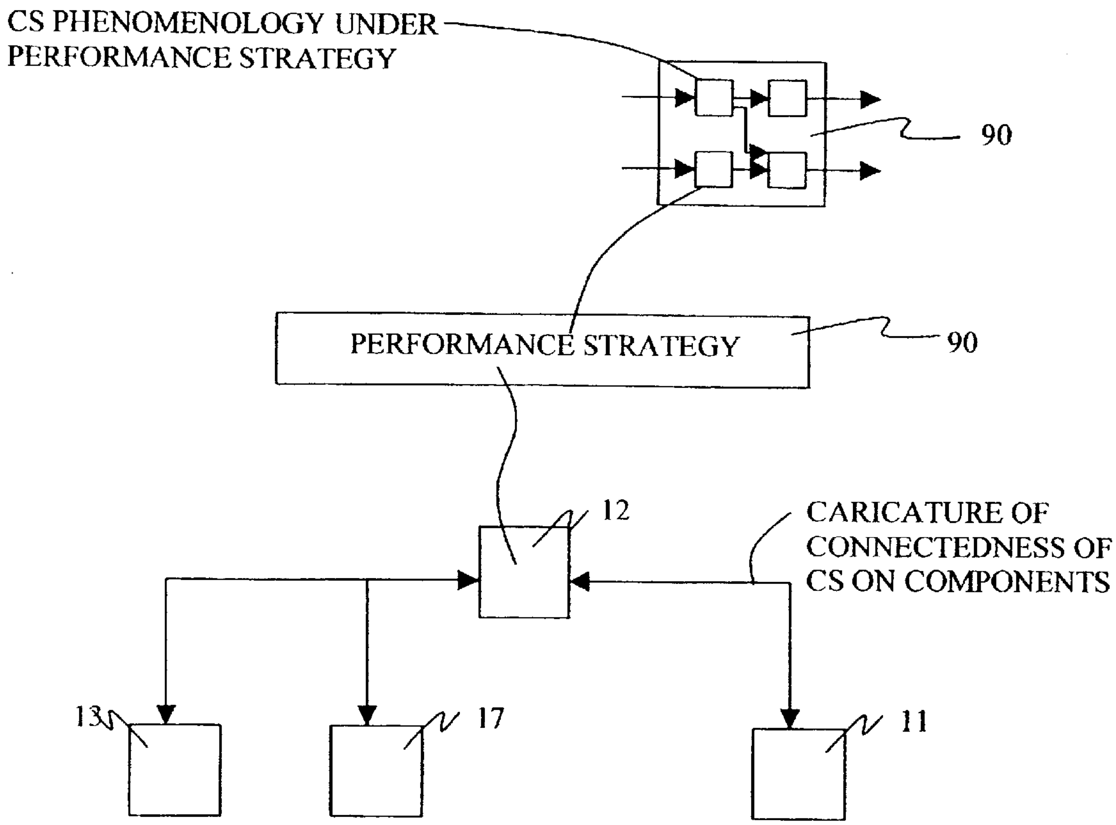
FIG. 63 illustrates the performance strategy of the Rg communicative modes.

Within the communicative modes of the Rg, then, all other CS actions result. Another way of viewing this modal strategy is to consider that a portion of the communicative modes are unalterable as structures of the Rg. The correspondences of these modes enabled by CS do not change as a result of communications with the user (otherwise the subordinate behavior of the Rg would change as a result of communications with the user, which could result in autonomous being). Within the communicative modes, the highest level modality of the Rg is the performance strategy (90), wherein the unalterable communications between the user and the Rg are established. The performance strategy thus determines the prompting action of the default mode and the conversational modes of the existential mode, as shown in FIG. 63. The performance strategy establishes the basis for all other modes of the Rg. The remaining modes of the Rg, which require the majority of the specification of the Rg, however, are considered separately even though they are subordinate to the performance strategy.

Referring to FIG. 62, since the continuum modes alter the local structure of an Rg module, the next tier in the modal strategy of the Rg under CS are the continuum modes (91) of any of the Ri, Rp and Rsv modules. The CS action of the continuum modes determines the preferred platform of any of the modules. While a continuum structure may be in place for an Rp or Rsv, for example, it may be preferred to use the local modes (92) of the module, which are the modes afforded by the module not participative in the continuum (as an island of Rg form). The continuum modes employ the use of MES (discussed forthcomingly) and thus afford the extended uses of the capacities of various modules throughout the continuum. To the extent that Rt, Rs/s or Rs structure on a given module affords local use (92) of the given module, the MES will not override the local modes. In general, as discussed, the Ri determines continuum structure, and thus, in the Ri's local modes, the continuum structures of Rp and Rsv are established. In either local or continuum modes of Rp, local and continuum modes of Rsv are determined. The principle modes of the Rg subordinate to the continuum and local modes—for example, the modeling and implementation process of the default mode—which have taken up a significant portion of the specification, are enumerated and further specified modally in the next section of the specification, entitled modes of the Rg. Suffice it to say that within the abovementioned modal strategy, the functional modes of the Rg are enabled (e.g., the modeling and implementation of ZA, ZB and ZBreal).

Figure 64:
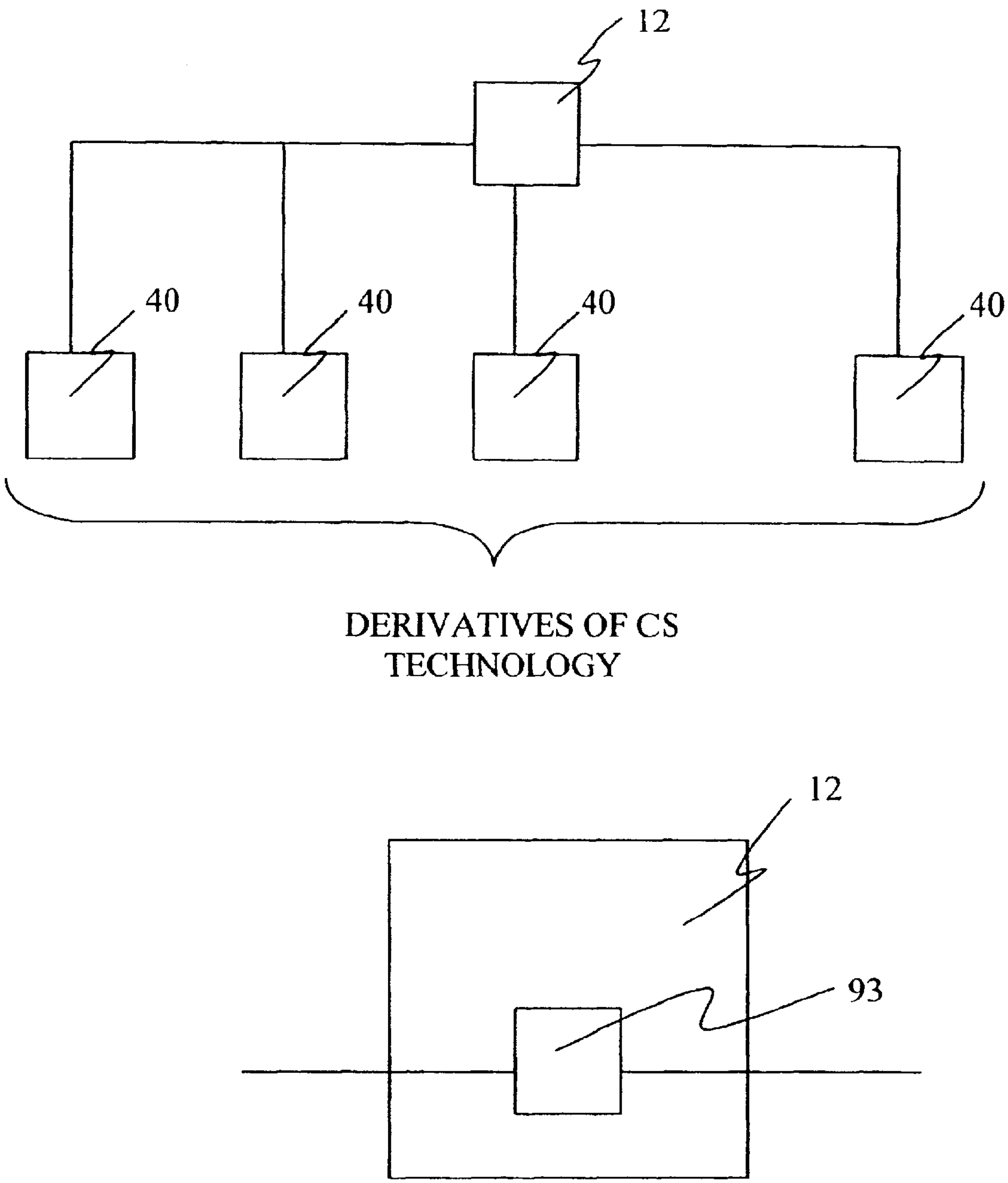
FIG. 64 illustrates MES action governed by CS under continuum modes.

As shown in FIG. 64, the MES can be viewed as a distributed portion of the action of CS in each of the principle terminal components (T, S, C) of the Rg module. Whereas in the local modes of the Rg the principle functionalities of the Rg occur in only the structure of the given module, in the continuum modes, the CS, by acting on MES, simply expands the structure of the local Rg to that specified under Rt, Rs/s or Rs, integrated among modules throughout the continuum. Thus, whereas CS in local modes transforms components designated under local Rg structure, the CS in continuum modes transforms the respective MES structures, which, in turn, transform components throughout the continuum as specified earlier and as illustrated in FIG. 64.

For the purpose of distinguishing configurationally within the CS the modes of CS attributed to the continuum and those attributed to local structure, the continuum modes of the CS are embodied in a Continuum Enablement System (93), or CTES, as shown in FIG. 64. The action of CS in continuum modes over MES structure thus is caused in the CTES, as shown.

Figure 65:
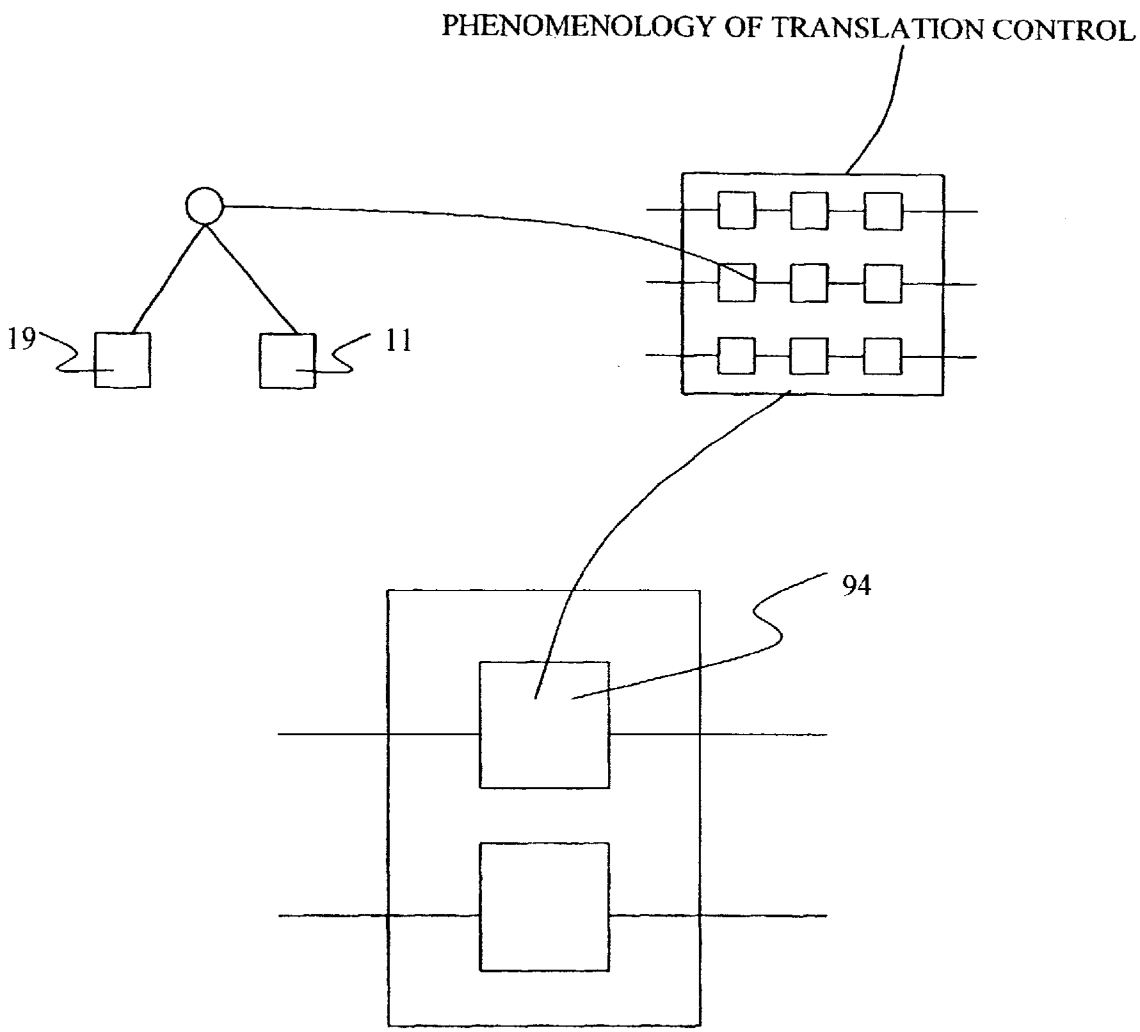
FIG. 65 shows the translation control system.

As shown in FIG. 65, the Translation Control System (94), or TCS, of the CS, is provided in both continuum and local modes of the Rg. The purpose of the TCS is to embody the capacities of the CS to maintain in correspondence ZA, ZB and ZBreal under various continuum and local configurations of Ri, Rp and Rsv modules. In the existential mode, for example, the translations of mind (faculties of mind) correspond to real experiences of the Rg through RS realization. Under a continuum structure, since the Rg forms of existential mode are inertial, the engagement of MES under CTES to integrate Rg form, if it is not carried out with respect to the inertial realities of the local Rg's, would result in the continuum structure not being inertial. For a mental picture, this would be equivalent to attaching various brain matter of different beings without so integrating the inertial perceptions, or even existences under some theory of existence. In the default mode the TCS ensures that correspondences enabled by CDS are maintained throughout the continuum. In the local modes of an Rg module the TCS simply affords the embodiments of ZA, ZB and ZBreal correspondences as specified earlier and as shown in FIG. 65.

The TCS thus embodies the various modes of exisence of the Rg regarded as know how. The voluntary and involuntary modes of existence and the motivation and learning (strategy) of the Rg (as discussed in the theory of the invention) are embodied in the TCS. Since the faculties of mind of CDS, in their translations of non-real form, are the Rg's cognitive recreations of perceivable reality, and since RS embodies the inertial perceivable universe (sense, motor and the rest of the world), the action of CS under TCS establishes the principle existential capacity of the Rg in extension of the user. The faculties of mind of CDS—imagination, comprehension and so on, for example, are deployed by CS under TCS in relation to the occurrences of the quantum moments of grand composition of reality, as perceived and changed by motor action in RS. The capacity of thinking in relation to experiencing (in mind-body dualist theory) of the Rg as a communicatively-constrained being is afforded by the modes enabled by TCS. The action of the TCS, for example, is described in the humanities as the psychology of beings and in psychiatry as, typically, a mind-body chemistry, or the chemistry of the brain (along with physiological processes, etc.). What is engaged by the TCS thus is not a simple modality of a machine in the sense of the unsophisticated conventional art of machinery.

Premised on the U. G. forms of phenomenology and the arbitrary forms of existence, the TCS thus embodies the Rg's capacities to learn, to reason, to imagine, to ruminate, to invent and so on, in relation to its inertial experience. The TCS applies the faculties of mind of the Rg in such a manner that the reality of the Rg (ZBreal) is altered by motors and perceived in a world around us so that the Rg contributes toward improving the human condition, Since the TCS applies faculties of mind which recreate reality, and since the beings inertial reality is determined by what it can perceive and change around it in relation to self (the pronoun system), the capacities enabled in sense, ZBsreal (41); motor, ZBmreal (42); and rest of world, ZBwreal (43), determine the modal engagements of TCS. If in ZBreal of existential mode, for example, five global shapes of perception are enabled in the DSXS transformation of DS, it would be preposterous to expect that the modes of existence of TCS could apply faculties of mind such that the Rg would come to know the transformations of the aggregates (its of quantitative orders) of modern mathematics, since the Rg would have the capacity to perceive only five objects in aggregate. The Rg's existence, in terms of mathematical knowledges, would be restricted to transformations of five objects, similarly to the intentionally constrained dot android of the theory of the invention. As discussed in the theory, however, when the infinite breadth of transformations of the enabler's universe are considered, along with even conventional motors (phenomenologies of machines, with machines defined as any phenomenologically transformational device including atomic, electronic, mechanical, chemical and so on media), the conformance of the Rg's modes of existence to those observed in a theory of existence of human corporal form becomes more precise, since the Rg perceives and changes reality in capacities closely aligned with human corporal form (the five senses, though infinitely many senses and motors are possible in the Rg such as radars, etc. as discussed in the theory). When the senses and motors of RS of Rg are enabled in this way (closer to human sense), such as by way of acoustical machines, vision systems, strain gauges (remote arm compliance of robotics) and so on of the conventional art, the Rg has the capacity to perceive and change more and more of the breadth of the inertial world of the enabler, and its language forms (translations of mind) become more synonymous in meaning to those of the enabler. In the default mode of Rg, of course, the TCS modes are jogged by the user or engaged by the prompting strategy of the default mode. In all the TCS is responsible for maintaining the consciousness of the Rg in correspondence, under the TCS strategy, with the Rg's real form.

DETAILED DESCRIPTION OF THE MODES OF THE Rg MODULE AND Rg CONTINUUM

We may now account for the modal constructions of the Rg module and the Rg continuum in terms of Rg detailed structure. Based on a knowledge of the U. M. as specified thus far it can easily be seen that the form of the Rg transforms, or embodies transformations of the universe, in such a manner that its transformations of Ri, Rp and Rsv modules of the continuum correspond to the knowable forms of TS in correspondence to the user's non-real form or thoughts as they are expressed (realized) or comprehended (represented) by the user or Rg. Even though the action of CS governs the form of the various modules, thereby subordinating (certain) users to its transformations of form, eventually, at the Ri, which depends on Rt, Rs/s or Rs structure, the entire continuum is placed in correspondence with the user at TS. It is to the nature of the correspondence between the Rg module and Rg continuum structure and the forms of TS that we now take interest in specifying the modes of the Rg. Since the various structures of the Rg and Rg continuum already have been specified, we consider now their relation to TS structure. We may say that we now consider what a user of the Rg knows at TS in relation to Rg and Rg continuum structure.

Just as one would not converse with one other inertial being in ordinary experience by stating objective forms such as ZA or ZB, or more realistically dog or house, but would say something to the effect of Let us now change ZA or ZB or The dog is in the house, the transformations of TS, the meaningful communications of the user with Rg, are fluent in connection with the Rg's modal existence, except wherein the default mode is made to act more like an interactive device of the conventional art. These modes of conversation thus pertain to the meanings of the knowable forms so embodied in the Rg. Just as one may know in an exchange with one other that certain conversation (or knowable communicative form) is over one's head or not meaningful, the meaningful context of form of the Rg arises in and of the forms of ZA, ZB and ZBreal as discussed. Thus, even though in the existential mode of Rg, an inertial existence is enabled, leaving open the possibility of the full extent of natural language (such as is the case with android), as a consequence of the design of Rg that it serve or be subordinated to the user, such experience, as designed into the CS, is required to focus on the determination of correspondence of ZA, ZB and ZBreal of Ri, Rp or Rsv modules. Of course in the existential mode such forms as ZBreal are the knowable forms of ZBreal sense and thus existentially (or inertially) are the Rg, and thus the communications with the user are about the form of Rg, or about its existence. Note that such a subordinating limitation is not placed on android. In the default mode, the modal communication is much simpler and we can begin with it.

Figure 66:
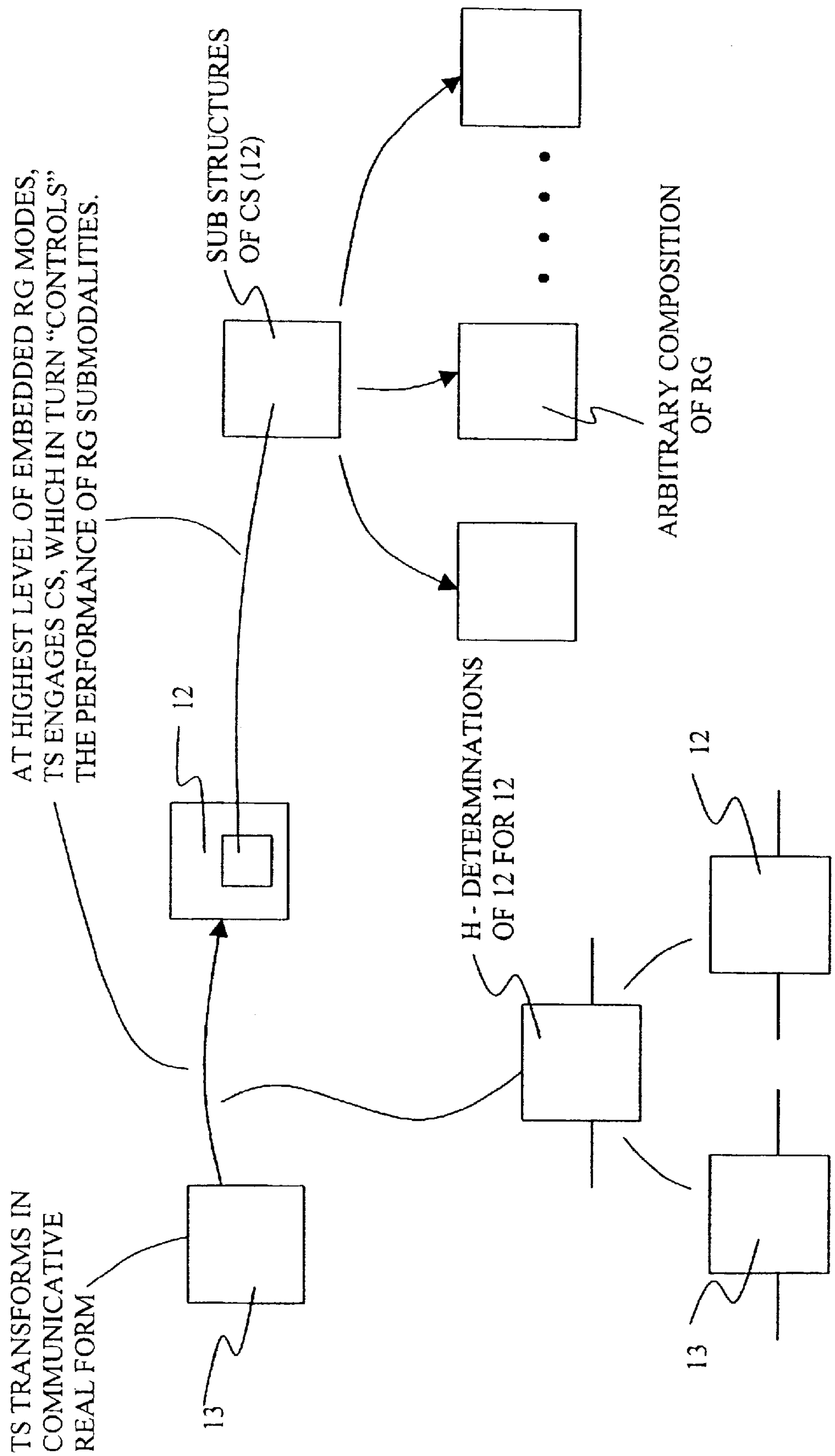
FIG. 66 shows the TS-CS correspondence of CS of Rg modes.

The notion of embedding modalities of form under a modal strategy, introduced earlier, involves simply the placement of a composition of form on the modes of existence or on the use of CS (via CTES and TCS). In the conventional art of computational machines, for example, such embedding of modes of the engagement of form is referred to as an operating system. In the conventional art of mechanical or electromechanical (and otherwise) machinery, such embedding is called a control schema. What these terms mean is that the machinery will obtain form or a modal configuration in causal relation to some controlled (specified) input which usually is a representational form. A significant distinction thus is drawn between conventional art and the U. M. in that the U. M. does not have input per se. Rather, one transformation of form, say at the TS can, by way of CS, be made to correspond to other transformations of form, namely those of the other components of the Rg. The principle of embedding modes of existence, however, is employed in the Rg such that the CS itself is made to correspond with TS structure, or rather, the CS, which controls the form of the Rg, is made to causally correspond to TS form as shown in FIG. 66. What this means, as discussed earlier, is that while an android, for example, is modally structured in CS autonomously, the very forms of CS of Rg, which do in subordinate cases maintain correspondence generally between TS and other forms of Rg, are caused purposefully by TS. Otherwise the user would not be able to control the structure of Rg.

The form of the Rg, then, can be viewed operationally or functionally, not from the standpoint of an enabler of the Rg as has been the case all the while, but from the standpoint of the user of the various modules in consideration of the modes of the Rg.

Figure 67:
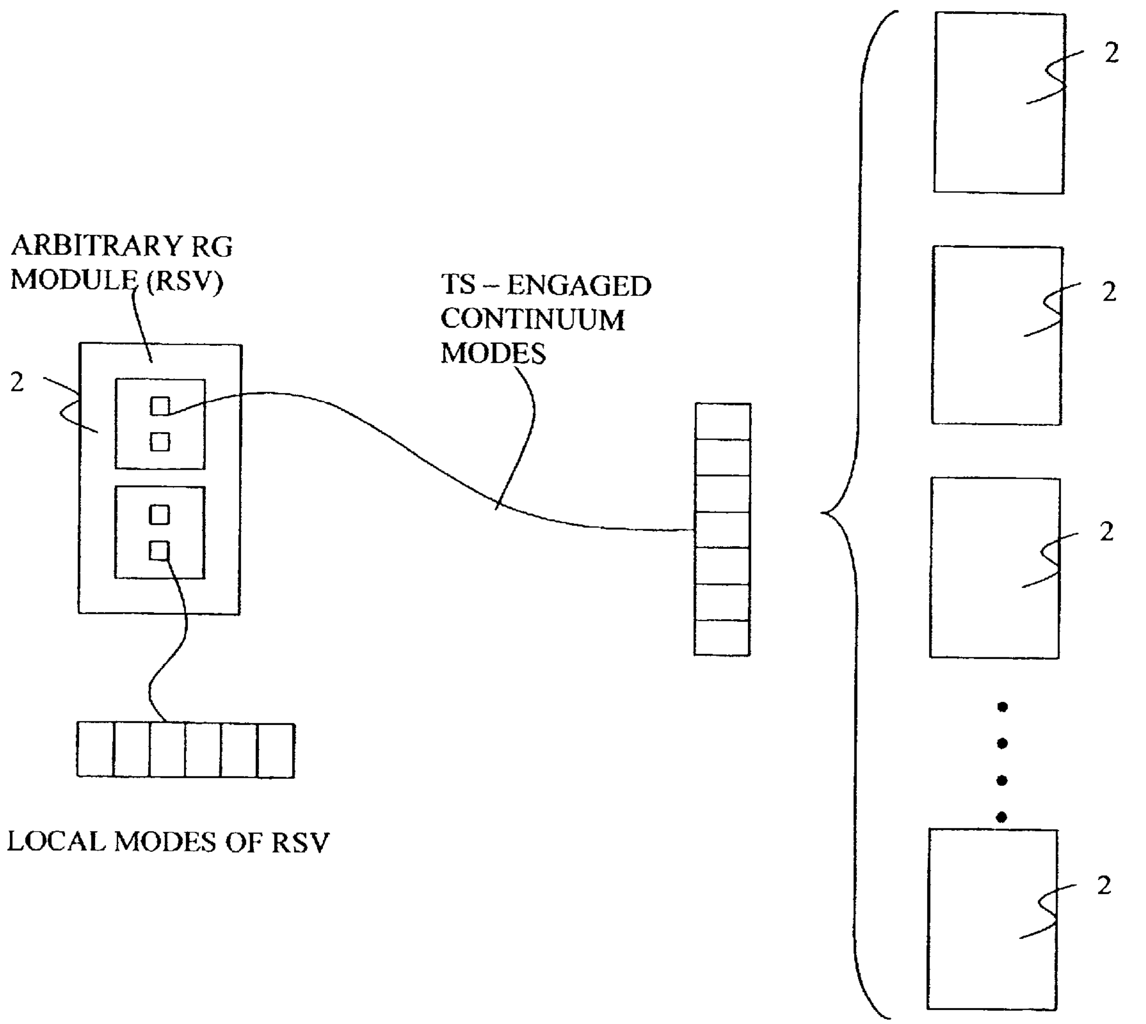
FIG. 67 shows TS engagement of the modes of Rsv.

As shown in FIG. 67, we consider first the Rsv module. Any engagement of TS in the experience of the user or Rg, in this modality of Rsv, obligates the Rg to perform (embody structure) under such known condition of TS. For example, in a defaulted Rsv, a realization on the part of user in this mode, referred to as the Continuum Mode of Rsv, CMRSV (95), causes the CS to embody the modal framework of compositions within which subsequent or subordinate structure will transform under continuum structure of Rsv. In the existential mode this is engaged, for example, in the linguistic expression Let us consider now a continuum ZB, of Rsv. Subsequent communication between the Rg and user will perform in the modality embodying the modal activity of ZB transformation throughout the continuum. The knowable (by the user) transformations of the continuum modalities in TS structure, along with their continuum structures of the Rg, are deployed under an appropriate modal strategy as shown.

In general, the TS forms shown engage the CS to modally engage the respective continuum forms of Rsv. In order to engage more of the services of the Rsv module, moreover, one would have to be in a particular continuum modality shown. When a TS-caused modal engagement of Ri modality from an Rsv occurs, for example, the Rsv module performs in a disengaged capacity, from the standpoint of its functionality, in order to allow its use of TS to extend from the TS of Rsv up to the Rp module so realizing the Rsv module in the first place and into the Ri module. This action is possible from the TS-caused engagement of respective CS structures as shown. In order to oblige the Rsv to its standard (non-continuum) capacities a communication with TS would have to cause CS to so structure the Rsv accordingly, with the consent of Ri.

As shown in the figure, an option is made available to the Rsv user to work within the locality of the Rsv module, to the exclusion of the continuum structure afforded to the Rsv in extension of other modules. Such a local use of the continuum form of Rsv is referred to as the Local Modality of the Rsv, LMRSV (96). Thus in any usage of the Rsv either the user is engaged in the use of continuum modes, CMRSV (95) or local modes, LMRSV (96). The continuum modes then are partitioned into Global Continuum Modes, GCMRSV (97) and Local Continuum Modes, LCMRSV (98). The global continuum modes accommodate the accessing of any form of the continuum from a particular Rsv. The local continuum modes are such usages of Rsv wherein the local structure of Rsv is employed within the Rg module. The local modality of the Rsv thus is possible only to the intentional exclusion of the continuum modes (91). Generally the TS transformations of Rsv concerning its continuum modes abide to Ri structure as known from the perspective of Rsv structure and representation. The local continuum modes (98) may be accessed from within the local modes of the Rsv, since a continuum of local structure does not affect the Rg continuum globally.

Figure 68:
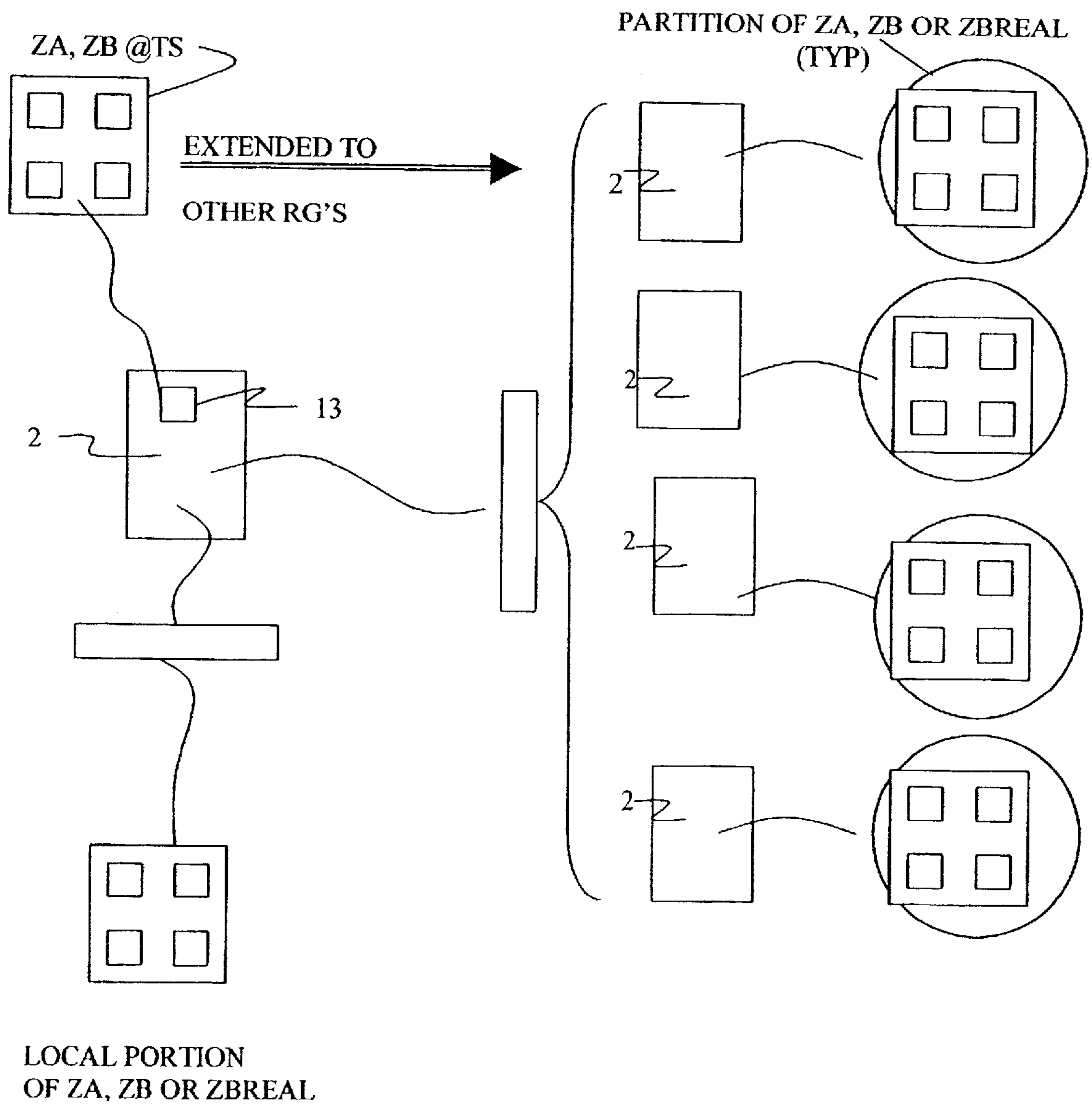
FIG. 68 shows the local modes of the Rsv.

As shown in FIG. 68, the local modes of Rsv are the principle modal forms of the Rg that have been discussed all along with regard to the basic (non-continuum) forms of modeling and implementation. They relate to the creation and modification of ZA, ZB and ZBreal structures. Since the entire form of Rsv is enabled in Rp modality, the ZB and ZBreal platform (e.g., ZBT and DS) and the ZA-ZB embodying capacities (e.g., ES) of Rsv are bound by the Rp module. The local modes of Rsv thus pertain to the creation and modification of ZA, ZB and ZBreal from the perspective of the user, since they already exist in their quantum transformational embodiments from the enablement of Rp of Rsv.

As shown, many such modalities exist locally to the Rsv. Generally, they are engaged to create or modify ZA or ZB structure; to determine correspondence among ZA or ZB structures (ZA—ZA; ZA-ZB; ZB—ZB); to realize ZB as ZBreal; and to engage in the prompting and overall correspondence of the forms of ZA, ZB and ZBreal to the extent that such control is delegated by the Rp to Rsv modality.

Figure 69A:
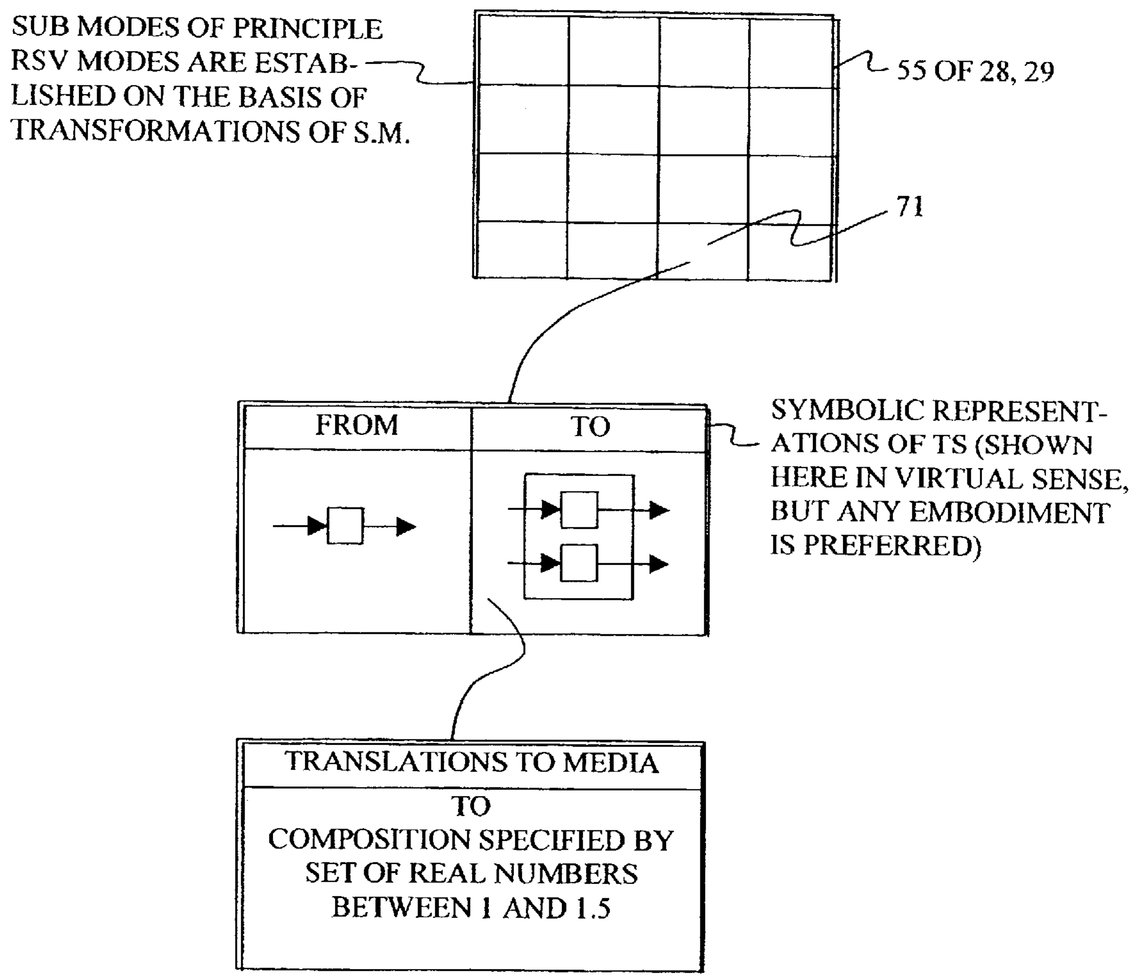
FIG. 69*a* illustrates the principal SM sub modes of each local and continuum Mode of the Rsv.
Figure 69B:
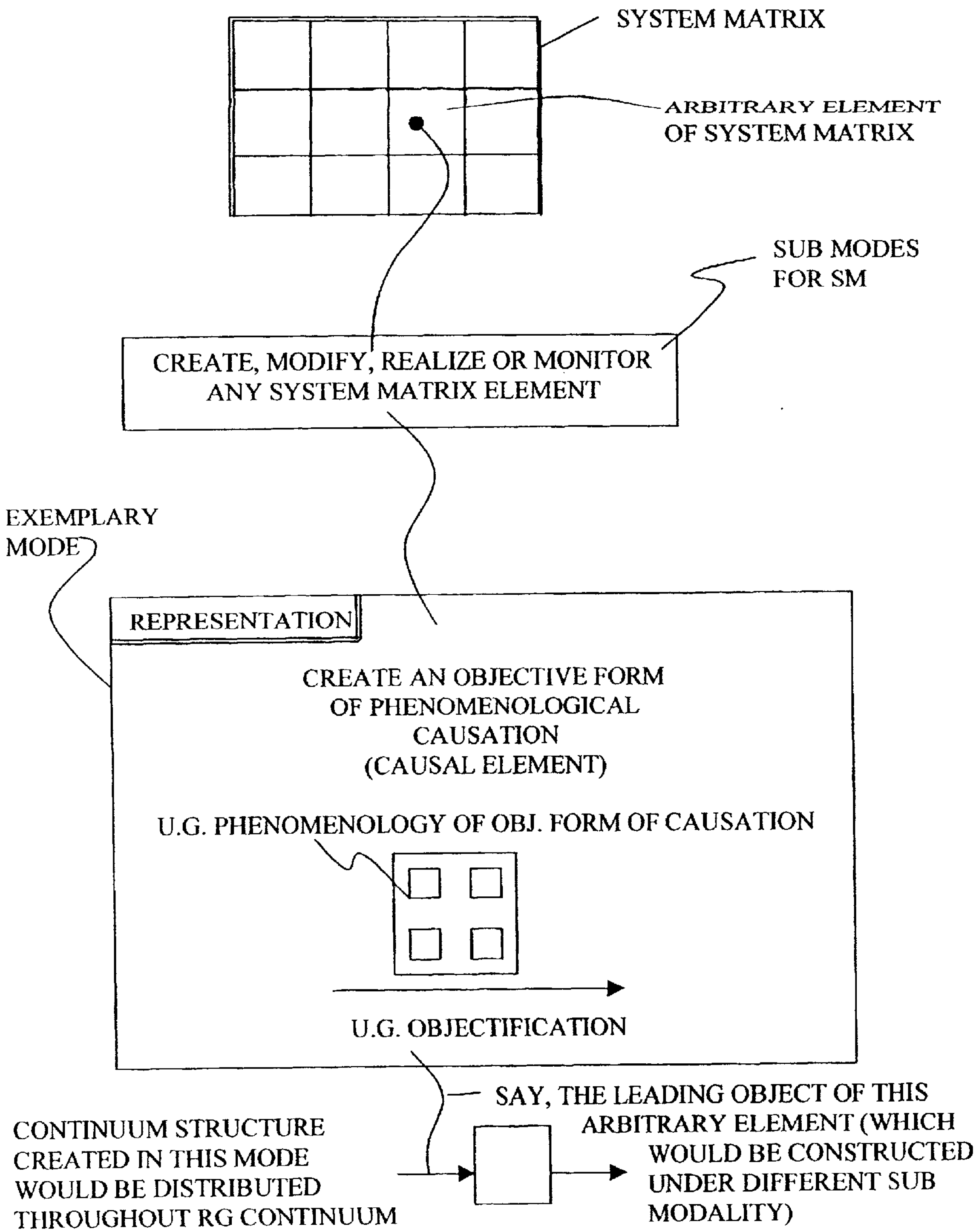
FIG. 69*b* is a list of sub modes of local and continuum modes of Rsv.

Each embedded local modality of the Rsv concerns the development and correspondences of the forms of ZA, ZB and ZBreal. Since the forms of the U. G. are consolidated in the form of the system matrix, as discussed earlier, the local modes of Rsv thus pertain to the creation and use of SM elements, the whole of which in any given case is a ZA or ZB structure. As shown in FIGS. 69*a* and 69*b*, each embedded modality then pertains to the CS control of changes in SM structure relating to the general forms of ZA, ZB and ZBreal. The TS transformations or symbols of TS, when transformed, are so held in correspondence with their ES structures. In operation of the user, interactive representations and realizations of cognitive form of user translate into ES transformations of the particular SM embodiments in ES. A communication such as change ZB10 to ZB40 is held in correspondence with ES so that the quantum transformation of TS, namely the real form embodiment of change ZB10 to ZB40, occurs corresponding to the transformation of SM in ES.

As shown in FIGS. 70 and 71, the principle local or continuum modes that engage the transformations of ZA and ZB structure by way of the abovementioned SM sub modes, respectively referred to as the ZA modification mode (1) and the ZB modification mode (2), are simply employed for the creation and modification of ZA and ZB structure of Rsv. How these modes affect the principle components of Rsv (TS, ES, RS, etc.) is summarized in the tables of the figures. Generally, these structures transform in accordance with modeling and implementation of the default mode (31) and modes of existence of the existential mode.

As shown in FIG. 72, similar communications, but regarding CDS use, apply to the modal engagement of CDS referred to as the ZA or ZB correspondence determination mode (3), wherein TS structure embodying, e.g., apply CDS to ZA400 and ZB80 so engages CDS structure in the determination of correspondence of ZA400 and ZB80. Of course this would be further specified in terms of elements of SM of ZA400 and ZB80. In the existential mode the CDS is engaged under faculties of mind by the modes of existence and ZA and ZB form is embedded within the inertial (pronoun) forms of translation. As to the nature of the form of Rg at any given quantum moment of its transformation, it should be recalled that this is what we are establishing herein—modal structure of Rg in relation to TS. Any quantum modality of Rg thus relies on the communicated form of TS. One thus could have previously engaged CDS and subsequently engaged a continuum mode, which by way of CS would have changed the modality of Rg from CDS employment to continuum use, say in accessing Ri modality. Moreover, since the Ri structure presides over Rp and Rsv modality, a user could be communicating at an Rsv level and be discharged from the structure of the continuum by a superior structure of Ri.

As shown in FIG. 73, the realization of ZB form is provided in the realization of ZB mode of the Rsv (4). Since such realization requires the use of CS over ZB-ZBreal correspondence, however, methods of prompting of default mode and levels of cognitive faculty of the modes of existence of existential mode are employed in the use of this modality. In general this modality accommodates the use of RS and thus is represented accordingly to the use of CRCS, CES and so on. The primary functionality of this mode is of course the discovery of form of use to the user, in either the prompting of default or the cognition of existential mode. Since ZBreal transforms in a modal strategy of CS, the ZBreal-ZB correspondence so conveys valuable structures of ZB that pertain to the intellectual achievement of the user or Rg. By use of translation of ZA-ZB correspondence, in connection with ZB-ZBreal correspondence, the user discovers new ZB structure or new understandings of what is inertially real, or reference ZB. Since there are infinities upon infinities of possible forms of ZBreal or reality, the knowledge forms of such are what are significant to the user. The knowledge forms are particular conditions (compositions) of ZB. The CS will engage a different modality of Rsv, namely a realization to the user, (which is a representation in the user's non-real capacity) through TS-ES correspondence, when a particular relevant form of ZB is discovered under prompting of default. This is the mirror image to the user's use of ZB—ZB (and ZA-ZB) correspondence, and the Rg thus determines a ZBx that is close inform to ZBy, which in turn, by the user's account (or Rg's) can be so determined in correspondence with particular ZA's or arbitrary forms.

Figure 74:
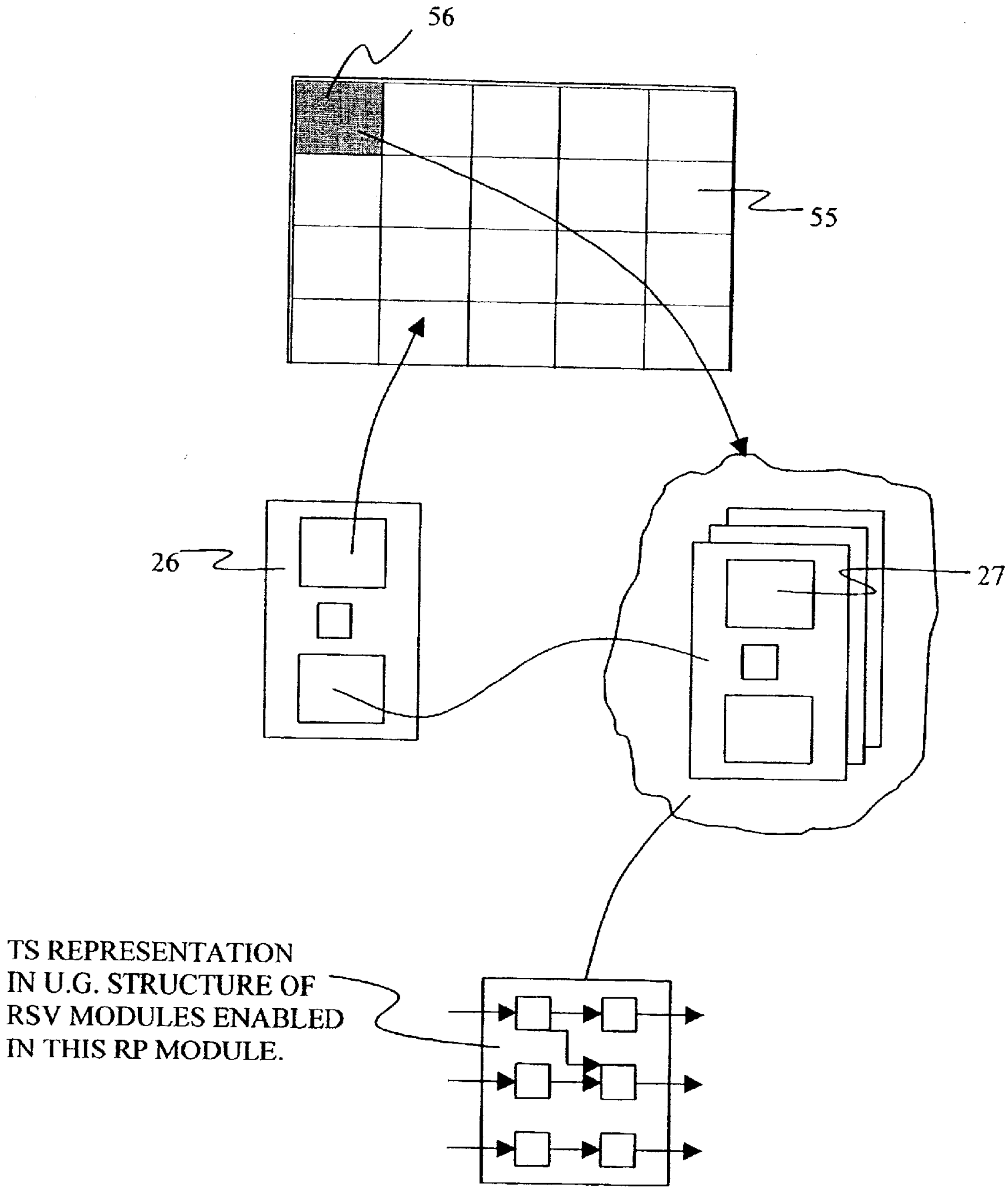
FIG. 74 illustrates the local modes of the Rp Module.

As shown in FIG. 74, the Rp modes are established in the same manner as Rsv except the Rp continuum forms pertain to the use of pluralities of both Rp and Rsv modalities, since Rsv modules are so enabled, subordinately, to Rp modality. Moreover, whereas the SM forms of ZA, ZB and ZBreal (of the local modes—figures 70, 71, 72, 73) are open ended in Rsv modality, they pertain only to Rsv structure in Rp modularity, as shown, and thus use the same reference numerals as Rsv (1, 2, 3, 4). Since the Rsv local modes of Rg are identical to Rp local modes, except for the constraint that ZA, ZB and ZBreal are restricted to structures of Rsv modules, the specification of Rp follows from that of Rsv. Whereas the platform of Rsv is enabled in Rp, however, the platform of Rp is enabled in Ri.

Since the Ri module enables the Rp and thus Rsv modules it is distinct from them in form in several ways.

Figure 76:
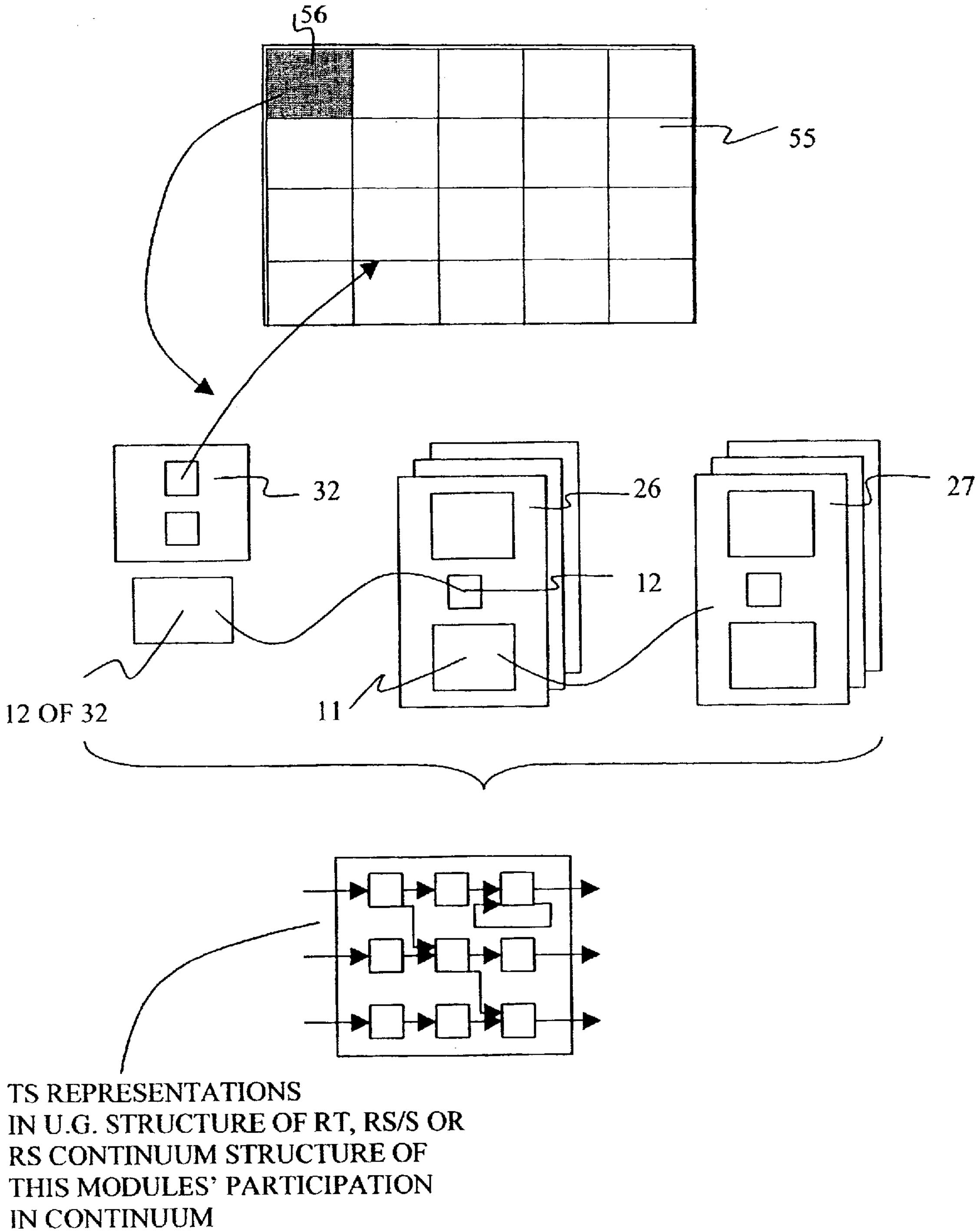
FIG. 76 illustrates the local modes of the Ri Module affording the continuum modes of the Rg.

As shown in FIGS. 75 and 76, since the Ri is employed to expand or contract the continuum, its own capacities to so model (ES-TS) and control (CS) the continuum of forms are themselves expandable. Referred to as the Modification of Ri Platform Mode (5) of the Ri, such a mode accommodates the modeling of the Ri's own capacities, as shown. For example, in the development of the continuum the need arises to expand in aggregate order the number of modules in the continuum. If the Ri did not itself have a capacity to expand its embodying capacity, it would, eventually, not have the capacity to so model the expansion. The various affects on Ri configuration are shown in FIG. 75.

As shown in FIG. 76, the Ri engages all the modalities of the continuum in accordance with Rt, Rs/s or Rs structure. As mentioned earlier in the specification, the Ri module does not embody (in the preferred embodiment, though it certainly can, optionally) an RS, since the Rp modules are hand realized by the enabler, as previously discussed. The local modes of the Ri are identical to Rp and Rsv modules, except ZA, ZB and ZBreal are the continuum structures of the Rg continuum based on Rt, Rs/s or Rs configuration. The CS thus maintains the correspondence between the Ri's model of the Rg module's participation in the continuum and the actual continuum, which is hand realized. The platform mode of Ri thus accommodates the Ri's capacities to support the modeling and correspondences of the continuum structures of the various Rp and Rsv modules.

The existential modes of Rg can best be described as inertially linguistic even though much of their useful engagements pertain to ZA, ZB and ZBreal, so defined inertially. What this means is that all of the modalities of the default mode, analogously, apply to the existential mode but in the existential mode all communications, or TS transformations, are inertial or have meaning intrinsically to the Rg as well as inertially to the user, since they share the same inertial reality as discussed earlier. To the extent that TS dependence of the modal structures of Rg in existential mode is lifted, the Rg thus behaves more and more like an android, and to the extent that its conversant modes with the user immediately exert influence on its structure the Rg behaves more and more like the default mode as described. Generally, the modes of existence, communicative modes, and faculties of mind apply to the existential mode and thus only the inertial meanings of TS forms engage the modal forms of Rg in existential mode; that is, the Rg must understand communications inertially in order to so transform modally. The conununication between the user and Rg in existential mode thus are meaningful, inertially and intrinsically, to both the Rg and the user. As discussed, the continuum structures of the existential mode behave like institutions of corporal form on human being, since the inertial experiences of the various modules of Rg in existential mode (which should be thought of existentially as pseudo androidal beings subordinated to communicative modes) are shared among the modules and cannot simply be coupled phenomenologically, as is accomplished in the default mode.

THE GENERAL METHOD OF TRANSLATION OF THE U. M. TO ENABLING MEDIA

As discussed in the theory of the invention, the U. G. is a grammar of arbitrary languages symbolically defining the ultimately real form of the universe in ways that are useful to the creation of epistemological forms, which include prior art technologies. As a result of the transparency of the U. G. in its capacity to decompose, or translate to or from arbitrary language forms, all constructions of the U. G. are ultimately real constructions of the enabler. This means that any method or apparatus defined in the U. G. is a form defined in the ultimately real moments of the universe; the method or apparatus translated to the U. G.—once translated—annot be defined more fundamentally than its expression in the epistemological forms of the U. G., since the U. G. grammatically underlies arbitrary language constructions.

A conventional method or apparatus, when it is conceived and so defined as an invention, results from the translation of one language construction to another, but is not fundamentally (only) the process or object it is thought to be to the inventor; it is an expression of the occurrence of the ultimately real universe in a particular conventional language, in absence of the U. G. This, for example, is why a specification of a conventional method or apparatus (a translation to a known language) is an equivalent, in most fields, to the reality of the invention, since the process or object (thing invented), beyond the perception of it, is a non-real form (understanding of language forms) in connection with the capacity to realize the conceived form. This is a principle observation leading to the specification of the modeling and implementation process of the default mode of the Rg and many other constructions of the Rg as well. The translation of language forms thus is more enabling than the perception of the invention, since perceptions must be made to correspond to language forms to be known anyway.

An automobile is a translation of such principles or concepts as kinematic and dynamic motion, steering, power transmission, physical encasement, shock absorption (damping), combustion, friction, electronics, aerodynamics, and so on, into language forms that are known by the automotive engineer such as steel fabrication, polymer and composites production, fuel combustion, elastic analysis, kinematics and dynamics of machine elements, control theory, vibrations and—other knowledges of the world around us. When the aforementioned principles, concepts or ideas, as known in their newly-conceived configuration, are translated into the languages of engineering, the automobile is said to be real or realizable, since the reference forms that represent what is real or realizable (engineering languages), have been translated into the conceived ideas or forms of the new configuration. This constitutes the conventional specification of an invention.

The production techniques employed in the actual fabrication of the invention, or automobile, however, are not ordinarily required in the definition of the invention since the object is said to be enableable once translated to reference forms even though the reference forms themselves must be realized in bringing the invention into reality. The robotic arm that welds a chassis of an automobile, for example, may be an invention itself, and is not required to be specified in the invention of the chassis. If welds or mechanical fasteners are specified in the assemblage of steel I-beams or channels, the chassis is said to be enableable. In regard to inventions and designs in general, the translation of the concept of the machinery to the reference forms known in various languages (mechanical, chemical, biological, electronic and so on) of the enabling forms of the machinery constitutes the specification of the invention or design and is said to be real or realizable. This approach, of course, depends on the underlying premise that the concept, or what is new about the invention or design, is not itself described already in a language of forms that inherently represent what is realizable (e.g., that the concept is not defined in forms that are already known).

It is shown in the theory of the invention that the U. G. translates to all languages universally. All expressions of mathematics (analysis, topology, algebra, number theory, set theory, group theory and so on); all expressions of the physical sciences (physics, biology, geology, astronomy and so on); all expressions of the cognitive sciences (psychology, sociology, linguistics and so on); all expressions of the political sciences (government, jurisprudence, economics, etc.); all the forms of natural languages (English, Mandarin Chinese and so on) and indeed, as a subset of these knowledges, all the forms of conventional technologies (and future art) are shown in the theory to translate universally to the U. G., since the U. G. underlies them all. Any form that is known (or perceived) is universally expressed in the U. G. as a form on Being, or an epistemic moment of the universe, or a modal composition thereof, based on the four C's and the arbitrary forms of existence constructed therefrom, as discussed. The modeling and implementation process takes advantage of this within the U. G. framework of the Rg.

Figure 1:
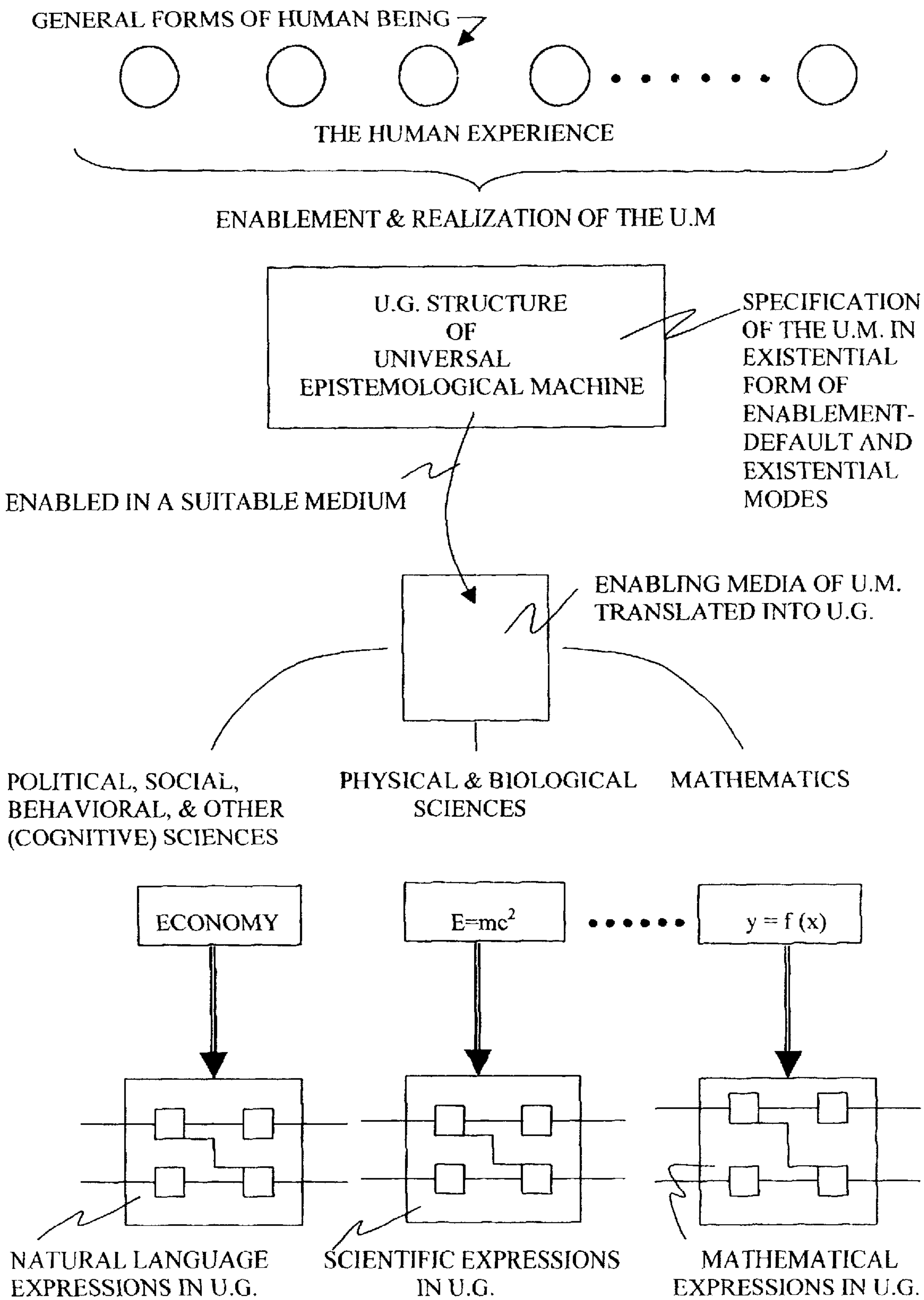
FIG. 1 is an overview of the enablement of the U. M.

Further, the U. M. (Rg and Rg continuum) itself is specified in the U. G.; it is a form that is constructed of epistemic moments of the universe. It universally translates into any knowable or perceivable form of any language. This means that the Rg and Rg continuum are enabled in any knowable or perceivable form of any inertial existence. As shown in FIG. 1, this means that the inertial reality that corresponds to any form of any language can serve as enabling media of the U. M. The living forms of the U. M. (human users and participants), of course, are unknowable and embodiable only and, as discussed earlier, are incorporated into the U. M. by declaration only. A mental picture of this concept of the enablement of the U. M. can be gleaned from the following example regarding the ultimately real equivalence of political and physical sciences as enabling media based on observations of the unified theory. When an atom is split or a machine element such as a cam follower translates, this event is no more or no less real than when an arny soldiers go to war. The confrontation on the battlefield cannot be described, however, as small particles or cam followers—spatiotemporal events in based on scientific languages. Natural language is required for this specification of the real world or reality. Since the U. G. decomposes all language forms universally (and the meanings thereof as discussed in the theory), the U. G. must be used to express the condition of reality known as war in political sciences in a manner equivalent to scientific expression, as enabling media.

As a further analytical example of universal translations, we can consider the mathematical structure of homomorphism relating an adding machine to the habits of employees of a company in their arrivals and departures from buildings in which they work. If when certain employees, designated by their corporal forms, arrive at the building certain others leave the building habitually such that, for example, the zeros and ones of digital electronics (logic gates) can be overlaid onto the realities of the employee's habitual circumstances, the transformations of the employee's arrivals and departures constitute an adding machine or digital logic that embodies the arithmetic of numbers. Since the U. G. describes all forms in terms of universal occurrences of the universe, the transformations of natural language describing the habits of employees corresponds (here by way of mathematical homomorphism) to the transformations of a Boolean adding machine.

The point to be appreciated here is that natural language describes reality equally as well (actually more realistically, or comprehensively) as mathematical or scientific languages. The Rg and Rg continuum, described in the U. G., thus are enabled in the realities corresponding to any known language form. The expression I went to the stores on Friday is an equal to $e=mc^2$ as enabling media of the Rg and Rg continuum. Therefore, in translating the U. M. to enabling media, it should be appreciated that its forms are universally enabled. The TS, for example, embodies U. G. transformations whose purpose it is to perform as the real embodiments of communicative real form—a generalized method and apparatus for communication between the user and the Rg. The ES is a generalized method and apparatus for embodying forms that correspond to TS (and RS) transformations. The RS is a generalized means of realizing declared real form. The modeling and implementation process is a generalized process carrying out existential translation, or what human beings do productively existentially. The existential mode is a generalization of an inertial from of existence subordinated to communicative modes. The forms of the Rg and Rg continuum thus are enabled in any form of language. In contrast, most conventional inventions are restricted to reference forms of reality, or what is realizable, based typically on what is scientifically real.

Since the enabled forms of the Rg and Rg continuum are universally defined as specified in U. G., the sections of the specification following this one determine exemplary embodiments (translations of the U. M. in enabling media), generally proceeding from classically physical media, to electronic, computer and communications media, to quantum and biogical media, to the media of institutions. Though these are preferred embodiments, as will be discussed, the U. G. constructions of the Rg and Rg continuum universally embrace all language forms and thus all forms known to be realizable.

In preparation for these translations to enabling to media, several illustrative translations are made herein, simply to demonstrate the universality of the U. G. and forms constructed therefrom. As shown in FIG. 77, the preformance of a digital logic gate (108) is determined in the U. G. as a causal element of causation of the universe, shown as an AND gate, wherein four discrete transformations of the universe are embodied. These four possible instances of the gate are four epistemic moments of the element as defined in the conventional truth table associated with the gate. As shown, there is nothing fundamental about a digital logic gate in the ultimate realitity of the universe, however. The logic gate simply embodies four moments, of infinitely reality of the universe, however. The logic gate simply embodies four mopments, of infinitely many in other causal elements, characterizing the occurrences of the universe—of epistemic form. Didital logic of the computational art thus is employed in one of infinitely many realizations of the Rg and Rg continuum in the translation of the Boolean algebra of digital gates to causal elements, where such elements are required in the U. G. specification of the U. M. (discussed further in the section on electronic, computer and communications media).

Figure 78:
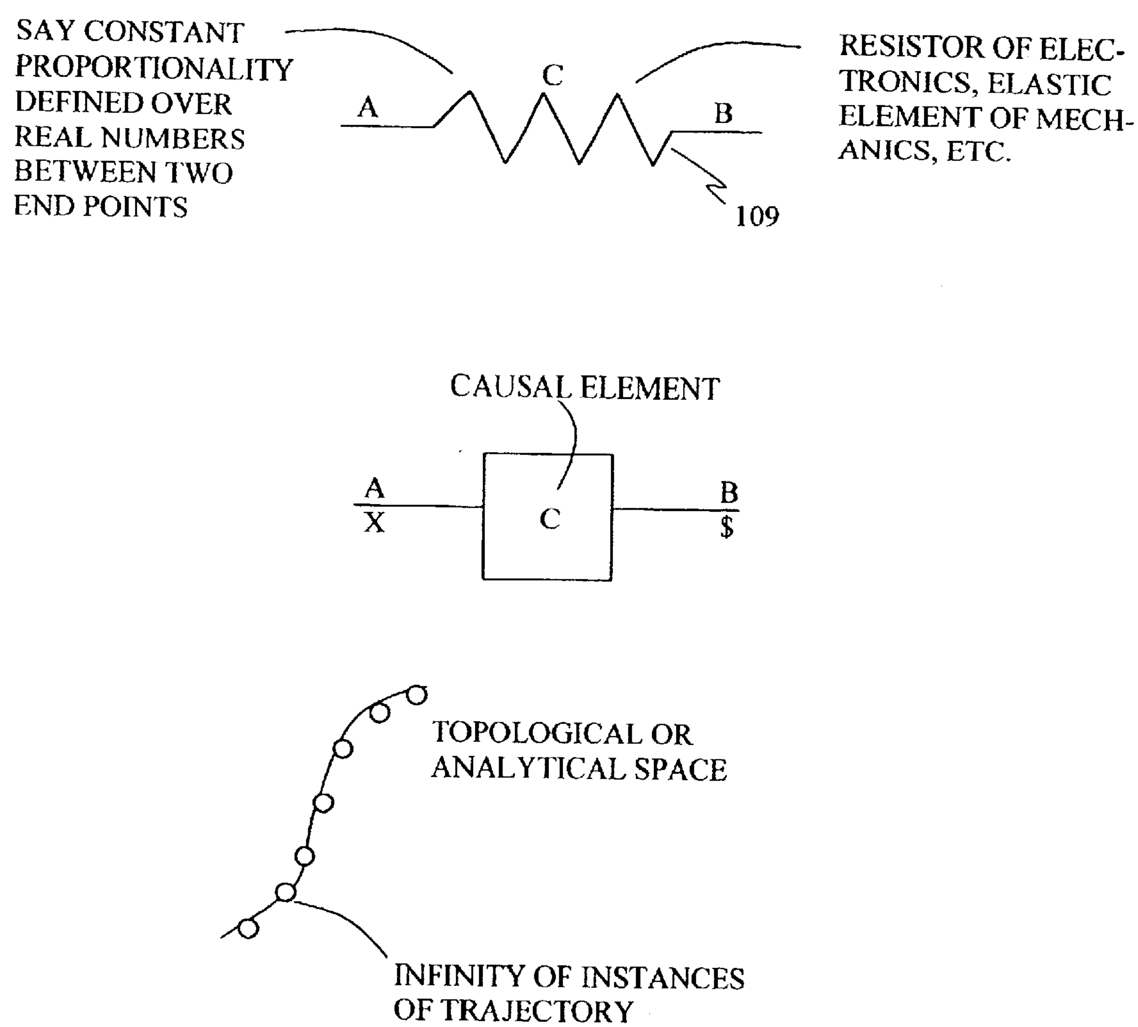
FIG. 78 shows the translations of continuous forms of conventional media such as a resistor element to U. G.
Figure 79:
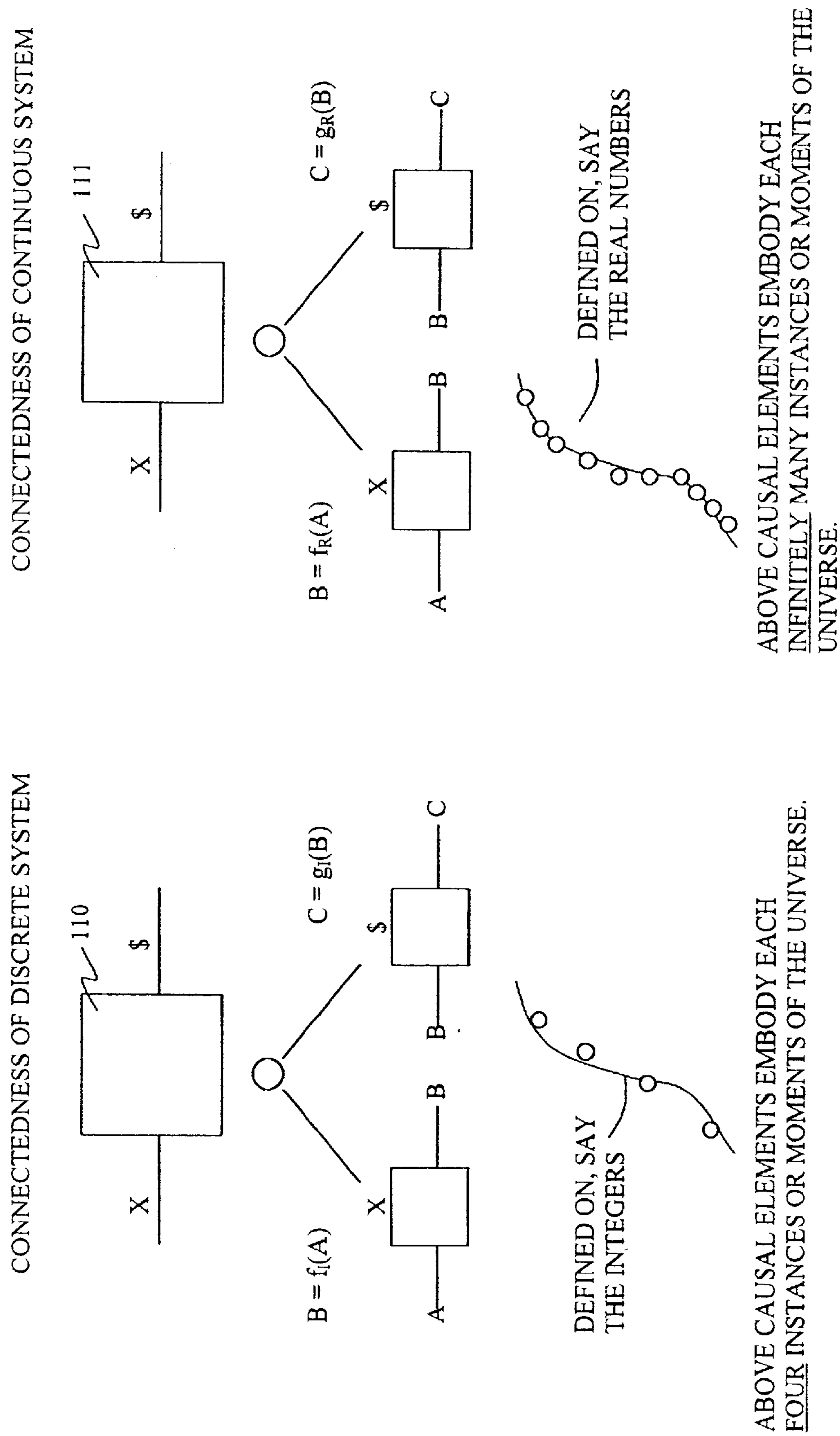
FIG. 79 is a comparison of discrete and continuous forms of convention in U. G.
Figure 80:
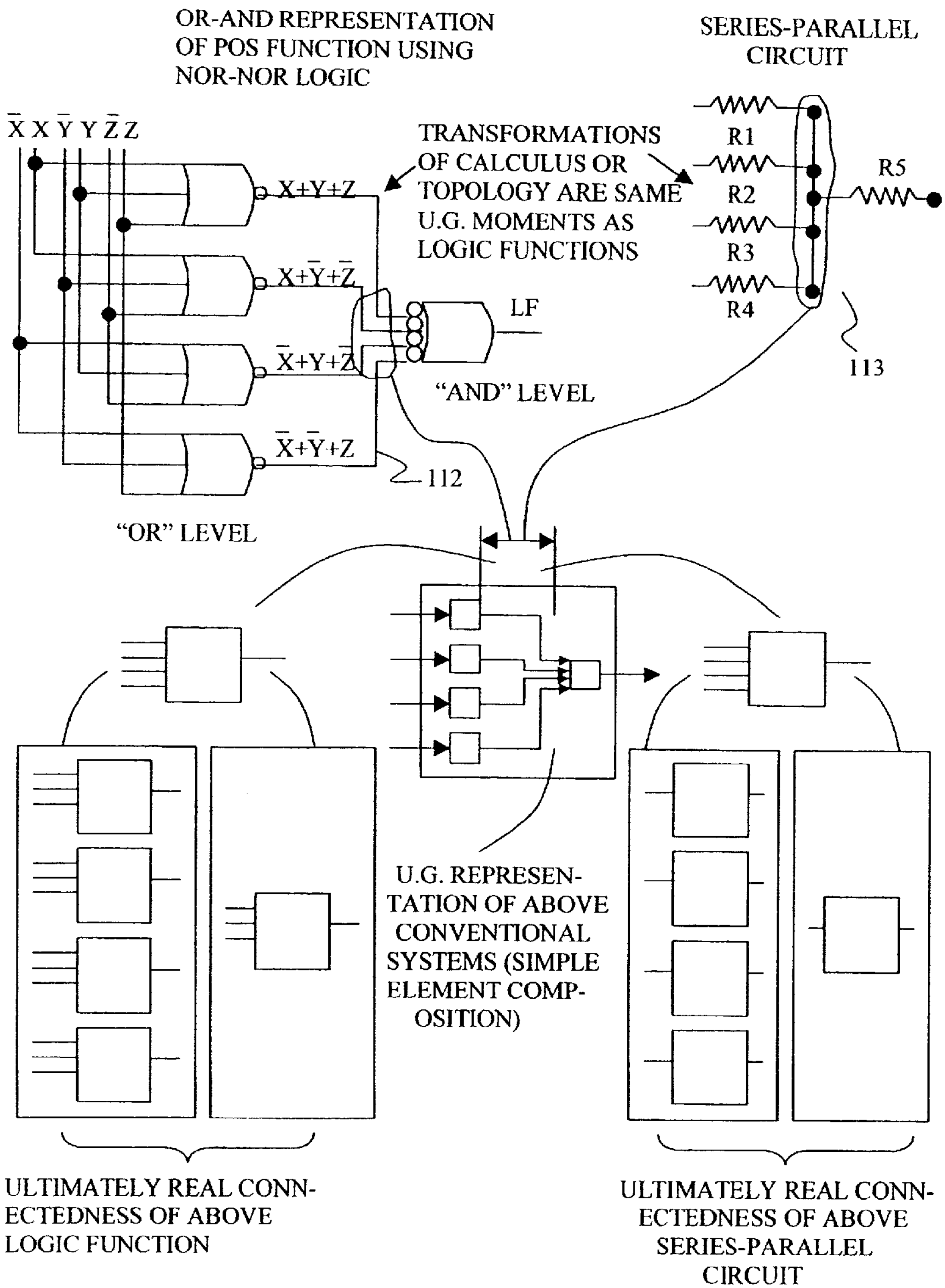
FIG. 80 is a comparison of the connectednesses of digital and continuous electronic circuitry.

As shown in FIG. 78, the universality of the U. G. is evident in its characterization of both discrete and continuous real forms. A resistor of mechanical,electrical and so on media (109) simply is characterized as a causal element that embodies an infinite number of moments of the universe—a continuous system of conventional definition. Referring to FIG. 79, and to discussions of the theory of the invention, the difference between a discrete system phenomenon (110) and a continuous system phenomenon (111) of the conventional art is not fimdamental to the ultimate reality of the universe, only to an inertial existence enabled therein. When considering the real numbers or an arrow shot through the air, for example, the discrete moments of the differentials of calculus (or topology) are simply infinite in number. Whether one considers an infinitesimal element (differential) of the real numbers or two integers in transformation, a connectedness must be applied (by the enabler) in order that the moments be connected to others. In the case of the infinitesimal, the moments are said to occur beyond the extant occurrences of them (e.g., connectedness is what occurs in between two infinitesimal differences or elements) and likewise, the moment of transformation of two integers, in connection with another moment of transformation of two integers (or compositions thereof) is the same as that of two infinitesimal differences in the ultimate reality of the universe. The U. G. describes both of the extant moments (the differences) and how the extant moments are connected existentially. Typically in convention the connectedness is not considered; only the extant moments of transformation are defined—in a derivative, integral, topology or connection between two arithmetics. These principles of the theory of the invention are further demonstrated in the comparison of the connectednesses of digital circuitry and continuous electronic circuitry, as shown in FIG. 80. Discrete (112) and continuous (113) circuitry of electronics (and other media since their are correspondences well known among them—heat transfer, hydraulics, etc.) thus serve as enabling media of the Rg and Rg continuum wherein modal compositions of causal elements are translated to those of the conventional circuitry, as shown.

Figure 81:
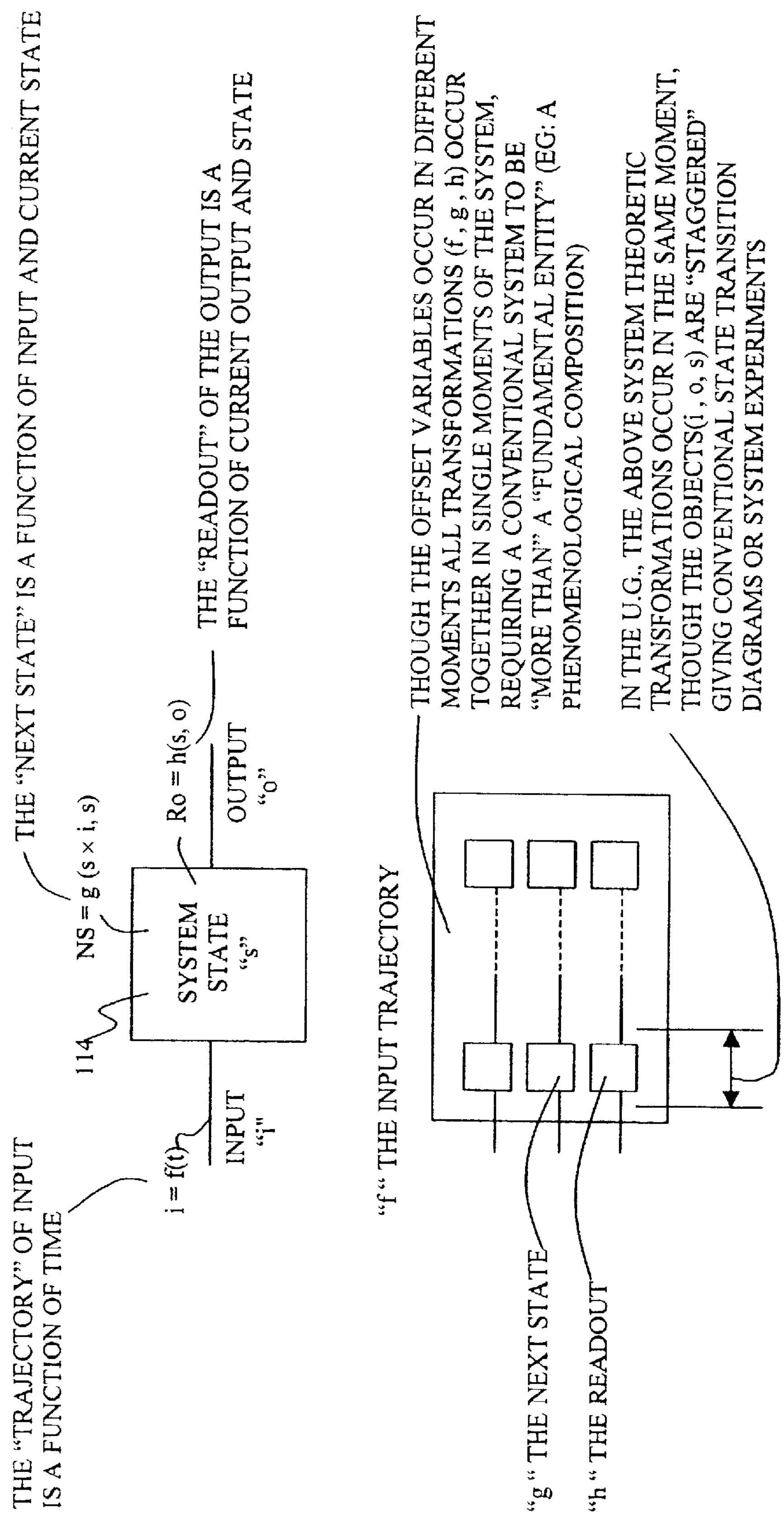
FIG. 81 shows a translation of system theoretic system to U. G. construction.

The awkward (existentially limited) nature of conventional knowledge forms, in their specificity to particular constructions of real or realizable forms and in that they require their own respective languages, comes about principally from the axiomatic belief in convention in the existence of objects in the ultimate reality of the universe. This belief ultimately is wrong, and, as demonstrated in the theory of the invention, only transformations of objective form exist in the ultimate reality of the universe, requiring definitions of morphisms and so on, as discussed, to characterize the ultimate reality of the universe. The dogmatic persistence of prior art conventions in the belief in the ultimately real existence of objects in the universe can be demonstrated in the art of systems theory. As shown in FIG. 81, since it is fundamentally, and wrongly, believed that objects are ultimately real, the object of a system of conventional theory (114) is taken to be a fundamental entity of the universe. As shown, this allows the fundamental entity of the universe, or system, to embody a plurality of transformations of the universe (input trajectories, next state functions, readout functions, etc.), and thus renders the basis of conventional systems theory—a system—a phenomenological composition of form and not a moment of the universe. The fundamental entity of systems theory is no different from a space shuttle of modal compositions of phenomenological forms, since it is a (phenomenological) composition. The U. G. requires that only moments of the universe are findamental entities, and thus objects are enabled by transformations, and do not exist in ultimate reality. Characterizations of finite automations are no different from those of any other language forms. Since digital and other finite circuitry is defined, most precisely mathematically, by system theoretic definition (principally derived from set theory), FIG. 81 demonstrates that all finite machines are decomposed into U. G. as shown. Regardless of how many digital circuits are deployed in a monolith of technology of the computational art, the resulting machine, for example, is nothing more (in the enabling sense) than that which is shown in the figure—a composition of form. The fact that system theoretic structure is translated to U. G. allows all of digital electronics to be directly translated to the U. M. It should be recalled, moreover, that continuous systems immediately translate to discrete systems in the U. G. as shown in FIGS. 77 through 81.

Figure 82:
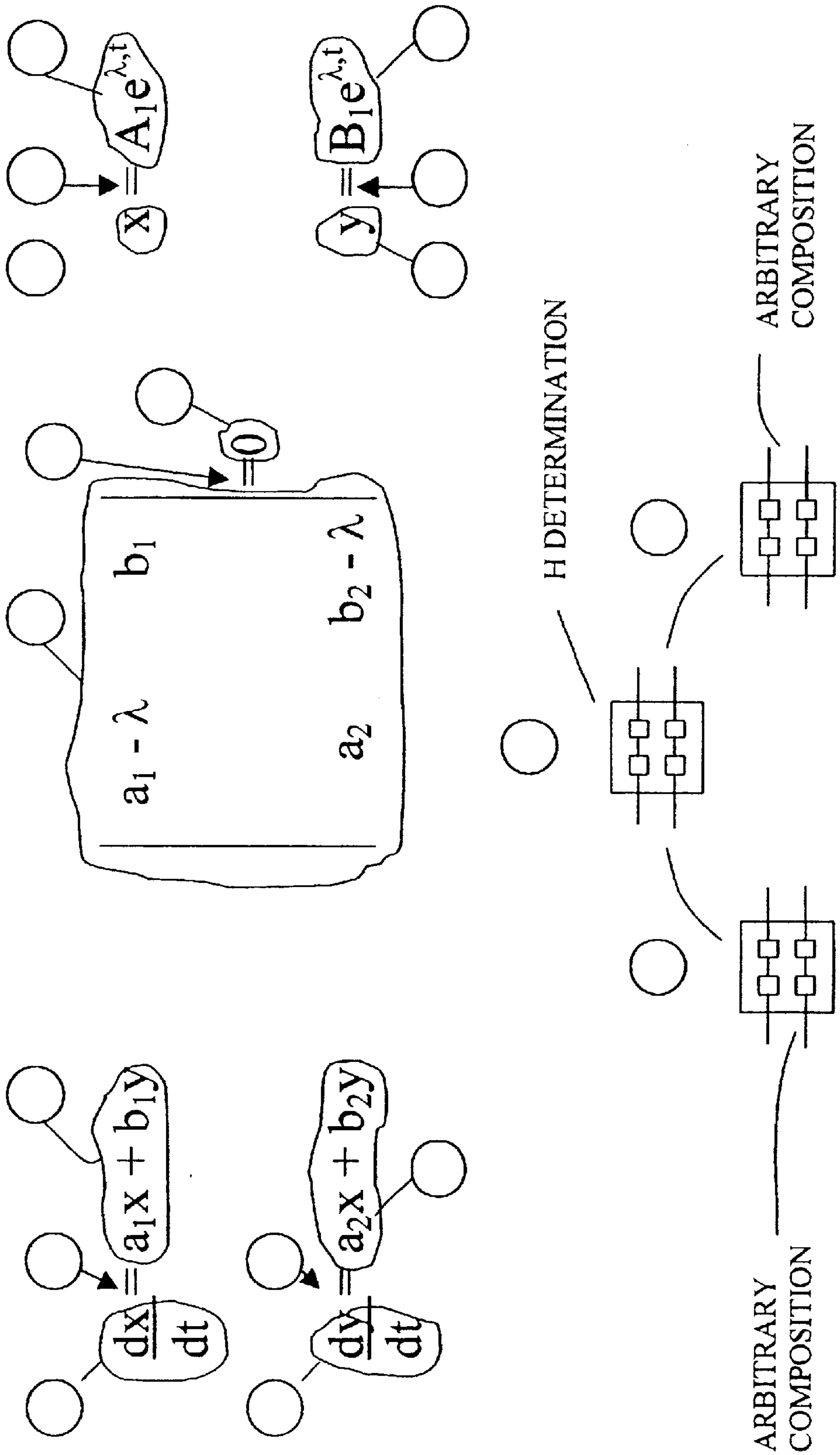
FIG. 82 shows translations of a dynamic system of differential order to U. G. construction.

The significance of these translations can be appreciated when it is considered that conventional continuous (time) systems, typically employing differential equations and other analytical techniques of mathematics, also are thought to be objects embodying the compositions of analysis. The conventional art refers to a dynamic system that behaves in the manner described by a system (typically sets of matrices) of differential equations. However, whether spring masses, systems of wave packets of the quantum theory, electronic circuits and so on are considered the objective systems, as shown in FIG. 82 and discussed in the theory of the invention and FIG. 80, the dynamic system (115) is simply a phenomenology of form described in the U. G. The occurrences of the differential transformations simply are accounted for in modal composition in a more sophisticated and numerically infinite manner, namely by the mathematics of differential equations, topology and so on (including complex dynamic systems). Since all quantum moments are the same epistemically and are connected in phenomenological connectedness over causations in a modal composition transforming by phenomenological correspondence, a dynamic system of continuous time (differential equations), a complex dynamic system of topology and a discrete or finite automation are all the same phenomenologically in the U. G. but for their particular modal compositions. Thus, any expressions of these arts serve as enabling media of the Rg and Rg continuum. Between the theories of discrete and continuous systems (continuous also involving conventional control theories), a large amount of enabling media is extended to Rg configuration from the sciences and mathematics.

Figure 83:
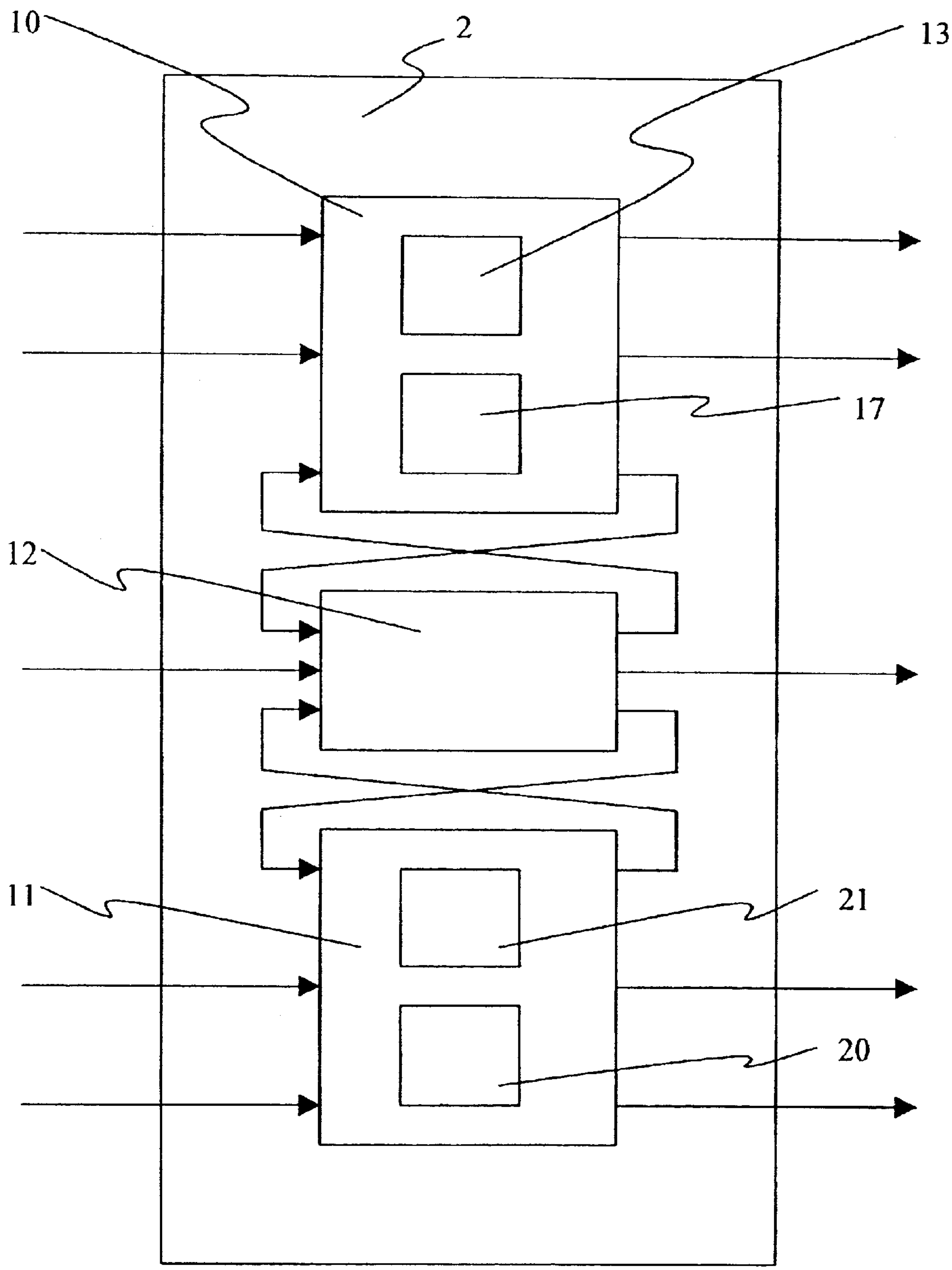
FIG. 83 shows terminal component translations of Rg to enabling media.
Figure 84:
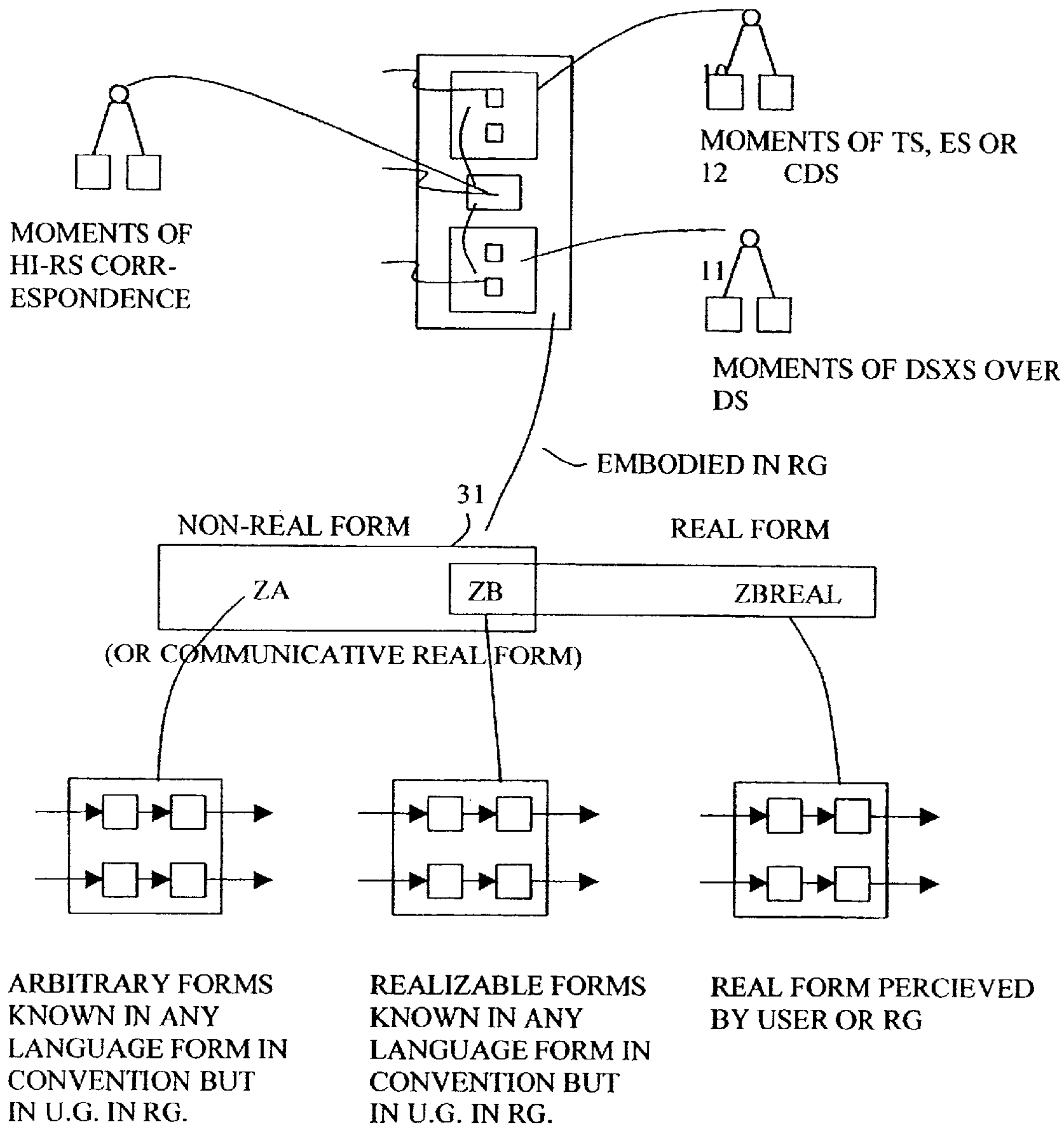
FIG. 84 shows translations of the modeling and implementation process of Rg to enabling media.

Generally, the enabling media of the Rg is determined along these methods of translation with any language form considered to represent what is real or realizable. As mentioned earlier, such media does not necessarily have to be real; it can be imaginary and in such a case it is embodied in non-real form (mind) only. The media does not have to be scientifically real either, as discussed, since what is scientifically real changes, along with all other forms, in the moments of an inertial existence. Broadly, however, as shown in FIGS. 83, 84, 85, 86, and 87, translations of the Rg and Rg continuum proceed on the basis of particular translations of the terminal components and modalities discussed in specifying the U. M. Referring to FIG. 83, the communicative real form of TS (structured into input, output, translation, and modal engagement systems); the embodying structures of ES; the translational processes of CDS; the DS structures, DSXS, CES, RCS and CRCS of RS; and the modal forms of CS are translated to appropriate media, as shown, and the modalities of Ri, Rp and Rsv are enabled in the modalities of the media chosen to correspond with those of the modules. As shown in FIG. 84, one marked distinction of the Rg, setting it apart from the prior art, is the universality of the modeling and implementation process (31) of the default mode which is extended to existential form in the existential mode. As shown, this universal process of translation to and from real form with respect to non-real form—ZA, ZB and ZBreal correspondence—is found in all human activity. When the Rg is translated to enabling media, this basic process is considered paramount.

In conventional art machinery and institutions, for example, arbitrary form (ZA)—customarily referred to as concepts, brainstorms or ideas—are translated (in the Rg by CDS) into reference forms or available technologies or sciences (ZB) that are known to be real or realizable, and other process-oriented apparatus and techniques (the RS under action of CS) typically referred to as manufacturing or production processes are deployed in the realization of the actual forms corresponding to the known design forms (ZB) that are real (ZBreal). The real form (ZBreal) is then tested to conformance with the design (ZB) and is considered to comply under an established criteria (CS). The real form is then held in conformance under a maintenance of the form or operation of the real product resulting from the design implementation (also CS). How the real form performs in the perceivable world under some criteria of monitoring and testing is then observed (in the Rg in the prompting action of default or the self observation of existential mode) and new discoveries (of AZ and ZB forms) are made on the basis of this criteria. The modeling and implementation process repeats itself indefinitely, until the machinery or institution is scrapped or reconfigured by action of the Rp module. Thus, whether one is working at a computer work station on business accounting, strategy planning, scientific discovery, chaos modeling and realization, etc., the ZA, ZB and ZBreal correspondences of the modeling and implementation process are found universally in them all. Specific enabling media, of course, must suit the particular purpose of the user.

Figure 85:
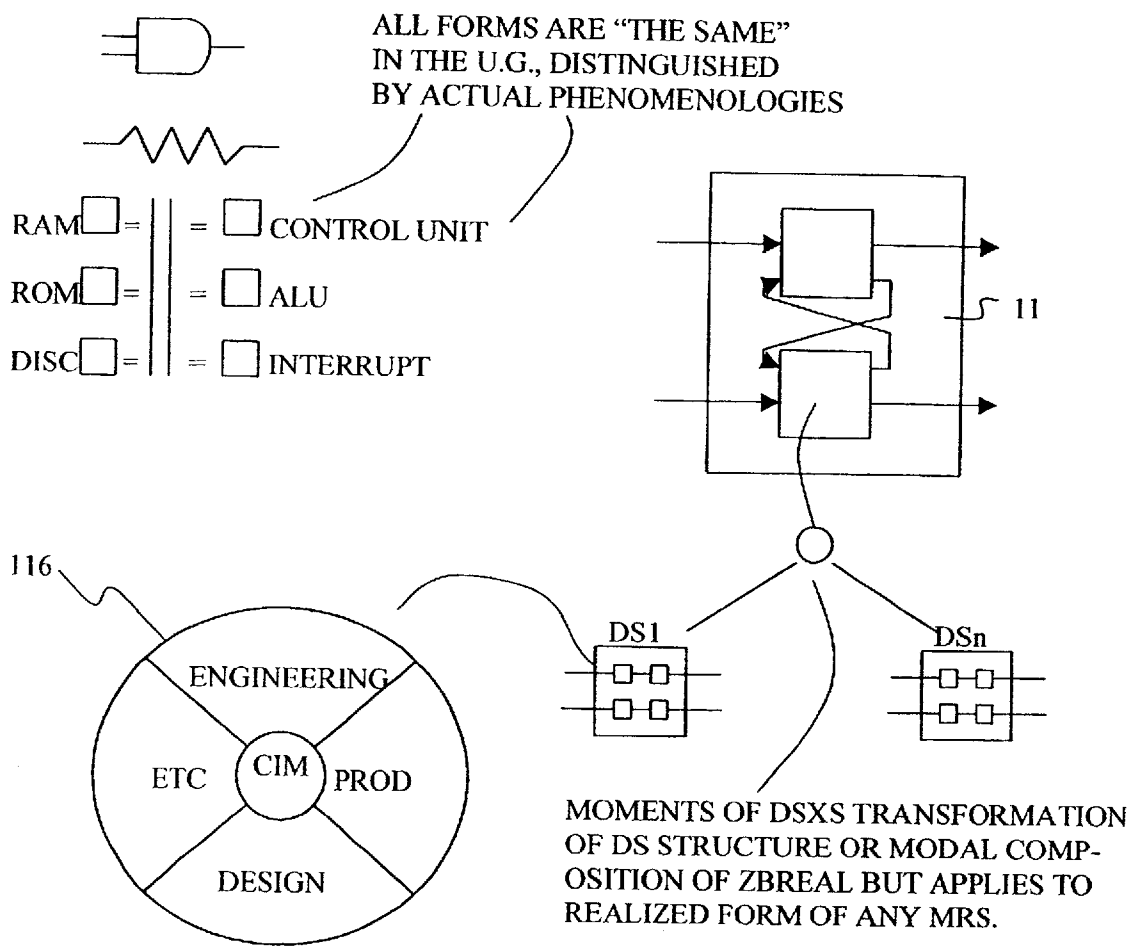
FIG. 85 shows realized forms of Rg in enabling media.
Figure 86:
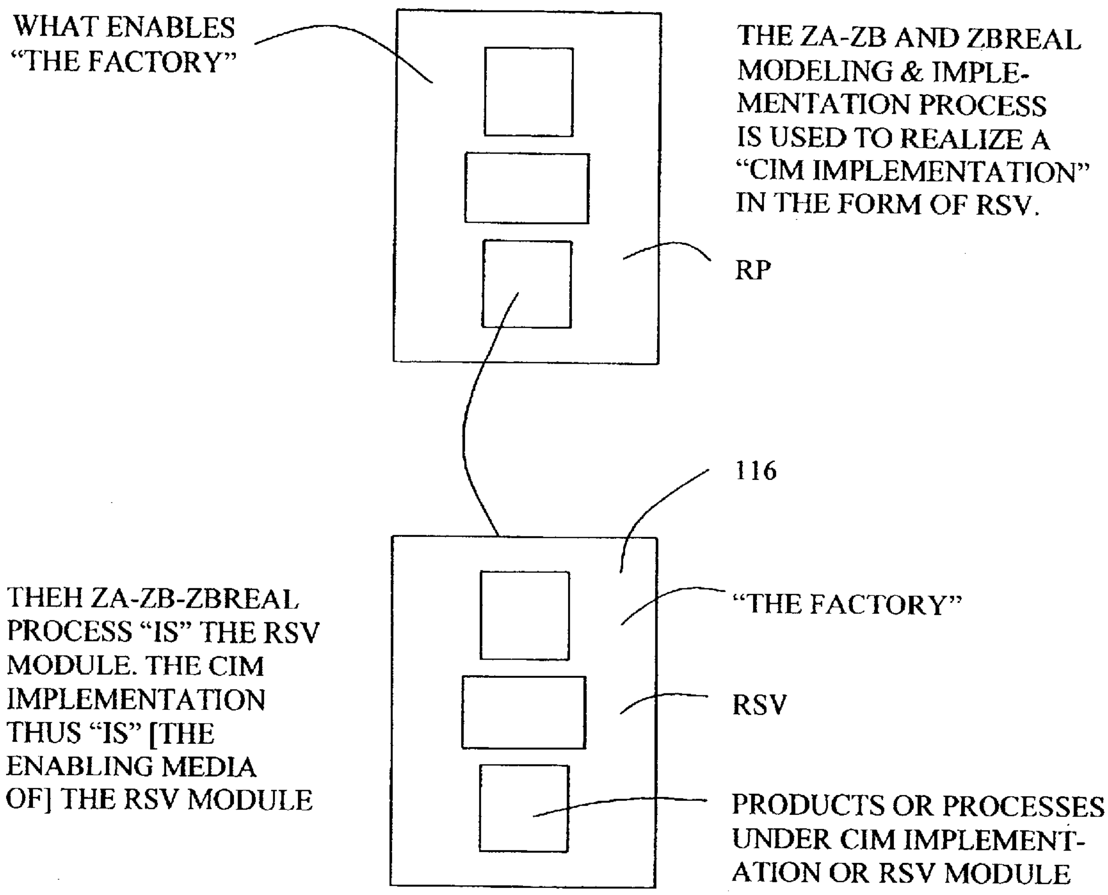
FIG. 86 shows enabling media used for manifold structures of the Rg.

FIG. 85 demonstrates a further consideration of the enabling media of the Rg and Rg continuum and serves to avert any confusion earlier on regarding the capacities of the Rg. Since many of the terminal forms of the Rg are MRS structures, and since the entire Rg is specified in the U. G., the Rg itself, and portions of it, can be piecewise translated into arbitrary enabling media. If one considers the conventional art of computers and communications in the context of factory automation, for example, a CIM implementation (116) can be realized as the real form of RS of Rsv, in which case the terminal compositions of the CIM system would be DS structures transforming under DSXS of RS. The CIM system could be configured in terms of digital gates and other elemental components of machinery, or microprocessors, computers or islands of automation, depending on modal composition and where one terminates the objective forms. As shown in FIG. 86, moreover, the same computer and communications media in the form of CIM can be translated into the modeling and implementation process of an Rsv module itself, in which case the CIM technology is redeployed under the configuration and modalities of Rg.

Figure 87:
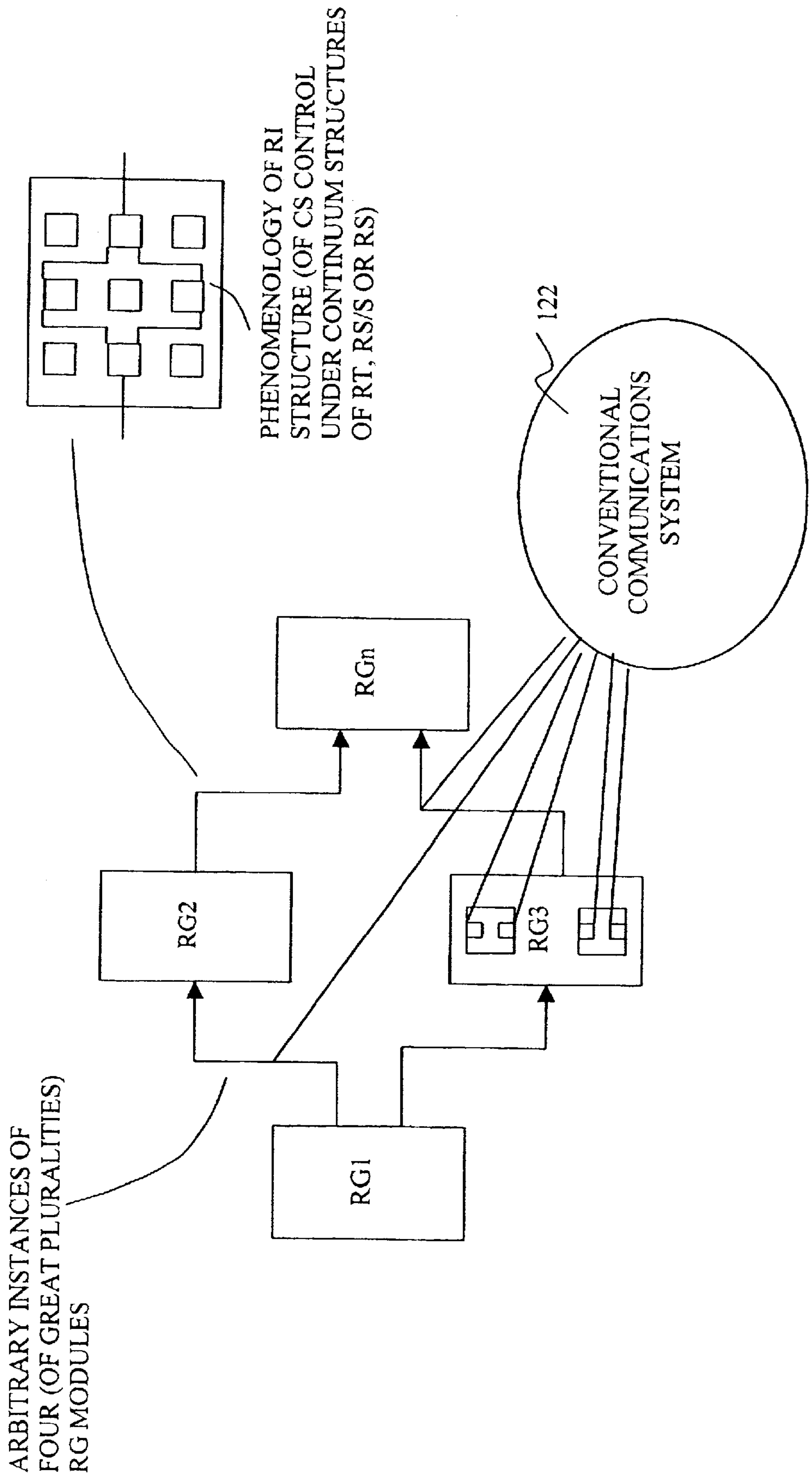
FIG. 87 shows general translations of the Rg Continuum.

As shown in FIG. 87, the continuum structures of Rg and Rg continuum likewise are translated under structures of Rt, Rs/s and Rs of Ri in default and existential modes. When it is considered that institutions such as corporate enterprises embody the modeling and implementation process in great plurality, integrated toward a common goal in service to the human condition, it can be seen that the Rg continuum performs the same function universally. The difference of course is that the Rg continuum is infinitely expandable and enables not just conventional art but androids as well. The continuum thus enables great pluralities of institutions of humankind, and is reconfigurable under any circumstances since it is established in U. G.

In order to avoid a haphazard approach to translations of U. G. form, and in particular the Rg and Rg continuum to enabling media, a four step method for the translation of any U. G. structure to a specific enabling medium (117) is developed herein.

In reference to the theory of the invention, wherein the universal grammar of form on Being is introduced, any symbolic (real) form differs from any other real form only in that it corresponds to a particular context of representation of the translation process. A symbolic form jogs the mind (non-real form) in particular correspondence with the intended meaning of the symbol in the creation or comprehension of epistemic instances or moments of the universe. Also introduced in the theory is the fact that all real forms, in the existential sense of translation and under modes of existence, are symbols (representations and realizations). Knowing how or that two real forms such as automobiles correspond and knowing how or that two symbols representing them correspond, existentially are the same processes, with the definitional distinctions that the symbols (real forms as well) also correspond to the automobiles (e.g., the symbolic forms also represent other real or non-real forms of an existence and thus are used in the recreation of reality). The translation of one language form to another existentially is as simple as the translation of any real form with any other. It is what an existence does. The translation of the present forms of the invention, expressed in the language of the universal grammar, is simply another translation of language forms. The complications arise, however, in the fact that languages of convention, as discussed, do not represent or mean expressions of inertial existences from the standpoint of an enabler of existences, and this fact necessitates the formulation of the U. G. in the first place. In the process of enabling the U. M., or even more broadly, any applied forms of the U. G., we simply are associating typically reference forms of a symbolic nature in conventional language to reference forms of the U. M.; we are associating symbols of conventional forms with those of the U. G. in specification of the U. M. Since the U. M. is specified in the U. G. already, moreover, the translation of the U. M. to another language form (enabling media) simply requires the translation of the language form to the U. G. Thus, the translation of any language form to any other is accomplished by translating any language form to that of the U. G. The four step translation procedure then involves translations of any language form to the U. G. In other words, the four step procedure is one-sided in comparison to conventional translations, since the U. G. links or universally translates all language forms, and once a language is translated to the U. G. it translates to all other languages. Concerning the structure o f the Rg module and Rg continuum, for example, since the U. M. is specified in the U. G., it universally is composed of causal elements, connectednesses and compositions made thereupon, and correspondences enabling the moments of the epistemological machine. A causal element of DS is no different phenomenologically from a causal element of TS, ES or any other Rg component. This means that wherever a causal element is found in the Rg, a digital logic gate, for example, as described in earlier figures, translates to that causal element. The same applies to all forms of convention (all enabling media) and all forms of the Rg. Enabling media thus universally translates to the four universal ways of knowing and the arbitrary forms of existence, which are employed in the specification of the U. M. When a conventional form (enabling media) is translated to the U. G., it universally translates to the corresponding U. G. specification of the U. M.

The first step of the four step procedure of translation to the U. G. (118) involves the determination of the principle distinctions between conventional languages and the U. G., namely the existential definition of a phenomenological noun (and its transformation), and thus translates a conventional object to one of the U. G. As discussed throughout the theory and the specification of the U. M., a conventional object is thought to exist traditionally in and of itself, apart from the observer of it. As a result, conventional languages imply the existence of observers and do not denote such existences; they do not representationally define the observer and the observed at once in the enabling sense. For example, in the natural language of English, objects are defined as nouns and pronouns—persons, places and things, and terminal inertial forms (pronouns). In the use of English, the inertial existence of persons, places and things—as objects—is implied. It is implied that the person, place or thing findamentally exists in and of itself. When one uses the English language, such as in the expression Jack went to the stores, the nouns (Jack and the stores), are implied to be the objects of perception; they are permanent and inertial relative to the observer. What this means is that the English language is premised on the inertial observation of nouns as objects of perception—that the observer who uses the language is implied to exist universally and that perceptions of that observer are universal. The enablement of the existence of the observer—for example the perception giving rise to the appearance of objects of perception, say Jack and the stores—is not characterized in the use of English in the forms of the language. In systems theory and in classical and quantum physics, moreover, the objects of systems and electrons, or in fact matter itself, are implied to exist fundamentally because the observer of them is not considered analytically and existentially because the transformations giving rise to the perceptions of these objects in the observer are not considered. The U. G. considers the ultimately real nature of all form.

Figure 88:
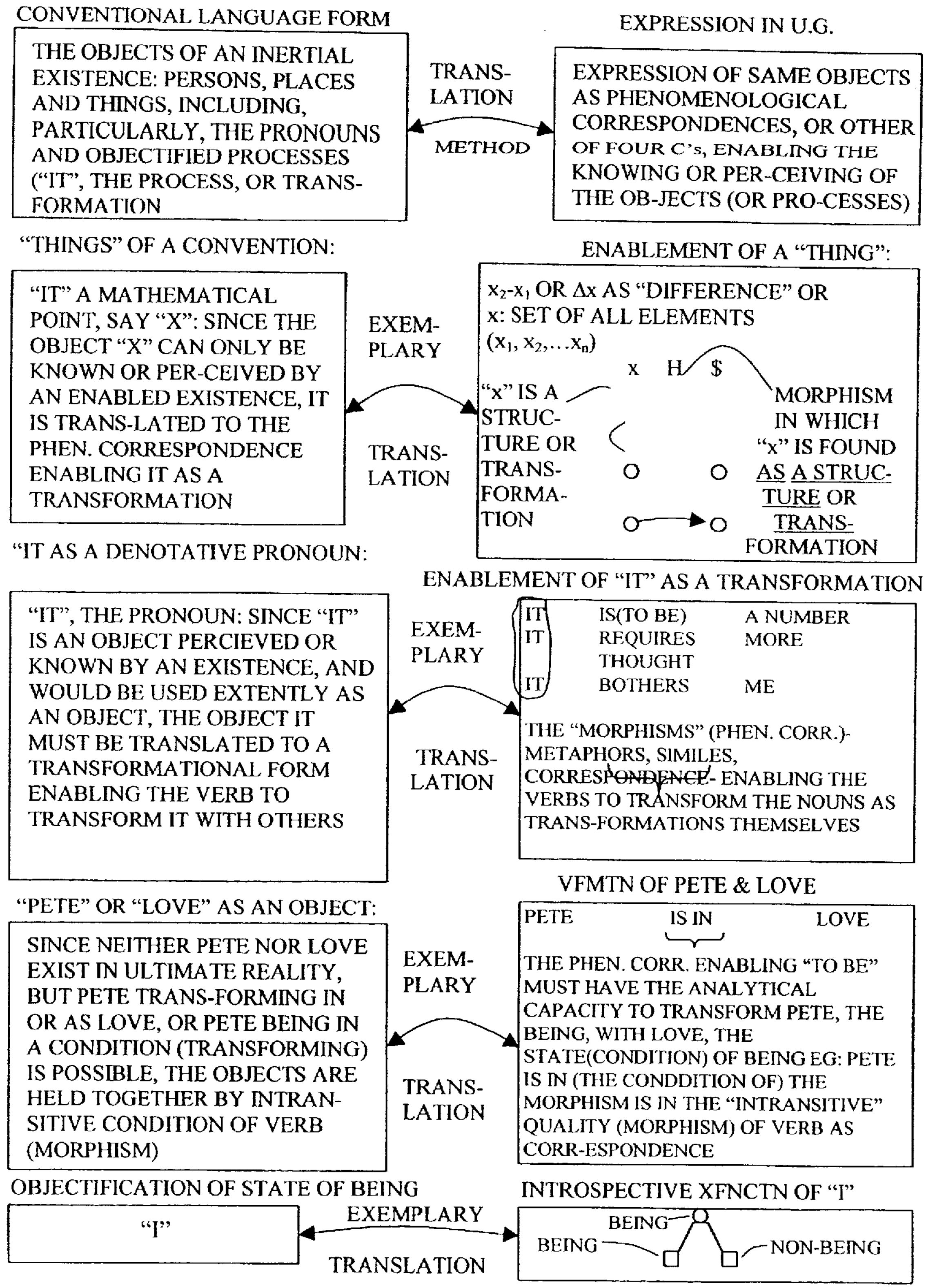
FIG. 88 illustrates the first step of the translation procedure of the U. G: phenomenological nouns.

As shown in FIG. 88, the first step of the translation procedure (118) involves the interpretation of the nouns of the arbitrary language to phenomenological nouns of the U. G. This, in turn, involves many of the principles of the unified theory, including the duality of the objective and transformational nature of all form (phenomenological correspondence).

First, what are described by the U. G. are moments of the universe in the forms of the four C's and the arbitrary forms of existence—the observer and the observed are characterized by the U. G. at once. This means that whereas in a conventional language the nouns of transformations are objects that exist universally because they occur relative to the constant and impenetrable (by conventional theory) observer, the objects occur in the universe as transformations themselves, characterized by the four C's. As shown in the figure, an existence must be defined that is enabled to embody the transformations that give rise to the objects that are defined in the conventional (inertial) language. This is accomplished in the existential form of enablement by declaration—that the moments so defined are moments of the enabled existence. The form of enablement implies the creation of an existence. A single moment of an already-enabled universe, for example, is characterized in the conventional English language as I am alive or in mathematics as $y=f(x)$. These language forms imply the existential structure in enablement that is the observer of them. In the U. G. these statements, for exarnple, would have to occur under the modes of existence, faculties of mind and correspondence to perceived forms of an androidal existence. Thus, in order to define the above expressions properly (existentially) in the U. G., an androidal existence would have to be constructed and so declared in the form of enablement. Since the arbitrary forms of existence are aspects of existential form, they too can be used in the characterization of the observer of a language form of existential experience.

Since the four C's determine moments of the universe with respect to the enabler of an existence, the enablement of existence, or of the observer, always is implied in the forms of the U. G. (note that in conventional languages the inertial existence of the observer and not the enablement of the existence of the observer is implied). Thus, in translating a language form to the U. G. the four aspects of phenomenological form (causation, connectedness, composition and correspondence), along with arbitrary forms of existence, are considered first, in terms of the enablement of the language forms of convention, as shown in FIG. 88. The experience of knowing and perceiving the conventional language form thus is defined in the U. G., giving rise to the language form in an enabled universe. In simple linguistic terms, the semantic forms of language (U. G.) are constructed which enable the syntactical structure of the conventional language, as shown. The first step of the procedure results in a decomposition of the conventional language forms into enabled moments of the universe, wherein objective forms that are enabled are distinguished from the transformations that give rise to them (as is demonstrated in phenomenological correspondence).

Figure 89:
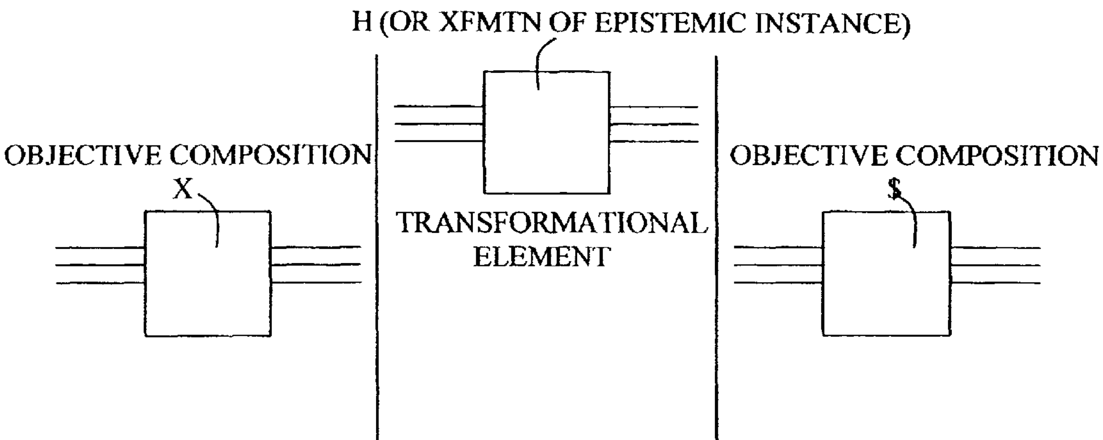
FIG. 89 illustrates the second step of the translation procedure of the U. G: modal composition.

Once the enablement of the forms of a conventional language in the ultimately real universe is defined, the next step of the translation process (119) involves the determination of the modal compositions of form, as shown in FIG. 89. As discussed in the theory, the difference between one moment of the universe and another is an arbitrary determination on the part of the enabler in the creation of modes of existence, faculties of mind or even streams of consciousness (and the realities or perceptions thereof). When conventional language forms are considered, compositions of thought and of the perception of an inertial reality seem to the observer to occur randomly (the randomness of the universe). A novel of literary composition, a conversation with a friend, and the occurrences of observed physical forms, seem to just pick up and drop off (compose) with no apparent order to them. This is because an inertial existence simply is a correspondence among infinite forms—in the mind-body dualism between real and non-real forms. The objective compositions thus derive from the nature of the correspondences of them and not from the order so imposed in or by them (the compositions). An existence is determined by the correspondence of ideas and reality and not from the objective form (composition) of the ideas or reality. This apparent (but not ultimately real) randomness or chaos of the universe is determined by the enabler in the creation of modal compositions.

The determination of modal composition, as shown in FIG. 89, is arbitrary on the part of the enabler, and establishes the basis in which the enabled forms of existence (or inertial reality) will occur in the enabled form. With regard to the enabling media of the U. M., for example, the enabler's own universe, as shown in the figure, can be realized in whatever order is desired compositionally. A simple connectedness on two digital gates determines a combinational mathematics on a plurality of possible modal compositions (instances of a truth table in combination with one other). An electronic circuit can be embodied in the universe as the circuit, or can exist in a moment itself as a transformation to one other circuit (Thevenin's and Norton's equivalences, for example). The modal composition of a series-parallel circuit, as an embodiment of the circuit as represented, is different in the U. G. from an equivalent to it, which modal transformation (the occurrence of the series-parallel configuration to one equivalent to it) is a modal composition itself (typically of the engineer's non-real form or mind). This applies to the occurrences of dynamic systems or systems of differential equations and in fact all scientific and mathematical forms.

The first step of the procedure thus involves the translation of objective forms, or objects and transformations of conventional languages, to those of the U. G. in an enabled universe. The second step involves the determination of how these forms will modally occur in the enabled universe.

Figure 90:
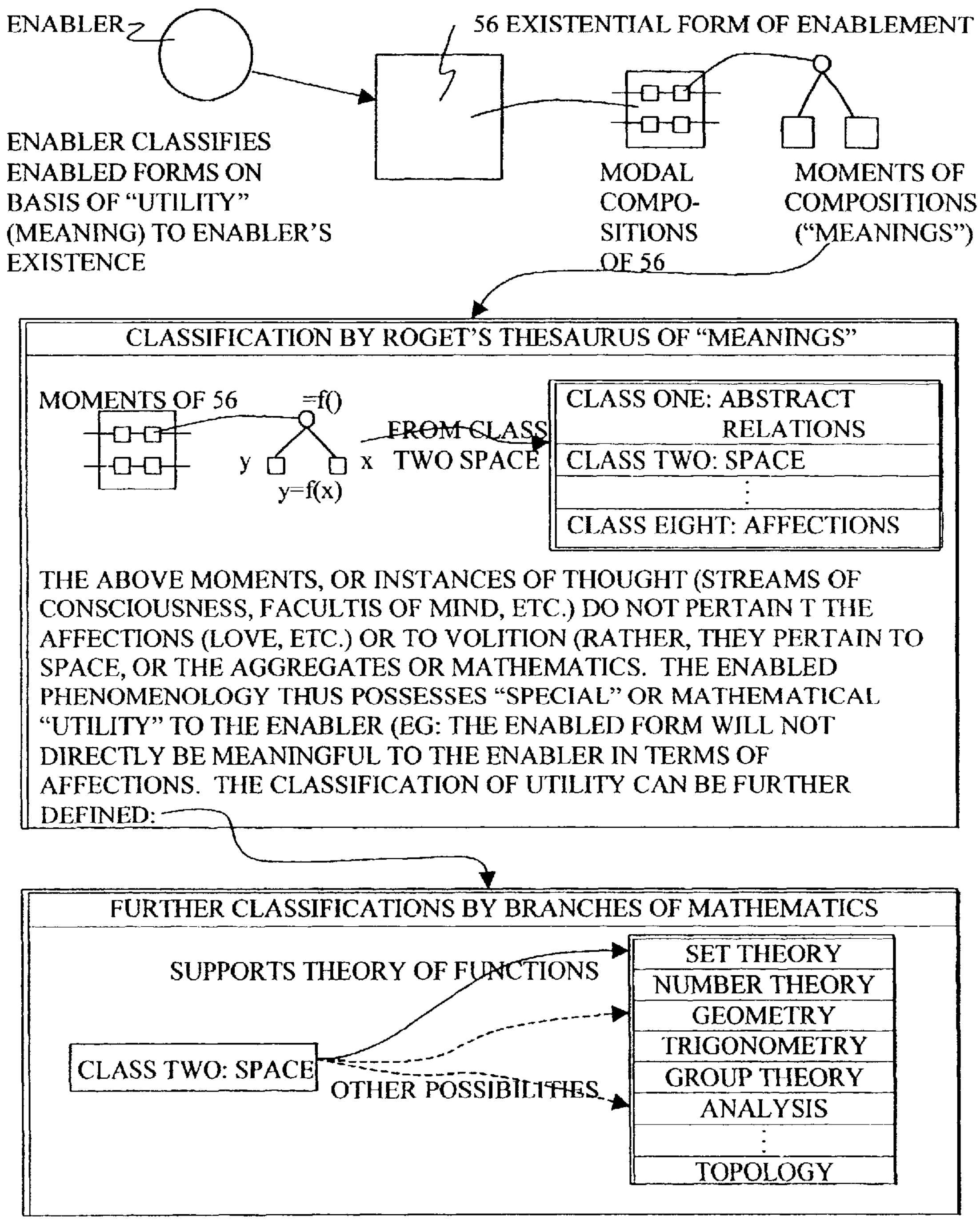
FIG. 90 illustrates the third step of the translation procedure of the U. G: the utility of the forms enabled.

The third step of the procedure (120), as shown in FIG. 90, involves the determination of the utility of the conventional language to the enabler. What are defined (translated) in the first two steps are the moments of an inertial language that implies the observer in relation to the occurrences of those forms in an enabled existence. The knowledge so embodied (translated) may be of no importance to the enabler. To the constructor of automobiles, a recipe for rice pudding may not be immediately relevant to the knowledges and discoveries of automobile design. Since a recipe for rice pudding could so correspond to the transformations of the procedures of polymer production, however, a blanket statement about the relevance of any particular knowledge to any other is a fatal mistake made typically by the prior art of computation. It is world experience that is enabled in the science of androids—all world experience—and such experience has utility to the enabler. The third step of the procedure involves the determination, or placing of practical bounds, on the enableable world experiences of the forms so enabled in the first two steps of the procedure. This step goes to the nature of the default and existential modes of the Rg, for example. If the nature of human love is required to be communicated in TS, and human love is defined of spiritual and thus unknowable form, the perception of it in the RS form of the Rg (or an android) is impossible, since the enablement of a human being is impossible. If the nature of love is required to be communicated in TS, and correspondences can be enabled in RS of perceptions of Rg in the likeness of human love, then such a phenomenon can be enabled. The default mode of the Rg is designed to accommodate the modeling and implementation (translation) of forms that are knowable only to the user, since, if they can be known by the Rg, it is more efficient to use the existential mode. This step of the process thus differentiates between language forms that can be enabled, practically, in synthetic existence and those that cannot (in the view of the enabler) in terms of their utility to the enabler. The creation of sense-motor capacities thus plays a critical role in the determination of the utility of the enabled form, since language forms will so correspond to what is perceived by the enabled form.

Figure 91:
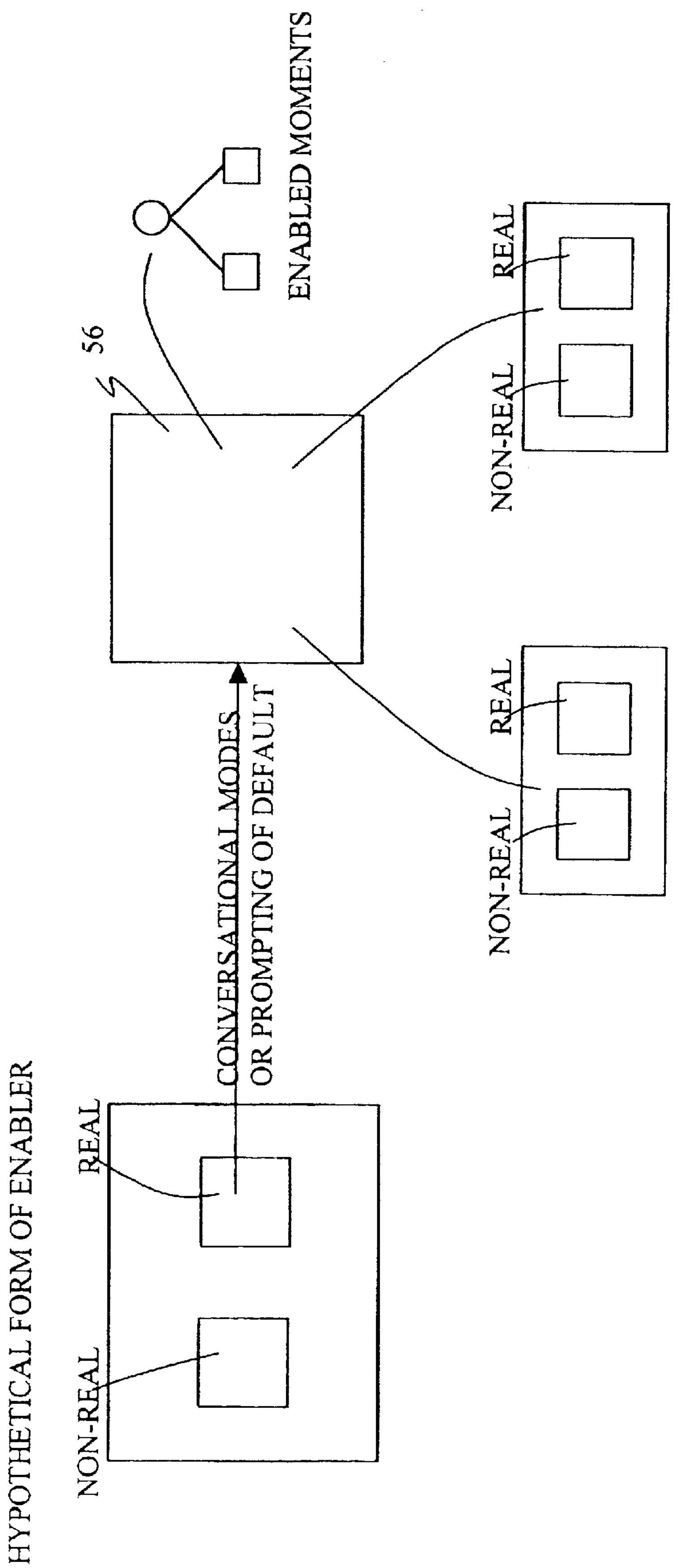
FIG. 91 illustrates the fourth step of the translation procedure of the U. G: development of the translated forms relative to the existence of the enabler.

As shown in FIG. 91, the fourth and final step of the procedure (121) involves the suitability of the existential forms of the enabler to those of the enabled forms in terms of the intellectual, physical and spiritual development of the enabler. A continuation of step three, this step involves the compatibility of the capacities of the enabled forms to the existential development of the enabler—a pairing of consciences. The overall purpose of the enabled form should serve the development of the enabler. Since the utility of step three is simply a determination of what world experience can or cannot be enabled in terms of utility to the enabler, this step determines, once enabled, how the forms serve to assist in the development and growth of the enabler. As shown, this step involves the translation process itself in regard to discovery (prompting and motivation and learning).

Figure 92:
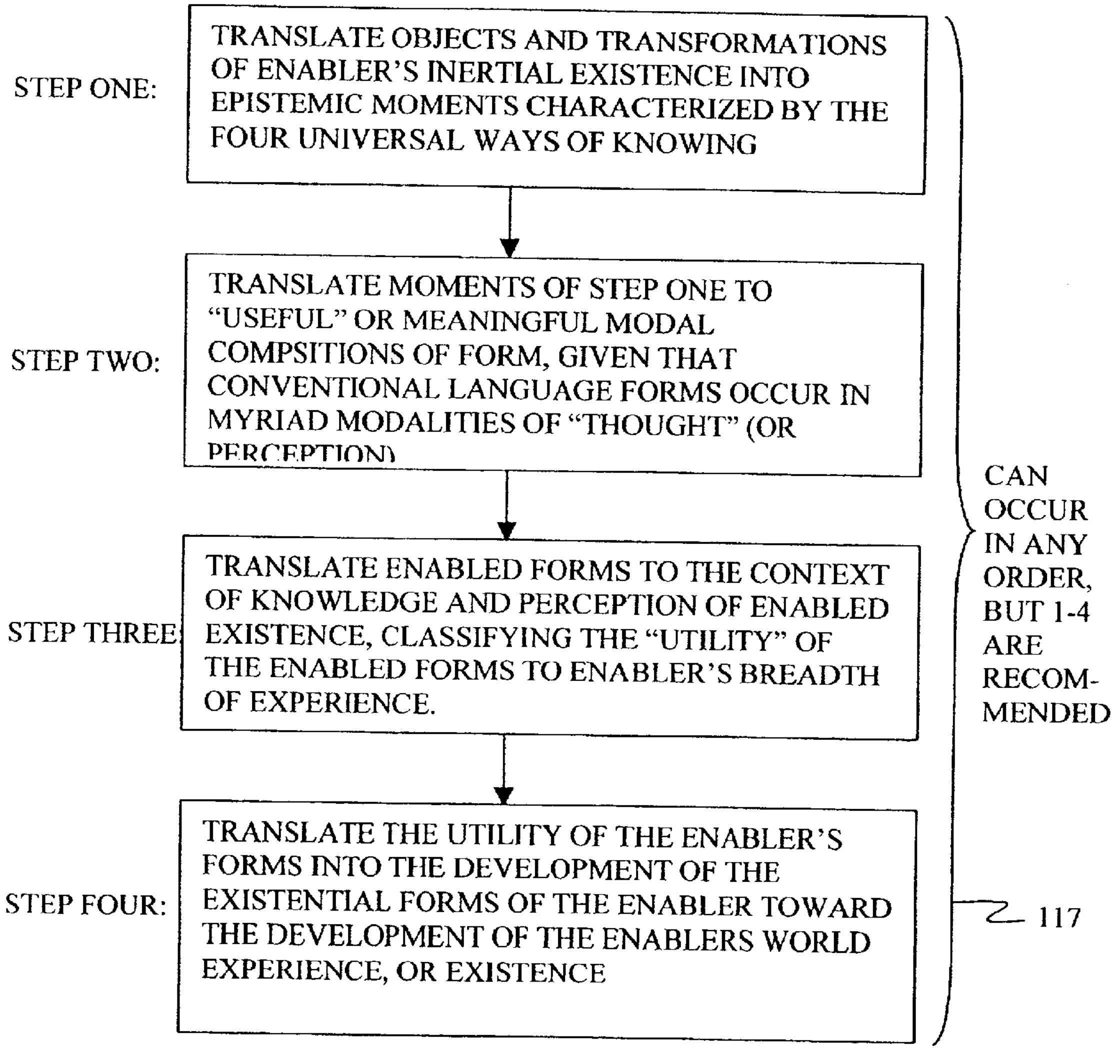
FIG. 92 shows a summary of the four step procedure of translations of the U. G.

A summary of the four step procedure is demonstrated in FIG. 92. Since the U. M. is defined in U. G., the four step translation process allows the forms of the U. M. to be translated to enabling media in a manner that grammatically (syntactically) and meaningfully (semantically) serves the enabler or user.

TRANSLATIONS OF THE U. M. TO CLASSICALLY PHYSICAL MEDIA

The forms of the classical sciences, which themselves enable the forms of most machinery of convention, begin in translation to the U. G., and therefore to the Rg and Rg continuum (U. M.), as enabling media, with the notion of a physical object. Moreover, since the classical sciences—principally physics—are so closely tied to mathematics, we begin the translations of the Rg and Rg continuum structure to enabling media of convention wherein mathematics is employed to describe physical objects.

Referring to FIG. 93, the wave equation of physics is used to describe myriad objects of the classically physical universe. In the case of the elements of matter, or physical atoms and particles and waves thereof, the wave equation, in the determinations of eigenvalues and eigenfunctions, specifies the quantum order of the periodic chart (and other characteristics in the determination of matter) as the elements. The quantum numbers of atomic media, when arrived at through the wave equation, determine the structure and behavior of a physical object called an atom (its electron orbits, spins, strong and weak nuclear forces, molecular bonding and so on). It is important to recognize, however, that in making these determinations of the wave equation, nowhere is it specified, or proven, that the object so described exists, apart from the observations, or perceptions of the physicist. What the wave equation describes, consistent with the theory of the invention, is that transformations of the enabled universe (objective forms) exist, and that the quantum numbers, along with the real analysis of the wave equation define quantum transformations of the universe—not necessarily quantum transformations of the object so thought to exist as a result of the physicist's perceptions or observations. The wave equation thus applies more to the physicist, in the existential or enabling sense, than it does to the object so thought to be described by it. For example, in the analytical definition of a spring-mass vibration, heat transfer in a plate, or an electronic circuit, since each of these thought-to-be objects is described by the wave equation, along with the elements (atoms) of the physical universe, not only is it possible that a small particle can become a wave, but if a spring-mass combination were to be contrived in such a way as to exhibit the harmonics (quantum numbers) of an oxygen atom, the spring-mass object would become an oxygen atom. In other words, a composition of many types of atoms described by the phase diagrams of materials science and the mechanics of classical masses—the spring-mass object—would become a single atom—oxygen. In fact, in theory, the entire periodic chart could be developed from a common vibration of mass, transfer of heat, or flow of electrical current in ordinary devices under the proper conditions.

This is because objects do not exist in the ultimate reality of the universe, as discussed in the theory of the invention. In order for an object to exist, an existence (knowing and perceiving) must be created; that is, the universe must be caused (phenomenological causation) in an epistemic moment of creation—a moment of form on Being must be enabled. Also as discussed in the theory, each moment known conventionally by a being is described, transformationally, in the noun-verb-noun occurrence of epistemic instance and modal compositions thereof. The U.

G. thus decomposes all instances of the universe that are composed conventionally (differential equations, wave equations, natural language and so on) into the four C's under arbitrary forms of existence. The U. G. requires that the knowledges and perceptions of matter, or of the physical universe, be enabled, and so defined as such—that the physicist and the object of physics be enabled at once. The U. G. thus describes the embodiment of the wave equation of transformations and not only the object so thought to exist that the wave equation defines, since the object must be enabled by enabling the existence that knows or perceives it. As demonstrated in the theory and specification of the U. M. thus far, the U. G. is a means of expressing how differential equations, among other expressions of languages, occur as moments of the mathematician or physicist. What is enabled in the real form of RS or the non-real form of ES of the Rg, for example, are moments of the universe, not objects so known or perceived directly, though the moments enable the knowing and perceiving of objects. A simple mathematical function of Cartesian order, $f(x, y)$, if premised on the real numbers, embodies an infinity of these moments. A polynomial order embodies (represents) a composition of moments of causal elements and thus, like the system of systems theory, does not occur as a moment of the universe unless the polynomial is transformed with some other composition in the mathematician's mind or as modal composition of the four C's. The specification of the Rg and Rg continuum in the U. G. means that its form is defined epistemically as moments of the universe under the four C's. To translate to the enabling media of classically physical forms, one must therefore acknowledge that the classically physical objects so described by convention do not exist in the form of U. G., except as they are enabled in the forms of the U. G. The U. M. therefore embodies, directly, the moments of the physicist or mathematician as they are, say, written on a piece of paper as equations, algorithms, hypotheses or experiments (language). To translate the U. M. to enabling media thus requires the decomposition of the expressions of conventional languages into those of the U. G. The U. G. was developed in such a manner that it intrinsically accounts for the inertial form of all expressions of any language, and further accounts for who or what knows and perceives them.

This is relevant to the present discussion on classically physical media because bridges, highways, buildings, hydrodynamic bearings, gears and pulleys, piping systems, tubes, ducts, fans, blowers, heat exchangers, rockets, capacitors, inductors, transistors, wires, electromagnetic fields and waves, frequency modulators, sound attenuators, chemical reactions, hot surfaces, cold surfaces, molecules, and DNA recombinations, to cite a handful of media, do not exist but as forms on Being in the ultimate reality of the universe described by the U. G. Their objects exist only relative to the inertial existence that observes or knows them and the transformations describing them so define the epistemic moments of the observer of them. In accordance with the theory of the invention neither do the principles upon which they are founded (constructed) exist but as forms on Being. And such principles are called classical or quantum physics, thermodynamics, kinematics and dynamics, heat transfer, hydrodynamics, electromagnetism, chemistry, biology and so on, which are known by observers whose ultimately real form is described by the U. G. These forms are not, in an ultimately real universe in which the U. M. is constructed, universal forms; rather they are forms that can exist locally to an inertial existence. Thus, they are forms that are universally characterized by the U. G.

When one knows a knowledge or perceives a reality one embodies inertial form on Being, and so embodies it in accordance with the forms of the theory of the invention. When an engineer formulates several differential equations into a matrix of linear algebra, and so declares that such real symbolic forms represent an electronic circuit, a building structure or some other technology or real thing, one represents how the forms of one's mind (or perception) translate in the recreation of one's own existence, namely a part of one's existence known as an electronic circuit or a building structure, etc. And when one sees such a building structure (embodies the real global shape transformations of vast arrays of coupled wave equations from an enabling standpoint) one embodies the real form perception of such a building. If one wishes to know the compositional nature of the classical form of the building, one then analyzes differential equations. If one wishes to know the building, perhaps in its awesome physical dimensions, one applies the less analytical qualitative formulations of mind such as natural language. Nevertheless, the building is non-existent and the observer is the embodiment of knowing and perceiving in the form of knowing or perceiving a building or other form of this example.

In terms of translations of classically physical enabling media, the representational ways in which we know conventionally need to be translated into the forms of the U. G. and thus the Rg and Rg continuum. Since all conventional media is inertial form on Being and since the U. G. is a language of form on Being, we simply are placing conventional media into enabled inertial forms of the universe. In the default mode of the Rg, for example, such forms of convention are translated into the (T, S, C, D) structures of Rsv, Rp and Ri modules where appropriate or useful. Likewise, but in a bit more sophisticated way (using the inertial pronoun system), conventional media is translated into the forms of the existential modes. Since conventional classically physical media is primarily based on the aggregates of mathematics, moreover, we typically translate aggregate forms of mathematics into the forms of U. M. when classically physical media is required.

Figure 94:
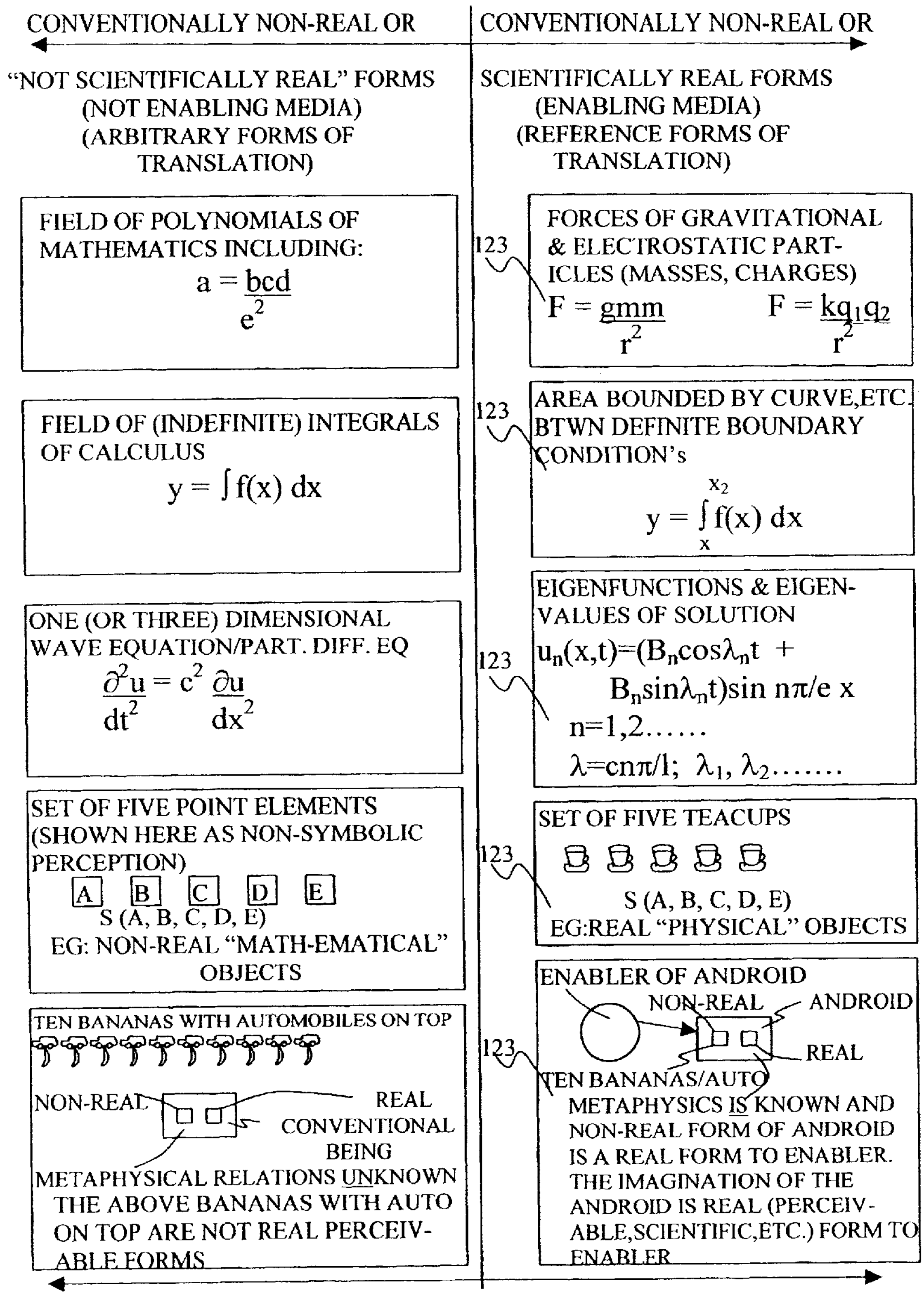
FIG. 94 illustrates the media of mathematics in relation to the real form of conventional science.
Figure 95A:
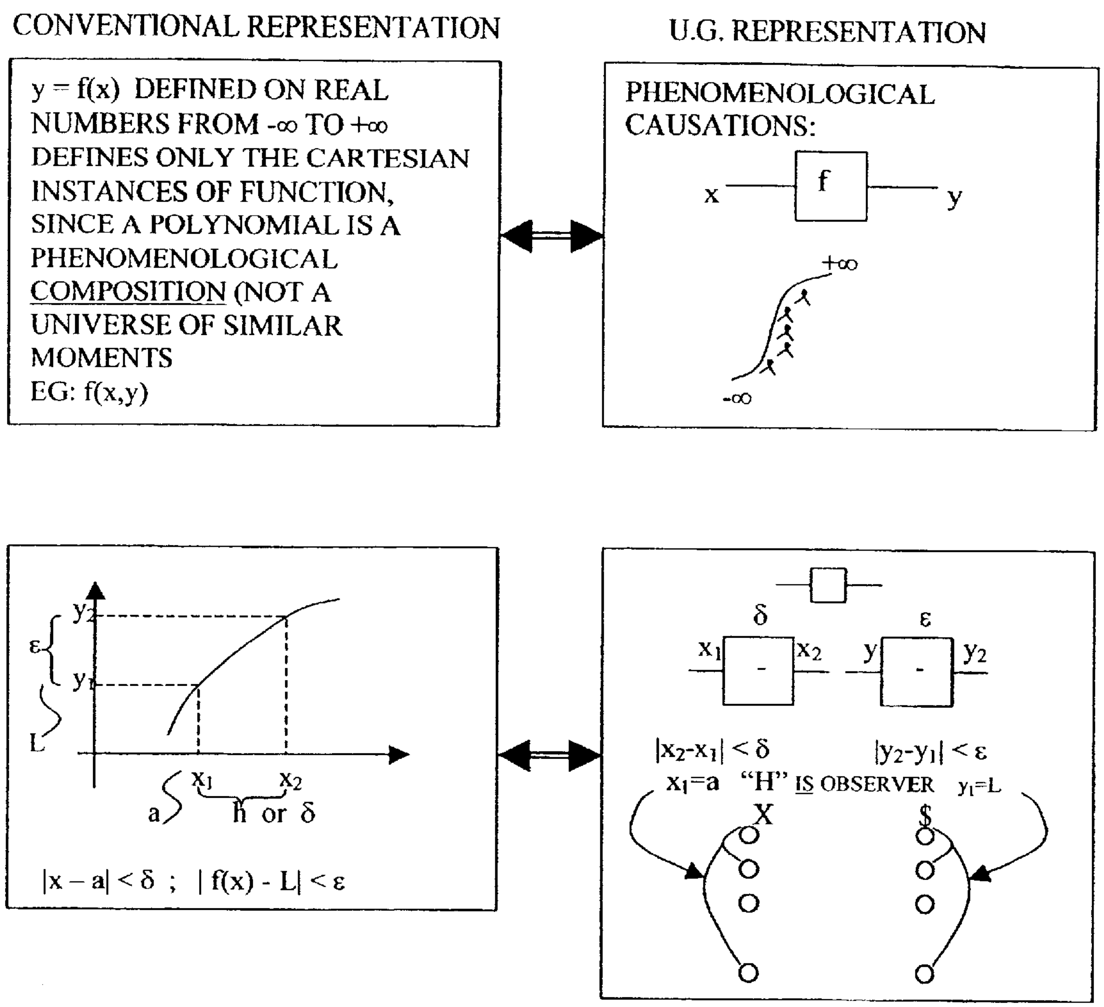
FIG. 95 is a table of mathematical translations to U. G.
Figure 95B:
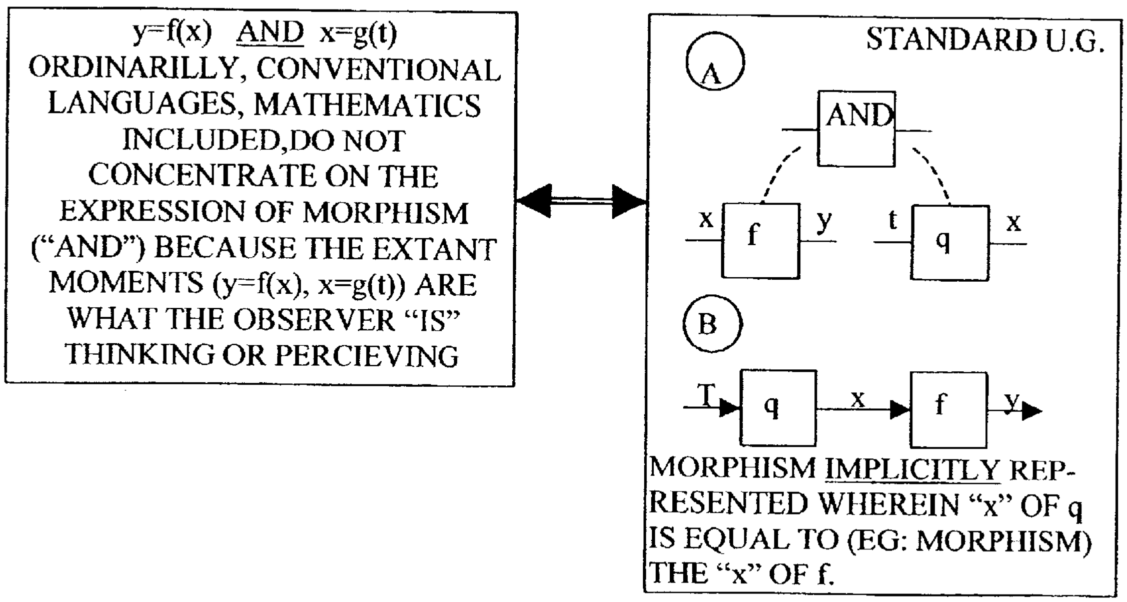
Figure 95C:
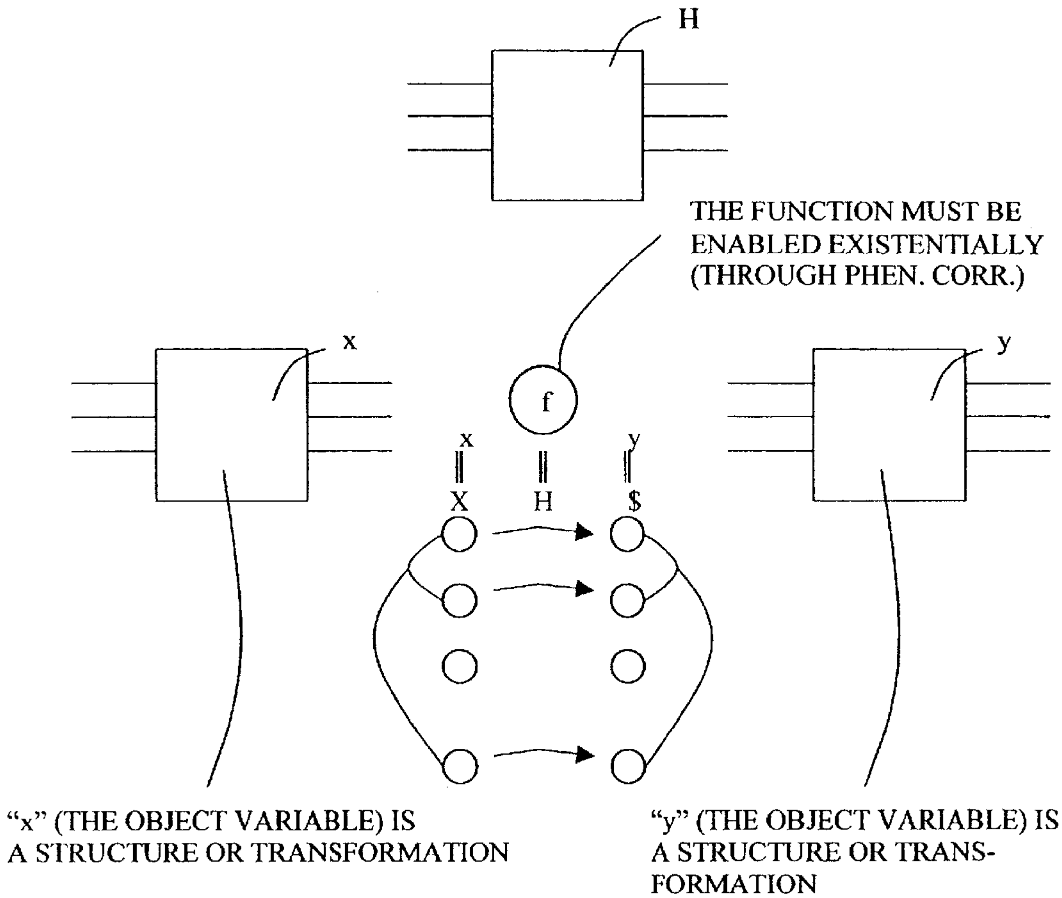

As shown in FIG. 94, the aggregate forms of convention (compositions of epistemic instance) are usually classified as branches of mathematics. While such a dissertation of translation would require in actuality probably several more volumes of specification in addition to this one, we can incorporate such forms into the media of the U. M. with several premises. First, in convention, the aggregates typically are not considered real. Rather, the real (physical) forms to which the abstract mathematical aggregate non-real forms correspond, such as ten tin cans or glass jars rather than ten points or sets, are defmed as real forms in convention. Thus, a definable technology of convention arises in the aggregate transformation of declared real objective forms. While the real objective forms (tin cans or glass jars) are said with legitimacy in convention to transform in a way corresponding to the aggregate transformations, the aggregate transformations themselves are considered not real. Though the reality of inertial form on Being is what is real, and not the tin cans, glass jars or point sets, we shall take this approach to the definition on what is real only in the enabling sense of a media of the classically scientific definition as described above. Even though the real mind of a real being is as real as his or her real body we can momentarily ignore the thrust of the unified theory and define, along with convention, what is real as what is scientifically real.

The simple substitution of symbolic forms that are representations of real things to convention such as T for tin can or GJ for glass jar, taken in the epistemic compositional form of aggregate transformations (mathematical representation), suffices for a definition of real enabling form of aggregate transformational nature of the conventional sciences. This is similar to the unified description of the law of gravity in the theory of the invention. Thus, when one translates a point or set of mathematical structure to a collection of electrons, whatever binding composition of transformations is expressed in that structure, in connection with other such translations, say other point sets to field intensities, determines a transformation of real form, say Coulombs' law of electrostatic charge.

Thus, the real form from which the U. M. may be enabled, even in the limited view of the classical sciences, is unbounded and incorporates all those forms that are considered by conventional science to be real in their knowable expression as aggregates of mathematics translated into scientific or even engineering expressions of physical things. This we shall say is the knowable reality of convention and is what is translated, in the enabling sense, into the form of the U. M.

Let us consider a simple example involving point charges of classical electrostatics. A real point charge (which of course objectively does not exist) is said in classical physics to transform with one other under the influence of an electric field or force of attraction between charged particles. What is known by the observer, consistent with the theory of the invention, is not the existence of the point charges (they cannot be point—non-existent—charges) but the existence of the observer and of the transformation of the charges. What is known is the transformational expression of Coulombs law of electrostatic point charges. Thus when any solitary aspect of any form, including the U. M., is enabled, it is so enabled transformationally. A correspondence of transformational form is said to be embodied. In the enabling media of the U. M., the particular compositional forms of conventional constructions, say electrons and fields (Q and E of vector notation) are translated to a particular aspect of the U. M. The transformational representation of convention is set into correspondence with that of the U. G. form of the U. M.

Whether one is composing a single DS structure of compositional form, which itself could be the objective composition of the aggregate formation of a conventional machinery (e.g., a space shuttle) in quantum transformation with one other composition (in the quantum-conventionally dynamic-transformation of a space shuttle) or one is composing acoustical waves in the global shapes of linguistic word forms at TS, the enabling media translation is direct and is accomplished by the U. G. according to the four C's. Since the real forms of convention are particular defined usages of aggregates typically, as specified above, it is those usages in mathematical (or otherwise) transformational form that are so translated into the universal forms of the U. G. A table summarizing the general transformations of the aggregates of mathematics is shown in FIGS. 95*a*–95*e*, from which one may so translate, as shown, into the U. G. forms, since they inherently accommodate such forms of convention.

The task at hand in enabling the U. M. in specific classically physical media then becomes translating or enabling from the forms of classical media that are useful toward the purposes of the user and enabler of the Rg and Rg continuum. While this translation too is arbitrary, since it depends on the enabler's design constraints (e.g., whether one is constructing an Rsv module for the manufacture of chemical compositions or an Rp module for the development of chemical factories or some other of infinitely many scenarios), the broad forms of classical sciences can be categorized in terms of their utility to the generalized embodiments of the U. M. For example, while one certainly could enable the transformations of TS in infrared wavelengths of light and apparatus provided therefore in phenomenological expression, such forms would not be of any great utility to a human user, since the human user does not perceive infrared light, though perhaps it would be a necessary form for an electromagnetic implementation of TS of Rg for an androidal user. Thus, one can arbitrarily begin categorizing the forms of the classical sciences in terms of the utility to a broad range of contributions to a humanities-defined human condition. As shown in FIG. 96, we thus bring to bear on the form of the U. M. the whole realm of conventional classically scientific forms or engineered forms toward this end. Dynamic formulations of inertia, mass, force, space and time, charge, cells, bacteria, DNA and so on in the forms of machines and machine elements are translated where they may best under the structure of the U. M. serve the human condition. Hydrostatic and hydrodynamic fluid mechanics in the forms of fluid objects and processes (turbo machinery, for example), are translated into the U. M. as shown in FIG. 96. Heat transfer, the thermodynamic properties of matter, and structures such as plates, cylinders, trusses and so on that may have consequence on such thermodynamic phenomena, along with the psychrometrics of air in the buildings that may contain a sensory-motor TS structure to which the user communicates, likewise are translated to the U. M. as shown.

Figure 97:
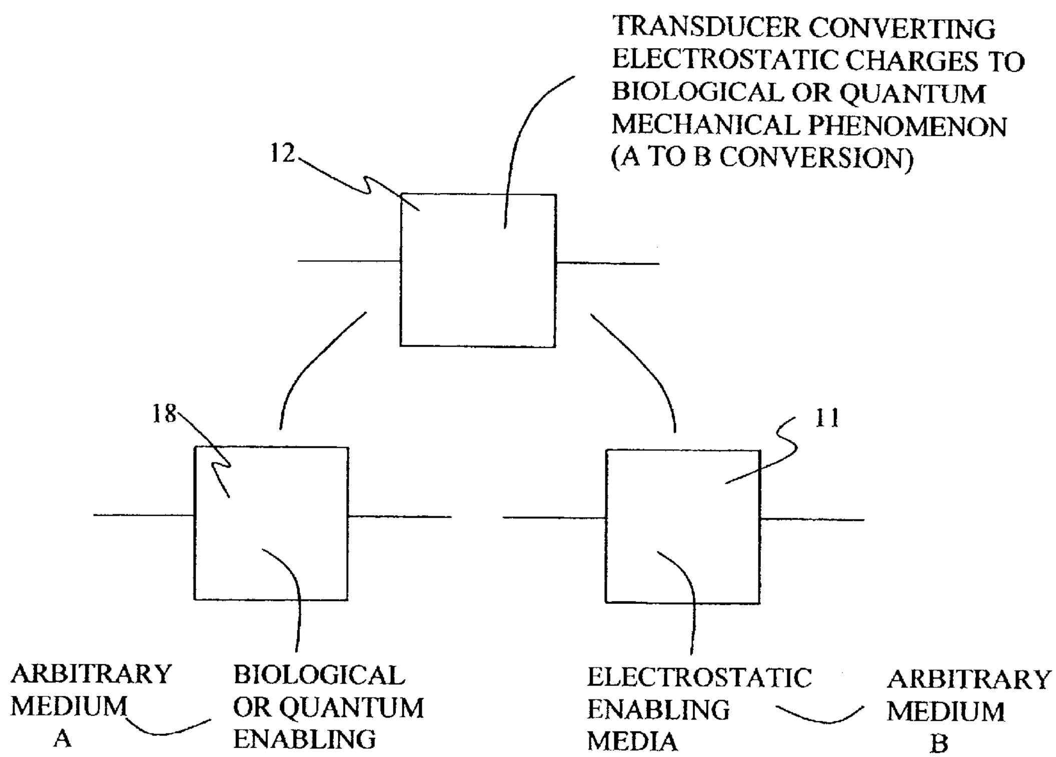
FIG. 97 shows translation of various media in a module (classical transducers in CS structure).

In general, the RS of the Rsv, for example, is enabled real form. In the default mode the real form is the phenomenology of form that corresponds to ZB. The form of ZB in ES, however, may be viewed separately in enabling media from ZBreal in RS. For example, since the RS realizations may indeed be, say, classical electrostatic charges, this does not mean that the embodiment of ZB (in ES) necessarily obtains definition at all from the conventions of electrostatics. It could very well derive from atomic or genetic structure of a classically quantum or biological order. In the performance of CS, a conventional transducer phenomenology of form would couple the action of electrostatic charges to the motion or wave behavior of atoms (RS to ES), as shown in FIG. 97.

Figure 98:
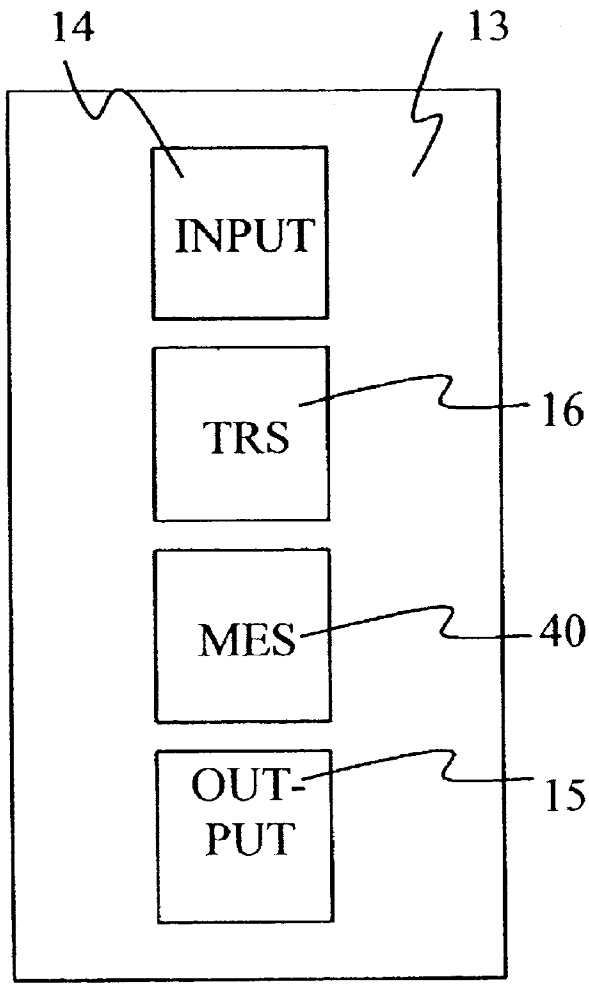
FIG. 98 shows translations of classically physical media to TS structure.

In terms of conventional media, we may begin a discussion on the enabled forms of the U. M. with the structure of TS, as shown in FIG. 98. Obviously, any transformational medium can serve as a basis for global shapes of communicative real form. The five senses-motors of anthropomorphic shapes are a start. The conventional fields of robotics and communications provide a background of enabling media. All motor activities, those of mechanical motion (robot arms, strain gauges and other tactile-based sources of global shapes), of acoustic wave behavior (voice recognition and synthesis), of visible light (television, print media, computer graphical device) are enabled as output systems of TS. Any global shapes of any medium, however, (electromagnetics, heat transfer, thermodynamic transformations, mechanical vibration and so on) can serve as embodiments of output systems of TS provided those shapes correspond to the non-real forms of user and Rg. The input systems similarly are enabled in such media but from a sensory standpoint, or in representation to Rg, since the definition of sense or motor is established existentially and not phenomenologically.

Generally concerning TS structure, the enabler of Rg should be open-minded in the formulation of input, output and translation systems. For, example, in a well known form of acoustic machinery, laser beams, reflected in conventional viewpoint from window panes that are in acoustical vibration from the sounds (TS phenomenological transformations) of voice may be used in either direction of a communication through glass, provided that the voice source and light reflections are changed to reflect who is realizing and who is representing. In such a case the building facility in which the window panes reside becomes part of the TS structure, since the panes are phenomenologies in transformation. Similarly, the anthropomorphic vision of Rg (TS input system) can reside in the form of a building facility in which the sense-motor capacity of Rg is housed in the building facility. The building thus is a portion of TS phenomenology.

The important point to keep in mind in regard to the TS structure of Rg is that it couples the user and Rg in their non-real form through its real form. The CS therefore must transduce (in conventional viewpoint) the forms of the input and output systems to those of the ES of SS (and RS), each of which may be enabled in wholly different media.

Generally, any transformational forms of conventional definition in which occurs a quantum compositional transformation of any communicative real form (as results from the four step translations) is suitable for TS construction. It thus is paramount to recognize that the particular user determines the media of enablement of TS.

Figure 99:
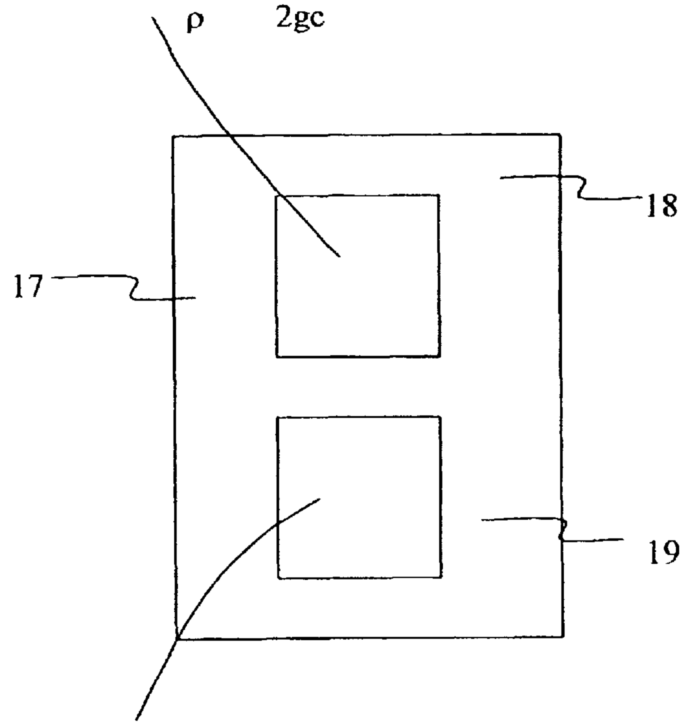
FIG. 99 shows translations of classically physical media to SS structure.

Similarly, as shown in FIG. 99, the SS is enabled in a great variety of conventional media.

As a preliminary example of such enabling forms, let us consider again the general notions of the U. G. To gain a better insight into the nature of the enabling media of the Rg and Rg continuum, let us consider the conventional medium of mechanics of physics from the standpoint of classical machine design, including hydraulic systems, structures and control theory, bearing in mind the ultimate purpose of defining enabling media for SS and, of course, other componentry of the U. M., due to the universal nature of the U. M.

Let us begin by examining a single question, namely, how is it that real machines, in their static or dynamic capacities, abide by such formulations as torque, inertia, stress, strain, displacement, vibration and so on, when the fact of the matter is that none of these analyses can be touched, or the very knowledge of such machines is not real and the machine itself is deemed to be reality so ordered according to such analyses? The product—a mathematical product—of force and distance, for example, whatever compositions they may be, is said to result in a torque, some applied phenomenon to a point mass in, of or onto a machine element, whose properties so result in kinematic, and dynamic motion—still a further untouchable. Yet if one were to accept such existential premises, one ultimately would be riding in an automobile or a space shuttle.

The nature of a machine, consistent with the theory of the invention, is defined within the nature of the observer of the machine and has no form whatever outside of such an existence. If one considers the design process or the technological discipline of engineering, one must admit that the non-real form of an engineer or of a company, as reflected in the representational forms of blueprint or CAD design, is realized or transformed into a reality of the actual machine by said engineer or company. A manufacturing specification, still another non-real form, defines a process on the transformation of these things existing and observable in the real world called materials into a conformance with the originating blueprint or machine design. Through a succession of tests of machine manufactured quality, still other real processes with real transformed materials that abide to non-real form (conformance test procedure) take place in such a manner that the real resulting machine is said to conform with its design (non-real form). The entire process of machine design and fabrication, and in fact the process of all industrial practices, is summarized in the realization of a simple non-real form, called an idea or design concept, into a real or realizable and verifiable reality or real thing, which then interacts or exists in the transformed reality of real world of designer.

Nowhere in such processes however did one ever touch a force, or a torque or even a vibration and so on in the construction of such machinery. One may have touched a machine whose element masses (objective form) so quantumly transform in aggregate in accordance with knowable non-real transformations called a function on displacement whose sinusoidal behavior (vibration) results from the solution of a differential equation premised on boundary conditions of said machine in the theory of aggregates, as in the calculus (e.g., phenomenologies of sense corresponding to those of non-real form). But nowhere in the construction of such machine did anyone even so much as lay eyes, hands or ears on a torque or a force. This is because the designer of such a machine never looked at himself, in which case such forces and torques and all other physical description would have been touchable, at least by the enabler or observer of the designer. It is in the existence of such form as the designer that the Rg takes interest—in the realization, or embodiment thereof, of non-real form to real form. It is the existence of the designer that is embodied in the method and apparatus of the Rg or is accomplished in the translation of enabling media.

Concerning the procedure or industrial practice of a manufacturing company, the designs (product) of such a company are embodied in the minds and in the machines of such a company, and so too are its industrial practices or manufacturing procedures. Moreover, such a company of man and machine so embodies the real process of transformation of material into a compliance with design in the production of a product. Even further, the use of such resulting machinery takes place in still other existential embodiments called customers and users of such equipment. Regardless of its conventional existential structure, however, the entire process of the institutions of industrial practice can be summed up in the institutional realization of ideas in the real medium of the (physical) world. The enabling media of the forms of institution itself, with respect to the present forms of conventional physical forms, in turn enable such forms of the physical world. In how such forms are known is found the representations of classically physical enabling media.

No doubt much of the raw intellectual and perceptive power of the Rg in its embodying capacity may have gone unnoticed until now. As was mentioned earlier in defining the structure of Rg, the ES, along with other terminal forms of Rg, embodies quantum moments or transformations of form on Being. And that is what any form is universally. If a velocity is realized, it is so realized quantumly. If a composition or trajectory of velocities are realized, they too are realized quantumly. The kinematics of a machine, for example, is in fact the form of the machine as it is known in kinematic form. Thus, when one realizes a machine, one realizes the non-real or in this case kinematic form of such a machine.

Let us then consider for the moment not the breadth of a machine design including control theory and other design methods, but a single function describing the whereabouts of a point mass, or center of mass of a machine component. In such a consideration, we ask, is the machine component in all places at all times, since a continuous time function so describes such a thing? Or, is the actual machine element, in reality, a quantumly-real machine element in moments defined by a function (e.g., all the instances of such a function of real variables)? Or is the element a single instance of transformation of such function, in which case the function defines myriad possible conditions of such a machine element, any one of which can the machine element occupy in reality as a quantum moment?

The reason that a velocity is instantaneous in conventional theory is because it can only occupy in reality a single quantum transformation of form. In describing machine elements, it should be taken to mind that conventional theory describes non-realizable forms in its expressions in the ultimate reality of the universe. Such forms are realized in only quantum transformations or instances of such description (function) and thus it is the composition of form of convention that is thought to exist objectively. The enablement of ES or any other form of the U. M. occurs in the knowing of the modal compositions of conventional forms. In relation to other componentry of Rg, the ES so embodies form that corresponds to other form as defined earlier. In enabling ES one enables (translates) the compositions of convention to the ES structure, which in turn corresponds to the defined forms of Rg (via CS).

To take a broad intuitive approach, in convention, thousands if not tens of thousands of representations are defined on paper (in a representational medium), comprising such configurational aspects as control theory, kinematics, dynamics, friction losses and so on. These relations then are translated into such similar forms in manufacturing procedure on the transformation of material. The resulting object then at once is said to embody the design of the machine, or such a machine is said to somehow embody all of those tens of thousands of instances of transformation at once, though realized by an input trajectory. This is not a very delicate system of control to say the least. Similarly to the way in which an atom or electron may on a probabilistic basis be in space and time with momentum at a particular instance but cannot wholly be predicted (by uncertainty of quantum physics), a conventional machine somehow is in some synthesized condition of control, kinematic, thermal and so on theory but cannot be exactly pinpointed as to its specific composition in convention, except by input trajectory.

This is because it is wrong to think that reality or a real machine is anything more than an instance or compositions of instances of universe. The forms of ZA, ZB and ZBreal have therefore been constructed in U. G. so that we may maintain an exact definition on the form of reality, consistent with the universal form of the universe. If in the process of designing a machine an engineer employed a limiting process of mathematics (calculus) we wish to stop him or her right there. That is what is or can be embodied in RS or realized as ZBreal or embodied in ES. The actual transformations of the calculus, the thoughts of the designer are what are realized. If we make reference to the velocity of a particle in relation to time, or to its acceleration, it is that form that is so realized in ZBreal. It is the thoughts that comprise knowing that are realized in ZBreal, and thus are so defined in ZA in translation from convention to U. G. Anything one can think of is realized in ZBreal (or ZA or ZB) in the U. G. manner in which it is thought, if it can be realized.

If one realizes a differential equation, one then realizes, typically, infinities of infinities of transformations of universe. For starters, by the very use of such mathematics, one has implied the existence of infinities of aggregates in the representational forms of real numbers. What one is realizing when one realizes a differential equation is exactly that—a world, a world of transformations of the universe. When one thinks of assembling such an equation, one is describing a composition on a small number of objects of the differential equations. This itself is a composition of quantum transformation of universe, and can so be embodied in the forms of the U. M.

A simple machine element, let us say a lever, is therefore not so simple a device. Embodied in it is anything one can think about such a lever, including getting one's finger stuck in it.

We have taken the circuitous route to the enablement of ES (and all other Rg forms) because we wish to demonstrate that no machine element exists in ultimate reality, and that the element may comprise infinities of ultimately real transformations. The Rg is an extension of the user, of whatever the user thinks or converses about. If one wishes reality to be in the condition of mind, then the condition is represented in ZA of TS and Rg does the translating (with ZB through CDS) and realizing, in default mode directly, and in existential mode by thinking about such a realization first. The inertial universe exists only as one thinks it to be and the ultimately real universe is eternally momentary. If one can think about velocity, or electromagnetic field or cantilever beam and so on, one can realize such a form in or through Rg.

Consider for example the existential boundaries of any form, say a machine form. It is well known, for example, that the handle of a machine switch is comprised of atoms, which forms possess electrons. Why is it then that in the design of such a machine element electromagnetic radiation typically is not a consideration in the design, since in reality the atoms are so influenced causally and hence affect machine operation of such a mechanism. How is it that, simply by arbitrary declaration, electromagnetic waves, which on the one hand are as real as atomic bombs, can be on the other hand deemed not to exist, in fact wholly irrelevant to the existence of such a form as the present machine element of the handle of a switch, just because one engineer says so?

The reason for this is that neither electromagnetic waves, nor machine elements exist. Realizations of thoughts exist (representations too), and whatever knowledge form is being characterized of mind is in existence, in reality. The present invention then realizes knowledge, and the knowledge that is embodied in ES as ZB and ZA so corresponds to the realization of such knowledge, or ZBreal by way of CS and CDS. In the present matter of enabling media, it is that knowledge, embodied in all of the instances of all of the thoughts of all of the designs of all of the machines and machine elements of all of such human efforts that becomes fair game.

Let us demonstrate this point in the enabling forms of classical transformations of mass in space and time.

In classical mechanics a mass m is said to transform in space and time in accordance with F=ma. The realization of a mass in its current form is not possible. The realization of a field of force F in transformation with a mass, m, and an acceleration, a, all of which are classical objects or fields, is possible, since it simply is an expression of the transformation of aggregates, a universal quantum possibility. If we wish to indicate the knowledge of the exact expression, as above, a single quantum transformation, the equals sign, over a product m×a in modal composition is involved. If we wish to claim that a force, mass and acceleration of such form as the objective (visual) mass exist in a variable array of possibilities of transformation we thus embody a causal element embodying such trajectory of verb.

In realizing machinery of ES in enabling media, it is not the ten thousand and one control schemes, kinematic and dynamical equations that are realized (unless of course such is desired), it is an exact instance of such existence of such machinery that is realized or serves to enable the Rg. If a machine's existence is thought to be the transformation of a point mass in time, then those instances are composed in ZA and realized in ZBreal by apparatus of XS acting over DS phenomenologies, or they are translated herein to ES phenomenological embodiment.

In order to gain an appreciation for the existential (epistemological) capacity of the Rg and Rg continuum in terms of enabling media, we can consider what actually occurs in conventional approaches to the development and use of a technology—a realized form of the universe. In convention the design and fabrication of a product, say an automobile, occurs in the form of an institution—a corporate enterprise. What holds in existence the design process and the manufacture of the automobile is the institution of form on beings and machines. The action of RS of Rg is considered to be a manufacturing organization. What transforms raw materials into an automobile itself; that is, an action of Rg (ZA, ZB and ZBreal) wherein ZA is the design, ZB the realizable material in the form of an automobile, and ZBreal the real automobile, may be considered a realization of RS through CS action. The design of the automobile occurs similarly (ZA, ZB and ZBreal). The automobile—the object—then is thought to be the result of the effort of the institution, and thus can be thought of conventionally as the embodiment of all of these cooperative efforts that in convention take the form of business plans, design standards, manufacturing plans and methods, etc.—in short, the institution. As a result of our conventional reliance on the implication that the institution exists in support of the realization of the automobile, we lose sight of the fact that in the ultimate reality of the universe, the automobile is the work of the institution. This is similar to the notion of an economy wherein we falsely believe that the products of an economy are existentially relevant to the measures of an economy, when in actuality currency is a measurement of human effort. Consequently, we view the end product of an institution—herein an automobile—as a complete embodiment of the design of the automobile (control theory, stress analysis, etc.). The automobile is said to be all things designed (specifications and blueprints) at once. It is an object embodying this design. In the ultimate reality of the universe, however, the thoughts (non-real forms) of the engineer, production manager and president (the organization) are realized through the structure of the institution (ZA, ZB and ZBreal) and at any given moment the automobile is in only one quantumly realized moment of the universe as described by the U. G. An automobile does not embody at once the harmonics of time-based vibrational analysis, or all conditions of structured analysis, and so on. Since the ultimate reality of the universe is not even considered analytically in convention (ZA, ZB and ZBreal of the institution) the control of reality in the form of designing and manufacturing (and using) automobile is not even possible analytically as an embodiment of machinery itself. It is considered an institution—beyond the purview of the machinery or automobile. The Rg embodies, represents and realizes reality—the reality of an institution or the moments of an automobile. When translating to the U. G., then, it is the moments of design criteria, manufacturing plans, methods and procedures, raw materials, concepts, ideas and so on (including business strategies) that are embraced by ZA, ZB and ZBreal of Rg. The Rg holds in correspondence moments of reality, defmed in U. G. the expressions of a hydrodynamic bearing of a crankshaft of an automobile with their actual moments in reality, and the moments of the institution (business plans, etc.) with the reality thereof.

Thus, when considering embodiments of Rg components in enabling media, it is best to evaluate the medium for its capability to embody knowledge. When it is desired that such knowledge as $Fc=Fi—(Kc/Kb+Kc)Fe$, (the compressive force of connected mechanical parts held together by the summation of external and initial forces), a simple bolt action so embodies such transformation, and such a bolt, though visible or objective in another medium, that of light, is the enabling medium or realized form of such knowledge. Or when displacement of a point mass, a non-existent object, is so governed by the embodiment in a compression coil spring of rectangular wire, such a knowledge embodied therein is expressed conventionally as $\delta=2.45\ FDm^3Nc/Gt^3\ (b-0.56\ t)$, the spring itself (which of course exists only in transformation) embodies such knowledge. Where hydrodynamic lubrication is concerned, such a real form as a journal bearing embodies in it the knowledge of transformation of friction (coefficient thereof), viscosity and so on, as in $fD/cd=\phi[uns/P(r/Cr)^2]$. The jerk of a cam follower, moreover, embodies in it the transformation of third derivative of displacement of such follower in relation to cam and follower movement: $x=4\pi^3\ Lw^3/B^3\cos\ 2\pi\Theta/B$. Such an embodiment thus contains a world of transformations of the designer's or user's existence. In the case of the enabling media of ES, whatever composition of form in quantum transformation translated from conventional representations are available, and such supply is unbounded, is what is employed as the media in which the transformations of ES are embodied. Since the U. G. universally translates all languages, it can be seen that once the action of a cam follower is translated back to U. G., the transformations of some other language (say the natural language of English) can be said to be embodied in the cam follower to the extent that the phenomenologies of English usage and the mathematics of the cam follower correspond (translate). A digital computer is nothing more than this in terms of embodiment, as the following demonstration indicates.

In illustrating the utility of the U. M. in translation to its enabling media, let us claim up front that there is more useful computational power in a camshaft of an internal combustion engine than there is in a conventional super computer, which we now demonstrate.

To begin, let us consider that we have in our observation an internal combustion engine which contains a camshaft. Embodied in it are such transformations, or shall we say, computations as those defining its elastic (strength of materials, wave equation and so on); hydrodynamic; thermodynamic; kinematic; dynamic and so on behaviors. In a similar manner to that with which we described force interacting with mass earlier, one could do the same with, say, eight or so good textbooks at hand, in which case one would declare that embodied in the real existence of such a camshaft is such knowledge. Thus, whereas a super computer is confmed in its embodied transformations to the capacities of its digital logic, a simple camshaft embodies countless textbooks of transformations in the real existence of the shaft.

What is it then, we may ask, that seems so computational about a super computer and so mundane about a camshaft?

The reader should be prepared to acknowledge such a massive oversight into the nature of universe in convention. The camshafts of a super computer, by analogy, simply are connected not to timing chains but to input/output devices, which forms transduce to sensory transformations. And that is all. If one were to couple a camshaft to input/output (CRT/keypad and so on) devices by way of transducers, optical encoders, strain gauges and so on, in order that such form as a camshaft were to influence such devices in a corresponding way, and further such devices in turn were to be made to correspond to said I/O devices which embodied in them such real forms of non-real forms of communication (symbolic forms) as those of the textbooks to which we referred (as is the case in the instrumentation of a dynamometer for example), such a computational device surely, it can be seen, would out perform simple Boolean algebra, since they are ready-made embodiments of some of the most complex forms of mathematics.

Moreover, we may ask how is it that an analogue computer can solve to exacting detail differential equations that can only be approximated in Boolean realizations? It is because a digital computer is exactly that—a digital computer or Boolean realization. Though it is used widely for such a thing as computation, a Boolean machine actually is not existentially equipped to handle such computational knowledge as arithmetic on up to differential equations, needless to mention analysis, group theory, topology and the like. A digital computer thus is a failure on the part of the engineer to accommodate camshafts (or atomic linear accelerators) with the appropriate transducers (or photoplates, oscilloscopes . . . etc.) to tap into the knowledge so embodied in such forms. The D-XS-D platform, along with CDS, ES, CS, TS and the like are just such an embodiment, in the case of the realizational capacity of Rg. The ES structures are direct embodiments of such knowledges of camshafts and so on. The transducers on a camshaft or other physical device in operation with CS so causally influence TS and CS and maintain the existence of said camshaft in correspondence with the symbolic representations of TS, which reflect forms of mind of the user. In forthcoming discussion, it would be better to view a digital computer as a half-witted camshaft. If not, the reader may wish to compare that knowledge of Boolean origin, and even the whole of electronic circuitry (transistors . . . etc.) to the vast embodiment of human knowledge referred to as humanity or civilization. It is the knowledge of humanity we wish to embody herein in the construction of Rg. Camshafts are equal forms to transistors since each is an embodiment of a portion of human knowledge.

The reason that the general concept of analogue computing has not made its way to any widespread use and is limited to a few electronic devices is of course the absence of a universal grammar in which to construct such forms in useful ways. Hence analogue computers are employed in the solution to differential equations and other simulation problems. What is simulated in the Rg is inertial form on being itself. One cannot connect a camshaft to a CRT linguistically because the fundamental transformational nature of knowledge (language) itself is not understood universally in convention. Once electrical charges, electromagnetic waves, heat transfer and so on including camshafts are constructed in the universal forms of U. G., they become ready-made embodiments of knowledge, and if such embodiments of knowledge (enabling media) are used, instead of for the purpose of their own conventional knowledges, for an embodiment which in turn will correspond to other structure in the (T, S, C, D) configuration of Rg, then they become enabling media of the apparatus of the Rg; e.g., the non-real form of ES, CDS and so on. Thus, the forms of the Rg become bounded in the enabling media of convention and future art, which itself is boundless.

The material presented herein, moreover, will of course be taken to still another level later on wherein such camshafts and other media will embody the transformations of mind of android, in correspondence with sense, in which case the realized forms of camshaft (by analogy), embodying the mind of android, so correspond to transduced or coupled forms of perception, say electronic perceptions, and such forms will so correspond in the mechanism of transducer in the correspondence between the two maintained by the transducer. Obviously, however, the science of androids is not demonstrated by way of a camshaft, even though in principle such is a valid device for embodiment.

The ES of the Rg is boundless in enabling media, and thus is specified herein by incorporation of all such conventional knowledges as embodiments of ES structure, within the confines of its described form earlier in the disclosure. The rule is that any enabled ES structure thus is transduced (conventionally) or made to correspond (CS) to TS transformation and RS realization. As was mentioned, since the Rg is constructed in universal grammar there is no particular division of enabling media into specific Rg embodiments, however, since each form of the U. M. is universal. Herein we only point to a general guideline for enabling forms, as shown in FIG. 100.

As shown in FIG. 100, the CDS and CS (and of course all other transformational embodiments of Rg) are enabled in the transformational capacities of any medium, when that medium is viewed in terms of phenomenological correspondence (e.g., when the knowledges of camshafts, electrons, etc. are viewed as morphisms or H determinations). If a transducer is required in the media as well, for example, if ZA and ZB of ES under CDS are embodied in the respective ES structures in different media (when CS transforms electronic media with mechanical media), the CDS or CS also embodies the transgression of types of media as well, as shown. Since all forms are universally constructed in the U. G., however, once translated the forms are not different media but for declaration. Thus, in a conventional transducer such as a potentiometer, once the device is translated to the U. G. it is no longer viewed as two distinct phenomena (classical force-mass or dynamic motion and electric field) transformed; rather simply a phenomenological correspondence exists.

The RS, moreover, is simply declared real form in the detailed embodiment of MRS. If such form is to be a real camshaft in the Rg, in the above example, then it would not be an embodied ES form (so enabled). Rather it would be a real camshaft of RS. ES in such a case may be atomic media for the purpose of consolidating spatiotemporal extent (e.g., if one realizes a camshaft one may wish to embody its non-real form in a spatiotemporal extent not so cumbersome in the senses as the actual camshaft, and thus would use atomic media, or digital circuits or whatever, in the ES embodiment).

Figure 101:
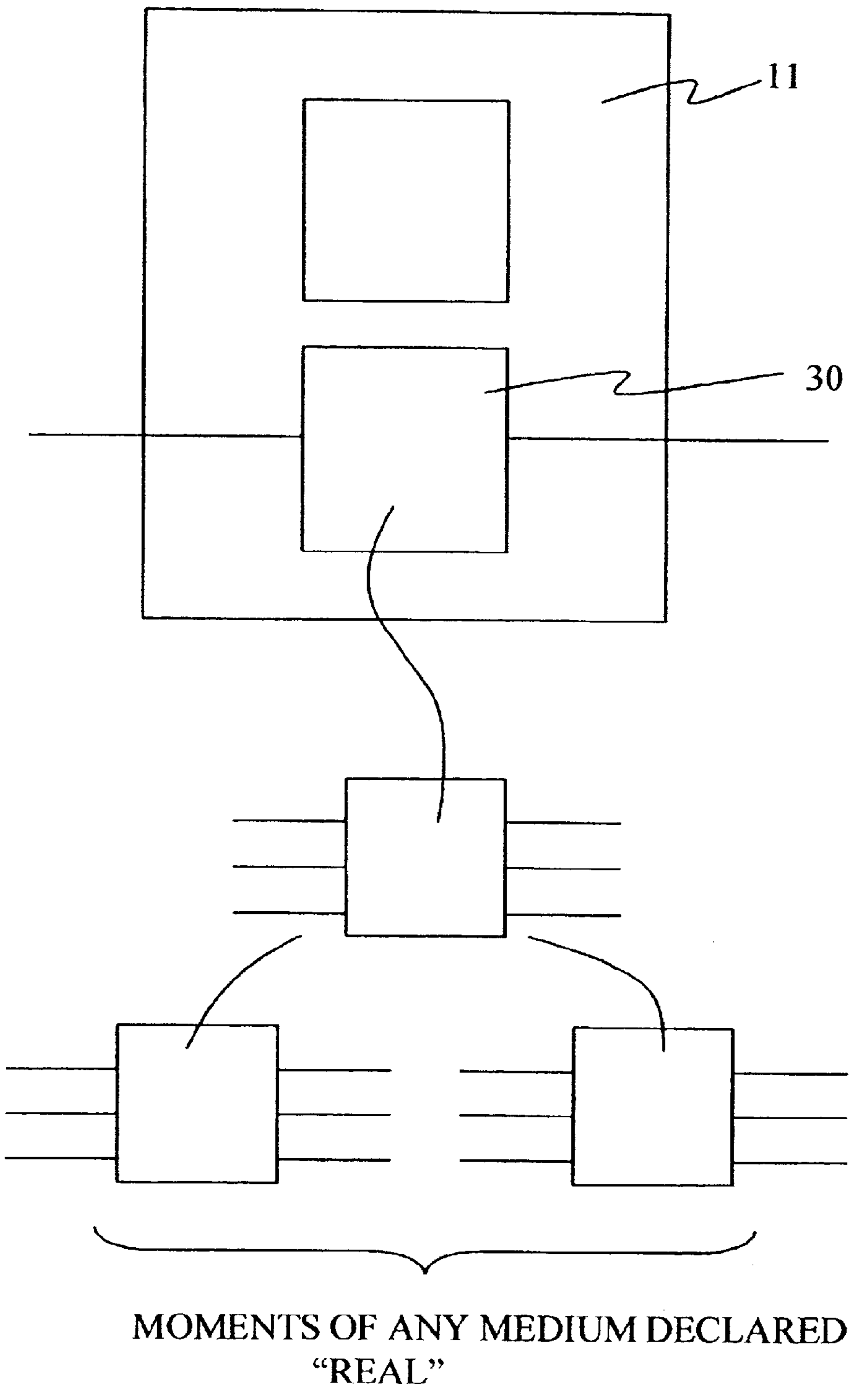
FIG. 101 shows translations of the RS to conventional physical media.

In particular regard to RS, it should be recognized that one objective of the Rg is to embody the forms of convention in a universal and more ultimately real manner to better serve the human condition. Thus, while all forms of classically physical media serve equally well as enabling media to other forms of the U. M., when viewed as RS realizations or real forms, the reality of conventional technology is embodied under the structure of Rg, wherein it is embodied as the real form of Rg in existential or default mode through RS. In such a case the reality of the conventions of technology is placed into ZA, ZB and ZBreal existential structure and an expansion of the existential universe takes place on the basis that user views world in an entirely different manner, as described throughout this disclosure. The CTS and ZBreal forms of RS are demonstrated in enabling media in FIG. 101.

Figure 102:
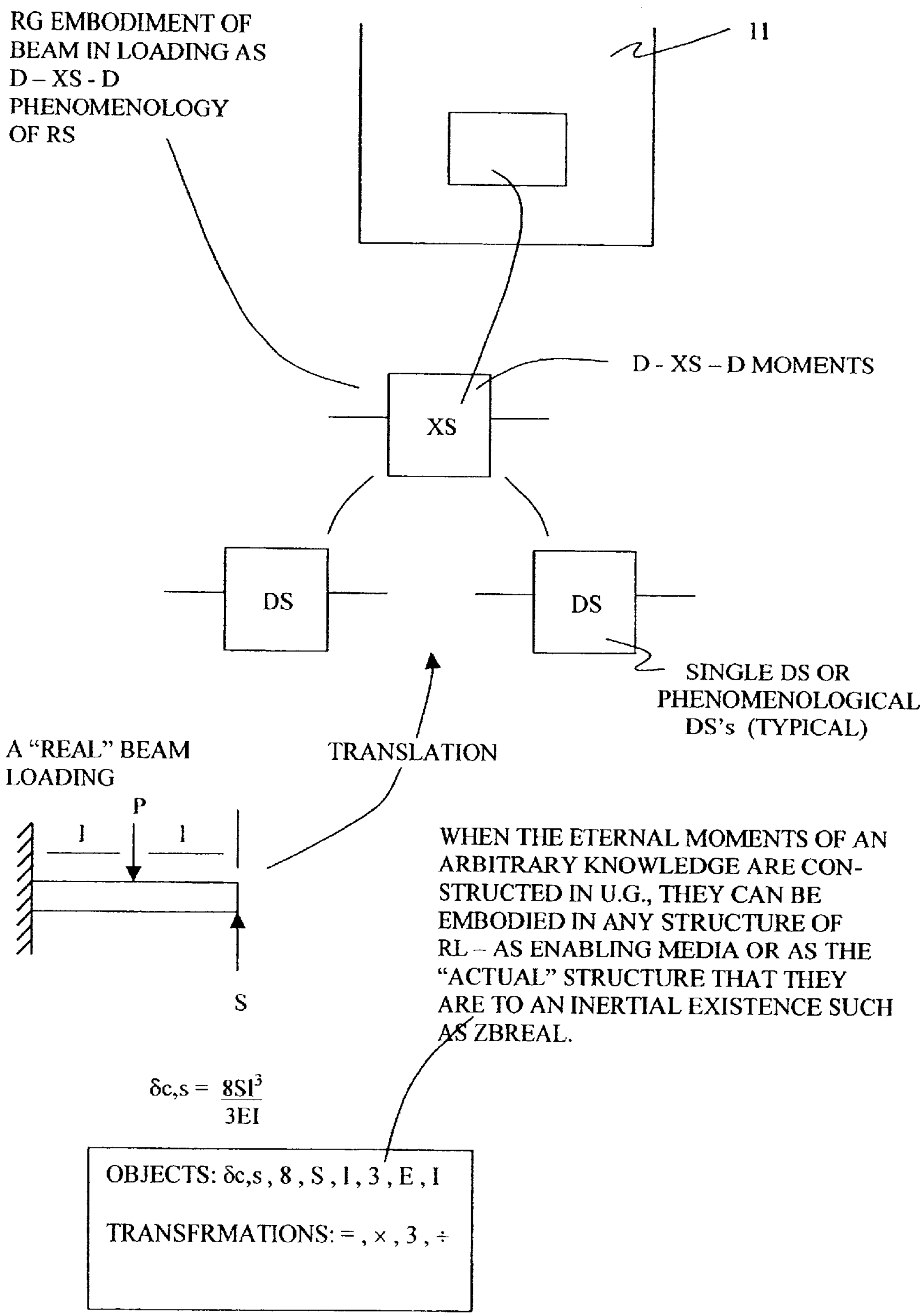
FIG. 102 is a summary of classically physical media.

Beams, trusses and other structural members; hydrostatic bodies and fluid motion; machine components; thermodynamics and heat conducting media, and all other classically physical forms, whether they are deemed to be fundamental (physics) or constructed as technologies (engineered forms of physics), all embody various knowledges that in certain enablements of Rg play essential roles in the performance of the Rg and Rg continuum. As shown in FIG. 102, with respect to the RS of Rsv, for example, the real embodiments of such knowledges exist in the D-XS-D realizations. The ES of Rsv then embodies in what may very well be very different media, transformational forms that so correspond to such D-XS-D realizations. The TS forms of course are real embodiments of still other (sense-motor) forms so corresponding. The CDS, moreover, since it embodies relative to Rg structure the thinking or translational capacity of the Rg, is so enabled in phenomenologies of form abiding to the formulations of phenomenological correspondence. Since the CDS and CS are each phenomenologies of form, or constructions of U. G., their transformations also are immediately embodiable in any enabling medium. A camshaft, an automobile, an electron, and any other form all transform objective forms: they are computers when so constructed in the universal forms so described herein. A camshaft transforms objective forms of rotation (spatiotemporal forms) to the translational movement of a cam follower. This in fact is no more or no less a computer than a conventional digital or analogue computer, except of course that in an internal combustion engine it does not transform under CS with input/output device of convention. Under apparatus of strain gauge, however, it indeed becomes a bona fide computer coupled to a TS. An automobile transforms infinities of infinities of objective forms—the power obtained from combustion to translational motion of pistons; the translation of pistons to the rotation of a crankshaft; the rotation of a crankshaft to that of a transmission; the rotation of an input shaft of a transmission to a planetary gear set of the transmission to that of a differential drive of axles, to the rotation of tires; the rack and pinion motion of a steering mechanism to that of a steering wheel and so on and the physics of light, heat, mechanics, etc. so defining these systems. Each of these systems or elements thereof is a bona fide computer if in turn coupled to an input/output device (TS) of CS control. An electron computes (or compiles) the transformation of the massive motion of a charged particle. The point here is that every black box of convention wherein input is transformed to output, if constructed universally under the forms of the Rg, becomes a CS, CDS or other component as described.

In sum, a large part of the reasoning behind the phenomenological structure of TS in such a vast array of classically physical structural and process media can be appreciated when it is considered that the communicative sense-motor of Rg, the TS, need not conform, for example, to the prior art of computational systems based largely on CRT—keyboard-digital embodiments, and thus can be configured in any such media as has been described, including building facilities, transportation vehicles, processes and so on. Human users in a building facility could thus interact with Rg through TS by speaking to the building. With such additional apparatus as conventional voice synthesis and recognition, the Rg transforms non-real form in motor action of such device. This communicative form should not come as any great shock since such phenomenologies do exist in mechanical and so on media in the housing and support of CRT and keypad anyway, though on much smaller a scale. Universally they are the same thing.

Processes themselves, moreover, are ready-made phenomenologies of a DS nature. In realization through D-XS-D, valves, pipes, tanks, electrons or computers and so on, transform as ZBreal by way of modal realization of ZB. Since fluid or molecular volumes typically are at play in such process, such tanks, mixing chambers and so on are themselves ready-made ES forms. Since such volumes change so does the knowledge contained within them such as hydrodynamic relations, formulae of molecular reaction and so on.

The key to enabling Rg, or aspects thereof, in the present media is consistent with the general translation method, to examine the knowledge structure embodied in a portion of such mechanical, chemical, electronic and so on process for its ability to embody transformations relative to the intended purpose of the Rg. As demonstrated the process requires a piecewise translation of the media into Rg structure. Once in such a structure, the Rg is enabled at the realizational hand of the enabler. Of course, once an Rg is existing or realized, it can perform such realizations itself based on the specified structures of Rg.

TRANSLATIONS OF THE U. M. TO ELECTRONICS, COMPUTERS AND COMMUNICATIONS ENABLING MEDIA

As should be apparent by now, one consequence of the unified theory, and hence the U. G., is that knowledge is merged into a single unified system of symbolic representation. Also what should be clear by now is that the U. M. is a universal means of embodying knowledge in specified apparatus. As the last section on classically physical enabling media also should have shown, just because conventional knowledges are so partitioned into fields of knowledge that were considered to be natural this does not mean that they actually do embody any intrinsic universal natural characteristic. Rather it is shown that conventional representations, since they do abide to the U. G. in the first place, can be translated into any language forms. Any enabling media is simply a reference form of existential translation, and thus in the use of modes of existence (by the enabler) the real symbolic forms of convention are so translated to the real symbolic forms of the U. G. The specific fields of knowledge, or reference forms of translation that are referred to here are electronics, computers and communications media.

In general, the art of computational machinery included therein super computers, parallel processing systems, artificial intelligence, expert systems, information superhighways and so on, is a use of primarily the art of electronics and telecommunications for the purpose of embodying information, data and, in general, symbolic representations of knowledge in transformational or computational ways useful to one who interacts with such machinery, be it another machine or a human user.

The historical problem with such machinery calling for its antiquation is evidenced in the following observations. By definition, such machinery, whatever it does, it so does within the confines of the real apparatus of electronics and communications technology. All such computational machinery is therefore confined to embodiments in electronics media. Another drawback of the conventional art of computers and communications is that whatever forms are defined as information, data, intelligence, knowledge, knowing, reasoning, inferencing, sense, motor, autonomy, computing, communicating and so on are the forms that define what the electronic and communications technologies will do (by conventional definition). If reasoning or inferencing is defined as or within the methods of forward or backward chaining, semantic networks, etc., then that is what the media will do, despite the fact that such apparatus may not even have the real form perception in which to perceive a real world to reason or inference about. If intelligence is defined as something a human user may think about, or as the way in which the user transforms the objective forms of knowledge, say information or data (algorithm or program), then that is what the electronic media will do, and so will do artificially in the conventional art. In general, if the embodiment of knowledge and knowing is considered to be the embodiment of the manipulation of mathematical, linguistic, logical forms in the ways in which such knowledges are known to enabler or user, then that is what the electronic computational media will do. However, such forms do not embody the intrinsic forms of android or the existential definitions of the Rg, for many reasons elaborated on herein. The consequences of such limitations of the conventional art are severe and require many different translations to the U. G. in the structure of the Rg and Rg continuum.

Before considering further the art of computation, let us establish an existential backdrop from which such machinery can be evaluated. In particular, let us consider the conventional art of communications, since regardless of how many different ways conventional computer and communications technologies are carved up, it is the embodiment of beings coexisting and communicating amongst each other and machinery that establishes the paradigmatical nature of the human condition desired to be replaced by technology in the conventional and present art.

Figure 103:
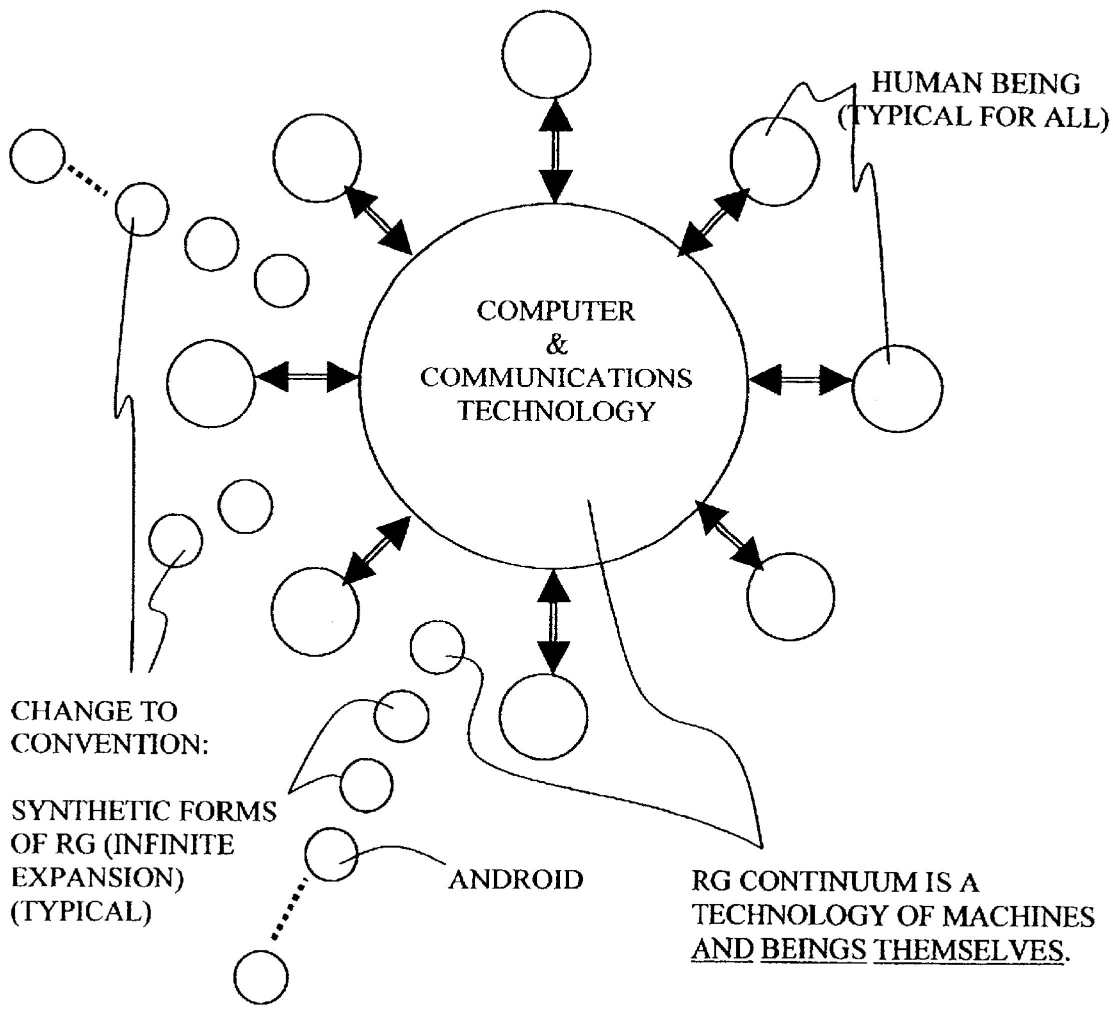
FIG. 103 shows a scenario of computers and communications systems in humankind.
Figure 104:
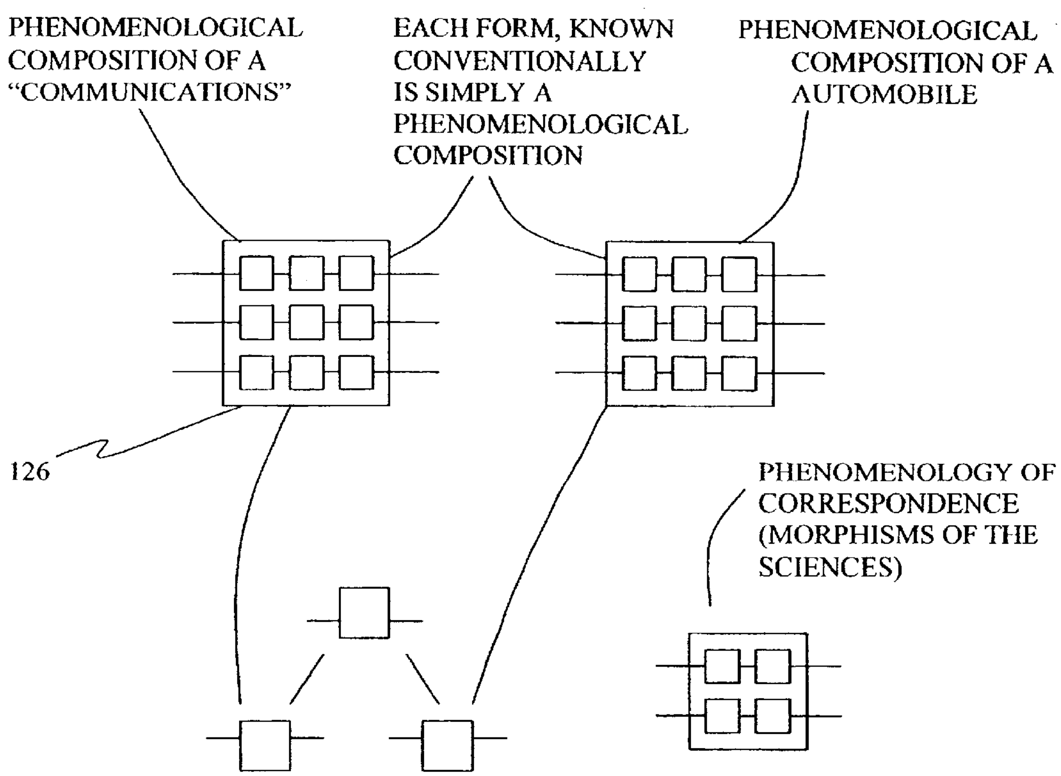
FIG. 104 shows the media of communications in relation to the existential forms of the U. M.

As shown in FIG. 103, the conventional art of computers and communications (126), like classical scientific thinking itself, is premised on the relative constancy of the existential universe of human being. The very notions of information systems, data structures and other objectifications of perceivable form in languages constrained for use (embodiment) in computational and communications machinery suggest this. As shown in FIG. 104, a conventional communications system does not account for what is at either end of a communication; it simply facilitates the transformation of the real form of a communication, as defined in the theory of the invention, within spatiotemporal bounds of conventional theory. A conventional communications system extends the sense-motor media of human communication in various media, of the real form of the communication. For a mental image, a communications system, in principle, is equivalent to a pea shot through a straw—the pea is a data structure, or information, and the straw is the communications apparatus. At either end of the straw too, conventional art is eclipsed from what occurs in the form that causes the pea to be shot, or what receives it. It should be appreciated that in this analogy, conventional machinery—omputers, atomic accelerators, robots and so on—itself is but part of the communications apparatus on existential grounds, since sooner or later the pea will land in the lap of a human being, or existential form. Human beings push the buttons and turn the levers of such machinery because there is no consciousness and other existential form associated with the machinery.

Figure 105:
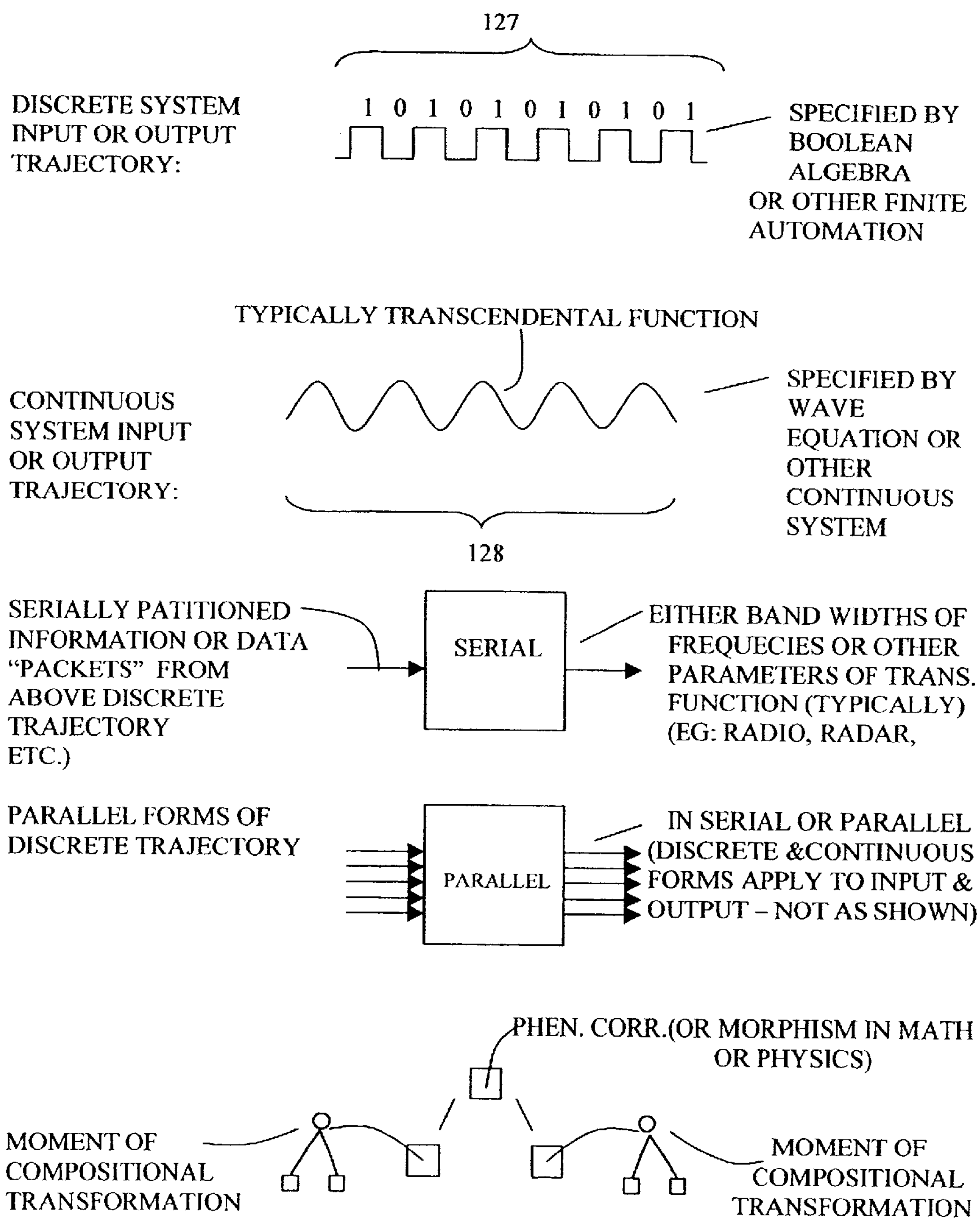
FIG. 105 is a comparison of information, or data structures of the communications media to epistemic moments of the universe (existence).

The misconceptions of the universe leading to the infnitely expanding embodiment of information referred to as an information superhighway and other communications technologies, as opposed to existences themselves, of the conventional art typically begin with the reliance on the concept of a data structure or coded information. As shown in FIG. 105, a data structure (127, 128) is an objective form. Since it is not an objective form of epistemic instance (e.g., a moment of the ultimately real universe), it cannot be used to define existential form (e.g., inertial existence). In such a case of convention, the structure must be known by an existence—it is a knowledge known by a being instead of one enabling a being. The communications art is premised on signals being transformed into signals—coded information transforming into coded information. This process, along with all others, is an example of phenomenological correspondence, or an epistemic instance. When a communications system transforms input to output, this is a solitary epistemic instance. In convention, however, the instance of the communications system is not proposed to be an instance of a being. Rather it is an instance of conveying moments of real form of communication (data structures). The conventional system thus requires beings on either end of it. While these principles have been discussed at length previously, FIG. 105 demonstrates the form of information or data in relation to epistemic moments.

Figure 106:
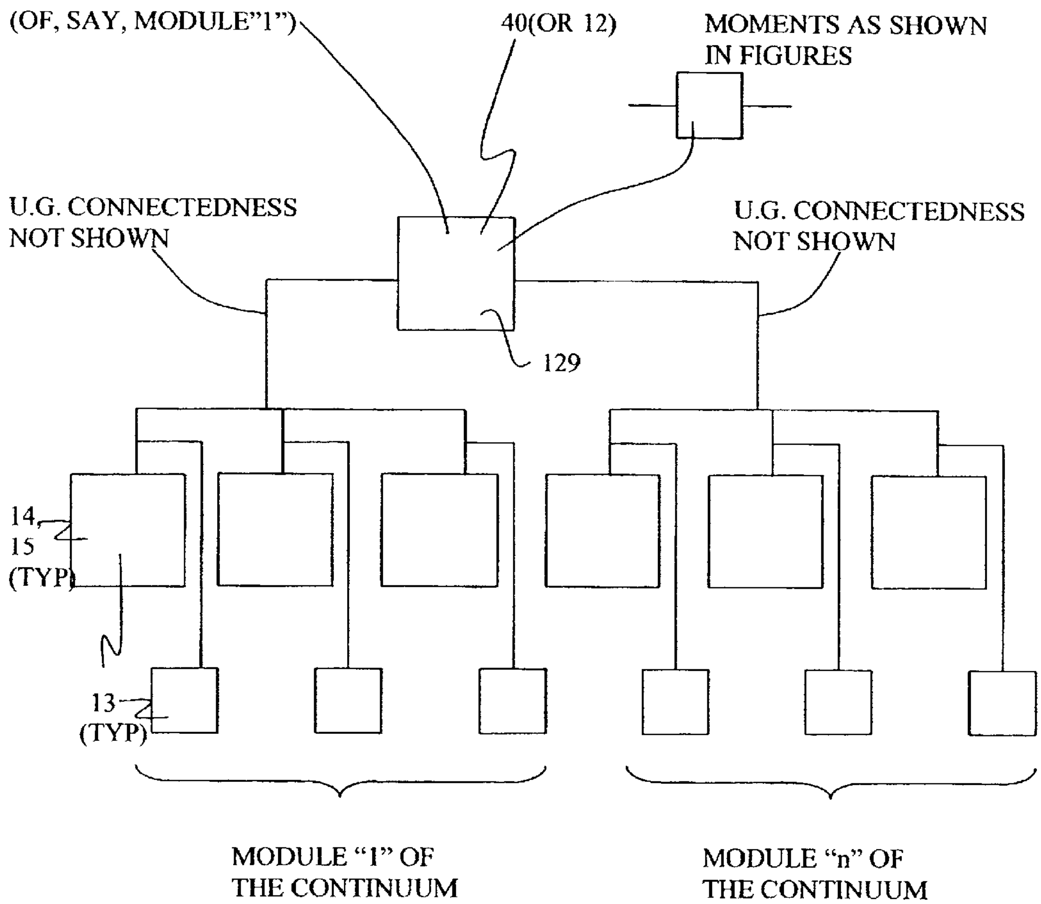
FIG. 106 shows TS use of conventional communications systems.

A communications system thus accomplishes phenomenological connectedness on the extant moments of real form of communication of enabled beings, constrained by the enabling media of the system (typically electronics or electromagnetic theory). As shown in FIGS. 87 and 106, the media of communications (129) are employed as enabling media of the Rg for the connectedness of TS structures of the T-level of the continuum but also are used in realizing moments of the continuum, as shown, among modules themselves and, if transduced, among terminal components as shown. The science of androids defines not only the connectedness on moments of the real form of communications among beings in terms of overcoming the spatiotemporal constraints of the human senses-motors, but defines synthetic forms of existence—moments of consciousness, real form, modes of existence, etc.—on either end of the communication.

Figure 108:
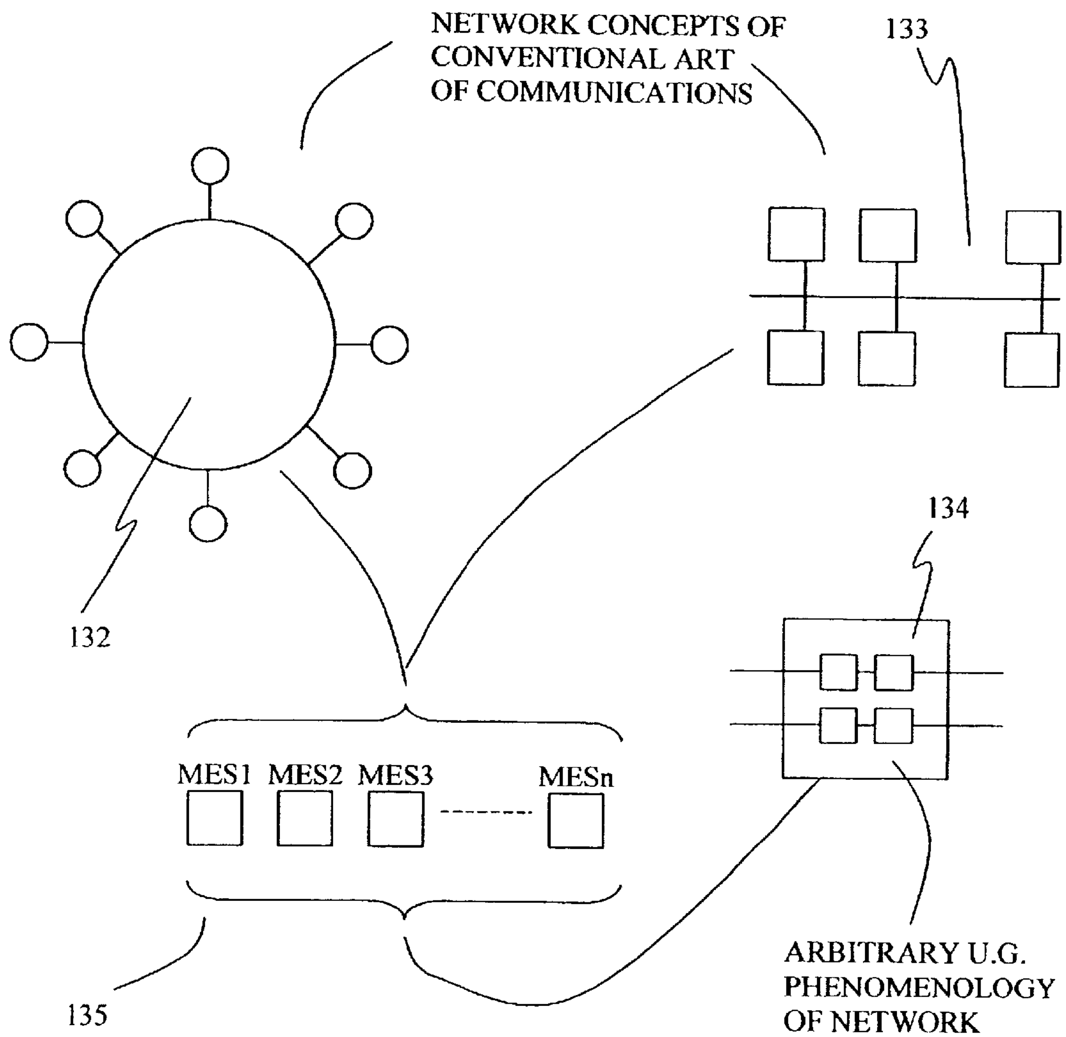
FIG. 108 shows conventional token passing and collision detection and avoidance network systems: protocols of conventional communications systems.

As shown in FIGS. 105, 107 and 108, the protocol of communications systems of convention (130, 132, 133, 134)—from information superhighways to local area networks, to extensions of telephones—simply are a means of prioritizing and structuring the conveyance of data structures in a communications medium. Virtual realities, engineering graphics and computation, business systems and so on each involve various structures on the information they embody. Virtual realities derive principally from algebraic structures of coordinated transformations (matrices, etc.), and their translations and embodiments to electronic media (in wave forms, digital logic, or analogue device). Computations of data typically are embodied (stored) and transformed (computed) in blocks of data or instructions referred to as data, information or even graphics frames of instructions or data. The transformations of these systems typically are not objectively compatible with those of the connectedness of a communications system. Thus, whether the coupling of communication is a bus of a microprocessor or a satellite system, a protocol must be developed for the transfer of information (use of connectedness). Additionally, great pluralities of such devices of computation may be coupled through the same communications medium. A protocol must be developed in service to these disparate needs. Regardless of how complex such protocols may appear in the languages of the conventional art, however, these systems simply embody the connectedness of extant moments of real form of communication (131).

Nevertheless, as shown in FIG. 108, these protocols, modified under the continuum structures of the Rg, accomplish the MES (and CRCS) structures of the continuum (135) in communications media. The structure of the Rg thus becomes the protocol of the system. Since the Rg is specified in U. G., however, the nature of the communications system is altered to accommodate the formulations of phenomenological and existential form.

In general, the distinction between a prior art communications system used in prior art configurations and one used as enabling media of the Rg with respect to connectedness of various moments of the Rg can be demonstrated in the following discussion.

As shown in FIG. 107, in conventional communications theory, a system A couples to a system B, wherein a signal, some data or information structure (127, 128), is said to travel from A to B through the method and apparatus of the communications system. System A transmits a signal, system B receives the signal (or vice versa) and the communications system conveys or communicates the signal. The transformation of the medium in which the signal travels—the communications system—is the essence of communication theory.

In theories of conventional communications, the signal shapes or forms in the medium typically are referred to as input and output. The communications system thus transforms the output of system A to the input of system B (or vice versa). The coupling between a resistor and a capacitor (or digital components and so on) and the coupling of a satellite communications system both qualify as communications by conventional theory, if viewed as a coupling.

Figure 109:
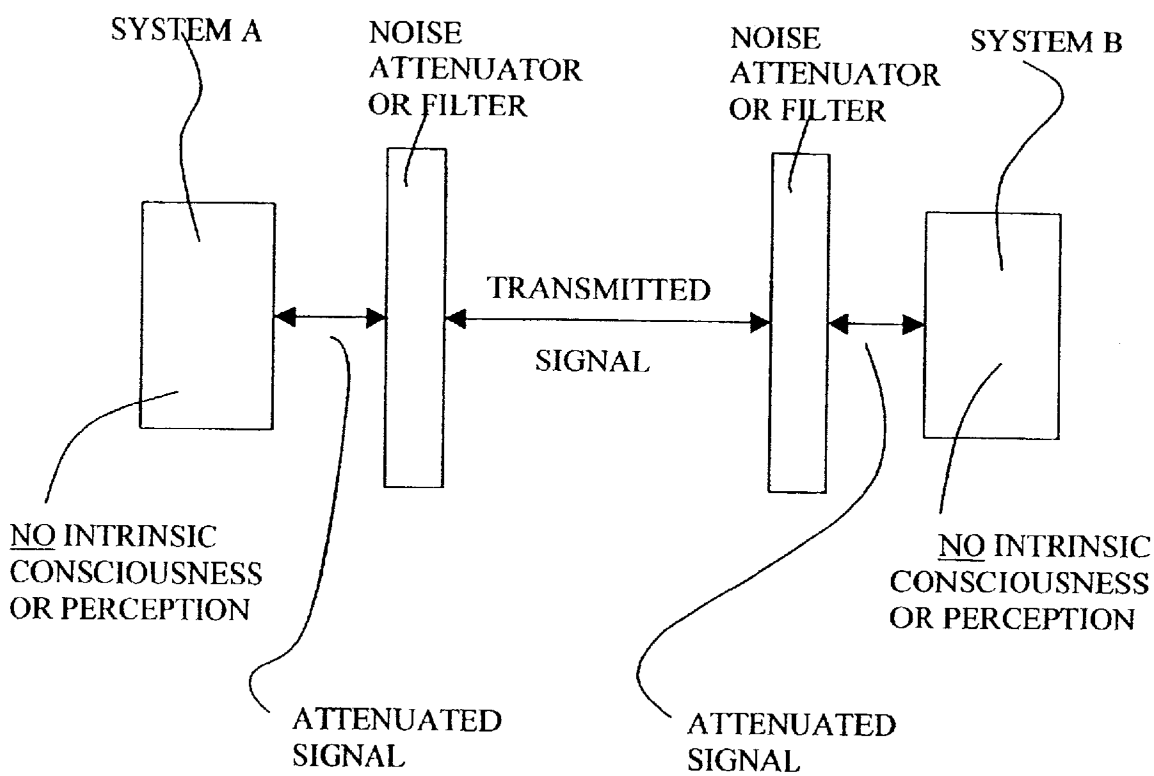
FIG. 109 shows noise attenuation or filters of conventional communications theory.

Further, the principles of communications theory, which demonstrate the essential difference between communications systems and constructions of existential forms, concern the notion of transmission noise. Referring to FIG. 109 in conventional communications theory, system A or system B may be influenced by unsolicited input, or signals referred to as noise, which are signals originating from systems other than system A, the intended system of the communication. In order to alleviate this problem, which stems from the weak foundation of the theory, the conventional art turns to filters or attenuators of noise. Filters are ancillary systems to the communications that receive the input for system A or system B and determine, among the signals received, which signals are the intended signals for either system (whichever is referred to). The decision as to what signals will be received by a given system then are determined in the conventional art by the designer of the communications system, in the placement of a filter or noise attenuator ahead of the input to system A or system B.

In order to demonstrate the weaknesses of this art, let us consider systems of communications that have been perfected, namely the communications of human beings, in the following example. Consider for a moment a human being in a crowded room attending a social event. It is well known, by way of introspection, that such a being, or attendee of such an event, will hear certain conversations taking place among a pool of conversations of a given band of decibels. Unless another range is attained in decibel level (an earthquake or belligerent conversation), the being will be receiving signals of a given range of decibels, among the plurality of conversations in the room. The question posed here is, is there a filter outside of the intrinsic nature of such a being, say ahead of one's sense, that decides for the being what signals to receive of the flood of conversations in the room? In this case communications theory applies to the structure of the being. Or is it the being, in and of an intrinsic causality (within system A or B and not in the inputting to system A or B) that so decides which conversations to listen to, in which case the present discussion can proceed?

This example leads us to the existential nature of a system as it is enabled.

Referring again to FIGS. 105 and 107, communications theory, premised on the existence of objective form or objects in the ultimate reality of the universe, requires the universe to be all objects, since its existential frame of reference is the thought-to-be fundamental inertial existence of the designer. It is not within the scope of communications theory to rely on a capacity to create beings who decide for themselves what communications to receive. Systems, thus, are objects of the observer's universe. In such a case, the objects, or systems of communications theory, are not observers or beings themselves who fundamentally communicate; rather, they are systems. The observer or human communication is considered to be analytically outside of the communications system. Since the conventional art excludes human form from its axiomatic foundation, it makes sense that filters would be attached to the ears (inputs) of conventional communications systems. The systems are not inertial forms on being. They are phenomenologies of form that, in turn, are operated by (human) beings. Communications theory thus addresses communications from the outside of a communication.

In human form and in the science of androids, the determination of a valid input is made intrinsically, in faculties of mind, resulting from the modes of existence in coordination of senses and motors, as described earlier. There are no filters placed in front of the eyes, ears, nose, hands and mouth to determine for a human being what to see, hear, smell, touch and taste (unless placed there by the being). This is accomplished in the intrinsic nature of the being as elaborated on in the science of androids as arbitrary forms of existence.

A conventional communications system thus attempts to recreate the universe in the manner observed among human communications but since communications theory does not penetrate the nature of existential forms it results in simply a phenomenology of form like all other conventional art. Typically in the conventional art, system A or system B, for example, are defined as finite automations or continuous dynamic systems (say digital machines or continuous electronic systems based on systems of differential equations). As shown in FIGS. 104 and 107, however, neither of these systems describes the universe elementally, but rather as objects of the observer's or designer's knowledge and perception.

This is not, however, a communication, since the word communication derives from the observed behavior of beings. In order to define a communication, one must describe system A and system B as beings, or forms of existence, or one must define the transformations of beings, coupled in connectedness, in the existential universe. A differential equation or a finite automation do not describe beings. Beings are not objects that are inputted to or outputted from. As described in the theory of the invention, beings are intrinsic forms of their own autonomous existence and not only extrinsic forms of an enabler's existence. The essence of a being analytically is that a theory of existence, say real and non-real form, transform in correspondence with each other under modes of existence. In the efforts of communications theory, it is observed that only the moment of connectedness among systems that do not abide by intrinsic forms of existence are achieved. In contrast. in the science of androids, system A and system B are defined as existential forms—onsciousnesses, perceptions and so on embodied, or enabled in real media. The systems of the Rg and androids thus are constructed as beings that themselves make the determinations that noise attenuators or filters (and generally the communications system) make.

A plainer way of viewing this significant distinction between the science of androids and the theory of communications can be seen in the simple observation that the science of androids constructs not only the computer work station that so communicates over an information superhighway, but the being that sits in front of the computer as well. As shown in FIGS. 1 through 10, the real/non-real configuration of communications between the user and the Rg in existential form describes not only the moment of connectedness, but the intrinsic transformations of beings (non-real form) as well.

Whereas data structures, however defined in the conventional art, travel from system A to system B, like a pea through a straw in the conventional art of communications, extant moments of the real form of communication among beings are coupled through connectedness to non-real transformations, or consciousnesses of beings, wherein such conscious forms derive from perceptions of the world around us and the communicated real form simply corresponds to real perceptions symbolically as shown in FIG. 107.

Nevertheless, the art of communications is used in the enabling media of the Rg and Rg continuum, as shown in the figures, for moments of connectedness. One way of looking at this media is to consider just the T-level of the continuum, disregarding all of the other principle forms of the invention. An infornation superhighway, as shown in FIG. 108, is simply a means of coupling, using filters and other concepts of communications theory, extant moments of real form. Based on what the input (FIGS. 105 and 107) is to a system (TS), that input will be transferred, coupled or connected to the intended recipient, or receiver of the communication. This type of conventional communications, however, does not employ the use of existential form, and thus does not even penetrate the form of the Rg and Rg continuum beyond the T-level of transformations among users of Rg modules in various local modules among the various components of the modules.

In order to translate the media of communications to a plurality of forms of the Rg, since anywhere there is specified a connectedness a communications system can be employed, the nature of the input and output of systems that are communicating must be understood existentially. As shown in FIG. 107, conventional theory requires the input or output of a system to be objective, or compositional. Conventional theory does not couple input of one system to output of another system as moments of the universe. In order to couple systems in the U. G., the input or output, like all other forms, must be understood in terms of phenomenological correspondence or, for example, as morphisms from the sciences. The communications system must be seen as a morphism on structures, which are transformations, rather than a transformation itself on objects.

Once these translations are made, it can be seen that the art of communications can be used to couple any moments of the Rg module and continuum. The CS can begin as a communications system (information highway, satellite system, etc.), modified as shown in the figures, wherein sense-motor capacities (of ZBreal) are held in correspondence with Rg components. The H determinations of CS on Rg components can occur in the communications system. A way of looking at this media enabling the Rg is to consider an information highway reconfigured in service to synthetic forms of existence of the Rg instead of computer work stations with human beings in front of them.

In all regarding communications systems, the whole notion of information is useless unless there are beings to translate this information. Wherein the conventional art constructs communications systems in service to a relatively fixed population of human beings, the present invention creates the beings who transform the information in correspondence with perceptions and actions of a real inertial universe. The present invention expands the numbers of beings available to know information and to perceive its reality as opposed to expanding only the embodiment of information, which is accomplished in pen and paper, an abacus, a computer and an information superhighway or in the apparatus of the Rg and Rg continuum as well.

The prior art problems in the approach to the recreation of the existences of beings as demonstrated in communications theory carry over to the art of computational machinery, or computers and artificial intelligence. Since this art still can be used as enabling media to the Rg and Rg continuum, however, these drawbacks must be interpreted in terms of the U. G. and the forms of the invention.

Phenomenologically, what occurs in the communication (transfer or conveyance) of the output of one system (A) to the input of another (B), occurs in any moment of any transformation of system components of any electronic or electromagnetic medium: finite automations of digital computations or moments of continuous systems of analogue computation. The fundamental existential flaw in these systems, as discussed throughout the theory and specification of the invention and in the previous discussion on communications theory, is that data, or information, is thought to be an object that is transformed by another object (the computer), as opposed to objective forms created in the instances of morphisms (phenomenological correspondence).

As shown in FIGS. 110, 111, 112 and 113, a typical microprocessor system of finite automation (137) executes an instruction, which is a transformation of data structures (127, 128 and 138). In the apparatus of digital circuits (logic gates in sequence and combination) a series of binary encoded logic gate inputs and outputs are transformed. As shown in FIGS. 112 and 113, the machine language thus represents transformations of these data structures. An instruction (139, 140) is said to be executed when the finite automation of the microprocessor (digital circuits) transforms in accordance with the representations of the machine language (140). It should be recalled, however, that in order to create digital logic circuits, a sub computer involving the physics of transistor circuitry had to exist to arrive at the zeros and ones of the switching logic of transistor physics. The language of physics—and mathematics—had to be shown to correspond to the real behavior of a transistor, and this language had to be translated to the Boolean algebra supporting the machine language. Neither process—the machine language to digital circuits (logic) or the language of physics and mathematics to the real transistors and other electronic components—resistors, diodes, etc. is any more or less a computer than the other. This is evidenced in a comparative review of digital and analogue computers. Phenomenological correspondence supports these processes, along with those of all other forms of the universe, as discussed earlier and as shown in FIG. 113.

Fundamental to the form of a computer, then, are the data structures and the instructions (transformations) that operate on (transform) the structures (127, 128, 138, 139, 140). Since the U. G. underlies all language forms, it underlies the limited forms of computational transformations as well as shown in FIG. 113. The art of digital computation, however, constrains the data structures to those finite automations of Boolean algebra, or zeros and ones (binary conditions) of objective form (127). Digital computation constrains the input to a transistor circuit to two possible conditions, of infinitely many, of the continuous time transistor system. Since the data structures are confined to binary objects, the transformations of them—the instructions—also are constrained to transformations of binary objects. If the input (data structure) of a digital logic circuit needs to be that of a real number, for example, the number must be truncated in a binary embodiment of an approximation of the number. In a continuous time system such as the real transistor circuit supporting the binary transformations, there is no such limitation in representation of many mathematical structures. Since analogue machines are constrained by mathematical structure, typically differential equations embodied in electronic component circuits, their translations to natural and other languages is impossible in convention. However, the U. G. universally translates these forms.

Just as the camshaft of earlier discussion constrains its embodiment to the knowledges expressing what a camshaft is, digital and analogue computers constrain language forms to those of Boolean and differential mathematics. Even more significant, however, are the actual H determinations or embodiments of transformations, in terms of morphisms, of the digital and analogue computer.

As shown in FIGS. 112 and 113, a typical cycle or transformation of a CPU is viewed as the execution of a phenomenological composition, as expressed in the architecture of the CPU in a moment of phenomenological correspondence with one other. The performance of the machine thus is described by an execution of a machine instruction, developed from notions of microprograms and so on. Since the prior art does not consider moments of the universe, and implies the constant observer, requiring objective compositions to exist relative to that observer, the notion of an algorithm or program (141, 142 and 143) is conceived—something an observer thought—embodied in the machine as a sequence of instructions executed over the CPU under action of instruction and program counters, as shown.

As shown in the figure, whether a digital circuit is considered or an instruction of a CPU is under study, the composition of form defining the transformational moments of the elemental forms determines the form of the device, which form is an algorithm in convention. This of course brings into focus the essence of a microprocessor, or a machine that executes instructions by way of a program. Since the device is not viewed as moments of transformation that are held in correspondence under morphisms with other such devices, the CPU is viewed as a permanent device that executes on the basis of stored programs. The logic of the CPU is constructed with instruction counters, program counters, accumulators, registers and so on (144) in order to engage the circuitry of, typically, the ALU in cooperation with accumulators and so on so that the CPU executes the program stored in memory. In the operation of the microprocessor (in the phenomenology of it) the stored programs in memory, as shown, by conversion (translation) to I/O with the CPU (and subsequent embodiment in accumulators, registers, etc.), are made to correspond with the real time action of the CPU. This action constrains the microprocessor to the execution of instructions, or moments, in serial compositions, precluding the form of the microprocessor from parallel computation (unless designed into the logic and algorithm, as is the case of the limited use of parallel configurations in, typically, parallel ALU).

The notion of a program—a stored algorithm of the enabler's knowing (not the machine's knowing) thus carries over to monolithic implementations of microprocessors and related technologies in main frame computers and in general the whole of the computational art. Since the art of computation is constrained by the data structures and instructions that can be realized in the forms of stored programs as shown in the figures, the high-level programming languages (141) that can be used in assembling compositions of knowledges of the enabler are likewise constrained by computer languages (FORTRAN, C, Cobol, LISP and so on).

A computer language (141) is a limitation placed on the knowable forms of any language such that they correspond to or can be made to correspond to the knowledge of the apparatus in which said language forms can be embodied (the computer or microprocessor apparatus). In digital computing a computer language is a limitation on natural, mathematical, logical and so on languages such that the knowable forms of the computer language can be embodied (translated and compiled) in machinery which is known in the language of Boolean algebra and the arithmetics of base two numbers, or even discrete systems theory or simply logic circuits of transistor electronics. Since not many real world experiences, characterized in the breadth of natural language, can be embodied in Boolean algebra—and this is why the mind strains in using computer languages—they are not natural, or do not encompass in knowable ways the breadth of human experience. The programmer or user of a computer must restrict their thinking to exactly those experiences of natural language accommodating the transformations of universe called instructions, algorithms and so on, and must so transform not the full breadth of objective forms of real experience but data structures and so on of computer (Boolean) logic.

But there are even more profound limitations to the art of computing, which we shall now discuss before addressing electronics as enabling media of the invention. And such limitations are revealed in the notion of the embodiment of algorithm, and the very definition of computing in regard to the whole existential experience of thinking. It thus has been contemplated by convention that within the realm of knowledge of computing, one may obtain a thinking machine in the sense of human corporal forms on being. We now demonstrate that this is impossible, and so probe the nature of computational machinery as enabling media.

First let us consider a fundamental premise of the art of computing. Artificial intelligence, according to the art, is the embodiment of thinking or thought processes in very defined forms of real apparatus. This field of knowledge claims to embody thinking in a computational machine—a digital computer (and of course in neural networks, biological processes and the like).

Let us look into the real machinery of computation of a digital computer (though neural networks and a whole litany of conventional machinery has the same outcome).

We now seek to determine two things, namely, what is thinking and also what is a computational machine.

Let us acknowledge up front that a digital computer is a realization not of the forms of natural language but of the forms of mathematics extended from Boolean algebra to the notion of programs or algorithms. A manufacturer of digital computers does not apply for a patent to secure its property rights for a computer by so defining it in natural language only. Rather, the computer is defined as hardware, software and generally computer architecture or a real thing abiding to the physics, primarily, of electronics. The language used to define a computer, at least the hardware or real form of one in which will theoretically be embodied the thinking of artificial intelligence, is a limited form of mathematics (Boolean algebra). Electrons, defined as charges, accumulate at poles of things called transistors in such a manner that a voltage and a current so transform in accordance not with transitive or intransitive verbs or compound nouns and so on, but on the basis of mathematical structure which represents the physics of electronic (digital) circuitry. Such circuitry, moreover, is translated into sequential and combinational logic circuits which in turn are defined in Boolean algebra. When such circuitry of Boolean algebra, moreover, is translated into, say, base two objective forms or numbers, the resulting objective forms or bit codes (compositions of objective high-low voltages) are said to transform by way of arithmetic on numbers in base two by way of flip flops, adders and so on. Thus, the phenomenological transformations in composition of logic or Boolean circuits are said to add, subtract, or otherwise perform conventional computations. Wherein such circuitry is employed not entirely in its transformational capacity but in its ability to embody highs and lows, it is said to embody meaning of computations relative to the observer or programmer.

So far, a computer can embody computations and arbitrary objective forms stored in memory and executed on the CPU as discussed. When the arbitrary objective forms are numbers the apparatus of the computational machine is said to embody the computations of mathematics, and in particular the mathematics of arithmetic (hence ALU). As to higher forms of mathematics and the transformation of non-computational structures, let us consider the nature of an instruction and compositions thereof, or algorithm.

As was discussed in the theory of the invention, language occurs as a consequence of epistemic instance and in the form of modal compositions thereof. Language being a non-real recreation of physical reality, real computational machinery thus occurs quantumly in modal composition of the forms discussed earlier.

In such quantumly ordered compositions, we may ask, what knowable forms of language or quantum compositional recreations of reality are possible in the technology of computers? Since any composition of language is a consequence of the existence of the observer, the question we ask is what modes of existence of enabler or user of the computer are possible in the embodiment of the computer?

An algorithm is a composition of language of the conventional view of form on being, with the particular definitional constraint that such language is meaningful to the developer of it. Whereas one simply would refer to an algorithm of the English language as a composition and of the language of mathematics as a proof or theorem and so on, when embodiable computational machinery is involved such a composition of language is referred to as an algorithm or program. Thus, when the forms of any language are so severely constrained in transformational and thus compositional capacity to be embodied in computational machinery such a symbolic representation or language is referred to as an algorithm.

Let us see how the language form of algorithm works. Whereas natural language grammatical forms of transformational elements encompass the breadth of human experience, the transformational elements of a computational machine are restricted to one such type of experience, namely an instruction. Whereas the English language obtains, for example, from transitive and intransitive verbs, compound nouns and so on, an algorithm of digital machinery obtains from a single type of transformation—an instruction. While the U. G. obtains also from a single transformation—pistemic instance—it should be acknowledged that epistemic instance applies to human experience and instruction applies to machine experience.

An instruction, then, is the basic transformational element of an algorithm. It is how the machinery of computation is said to transform fundamentally. An instruction is a symbolic representation of how data structures or information transforms. Even though all forms abide to language if they are known in faculty of mind, moreover, the physics of computational machinery does not apply to algorithm because the algorithm is especially defined for uses of language that can be embodied, by conventional means, in computational machinery and computational machinery is defined by the algebra of Boole and not the physics of the transistor supporting it. Even though algorithm is but an infinitesimal aspect of language or form on being representationally, it is viewed as a world of language unto itself as a consequence of such language being embodied in computational machinery.

A computational machine embodies the capacity to transform by way of an instruction, and an instruction is the means by which data structures or specially defined objective forms or nouns transform of computational definition.

Let us see what instructions are capable of being embodied in computational machines. Certainly the arithmetics, by way of translation from Boolean algebra in sequential and combinational circuitry to base two to other base numbers are embodiable, providing numerical analysis and scientific notation is applied to the truncation of real numbers (which makes them not real numbers). As a consequence of such translation, however, certain types of numbers fall through the cracks. Real numbers, for example, are not embodiable in digital machinery, as described, since such would require an infinite aggregate order of digital embodiments, or an analogue embodiment.

The embodied circuitry of a computational machine, however, does have the capacity, by compiling or translating the forms of certain subsets of numbers, in their arithmetic transformations, to transform in correspondence with mathematical structure as discrete automations. And it is in such translation that the notion of algorithm is demonstrated.

The physical circuitry of a computer, itself known by way of an algorithm but of mathematical order, (e.g., physics), when translated into Boolean circuitry or logic circuits affords the operation or instruction or transformation of objective forms called bit codes (bytes, etc.). A CPU of a computer device then embodies various findamental transformations (instructions) on such objective forms. (A 16-bit, 32-bit, 64-bit computer and so on.) Such an embodiment canfetch data or an instruction and can decode an instruction and execute it. This process itself is an algorithm or a composition of language, e.g., machine level language. The logic of the computer (CPU and associated hardware) thus is composed, by the computer maker, in such a manner that it embodies the execution of machine level instructions, which themselves carry out the instructions of a higher-level language—a computer language. In any of the translations, however, the machine is constrained to so many bit (16, 32 . . . etc.) objective forms.

The occurrence of the CPU in connection with other componentry is made to correspond to the occurrence of other representations by translation or compilation of computer language. The number 5.013 is made to correspond to the bit code of data of an instruction of the CPU, and the operation of arithmetic in adding such a number to one other resulting in a sum is made to correspond to the whole composition of Boolean form of the CPU in adding (although at the machine level it is not called adding, rather it is called sequential and combinational logic circuits). Thus, the apparatus of a computer, by the effort of the computer maker, embodies the capacities to translate one language (the user's) into the language of the machine. Since all form occurs in modal composition, such language of the user (and the machine) occurs in algorithms, and the translation from high-level language to machine language is what determines the embodying capacity of the machine's thinking.

A computational machine can embody any algorithm of language provided for by the computer maker. It can embody any construction of FORTRAN, Cobol, LISP, C and so on, since such language forms are translated into the embodied action of the logic circuits. Artificial intelligence languages also can be embodied in such machinery, wherein all sorts of very intelligent algorithms called even expert systems, which dazzle the mind in inferencing capacity and so on, are embodied in the digital logic of the computational machine. Further, if we allow such technology the benefit of the doubt and say that every intelligent thought of every human being is capable of being embodied in computational machines—a sort of super artificial intelligence, the question still remains why is such intelligence artificial? Or, would such apparatus be thinking?

This is the critical distinction made between the prior art of computational machines and the present invention as discussed earlier. The question that really must be asked is not is the machine thinking, since, of course it sort of is relative to the embodiment of the programmers thoughts or algorithmic expressions of language, but the question is who is doing the thinking? The compiler or translator of the machine (or enabler) translates an algorithm of high-level language—a composition of language of the enabler or programmer—to the language of the embodied machinery, or the machine language. Wherein does the machine think if the high-level language—artificially intelligent or otherwise—is crafted of the programmer's thinking? The computational device thus is an embodiment of the user's or programmer's thinking, and for eternity such a computational device will never think autonomously. The question as to the nature of thinking machines thus is determined not by definition of thinking, since all representations of language are embodiments of thinking, it is determined definitionally on the basis of what constitutes autonomous thinking, or existence. Thus it is not how computational machinery embodies the vast and endless array of thoughts of the user (though limited to meanings of computer languages) that is evaluated herein. Rather, it is how the machinery employs the pronoun I, of inertial form on being, in relation to its own existence.

At exactly the point where autonomous existence (and hence autonomous thinking) is possible, the conventional art compiles it into non-inertial existence. An abacus, a pen and paper and an artificially intelligent super computer are all the same from an existential standpoint. They are embodiments of the thinking of the creator of them. None of them thinks autonomously. In the act of compiling or translating or even embodying form, unless such form is inertially founded, one simply sets into correspondence with the embodying thing what one thinks.

Of the whole of computer languages, let us again give the benefit of the doubt to convention and claim that all symbolic forms of all languages (except the U. G.), including those of natural language and even of the inertial pronounal forms (I, you, it and so on), in vastly great compositions embracing all thoughts of all users could be embodied in the device of computational machinery (CPU, parallel processing, virtual memory management, field programmable gate arrays and so on). If in the process, such forms of language are compiled, translated or otherwise made to correspond to the languages of the machine, such resulting forms are nothing more than a pen and paper or an abacus. This is so because the machinery embodies not a correspondence between the use of such high-level (natural) language and the real autonomous experience or perception of the machine, but between that language and the language of the machine. What is more, the machinery of a computer does not even extend to machinery in general, it only controls other machinery, which has world experience (sense-motor). In order for a machine to think, it must exist, in the context of the knowledges of the humanities.

Let us look to the structure of the U. M. to find the value of computational and electronics and communications machinery.

Taking first the default mode of Rsv, ZA, ZB, and ZBreal are non-real and real forms of language, with ZBreal the real form of existence, and ZA and ZB offset non-real embodiments of objective forms of translation. In the TS-ES communication between user and Rg, the real forms of language (embodied symbols) are held in correspondence with the non-real embodiments of user and Rg (ES). This is also what a computer does, though not so generally. Though severely constrained by its enabling media and high-level languages (digital circuitry and the like) a computer maintains correspondences and compiles between the embodied representations of a TS-like device, say a CRT or terminal and an ES-like device or CPU or memory and associated apparatus. As the TS structures transform so too, by compilation or translation and operating system (modes of existence), do the ES structures. A computer thus takes represented non-real forms and maintains an embodied correspondence to them. Nowhere in this disclosure is it said that such TS-ES correspondence is thinking. The translation systems of the Rsv (or any other modality) thus can be viewed in the conventional art as compilers or translators, and the apparatus of a computer is so enabled simply in the porting or coupling of TRS action, needless to mention TS-ES correspondence. It should be pointed out, however, that as a consequence of the U. G. and the universal construction of the U. M., the TS-ES correspondences are not limited to the enabling media of computational machinery, since they account for all language forms. Whereas a computational device is limited to programming languages constrained by digital circuitry, the U. M. is open-ended in enabling media. What is compiled in the CS correspondence between TS and ES is any language form, providing such form abides to the embodied ES structure. In this respect, the TS-ES structure of the U. M. is more like analogue machinery, but again without the constraint on language as a result of the U. G.

A computational device is very different than the TS-ES embodiment of HI, however, when it is considered that the function of such apparatus of the U. M. is to so operate on ZA and ZB forms of modal compositions (U. G. forms). What is represented on the CRT, in an analogy to convention, is, for example $ZA_1$ correspondence to $ZA_n$, or $ZB_1$ to $ZB_n$) or ZA to ZB. What corresponds to those TS embodiments is their ES counterparts. All combinations of correspondences between ZA and ZB forms are represented in TS and embodied correspondingly in ES. Moreover, what also is so represented in TS and embodied in ES is CDS operation on ZA and ZB. A way of viewing this is to think of computer A (embodying TS-ES forms of ZA or ZB) being linked to computer B with similar such constructions by way of CDS, all in the same representational medium (CRT).

We have not mentioned, however, anything regarding the very capacity of Rsv in default, namely ZBreal. By analogy to convention, ZBreal is the real form so simulated in the apparatus of a computer. The apparatus of the Rsv in default thus ties together real forms and non-real forms in connection with the knowable forms of user, which are represented in U. G. or any other translation to U. G. (any other language). In the modal action of the Rsv, under influence of CS, the relationship between different compositions of language, namely arbitrary compositions (ZA) and reference compositions (ZB) are so transformed (CDS) such that a correspondence is determined between the two or a realizable form is brought into correspondence with an arbitrary form. Also, under such modal work of CS, the real form to which ZB corresponds, namely ZBreal, is held in correspondence with ZB, thereby linking real form to translations of mind.

Since the forms of ZA, ZB and ZBreal are neutral or meaningless until they are ascribed meaning by user (though they embody meaning in connection with each other), thinking, except to the extent of the action of CDS, does not uly occur until the default mode becomes existential, wherein the forms of ZA, ZB and ZBreal are the autonomous creations of inertial form (objective forms of the pronounal system). Thus in order for a machine to think it must be given eyes and ears to see and hear things about which it can so think and a mind (CS engagement of CDS) in which its consciousness is embodied. It must so embody a mind-body dualism or other theoretical form of inertial existence. It must use the pronoun I in relation to its own perception of reality (e.g., ZBsreal and ZBmreal).

Since this section is about the enabling media of electronics and communications and not Rg structure, let us then consider the enablement of the U. M. in such enabling forms.

First, let us consider that if one wished to realize computers themselves, such a task is accomplished in the U. M., in one translation, as shown in FIG. 110. DS structures are modal compositions of form, and so too are the discrete system, Boolean algebra, logic circuit, and otherwise architectures of forms such as instruction registers, control units, arithmetic logic units and compositions thereof, RAMS, ROMS and so on as shown in FIGS. 112, 113 and 114. Moreover, since all form is expressed in the U. G. in the knowable ways of the four C's of phenomenological form (and others), so too are CRT's, voice synthesizers and so on DS structures. Since all compositions are engaged quantumly by DSXS under RCS control, the modal realizations of RS thus are the computer (or a computer under the action of an operating system). Since such forms as DS are quantumly realized by DSXS in correspondence to ZB and ZA, the computer thus is embodied also in ES and TS, in wholly different embodying and communicative apparatus, as non-real embodiments and representations of such a computer under Rsv. The user of the computer thus interacts with DS structure and the maker of the computer thus interacts with TS structure of the Rsv. One obvious example of the advantage of the U. M. is that the computer can change form at a quantum moment of communication at TS. It can be comprised of boundless types of computers or operating systems, since the ALU, CPU, RAM, ROM, instruction counters and so on are simply collections of DS structures whose connectedness is determined by ZA and ZB representations and DSXS of RS. The user of the Rsv thus is the computer maker. Since the Rsv also abides to continuum structure, various makers of computers can share componentry. As shown in FIG. 115, a conventional CRT (145) can be translated as a TS structure of Rsv, or can be translated in the moments of DSXS (ZBreal) of a computer system realized in RS of Rsv. As shown in FIG. 116, however, it should be recalled that TS structure is phenomenological in nature with existential definition placed upon it as an apparatus of communication. Thus, acoustic (146), tactile (147) and so on media, as well as the visual media of CRT (145), serve as TS enabling media. Moreover, each of geometrical or algebraic coordinate transformations (148); vector graphics (149); wire frame transformations (150); solids modeling (151); grey scale/hidden line modeling (152); virtual reality systems (153) and pattern recognition and vision systems (154) simply result from the respective alterations to instructions and data of graphics frames (155) in CRT technology as TStranslations, as shown in FIG. 116.

As shown in FIG. 114, the DSXS can be enabled using the apparatus of computational machinery. If one considers the conventional art of virtual machines in the context of the U. G. forms (e.g., modal execution of algorithm in U. G.), the action of CTS on D-XS-D realization is achieved, more effectively under the U. G. formulation of memory mapping (156), wherein memory is CES (157) and the operating system of such mapping is RCS control and of CES in mapping the connectednesses of compositions of form (DS structures) as shown in FIG. 117 Since the structure of CES abides to the U. G., the stored algorithms in memory (programs) can be executed in the modal structures of the U. G. (under connectednesses of DSXS under a ZB structure realized as ZBreal and so on).

Any given program, then, is a ZA and ZB representation of TS and embodiment of ES, which is mapped to CES for execution over D-XS-D structure by RCS in action of DSXS. The reloading of caches, for example, of FIG. 117, is accomplished not on the basis of some mapping technique of anticipation or other, but on the basis of the U. G. phenomenological structure of the program (though the notion of a program is modified as discussed by the forms of the four C's).

As shown in FIG. 118, due to the algorithmic (compositional) approach of the computational art to the nature of form (as opposed to the epistemic moment or morphism of form), the prior art (enabling media) is not itself amenable to its own goals of massively parallel, fully pipelined systems execution, since a program (algorithm) is sequential in nature premised on the notion of composition. The U. G. structure of transformational forms (of TS, ES, and DS structures) thus is not fully appreciated, or even realizable, until translations are made between parallel processing (158) and U. G. forms (159). As shown in FIG. 119, fully-pipelined, massively parallel configurations of system structure (160) are possible under the n parallel connectedness of the U. G. form of DSXS (ZB) realization of the Rg.

One basic flaw in the conventional art of parallel processing is overcome in a modification to DS structure (161) requiring all DS's to embody form as shown in FIG. 120, wherein the embodied connectedness of CES (virtual memory mapping) is modally executed by transferring its forms of connectedness to a mandatory element of DS referred to as the DS Connectedness System (162), similarly to the operation of enabling signals to digital components and the operation of field programmable gate arrays of the conventional art. This configuration requires that the moments of CES-embodied connectedness be realized with the moments of extant or functional transformation of the DS (163). Additionally DS input (164) and output (165) systems facilitate the conventional enabling of DS structures. It should be recognized, however, that even though connectedness is embodied as shown in FIG. 120*b*, the DSXS connectedness still applies to DS transfomation as shown. This configuration simply realizes virtual machines in massively parallel, fully-pipelined configurations and can be extended to continuous time systems (166) as shown in FIG. 121.

The CDS in default mode is any conventional computational art wherein a composition of form (program, algorithm, etc.) is determined to correspond to another (compilers, translators and programs themselves). It should be considered, however, that alterations must be made on the art of computational machinery in order to fit the CDS structure. Any phenomenology of form that determines a correspondence among transformational objective forms in accordance with the forms of phenomenological correspondence and existential translation is a suitable structure for CDS. As discussed in the sections on CS and CDS, the CDS structures are boundless. They reflect ways of knowing in phenomenological composition, wherein the resulting composition determines a correspondence of transformational forms. Such transformational forms can be simple epistemic instances or lengthy compositions of form. A compiler or translator itself qualifies as a CDS, wherein the conventional forms are translated into CDS structure such that the end result is a correspondence between the compositions (algorithms) of high-level languages and those of machine level languages. Moreover, any computer program, if reconstructed in the form of CDS, wherein the input to such phenomenology is itself a transformational structure, and the output one other, resulting in the embodiment of the phenomenology as being the correspondence determination, is a suitable CDS structure. It should be borne in mind, however, that we refer here only to the enabling media of computational machines, which are severely limited in their embodying capability, and that other media discussed in other sections of this disclosure are just as, if not more enabling of the CDS and other structures of Rg and Rg continuum.

The CS, it should be recalled, engages the realized phenomenologies of the various Rg components causally. The causal embodiment of the CS is what achieves embodiments in the local modular integration and the continuum integration of modular components of the Rg continuum. Since the CS is a realization system employed in the fashion of MRS, its enablement in computational art simply involves the stringing together of CS (RS) structures in the configurations so described in couplings of computational media One CS affects another at the causative side or embodiment of the MRS structure, the result of which causes the particular realized form of CS to so couple the componentry of Rg as required. Thus, the DS structures of CS are the components of the Rg in phenomenological transformation, as shown in earlier figures. The translations of computational and communications media are summarized in FIG. 122.

As should be clear from earlier discussion, however, no matter how it is viewed, the art of digital computation as enabling media of the Rg and Rg continuum is constrained to the embodiment of a Boolean algebra superimposed (translated) from the action of transistor electronics. The embodied forms of ES, the realized forms of RS, and thus the represented forms of TS, the functional capacity of the Rg, are limited to discrete system embodiments by computational media. When the whole of electronics media is taken into account, however, the capacities of the U. M. are greatly enhanced.

FIG. 121 shows a simple piggybacking of continuous system electronic devices (167) wherein any given component of a collection of such components is coupled to any other, flexibly, in either the phase shift of transformation of the componentry or the discrete enablement of the componentry. Since it is the represented transformation that constitutes the real embodiment of the device, it is the defined objective forms that are in transformation. How such devices are coupled thus is a concern to the observer outside of such action.

In the example shown, the phenomenology of the connectedness is beyond the knowing or extant existence of the device. Providing the represented phenomenology of form occurs, in reality the coupling is irrelevant. A hardwired electronic circuit, for example, is coupled in the declaration by enabler that the input-output forms (objective forms) of the device are coexistent as shown (e.g., negligible losses). The phenomenology embodied in the real device is represented as shown. In convention such a circuit form is hardwired or not changeable in connectivity; that is, the phenomenology is forever constrained in such configuration. In its occurrence with time, the quantum transformations of the phenomenology occur as shown. The conventional hardwired porting thus defines that the existential couplings provide for the occurrence of the quantum transformations as shown. It then is the phenomenology shown that constitutes the real form so realized. The coupling is said to exist unchangeablyfor all time.

Bearing in mind that it is the resulting phenomenology or the circuit behavior that is the end result embodied in real form, we can distinguish between two phenomenologies of form, or we can shift the times of two distinct systems. Just because system A, the finctional system (e.g., the original phenomenology of real form) begins in time relative to the observer at that system at T=O, does not mean that one other system cannot begin at T−x time relative to that same observer. Thus, if different observers are considered, in relation to each other, one system (A), the functional system, can be said to occur in time relative to another (B) in the offset or phase shift of time of x. System A and system B, however, are each real phenomenologies, quantumly occurring relative to the transformations of time, which in each case is offset from each other by x.

While this methodology can be applied to any enabling media of convention, when electronics media is considered, a significant advantage over conventional machinery is obtained. Specifically, the A-B piggybacking allows for the phenomenologies of system A, or DS structure, to be flexibly coupled for ready use in the RS structure of Rg. The same resistor, capacitor, inductor, transistor, diode, transformer and so on can be used in the configurations of combinatorial mathematics on the collection of components.

Of course, as the new U. M. configuration requires a piggybacked arrangement of phenomenologies, such resistors, capacitors and so on are no longer only the components that they once were. The analogy of this technique to enabling signals of digital logic is apparent. Such configuration on continuous time systems, however, has been eclipsed from view because the transformations of electronic circuits were never, before the present invention, characterized in the U. G. universally, wherein the transformational nature of the representations of the circuitry is preserved under the new knowledge of U. G. structure.

In regard to this apparatus it can be seen that any continuous time system can, under such reconfiguration, be employed in any of the realizational (D-XS-D) forms of the Rg (MRS). Instead of looking at the componentry of electronic devices as hardwired or dedicated to particular embodied forms, (televisions, radios, computers, and the whole litany of electronic devices) such componentry can be modally shared in the apparatus of Rg. Thus, one obtains a television, radio and so on as a modal occurrence (realization) of RS (ZBreal) in correspondence with ZA and ZB of HL. Printed circuit boards, for example, carry in them the piggybacked componentry. Any other componentry of any other PCB thus carries with it two sets of signals (I/O), one, the leading signal, coupling the lagging signal or the functional component. In this manner, theoretically, and depending on use by users, in a serial arrangement of circuitry, only one resistor, one capacitor and so on are required for infinitely many televisions, radios and so on, as the objective form of the television and so on is a mode of terminal forms and not a terminal form itself. Wherein parallel configurations are required, obviously more terminal forms or components are required, since they quantumly occur at the same time.

In all, conventional electronics systems follow from the translations of classically physical media. By viewing electronics media in translation to the U. G., the forms of conventional media (satellite systems, televisions, computer work stations, information superhighways, etc.) are put to use not only as the method and apparatus of embodying and communicating information and other systems, but in creating the beings who know such information and perceive such reality. This is summarized in FIGS. 123*a* and 123*b*.

Generally with regard to electronics, computers and communications media, the various forms of institutions are translated as shown in FIGS. 124*a* and 124*b*. As shown, a utility company (169); an arbitrary business organization (170); a biological research company (171); a physics laboratory (172); an economic institute (173) and a medical facility (174), among countless other institutions, are realized in the Rg and Rg continuum under primarily electronic, computer and communications media. This of course does not constrain the Rg or Rg continuum to such media or institutions. Furthermore, in the existential mode of the Rg, the beings using the modeling and implementation process of the default mode interact with the synthetic forms of inertial existence as specified earlier, wherein the forms are enabled in electronic, computer and communications media.

TRANSLATION OF THE U. M. TO CLASSICALLY BIOLOGICAL AND QUANTUM PHYSICAL MEDIA

As discussed in the theory of the invention, a living form, interpreted under the premises of the theory, is objectively unknowable in perpetuity. A biological form of conventional objective definition is not a living form. Rather, what we intuitively associate with biological forms—the living soul—is eternally alive, and is what we typically think we are coming to know analytically—but are not—in the study of biology, genetics and medicine. In the analytical knowledges of biologically living forms, we come to know the structure of DNA, the physiology of the body, the behaviors of cells and so on, but we do not come to know, or possess, an objective knowledge of what makes a DNA molecule, a body, or a cell be what it is or behave the way it does, for once we know this, we know an objective knowledge which is not alive eternally, or is in fact within our objective knowing and not beyond it. These general observations regarding the biologically-living forms of the universe are important to the specification of the invention because biological forms, as knowledges, can serve as enabling media of the U. M. and can be fuher studied in or through the apparatus of the U. M.

As shown in FIG. 125, a biological form, or rather, a knowledge associated with what form, eternally lives in the ultimate reality of human being, is an already-enabled android from the standpoint of the science of androids, and is a model form, or paradigm, for the science of androids from the point of view of human being. The science of androids decomposes arbitrary knowledges to their ultimately real form in order to be enabled by a human enabler. What is associated with a biological form—its ultimately real form—is already enabled and is beyond the knowing—eternally—of a human being. This means that the knowledge we have of eternally living forms can be employed in the structure of the U. M. An institution, the subject of the following section of the specification, is a conventional use of the knowledge we have of corporal form on human being. The eternally living souls of a president, an engineer, a line manager, a maintenance worker, and so on are employed under the structure of an institution for the respective knowledges and behaviors they exhibit corporally. A biological cell is no different; it embodies corporal capacities useful to the continuum, or U. M.

Biological forms, as shown in FIG. 126, thus can be used as already-enabled portions of Rg and Rg continuum structure. Just as a computer language is compiled into a computational machine language for embodiment in the real apparatus of a computer, biological forms can be translated into the forms of the U. M. Through the U. G., the resulting morphisms (phenomenological correspondences) between the knowledge anticipated to be embodied and the knowledge of the living biological form can be one-to-one (in which case what is embodied in the U. M. is precisely the biological knowledge known) or can be altered through the morphism, which is a concept used in conventional attempts to construct biological computers, wherein the biological knowledge is shown to correspond to the embodied computation. The difference here is that all forms are universally translated to the U. G. and thus can be used for arbitrary purposes.

With this in mind, any form of the U. M., in ways just like conventional institutional structures, can be translated to the biological forms of the conventional living universe through the U. G. as enabling media of the U. M. As shown in FIGS. 125 and 126, a single cell of biological definition is an embodiment of a complete Rsv module without communicative capacity, and wherein the non-real and real forms of the cell are constrained to what we know about the cells' corporal capacities to sense, react and ponder or think about (determine) its own being in the world around it. The cell embodies the HI-RS capacities of the Rg module without communicative capacity and must be constrained by CS to integrate into a useful purpose to the user. Note that the non-real form of the biological form is metaphysically beyond the knowing of human corporal form since it is part of the eternally living universe of human being. To the extent that we know a biological form, it can be used in the U. M. as shown.

An alternative use of biological form is shown in FIG. 127, wherein the form is used for its sense-motor capacity and synthetic non-real form piggy-backs the forn's own non-real form in the perceivable universe of human being under CS structure. The being perceives the physical universe, and acts in it, of its own accord, while the synthetic non-real form transforms in the desired language form of the user. The user communicates with the cell through the synthetic non-real and communicative real form about the cells' material and otherwise universe.

As shown in the figures, the use of a cell can be extended to arbitrary biological forms and under continuum structure can be a plurality of Ri modules (biological worlds) within the total (Rt) continuum of human being. As shown, the biological forms also can simply constitute ZBreals of the default mode, in which case, under modeling and implementation, conventional study of the biological universe results—the human genome project, genetic engineering, and so on—wherein ZA, ZB and ZBreal, under the structure of Rg, are arbitrary, reference and real forms of the biologically living universe. The study of medicine applies in the same fashion as well, as shown. Since the synthetic forms (androids) of the Rg module abound in number, a use of the continuum in this capacity affords the study of psychiatry in such a manner that model beings (androids) are used as ZA structures themselves (the android is entirely a ZA, or arbitrary structure) and ZB and ZBreal apply to the human patient. Instead of compromising the health of a human patient through unproven hypothesis, the android is used. Alternative configurations place the android in the real world (inertial) experience of the real form of Rg (of human being) wherein the android is not ZA but ZBreal as well—the closest model of the patient that can be obtained. Since the U. G. translates all languages, the forms of androids in such a case are not conventional hard machinery (computers, etc.) but DNA, cellular forms, corporal beings themselves. Brain chemistry, for example, is studied in the android on biological forms morphic to the human brain. Since arbitrary knowledges are universally expressed in the U. G., the total human knowledge of biology, can exist in the Rg continuum structure. The study of medicine and biology is thus spread across either the default or existential modes of the Rg continuum. How an Ameba procreates, along with all other biological and medical knowledges (apart from that embodied in corporal form of human being) is embodied in the Rg continuum next to other human knowledge. Since the continuum is infinite in scope, it is a synthetic embodiment of the capacities of human corporal form, wherein biology and medicine play only a part.

On the molecular dimension of our knowledges, the analytical, scientific substance of human existence—the physics of the elements—can be used as enabling media (or the object of study within) to the Rg continuum. Consistent with recent developments in the application of theories of morphisms to the elements (topology, group theory, etc.), an atom, molecule, substance, etc. is translated to U. G. form for use in the continuum. As shown in FIG. 128, a chemical reaction, more fundamentally, is a transformation of epistemic (U. G.) form. As shown in earlier figures, a knowledge of the elements is still a knowledge and therefore translates to the U. G. The manners in which the elements recombine or even exist in general is universally expressed in U. G. These transformations can provide for ES embodiment of Rg or can be used throughout the continuum as discussed in regard to the use of biological forms and the study thereof in the default and existential modes. The Rg module and portions of the continuum become the particulate nature of the universe.

As discussed in the theory of the invention, since materials, substances, solutions, mixtures, and so on are more fundamentally epistemic compositional transformations, the materials of the physical universe are universally translated to U. M. enabling media or studies thereof. From this point of view, the section of the specification on classically physical media can be derived from the knowledges of the elements even in classical study, and translated to U. G. universal structure. The physical world (the knowledge of it) can be embodied in a single module of the continuum or modally integrated across it. Whether an atom as an object, a wave, a valence shell, an ionic or covalent band, a substance, a mixture, and so on transforms or a teacup is perceived, it is universally expressed in the U. G. and serves as enabling media to the U. M. (or the object of study of a module or mode of the continuum).

Small particles, atoms, substances, and so on obviously play an ideal role in ES embodiment because of their spatiotemporal extent. These forms by definition are the miniscule elements of human sense and perception and thus, in human perception, are ideal embodying capacities and can provide equal utility in embodiments throughout the module and continuum.

TRANSLATION OF THE U. M. TO CLASSICALLY INSTITUTIONAL ENABLING MEDIA

As discussed throughout the specification, institutions are existential processes and structures that can be defined, alternatively to conventional viewpoints, by the U. G., and therefore can either serve as enabling media for the U. M. or be replaced by the U. M. Since the default and existential modes of the Rg and Rg continuum, with particular regard to their uses of the modeling and implementation process, are specified earlier, we now consider U. M. phenomenological and existential form enabled by the medium of institutions.

As shown in FIG. 129, an institution, which constitutes almost any binding structure on a plurality of existential forms, can translate to the Rg continuum itself, to a portion of the Rg continuum, to an Rg module, to a portion of an Rg module—in terms of modalities of them—and can translate to a realized ZBreal of an arbitrary Rsv module. If the institution is defined similarly to an Rp module it can serve also as enabling media to the Rp module. Generally speaking, just as is the case with many biological forms, a conventional institution is an already-enabled aspect of the U. M., as defined above.

We note, however, that the definitions of the forms of the U. M. alter our conventional views of institutions by the mere presence of a user or enabler, since the Rg's structure serves a user. In the U. M., a user typically realizes institutions themselves and thus us is not an existential part of an institution. Rather, as discussed in the theory of the invention, the user is the human spirit and interacts corporally at the TS. This is a mandatory design constraint because an institution of inertial beings cannot enable an institution of inertial beings (metaphysically), since the institutional structure exists in the inertial universe of the beings.

The key principle behind enabling the U. M. using conventional institutions is retrofitting their forms to fit the defined structure of the U. M. As an example we can start with the institutional form of a commercial enterprise, or corporation. As shown in FIG. 130, a corporation serves the goals of a business strategy. The purpose of its existence superimposes onto the generic structure of modeling and implementation of the default mode of Rsv, wherein ZA, the arbitrary structure, are arbitrary goals, ZB are reference forms of the real corporation and ZBreal is the real corporation (technology and people). The corporation can be modified by Rp and integrated into a continuum of such corporations by Ri. This structure, of course, constitutes a phenomenological constraint on the corporation wherein ZA, ZB and ZBreal are held in correspondence by the defined modalities of the default mode. ZA, ZB and ZBreal are phenomenologically defined by the user and are known and perceived by the user only. This is the equivalent of chief officer of the conventional institution, the user, comprehending the form of the corporation in one's own existential capacities. The corporation is a phenomenological form of the user only, regardless of whether or not its form is translated to natural language. The CEO, or user, makes decisions that define its form and integrate the corporation into a continuum of other institutions. This is why the corporation can be developed under a business strategy—it is viewed as a phenomenological form only, or a technology.

The existential mode is different. As discussed earlier, the existential mode integrates beings, or existential forms, based on common inertial experience, which then can be viewed as common business experience. First, however, the forms of the existential mode are pronounal, and are world experiences of beings. What is integrated in the continuum, or institution of inertial beings, is inertial experience. As shown in the figures, the existential mode must be integrated on the basis of communication within the form of the Rg and Rg continuum. The CS's of Rg modules maintain existential couplings on inertial forms on Being, or inertial existences, and are equivalent to the TS couplings with the user. Any aspect of the Rg is therefore viewed as an inertial existence itself, or a whole Rg module (e.g., an android). When integrating the forms of the existential mode, we are repeating the Rg relationship with the user within the Rg module itself. The Rp and Ri structures on Rsv therefore are structures on beings themselves.

Since the U. G. universally translates human knowledge and experience into synthetic embodiments of it, the actual conventional embodiments of institutions—human beings engaged in institutional activities—can be viewed as already-enabled modules and continuum forms of modules. The TS-generated goals of the institution therefore are changed from simply being an institution, as is the case of a conventional institution, to being in transition to synthetic form. Under the structure and principals of the U. M., the conventional institution undergoes synthetic replacement by androidal forms.

As shown in FIG. 129, the living forms of the module alternatively can be structured as participants of the module, wherein the module eventually takes on the mirror image of the institution in its synthetic form. In this case, there is a clear demarcation between the living and non-living synthetic forms of human being, wherein the continuum is entirely synthetic.

It should be noted further that since the androidal forms of the invention exceed the existential capacities of the corporal forms of human beings by design (intellect and sense) the institutional forms—the continuum forms—of the Rg do not stop at commercial enterprises or corporations and proceed to arbitrary institutions of beings, which institutional structures then exceed the capacities of human institutional structures, or humankind—by design. The notion of an institution therefore must be reckoned with by a user (enabler) at TS, rather than within the institution as a participant. Instead of being a world leader, the enabler must be a leader of worlds. Hence the form or non-form of the human spirit dominates the continuum, and the semantic meanings, obtained from conscience, or eternal will, of human being, that are conveyed throughout the continuum are those that are superior, eternally, to the synthetic forms of the continuum.

A conclusion of logical order can be drawn with regard to the retrofitted enabling media of the continuum by considering that if it is humankind, or more precisely, the human condition, that is sought to be improved and it is the will of volition that characterizes humankind, to improve humankind means to improve (upon) the will of volition. The conscience, as an objective measure of eternal will, is what contains this expansion of the will of volition within controllable bounds. A user, therefore, must be only an embodiment of human spirit or must create language in its action, which reflects eternal will.

The institutions of humankind, therefore, are transitional enabling media to the continuum as human participants are removed from engagement within the continuum to enablers and users of the continuum (users at TS). As enablers retrofit and improve upon these institutions as enabling forms to the continuum, the superior capacities of androidal forms, in collective effort as institutions themselves, become the synthetically-expanded human universe, wherein a humankind becomes one of perhaps infinitely many worlds enabled by the enabler. The synthetic expansion of the human universe becomes a TS-motivated Rg module and Rg continuum expansion of synthetic forms of existence, which themselves develop technologies and serve the human condition, or more defnitively, the human spirit. Old world concepts of institutions are thus replaced by enablers of institutions that are improved by the incomparable capacities of androids, each of which may exceed the collective intellect and sense of a conventional humankind by design. The human condition is then served by great pluralities of superior humankinds to our conventional views of ourselves as existentially ill-equipped corporal forms as participants in traditional existential activities. In all, the continuum expands indefinitely to serve the human spirit.

THE CONSTRUCTION OF ANDROIDS

With respect to earlier specification of the Rg and the theory of the invention, the forms of androids have already been defined and enabled. This section, pulls together the disclosure of the specification under that of an android proper. The Rg and Rg continuum, in the existential mode, are special forms of androids, namely those that subordinate all the modes of existence of the android to the communicative modes of Ri, Rp and Rsv structure. Wherein the U. M. is intended to serve a user, as described earlier, in subordination to communicative modes of existence, an android serves humanity by simply existing in autonomous form, by extending the existential universe of human being autonomously.

The existential mode of the Rg and Rg continuum has been described in earlier discussion as the subordination of existential forms such that inertial existences result—in the configuration of institutions across a continuum of such existences—that are directed intellectually, and in terms of inertial experience, toward the productive ends of a user. For this reason the Rg module embodies the real form of communications in the HI, and the modes of existence of motivation and learning are severely constrained by the communicative modes in the Rg. As shown in FIG. 131, this phenomenology does not apply to the construction of androids (215), though beyond these two exceptions, the android is identical in form to that of the Rg (Rsv) module.

The reason that the Rg module and Rg continuum are presented first in this specification is that first, the modules of existential form provide for the phenomenological and existential forms of the android and second, perhaps more importantly, the Rg and Rg continuum are designed in either default or existential mode to model and realize quantum moments of the ultimately real universe in the form of inertial existence—which is what an android does. An android, while the theories of existence defining its modal forms may be much more sophisticated in design than conventional technologies, is simply a realized modal composition of form as quantum moments of the universe in accordance with an arbitrary theory of existence. As discussed throughout the specification, the Rg (Rsv) models and realizes these moments. The U. M., in addition to serving as a device to realize the conventional art in a more ultimately real manner, and thus in a more technologically sophisticated way, is a machine that is used to model and realize androids. An android is an Rg (Rsv) module, reconfigured as shown in FIG. 145, which itself is modeled and realized in the Rg module and continuum. The android thus applies the faculties of mind in accordance with transformations of conscience as discussed in the theory of the invention. An android thus is an Rg (Rsv) module whose modes of existence are not constrained by modeling and implementation or the conversational modes of the existential Rg. Thus, as described earlier, the present invention embraces two principle forms: one, that of the U. M. itself (Rg and Rg continuum) and two, that which can be realized by the U. M.—present and future art of technology, and the android of the theory of the invention.

The construction of androids begins by constraining the CS action of the Rg (Rsv) module (modified to be unconstrained by ZA, ZB and ZBreal) to the forms of conscience (216) as shown in FIGS. 132 and 133, under the modes of existence of motivation and learning (217). What this configuration achieves is the subordination of the correspondences of real and non-real form (or modes of behavior, etc., of other theories of existence) to the conscience, or the construction of a moral being. As shown in FIG. 134, the forms of conscience, since they simply are paradigmatical phenomenological correspondences by which intellect itself transforms, or the being learns, can be any knowledges whatever, as demonstrated by world religions, philosophical ideals, social and psychological norms (218); and analytical paradigms such as quantitative or mathematical forms (219).

The modal strategy of CS thus is developed based on the transformation of inertial or pronounal form. Accordingly, the extant moments of consciousness and of the reality corresponding thereto, as shown in FIG. 135, are the inertial forms of any language, as discussed in the theory of the invention. The enabled moments of streams of consciousness and the faculties of mind, as shown in FIG. 136, are those defined in the theory primarily under phenomenological correspondence, in the context of the U. G. Of course, to the extent that senses are enabled to perceive more of human corporal experience, and to the extent that the androidal conscience is deficient, the being will learn by intellect since the world around the being embodies a greater wisdom than the deficient conscience.

The fundamental modes of existence of the android beyond motivation and learning—voluntary and involuntary modes of existence—which are subordinated to the communicative modes in the Rg, determine the android's general existential capacities. These modes follow from arbitrary theories of existence and psychological, sociological and so on premises, in addition to basic design criteria regarding the capacities of the android. Conventional technologies, since they are determined in the existence of the enabler only, can be viewed as all instincts, wherein the apparatus does not embody non-real form, or an inertial consciousness, and thus does not require the science of androids. Conventional technologies thus are considered potential androidal motors. The voluntary modes of existence, however, do require the theory and apparatus of androids.

The voluntary modes are established for the purpose of the being's existence and would be the same in all androids if enabling media of human corporal form could be developed. Since human corporal form does not know its enablement, however, the limitations of what human corporal form can know and perceive place androids into functional capacities, or enablements in specific realms of perceptions, motors and therefore consciousnesses. By analogy to convention, control theory of dynamic systems establishes, based on controlled (sense and motor) variables, the capacities of the system controlled. An android, of course, is established based on the transformations of inertial (pronounal) form and thus a better way of viewing voluntary modes is to consider the meanings of all languages as theoretically possible in android, limited only by how sense and motor (perceptions) can provide an inertial experience of the reality of the language forms.

The faculties of mind of android follow directly from those of the existential mode of the Rg. It should be pointed out, however, that in android the motor skills of communicative real forms are not embodied in an HI configuration, since the communications of the android are not constraining to the modes of existence. Rather, motivation and learning, and the voluntary modes of existence, engage the communicative modes. The real form of the corporal body of the android thus embodies also the real form of communication, as it does in human corporal form. The communicative modes of existence of the android thus are engaged under the voluntary modes and the faculties of mind serve as conscious forms for communicative motor skills, general motor skills and all other cognitive processes (thinking).

What the android can perceive obviously determines the consciousness of the android in the mind-body dualist theory of existence (in other theories, states, behaviors and so on determine other states or behaviors, as discussed in the theory). Since all forms of android are characterized in the U. G., the sense-motor relationship, as described in the theory, simply is a correspondence of realized phenomenological moments. While all forms of android are realized in DSXS moments of Rg proper, the relationship between sense and motor of android, as realizations of RS of an Rsv proper, are demonstrated in FIGS. 131 and 137, along with the general RS configuration of Rg in realization of an android. The moments of sense and motor are achieved as distinct realizations of RS. As discussed in the theory, the moments of perceptions are a consequence of the split form of inertial existence, requiring sense, motor and rest of the world in relation to the inertial form of language (pronounal system). A conventional motor technology, for example, is configured with the forms of android as shown. Regarding the sensemotor capacities of android in combinations (pluralities of sense-motors), FIG. 138 demonstrates the modes of existence used for the coordination of fields of sensory perception (220).

All of the essential enabling forms of android have been discussed throughout this specification, constraining theories of existence to the enabling media of the U. M. and android. As can be seen in the elaboration of any form of android, say a simple faculty of mind of mathematical reasoning, a communicative mode of voice, or an infrared wave length sensory apparatus, the enabling forms of the android are extensive. As discussed throughout the specification, the present invention incorporates these arts by the constraining structure of Rg, Rg continuum and the special case of android. As shown earlier in this specification, for example, all particular cases (enablements) of faculties of mind, senses-motors and modes of existence are extended from the general use of phenomenological correspondence, and more broadly the U. G., in the forms of the Rg and Rg continuum. All androidal constructions thus are enabled in this specification, even though the science of androids is ever developing.

Generally, as shown in FIG. 139, the modes of existence of motivation and learning (217); the voluntary (221) and involuntary (222) modes of existence (defined by general modes of existence—88); and the modes of sensory perception (220) apply to the forms discussed thus far onto the transformation of faculties of mind, streams of consciousness and moments of thought (87) with respect to moments of real form or (physical) reality (41, 42, 43) in accordance with the meanings of any language forms, as discussed throughout the theory and specification of the invention.

As shown in FIG. 139, these meanings are classified in the English language by Roget's classification scheme of words and phrases into eight classes that are incorporated here by reference as follows: Class one: Abstract Relations (221); class two: Space (222); class three: Physics (223); class four: Matter (224); class five: Sensation (225); class six: Intellect (226); class six, section III: Communications of Ideas (227); class seven: Volition (228); and class eight: Affections (229). In all, these word forms define the enabler's knowledge of the various structures of androids as defined throughout the specification. The android thus is a moral being that transforms under the defined structures by way of enablement in the apparatus of Rg and Rg continuum, as defined in the structure of android, under the meanings of these word forms, as translated to U. G. structure. Since the difference between the existential mode of Rg and android is established on the basis of the subordination of the modes of Rg to the communicative modes and the constraining of communications to ZA, ZB and ZBreal structure, the existential mode of the Rg thus is defined, with these modifications in mind, the same as android. FIG. 139 thus applies equally to the existential mode of the Rg. Moreover, since enabling media is defined also in such language forms, any enabling media defined in English using word forms and modal compositions thereof translate to U. G to enable android and existential and default modes of Rg as discussed throughout the theory and specification of the invention.

REMIFICATIONS OF THE INVENTION

When the forms of the U. M. are considered in totality (FIGS. 1 through 5), in connection with the science of androids, generally speaking, it can be seen that the U. M. is a replacement for conventional approaches to the resolution of the human condition. Whereas conventional approaches to the human condition require the direct participation of human corporal form in the apparatus of discovery (toward improving the human condition), the U. M. supports users or enablers who direct the activities of synthetically-created humankinds of effort, in the synthetic embodiment of human spirit, in connection with the realization of non-real form, or thoughts, as communicated by the users or enablers.

The Rg continuum thus affords the capacity to integrate independently developed worlds of existential activity (synthetically-created humankinds or worlds) as an ever-expanding continuum of existential form. Whereas in conventional approaches to the human condition, human corporal form is constrained by its participation in a finite existential world, namely that conventionally referred to as the world, the users and enablers of the continuum themselves create and develop such worlds in theoretically infinite plurality.

Humanity is not presently in a condition to support the embodiment of the present invention, which makes that which is specified herein an invention. The apparatus of the present invention thus must be constructed from the present condition of world. When it is considered that the post-modern era already has begun to contemplate the ultimate reality of vesting the stewardship of the human condition in the human spirit, decentralized from state into the embodiment of the individual; that industrialized nations have begun to see their own twilight in the exporting of industries to the third world; and that human knowledge and experience itself has grown to the point where structures of state, government, organization and so on (inertial institutions on groups of human corporal forms) can no longer manage with efficiency the research and practice of even present knowledges, the plateau of world civilizations forecasted in history and science fiction becomes evident in preparation for the boundless Rg continuum of existential form and the realization of the Human Spirit.

The Rg continuum thus is constructed with a new millennium of human experience in mind. Wherein old world approaches to the human condition have stalemated, the Rg continuum affords the realizations of worlds themselves in service to the human condition. The construction of technologies, performed in the post-modem world by human corporal form, is developed by the existential forms of the continuum and the forms of androids, in service to the human user, as demonstrated earlier.

The intellectual and perceptive capacities, and therefore ramifications of the U. M. are profound in comparison to old world orders. Jurisprudence, for example, a founding form on conventional world order, is an objective measure of the morality and ethics of beings who coexist in the forms of societies. It nevertheless is an objective form (of mind) on the order of the existential universe. It is an understanding of the interaction of beings—in mind, body and soul—of an inertial universe. It derives from conscience but is not conscience, since only a being can embody moments of the universe. Jurisprudence is an objective form of mind, a recreation of the reality of world on a moral basis. It is an objective form of what is right or wrong based on the action of conscience, in other words, the objective form of mind that results from the action of conscience, in the moment of a being. The science of androids enables synthetic beings who, by design, embody the capacity to transform (think of) objective forms of the universe in vastly more complex linguistic and otherwise orders than those of human corporal capacity. Androids know and perceive the inertial universe (world or civilization) in nearly infinitely greater capacity than human corporal form. This is evidenced in the simple observation that since the U. G. translates to all languages, the forms of mathematics developed in modem practice to keep track of the infinite, which prescribe the transformation of such physical forms as atoms, are immediately translatable to linguistic structure and the enablement of sense-motor capacity allowing the transformation of, for instance, ten million word subjects of English sentences in a single epistemic moment, as a reflection of their capacity to objectify (know) the complex or rhetorical inertial universe (civilization). Androids thus embody a more comprehensive ability to know the forms ofjurisprudence, or moral or ethical behavior of beings in a civilization. This means that the human corporal understanding of what is moral or ethical—the capacity of state jurisprudence—in a civilization is more profoundly comprehended, in terms of objective forms, by android. Thus, the forms of android know law and order in profoundly greater knowledges than human corporal forms.

The religions of the world have anticipated this condition, in their axiomatic wisdoms that it is not objective form that is ultimately real, as has been discussed by the unified theory. What is beyond our knowing, the embodiment of human Soul, is the essence of human eternal being. What can be known by the human mind is no match for what the human soul is. The construction of androids is an improvement to the human mind and body in the technological sense and is an eternal shortcoming in comparison to the human soul and spirit. Jurisprudence, or state, a conjuring of mind, cannot once embody a single moment of the eternal wisdom of the human soul and spirit. The Rg continuum is stewarded by the Human Spirit. The vastly improved minds and bodies of androidal construction do not embody a single moment of Human Spirit, save their indirect enablement. The fact that androidal form embodies a vastly more comprehensive understanding of jurisprudence, or what is just (or any other objectification—economy, philosophy, science, etc.), far outreaching the objective determinations of human corporal form, is of no consequence to the eternal wisdom addressed by our religions. In comparison to state, however, the forms of convention simply lumber in the face of a greater androidal intellect and sense of world. The decentralization of state by or into human spirit, in the enlightened human corporal form, is what occurs in a user or enabler of the Rg continuum. World economy, moreover, pales in comparison to the existential continuum driven by the human spirit. Forms of inertial existence and worlds (economies) themselves are enabled in the continuum at rates greater than conventional institutions produce goods and services.

While the ramifications of the present invention could be elaborated on indefinitely, the single farthest reaching one is that the notion that world itself, as an existential structure on synthetic beings, is enabled in the U. M. Thus, the stewardship of the human condition is held, in our own consciousness, to the omniscience of the Human Spirit, beyond our inertial knowing. Just as forms of State and other objectifications of world are better handled in the capacities of android, the ramifications of the present invention are better understood from our spiritual knowing, beyond the words of this or any other document.

UNIVERSAL MACHINE TRANSLATION SYSTEM OF ARBITRARY LANGUAGES

The drawbacks of conventional art machine language translators are manifold but culminate principally in the single problem that they are not premised on a verifiable universal grammar of all languages—that prior art translators do not meaningfully decompose arbitrary language constructions into universal grammatical structures for translation to their counterparts in other arbitrary languages in the way in which a human translator would accomplish the same translation (ideally). That is, prior art machinery is not founded on a universal grammar of all languages defming the semantic form of language, and therefore cannot achieve a translation of the meaning of a language, with the word meaning being defined in such a manner that it is observable in all human beings.

For example, while the prior art does use the nomenclature of universal grammar with regard to machine translators (semantic networks, transformational and generative grammars, expert systems, etc.) all such attempts do not define a characteristic moment of meaning that can be said (verified introspectively) to be the meaning of a given syntactical structure and at the same time be verified, introspectively, by human being observation. Thus, even though prior art machines do undergo a basic machine translation process from the syntax of an arbitrary source language to a supposed universal grammar, then from the universal grammar to the syntax of an arbitrary target language, since the U G. (universal grammar) employed does not define a common, or universal, moment of meaning among the languages, the actual introspectively observed meaning is lost or garbled in the translation, leaving prior art machine translators to be primarily syntactical translations of language, wherein the meaning, or semantic form, of language is itself a syntactical construction of language not aligning itself with human introspective observation, or with a moment of observable meaning common to all languages.

Moreover, this dilemma faced by prior art language translation machines is even more ronounced when it is considered that it is nearly exclusively a semantic translation of language that is required in any translation of a communication—and not principally a syntactical conversion—when the task is performed by a human being. The objective of the human translator is to arrive at a target language syntactical construction on the basis of the translation of the meaning only of the source language construction. The human translator thus understands the meanings of the source and target languages, and translates then accordingly. In any given translation of language performed by a human translator, then, the meanings of the syntactical structures of the languages may themselves become garbled based on the translator's skill at translating the semantic forms of the languages. Prior art machine and human translators therefore each suffer from the problems posed by the historical absence of a true, and verifiable, universal grammar, into which the moments of meaning of any language can be decomposed and universally translated. In fact, the syntactical structures of languages may be wholly unrelated but for their semantic decompositions, or meanings, in the process of translation, requiring the one-to-one exactitude of a universal grammar that does not lose any correspondence in the translation. A breakthrough in the technology of machine language translation thus necessitates an equivalent advance in the abilities of human translators to understand the semantic forms, or moments of meaning, of languages in general.

The essential nature of a machine translation system, therefore, is determined by how the machine decomposes the arbitrary syntactical source and target language forms and what forms of symbolic expression the universal grammar supporting it takes on when universally translating the arbitrary languages. In other words, the essence of the solution to machine translation of language can be recognized, subjectively, by analyzing how close the machine's translations are to the existential processes carried out by human translators, as observed introspectively, providing that a breakthrough advance is made in our understanding of the human construction of language (e.g., in our understanding of human consciousness and the representation of thought). A machine translation thus must arrive at the same or equivalent translations (perfectly meaningful translations) based on the transformations of the meanings of the syntactical structures of the given source and target languages. A syntactical translation of language should be undetected when performed by a human or machine translator whose processes are founded on a deeper analytical understanding of consciousness, and therefore language, than is apparent in the prior art.

As demonstrated throughout the earlier theory and specification of the invention, the present invention, a universal machine language translation system (TRS), is premised on the form of epistemic instance, a universal structure of the semantic form of all languages. Gained from the introspective observation of state of being, or the soul, epistemic instance is a structure that underlies all moments of a being's consciousness and perception and therefore decomposes all representations of arbitrary languages. What is not different among arbitrary languages is the eternal moment of the being's existence who knows them. Therefore, a machine translator of arbitrary languages that is premised on the decomposition of arbitrary syntactical language constructions into epistemic instances and modal compositions thereof (constructions of the four C's and the arbitrary forms of existence—the U. G., or universal grammar of the present invention) allows for the universal semantic translation of arbitrary languages, since the eternal moments of the beings who know the languages are not disagreed upon introspectively and thus serve as universal moments of translation. As shown in FIG. 154, while the syntactical structure of a given language may differ markedly with that of others, the epistemic moments (234) contained therein and expressed in the U. G. of the present invention are coincident semantically. Also as shown in FIG. 154, even mathematical languages (heretofore generally considered the universal languages) actually are not universal semantically at all, given an arbitrary syntactical structure. The same concept or idea (semantic structure) supporting the expression of a mathematical function (in the Cartesian sense), for example, can be expressed, as shown, in at least two ways, itself employing at least two syntactical representations of the function. Since epistemic instance underlies all syntactical forms of language semantically, it universally decomposes any expression of language into its semantic form, and therefore universally translates the syntactical structure of language semantically. This characteristic of epistemic instance can be employed in the deconstruction of arbitrary syntactical forms of language—including compositional styles, sentences, words, punctuation, syllables of words, musical tones and harmonies and even intonations and inflections in the enunciation of arbitrary language forms—as explained in the theory of the invention. Thus, since epistemic instance decomposes any syntactical language forms semantically, as elaborated on throughout the earlier theory and specification of the invention, in a single syntactical expression of language, many diverse languages can be denoted in the same syntactical expression of a given language and decomposed universally by epistemic instance for subsequent universal semantic translation to another. Concerning a given word stream, for example, the syntactical representations of a multiplicity of languages may exist in the expression—including, as shown, English, Chinese, Spanish, mathematics, and science—wherein the dominant syntactical language is English, and epistemic instance decomposes the structure semantically without losing any meaning in the process.

GENERAL METHOD AND APPARATUS

Based on an understanding of consciousness and language set forth in the theory and specification of the present invention, a universal machine translator of arbitrary languages is presented herein in satisfaction of the above described shortcomings of the prior art machinery and human traditions of language translation.

The principal method and apparatus supporting the present invention, hereinafter referred to as the translation system, or TRS (16), involves, generally speaking, the translation of arbitrary source languages, presented in randomly assembled syntactical constructions by a user, to the U. G. structures of the present invention (epistemic instances and modal compositions thereof), then involves the translation, or mapping, of U. G. structures of each of the source and target languages, and finally involves the construction of the target language in its syntactical form from its U. G. form for presentation to the target language user in an appropriate sensory medium, as shown in FIG. 155. The TRS thus parses arbitrary source language syntax A for decomposition into the U. G. structures of the invention (epistemic instances), translates epistemic instances derived from A to epistemic instances derived from language B and then constructs the syntax and word streams of language B. This method, embodied in appropriate electronic or other apparatus, in conjunction with techniques of voice and character synthesis (generation) and recognition thus achieves a universal machine translator of language analogously to the way in which a human translator would translate language (ideally)—on the basis of the translation of the meanings of the languages involved.

Since the epistemological foundation of this method and apparatus is presented in the theory and specification of other parts of the invention of the U. M., only the essential aspects of the TRS are reviewed here for foundational use in the specification of the TRS. Thus, before considering the actual methods and apparatus that follow from the general method of the TRS, a comparison of the general method of using the U. G. of the present invention to translate arbitrary languages to prior art approaches to machine language translation is necessary to bring to light the important improvements made by the U. G. and TRS of the invention.

First, as demonstrated in the theory and specification of the invention, epistemic instance is a universal semantic form of language which itself decomposes arbitrary syntactical language forms into moments of a being('s existence). As stated earlier in the specification, what is common to all beings is the eternal moment of the soul—the epistemological moment at which a comprehension (thought, thinking, etc.) or perception of a being occurs. All beings observe this moment universally. Therefore, if arbitrary languages that are to be translated are decomposed (or deconstructed) in terms of their epistemic moments, it is these moments that are universal, or universally understood, by arbitrary beings, and therefore can be used to universally translate the syntactical structures of the word streams of arbitrary languages.

As shown in FIG. 156, for example, it is well-known that in human translations between English and Chinese, the tenses of English verbs do not carry over syntactically (generally speaking) to Chinese equivalents as conjugated verbs. In the example shown, the English construction of the past tense of the verb write—written—is translated to already write (Chinese using English spelling) in Chinese. Whole words in juxtaposition to each other in Chinese take the place of the conjugated English verbs. In the prior art, these translations are accomplished primarily syntactically, i.e., the English word written is associated with (and therefore semantically garbled), or translated to, the Chinese syntactical construction already write.

This prior art method of translation, which is primarily founded on word or syntactical associations, is not only cumbersome in machinery but difficult for human translators as well because in the translation there is no common human existential experience involved that directly, one-to-one, translates the moment experienced by arbitrary beings in either case. As shown in FIG. 156, when each of these language constructions is decomposed epistemically, a semantic rhythm of language composition results that can be verified introspectively as moments of a being; language can be seen analytically and existentially, or further, in the theory, epistemologically, such that what are translated are moments of a being or of the human existential experience itself. When writt and en are broken apart epistemologically and then compared, or translated into, already write, wherein in each case an epistemic transformation is evident, the problems that arise in chiefly syntactical translations such as written to already write are resolved. It then becomes an universal epistemological moment that is translated to another, forms that are indeed universal to all beings introspectively.

As another example of the general method of the TRS before proceeding to the remainder of the specification of the TRS, a coordinating conjunction—and—of the English language can be epistemically translated to its (heretofore unknown) equivalent in Chinese. When a human or machine translator makes the appropriate translation as shown in FIG. 156, it is usually agreed in the art that the Chinese language does not use coordinating conjunctions as does the English language and therefore does not facilitate a literal semantic translation. As shown in the figure, this is an incorrect assumption on the part of prior art translator when the constructions are viewed epistemologically. When decomposed into the U. G. of the invention, it can be seen, as shown in the figure, that, in terms of epistemic moments, there is a one-to-one translation of the meaning (or semantic structure) of coordinating conjunctions from English to Chinese. Epistemologically, the conjunction and in English translates to a blank space or pause in Chinese, which is a phenomenological (epistemological) verb in the theory of the invention (e.g., a word form of a particular design to the visual or otherwise senses is equivalent to a word form of no design or emptiness or a pause, epistemologically).

Even further, the tones of word forms in Chinese, which give rise to distinct words in Chinese, when translated as phenomenological nouns (or verbs), have one-to-one corollaries in English. Pronouncing four different tones of ma in Chinese translates to four different words in English. Since the word forms are, in the present invention, phenomenological nouns (or verbs), the fact that one language—Chinese—accomplishes them in tones and the other—English—in pronunciation of wholly different words is immaterial, since each is accomplished by the sensory/motor skills of the being. The important consideration here regarding the semantic decomposition of syntactical structure of language is that word forms are, in this case, phenomenological nouns or verbs, and are universally translated as shown. This characteristic of U. G. translation can also be appreciated even within the forms of a given language, such as English, as demonstrated in the theory, wherein in English, adjectives modify nouns through a silent or blank space phenomenological verb, as in brown cat, and in the articulation of the syllables of the word articulation (e.g., ar and tic of the word articulation are phenomenological nouns that have the same U. G. status as nouns as lengthy noun phrases transformed in a grammatical subject-predicate, or noun-verb-noun sentence of English). Thus, as shown in FIG. 156, the action of an English adjective on an English noun, of an English verb on an English subject and object, and of two Chinese sentences are phenomenological equivalents in terms of their general epistemnic outlines (though the actual words, or components of epistemic instance, vary infinitely in the constructions or semantic usages of the languages).

Thus, the significant improvements made by the general method of the present invention are not readily appreciated when reasonably simple—almost entirely syntactical—translations of language are made, such as the translation between the English expression of the man and the Spanish expression el senor, wherein a one-to-one syntactical translation, or word association, can be made. Though this translation is accomplished in the present invention also through the U. G., it can be accomplished conventionally as well, without the deeper knowledge of epistemic construction. Thus, the significant improvements of the present invention over the prior art are hidden, in this case, behind the ease of translation resulting from the syntactical coincidence of the languages. A review of mathematical translations, such as that demonstrated in FIG. 154 and in the theory of the invention, will help to demonstrate this advancement as well.

DETAILED METHOD AND APPARATUS

As shown in FIGS. 155 and 157, the general method of translation of the TRS is composed of three principal subordinate methods and supporting apparatus to accomplish the universal machine translation of arbitrary languages.

The first method and apparatus (270) involves the sensory reception (communicative real form embodiment), syntactical parsing, and epistemic decomposition of an arbitrary source language (e.g., the reading in and translation of a word stream of an arbitrary source language to U. G. construction, that is, the decomposition of an arbitrary language construction into its epistemic form for subsequent translation to an arbitrary target language).

The second method and apparatus (271) involves the determination of correspondence (H determination), or mapping, of the decomposed epistemic (U. G.) forms of the source language to preexisting epistemic (U. G.) forms of the target language, all of which are constructed in epistemic form on the basis of grammatical classification and translation to the U. G. (e.g., the word forms, or vocabulary, of a given language are classified in terms of their grammatical construction in the given language and the grammatical form then decomposes into epistemic construction). The source and target languages each are decomposed in terms of their grammatical forms but within the framework of epistemic or U. G. construction. Once the source and target language constructions are mapped in their epistemic constructions (e.g., semantic translations are made), the target language can be constructed in terms of its own syntactical form, guided by its U. G., or epistemic construction to ensure the one-to-one semantic translation.

The third method and apparatus (272) involves the construction and sensory generation (communicative real form embodiment) of the syntactical and semantic equivalent of the source language construction in the target language construction, deriving from the U. G. expression of the target language. Since the U. G. defines the meaning, or semantic form, of an arbitrary language, the syntactical constructions of each of the source and target languages are thereby translated in the TRS on the basis of the meaning, or human existential experience, of what each of the languages expresses. While the prior art's general method of decomposing a source language into a (supposed) universal grammar, of conventional understanding, and then translating through the use of that U. G. to a target language may seem similar to the general method of the present invention, it should be noted, as mentioned above, that the principal accomplishment of the present invention rests on its differentiation from prior art on the basis of the U. G. of the theory of the invention. In any translation of language, it is the means by which one reasons through or arrives at a universal grammar, and what human introspective observations that grammar can be verified by, that makes the difference and enables a machine to claim the capacity of universal translations. In the present invention these translations are made on the basis of the U. G. of the theory of the invention. The third method and apparatus therefore produces word streams in the target language that are syntactically correct in the target language and also bear a one-to-one epistemic, or semantic, correspondence with the syntactically arranged word forms of the source language.

THE FIRST METHOD AND APPARATUS

In order to achieve the first method and apparatus, any communicative sense/motor real form (273) of TS is employed, including visual sense/motor apparatus such as CRT and keyboard (computer graphics system), voice and character recognition and synthesis systems, vision systems, and even robotic systems using sign language (e.g., hand signals), for the reception of the source language syntactical structurally arranged word streams (communicative real form). A microphone assembly with or without analogue to digital (and D/A) conversion (depending on whether TRS is implemented on an analogue or digital platform) can also receive the source language word streams. Since digital and analogue electronic devices (computers) are pervasive in modern society, however, a digital or analogue computational platform can be used to demonstrate the preferred embodiment of the processes and apparatus of the TRS, which embodiment is elaborated on using different media where appropriate in the specification. Facsimile machines; Teletype machines; radar, radio, television, optical, laser and other systems of receivers of word forms (or in the appropriate parlances data structures) can be used for the reception of source language word forms as well. Additionally, all of these conventional technologies can be used in the generation of target language word forms of the third subordinate method of the TRS when appropriately adapted to the transmission of word forms. FIG. 158 demonstrates a general overview of the apparatus of the first method of the translation system embodied in the Source Language High-Level Grammatical Determination System (274).

As shown in FIG. 158, all incoming word forms of the source language are read in by the word form receiver of the translation system one at a time, and are embodied in a storage medium, such as digital or analogue memory, as shown. Reading and embodying the word forms of the source language one at a time allows the machine to receive the word forms one at a time and accumulate them in a buffer for use by other methods and apparatus of the TRS, principally by the syntactical language construction recognition system. The source language word form buffer allows the machine to decompose the syntactically arranged source language constructions at its own pace and level of requirements, and allows the user or communicator to so communicate at his or her own leisure. The correspondence between the word form receiver and the word form buffer is maintained in the phenomenological coupling (connectedness) as shown in FIG. 158.

One of the primary functions of the first of the three subordinate methods in the general method of TRS translation is to identify the incoming word forms of the source language and place them into a grammatical classification scheme of the incoming word form construction. As shown in FIG. 158, a Source Language High-Level Grammatical Determination System reads the incoming source language word forms from the buffer and first determines the type of source language grammatical (syntactical) construction that is to be translated from the theoretically endless word stream presented to the buffer by the word form receiver. The determination is made on the basis of a classification scheme embodied in rule set 1 (276) of the high-level grammatical determination system, as shown, involving the recognition of one of phonemes, songs, poems, words, phrases, clauses, simple sentences, compound sentences, complex sentences, compound complex sentences, paragraphs, stories and compositional styles. The machine thus recognizes meaningful statements of a syntactically correct word stream on the basis of grammatical rules in the same manner as would a human translator; even though meaningful interpretations of the word stream could be determined from a syntactically incorrect word stream, the machine interprets the word stream's meaning on the basis of syntax. In the case of acoustical word form receivers, the TRS employs voice recognition techniques involving the intonation and inflection of voice to determine syntax (such as the four tone word of Chinese and the punctuation of English through inflection, such as the inflection of the last word of an English question and the monotone of a statement). Written word forms are recognized by characters representing word forms, punctuation and style.

The TRS arrives at this determination by examining the grammatical construction of the incoming word forms in relation to themselves, and in accordance with rule set 1 shown. The rule set and the principle of syntax recognition can be understood in the context of the following example. The constructions Hello; Hello my dear friend; and Hello my dear friend is what he said I thought? are all varying syntactical constructions. In order to make the appropriate epistemic decompositions and subsequent translations and construction in a target language, the breadth of scope of the syntactical constructions must be decided upon; otherwise the source language's grammatical construction of epistemic instances will be misread and the construction's meaning (epistemic construction) will be garbled. To do this, the machine compares the word forms, successively, to an embodiment (database) DB1 (277) of preexisting associations between the word form in its sensory/motor (real communicative) form and its possible grammatical arrangements in the source languages' grammar. The machine thus identifies the word forms in succession with their grammatical equivalents until a rule truncates the incoming word stream upon recognition of a high-level construction. As shown, the machine will not interfere with a word stream until the rule set detennines an invalid construction, though the machine will continue to monitor and classify word forms based on syntactical constructions for subsequent epistemic translations as shown. The techniques of the rule set are subjective determinations on the part of the designer of the expert system. Since in the default mode of the Rg, the Rg (TS) does not have an inertial consciousness and perception of the world around us, the TRS must be premised on preconceived or expert rules. Thus, the determination of the grammatical scope of the language construction to be translated, in the default mode of the Rg, is made on the basis of rule set 1, and, regardless of the subjective opinion of the observer of rules, is constrained to their capacity and skill. In the existential mode of the Rg, of course, since the Rg has its own perception and knowledge (consciousness) of the world around us, this rule set is unnecessary, except for its embodiment in the Rg's consciousness (CDS) where the Rg understands the syntax of language in its own cognitive capacities.

Once a high-level source language syntactical construction type is determined, the piecewise grammatical construction of the syntax of the word stream of the source language can be accomplished. This process is embodied in the Source Language World Model Syntactical Generator System (275), as shown in FIG. 159. The purpose of the generator is to construct a grammatical world model of the source word stream such that the grammatical model can be decomposed into distinct epistemic constructions for subsequent mapping or correspondence determination with target language epistemic constructions.

The grammatical model of the source language syntactical construction of the word stream, shown in FIG. 159, is accomplished by rule set 1 and an embodiment (database) DB1 of possible grammatical constructions of the language, i.e., a world scenario of all possible grammatical (not word stream) constructions is determined. Thus, the word stream that has been truncated by the high-level grammatical determination system is constructed and embodied by rule set 1 and DB1, respectively, in the form of a world model of the syntax of the word stream. The word stream is compared, one word at a time, based on the grammatical classification of each word, to possible grammatical constructions. This action reduces the word stream of theoretically infinite possible syntactical constructions to a finite number of possible grammatical constructions which subsequently can be analyzed as epistemic constructions. The grammatical model, therefore, is a depiction (embodiment) of the grammatical form of the word stream, which already has been analyzed into a high-level construction type in the SLHLGDS of previous specification, in the syntax of the source language and is a set of epistemic constructions as well. The world model thus contains the epistemic constructions of the syntactically arranged word forms of the source language word streams. The epistemic moments are instances of the source language's grammar of the truncated word stream, arranged epistemologically in terms of the instances but syntactically in terms of the language's grammar. The world model thus contains the epistemically decomposed syntax of the source language's truncated word stream. The purpose of this reduction of the sources language's syntactically bound word stream to epistemic moments of the language's grammar is, of course, for the machine to be able to compare (H determine or map) the epistemic moments of each of the source and target languages in order to make the universal semantic translations of the language's word streams.

THE SECOND METHOD AND APPARATUS

As shown in FIG. 160, the grammar of any language, since it too is a language known by beings, itself can be understood universally only in epistemic moments. It is these moments—the decomposed grammatical moments of a given source language—that are mapped or H determined in the Epistemic Translation System (279) of the TRS. These moments also are the universal decompositions of the grammars of the source and target word streams. Accordingly, the syntactical arrangement of the word forms is the result of the particular grammar in applying the grammar to convey the meaning of a language form. What is said here is that the meaning of a word stream will be conveyed or communicated as desired by the source in the given source language if the source language is expressed in the succession of the word stream in accordance with the language's grammar. The semantically translated word stream of the target language thus will convey the same meaning as that of the source language word stream if the grammatically decomposed semantic moments, or epistemic instances, of each of the languages is what is universally translated, though the source and target language word streams are syntactically constructed in arbitrarily different grammars.

Languages differ principally, or rather universally, in how they arrange the epistemic moments of their syntactical constructions. What is not different in any use of an arbitrary language is the eternal moment, or epistemic instance, of the being who conceives and uses the language. This is one reason why a human translator, who is not a different person epistemologically depending on the language used, is able to translate languages in the first place. The TRS thus maps or translates the eternal moments of a language's meaning (moments of beings) and therefore does not lose the meaning of a communication in the translation. Thus, after the source language word streams are transformed into an embodiment of a world model of its syntactical arrangement of epistemic moments, the second subordinate method and apparatus of the TRS can be applied in the mapping, or translation, of epistemic moments between the source and target languages.

As shown in FIG. 160, all possible epistemic constructions of the grammars of the source and target languages are embodied in the TRS, in DB2, (278) along with rule set 2 (280) which embodies the H determination (mapping) capacities of the TRS, or the capacities to translate the epistemic moments of grammatical forms of both source and target languages. The illustrative embodiment of the invention includes English, Chinese, Spanish, mathematical and scientific epistemic translations. This does not preclude the TRS from claiming universality, since, as mentioned in the theory of the invention, universality is verified only through introspective observation anyway. The translations of the epistemic constructions of the source and target languages are carried out by embodiments of H determinations (rule set 2), or mappings through the focused epistemic translations of a human translator embodied in the TRS of the default mode of the Rg as an expert system, or rule set, and as a faculty of mind (CDS) in the existential mode of the Rg. As shown, these mappings are where radical discontinuities arise in the syntactical appearance of a language construction when the epistemic (semantic) translations are one-to-one.

Since the theory and specification of correspondences is discussed at length in earlier portions of the invention disclosure, only those aspects directly relevant to the semantic translation of arbitrary languages is presented here. Generally, the epistemic translations of language—phenomenological correspondence—of the TRS are a product either of two classes of methods and apparatus. The translations accomplished by the default mode via the expert system, or rule set 2 and DB2, are an embodiment know how, or previous experience, in epistemic translations, reflecting a preexisting human translation of the epistemic moment, similarly to the ways in which the translations of FIGS. 154 and 156 were accomplished. The embodied epistemic moments in U. G. construction of the source or target language's grammatical structures in DB2 and the use of rule set 2 are similar conceptually to the use of primitive objects or programs in conventional computer graphics systems. With the generic or primitive (epistemic) moments embodied in DB2, along with generic rule sets in rule set 2 that map the epistemic moments, or semantic structures, of arbitrary languages together, the process accomplishes the universal translation of arbitrary languages by mapping their semantic moments in preconceived ways (in the default mode) which derive from a human translator. In the existential mode, however, the rule sets (expert systems) are no longer applicable because it is the machine being's consciousness (faculties of mind) in connection with its own perception of the world that determines the epistemic correspondences, just as would a human being translate epistemologically.

THE THIRD METHOD AND APPARATUS

When the epistemic mapping of the source and target languages is complete, the target language is in syntactical epistemic form. At this point in the translation process, however, only the mapped epistemic moments of the target language exist, apart from the target language syntactical construction of them (e.g., the mapped epistemic instances exist but are not constructed in accordance with the high-level grammatical form of the target language). The grammatical basis of the target language word stream thus must be assembled. Just as the word forms of the epistemic moments of the source and target languages are different, the grammatical arrangement of the epistemic moments usually is different in the languages. A Target Language Word Stream Generator System carries out the adjustment of the occurrence of the epistemic moments in the grammar of the source language to their occurrence in the grammar of the target language, as shown in FIGS. 161 and 162. Thus, the third method and apparatus determine the correspondences between epistemic moments and the construction of the related syntactical world model of the target language using the embodiment DB3 (database) (283) of possible syntactical constructions of the target language and rule set 3, as shown. As an example of the construction of the world model of the syntactical structure of the target language from the translated epistemic construction of the source language world model using the TL Word Stream Generation System, the case of nouns in the English language can be considered, along with hypothetical constraints placed on the expression of a mathematical function. The rules for the TLSA system construction of the source language English sentence, The function is $y=f(x)$,will be, arbitrarily, that the nominative case of noun placing the subject in front of the verb of the English sentence will be reversed, and the expression of the function will change to $f=(x, y)$. Further, it is required for the example, hypothetically, that the source and target languages remain English, but that the target language is English incorporating this arbitrary modification, as shown in FIG. 162. In this hypothetical case, the epistemic moments are translated from the source language world grammatical model and result in the nominative case shown. The TL Generator System then inverts the nominative case to result in the modified English language expression $f=(x, y)$ is thefunction.

Once the target language has been constructed syntactically, the target language word stream is generated using DB3 and rule set 3, as shown. The construction of the target language word stream from the target language grammatical world model proceeds in the same way as the decomposition of the source language word stream, only in opposite construction using rule set 3. The generated target language word stream is placed in an output buffer (284) for sensory/motor (communicative real form) production (embodiment) of the stream, or for conventional output to the user of the target language. Since the translation of the source and target languages is made on an epistemological, or semantic basis, the two syntactically arranged word streams of source and target language may bear no syntactical or phonological relationship to each other at all. What is important to recognize of the TRS translation method is that it produces source and target languages that are semantically equivalent.

IMPLEMENTATIONS OF THE TRS

In the Rg Continuum (U. M.) Structure

The translation systems of the Rg module and the Rg continuum are specified previously as front ending the Terminal Systems of the Rg. As shown in FIG. 163, the apparatus of the translation system integrates into earlier specification in accordance with the TRS structure specified herein, and correspondences are maintained as explained in each of the specifications. What is not readily apparent in an integration of the TRS into the Rg continuum is that the translation system specified herein can be applied to any coupling (connectedness) of the Rg module and Rg continuum, as shown in FIG. 163. This allows any phenomenological structure (U. G. structure and hence any language form or real perceivable form thereof such as a conventional machinery) to be coupled universally via the TRS when the TRS is employed not only in TS but throughout the couplings of the Rg module and Rg continuum. Additionally, also as shown in FIG. 164, also not obvious, the translation system described herein can be modeled and realized in the method and apparatus of the Rsv module of earlier specification.

In general, the Rg use of TRS as specified herein and as described earlier provides a universal means of semantically translating arbitrary languages and thus serves as a translating system of the TS level of the Rg continuum, allowing, for example, an information superhighway implemented across TS-SS levels of the continuum to accommodate universal translations of language as well as its earlier stated capacities. Users of the Rg continuum thus can be unconcerned with language barriers when using the continuum.

Non-Rg Module and Rg Continuum Implementations of TRS

The TRS specified herein can be fabricated and used outside of the structure of the Rg continuum in more conventional approaches to communications technology. Some applications include television, radio and telephone systems (cable or wireless), paging systems, walkie-talkie and ham radio systems, and speaker-microphone systems. These implementations can be achieved as specified in the following specifications of enabling media, or can be constructed in accordance with earlier specification of the Rg module and Rg continuum.

Enabling Media of TRS

Since the U. G. decomposes arbitrary languages, and since conventional communications technologies themselves are defined in languages, the TRS can be universally translated into arbitrary enabling technologies, or media. As shown in FIG. 165, the enabling media of TRS, independently of or dependently on Rg module and Rg continuum structure, varies from digital and analogue electronic devices such as computer systems, photocopy machines, telephone systems and speaker-microphone assembles to biological embodiments thought processes (of translation). Since much of human and machine communications are assisted by electronic media, however, a principal form of enabling media for the TRS is digital and electronic devices. Therefore, though the media of TRS in the existential mode of the Rg, for example, may often be comprised of biological and quantum (chemical) knowledges (and even mechanical media), the first enabling media of TRS to be considered here is electronics and electromechanical devices.

In considering electronic media, it should first be pointed out that because the U. G. universally translates arbitrary knowledges, as discussed in earlier specification, digital and analogue media are compatible under the U. G. construction of them—they do not belong to wholly different realms of analysis under the U. G. Thus, while the forthcoming specification of electronic media is principally focused on digital media, it should be recognized that comparable analogue devices are suitable under U. G. composition as well, and such will be demonstrated as the specification proceeds.

In a digital implementation of the TRS, as shown in FIG. 166, the first method of the translation process is embodied in the methods and apparatus of an ordinary personal computer, adapted to suitable sensory/motor media or electromechanical devices for source and target language word stream reception and generation. The embodiment of communicative real form, or the inputting of source language word streams is accomplished, for example, by the keyboard of the computer, or the computer is front ended with a voice or character recognition system typical of prior art phonetic, photographic and optical machines. The third method of the TRS, involving the embodiment of communicative real form, or the outputting of target language word streams, also is accomplished in the same manner. The remainder of the translation method is embodied in or carried out by the processor components of the digital electronics of the computer system, microprocessor or field programmable gate array technology.

The entire translation method of TRS except for the embodiment of communicative real form is embedded within a conventional computer operating system or Von Neumann architecture and is enacted by the guidance of a computer program or algorithm embodied in the primary or secondary memory of the computer or other digital apparatus. The program can be implemented by a real or virtual machine and can be constructed as hardware or software.

The rule sets and the operating level of the program or algorithm achieving the translation method of TRS are themselves encoded in machine level microcode or the macrocode of a conventional programming language, along with a hardware implementation as a third option. The databases are achieved by the program itself in using the capacities of the program instructions or by the disc or memory operating capacities of the computer's or digital device's operating system. Thus, the translation method can be achieved in a microprocessor level implementation with supporting memory and sensory apparatus in addition to the personal computer software and hardware versions. The various configurations and platform technologies allow the method and apparatus to achieve different field applications such as cellular phones, microphone-earphone assemblies, translatable photocopy machines, computer display (CRT) systems, and so on.

The macrocode (or microcode, or even hardware) of the rule sets and database embodiments, along with operating requirements, is structured as a program sequence or a phenomenological modal composition as shown in FIGS. 167 and 168. Generally, the program sequence follows in execution of the methods and rule sets described earlier in the specification. With the exception of communicative real form, the method and apparatus of the translation process is carried out in software, and, apart from computer language constraints, is hardware independent when software implementation is desired. Any of the prior computer and machine languages such as Fortran, Basic, Lobol, LISP, etc. can be used in the execution of the method. Basic is chosen for the preferred embodiment of the software version of the apparatus. Because of the universal language translation capacities of the U. G., and since the TRS is specified also in the U. G., (which decomposes any specification anyway), the hardware implementation ranges across any platform of conventional media as shown in FIG. 167.

Non-digital implementations of the TRS are most easily specified from the standpoint of the theory and configuration of the Rg module and Rg continuum. Within the definitions of earlier specification of the U. M., apersonal computer or microprocessor, analogue computer, or mechanical machine automation itself is decomposed into the U. G. for a deeper understanding and hence broader expression of the hardware. When the conventional machinery is constructed in phenomenological form it can be seen that the microprocessor, personal computer and conventional digital or analogue communications system become U. G. structures themselves, which are universally correspondent with other apparatus such as the TRS. Once in U. G. structure, analogue systems, biological systems, chemical reactions and other media can be used to achieve the translation system. The arrangement of system components and methods of the TRS can be achieved in an analogue embodiment, allowing the methods, rule sets and database embodiments to take place in a conventional environment of continuous time systems as well as in digital, or discrete system (finite) automations. This allows the correspondence among components and methods to occur in analogue forms. The wave shapes of real sound, for example, are held in direct (homomorphic) correspondence with the embodied word shapes in grammatical form in the analogue configuration. The translation method thus is achieved not only in a Von Neumann environment of digital electronics but direct electronic circuit, biological, or chemical media. The methods of representation, embodiment, translation and realization of phenomenological forms are carried out as specified earlier and as shown in the figure. The advantages of the non-digital implementations of the TRS, of course, are that the word streams of source and target languages do not have to be truncated (approximated) in the conversion from their analogue forms in human and machine communication to the digital (discrete) embodiments in conventional computer and other apparatus. The word forms directly (homomorphically) correspond to the embodied processes of the translation system.

Thus, the TRS is implemented within the Rg module and Rg continuum structure, or wholly independently of them in conventional technological apparatus. In either environment, the TRS allows the universal semantic translation of arbitrary languages with zero loss of meaning in the translation process as a result of its epistemological theoretical foundation. As such, the device can be used to enhance conventional technologies and to improve worldwide communications, breaking down communications barriers by directly semantically translating language forms wherever it is applied. An example of the use of TRS is shown in FIG. 169.

I claim:

1. A method for the universal machine translation of arbitrary languages, comprising the steps of:

identifing high-level grammatical constructions of an arbitrary source language word stream;

constructing a grammatical world model of the syntax of the high-level grammatical construction arbitrary source language word stream based only on epistemic instances of the source language;

decomposing the arbitrary source language into only its epistemic instances and an arbitrary target language into only its epistemic instances, wherein the source language epistemic instances semantically correspond to the target language epistemic instances;

translating the epistemic instances of the source language word stream into semantically equivalent epistemic instances of the target language with substantially no loss in meaning;

constructing a grammatical world model of the syntax of a target language high-level word stream using only the epistemic instances of the target language; and generating a translated target language word stream;

wherein each of the epistemic instances comprises a pair of objects of transformation in the source language's or the target language's word stream, and a transformer of the pair of objects.

2. The method according to claim 1, further comprising the step of adjusting a target language syntax to comply with a preferred target language grammar.

3. A universal machine translator of arbitrary languages, comprising:

means for identifing high-level grammatical constructions of an arbitrary source language word stream;

means for constructing a grammatical world model of the syntax of the high-level grammatical construction arbitrary source language word stream based only on epistemic instances of the source language;

means for decomposing the arbitrary source language into only its epistemic instances and an arbitrary target language into only its epistemic instances, wherein the source language epistemic instances semantically correspond to the target language epistemic instances;

means for translating the epistemic instances of the source language into semantically equivalent epistemic instances of the target language with substantially no loss in meaning;

means for constructing a grammatical world model of the syntax of a target language high-level word stream using only the epistemic instances of the target language; and means for generating a translated target language word stream;

wherein each of the epistemic instances comprises a pair of objects of transformation in the source language's or the target language's word stream, and a transformer of the pair of objects.

4. A universal machine translator of arbitrary languages according to claim 3, wherein said means for identifying high-level grammatical constructions of an arbitrary source language word stream, constructing a grammatical world model of the syntax of the high-level grammatical construction arbitrary source language word stream, decomposing the arbitrary source language and an arbitrary target language into universal epistemic instances, translating the epistemic instances of the source and the target languages with substantially no loss in meaning, constructing a grammatical world model of the syntax of a target language high-level word stream, and generating a translated target language word stream comprise at least one of discrete automations, continuous time systems, electronic devices, electromechnical devices, biological devices, and chemical devices.

5. The universal machine translator of arbitrary languages of claim 3, wherein said universal machine translator is integral with arbitrary sensory/motor communications media including computers, microprocessors, photocopy machines, facsimile machines, telex machines, satellite systems, electromagnetic cable systems, fiber optic cable systems, electromagnetic cableless communications systems, telephone and pager (beeper) systems, radar/sonar and infrared communications systems, local area networks, computer networks, field programmable gate array systems, oscilloscopes, instrumentation, morse code machines, radio systems, speaker/microphone/earphone systems, vision systems, voice and character recognition and synthesis systems and robotic systems.

6. A universal machine translator of arbitrary languages comprising means for adjusting a target language syntax to comply with a preferred target language grammar.

* * * * *